US010326607B2

(12) United States Patent
Sasaki et al.

(10) Patent No.: US 10,326,607 B2
(45) Date of Patent: Jun. 18, 2019

(54) METHOD FOR CONTROLLING INFORMATION APPARATUS AND COMPUTER-READABLE RECORDING MEDIUM

(71) Applicant: PANASONIC INTELLECTUAL PROPERTY CORPORATION OF AMERICA, Torrance, CA (US)

(72) Inventors: Takamitsu Sasaki, Osaka (JP); Kohei Tahara, Osaka (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 640 days.

(21) Appl. No.: 14/487,431

(22) Filed: Sep. 16, 2014

(65) Prior Publication Data

US 2015/0005952 A1 Jan. 1, 2015

Related U.S. Application Data

(63) Continuation of application No. PCT/JP2013/007671, filed on Dec. 27, 2013.

(Continued)

(51) Int. Cl.

*F24F 11/00* (2018.01)
*G05B 15/02* (2006.01)

(Continued)

(52) U.S. Cl.

CPC .......... *H04L 12/2803* (2013.01); *G05B 15/02* (2013.01); *G06F 3/04817* (2013.01);

(Continued)

(58) Field of Classification Search

CPC ............. G06F 3/04817; G06F 3/04842; G06F 3/04847; G06F 3/0488; G06F 19/00;

(Continued)

(56) References Cited

U.S. PATENT DOCUMENTS 6,756,998 B1 6/2004 Bilger
7,730,223 B1 6/2010 Bavor et al.

(Continued)

FOREIGN PATENT DOCUMENTS

JP 5-83764 4/1993
JP 7-177489 7/1995

(Continued)

OTHER PUBLICATIONS

Agarwal et al., Occupancy-driven energy management for smart building automation, 6 pages (Year: 2010).*

(Continued)

*Primary Examiner* — Thuy Dao

(74) *Attorney, Agent, or Firm* — Greenblum & Bernstein, P.L.C.

(57) ABSTRACT

A control method according to the present disclosure causes a computer of an information apparatus to: display on a display, a display screen representing a floor plan of one floor including at least two or more rooms; display each device icon representing each of one or more target devices in a region of each room, the one or more target devices including a specific target device that stores a set content when power has been previously turned off; and when selection of the device icon that represents the specific target device in any region of the at least two or more rooms is sensed, and selection of any region in the room, in which the selection of the device icon has been sensed, is sensed, output an on-off control command for controlling an on-off state of power of the specific target device corresponding to the room.

16 Claims, 187 Drawing Sheets

Related U.S. Application Data

(60) Provisional application No. 61/766,912, filed on Feb. 20, 2013.

(51) Int. Cl.
*H04L 29/08* (2006.01)
*H04L 12/28* (2006.01)
*H05B 37/02* (2006.01)
*G06F 3/0481* (2013.01)
*G06F 3/0484* (2013.01)

(52) U.S. Cl.
CPC ...... *G06F 3/04842* (2013.01); *G06F 3/04847* (2013.01); *H04L 12/282* (2013.01); *H05B 37/02* (2013.01); *H04L 2012/2841* (2013.01)

(58) Field of Classification Search
CPC .............. H04L 12/282; H04L 12/2803; H05B 37/0272; H05B 37/0227; H04B 10/116; G05B 15/02; G05B 2219/2642; F24F 11/006; F24F 11/0012; F24F 11/30; F24F 11/62; F24F 11/52; F24F 11/46; B60R 2001/1253; B60K 2350/1024; A61B 5/681; A61B 5/0022; A61B 5/1117; A61B 5/7267
See application file for complete search history.

(56) References Cited

U.S. PATENT DOCUMENTS 8,344,665 B2 1/2013 Verfuerth et al.
8,473,852 B2 * 6/2013 Russell .................. G05B 15/02 715/757
8,581,698 B2 11/2013 Ledlie et al.
8,880,204 B2 * 11/2014 Frei ..................... H04L 29/1249 700/90
9,092,040 B2 * 7/2015 Fadell ................ G05D 23/1902
9,134,715 B2 * 9/2015 Geadelmann .......... G05B 15/02
9,201,815 B2 * 12/2015 Frei ..................... H04L 29/1249
9,303,890 B2 * 4/2016 Haines ................... G05B 15/02
9,497,832 B2 * 11/2016 Verberkt ............ H05B 37/0227
9,571,986 B2 * 2/2017 Gottschalk ............. G06F 17/50
9,798,309 B2 * 10/2017 Tirpak .................. G05B 15/02
10,168,677 B2 * 1/2019 Funes ................. H04L 12/2834
2003/0050737 A1 3/2003 Osann, Jr.
2004/0002792 A1 * 1/2004 Hoffknecht ............ G05B 15/02 700/295
2005/0086093 A1 4/2005 Hammad et al.
2005/0131991 A1 6/2005 Ogawa et al.
2006/0028212 A1 2/2006 Steiner et al.
2007/0080940 A1 4/2007 Aoki et al.
2008/0316730 A1 * 12/2008 Diederiks ............. G06F 3/0481 362/85
2010/0262298 A1 * 10/2010 Johnson ................. F24F 11/001 700/277
2011/0015797 A1 * 1/2011 Gilstrap ................. G05B 15/02 700/291
2011/0068900 A1 * 3/2011 Billig .................. H04L 12/2818 340/9.1
2011/0126144 A1 5/2011 Sakaguchi et al.
2012/0066632 A1 * 3/2012 Sundermeyer ....... G08B 25/003 715/771
2012/0242254 A1 * 9/2012 Kim .................. H05B 37/0272 315/312
2012/0284672 A1 * 11/2012 Madonna ........... H05B 37/0245 715/850
2013/0050109 A1 * 2/2013 Ban ..................... G06F 3/04817 345/173
2013/0179826 A1 7/2013 Wang et al.
2014/0043791 A1 2/2014 Diederiks et al.
2014/0089859 A1 3/2014 Ishizaka
2014/0236325 A1 8/2014 Sasaki et al.

FOREIGN PATENT DOCUMENTS

| | | |
|---|---|---|
| JP | 09-065453 | 3/1997 |
| JP | 11-251072 | 9/1999 |
| JP | 2000-138979 | 5/2000 |
| JP | 2003-85356 | 3/2003 |
| JP | 2005-302017 | 10/2005 |
| JP | 2007-104567 | 4/2007 |
| JP | 2009-177743 | 8/2009 |
| JP | 2009-213107 | 9/2009 |
| JP | 2009-266654 | 11/2009 |
| JP | 2011-204656 | 10/2011 |
| JP | 5128489 B2 | 1/2013 |
| WO | 2007/072315 | 6/2007 |

OTHER PUBLICATIONS

Ellis et al., Matchstick: a room-to-room thermal model for predicting indoor temperature from wireless sensor data, 11 pages (Year: 2013).*
Mantoro et al., Web-enabled smart home using wireless node infrastructure, 8 pages (Year: 2011).*
Mamidi et al., Improving building energy efficiency with a network of sensing, learning and prediction agents, 12 pages (Year: 2012).*
Office Action issued in U.S. Appl. No. 14/165749, dated May 4, 2016.
Office Action issued in U.S. Appl. No. 14/165749, dated Aug. 24, 2016.
Japan Office action, dated Feb. 17, 2015.
U.S. Appl. No. 14/325,755 to Takamitsu Sasaki et al., filed Jul. 8, 2014.
U.S. Appl. No. 14/453,767 to Takamitsu Sasaki et al., filed Aug. 7, 2014.
U.S. Appl. No. 14/487,438 to Takamitsu Sasaki et al., filed Sep. 16, 2014.
U.S. Appl. No. 14/462,609 to Takamitsu Sasaki et al., filed Aug. 19, 2014.
International Search Report, dated Apr. 8, 2014 for Patent Application No. PCT/JP2013/007671.
International Search Report, dated Jul. 2, 2013 for Patent Application No. PCT/JP2013/002201.
European Search Report, dated Aug. 12, 2014 for Patent Application No. 13 821 785.6.
Office Action issued in U.S. Appl. No. 15/659,985, dated is Jan. 15, 2019.

* cited by examiner

| VERTEX ID | VERTEX COORDINATE |
|---|---|
| A | (X0,Y0,Z1) |
| B | (X20,Y0,Z1) |
| C | (X40,Y0,Z1) |
| ... | |
| P | (X150,Y100,Z1) |

| ROOM ID | ROOM TYPE | ROOM COORDINATE |
|---|---|---|
| A | LIVING ROOM | (F,G,H,I,L,O,N) |
| B | BEDROOM | (J,K,M,L,I) |
| C | BATH | (A,B,G,F) |
| D | STAIRCASE | (H,I,R,Q) |
| ... | | |

| DEVICE ID (4701) | DEVICE TYPE (4702) | MODEL NUMBER (4703) | ARRANGEMENT (4704) | CAPABILITY INFORMATION (4705) | CONTROL COMMAND TRANSMISSION DESTINATION (4706) |
| --- | --- | --- | --- | --- | --- |
| A | AIR CONDITIONER | CS-X403C | (X10,Y100,Z1) | TEMPERATURE CONTROL, AIR FLOW DIRECTION CONTROL, AND AIR FLOW AMOUNT CONTROL | DEVICE |
| B | ILLUMINATION | HH-LC710A | (X30,Y150,Z1) | ON/OFF CONTROL AND DIMMER CONTROL | DEVICE |
| C | REFRIGERATOR | NR-F557XV | (X50,Y200,Z1) | POWER CONSUMPTION STATE MANAGEMENT | SERVER |
| ... | | | | | |

| DEVICE ID (3101) | DEVICE TYPE (3102) | MODEL NUMBER (3103) | ARRANGEMENT (3104) | CAPABILITY INFORMATION (3105) | CONTROL COMMAND TRANSMISSION DESTINATION (3106) | IP ADDRESS (3107) |
|---|---|---|---|---|---|---|
| A | AIR CONDITIONER | CS-X403C | (X10,Y100,Z1) | TEMPERATURE CONTROL, AIR FLOW DIRECTION CONTROL, AND AIR FLOW AMOUNT CONTROL | DEVICE | 192.168.0.5 |
| B | ILLUMINATION | HH-LC710A | (X30,Y150,Z1) | ON/OFF CONTROL AND DIMMER CONTROL | DEVICE | 192.168.0.6 |
| C | REFRIGERATOR | NR-F557XV | (X50,Y200,Z1) | POWER CONSUMPTION STATE MANAGEMENT | SERVER | 192.168.0.7 |
| ... | | | | | | |

| ROOM ID (6801) | ROOM TYPE (6802) | FLOOR LEVEL (6803) | DISPLAY POSITION (6804) |
|---|---|---|---|
| A | LIVING ROOM | FIRST FLOOR | FIRST CELL ON FIRST FLOOR |
| B | BEDROOM | SECOND FLOOR | FIRST CELL ON SECOND FLOOR |
| C | BATH | FIRST FLOOR | FOURTH CELL ON FIRST FLOOR |
| D | STAIRCASE | FIRST FLOOR<br>SECOND FLOOR | SEVENTH CELL ON FIRST FLOOR<br>SECOND CELL ON SECOND FLOOR |
| ... | | | |

| DEVICE ID (4701) | DEVICE TYPE (4702) | MODEL NUMBER (4703) | ARRANGEMENT (4704) | CAPABILITY INFORMATION (4705) | CONTROL COMMAND TRANSMISSION DESTINATION (4706) |
|---|---|---|---|---|---|
| A | AIR CONDITIONER | CS-X403C | LIVING ROOM | TEMPERATURE CONTROL, AIR FLOW DIRECTION CONTROL, AND AIR FLOW AMOUNT CONTROL | DEVICE |
| B | ILLUMINATION | HH-LC710A | LIVING ROOM | ON/OFF CONTROL AND DIMMER CONTROL | DEVICE |
| C | REFRIGERATOR | NR-F557XV | KITCHEN | POWER CONSUMPTION STATE MANAGEMENT | SERVER |
| ... | | | | | |

| DEVICE ID (3101) | DEVICE TYPE (3102) | MODEL NUMBER (3103) | ARRANGEMENT (3104) | CAPABILITY INFORMATION (3105) | CONTROL COMMAND TRANSMISSION DESTINATION (3106) | IP ADDRESS (3107) |
|---|---|---|---|---|---|---|
| A | AIR CONDITIONER | CS-X403C | LIVING ROOM | TEMPERATURE CONTROL, AIR FLOW DIRECTION CONTROL, AND AIR FLOW AMOUNT CONTROL | DEVICE | 192.168.0.5 |
| B | ILLUMINATION | HH-LC710A | LIVING ROOM | ON/OFF CONTROL AND DIMMER CONTROL | DEVICE | 192.168.0.6 |
| C | REFRIGERATOR | NR-F557XV | KITCHEN | POWER CONSUMPTION STATE MANAGEMENT | SERVER | 192.168.0.7 |
| ... | | | | | | |

| DEVICE ID (1601) | DEVICE TYPE (1602) | MODEL NUMBER (1603) | ARRANGEMENT (1604) | CAPABILITY INFORMATION (1605) | CONTROL COMMAND TRANSMISSION DESTINATION (1606) | STATUS (1608) | SPECIFIC TARGET DEVICE (1609) |
| --- | --- | --- | --- | --- | --- | --- | --- |
| A | AIR CONDITIONER | CS-X403C | LIVING ROOM | TEMPERATURE CONTROL<br>AIR FLOW DIRECTION CONTROL<br>AIR FLOW AMOUNT CONTROL | DEVICE | ON<br>HEATER, 27°C | ○ |
| B | TV SET | TH-P42G1 | LIVING ROOM | VOLUME CONTROL<br>CHANNEL CONTROL | DEVICE | ON、16<br>4ch | ○ |
| C | AIR CONDITIONER | CS-X404C | BEDROOM | TEMPERATURE CONTROL<br>AIR FLOW DIRECTION CONTROL<br>AIR FLOW AMOUNT CONTROL | DEVICE | OFF<br>HEATER, 25°C | ○ |
| D | TV SET | TH-L32CS | BEDROOM | VOLUME CONTROL<br>CHANNEL CONTROL | DEVICE | OFF、16<br>4ch | ○ |
| E | WASHING MACHINE | NA-VX3300 | WASHROOM | WASHING CONTROL<br>DRYING CONTROL | DEVICE | OFF | × |
| F | REFRIGERATOR | NR-F557XV | KITCHEN | TEMPERATURE CONTROL | SERVER | ON | × |
| ... | ... | ... | ... | ... | ... | ... | ... |

| DEVICE ID (1701) | DEVICE TYPE (1702) | MODEL NUMBER (1703) | ARRANGEMENT (1704) | CAPABILITY INFORMATION (1705) | CONTROL COMMAND TRANSMISSION DESTINATION (1706) | IP ADDRESS (1707) | STATUS (1709) | SPECIFIC TARGET DEVICE (1710) |
|---|---|---|---|---|---|---|---|---|
| A | AIR CONDITIONER | CS-X403C | LIVING ROOM | TEMPERATURE CONTROL<br>AIR FLOW DIRECTION CONTROL<br>AIR FLOW AMOUNT CONTROL | DEVICE | 192.168.0.5 | ON<br>HEATER, 27°C | ○ |
| B | TV SET | TH-P42G1 | LIVING ROOM | VOLUME CONTROL<br>CHANNEL CONTROL | DEVICE | 192.168.0.6 | ON、16<br>4ch | ○ |
| C | AIR CONDITIONER | CS-X404C | BEDROOM | TEMPERATURE CONTROL<br>AIR FLOW DIRECTION CONTROL<br>AIR FLOW AMOUNT CONTROL | DEVICE | 192.168.0.7 | OFF<br>HEATER, 25°C | ○ |
| D | TV SET | TH-L32CS | BEDROOM | VOLUME CONTROL<br>CHANNEL CONTROL | DEVICE | 192.168.0.8 | OFF、16<br>4ch | ○ |
| E | WASHING MACHINE | NA-VX3300 | WASHROOM | WASHING CONTROL<br>DRYING CONTROL | DEVICE | 192.168.0.9 | OFF | × |
| F | REFRIGERATOR | NR-F557XV | KITCHEN | TEMPERATURE CONTROL | SERVER | 192.168.0.10 | ON | × |
| ... | ... | ... | ... | ... | ... | ... | ... | ... |

METHOD FOR CONTROLLING INFORMATION APPARATUS AND COMPUTER-READABLE RECORDING MEDIUM

RELATED APPLICATIONS

This application is a continuation application of International Application No. PCT/JP2013/007671, filed Dec. 27, 2013, which claims the benefit of U.S. Provisional application No. 61/766,912, filed Feb. 20, 2013, the disclosures of which are incorporated by reference herein in their entireties.

TECHNICAL FIELD

The present disclosure relates to a method for controlling an information apparatus and a computer-readable recording medium.

BACKGROUND ART

Technologies for remotely monitoring or remotely controlling one or more target devices using one remote controller are proposed.

Patent Document 1 discloses a technology for remotely operating one or more target devices from a monitor of a television set. Specifically, icons for the one or more target devices are displayed on the right side of a monitor screen. When a desired one of the icons is selected (i), a floor plan is displayed on the left side of the monitor screen (ii). When a pointer is moved to the location of installation of a target device desired to be operated in the floor plan (iii), an operation screen for the target device selected by moving the pointer is displayed on the monitor screen (iv) (paragraphs [0138] to [0140] and FIGS. 25A and 25B).

Patent Document 2 discloses a technology for controlling one or more target devices using a single remote controller. Specifically, a floor plan of each room and the condition within the room are displayed on a liquid crystal monitor of the remote controller. For example, the liquid crystal monitor displays a illumination mark displayed in the case where an illumination device of a certain room is turned on, a room temperature mark that indicates the current temperature of a certain room, a lock mark in the shape of a hatched window displayed in the case where a window of a certain room is locked, a device/facility mark that indicates the status or the like of a control target object, a mark that indicates the amount of hot water in the case where the control target is a bath, and so forth (paragraphs [0037] to [0041] and FIG. 6).

Patent Document 3 relates to a technology for remotely controlling and remotely monitoring open/close operation and the state of an electric building material (such as a hallway door or a skylight). Specifically, a monitor screen of a personal computer displays floor plans for first and second floors of a property, a picture of the electric building material (such as a hallway door or a skylight) and a state display icon that indicates the open/close state of the electric building material are displayed at the corresponding position on the floor plans. When the state display icon is selected, an operation screen for the selected electric building material is displayed in another window. The operation screen includes an open operation button, a close operation button, an operation monitor screen, and a button for hiding the operation screen (paragraph [0025] and FIGS. 4, 5, and 6).

Patent Document 4 discloses a user interface including a floor plan and an icon. Examples of the icon include an icon representing a receptacle, an icon representing a digital image frame, and an icon representing an illumination device (FIGS. 7 and 8B).

However, Patent Documents 1 to 5 described above need a further improvement.

Patent Document 1: Japanese Patent Application Laid-open No. 2007-104567

Patent Document 2: Japanese Patent Application Laid-open No. 2000-138979

Patent Document 3: Japanese Patent Application Laid-open No. 2009-213107

Patent Document 4: U.S. Pat. No. 7,730,223

SUMMARY OF THE INVENTION

In one general aspect, the techniques disclosed here feature a method for controlling an information apparatus, the information apparatus having a display and being connected to a network, one or more target devices being controlled over the network, the method causing a computer of the information apparatus to:

display on the display, a display screen representing a floor plan of one floor including at least two or more rooms;

display each device icon representing each of the one or more target devices in a region of each room included in the floor plan represented by the display screen, each device icon being initially displayed within the region of each room included in the floor plan, the one or more target devices including a specific target device that stores a set content when power has been previously turned off; and when selection of the device icon that represents the specific target device among the one or more target devices is sensed in any region of the at least two or more rooms included in the floor plan, and selection of any region in the room, in which the selection of the device icon has been sensed, is sensed, output to the network an on-off control command for controlling an on-off state of power of the specific target device corresponding to the room in which the selection of the device icon has been sensed.

According to the aspect described above, it is possible to embody a further improvement. These general and specific aspects may be implemented using a system, a method, and a computer program, and any combination of systems, methods, and computer programs.

BRIEF DESCRIPTION OF THE DRAWINGS

FIG. 31 is a diagram showing the configuration of vertex information according to the embodiment of the present disclosure.

FIG. 32 is a diagram showing the configuration of room information according to the embodiment of the present disclosure.

FIG. 34 is a diagram showing the configuration of a device list managed by the server according to the embodiment of the present disclosure.

FIG. 35 is a diagram showing the configuration of a device list managed by the home controller according to the embodiment of the present disclosure.

FIG. 68 is a diagram showing the configuration of room information shown in FIG. 67.

FIG. 70 is a diagram showing the configuration of a device list managed by the server for a case where the floor plan shown in FIG. 52 is adopted.

FIG. 71 is a diagram showing the configuration of a device list managed by the home controller for a case where the floor plan shown in FIG. 52 is adopted.

FIG. 119 is a diagram showing a control screen of an air conditioner including another display example of a detail control screen according to an embodiment of the present disclosure.

FIG. 120 is a diagram showing yet another example of transition of a display screen of a display when one device icon of the air conditioner is used in common to control air conditioners in a plurality of rooms according to an embodiment of the present disclosure.

FIG. 121 is a diagram showing a control screen of an air conditioner including another display example of a detail control screen according to an embodiment of the present disclosure.

FIG. 122 is a diagram showing another example of arrangement of a device icon used in common of an air conditioner according to an embodiment of the present disclosure.

FIG. 123 is a diagram showing an example of a control screen of a television set that is displayed on a display of a home controller according to an embodiment of the present disclosure.

FIG. 124 is a diagram showing an example of a control screen of a television set that is displayed on a display of a home controller according to an embodiment of the present disclosure.

FIG. 125 is a diagram showing an example of transition of a display screen of a display of a home controller according to an embodiment of the present disclosure.

FIG. 126 is a diagram showing another example of a control screen of a television set that is displayed on a display according to an embodiment of the present disclosure.

FIG. 127 is a diagram showing an example of transition of a display including the display screen shown in FIG. 126 according to an embodiment of the present disclosure.

FIG. 128 is a diagram showing an example of transition of a display screen of a display when one device icon of a television set is used in common to control television sets in a plurality of rooms according to an embodiment of the present disclosure.

FIG. 129 is a diagram showing yet another example of a control screen of a television set that is displayed on a display of a home controller according to an embodiment of the present disclosure.

FIG. 130 is a diagram showing an example of transition of a display screen of a display including the display screen shown in FIG. 129 according to an embodiment of the present disclosure.

Figure 131:
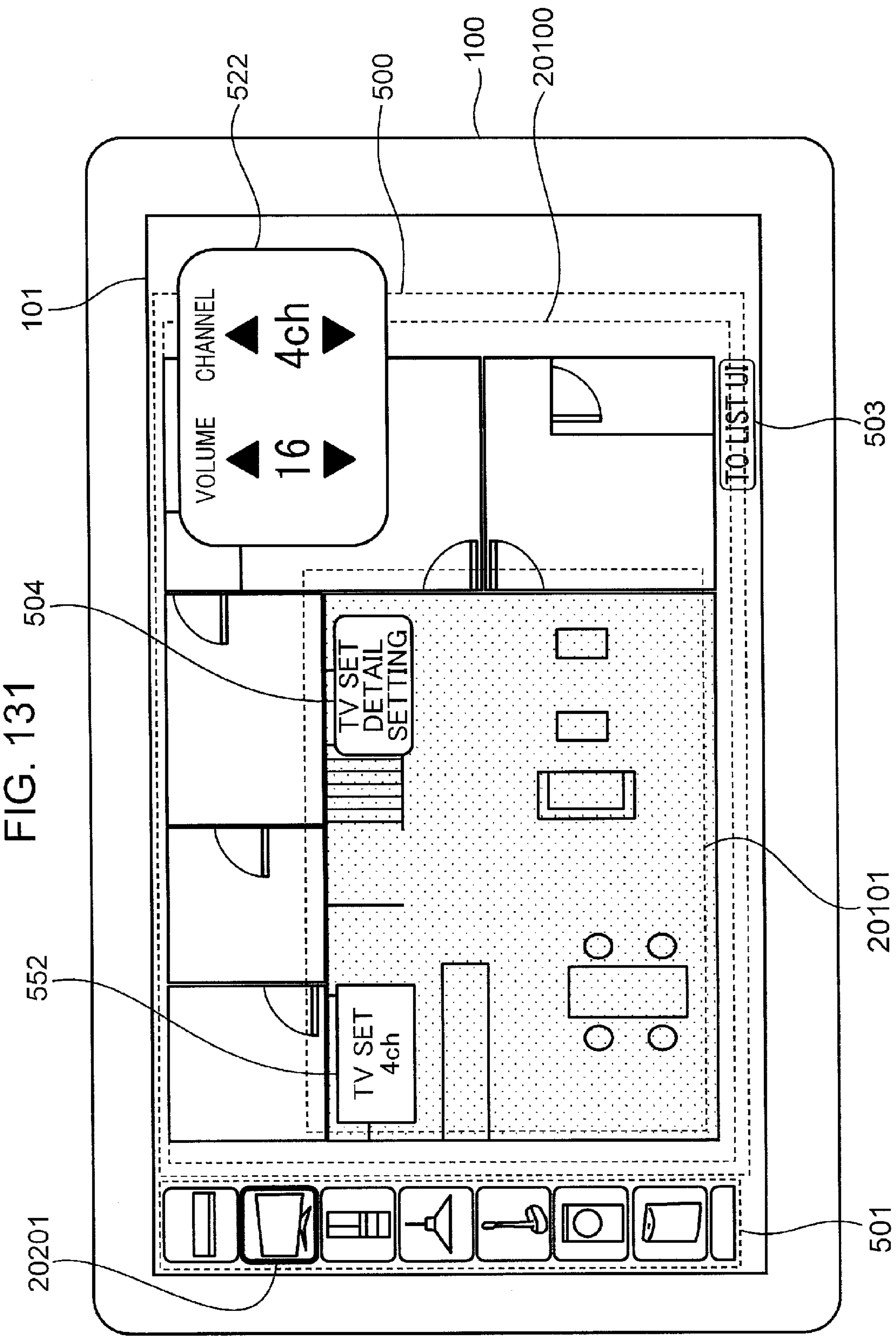

FIG. 131 is a diagram showing yet another example of a control screen of a television set that is displayed on a display of a home controller according to an embodiment of the present disclosure.

Figure 132:
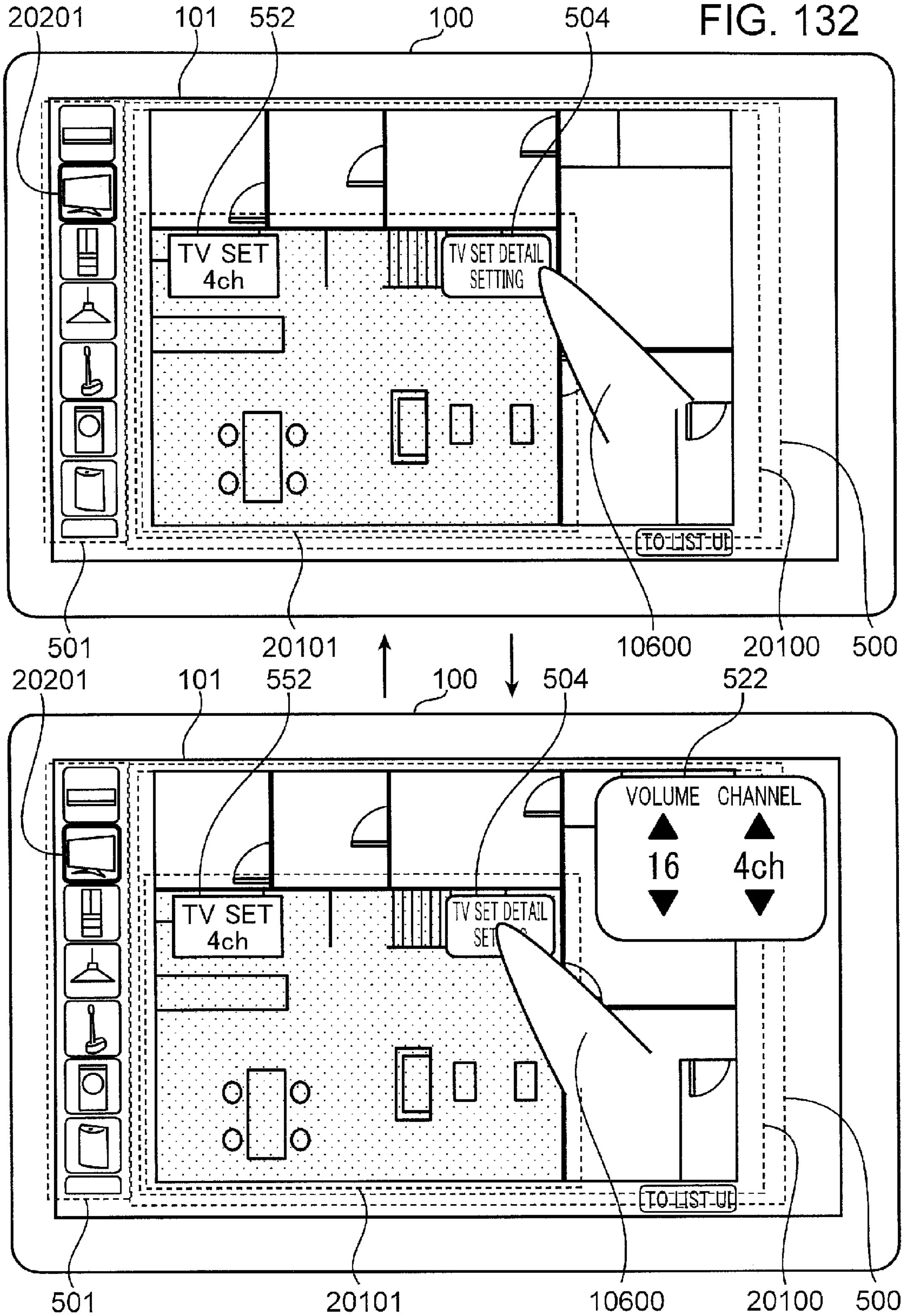

FIG. 132 is a diagram showing an example of transition of a display screen of a display including the display screen shown in FIG. 131 according to an embodiment of the present disclosure.

Figure 133:
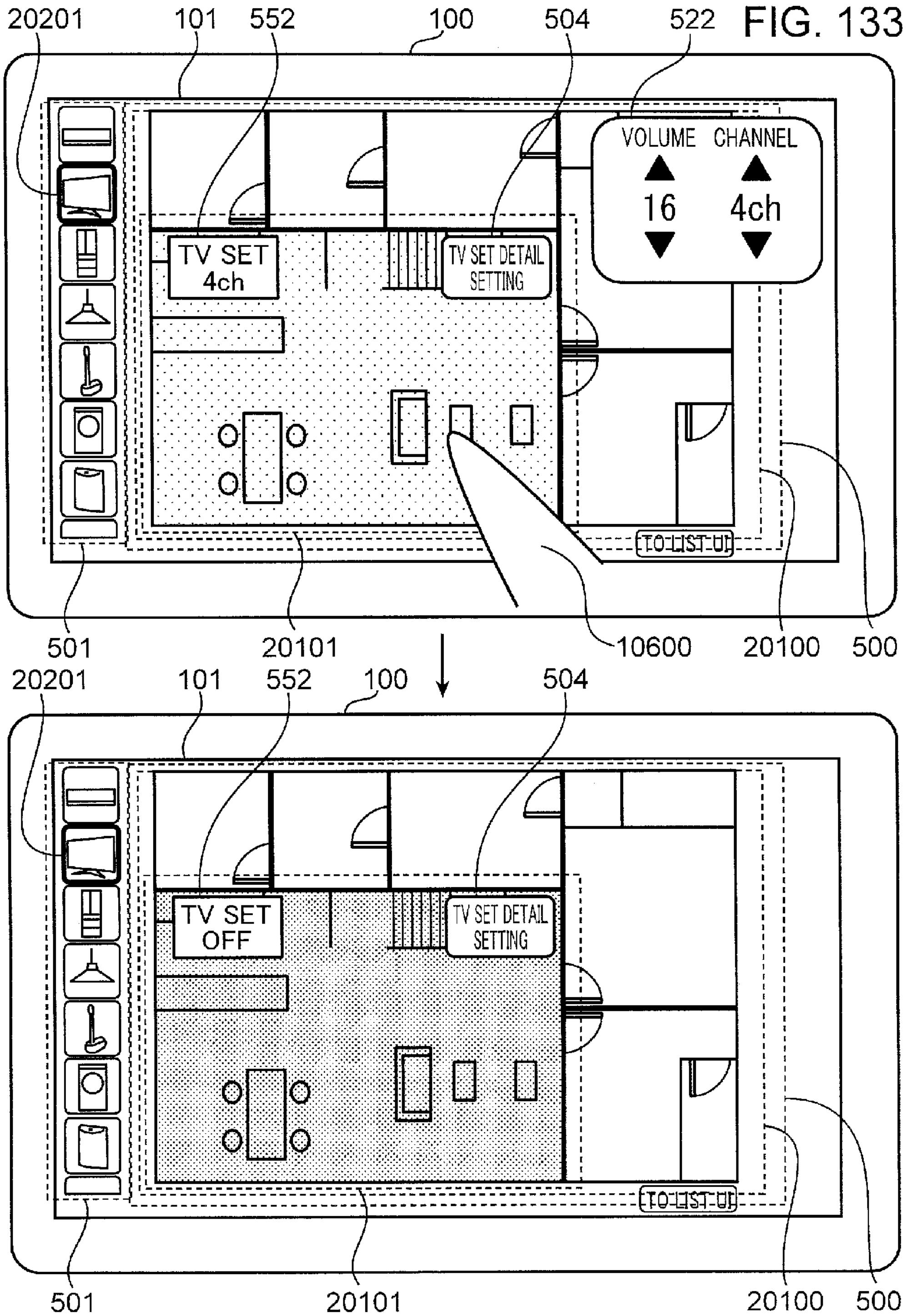

FIG. 133 is a diagram showing another example of transition of a display screen of a display including the display screen shown in FIG. 131 according to an embodiment of the present disclosure.

Figure 134:
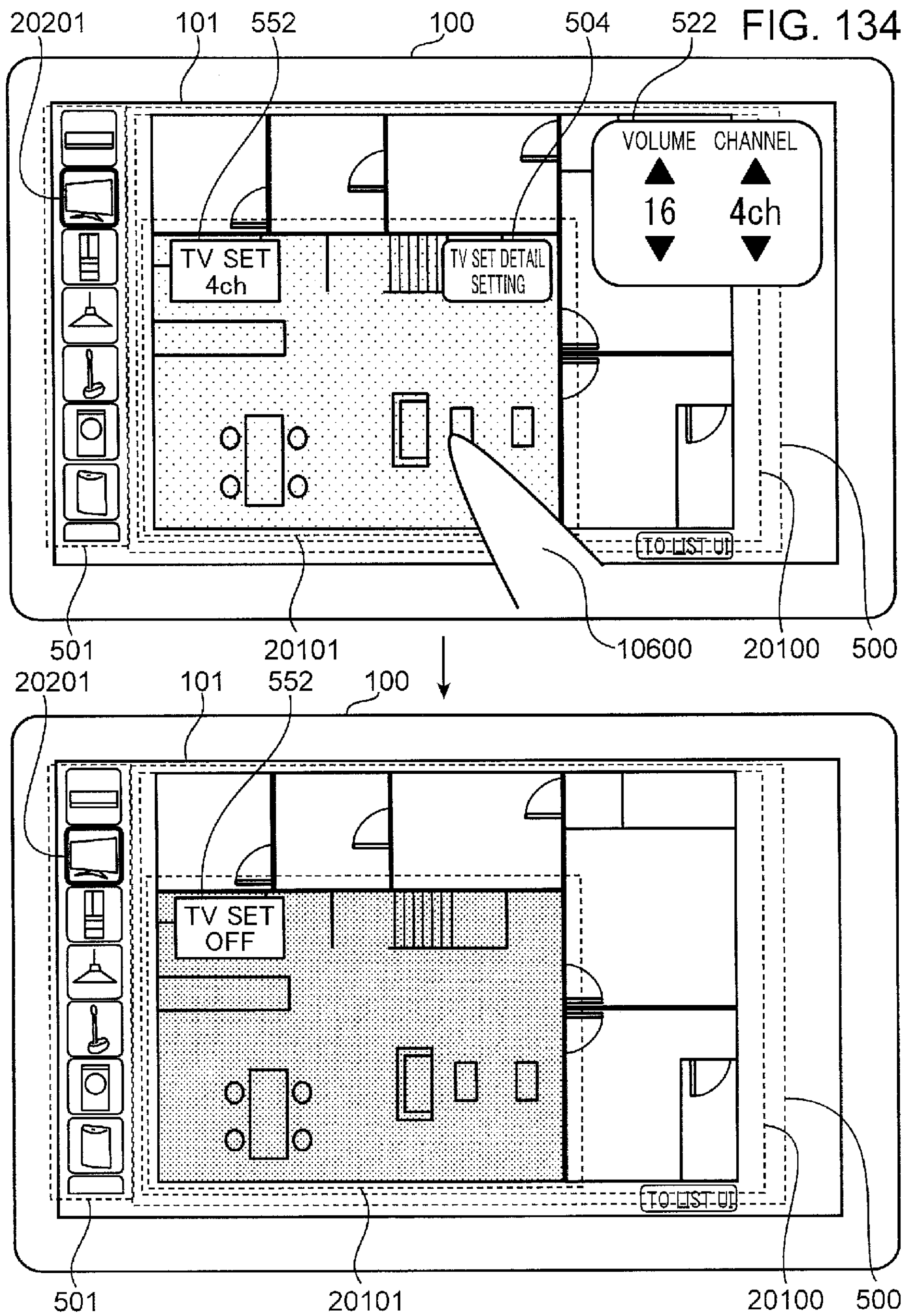

FIG. 134 is a diagram showing another example of transition of a display screen of a display including the display screen shown in FIG. 131 according to an embodiment of the present disclosure.

Figure 135:
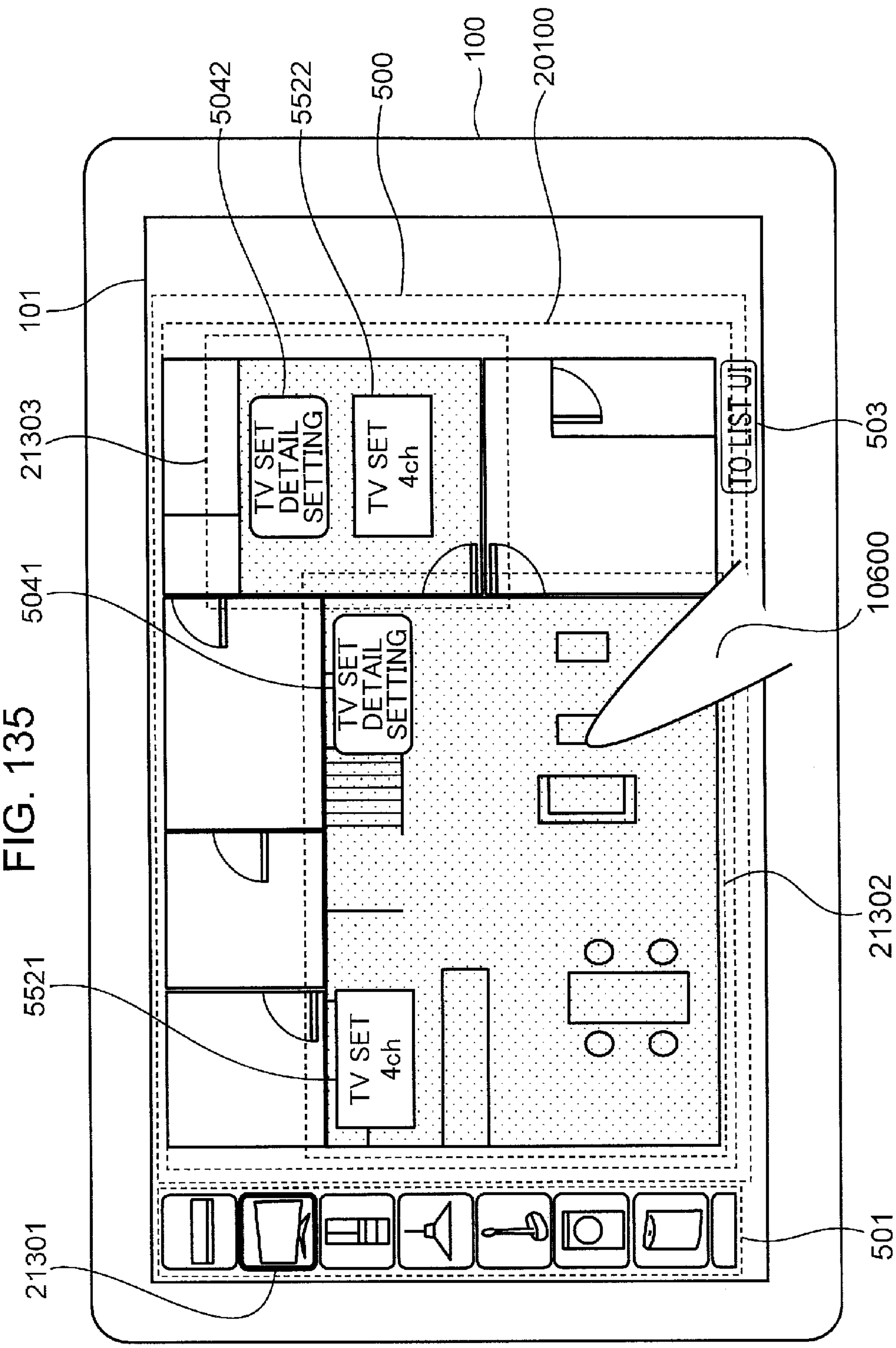

FIG. 135 is a diagram showing another example of a control screen of a television set when one device icon of a television set is used in common to control television sets in a plurality of rooms according to an embodiment of the present disclosure.

Figure 136:
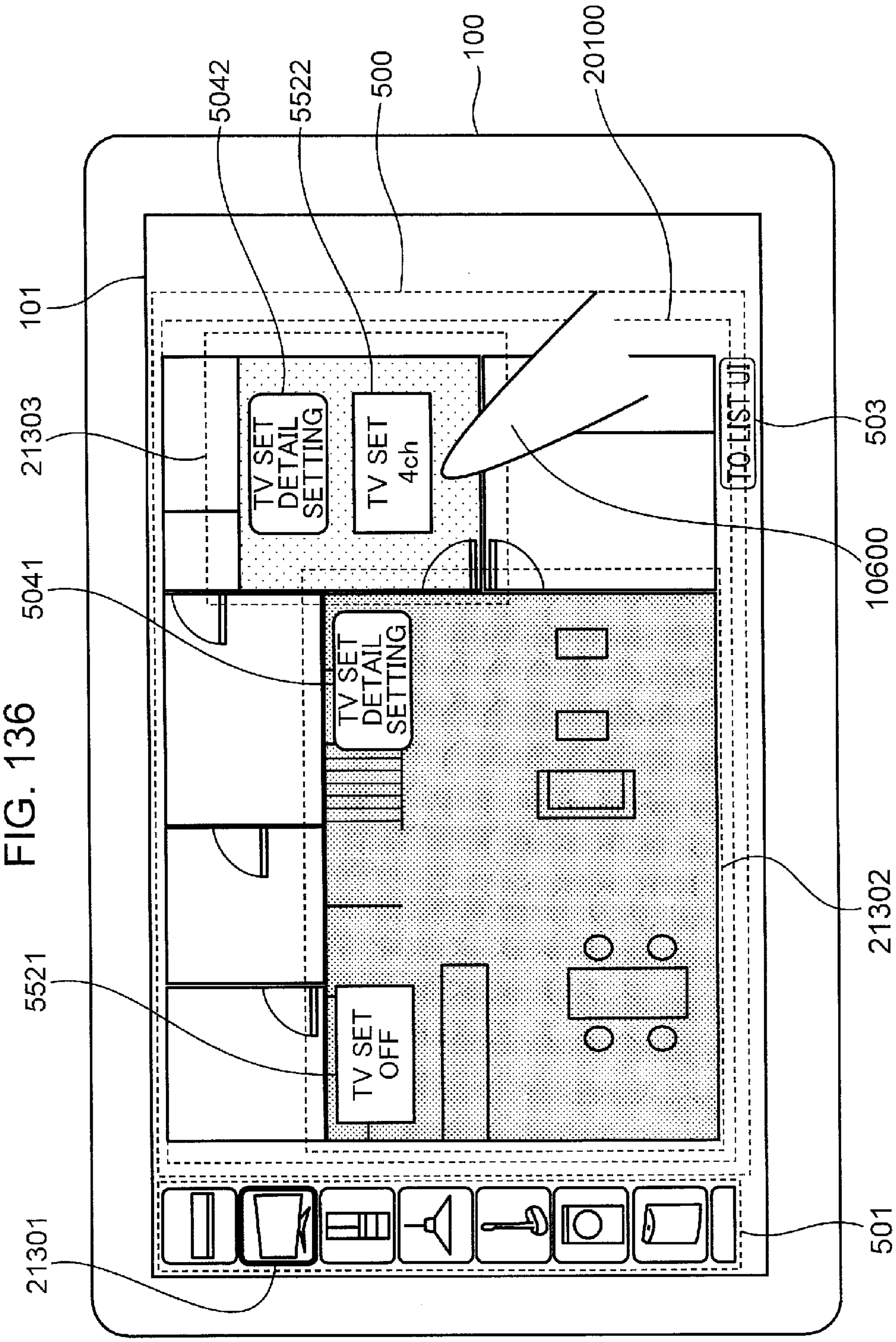

FIG. 136 is a diagram showing another example of a control screen of a television set when one device icon of a television set is used in common to control television sets in a plurality of rooms according to an embodiment of the present disclosure.

Figure 137:
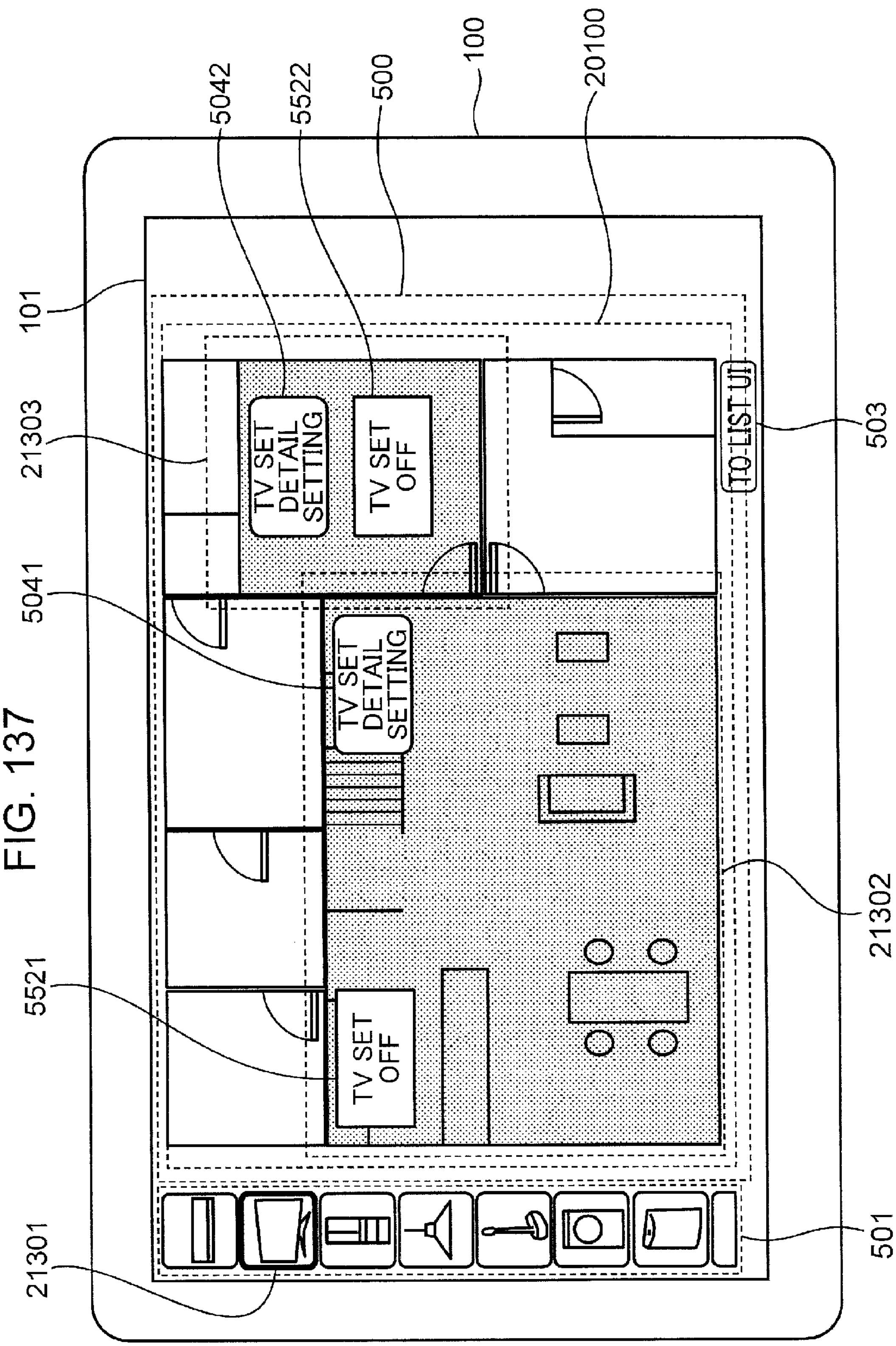

FIG. 137 is a diagram showing another example of a control screen of a television set when one device icon of a television set is used in common to control television sets in a plurality of rooms according to an embodiment of the present disclosure.

Figure 138:
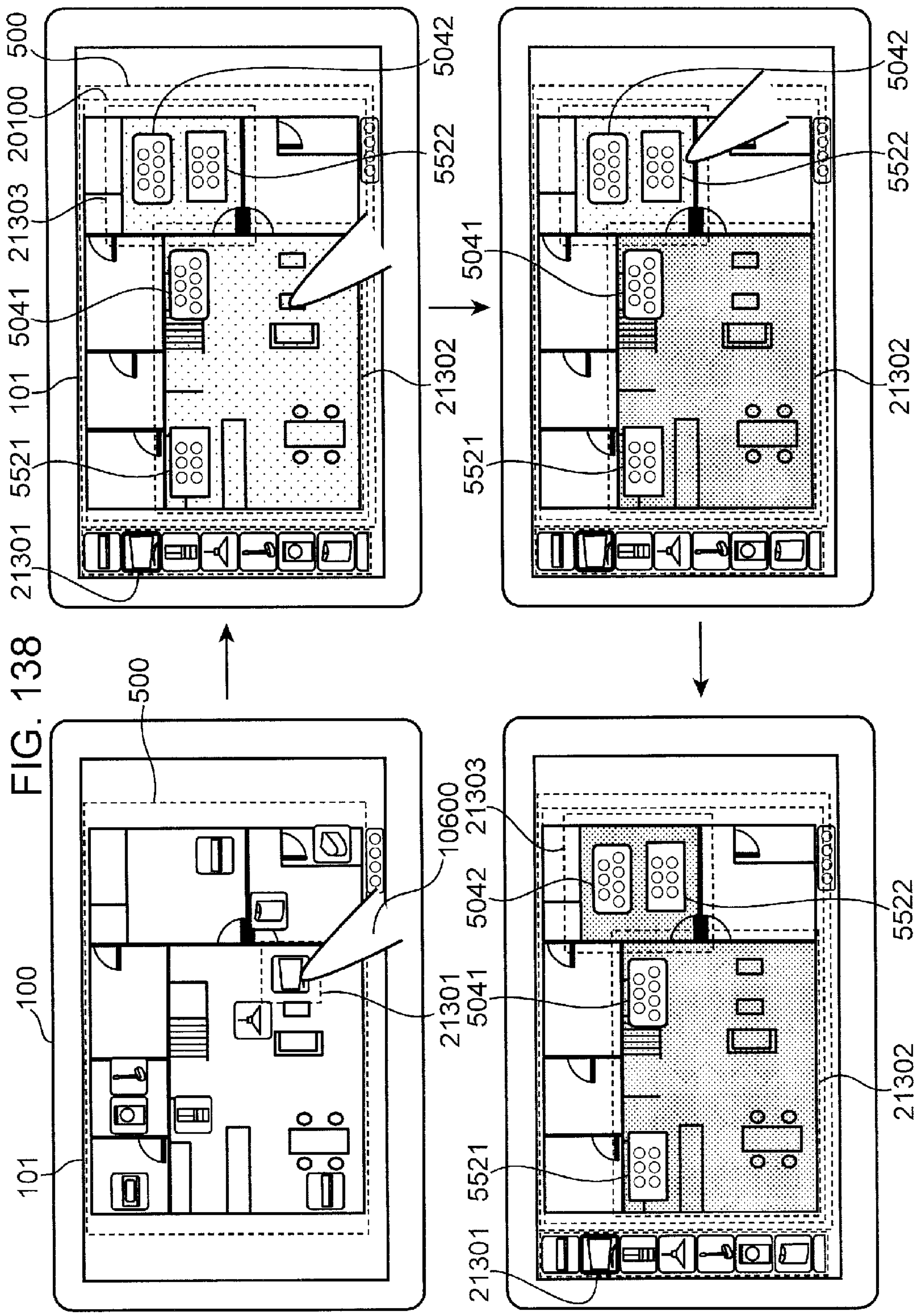

FIG. 138 is a diagram showing an example of transition of a display screen of a display including the control screen of a television set shown in FIGS. 135 to 137 according to an embodiment of the present disclosure.

Figure 139:
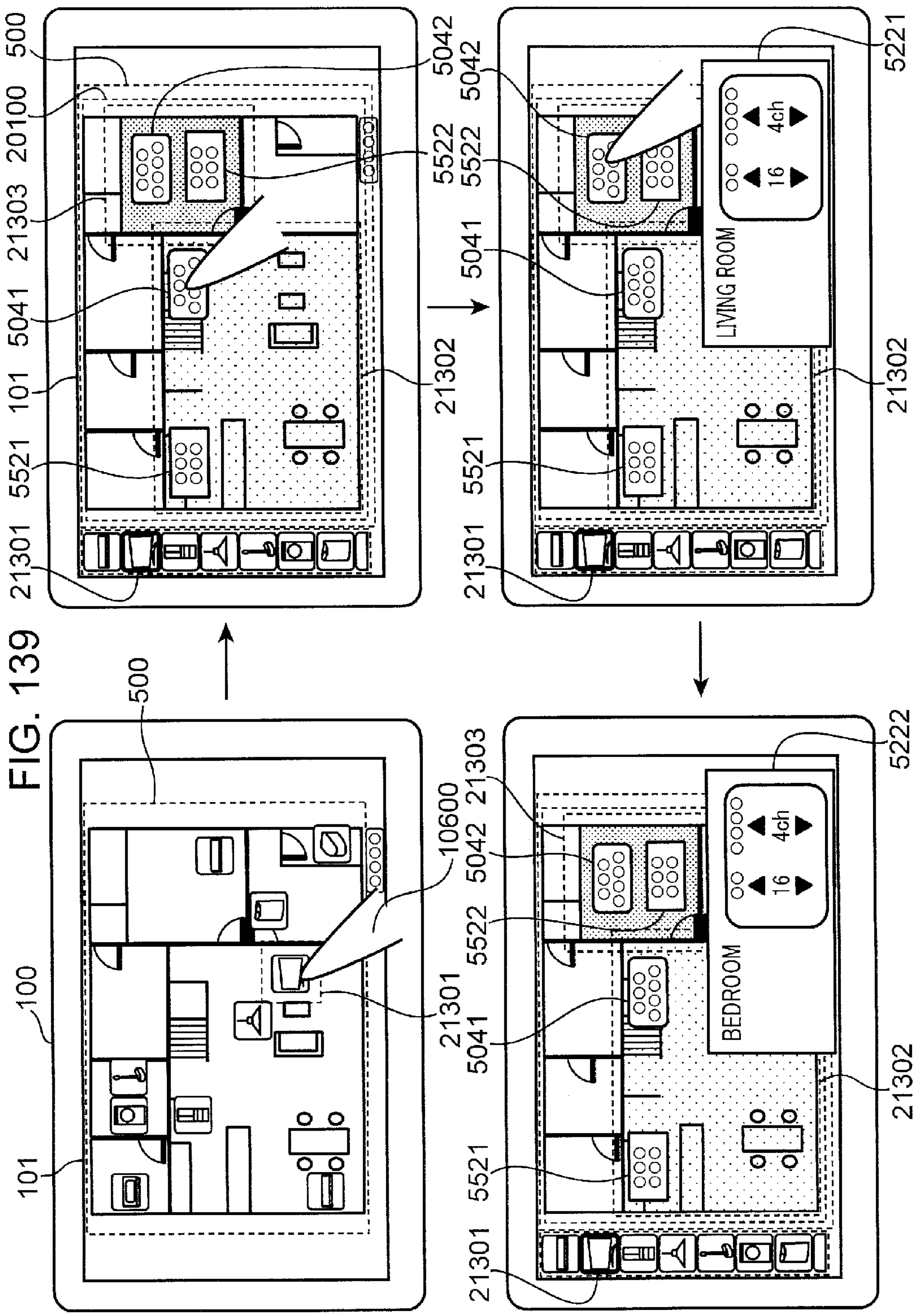

FIG. 139 is a diagram showing another example of transition of a display screen of a display when one device icon of a television set is used in common to control television sets in a plurality of rooms according to an embodiment of the present disclosure.

Figure 140:
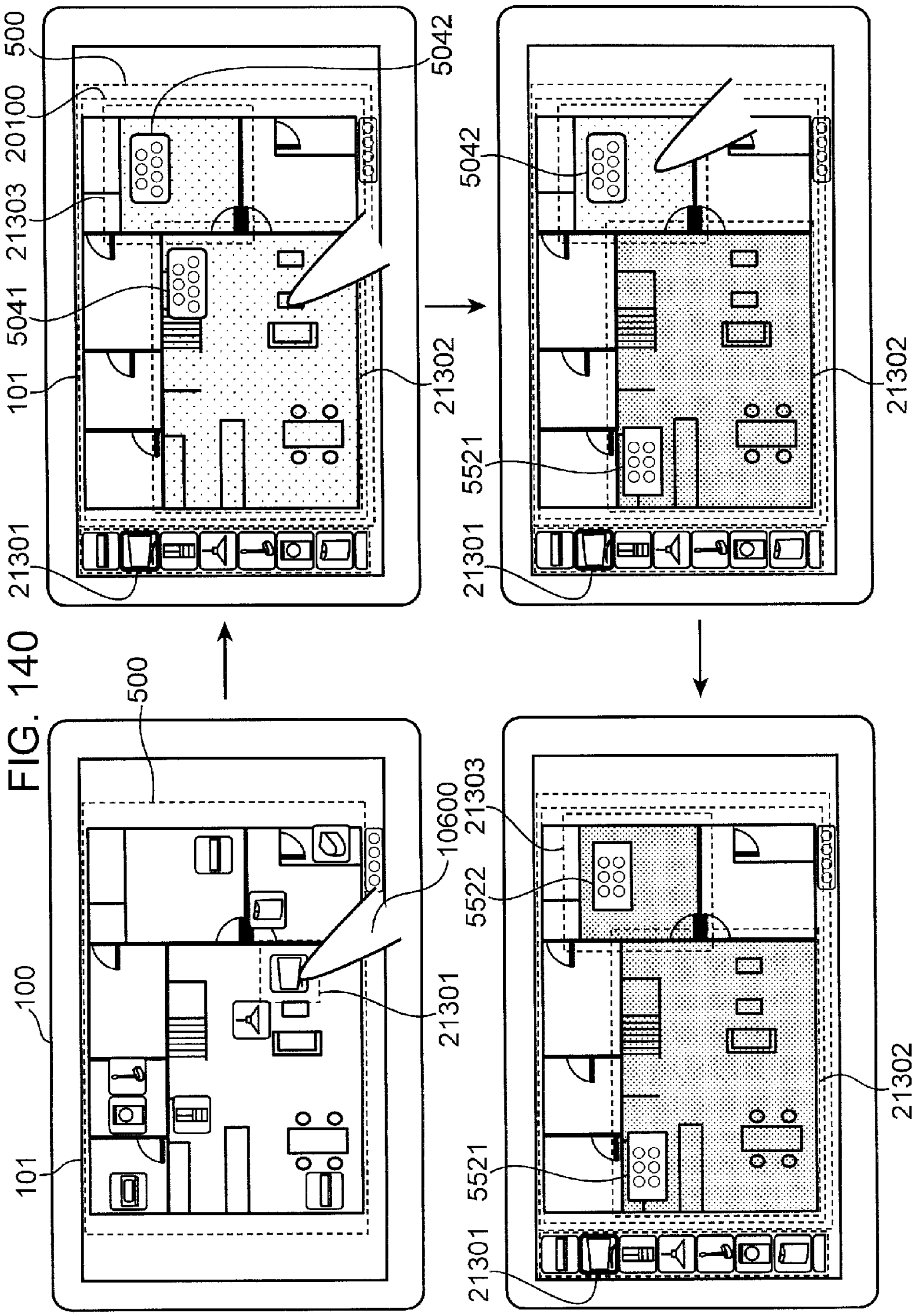

FIG. 140 is a diagram showing yet another example of transition of a display screen of a display when one device icon of a television set is used in common to control television sets in a plurality of rooms according to an embodiment of the present disclosure.

Figure 141:
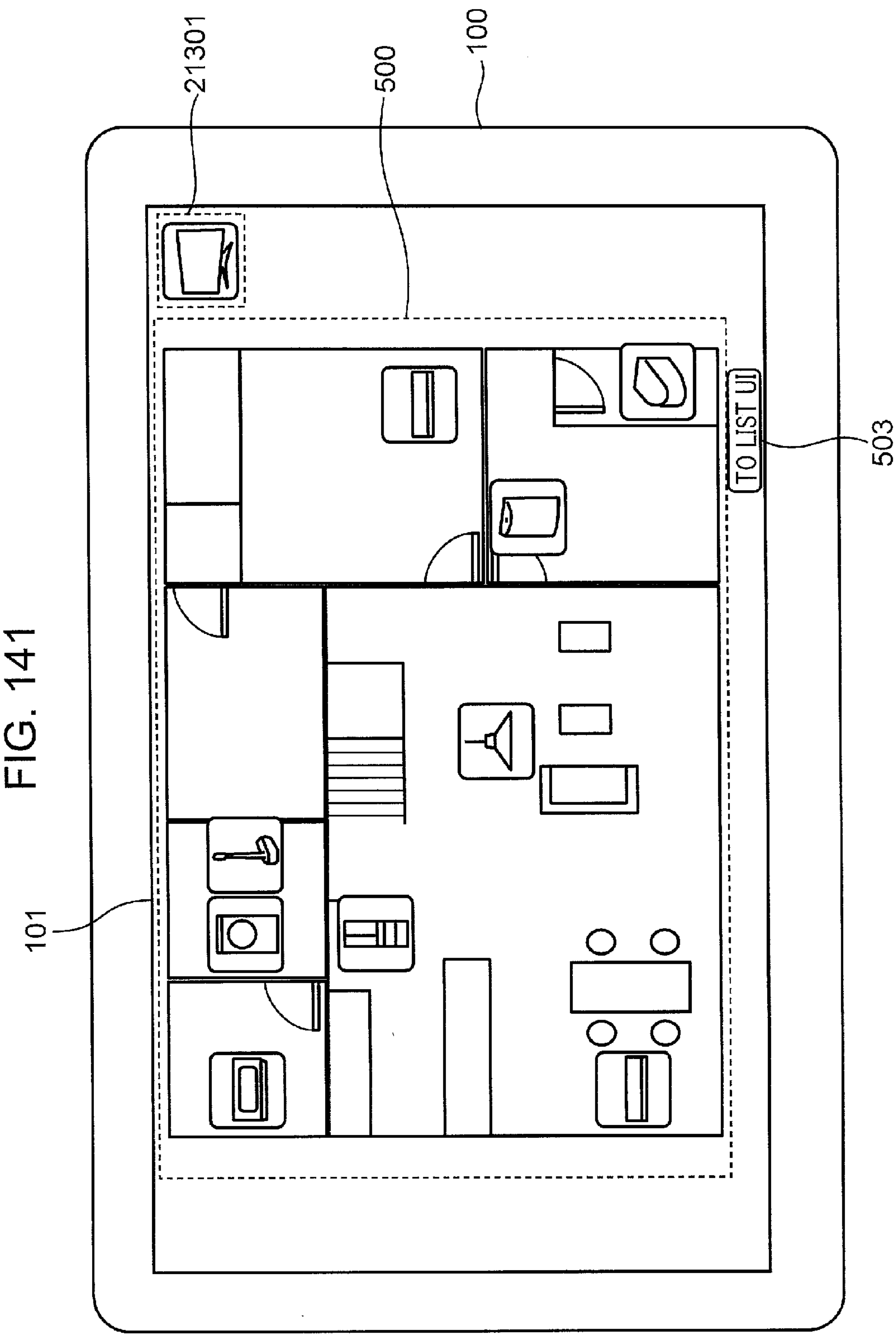

FIG. 141 is a diagram showing another example of arrangement of a device icon used in common of a television set according to an embodiment of the present disclosure.

Figure 142:
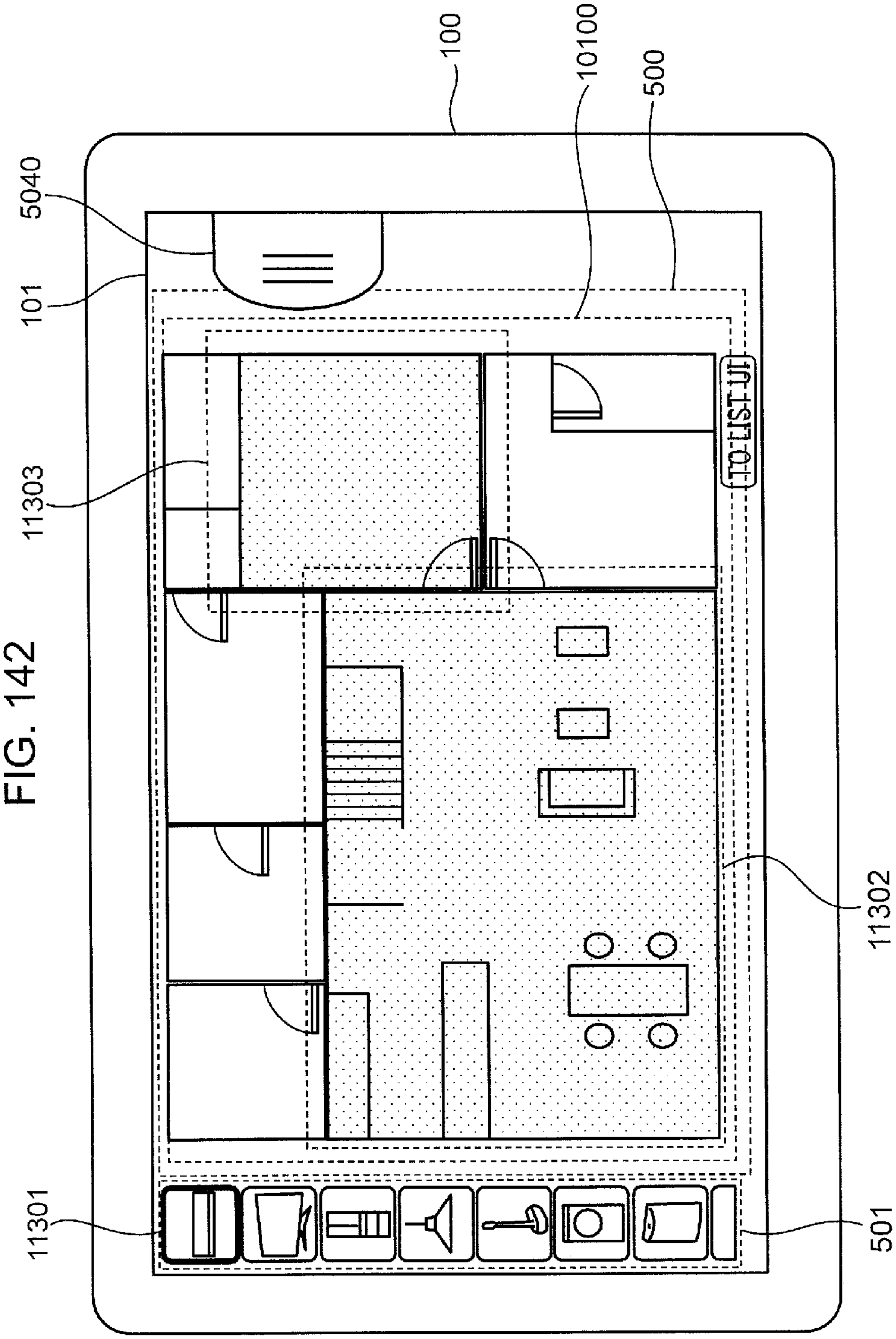

FIG. 142 is a diagram showing yet another example of a control screen of an air conditioner that is displayed on a display of a home controller when a device icon of an air conditioner is used in common according to an embodiment of the present disclosure.

Figure 143:
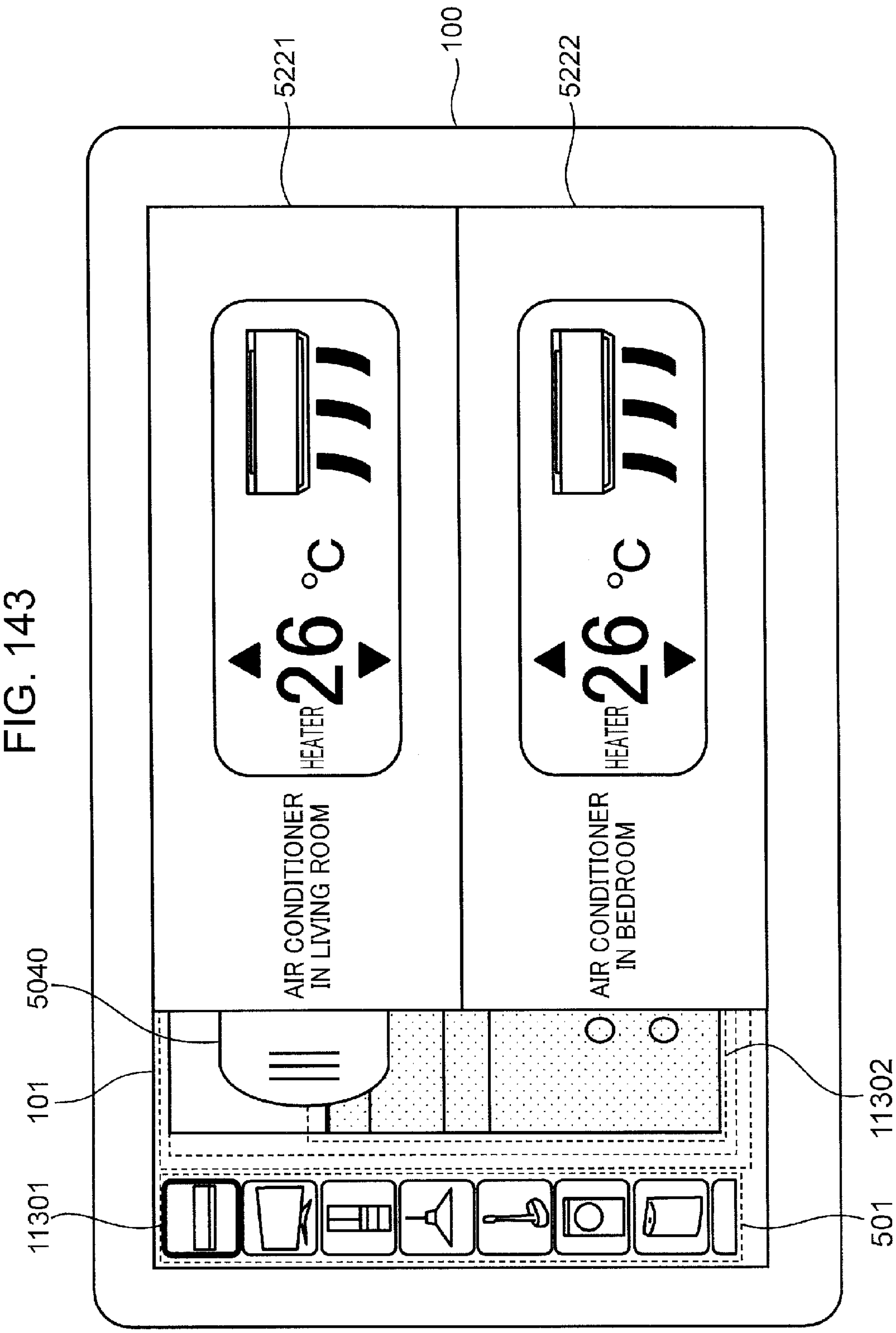

FIG. 143 is a diagram showing yet another example of a detail control screen of a room that is displayed on a display of a home controller when a device icon of an air conditioner is used in common according to an embodiment of the present disclosure.

FIG. 144A is a diagram showing a configuration example that differs from FIG. 34 of a device list that is managed by a server according to an embodiment of the present disclosure.

FIG. 144B is a diagram showing a configuration example that differs from FIG. 35 of a device list that is managed by a home controller according to an embodiment of the present disclosure.

Figure 145A:
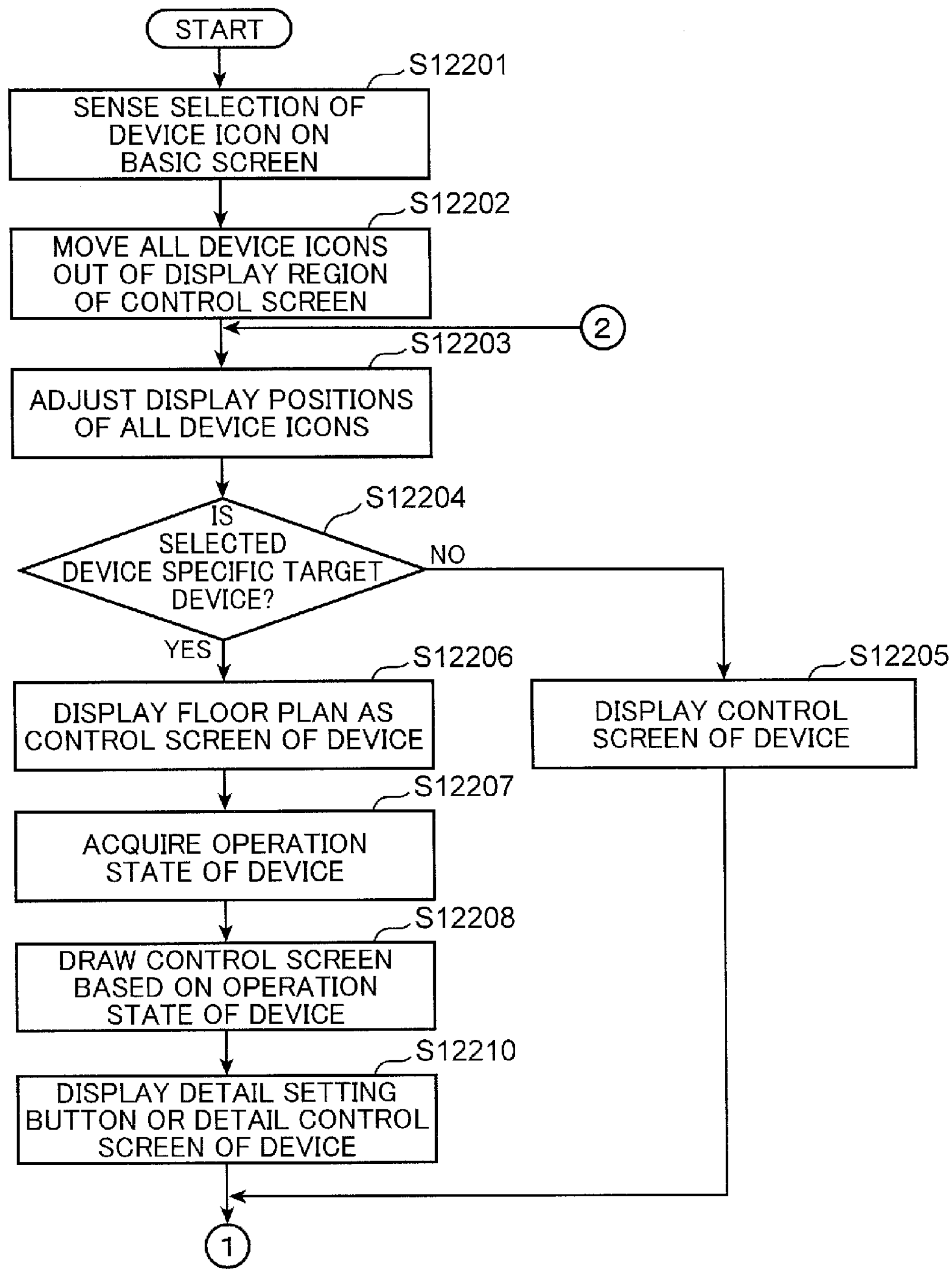

FIG. 145A is a flow chart showing an example of a flow of a process by which a home controller controls a specific target device according to an embodiment of the present disclosure.

Figure 145B:
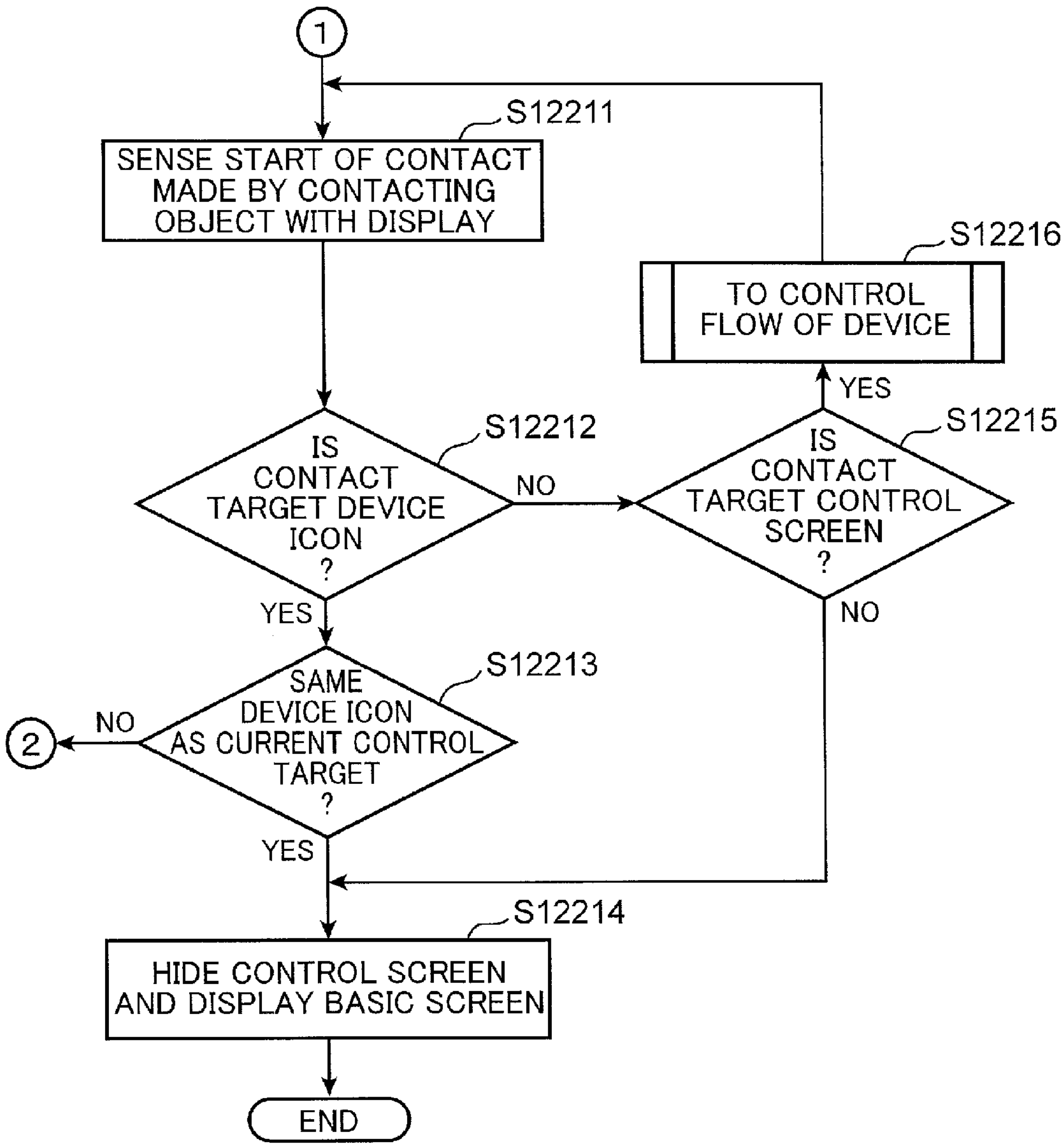

FIG. 145B is a flow chart showing an example of a flow of a process by which a home controller controls a specific target device according to an embodiment of the present disclosure.

Figure 146A:
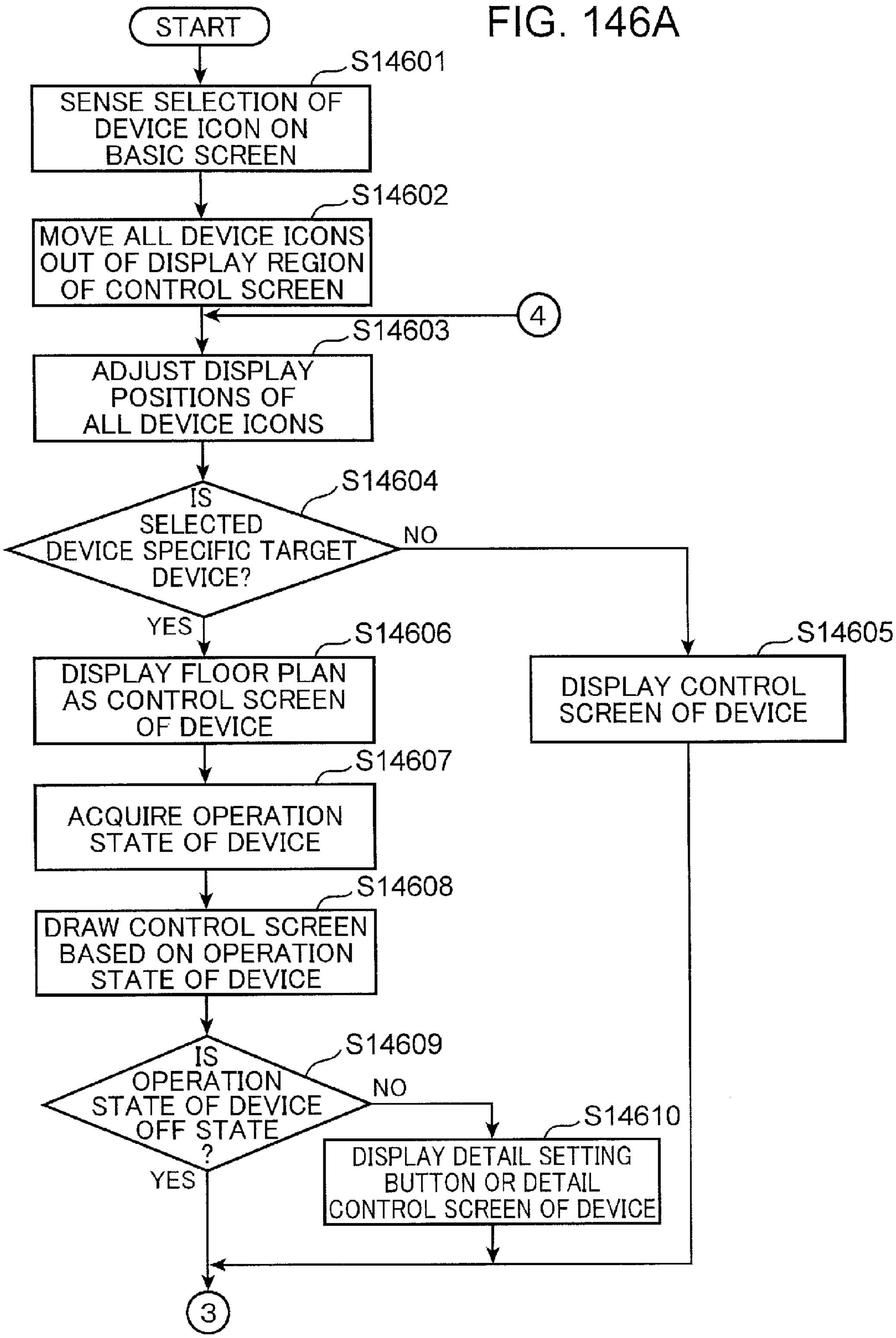

FIG. 146A is a flow chart showing another example of a flow of a process by which a home controller controls a specific target device according to an embodiment of the present disclosure.

Figure 146B:
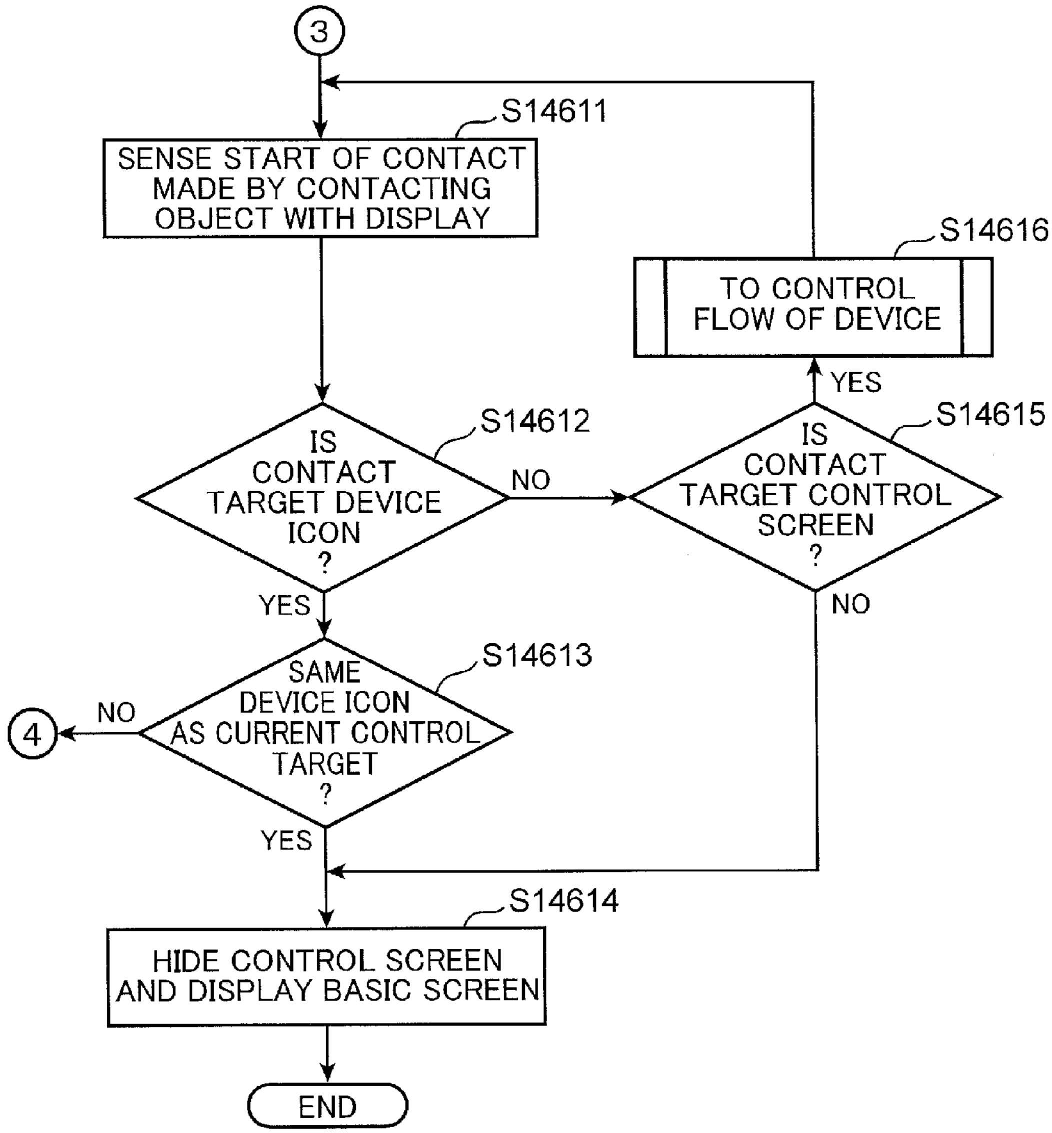

FIG. 146B is a flow chart showing another example of a flow of a process by which a home controller controls a specific target device according to an embodiment of the present disclosure.

Figure 147:
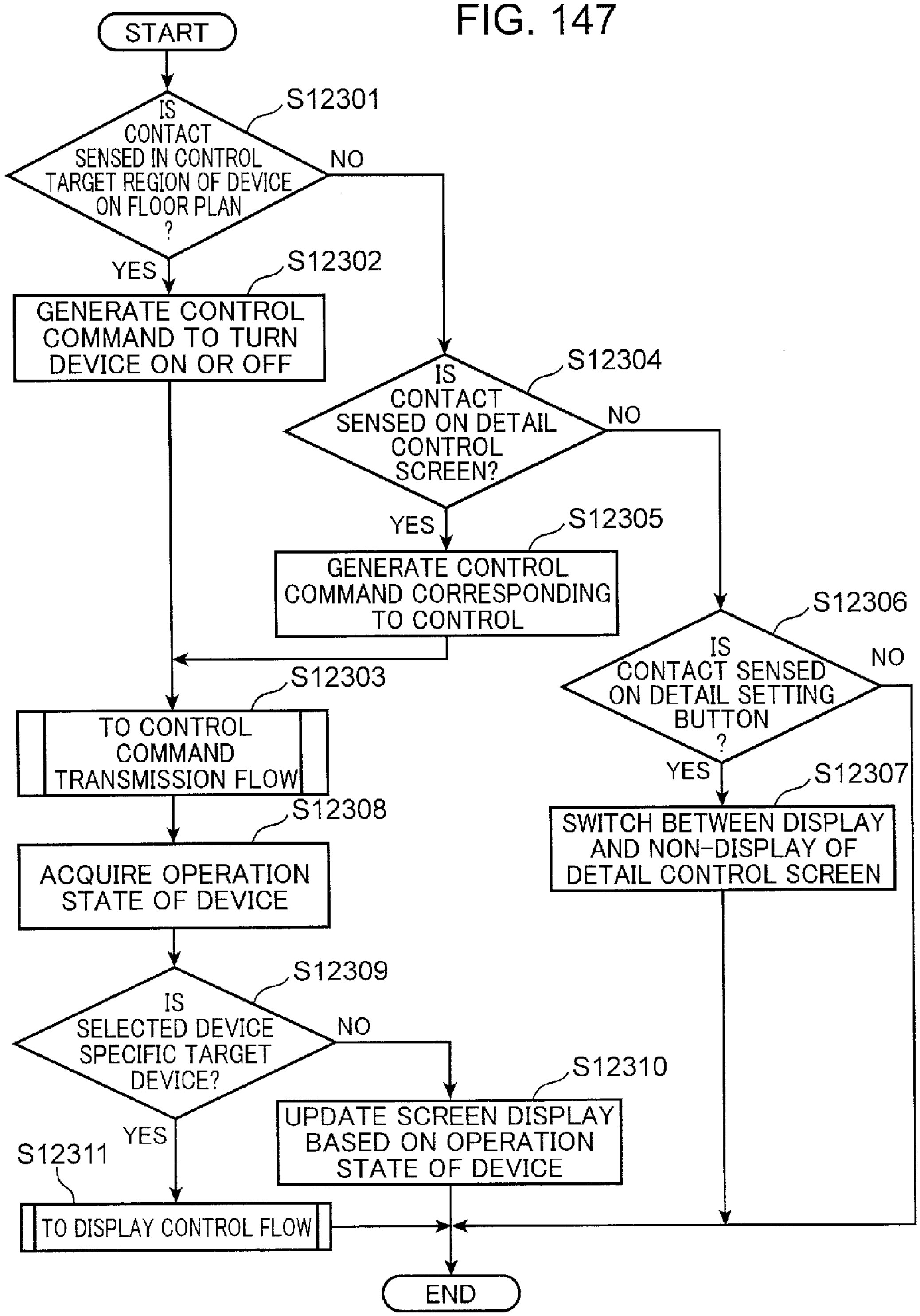

FIG. 147 is a flow chart showing a flow of a process by which the home controller generates a control command of a specific target device in accordance with a content of a contact made by a contacting object according to an embodiment of the present disclosure.

Figure 148A:
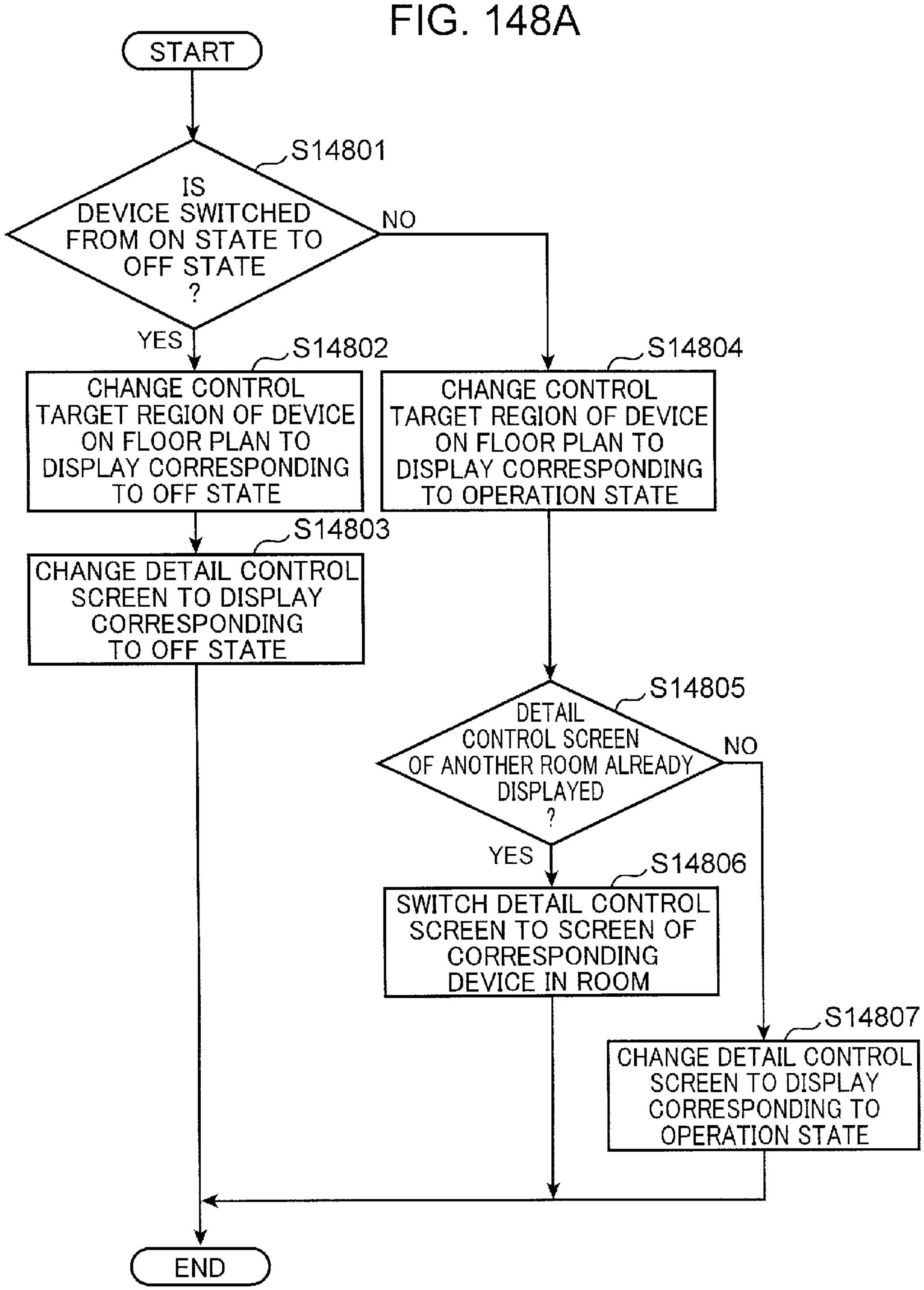

FIG. 148A is a flow chart showing an example of a display control flow in S12311 shown in FIG. 147 according to an embodiment of the present disclosure.

Figure 148B:
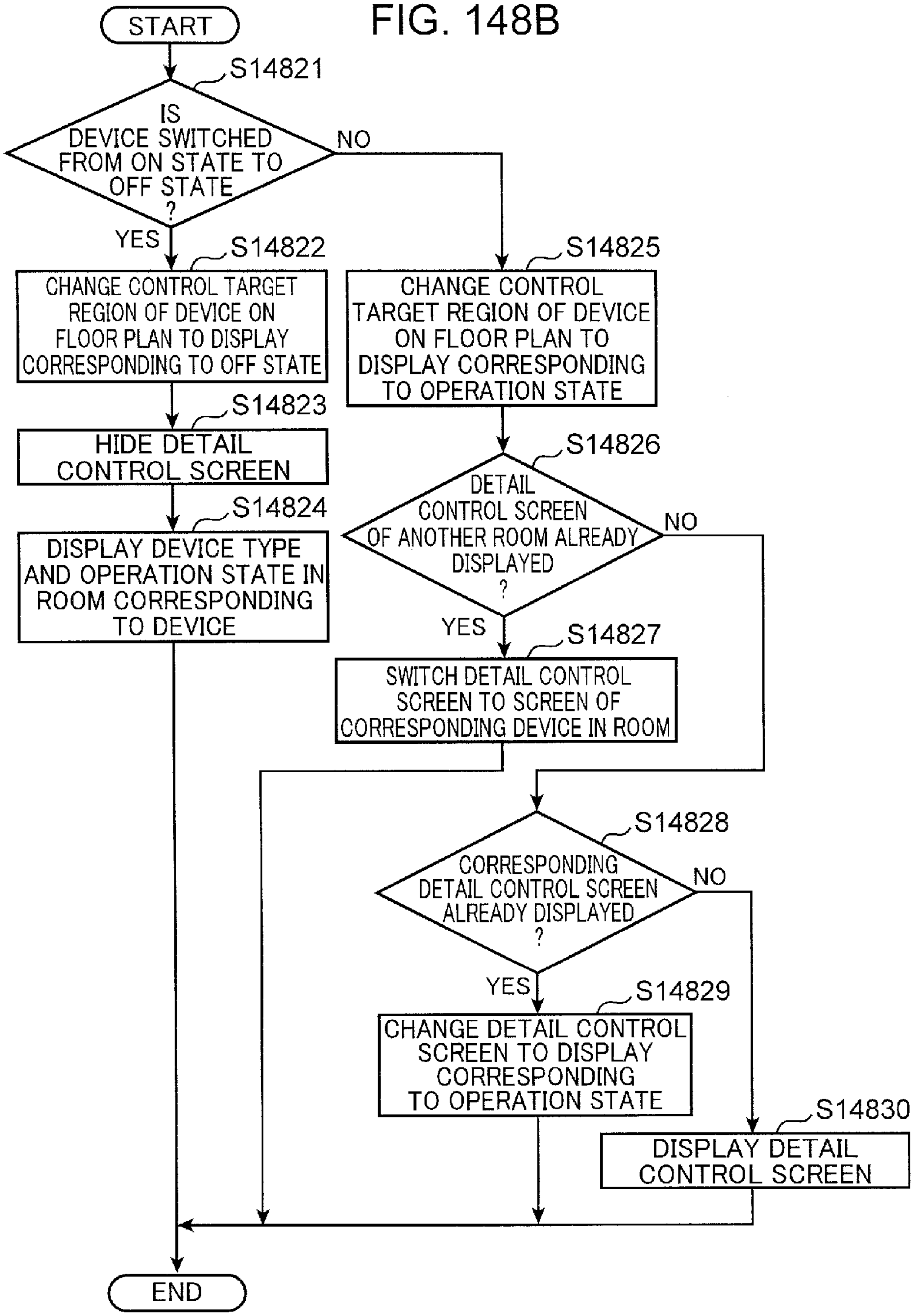

FIG. 148B is a flow chart showing an example that differs from FIG. 148A of a display control flow in S12311 shown in FIG. 147 according to an embodiment of the present disclosure.

Figure 148C:
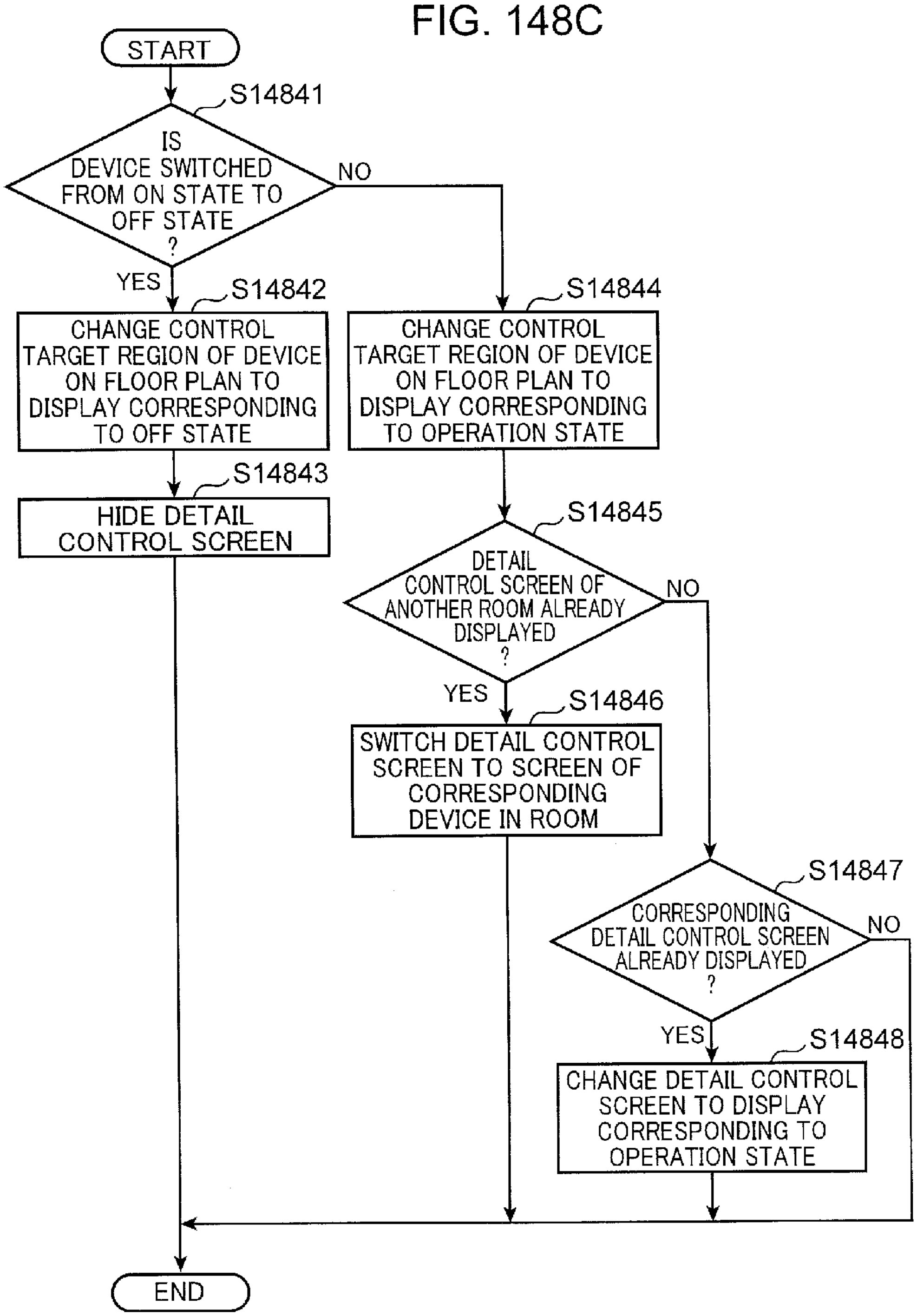

FIG. 148C is a flow chart showing an example that differs from FIGS. 148A and 148B of a display control flow in S12311 shown in FIG. 147 according to an embodiment of the present disclosure.

Figure 148D:
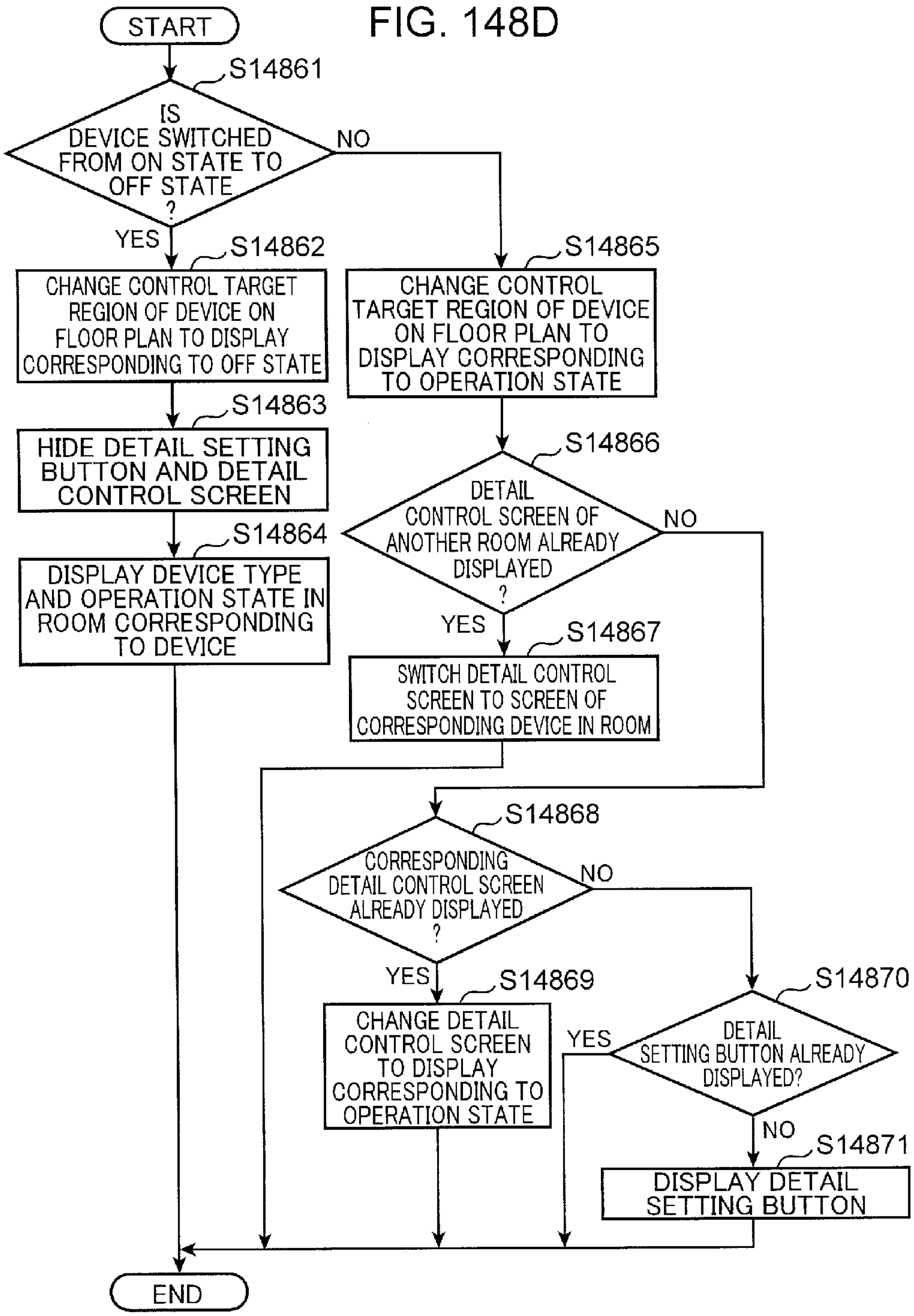

FIG. 148D is a flow chart showing an example that differs from FIGS. 148A, 148B, and 148C of a display control flow in S12311 shown in FIG. 147 according to an embodiment of the present disclosure.

Figure 149:
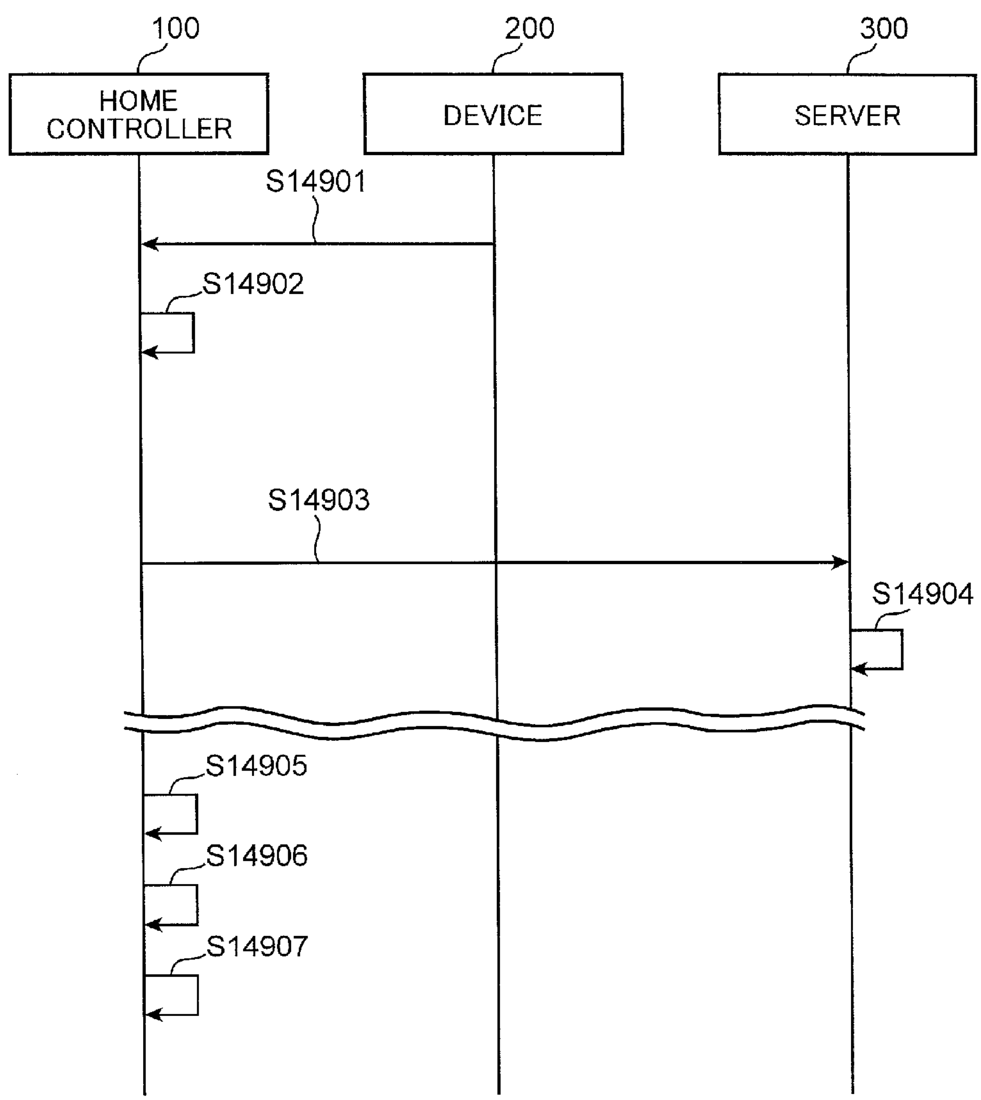

FIG. 149 is a sequence diagram showing an example of a process by which a home controller acquires a state of a specific target device according to an embodiment of the present disclosure.

Figure 150:
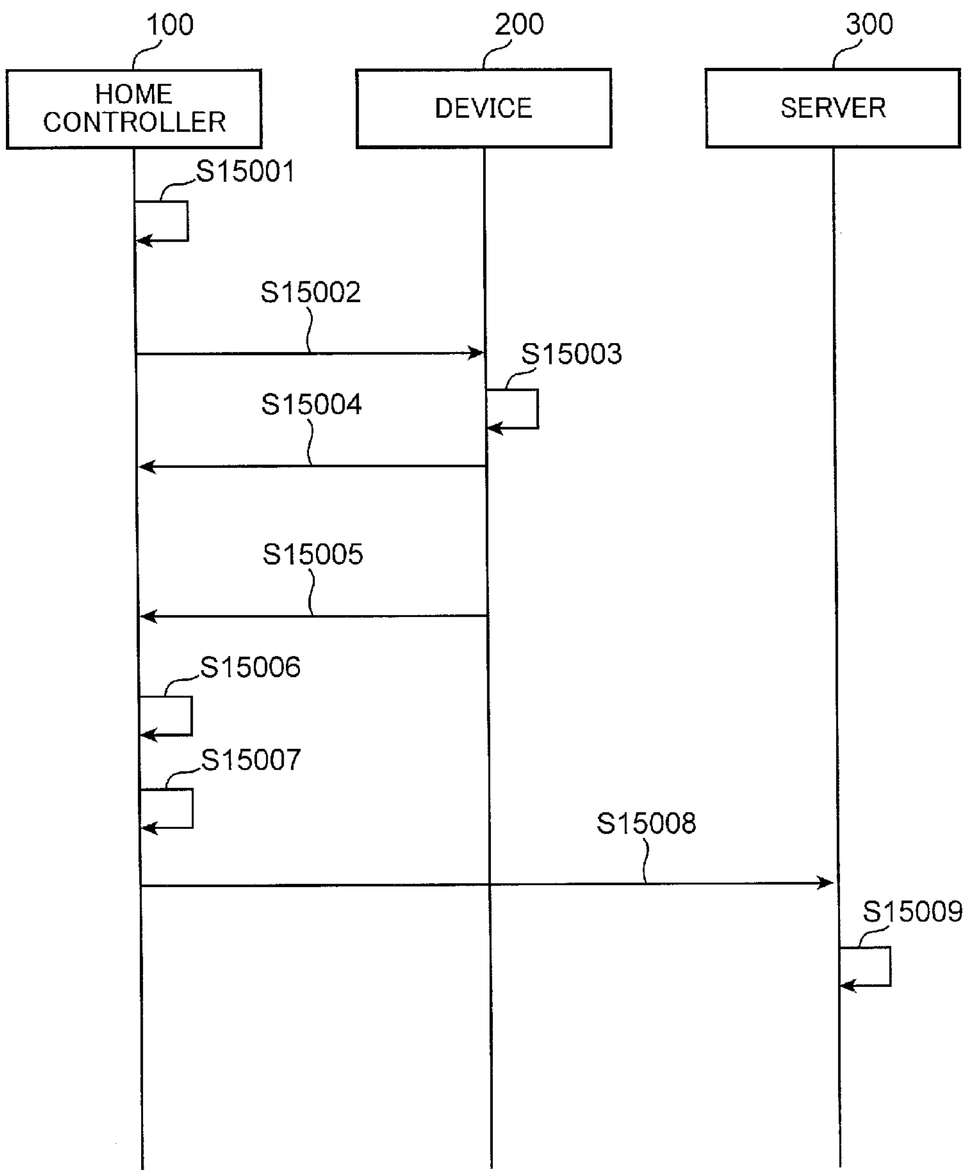

FIG. 150 is a sequence diagram showing another example of a process by which a home controller acquires a state of a specific target device according to an embodiment of the present disclosure.

Figure 151:
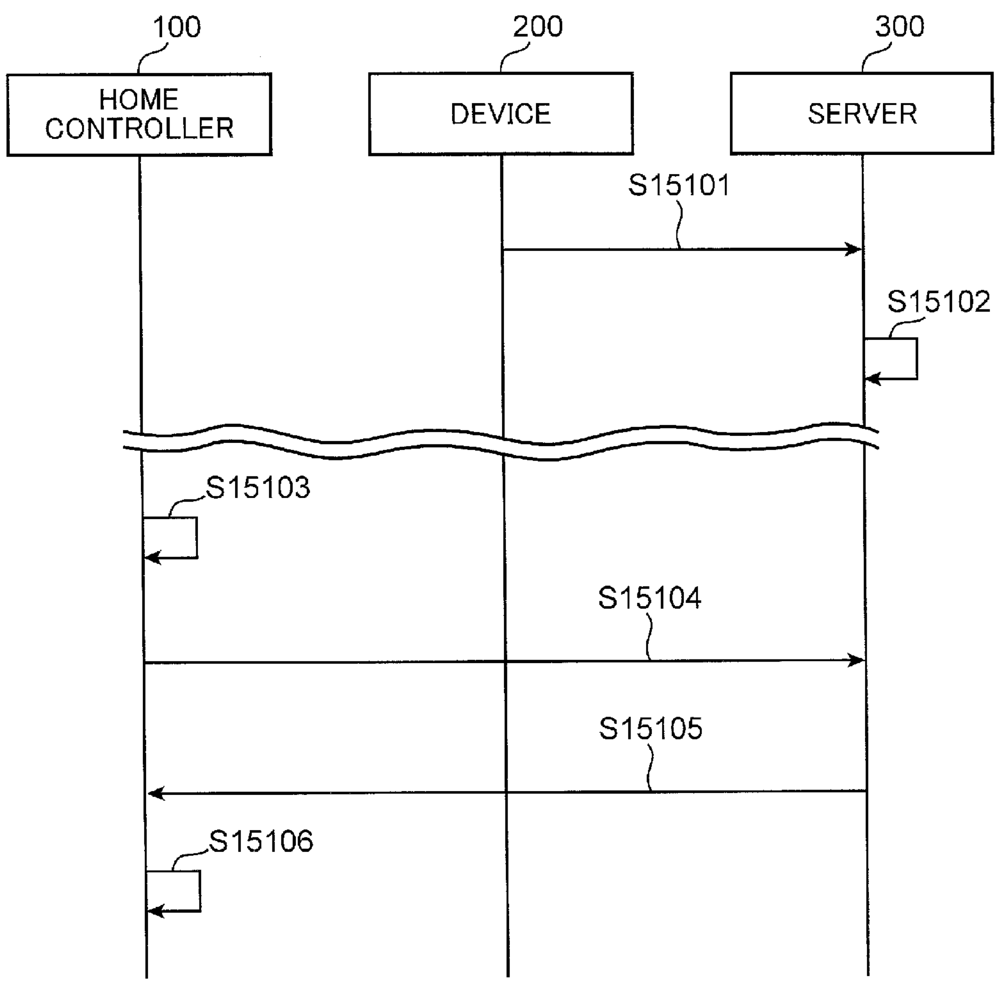

FIG. 151 is a sequence diagram showing an example of a process by which a home controller acquires a state of a specific target device from a server according to an embodiment of the present disclosure.

Figure 152:
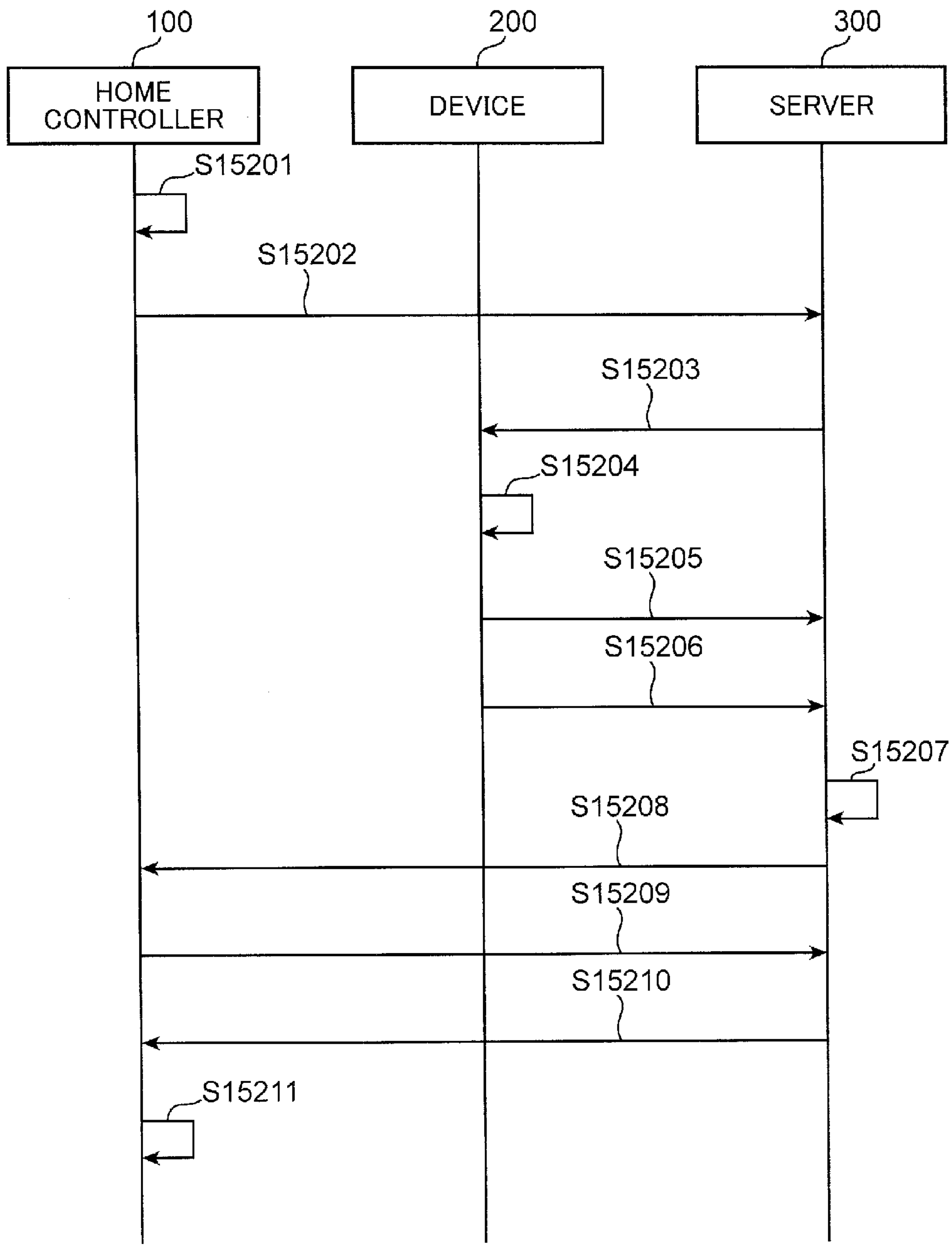

FIG. 152 is a sequence diagram showing another example of a process by which a home controller acquires a state of a specific target device from a server according to an embodiment of the present disclosure.

Figure 153:
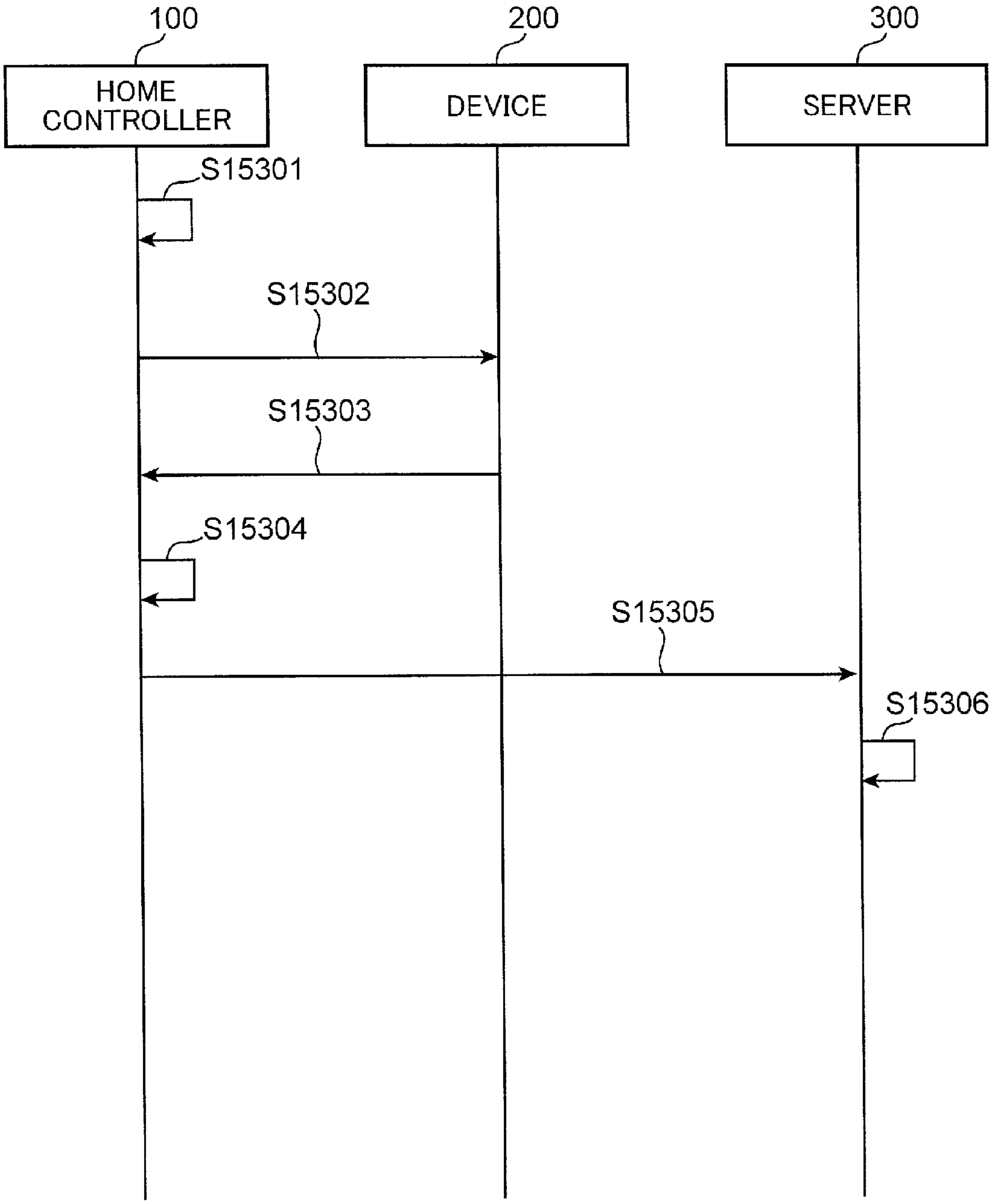

FIG. 153 is a sequence diagram showing an example of a process by which a home controller acquires a device state from a specific target device according to an embodiment of the present disclosure.

Figure 154:
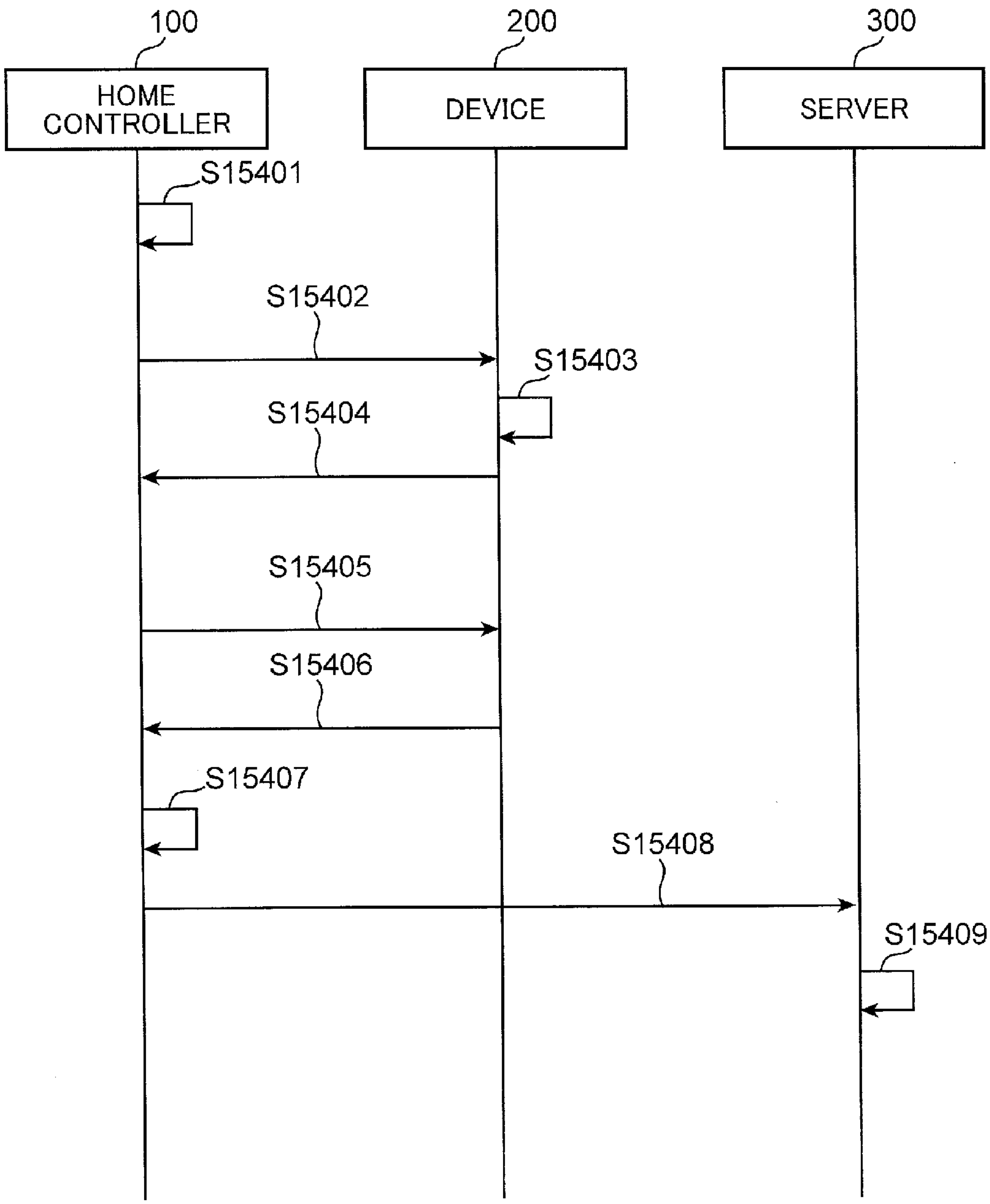

FIG. 154 is a sequence diagram showing another example of a process by which a home controller acquires a device state from a specific target device according to an embodiment of the present disclosure.

Figure 155A:
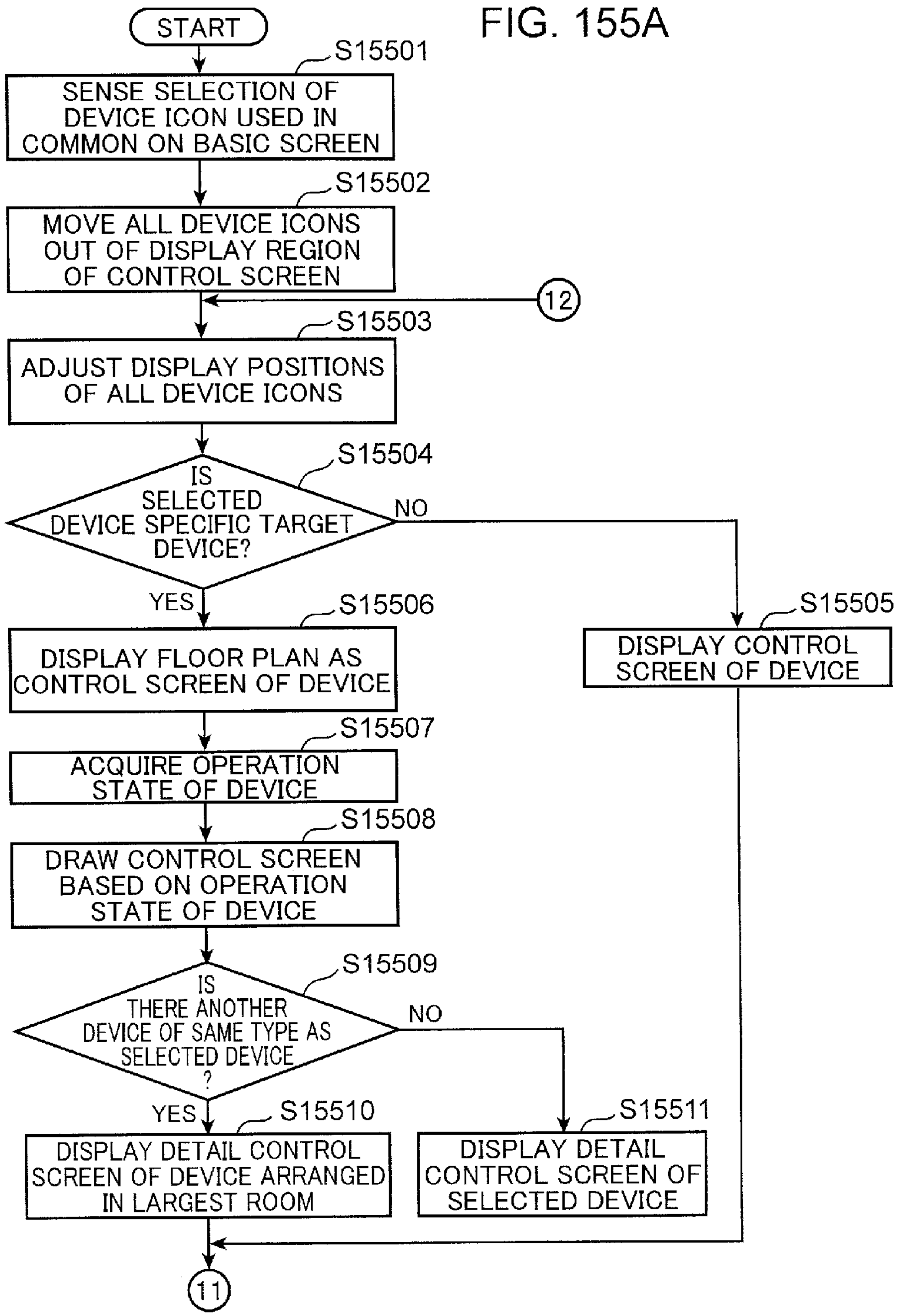

FIG. 155A is a flow chart showing a flow of a process by which a home controller controls a specific target device according to an embodiment of the present disclosure.

Figure 155B:
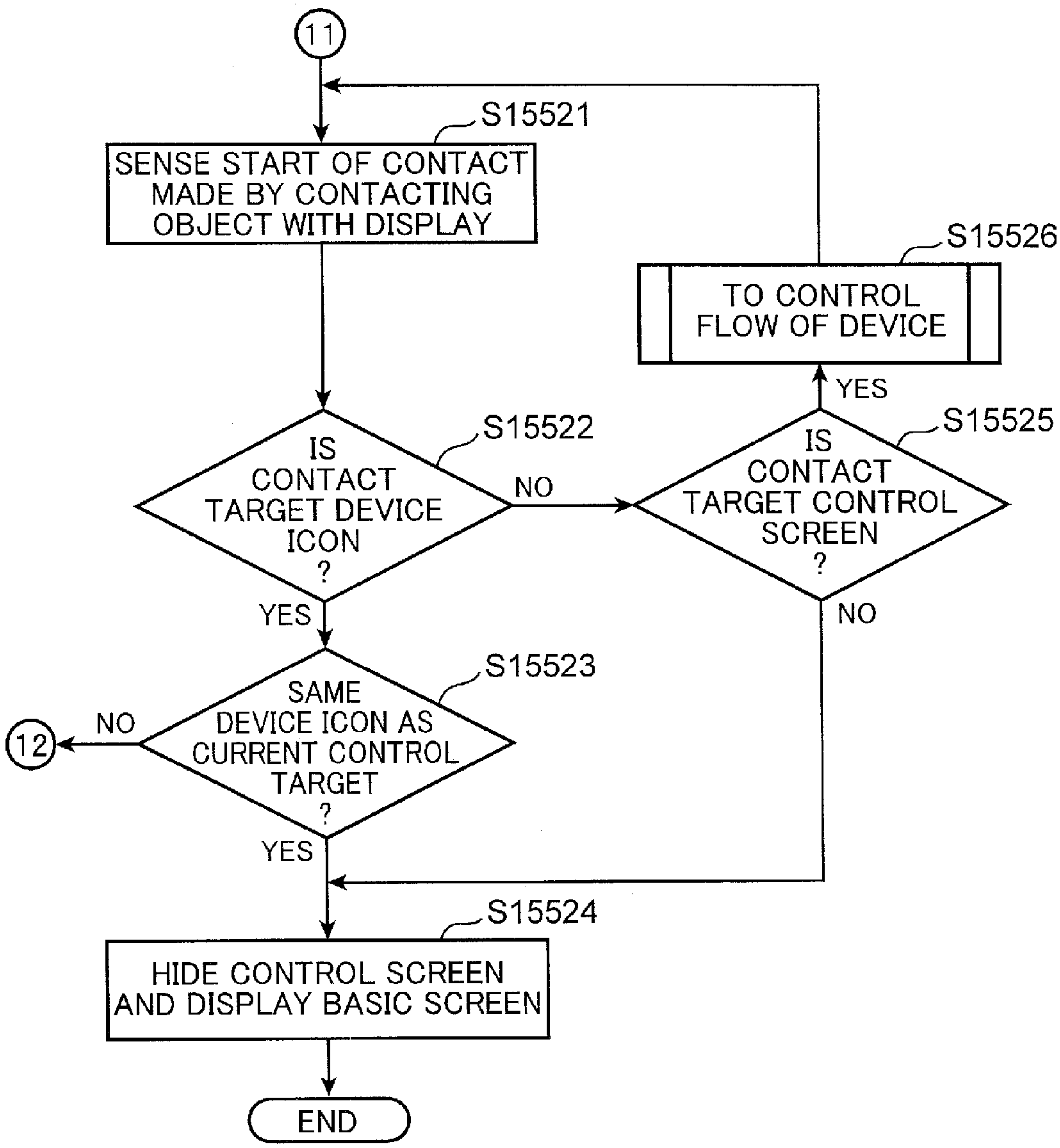

FIG. 155B is a flow chart showing a flow of a process by which a home controller controls a specific target device according to an embodiment of the present disclosure.

Figure 156A:
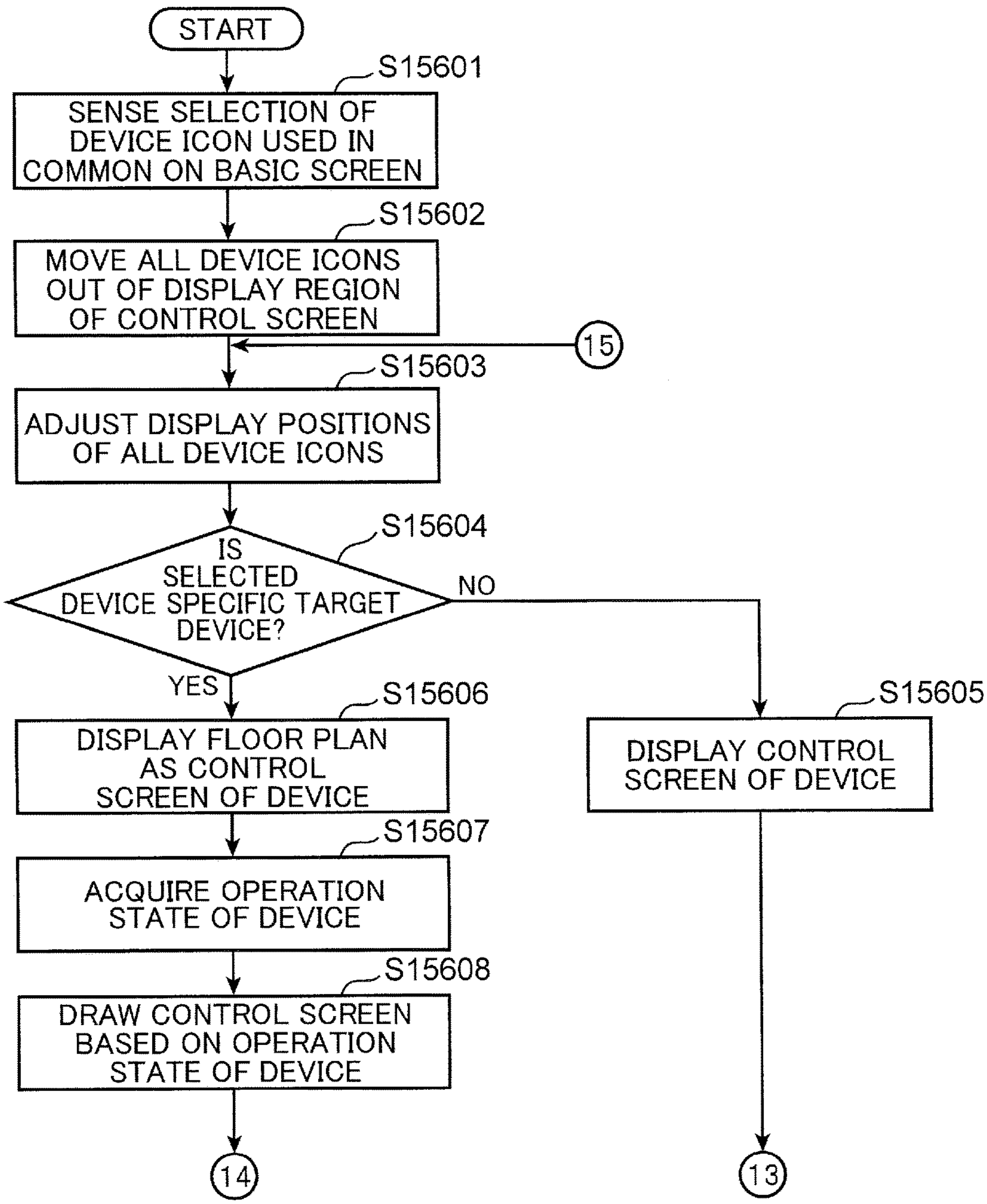

FIG. 156A is a flow chart showing another example of a flow of a process by which a home controller controls a specific target device when a device icon is used in common.

Figure 156B:
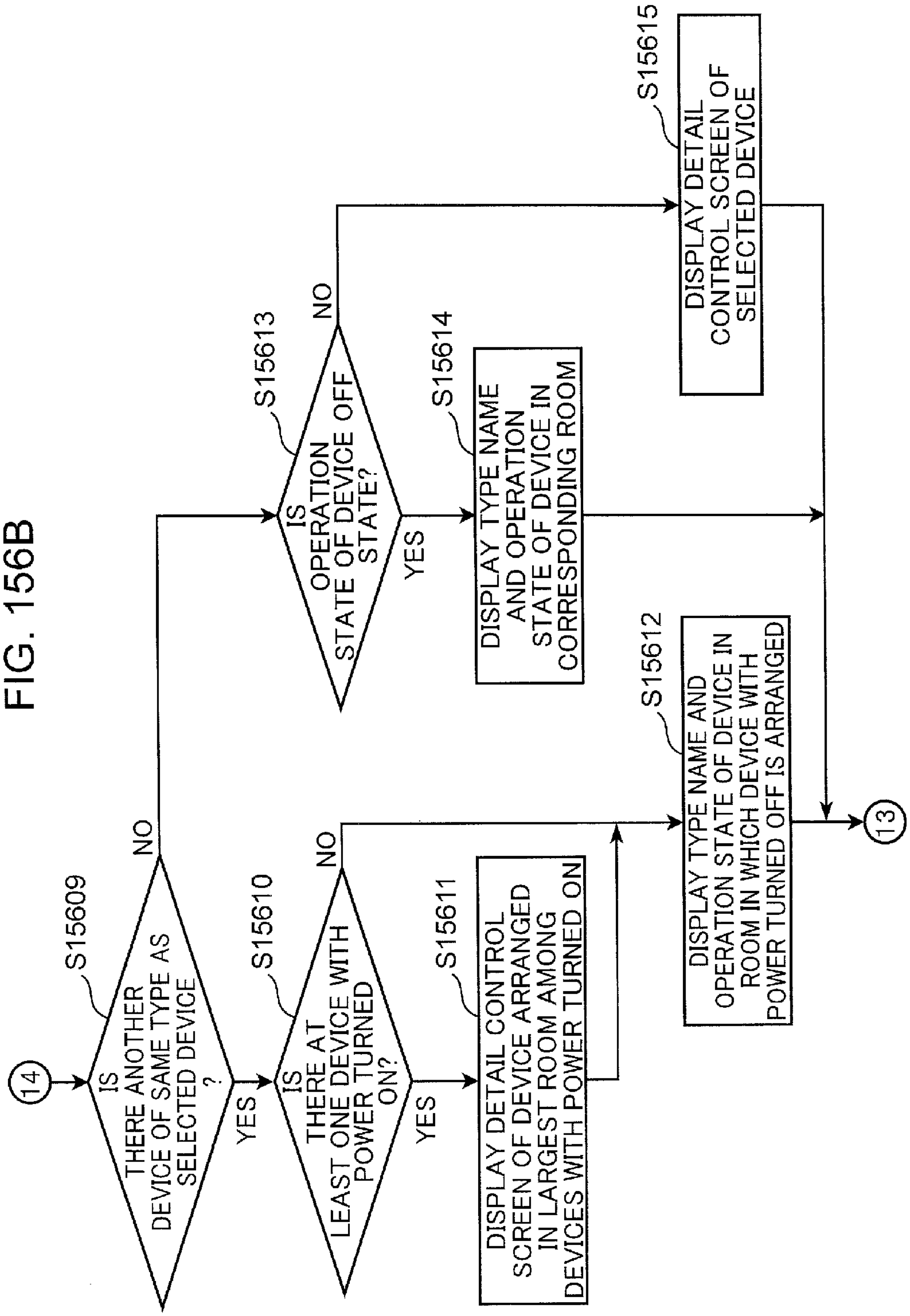

FIG. 156B is a flow chart showing another example of a flow of a process by which a home controller controls a specific target device when a device icon is used in common.

Figure 156C:
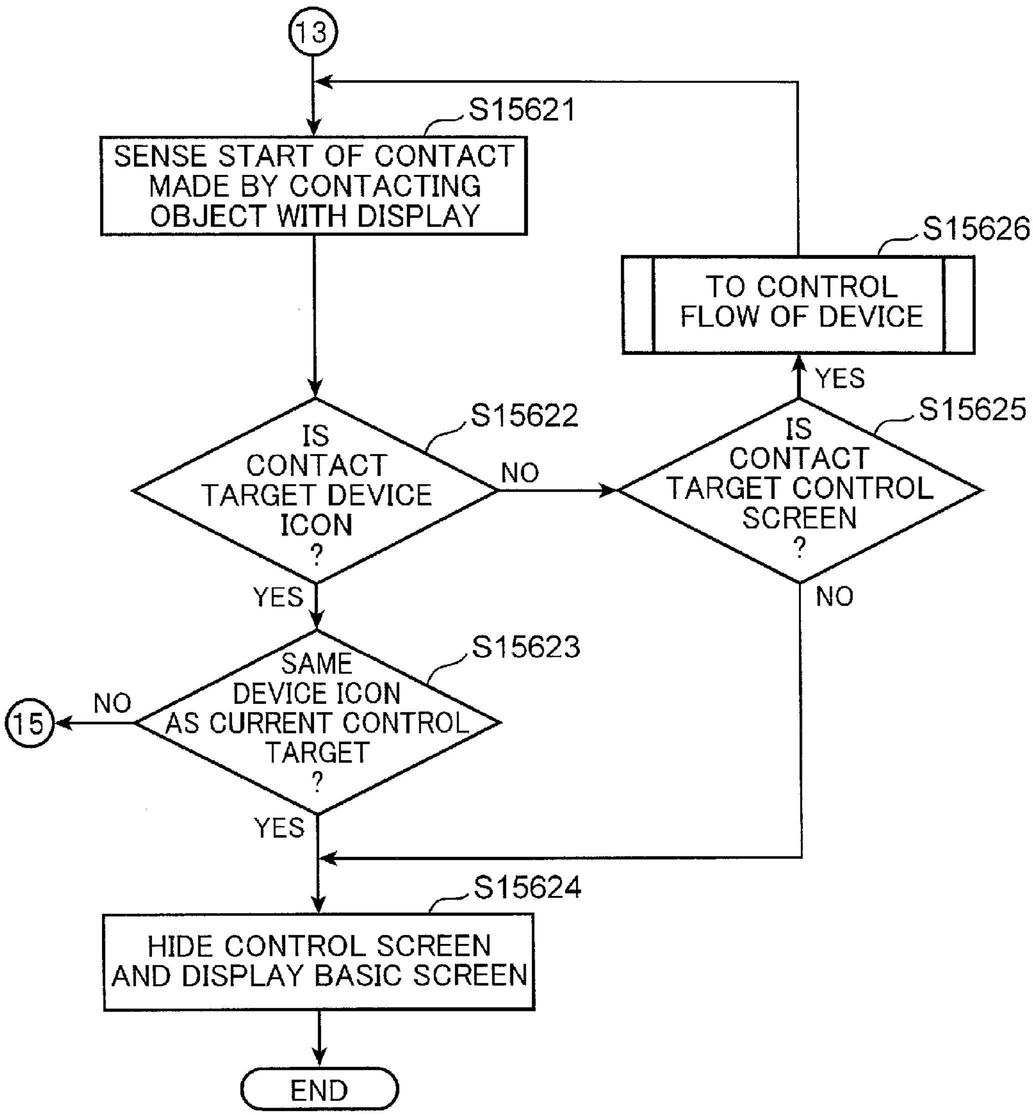

FIG. 156C is a flow chart showing another example of a flow of a process by which a home controller controls a specific target device when a device icon is used in common.

Figure 157A:
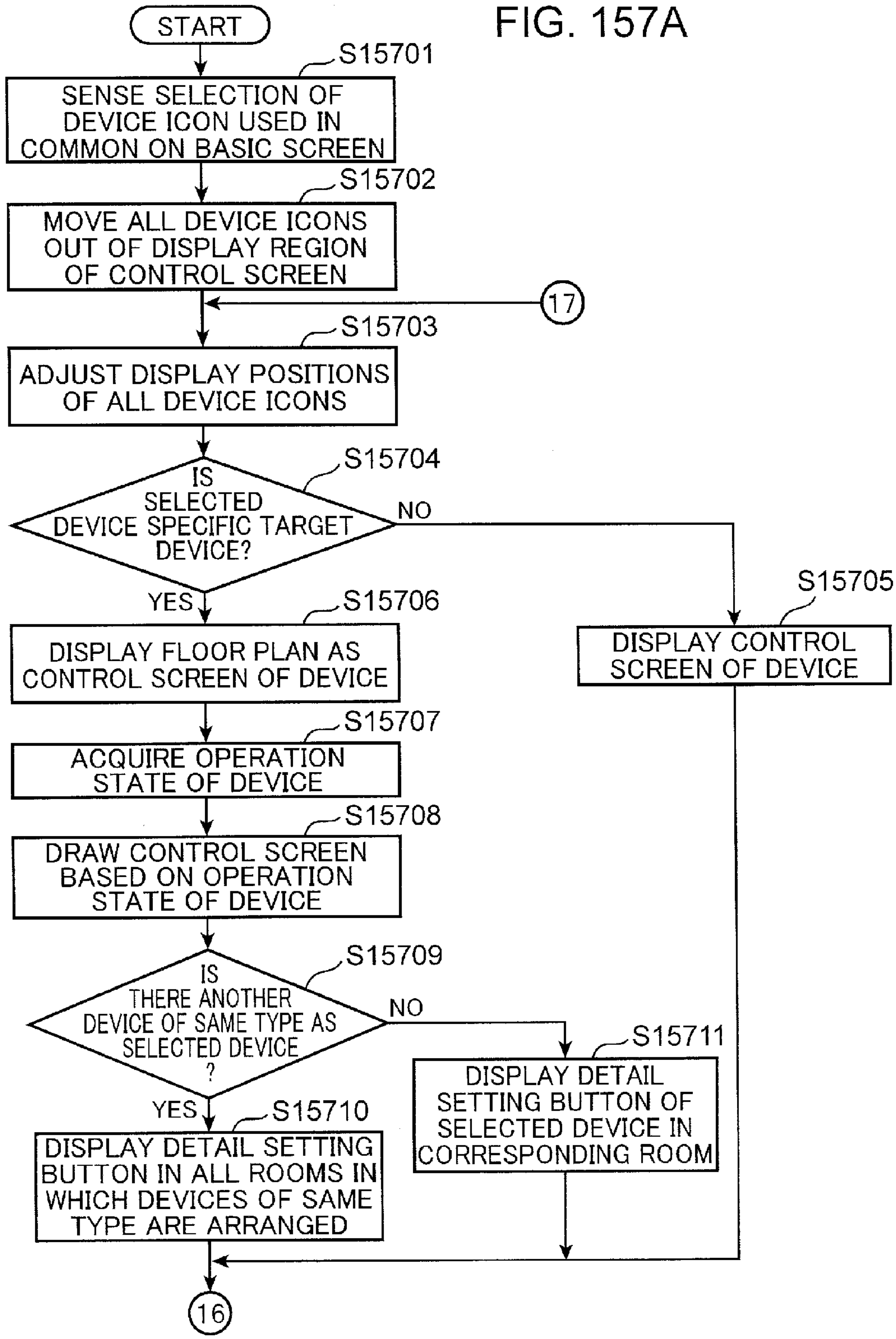

FIG. 157A is a flow chart showing yet another example of a flow of a process by which a home controller controls a specific target device when a device icon is used in common.

Figure 157B:
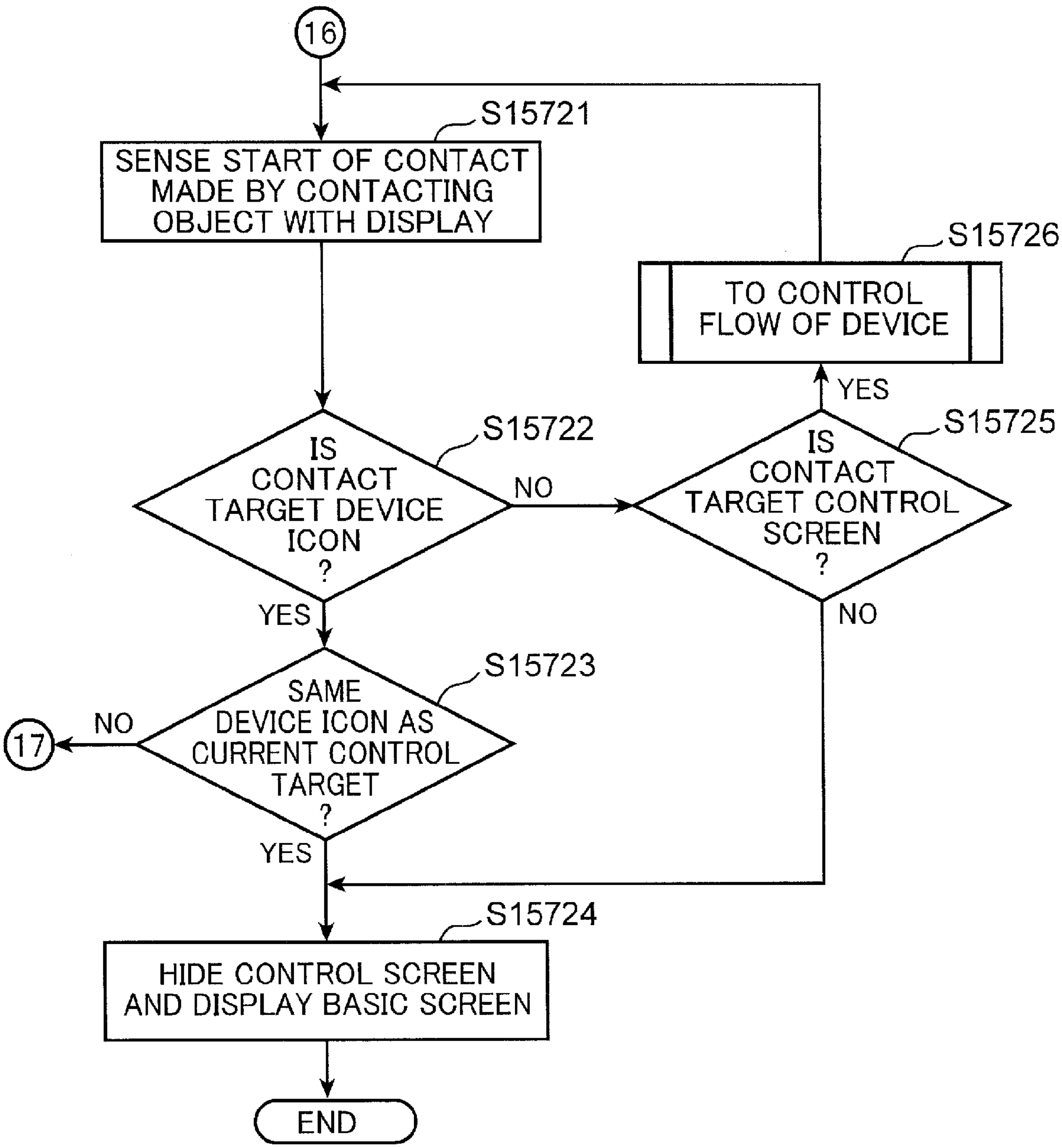

FIG. 157B is a flow chart showing yet another example of a flow of a process by which a home controller controls a specific target device when a device icon is used in common.

Figure 158A:
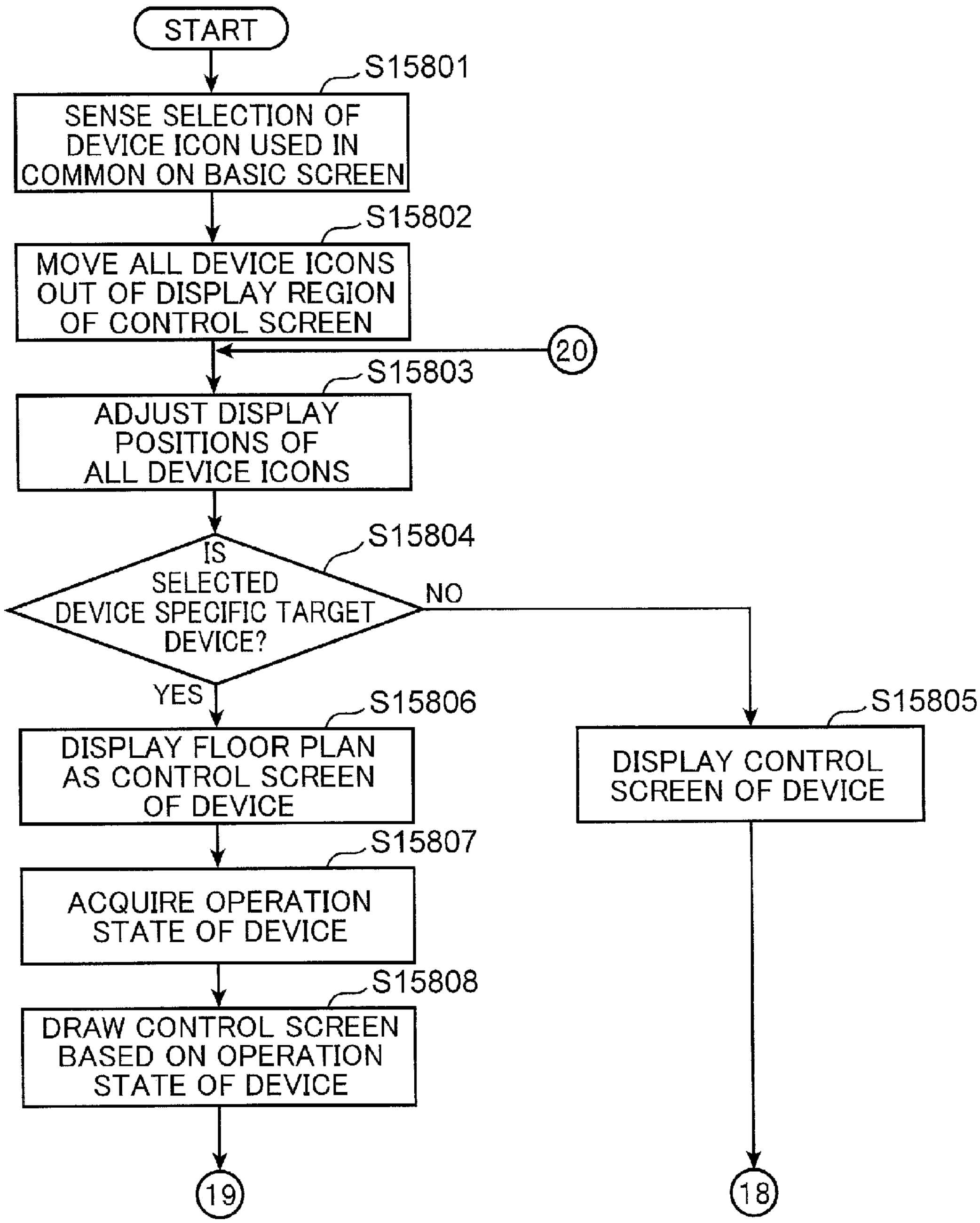

FIG. 158A is a flow chart showing yet another example of a flow of a process by which a home controller controls a specific target device when a device icon is used in common.

Figure 158B:
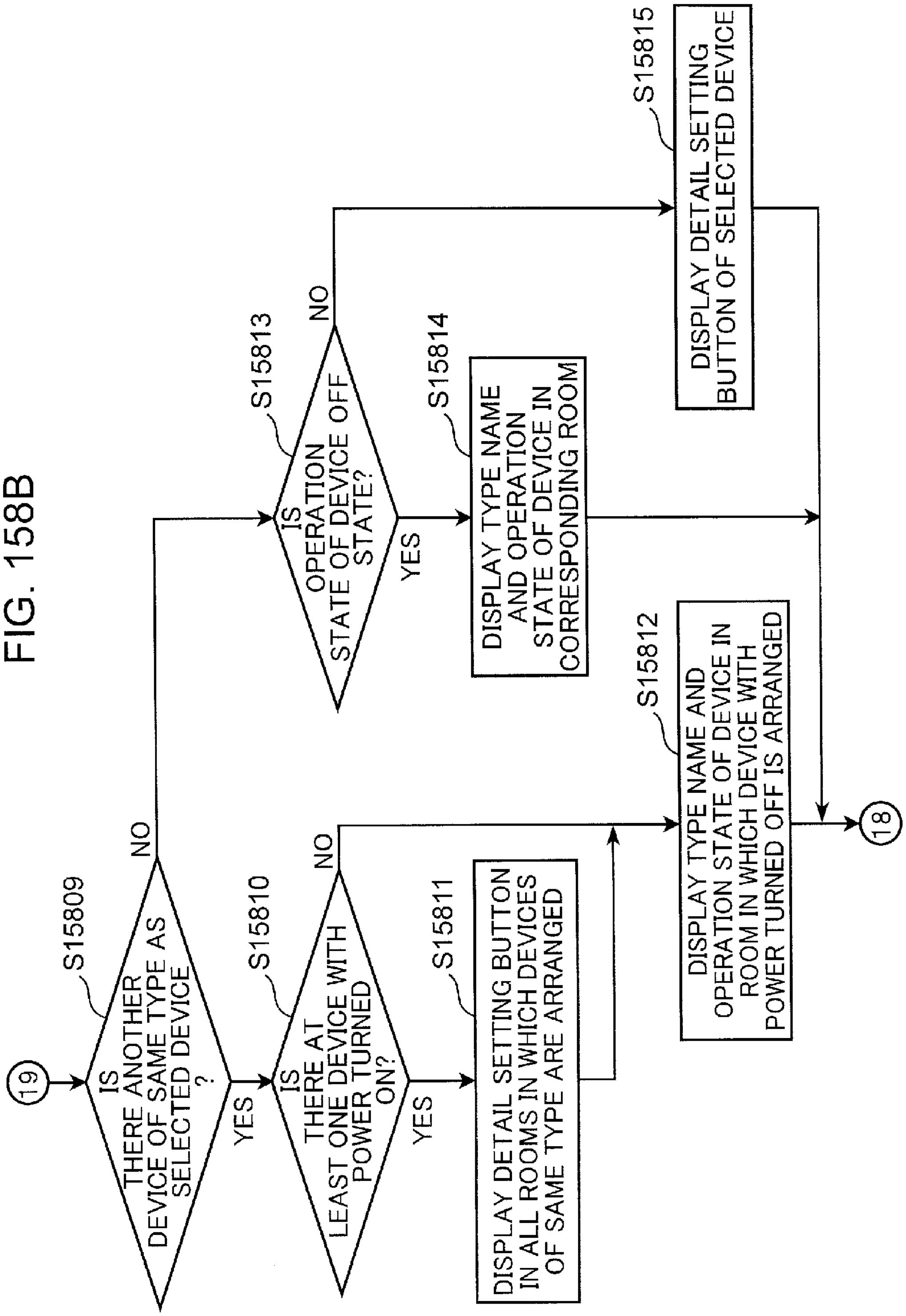

FIG. 158B is a flow chart showing yet another example of a flow of a process by which a home controller controls a specific target device when a device icon is used in common.

Figure 158C:
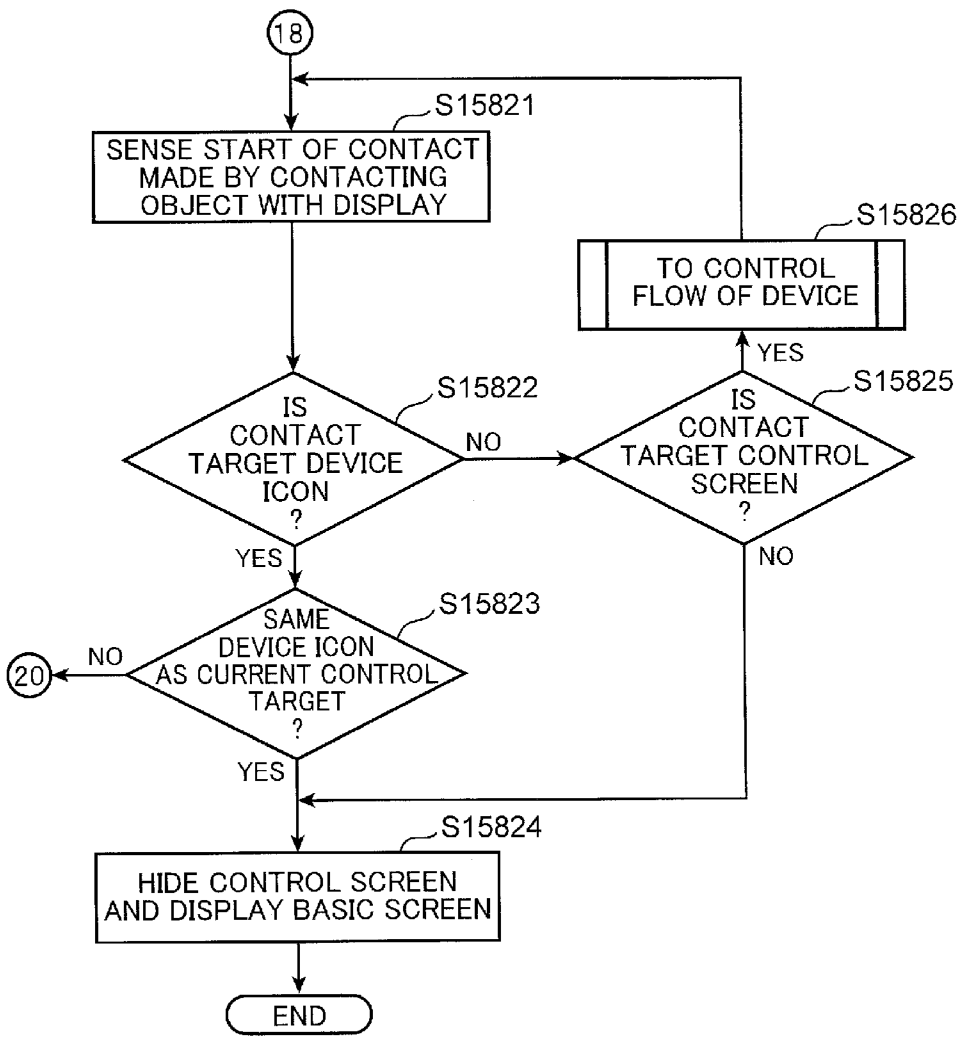

FIG. 158C is a flow chart showing yet another example of a flow of a process by which a home controller controls a specific target device when a device icon is used in common.

Figure 159A:
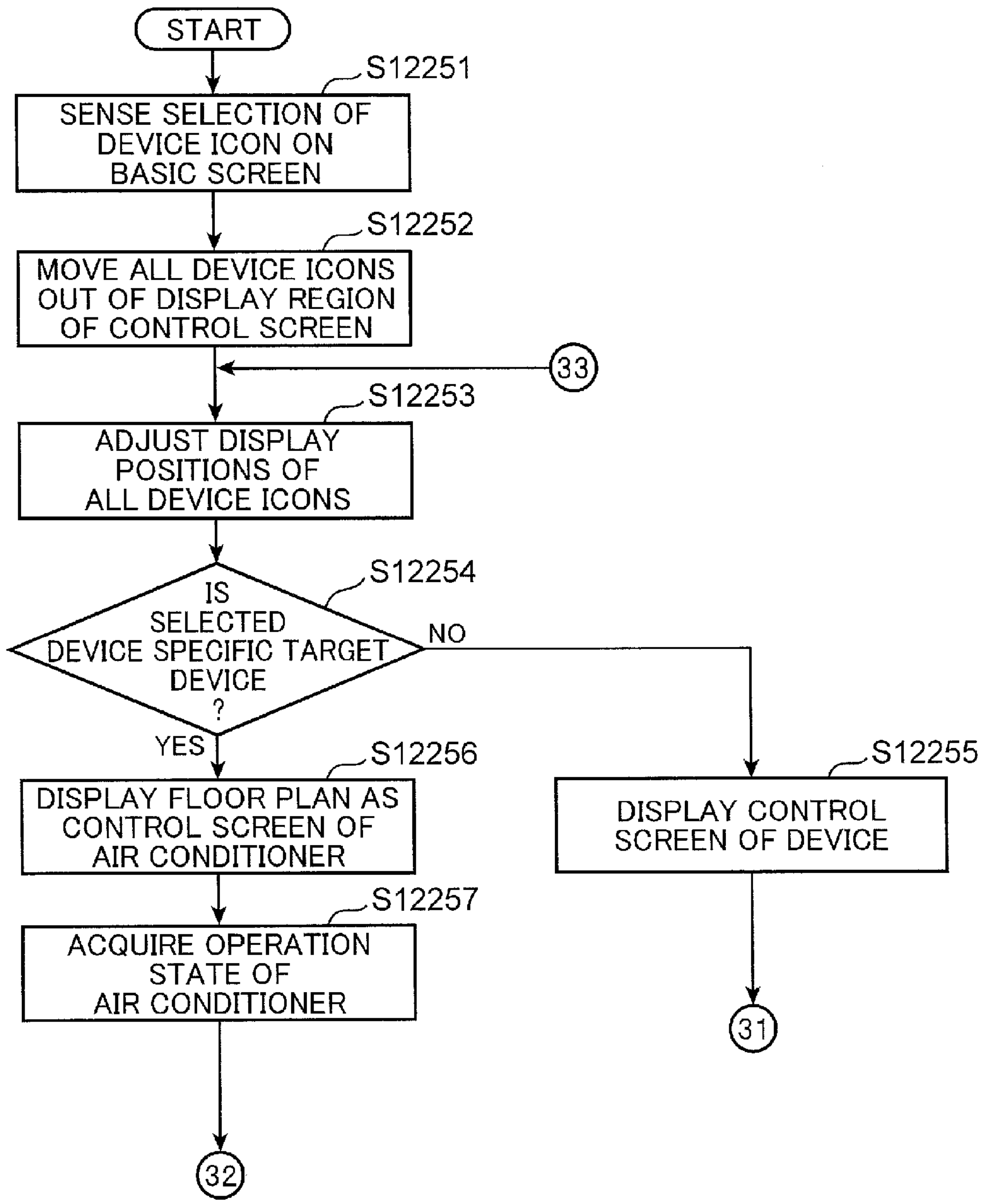

FIG. 159A is a flow chart showing an example of a flow of a process by which a home controller controls an air conditioner as an example of a specific target device according to an embodiment of the present disclosure.

Figure 159B:
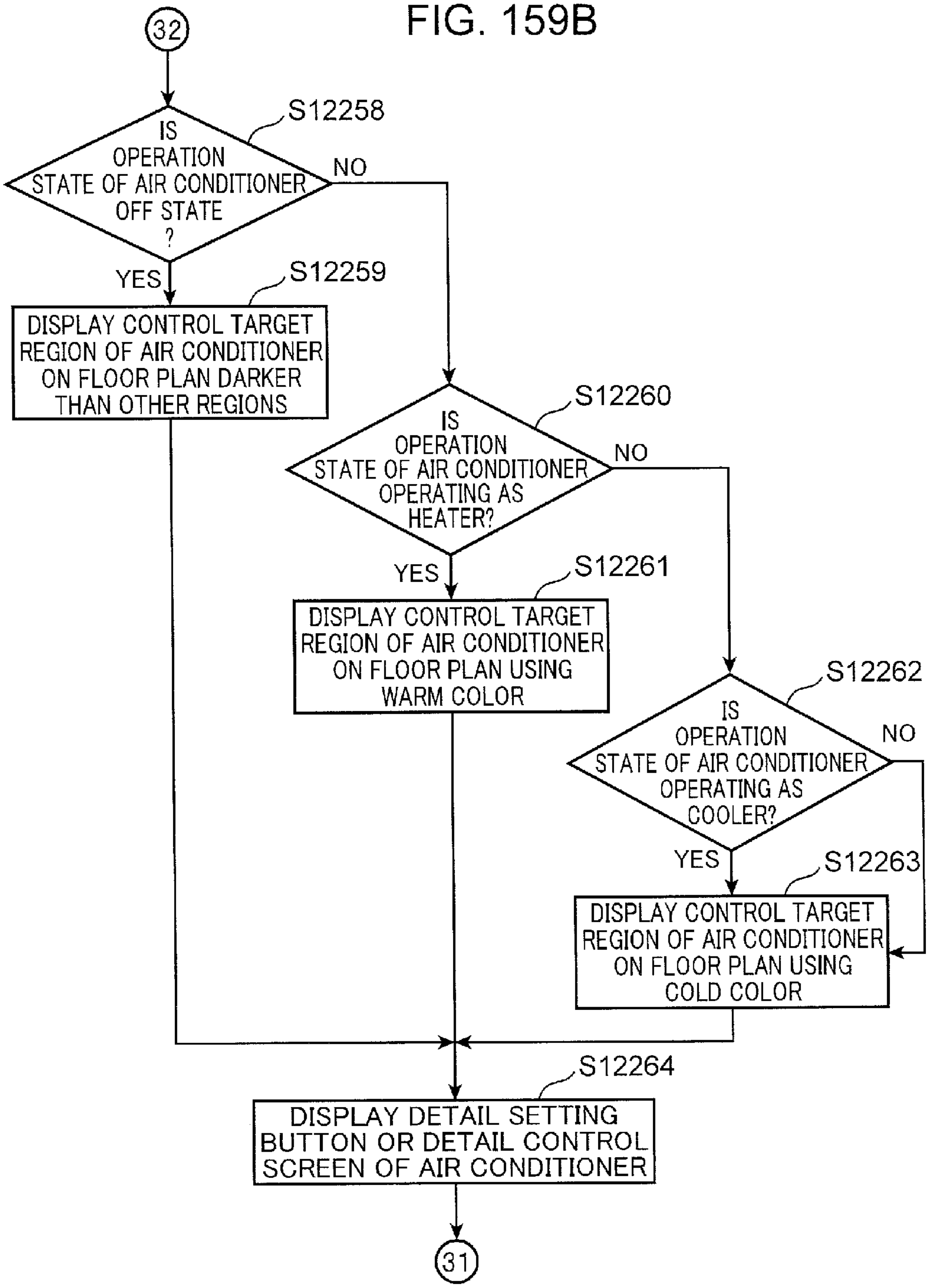

FIG. 159B is a flow chart showing an example of a flow of a process by which a home controller controls the air conditioner as an example of the specific target device according to an embodiment of the present disclosure.

Figure 159C:
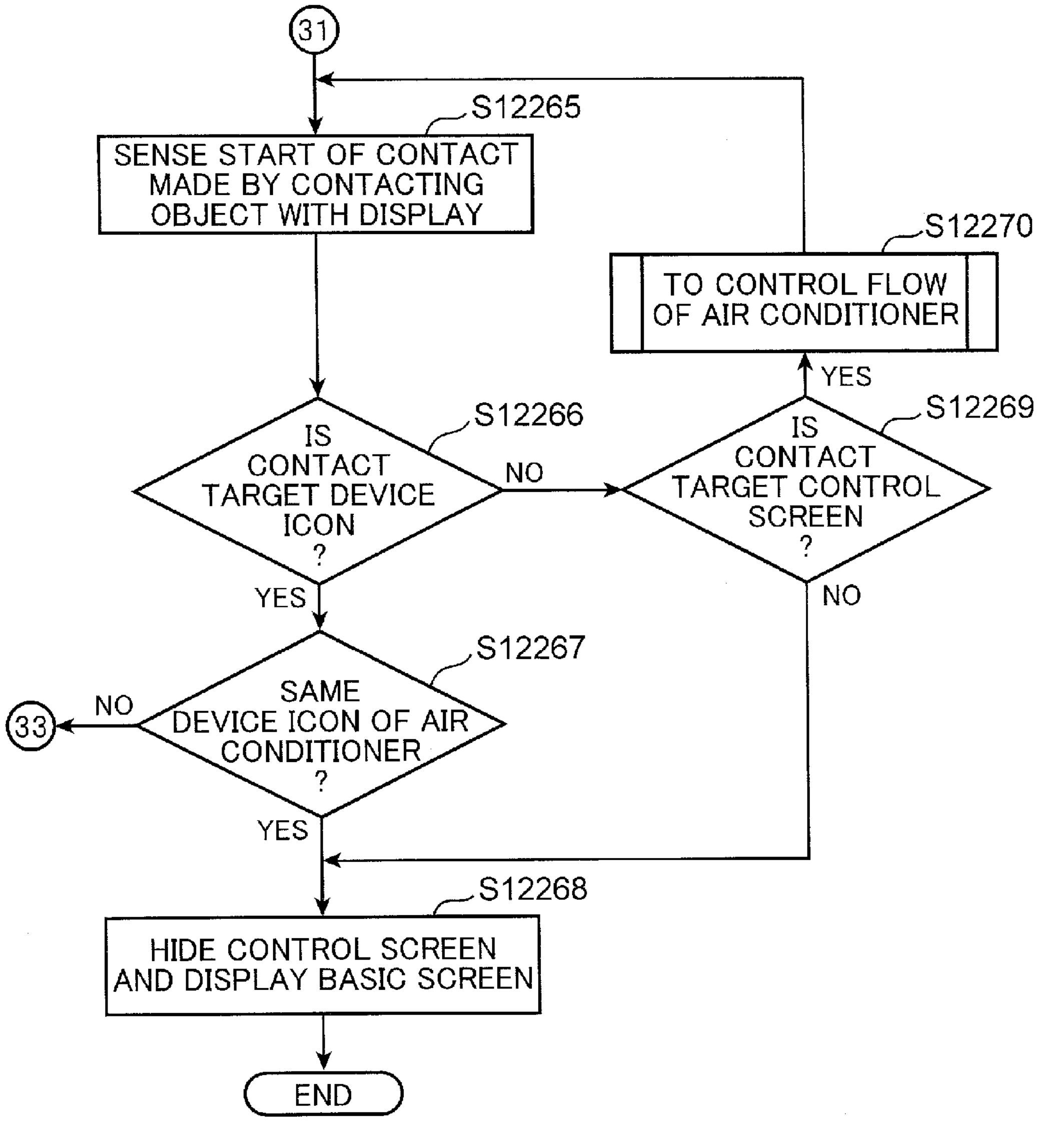

FIG. 159C is a flow chart showing an example of a flow of a process by which a home controller controls the air conditioner as an example of the specific target device according to an embodiment of the present disclosure.

Figure 160:
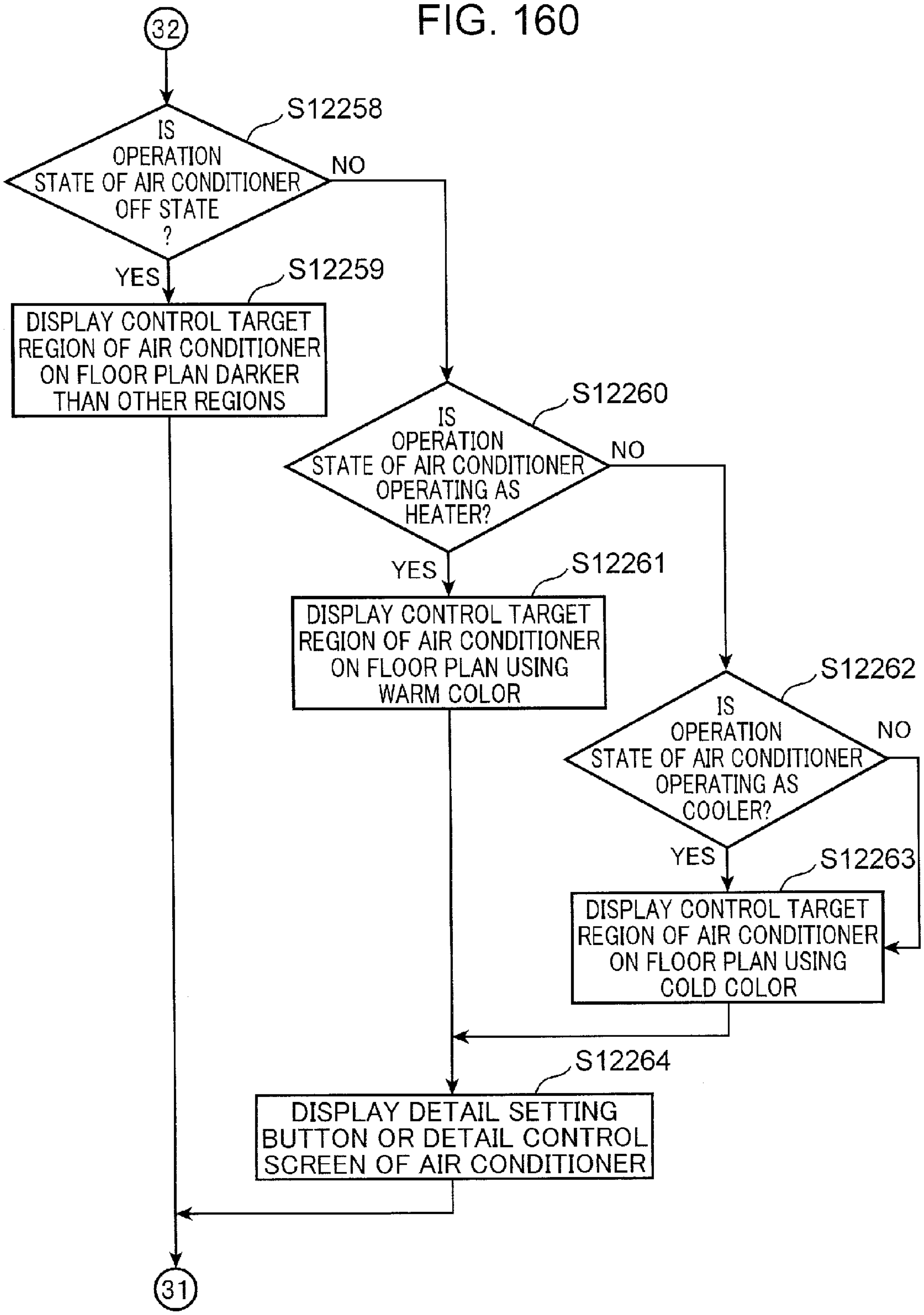

FIG. 160 is a flow chart showing another example of a flow of a process by which a home controller controls the air conditioner as an example of the specific target device according to an embodiment of the present disclosure.

Figure 161:
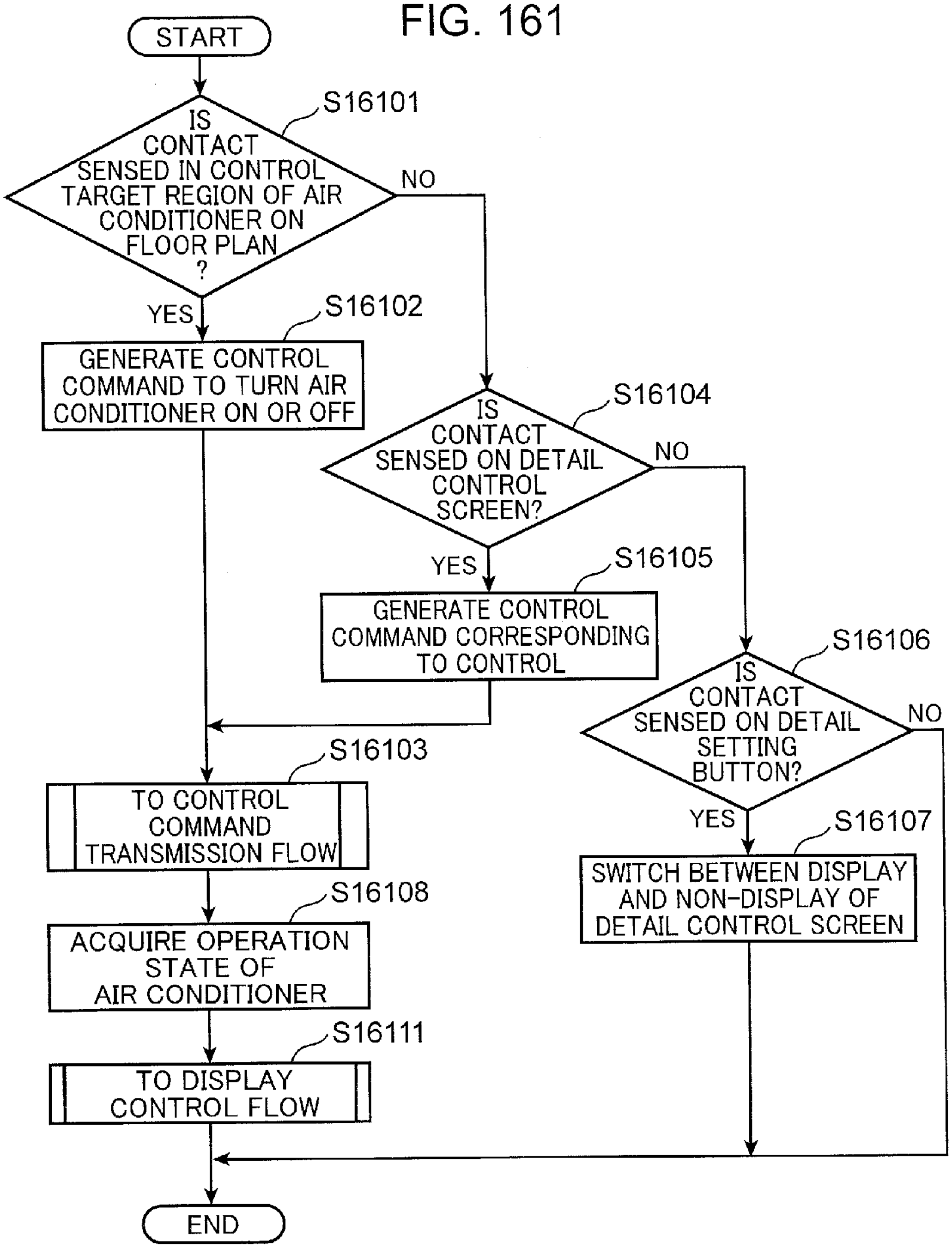

FIG. 161 is a flow chart showing a flow of a process by which a home controller generates a control command of an air conditioner as a specific target device in accordance with a content of a contact made by a contacting object according to an embodiment of the present disclosure.

Figure 162:
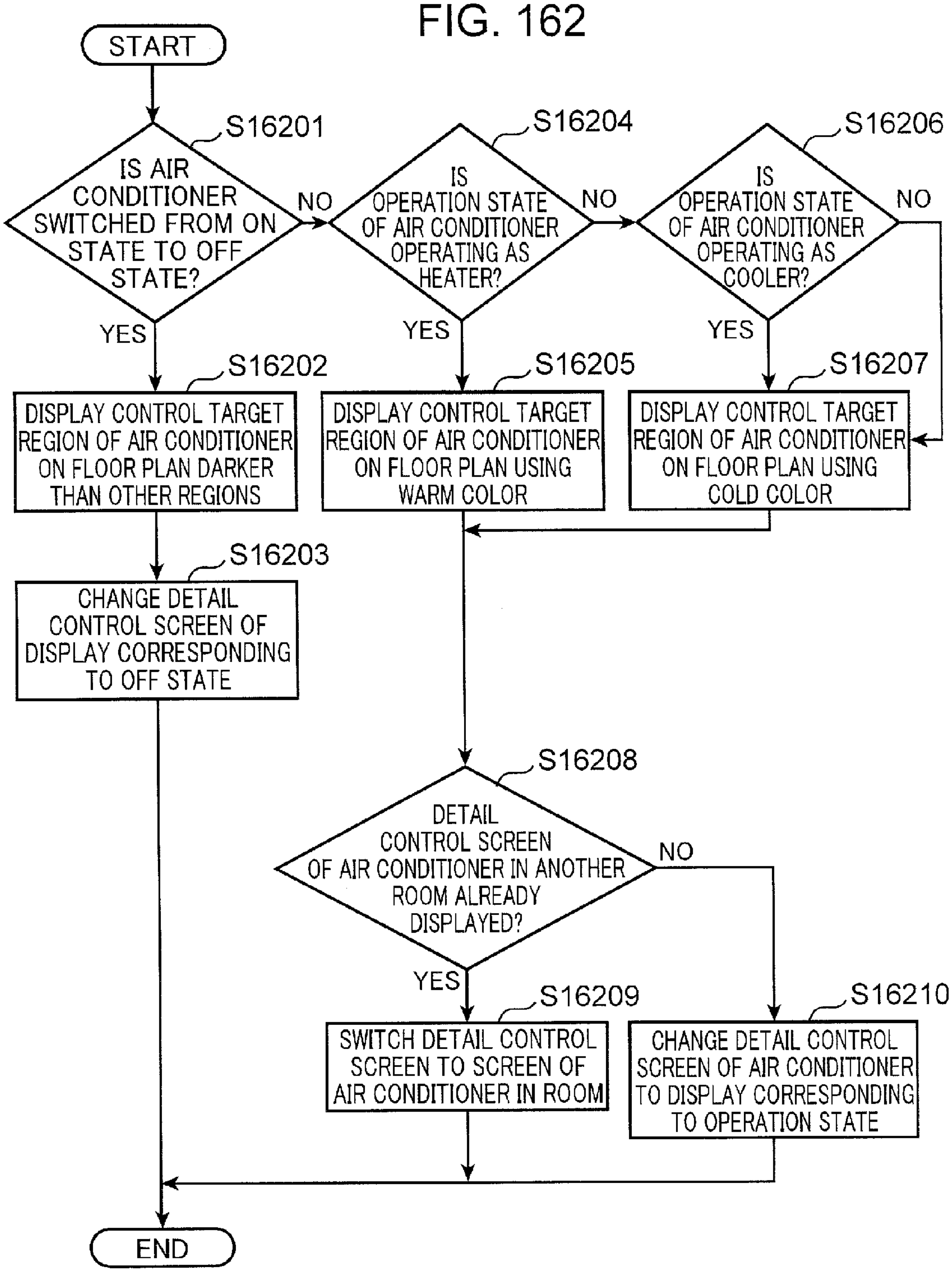

FIG. 162 is a flow chart showing an example of a display control flow in S16111 shown in FIG. 161 according to an embodiment of the present disclosure.

Figure 163:
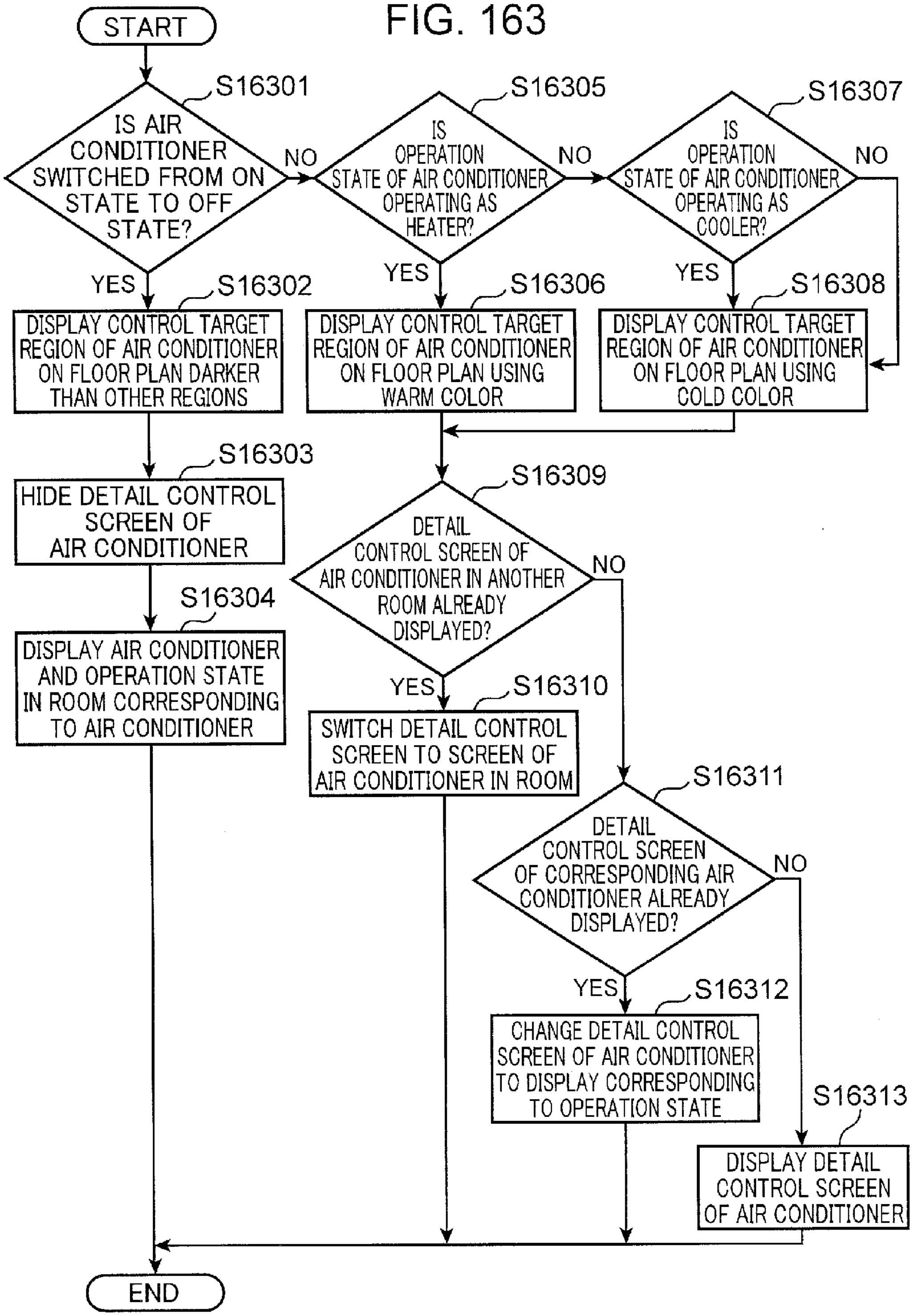

FIG. 163 is a flow chart showing another example of the display control flow in S16111 shown in FIG. 161 according to an embodiment of the present disclosure.

Figure 164:
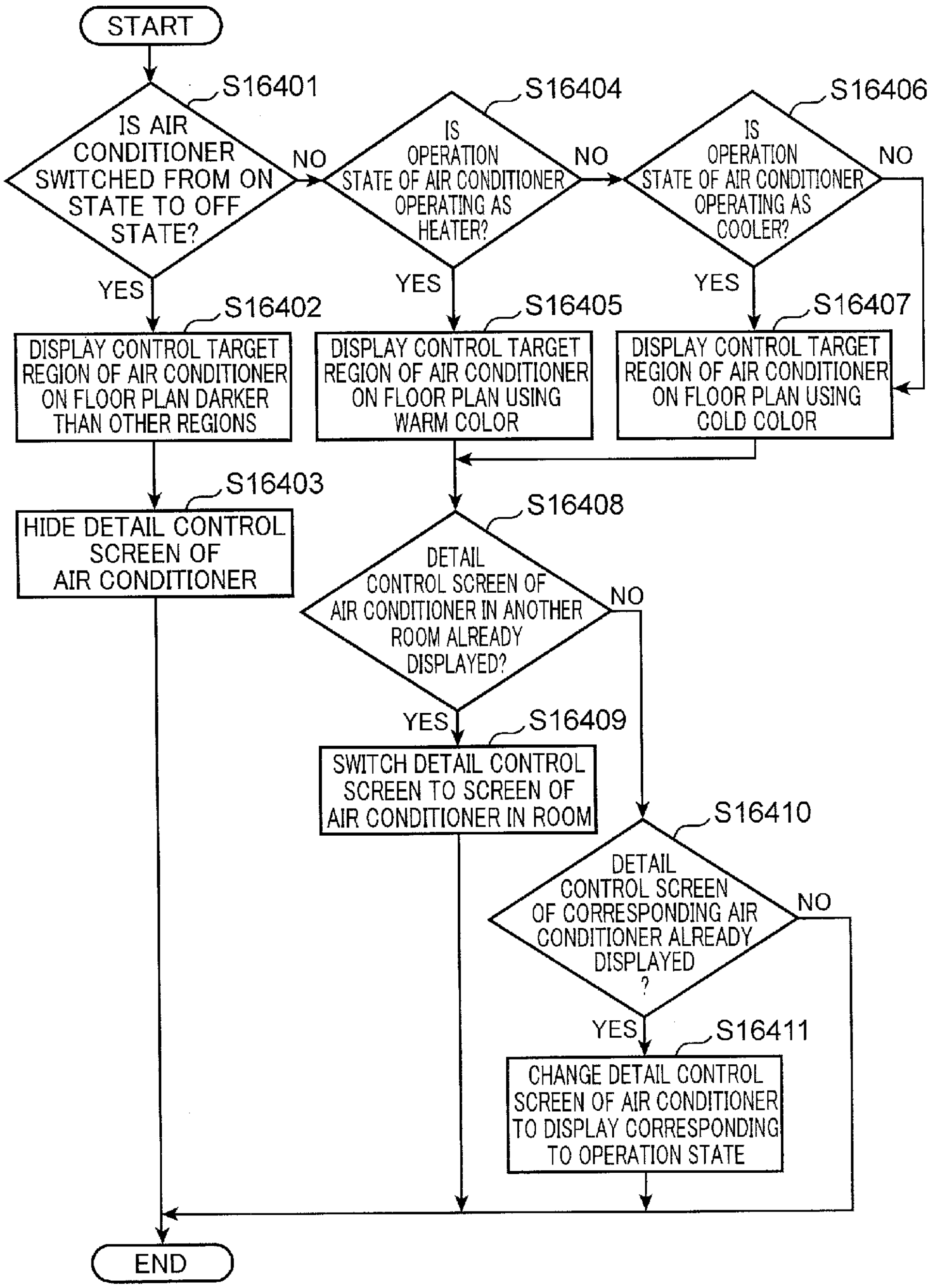

FIG. 164 is a flow chart showing yet another example of the display control flow in S16111 shown in FIG. 161 according to an embodiment of the present disclosure.

Figure 165:
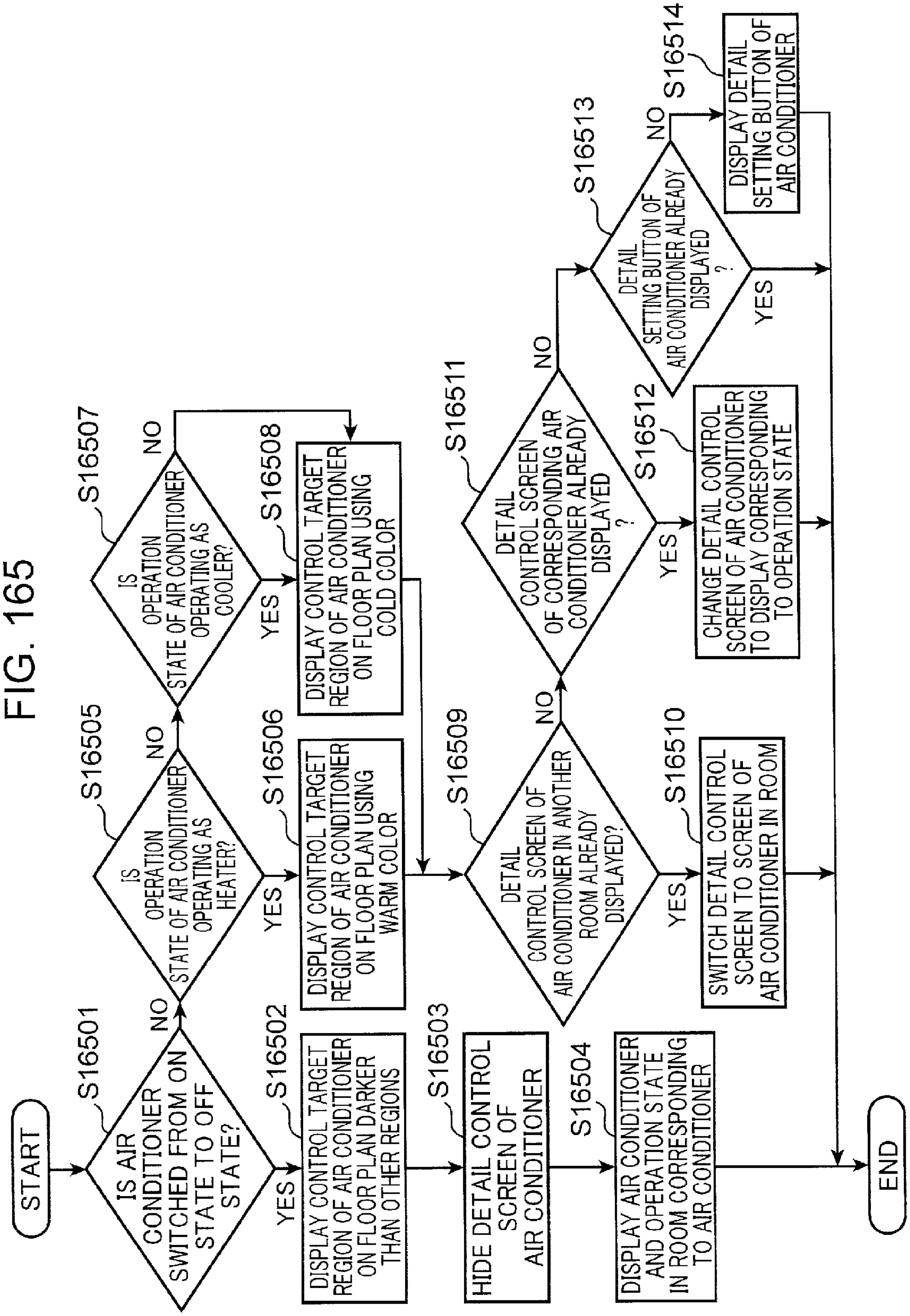

FIG. 165 is a flow chart showing yet another example of the display control flow in S16111 shown in FIG. 161 according to an embodiment of the present disclosure.

Figure 166A:
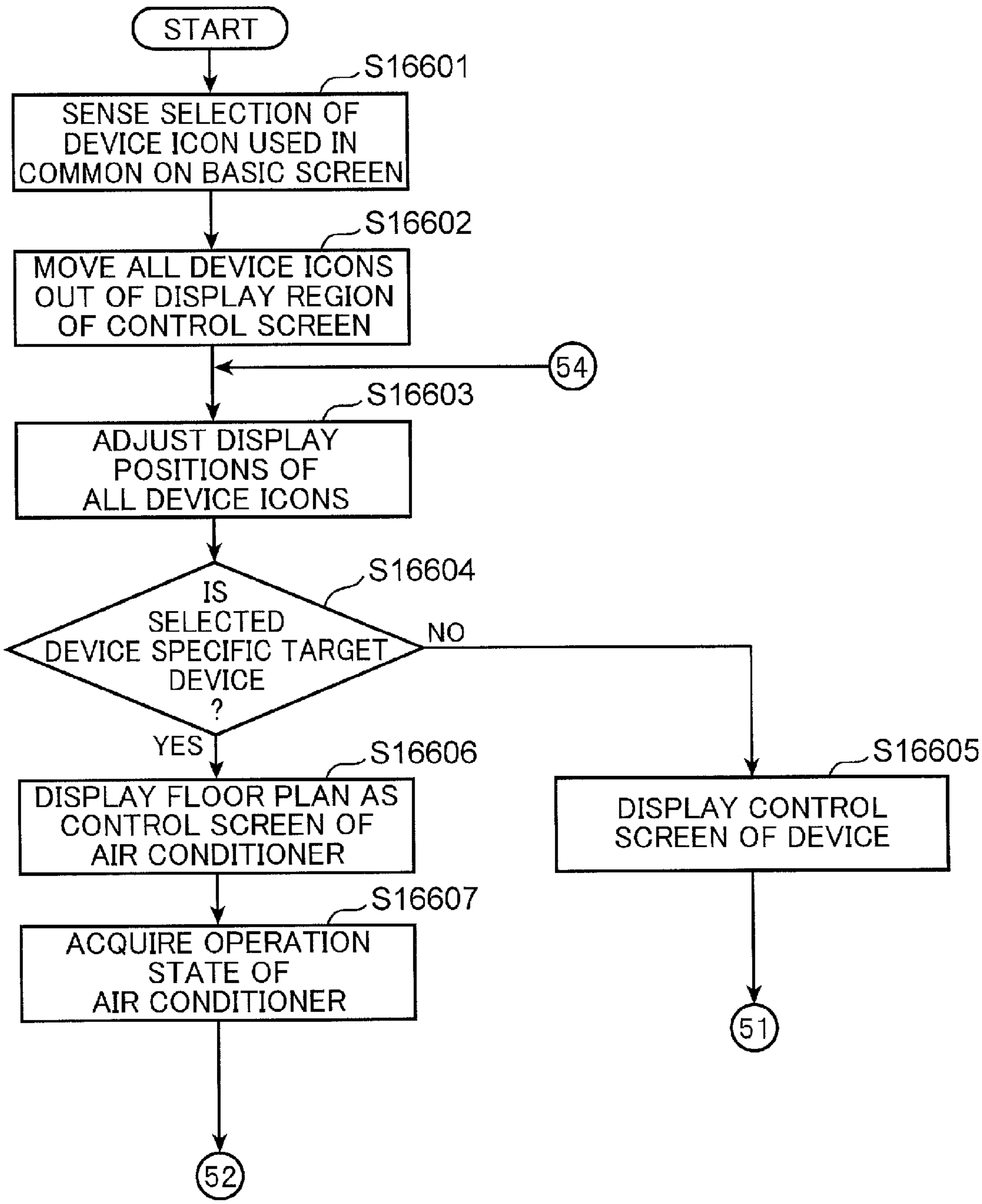

FIG. 166A is a flow chart showing an example of a flow of a process by which a home controller controls the air conditioner as an example of the specific target device when a device icon is used in common according to an embodiment of the present disclosure.

Figure 166B:
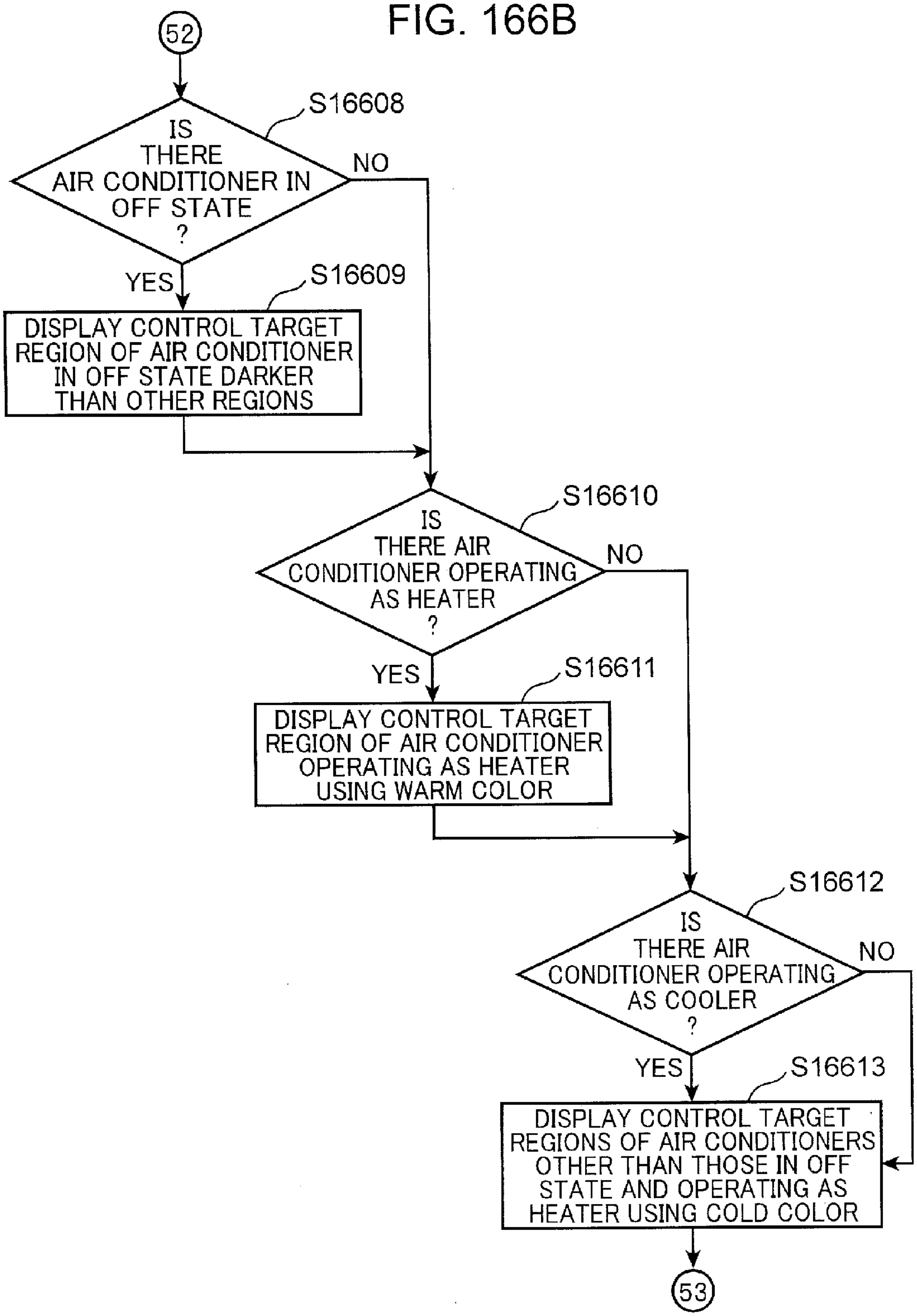

FIG. 166B is a flow chart showing an example of a flow of a process by which a home controller controls the air conditioner as an example of the specific target device when a device icon is used in common according to an embodiment of the present disclosure.

Figure 166C:
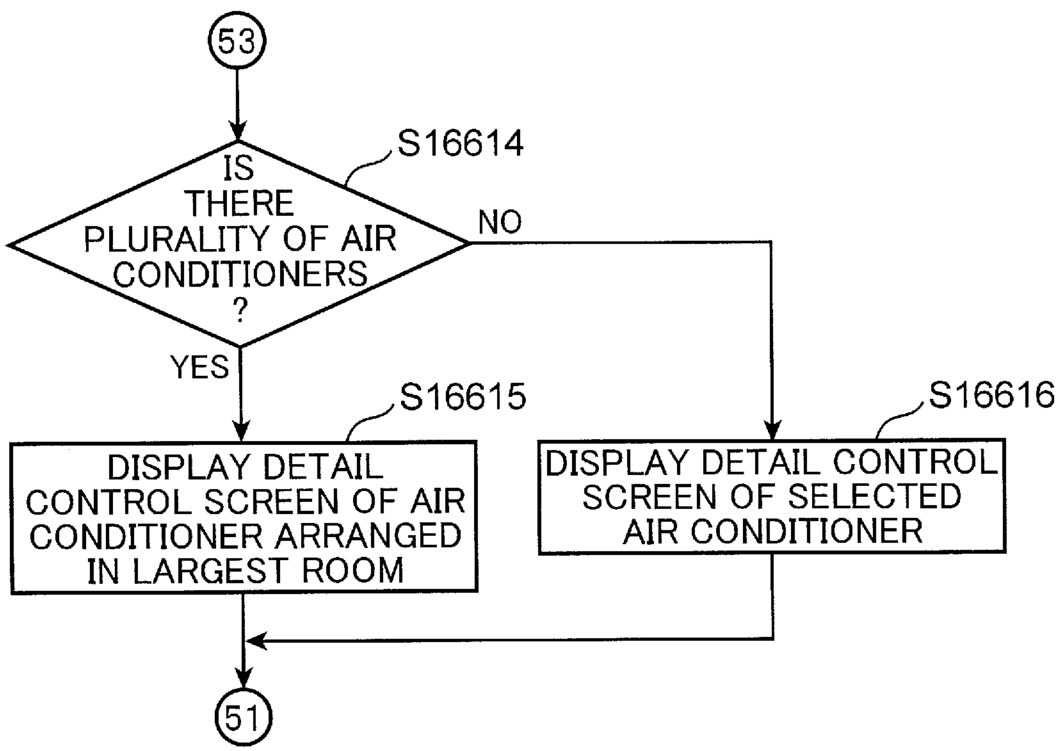

FIG. 166C is a flow chart showing an example of a flow of a process by which a home controller controls the air conditioner as an example of the specific target device when a device icon is used in common according to an embodiment of the present disclosure.

Figure 166D:
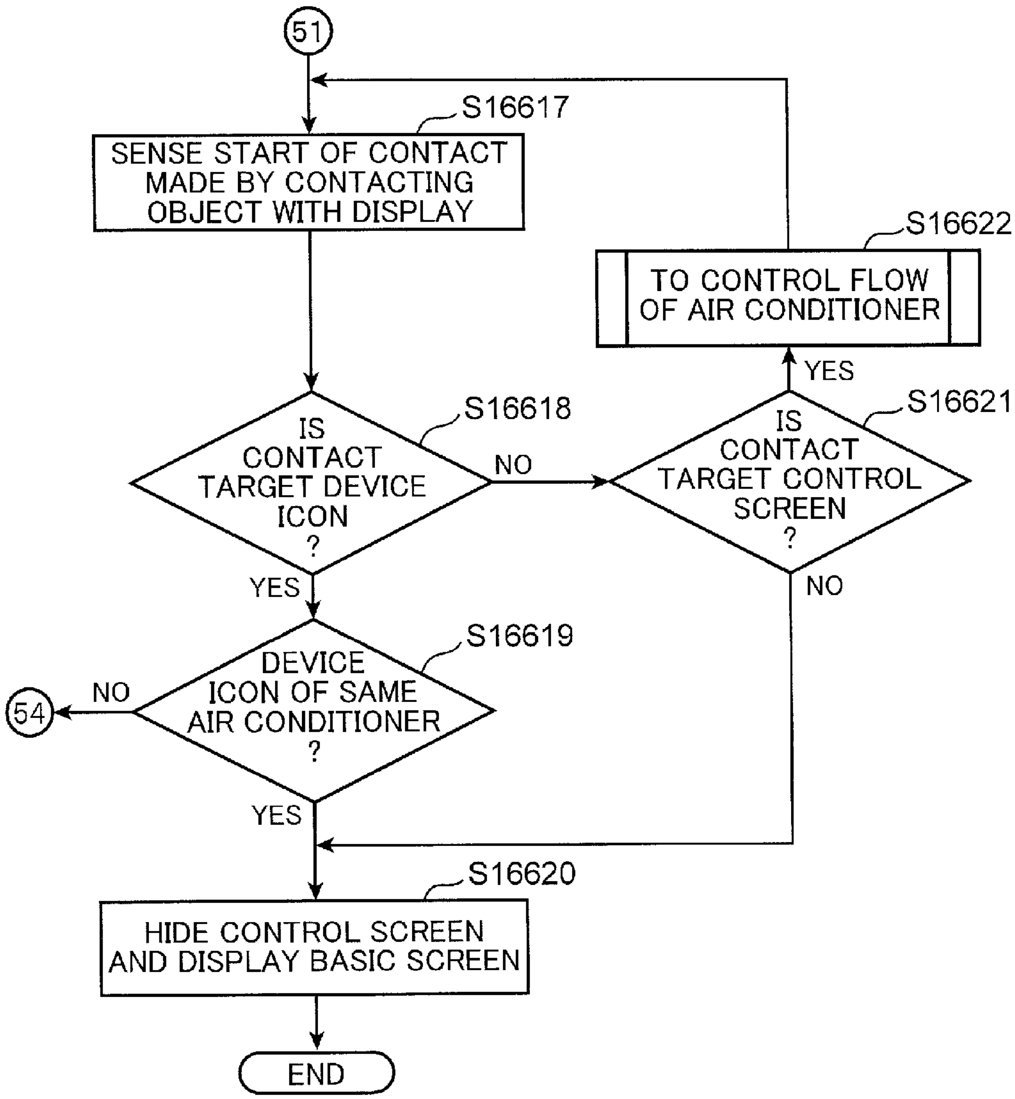

FIG. 166D is a flow chart showing an example of a flow of a process by which a home controller controls the air conditioner as an example of the specific target device when a device icon is used in common according to an embodiment of the present disclosure.

Figure 167:
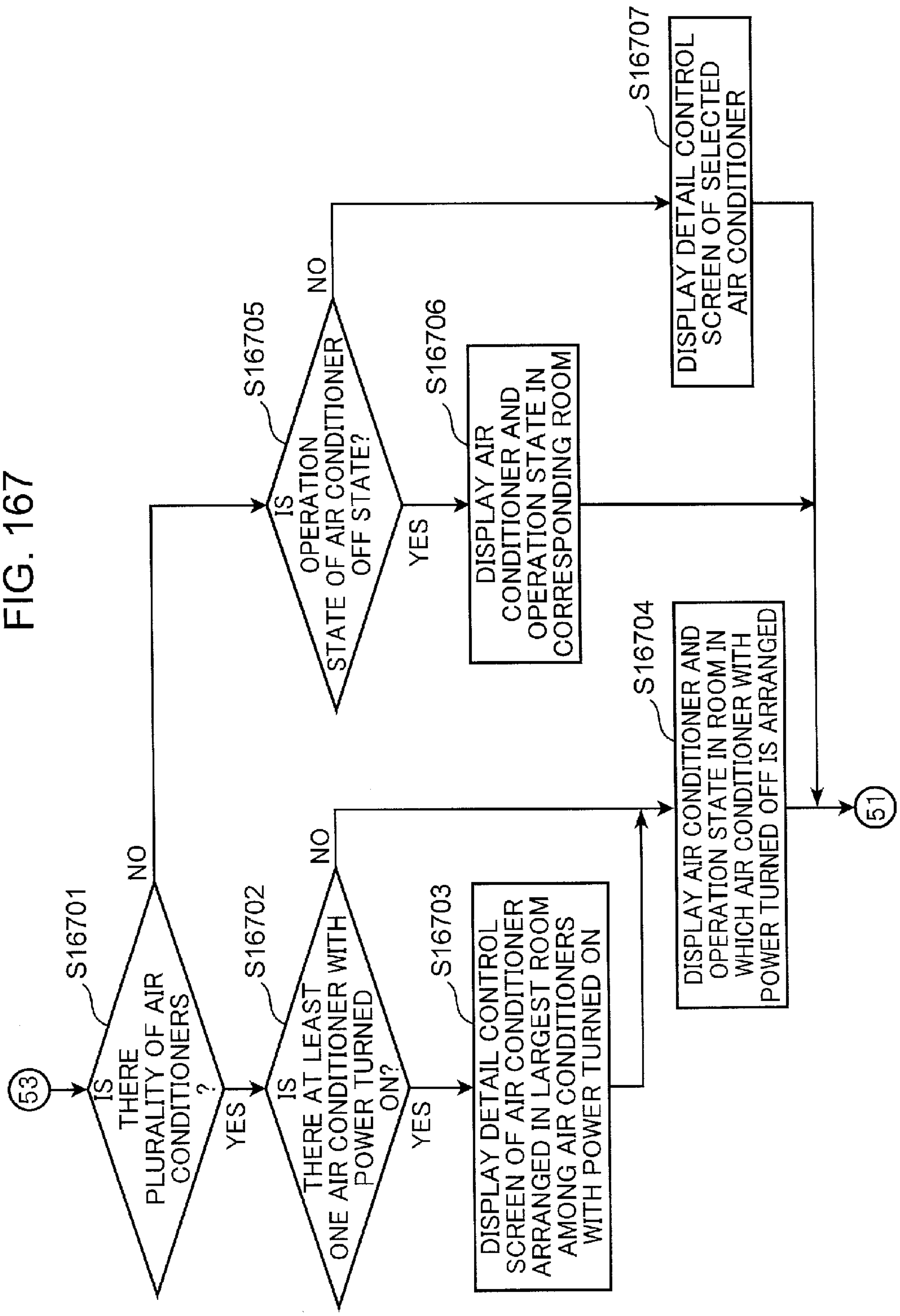

FIG. 167 is a flow chart showing another example of a flow of a process by which a home controller controls the air conditioner as an example of the specific target device when a device icon is used in common according to an embodiment of the present disclosure.

Figure 168:
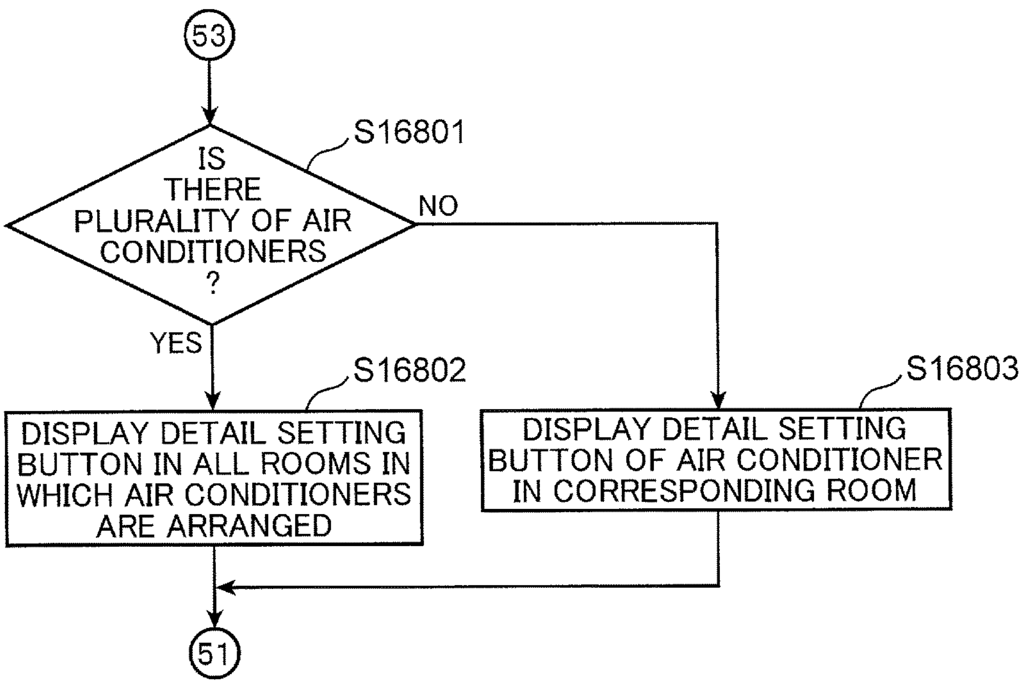

FIG. 168 is a flow chart showing yet another example of a flow of a process by which a home controller controls the air conditioner as an example of the specific target device when a device icon is used in common according to an embodiment of the present disclosure.

Figure 169:
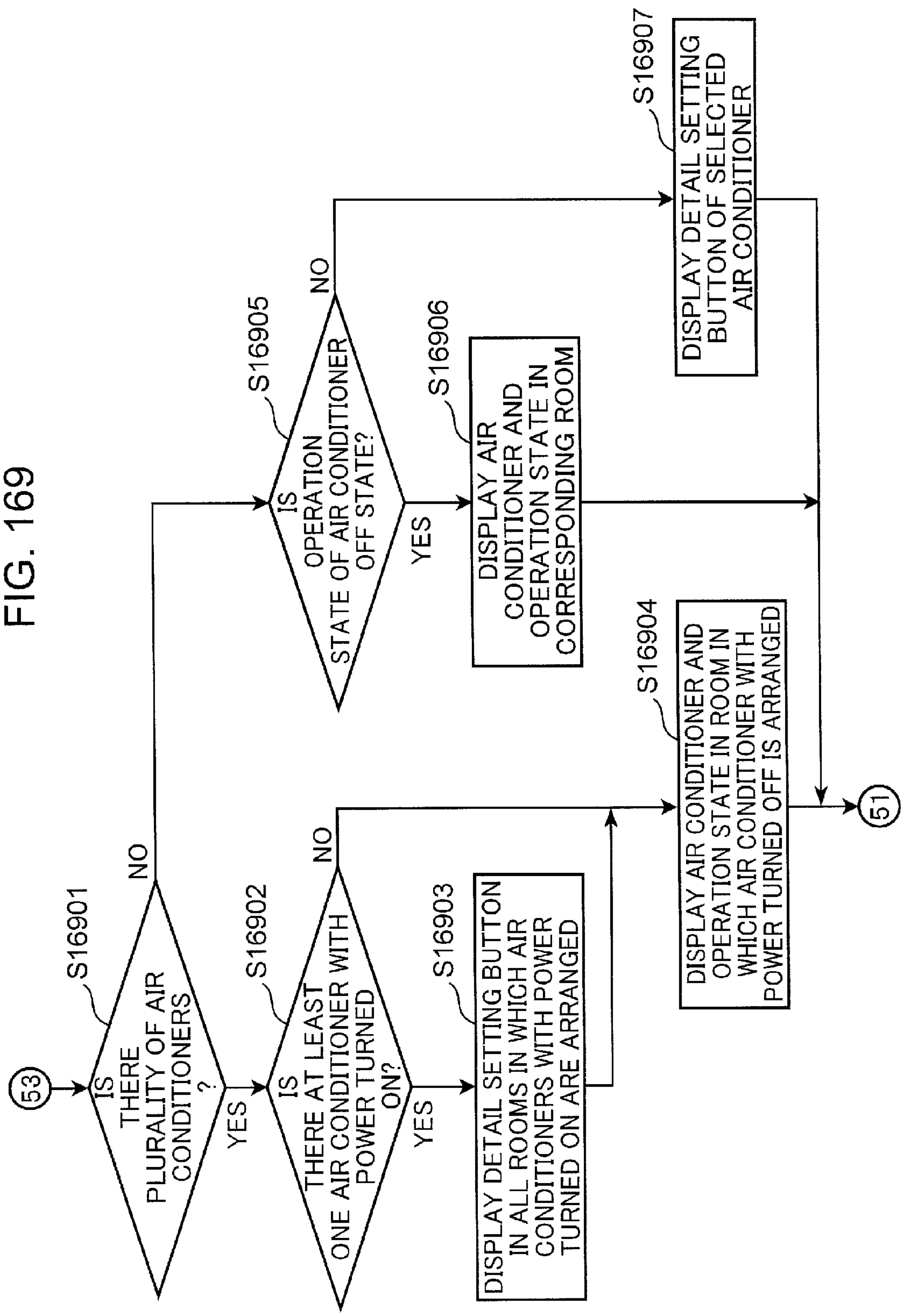

FIG. 169 is a flow chart showing yet another example of a flow of a process by which a home controller controls the air conditioner as an example of the specific target device when a device icon is used in common according to an embodiment of the present disclosure.

DETAILED DESCRIPTION (Story Before Inventing Aspect According to Present Disclosure)

First, the point of view of an aspect according to the present disclosure will be described.

In Patent Document 1 described above, icons for one or more target devices are displayed on the right side of a monitor screen, and a floor plan is displayed on the left side of the monitor screen. That is, the icons for the one or more target devices and the floor plan are displayed separately from each other, and the icons for the one or more target devices are not movable. Therefore, the location of installation of a target device desired to be operated in the floor plan is designated by moving a pointer. Then, an operation screen is displayed.

In Patent Document 1 described above, because of the configuration described above, the number of operation steps to be taken to operate a desired target device is large, from (i) to (iv) described above. Therefore, when one or more target devices are remotely monitored or remotely controlled using one remote controller, the operation steps (i) to (iv) described above are required to operate each target device, which complicates operation. This requires a larger number of process steps to be taken by an information terminal before a desired target device among the one or more target devices is operated simply because remote controllers for the one or more target devices are integrated into one, which requires a larger number of process operations to be performed by a user.

Patent Document 2 described above describes only displaying the state of each target device, and does not describe at all remotely controlling operation of each target device. Therefore, although the one or more target devices can be remotely monitored using one remote controller, the one or more target devices cannot be controlled.

In Patent Document 3 described above, open/close operation and the state of an electric building material (such as a hallway door or a skylight) are remotely controlled and remotely monitored using a personal computer. Also in Patent Document 3 described above, however, an operation is performed with an operation screen displayed. Thus, the number of steps to be taken to operate a desired target device is accordingly increased. Therefore, in remotely monitoring or remotely controlling one or more target devices using one remote controller, a larger number of process steps are required to be taken by an information terminal before the desired target device is operated, compared to a case where individual remote controllers are used for the one or more target devices, because remote controllers for the one or more target devices are integrated into one, which requires a larger number of process operations to be performed by a user.

In Patent Document 4 described above, as in Patent Document 3 described above, an operation screen for operating and confirming the state of an illumination device is separately provided (FIG. 8B). Thus, the number of steps to be taken to operate a desired target device is increased because of operations for causing the operation screen to display and performing an operation on the operation screen. Therefore, in remotely monitoring or remotely controlling one or more target devices using one remote controller, a larger number of process steps are required to be taken by an information terminal before the desired target device is operated, compared to a case where individual remote controllers are used for the one or more target devices, because remote controllers for the one or more target devices are integrated into one, which requires a larger number of process operations to be performed by a user.

Based on the considerations described above, the inventors have conceived various aspects of the present disclosure to be described below.

An aspect of the present disclosure is a method for controlling an information apparatus, the information apparatus having a display and being connected to a network, one or more target devices being controlled over the network, the method causing a computer of the information apparatus to:

display on the display, a display screen representing a floor plan of one floor including at least two or more rooms;

display each device icon representing each of the one or more target devices in a region of each room included in the floor plan represented by the display screen, each device icon being initially displayed within the region of each room included in the floor plan, the one or more target devices including a specific target device that stores a set content when power has been previously turned off; and when selection of the device icon that represents the specific target device among the one or more target devices is sensed in any region of the at least two or more rooms included in the floor plan, and selection of any region in the room, in which the selection of the device icon has been sensed, is sensed, output to the network an on-off control command for controlling an on-off state of power of the specific target device corresponding to the room in which the selection of the device icon has been sensed.

In this case, when selection of a device icon representing a specific target device among the one or more target devices is sensed and selection of any region corresponding to a given room in the floor plan is sensed, an on-off control command for controlling an on-off state of power of the specific target device provided in a region corresponding to the given room is output to the network. In this case, the specific target device refers to a specific target device that stores a set content when power has been previously turned off. Examples of the specific target device include an air conditioner which, when turned on, operates according to a set content (for example, a set temperature, an operation mode, or an air flow amount) set at the time power has been previously turned off and a television receiver which, when turned on, operates according to a set content (for example, a channel or a volume) set at the time power has been previously turned off.

In other words, as an operation screen for performing operations involving turning on or off the specific target device provided in a region corresponding to the given room, the floor plan is used instead of providing a separate operation screen. Therefore, selection of a device icon representing the specific target device among the one or more target devices in any region of the at least two or more rooms included in the floor plan is sensed, and selection of any region in a room, in which the selection of the device icon has been sensed, is sensed. This operation alone enables on-off states of the specific target device corresponding to a room in which selection of the device icon has been sensed to be controlled without displaying an operation screen for operating the on-off states of the specific target device.

Therefore, one or more steps that are performed until the operation screen is displayed separately from the floor plan as required in Patent Literature 1, Patent Literature 3, and Patent Literature 4 can be eliminated and the number of process steps in the information apparatus or the number of operations performed by the user can be reduced. As a result, both the number of process steps in the information apparatus and the number of operations performed by the user when remote controllers of one or more target devices are consolidated into one can be reduced and the period of time until a user operates a desired specific target device can be reduced.

In addition, as described above, the floor plan itself is used as an operation screen to operate on-off states of the specific target device provided in a region corresponding to the given room. Therefore, instead of simply using the display of a floor plan to display an operation state of the specific target device as is the case of Patent Literature 2, the display of a floor plan can also be utilized to remotely control the specific target device.

Furthermore, the inside of a region of each room that is included in the floor plan is set as an initial position of display of the device icon. Therefore, it is easy to recognize which target device in which room the device icon corresponds to. Furthermore, due to sensing of selection of a device icon representing the specific target device in any region of at least two or more rooms included in the floor plan, the specific target device included in the room in which the device icon has been selected is recognized as a control target. Subsequently, due to sensing of selection of any region in a room in which the selection of the device icon has been sensed, an on-off state of power of the specific target device corresponding to the room is controlled. Therefore, the on-off state of power of the specific target device corresponding to the room can be readily controlled by a simple operation of selecting any region in a room that is a control target.

In addition, in the aspect described above, for example, in a case where two or more specific target devices are installed in at least one room among the at least two or more rooms included in the floor plan, when one selection of the device icon representing the specific target device is sensed in any region in the room in which two or more specific target devices are installed, and selection of any region in the room, in which the selection of the device icon has been sensed, is sensed, a control command may be output to the network as the on-off control command, the control command controlling an on-off state of power of the two or more specific target devices corresponding to the room in which the selection of the device icon has been sensed.

For example, in a case of a large room, there may be two or more specific target devices installed in the room. In this case, for example, an on-off state of power of the two or more specific target devices may be controlled upon sensing of selection of the device icon in any region in the room in which two or more specific target devices are installed. Accordingly, the specific target device can be controlled on a per room basis instead of a per device basis. Therefore, collective processing can be realized. Furthermore, the number of device icons to be displayed on the display screen with a limited display region can be reduced.

In addition, in the aspect described above, for example, in a case where two or more specific target devices are installed in at least one room among the at least two or more rooms included in the floor plan, when one selection of the device icon representing the specific target device is sensed in any region in the room in which two or more specific target devices are installed, and selection of any region in the room, in which the selection of the device icon has been sensed, is sensed, each control command may be output in a unit of each of the two or more specific target devices to the network as the on-off control command, each control command controlling an on-off state of power of each of the two or more specific target devices corresponding to the room in which the selection of the device icon has been sensed.

Even in this case, the specific target device can be controlled on a per room basis instead of a per device basis. Therefore, collective processing can be realized. Furthermore, the number of device icons to be displayed on the display screen with a limited display region can be reduced.

Furthermore, in the aspect described above, for example, when the selection of the device icon representing the specific target device is sensed, each device icon representing each of the one or more target devices may be moved outside of a region corresponding to the room in which the selection of the device icon representing the specific target device has been sensed.

In this case, a device icon representing each of the one or more target devices is no longer displayed in a region corresponding to the room in which selection of the device icon representing the specific target device has been sensed.

Therefore, a region corresponding to a room that is a control target can be prevented from being hidden by the device icon and a misoperation by the user can be prevented. Accordingly, any region in a room in which selection of the device icon representing the specific target device has been sensed can be freely selected without being obstructed by the presence of display of a device icon representing each of the one or more target devices. As a result, even in a case where remote controllers of one or more target devices are consolidated into one, the presence of a device icon for controlling another target device can be prevented from obstructing control of on-off state of the specific target device.

In addition, in the aspect described above, for example, when the selection of the device icon representing the specific target device is sensed, each device icon representing each of the one or more target devices may be moved outside of the floor plan represented in the display screen.

In this case, a device icon representing each of the one or more target devices is no longer displayed at least in a region corresponding to the room in which selection of the device icon representing the specific target device has been sensed. Therefore, a region corresponding to the room that is a control target is freed. Accordingly, any region in a room in which selection of a device icon representing the specific target device has been sensed can be freely selected without being obstructed by the presence of display of a device icon representing each of the one or more target devices. As a result, even in a case where remote controllers of one or more target devices are consolidated into one, the presence of a device icon for controlling another target device can be prevented from obstructing control of on-off state of the specific target device.

Furthermore, due to display control which causes a device icon representing each of the one or more target devices to be moved out, display resources that are already being displayed is effectively utilized without displaying another display screen, and it is possible to show that a display screen representing the floor plan is in an operable state.

In addition, in the aspect described above, for example, when the power of the specific target device is turned on, a region on the display screen corresponding to the room, in which the selection of the device icon representing the specific target device has been sensed, may be displayed with brightness not lower than specified brightness.

Furthermore, in the aspect described above, for example, when the power of the specific target device is turned off, the region on the display screen corresponding to the room, in which the selection of the device icon representing the specific target device has been sensed, may be displayed with brightness lower than the specified brightness.

In these cases, the floor plan itself doubles as a screen for displaying an operation state of an on-off of the specific target device. Therefore, a separate display screen is not used as a screen for displaying an operation state of an on-off of the specific target device. Accordingly, one or more steps that are performed until a screen for state display is displayed separately from the floor plan as required in Patent Literature 1 and Patent Literature 3 can be eliminated and the number of process steps in the information apparatus or the number of operations performed by the user can be reduced.

In addition, a region corresponding to a room in which the selection has been sensed on the display screen is displayed brightly and/or darkly. Therefore, the floor plan that is already being displayed can be used to notify in which room the specific target device that is the control target is arranged. As a result, when the device icon is used in common by a plurality of rooms, a misoperation in which the user operates a specific target device of a different room by mistake can be prevented.

In addition, the floor plan itself is used not only to operate on-off states of a specific target device corresponding to the room in which the selection has been sensed but also to display an operation state of an on-off of the specific target device. Therefore, a same region that is already displayed can be used to confirm an operation state of an on-off of the specific target device in addition to remotely operating the specific target device. As a result, both a remote operation screen for the specific target device and a confirmation screen of an operation state of an on-off of the specific target device can be provided by effectively utilizing display resources.

Furthermore, in the aspect described above, for example, when the power of the specific target device is turned on, display stating that the power of the specific target device is turned on may be provided in the region on the display screen corresponding to the room in which the selection of the device icon representing the specific target device has been sensed.

In addition, in the aspect described above, for example, when the power of the specific target device is turned off, display stating that the power of the specific target device is turned off may be provided in the region on the display screen corresponding to the room in which the selection of the device icon representing the specific target device has been sensed.

In these cases, the floor plan itself is utilized as a screen for displaying an operation state of an on-off of the specific target device. Therefore, a separate display screen is not used as a screen for displaying that a specific target device installed in a given room is in either an on state or an off state. Accordingly, one or more steps that are performed until a screen for state display is displayed separately from the floor plan as required in Patent Literature 1 and Patent Literature 3 can be eliminated and the number of process steps in the information apparatus or the number of operations performed by the user can be reduced.

Furthermore, display stating that the power of the specific target device has been turned on or off is provided in a region corresponding to a room in which the selection has been sensed on the display screen. Therefore, the floor plan that is already being displayed can be used to notify in which room the specific target device that is the control target is arranged. As a result, when the device icon is used in common by a plurality of rooms, a misoperation in which the user operates a specific target device of a different room by mistake can be prevented.

In addition, the floor plan itself is used not only to operate on-off state of a specific target device corresponding to the room in which the selection has been sensed but also to display an operation state of an on-off of the specific target device. Therefore, a same region that is already displayed can be used to confirm an operation state of an on-off of the specific target device in addition to remotely operating the specific target device. As a result, both a remote operation screen for the specific target device and a confirmation screen of an on-off operation of the specific target device can be provided by effectively utilizing display resources.

In the aspect described above, for example, when the selection of the device icon representing the specific target device is sensed, an operation screen for the specific target device corresponding to the room, in which the selection of the device icon has been sensed, may be displayed on the display screen.

In this case, an operation involving selecting a device icon representing the specific target device does not simply signify a pre-procedure for controlling an on-off state of power of the specific target device corresponding to a room in which the selection of the device icon has been sensed. An operation involving selecting a device icon representing the specific target device also doubles as an operation for causing an operation screen for the specific target device corresponding to a room in which the selection of the device icon has been sensed to be displayed on the display screen.

Therefore, the operation screen is displayed even if an operation for displaying an operation screen for the specific target device is not separately performed. Accordingly, for operations other then turning the specific target device on or off, the specific target device can be operated based on the operation screen if so required.

As a result, an on-off state of power of the specific target device can be operated in a simple manner using a display screen representing the floor plan. In addition, other operations of the specific target device can be performed based on the operation screen without having to request the user to perform a separate operation for causing the operation screen to be displayed.

In addition, in the present aspect, an operation screen for the specific target device is displayed on the display screen regardless of whether the specific target device corresponding to a room in which selection of the device icon has been sensed is in an on state or an off state. Therefore, an operation of the specific target device by the operation screen is enabled regardless of whether the specific target device is in an on state or an off state.

In the aspect described above, for example, when the specific target device is switched to an off state by sensing the selection of any region in the room in which the selection of the device icon has been sensed, in a case where the operation screen for the specific target device corresponding to the room, in which the selection of the device icon has been sensed, is displayed on the display screen, the operation screen may be continued to be displayed.

In this case, even if power of the specific target device is turned off, the operation screen remains displayed on the display screen. Therefore, a state exists where a set content at the time power had previously been turned off is displayed. This makes it easier to confirm the set content at the time power had previously been turned off when power is once again turned on and the specific target device is operated.

In the aspect described above, for example, when the selection of the device icon representing the specific target device is sensed and the specific target device corresponding to the room, in which the selection of the device icon has been sensed, is in an on state, an operation screen for the specific target device corresponding to the room, in which the selection of the device icon has been sensed, may be displayed on the display screen.

In this case, an operation involving selecting a device icon representing the specific target device does not simply signify a pre-procedure for controlling an on-off state of power of the specific target device corresponding to a room in which the selection of the device icon has been sensed. An operation involving selecting a device icon representing the specific target device also doubles as an operation for causing an operation screen for the specific target device corresponding to a room in which the selection of the device icon has been sensed to be displayed on the display screen.

Therefore, since an operation screen for the specific target device is displayed even if an operation for causing the operation screen to be displayed is not separately performed, operations other than those involving turning on-off the specific target device can be performed based on the operation screen when necessary.

As a result, an on-off state of power of the specific target device can be operated in a simple manner using the display screen representing the floor plan and, at the same time, other operations of the specific target device can be performed based on the operation screen without having to request the user to perform a separate operation for displaying the operation screen.

In addition, in the present aspect, an operation screen for the specific target device is displayed on the display screen when the specific target device corresponding to a room in which selection of the device icon has been sensed is in an on state. In other words, even if a device icon representing the specific target device is selected, when the specific target device corresponding to a room in which the selection of the device icon has been sensed is in an off state, an operation screen for the specific target device is not displayed on the display screen.

When the specific target device is in an off state, even if an operation screen for the specific target device is displayed, the specific target device cannot be operated by an operation based on the operation screen unless the specific target device is switched to an on state. In consideration thereof, in the present aspect, an operation screen for the specific target device is displayed on the display screen when the specific target device corresponding to a room in which selection of the device icon has been sensed is in an on state. Accordingly, when the specific target device is operated by an operation based on the operation screen, an operation screen for the specific target device is displayed on the display screen.

The operation screen for the specific target device occupies a large display area on the display screen. However, in the present aspect, when the specific target device is in an on state due to an operation based on the operation screen, an operation screen for the specific target device is displayed on the display screen. Accordingly, a limited display region of the display screen can be efficiently utilized.

In the aspect described above, for example, when the specific target device is switched to an off state by sensing the selection of any region in the room in which the selection of the device icon has been sensed, in a case where the operation screen for the specific target device corresponding to the room, in which the selection of the device icon has been sensed, is displayed on the display screen, the displayed operation screen may be erased from the display screen.

When the specific target device is in an off state, even if an operation screen for the specific target device is displayed, the specific target device cannot be operated by an operation based on the operation screen. In consideration thereof, in the present aspect, when the specific target device is switched to an off state, the displayed operation screen is erased from the display screen. The operation screen for the specific target device occupies a large display area on the display screen. However, in the present aspect, when the specific target device is switched to an off state, the display of the operation screen for the specific target device is erased from the display screen. Accordingly, a limited display region of the display screen can be efficiently utilized.

In addition, when power of the specific target device is turned off, the displayed operation screen is also erased from the display screen. Therefore, the user is not requested to perform a separate operation in order to erase the display of the operation screen. Therefore, the number of operations for erasing the display of the operation screen can be reduced. Furthermore, when the power of the specific target device is turned off, the operation screen generally becomes unnecessary. Therefore, by erasing the display of the operation screen in conjunction with the power of the specific target device being turned off, an operation load required to erase the operation screen can be reduced in addition to turning off the power.

In the aspect described above, for example, when the displayed operation screen is erased from the display screen, status information regarding the specific target device may be displayed on the display screen.

For example, when the displayed operation screen is erased from the display screen, in the room on the display screen in which the selection of the device icon has been sensed, there is no longer display regarding the specific target device corresponding to the room. In consideration thereof, in the present aspect, for example, status information regarding the specific target device is displayed on the display screen. Accordingly, the user can determine whether an operation screen for the specific target device is hidden because the specific target device is in an off state or a state exists to begin with where the device icon is not selected. Therefore, a misoperation by the user can be prevented. In addition, a misunderstanding by the user that an operation screen for the specific target device has been erased due to a malfunction can be avoided.

In the aspect described above, for example, when the selection of the device icon representing the specific target device is sensed, a display button may be displayed on the display screen, the display button causing an operation screen for the specific target device to be displayed on the display screen, the specific target device corresponding to the room in which the selection of the device icon has been sensed.

In this case, an operation involving selecting a device icon representing the specific target device does not simply signify a pre-procedure for controlling an on-off state of power of the specific target device corresponding to a room in which the selection of the device icon has been sensed. An operation involving selecting a device icon representing the specific target device also doubles as an operation for causing a display button that causes to be displayed an operation screen for the specific target device corresponding to a room in which the selection of the device icon has been sensed to be displayed on the display screen.

Therefore, for operations other than those involving turning the specific target device on-off, an operation screen for the specific target device is displayed by selecting the display button when necessary. For example, there may be cases where the user only desires to perform an operation for turning on-off the power of the specific target device. On the other hand, a display area of the operation screen is relatively large. Therefore, uniformly displaying the operation screen may sometimes obstruct a next operation using a display screen representing the floor plan due to the operation screen being displayed. According to the present aspect, the operation screen is displayed by selecting the display button when necessary. Therefore, when an operation using the operation screen is unnecessary, the operation screen can be hidden.

As a result, the operation screen is no longer uniformly displayed. Therefore, when the operation screen is not displayed, a next operation using a display screen representing the floor plan can be performed without having to perform an operation for erasing the displayed operation screen.

In addition, in the present aspect, a display button for displaying an operation screen for the specific target device is displayed on the display screen regardless of whether the specific target device corresponding to a room in which selection of the device icon has been sensed is in an on state or an off state. Therefore, an operation of the specific target device is enabled by selecting the display button and causing the operation screen to be displayed regardless of whether the specific target device is in an on state or an off state.

In the aspect described above, for example, when the selection of the device icon representing the specific target device is sensed and the specific target device corresponding to the room, in which the selection of the device icon has been sensed, is in an on state, a display button may be displayed on the display screen, the display button causing an operation screen for the specific target device to be displayed on the display screen, the specific target device corresponding to the room in which the selection of the device icon has been sensed.

In this case, an operation involving selecting a device icon representing the specific target device does not simply signify a pre-procedure for controlling an on-off state of power of the specific target device corresponding to a room in which the selection of the device icon has been sensed. An operation involving selecting a device icon representing the specific target device also doubles as an operation for causing a display button that causes to be displayed an operation screen for the specific target device corresponding to a room in which the selection of the device icon has been sensed to be displayed on the display screen.

Therefore, for operations other than those involving turning the specific target device on-off, an operation screen for the specific target device is displayed by selecting the display button when necessary. For example, there may be cases where the user only desires to perform an operation for turning on-off the power of the specific target device. On the other hand, a display area of the operation screen is relatively large. Therefore, uniformly displaying the operation screen may sometimes obstruct a next operation using a display screen representing the floor plan due to the operation screen being displayed. According to the present aspect, the operation screen is displayed by selecting the display button when necessary. Therefore, when an operation using the operation screen is unnecessary, the operation screen can be hidden.

As a result, the operation screen is no longer uniformly displayed. Therefore, when the operation screen is not displayed, a next operation using a display screen representing the floor plan can be performed without having to perform an operation for erasing display of the operation screen.

In addition, in the present aspect, a display button for displaying an operation screen for the specific target device is displayed on the display screen when the specific target device corresponding to a room in which selection of the device icon has been sensed is in an on state. In other words, even if a device icon representing the specific target device is selected, when the specific target device corresponding to a room in which the selection of the device icon has been sensed is in an off state, the display button corresponding to the specific target device is not displayed on the display screen.

Therefore, when the specific target device is in an on state, the user can proceed to a next operation by displaying the operation screen based on the display button. On the other hand, when the specific target device is in an off state, unless the specific target device corresponding to a room in which selection of the device icon has been sensed is switched to an on state, the display button is not displayed and the user cannot proceed to a next operation by displaying the operation screen based on the display button. For example, when a display area of a room in which selection of the device icon has been sensed on the display screen is small, by hiding the display button in a region corresponding to the room, a display area of the region corresponding to the room can be prevented from being occupied by display of the display button.

Furthermore, in the aspect described above, for example, the display button may be displayed within any region of the room in which the selection of the device icon has been sensed.

In this case, the display button is displayed within any region of the room in which selection of the device icon has been sensed. Therefore, the user can be prevented from mistakenly recognizing a correspondence between the display button and a display button of a specific target device corresponding to a room. As a result, a misoperation where an operation screen for a specific target device corresponding to another room is displayed by mistake can be prevented.

In addition, in the aspect described above, for example, when selection of the display button is sensed, the operation screen for the specific target device may be displayed.

Furthermore, in the aspect described above, for example, when the selection of any region in the room, in which the selection of the device icon has been sensed, is sensed in a case where the power of the specific target device corresponding to the room, in which the selection of the device icon has been sensed, is turned on, a control command may be output as the on-off control command and the displayed operation screen may be erased from the display screen, the control command being used for turning the power of the specific target device off.

In this case, when power of the specific target device is turned off, the displayed operation screen is also erased from the display screen. Therefore, the user is not requested to perform a separate operation in order to erase the display of the operation screen. Accordingly, the number of operations for erasing the display of the operation screen can be reduced. Furthermore, when the power of the specific target device is turned off, the operation screen generally becomes unnecessary. Therefore, by erasing the display of the operation screen in conjunction with the power of the specific target device being turned off, an operation load required to erase the operation screen can be reduced in addition to turning off the power.

In addition, in the aspect described above, for example, when the selection of any region in the room, in which the selection of the device icon has been sensed, is sensed in a case where the power of the specific target device corresponding to the room, in which the selection of the device icon has been sensed, is turned on, the display button may be continued to be displayed on the display screen.

In this case, even if power of the specific target device is turned off, the display button remains displayed on the display screen. In other words, the display button has a small display area compared to the operation screen. Therefore, even if the display button remains displayed, a degree of the display button occupying the display screen is small. As a result, there is only a small possibility of the display button obstructing other operations when the display button remains displayed. In addition, when restarting the operation of the specific target device, the operation screen can be displayed once again by simply selecting the display button that has remained displayed. Accordingly, the number of operations by the user when restarting an operation can be reduced.

Furthermore, in the aspect described above, for example, when selection of the display button is sensed in a state where the display button is continued to be displayed on the display screen, the operation screen may be displayed.

In addition, in the aspect described above, for example, when the selection of any region in the room, in which the selection of the device icon has been sensed, is sensed, in a case where the power of the specific target device corresponding to the room, in which the selection of the device icon has been sensed, is turned on, the displayed display button may be erased from the display screen.

In this case, when power of the specific target device is turned off, the displayed display button is also erased from the display screen. Therefore, the user is not requested to perform a separate operation in order to erase the display of the display button. As a result, the number of operations for erasing the display of the display button can be reduced. Furthermore, when the power of the specific target device is turned off, an operation for displaying the operation screen using the display button generally becomes unnecessary. Therefore, by erasing the display of the display button in conjunction with the power of the specific target device being turned off, an operation load required to erase the display button can be reduced in addition to turning off the power.

In the aspect described above, for example, when the displayed display button is erased from the display screen, status information regarding the specific target device may be displayed on the display screen.

For example, when the displayed display button is erased from the display screen, in the room on the display screen in which the selection of the device icon has been sensed, there is no longer display regarding the specific target device corresponding to the room. In consideration thereof, in the present aspect, for example, status information regarding the specific target device is displayed on the display screen.

Accordingly, the user can determine whether the display button corresponding to the specific target device is hidden because the specific target device is in an off state or a state exists to begin with where the device icon is not selected. Therefore, a misoperation by the user can be prevented. In addition, a misunderstanding by the user that the display button corresponding to the specific target device has been erased due to a malfunction can be avoided.

Furthermore, in the aspect described above, for example, the display may comprise a touch panel display, and sensing of the selection of the device icon or sensing of the selection of any region in the room, in which the selection of the device icon has been sensed, may be performed by sensing a contact to the touch panel display.

In addition, in the aspect described above, for example, sensing of the selection of the device icon or sensing of the selection of any region in the room, in which the selection of the device icon has been sensed, may be performed by sensing a click of a mouse pointer.

Furthermore, in the aspect described above, for example, when selection of a device icon representing a target device other than the specific target device among the one or more target devices is sensed, a control screen may be displayed on the display screen representing the floor plan, the control screen being used either for operation or for state confirmation of the target device corresponding to the selected device icon.

In addition, in the aspect described above, for example, the specific target device may include an air conditioner.

Furthermore, in the aspect described above, for example, when the power of the air conditioner is turned on and the air conditioner is set to a heater mode when the power is turned on, a region on the display screen corresponding to the room, in which the selection of the device icon representing the air conditioner has been sensed, may be displayed using a warm color.

In addition, in the aspect described above, for example, when the power of the air conditioner is turned on and the air conditioner is set to a cooler mode when the power is turned on, a region on the display screen corresponding to the room, in which the selection of the device icon representing the air conditioner has been sensed, may be displayed using a cold color.

Furthermore, in the aspect described above, for example, when the power of the air conditioner is turned off, the region on the display screen corresponding to the room, in which the selection of the device icon representing the air conditioner has been sensed, may be displayed with brightness lower than specified brightness.

In these cases, the floor plan itself doubles as a screen for displaying a state of an on-off of the air conditioner and a screen for displaying an operation mode thereof. Therefore, separate display screens need not be respectively prepared as a screen for displaying a state of an on-off of the air conditioner and a screen for displaying an operation mode. Accordingly, one or more steps that are performed until a screen for state display is displayed separately from the floor plan as required in Patent Literature 1 and Patent Literature 3 can be eliminated and the number of process steps in the information apparatus or the number of operations performed by the user can be reduced.

In addition, a region on the display screen corresponding to a room in which the selection has been sensed is displayed using a warm color when the operation mode is set to heater or displayed using a cold color when the operation mode is set to cooler. Therefore, in addition to in which room the air conditioner has been switched to an on state, it can also be shown whether the air conditioner is operating as a heater or a cooler in the room. As a result, when the device icon is used in common by a plurality of rooms, a misoperation in which the user operates an air conditioner of a different room by mistake can be prevented. In addition, whether or not the air conditioner is operating in an operation mode intended by the user can be confirmed. Accordingly, a misoperation involving the setting of an operation mode can be prevented.

Furthermore, the floor plan itself is used not only to operate an on-off state of an air conditioner corresponding to the room in which the selection has been sensed but also to display an operation state of an on-off of the air conditioner. In addition, whether the air conditioner is operating as a heater or a cooler is shown. Therefore, a same region that is already displayed can be used to confirm an operation state of an on-off of the air conditioner as well as to confirm an operation mode in addition to remotely operating the air conditioner. As a result, a remote operation screen for the air conditioner, a confirmation screen of an operation state of an on-off of the air conditioner, and a confirmation screen of an operation mode of the air conditioner can be provided by effectively utilizing display resources.

In addition, in the aspect described above, for example, when the power of the air conditioner is turned on and the air conditioner is set to a heater mode when the power is turned on, display stating that the air conditioner operates as a heater may be provided in the region on the display screen corresponding to the room in which the selection of the device icon representing the air conditioner has been sensed.

Furthermore, in the aspect described above, for example, when the power of the air conditioner is turned on and the air conditioner is set to a cooler mode when the power is turned on, display stating that the air conditioner operates as a cooler may be provided in the region on the display screen corresponding to the room in which the selection of the device icon representing the air conditioner has been sensed.

In addition, in the aspect described above, for example, when the power of the air conditioner is turned off, display stating that the power of the air conditioner has been turned off may be provided in the region on the display screen corresponding to the room in which the selection of the device icon representing the air conditioner has been sensed.

Furthermore, in the aspect described above, for example, when the power of the air conditioner is turned on, a set content of the air conditioner when the power of the air conditioner is turned on may be acquired from the air conditioner.

In addition, in the aspect described above, for example, an information management system may be connected to the network and may manage log information regarding the air conditioner, and when the power of the air conditioner is turned on, a set content of the air conditioner when the power of the air conditioner is turned on may be acquired from the information management system.

Furthermore, in the aspect described above, for example, when the power of the air conditioner is turned on and the air conditioner has been set to a heater mode when the power of the air conditioner has been previously turned off, a region on the display screen corresponding to the room, in which the selection of the device icon representing the air conditioner has been sensed, may be displayed using a warm color.

In addition, in the aspect described above, for example, when the power of the air conditioner is turned on and the air conditioner has been set to a cooler mode when the power of the air conditioner has been previously turned off, a region on the display screen corresponding to the room, in which the selection of the device icon representing the air conditioner has been sensed, may be displayed using a cold color.

Furthermore, in the aspect described above, for example, when the power of the air conditioner is turned off, the region on the display screen corresponding to the room, in which the selection of the device icon representing the air conditioner has been sensed, may be displayed with brightness lower than specified brightness.

In these cases, the floor plan itself doubles as a screen for displaying a state of an on-off of the air conditioner and a screen for displaying an operation mode thereof. Therefore, separate display screens need not be respectively prepared as a screen for displaying a state of an on-off of the air conditioner and a screen for displaying an operation mode. Accordingly, one or more steps that are performed until a screen for state display is displayed separately from the floor plan as required in Patent Literature 1 and Patent Literature 3 can be eliminated and the number of process steps in the information apparatus or the number of operations performed by the user can be reduced.

In addition, a region on the display screen corresponding to a room in which the selection has been sensed is displayed using a warm color when the operation mode is set to heater or displayed using a cold color when the operation mode is set to cooler. Therefore, in addition to in which room the air conditioner has been switched to an on state, it can also be shown whether the air conditioner is operating as a heater or a cooler in the room. As a result, when the device icon is used in common by a plurality of rooms, a misoperation in which the user operates an air conditioner of a different room by mistake can be prevented. In addition, whether or not the air conditioner is operating in an operation mode intended by the user can be confirmed. Accordingly, a misoperation involving the setting of an operation mode can be prevented.

Furthermore, the floor plan itself is used not only to operate an on-off state of an air conditioner corresponding to the room in which the selection has been sensed but also to display an operation state of an on-off of the air conditioner. In addition, whether the air conditioner is operating as a heater or a cooler is shown. Therefore, a same region that is already displayed can be used to confirm an operation state of an on-off of the air conditioner as well as to confirm an operation mode in addition to remotely operating the air conditioner. As a result, a remote operation screen for the air conditioner, a confirmation screen of an operation state of an on-off of the air conditioner, and a confirmation screen of an operation mode of the air conditioner can be provided by effectively utilizing display resources.

In addition, in the aspect described above, for example, when the power of the air conditioner is turned on and the air conditioner has been set to a heater mode when the power of the air conditioner has been previously turned off, display stating that the air conditioner operates as a heater may be provided in the region on the display screen corresponding to the room in which the selection of the device icon representing the air conditioner has been sensed.

Furthermore, in the aspect described above, for example, when the power of the air conditioner is turned on and the air conditioner has been set to a cooler mode when the power of the air conditioner has been previously turned off, display stating that the air conditioner operates as a cooler may be provided in the region on the display screen corresponding to the room in which the selection of the device icon representing the air conditioner has been sensed.

In addition, in the aspect described above, for example, when the power of the air conditioner is turned off, display stating that the power of the air conditioner has been turned off may be provided in the region on the display screen corresponding to the room in which the selection of the device icon representing the air conditioner has been sensed.

Furthermore, in the aspect described above, for example, a set content of the air conditioner when the power of the air conditioner had previously been turned off may be stored in a memory of the information apparatus, and the stored set content of the air conditioner may be read out from the memory when the power of the air conditioner is turned on.

In addition, in the aspect described above, for example, the specific target device may include a television receiver.

Embodiment

An embodiment of the present disclosure will be described below with reference to the drawings. In the drawings, the same symbols are used for the same constituent elements.

In the embodiment, a home controller which can singly control one or more devices will be described.

(Overall Configuration)

Figure 1:
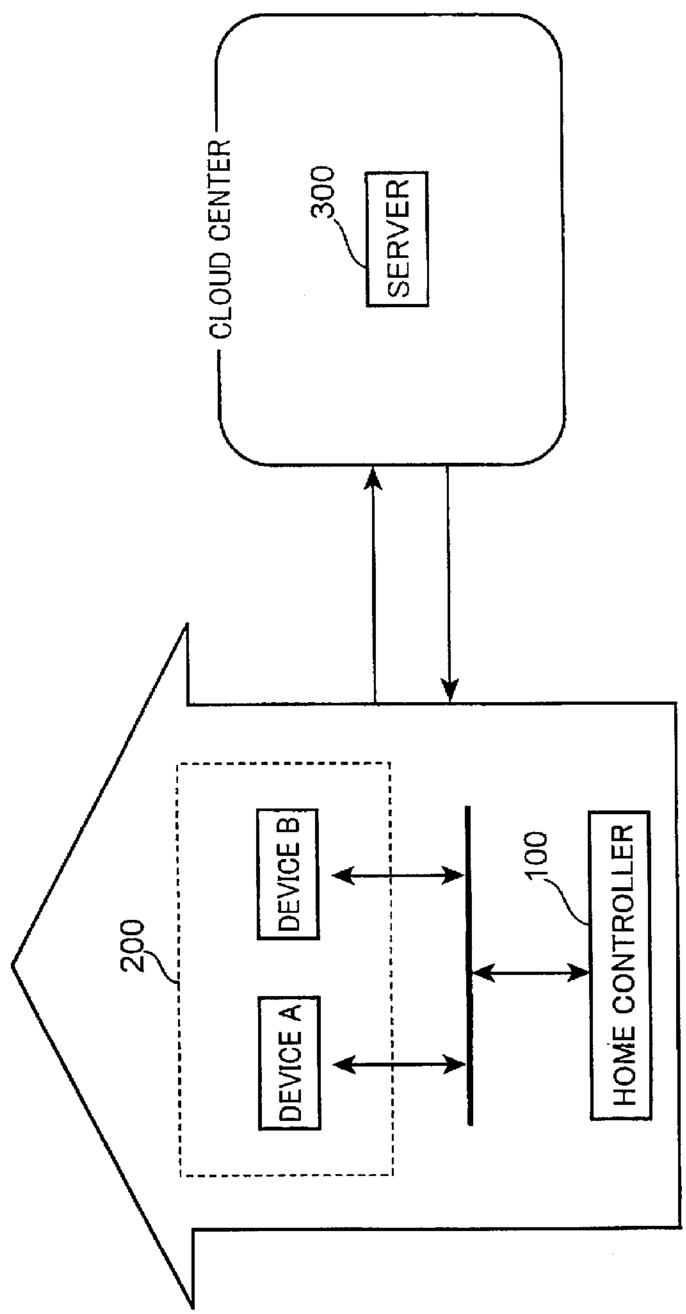
FIG. 1 is a diagram showing an overall configuration of a home control system to which a home controller according to an embodiment of the present disclosure is applied.

FIG. 1 is a diagram showing an overall configuration of a home control system to which a home controller according to the embodiment is applied. As shown in FIG. 1, the home control system includes a home controller 100, a device 200 (an example of a target device), and a server 300.

The home controller 100 and one or more devices 200 (for example, a device A 200 and a device B 200) are disposed in a house. The server 300 is disposed in a cloud center. The home controller 100, the device 200, and the server 300 communicate with each other via a wired or wireless network. For example, the device 200 and the home controller 100 are communicably connected to each other via a wireless or wired in-home network, and the home controller 100, the device 200, and the server 300 are communicably connected to each other via an external network such as the Internet.

The home controller 100 is not necessarily disposed in the house, and may be disposed outside the house. In this case, a user controls the one or more devices 200 from a location away from the home.

A portable information terminal such as a smartphone or a tablet terminal may be adopted as the home controller 100. It should be noted, however, that the smartphone and the tablet terminal are merely exemplary, and a portable information terminal of a button type such as a cellular phone may be adopted as the home controller 100.

Figure 2:
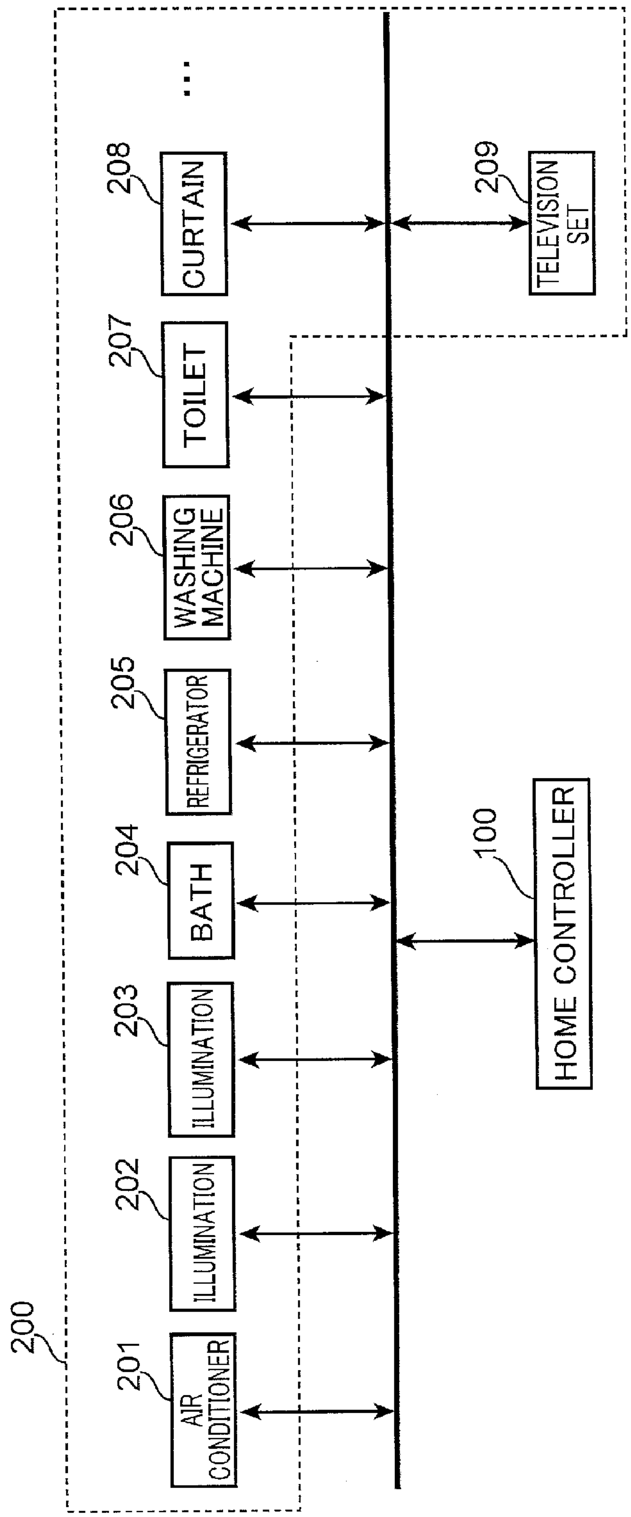
FIG. 2 is a diagram showing main devices to be controlled by the home controller according to the embodiment of the present disclosure.

FIG. 2 is a diagram showing the main devices 200 to be controlled by the home controller 100. The home controller 100 controls the devices 200 such as an air conditioner 201, illumination devices 202 and 203, a bath 204, a refrigerator 205, a washing machine 206, a toilet 207, an electric curtain apparatus 208, and a television receiver (hereinafter, referred to as a "television set") 209. Moreover, the devices 200 that are controlled by the home controller 100 may include a plurality of devices 200 of the same type such as the illumination device 202 and the illumination device 203. The air conditioner is an apparatus for adjusting temperature, humidity, cleanness, and the like of indoor air. Air conditioners may include a cooling apparatus, a heating apparatus, a heating/cooling apparatus, a humidifier, a dehumidifier, and an air purifier.

The devices 200 such as the air conditioner 201 shown in FIG. 2 are merely exemplary, and a television set, a Blu-ray recorder, an audio device, and so forth may be adopted as the devices 200. That is, any electrical device that functions to communicate with the home controller 100 may be adopted as the device 200. In FIG. 2, electrical devices for use in ordinary households are shown as the devices 200. However, the embodiment is not limited thereto, and office devices for use in offices or the like may be adopted as the devices 200. Examples of the office devices include a printer, a personal computer, a scanner, and a copy machine.

Figure 3:
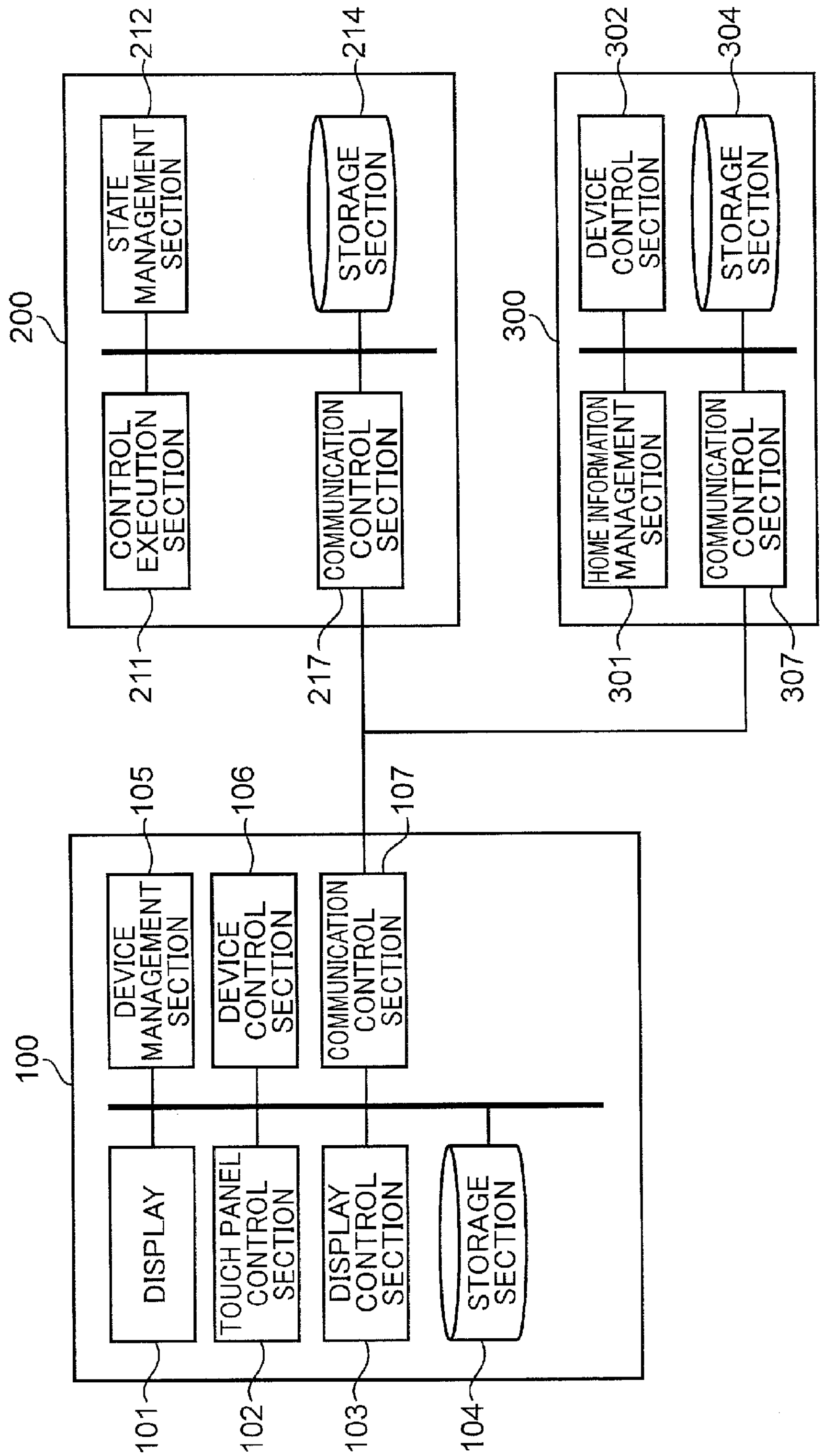
FIG. 3 is a block diagram showing the configuration of the home controller, a device, and a server according to the embodiment of the present disclosure.

FIG. 3 is a block diagram showing the configuration of the home controller 100, the device 200, and the server 300. As shown in FIG. 3, the home controller 100 includes a display 101, a touch panel control section 102, a display control section 103, a storage section 104, a device management section 105, a device control section 106, and a communication control section 107.

The display 101 is formed from a touch panel display, for example, and displays a user interface that allows the user to operate the home controller 100. The user can input various operations to the home controller 100 by contacting the display 101.

The touch panel control section 102 recognizes an operation performed on the display 101 by the user, interprets the content of the operation, and notifies the other constituent elements of the content of the operation. For example, if an object is displayed at a position on the display 101 tapped on by the user, the touch panel control section 102 determines that the object is selected by the user. A variety of GUI parts that receive a user operation such as buttons are adopted as the object.

The display control section 103 generates a GUI (Graphical User Interface) of the home controller 100, and causes the display 101 to display the GUI. The storage section 104 stores information that is necessary for operation of the home controller 100 such as a device list managed by the device management section 105.

The device management section 105 manages the control target devices 200 using the device list stored in the storage section 104. In addition, the device management section 105 detects a device 200 when the device 200 is connected to the in-home network. Further, the device management section 105 acquires home information 2700 to be discussed later from the server 300, stores the acquired home information 2700 in the storage section 104, and manages the home information 2700. The device control section 106 issues a control command for the devices 200. The communication control section 107 controls communication between the home controller 100 and the devices 200 and communication between the home controller 100 and the server 300. In addition, the communication control section 107 transmits a variety of data to the devices 200 or the server 300 upon receiving a request to transmit such data from other blocks, and receives data transmitted from the devices 200 or the server 300 to deliver the data to the relevant block.

The display 101 may be a normal display rather than a touch panel display. In this case, the user may use an external input device such as a mouse (not shown) to input an instruction to select an object by moving a pointer displayed on the display 101 and clicking on a desired object. That is, in the embodiment, a series of operations performed by the user by contacting the display 101 may be replaced with operations of moving a pointer and clicking using an external input device such as a mouse.

As shown in FIG. 3, the device 200 includes a control execution section 201, a state management section 202, a storage section 204, and a communication control section 207. The control execution section 201 receives a control command from the home controller 100 or the server 300, and controls the device 200 in accordance with the received control command. The content of control of the device 200 performed by the control execution section 201 differs in accordance with the type of the device 200. For example, if the device 200 is an illumination device, the control execution section 201 turns on and off the illumination device. In addition, the control execution section 201 transmits the result of execution of the control command and the state of the device 200 to the home controller 100 or the server 300.

The state management section 202 manages the state of the device 200. The content of management of the device 200 performed by the state management section 202 differs in accordance with the type of the device 200. For example, if the device 200 is an illumination device, the state management section 202 manages whether the illumination device is currently turned on or turned off. The storage section 204 stores information related to the state of the device 200 managed by the state management section 202. The communication control section 207 controls communication between the device 200 and the home controller 100 and communication between the device 200 and the server 300. In addition, the communication control section 207 transmits a variety of data to the home controller 100 or the server 300 upon receiving a request to transmit such data from other blocks, and receives data transmitted from the home controller 100 or the server 300 to deliver the data to the relevant block.

As shown in FIG. 3, the server 300 includes a home information management section 301, a device control section 302, a storage section 304, and a communication control section 307. The home information management section 301 manages the home information 2700 to be discussed later for each house or each user account. In addition, the home information management section 301 transmits the home information 2700 to the home controller 100 in response to a request from the home controller 100. Further, the home information management section 301 acquires log information related to the use history of the device 200 and information related to the state of the device 200 from the device 200, stores the acquired information in the storage section 304, and manages the information.

The device control section 302 transmits a control command to the device 200 in response to a request from the home controller 100. The storage section 304 stores information that is necessary for operation of the server 300 such as the home information 2700 and the information related to the state of the device 200 managed by the home information management section 301. The communication control section 307 controls communication between the server 300 and the home controller 100 and communication between the server 300 and the device 200 as with the communication control section 107. In addition, the communication control section 307 transmits a variety of data to the home controller 100 or the device 200 upon receiving a request to transmit such data from other blocks, and receives data transmitted from the home controller 100 or the device 200 to deliver the data to the relevant block.

Figure 4:
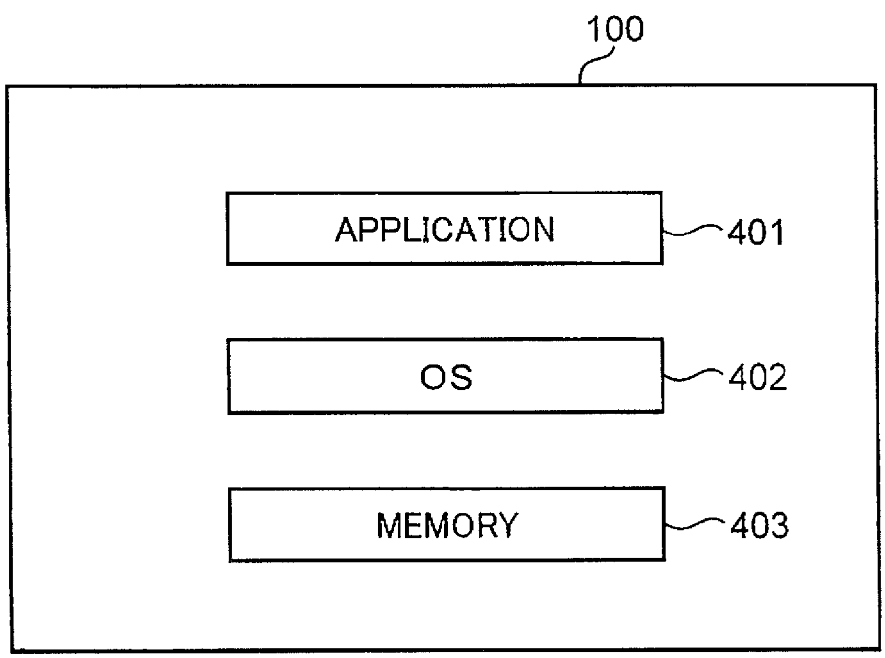
FIG. 4 is a diagram showing a configuration example of the form of implementation of the home controller according to the embodiment of the present disclosure.

FIG. 4 is a diagram showing a configuration example of the form of implementation of the home controller 100. As shown in FIG. 4, the home controller 100 includes an application 401, an OS (Operating System) 402, a memory 403, and other hardware (not shown).

The application 401 is application software for causing the portable information terminal to function as the home controller 100, and is executed by a processor of the home controller 100. The home controller 100 may read the application 401 from a computer readable recording medium to implement the application 401, or may download the application 401 from a network to implement the application 401. The OS 402 is basic software of the portable information terminal, and is executed by the processor of the home controller 100. The memory 403 is formed from a storage device such as a RAM and a ROM of the home controller 100, and stores a group of data included in the application 401. The processor of the home controller 100 executes the application 401 to embody the functions of the touch panel control section 102, the display control section 103, the storage section 104, the device management section 105, the device control section 106, and the communication control section 107 shown in FIG. 3. In addition, the processor of the home controller 100 executes the application 401 to cause the memory 403 to function as the storage section 104.

It should be noted, however, that in the embodiment, the home controller 100 may be implemented by the application 401 alone, may be implemented by the application 401 and the OS 402, may be implemented by the application 401, the OS 402, and the memory 403, or may be implemented by the application 401, the OS 402, the memory 403, and other hardware (not shown). In any embodiment, the home controller 100 according to the embodiment can be embodied. In the embodiment, the processor and the storage device forming the portable information terminal, for example, form a computer. One of a CPU, an FPGA, and an ASIC or a combination of two or more of these may be adopted as the processor. One of a ROM, a RAM, and a hard disk or a combination of two or more of these may be adopted as the storage device.

Figure 5:
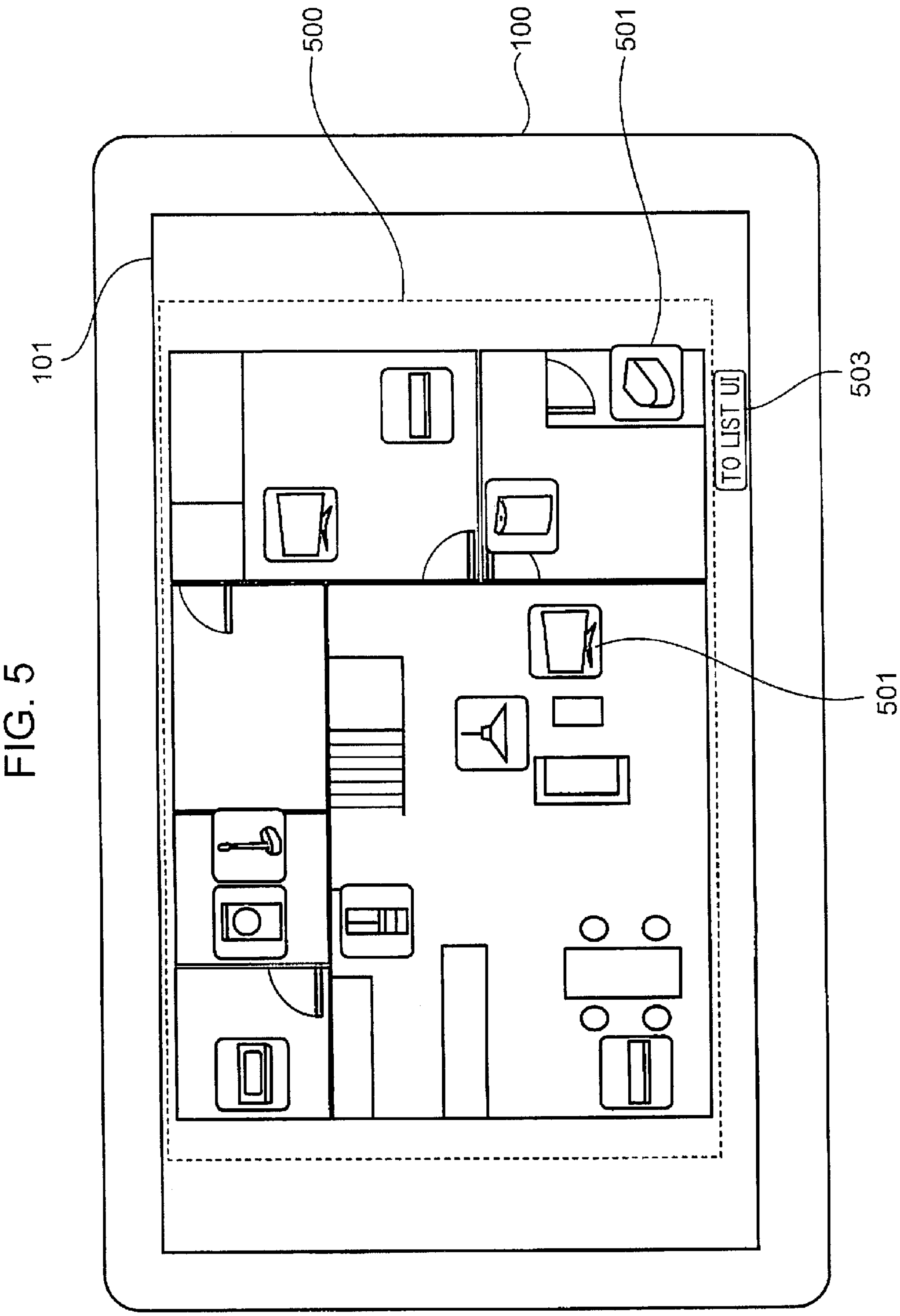
FIG. 5 is a diagram showing the configuration of a basic screen of the home controller according to the embodiment of the present disclosure.
Figure 6:
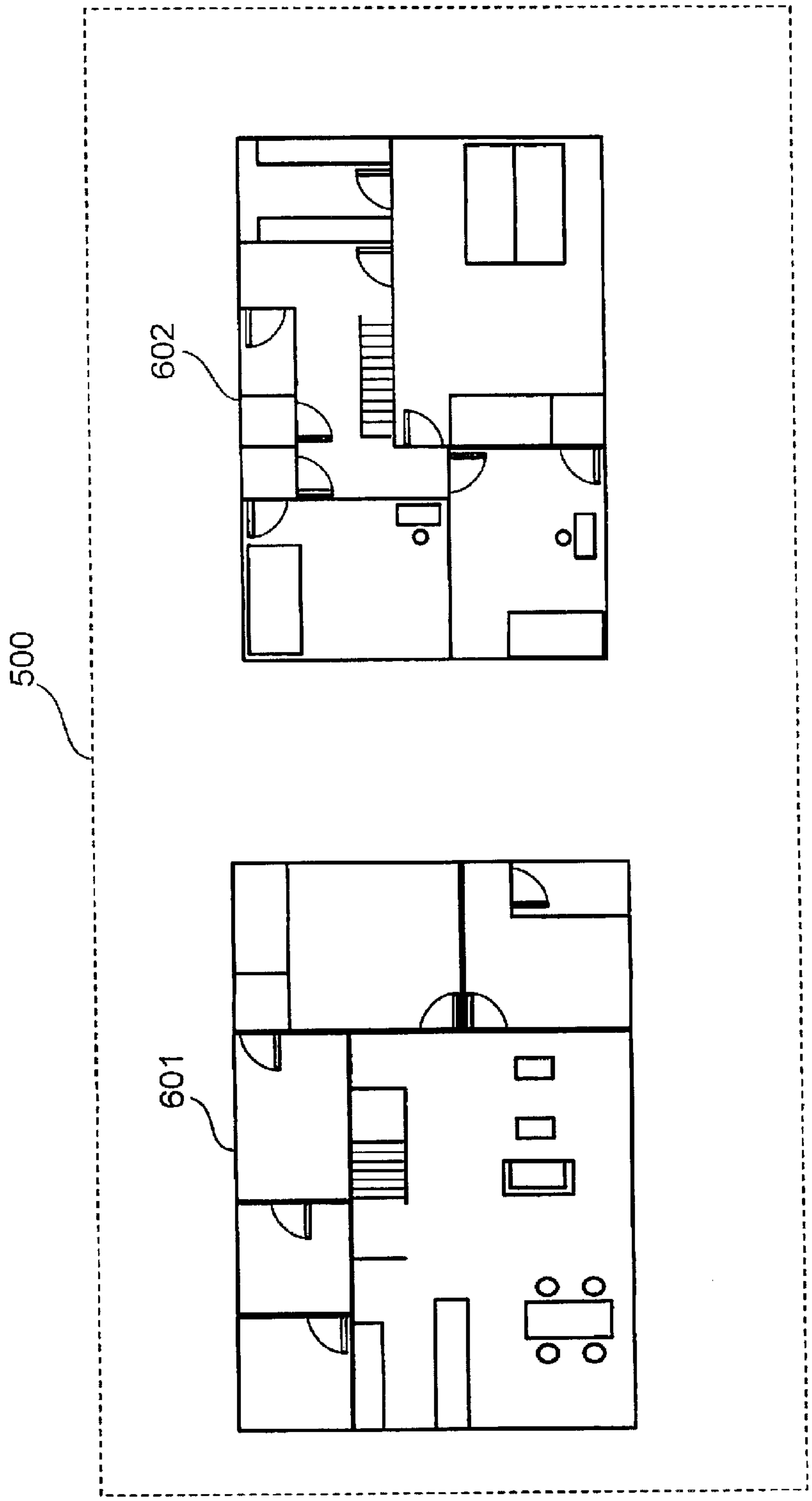
FIG. 6 is a diagram showing an example of a floor plan according to the embodiment of the present disclosure.

FIG. 5 is a diagram showing the configuration of a basic screen of the home controller 100. As shown in FIG. 5, the basic screen of the home controller 100 displayed on the display 101 include a floor plan 500, device icons 501, and a device list display change button 503. The floor plan 500 is a plan view that planarly represents the arrangement and the shape of one or more rooms forming each floor of a house. In the case where the house has one or more floors, the floor plan 500 is prepared for each floor. For example, in the case where the house has two floors, two floor plans 500, namely a floor plan 601 for the first floor and a floor plan 602 for the second floor, are displayed on the display 101 as shown in FIG. 6.

The device icon 501 is an icon displayed as overlapped on the floor plan 500 and representing the device 200. When the touch panel control section 102 senses a tap on the device icon 501 performed by the user, the display control section 103 causes the display 101 to display a device control screen 502 to be discussed later. This allows the user to control the device 200 by operating the device control screen 502.

The device icon 501 is prepared for each device 200. The display control section 103 disposes the device icon 501 on the floor plan 500 on the basis of the actual arrangement of the device 200 within the house. Information as to at what position on the floor plan 500 the device icon 501 is to be disposed is registered in an arrangement 3104 of a device list 3100 to be discussed later. Here, a position on the floor plan 500 corresponding to the actual arrangement position of the device 200 is registered in the arrangement 3104. Thus, the display control section 103 can dispose the device icon 501 at a position on the floor plan 500 corresponding to the actual arrangement position of the device 200 by disposing the device icon 501 at the position registered in the arrangement 3104 of the device list 3100.

In the floor plan 500 shown in FIG. 5, one floor is partitioned into a plurality of rooms by partition lines that indicate partitions between the rooms. This allows the user to recognize what device 200 is disposed in what room at a glance.

In the example of FIG. 5, in addition, schematic images of furniture pieces are displayed at positions on the floor plan 500 corresponding to the actual arrangement positions of the furniture pieces. An image that indicates the movable range of a door is displayed at a position on the floor plan 500 corresponding to the actual arrangement position of the door. An image of a staircase is displayed at a position on the floor plan 500 corresponding to the actual arrangement position of the staircase. This allows the user to recognize the positions of the furniture pieces disposed in each room and the positions of the staircase and the doors on the floor.

The button with a text "TO LIST UI" displayed at the lower right of the basic screen is the device list display change button 503, which is a button for switching the screen display from the basic screen to a device list display screen to be discussed later (see FIG. 24). When the touch panel control section 102 senses a tap on the device list display change button 503 performed by the user, the display control section 103 switches the screen display on the display 101 from the basic screen to the device list display screen. It should be noted, however, that the display control section 103 may hide the device list display change button 503 in the case where a registration is made in the home controller 100 in advance that the device list display screen is not utilized.

In the foregoing description, one device icon 501 is correlated with one device 200. However, the embodiment is not limited thereto, and one device icon 501 may be correlated with a plurality of devices 200 so that the one device icon 501 may be used in common to the plurality of devices 200. For example, in the case where there are two illumination devices in a living room, the two illumination devices may be represented by one device icon 501.

In this case, when the device icon 501 representing the two illumination devices is tapped on by the user, the display control section 103 causes the display 101 to display a device control screen 502 that allows simultaneous control of the two illumination devices. This allows the user to control the two illumination devices at the same time. A plurality of illumination devices are often disposed in a large room such as the living room. In the case where the user turns on or off the illumination devices in the living room, the user often turns on or off all the illumination devices disposed in the living room, rather than turning on or off some of the illumination devices. In this case, if it is possible to collectively turn on or off all the illumination devices, the number of operations to be performed by the user can be reduced. Thus, one device icon 501 may be correlated with a plurality of devices 200 that are highly likely to be operated by the user at the same time to cause one device control screen 502 to be displayed.

In the case where the device icon 501 represents a plurality of devices 200, the display control section 103 may display the device icon 501 at a position on the floor plan 500 corresponding to the actual arrangement position of one of the devices 200. Alternatively, the display control section 103 may display the device icon 501 representing the plurality of devices 200 at a predetermined location of a room in which the plurality of devices 200 are disposed.

In order to dispose the device icon 501 on the floor plan 500 on the basis of the actual arrangement of the device 200 within the house, the user moves the device icon 501 to an appropriate position on the floor plan 500. The user can move the device icon 501 to a desired position by dragging the device icon 501 while holding down the device icon 501. These operations are executed at the timing when the device icon 501 is added such as when the home controller 100 is initially utilized and when a new device 200 is purchased.

Specifically, when the touch panel control section 102 senses a drag on the device icon 501, the device management section 105 registers the position on the floor plan 500 of the device icon 501 after the movement in the arrangement 3104 of the device list 3100 to be discussed later. This allows a position on the floor plan 500 corresponding to the actual arrangement position of the device 200 to be registered in the arrangement 3104.

The initial display position of the device icon 501 may be determined in advance by the system, and may be a predetermined position outside the display region of the floor plan 500 or a predetermined position within a predetermined room on the floor plan 500, for example. The method of disposing the device icon 501 on the floor plan 500 on the basis of the actual arrangement of the device 200 within the house is not limited thereto, and the method described below may be used.

Figure 7:
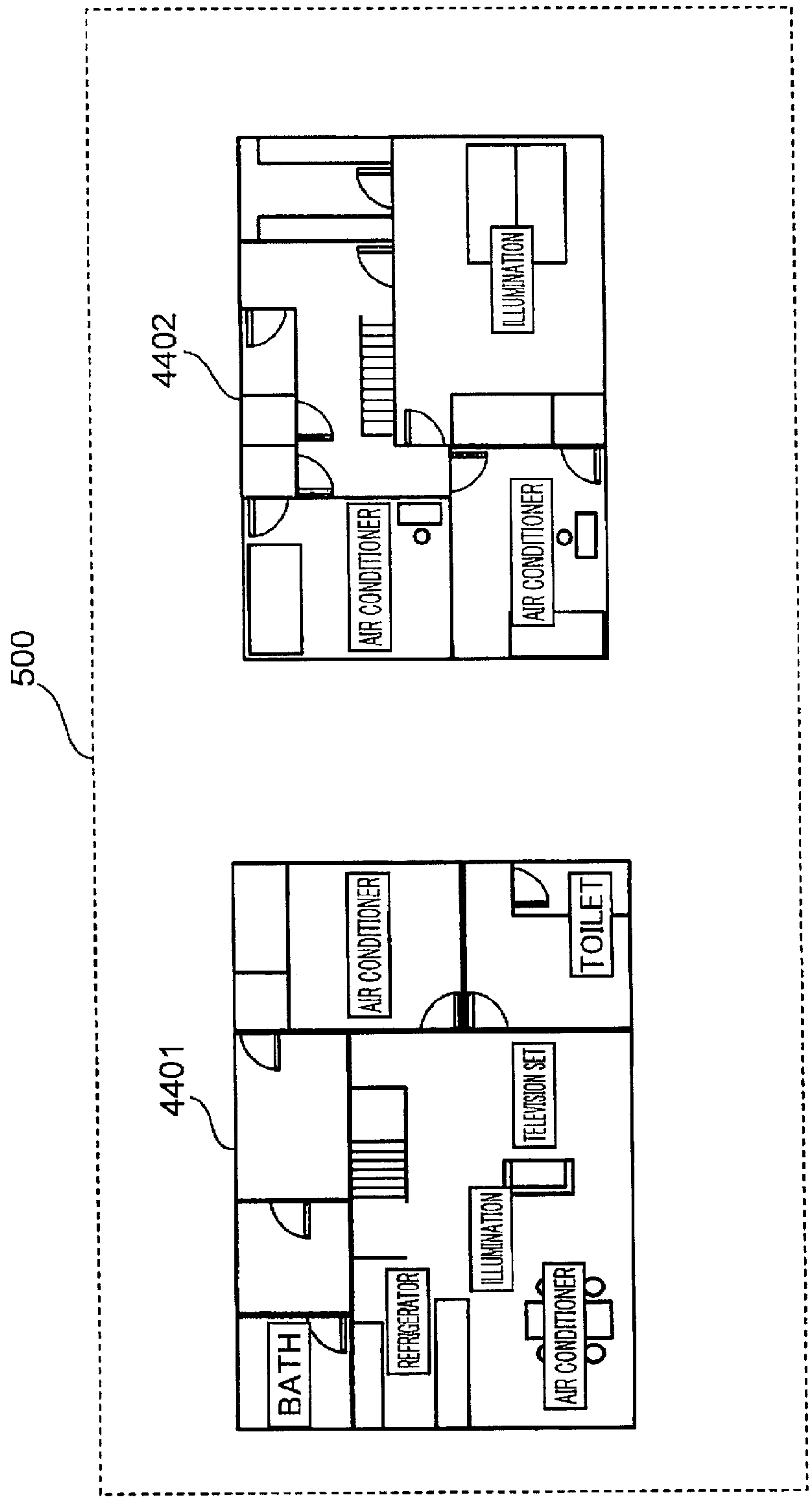
FIG. 7 is a diagram showing an example of the floor plan including arrangement information for device icons as texts according to the embodiment of the present disclosure.
Figure 8:
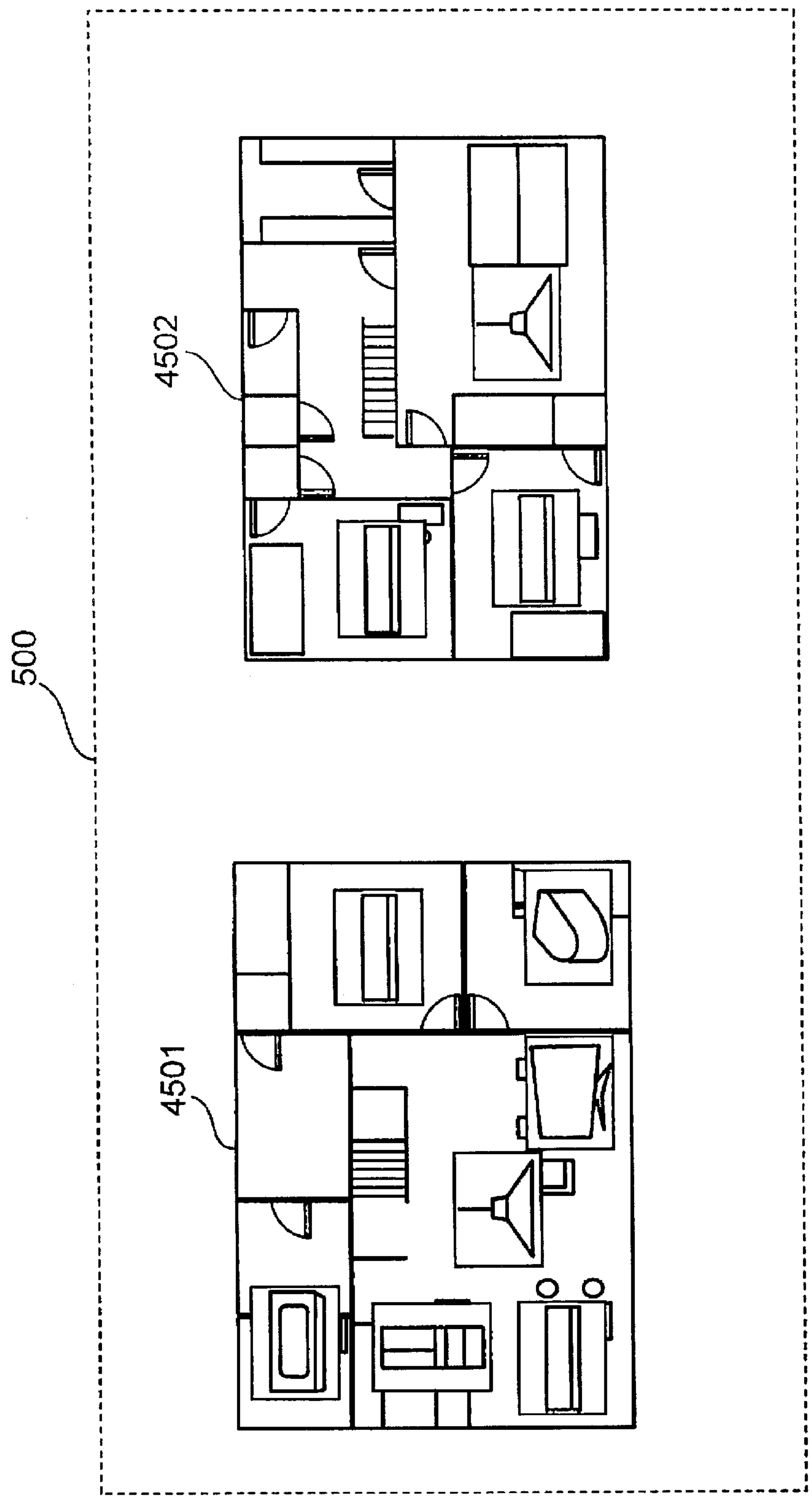
FIG. 8 is a diagram showing an example of the floor plan including arrangement information for device icons as images according to the embodiment of the present disclosure.
Figure 9:
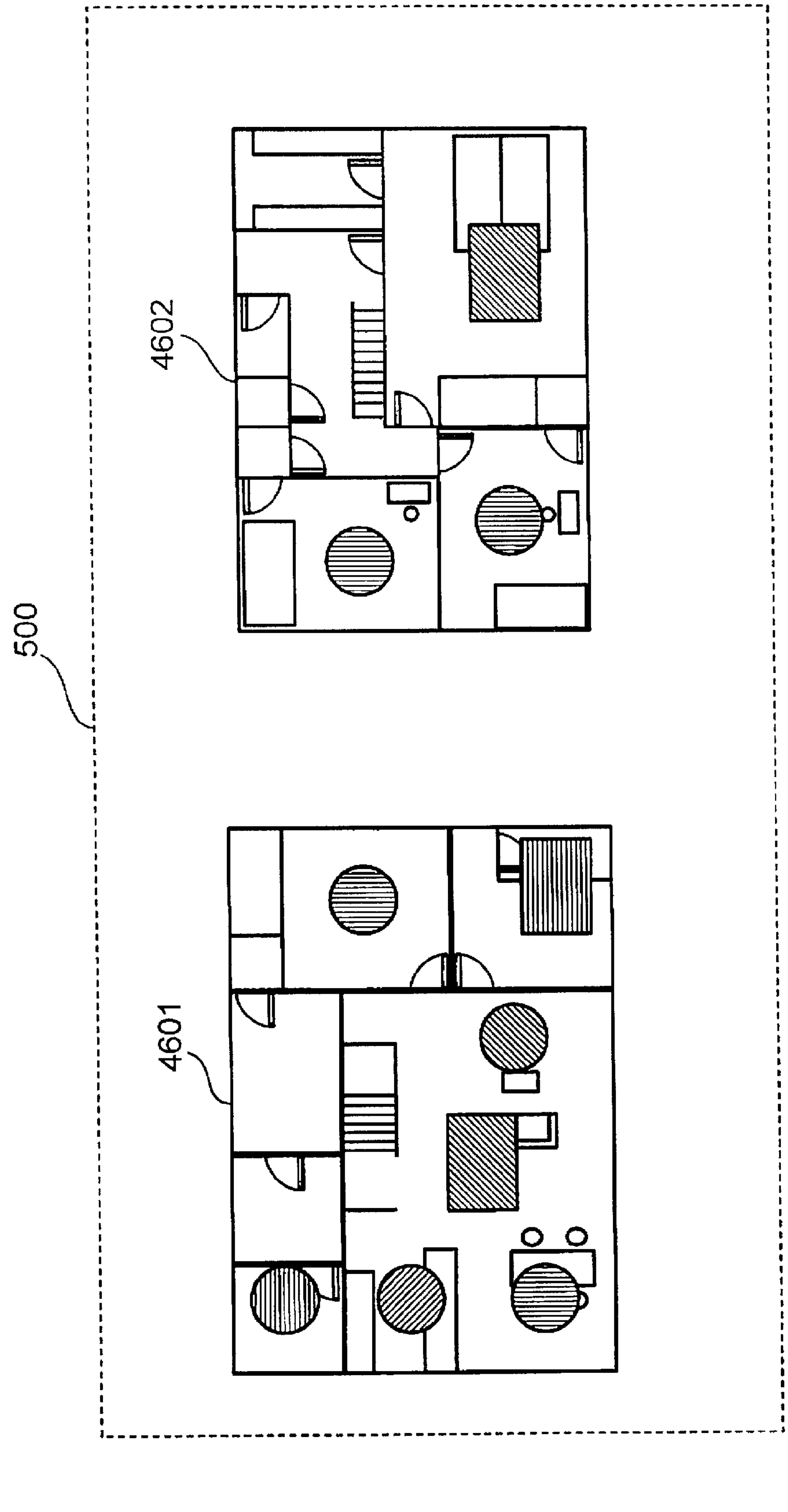
FIG. 9 is a diagram showing an example of the floor plan including arrangement information for device icons as images according to the embodiment of the present disclosure.

As shown in FIGS. 7, 8, and 9, some floor plans 500 include arrangement information for the device icons 501. For example, in the example of the floor plan 500 of FIG. 7, texts that indicate the type of the devices 200 represented by the device icons 501 to be disposed are provided at positions at which the device icons 501 are to be disposed. In the example of the floor plan 500 of FIG. 8, images that indicate the type of the devices 200 represented by the device icons 501 to be disposed are provided at positions at which the device icons 501 are to be disposed. In the example of the floor plan 500 of FIG. 9, simplified images such as circles and rectangles that indicate the type of the devices 200 represented by the device icons 501 to be disposed are provided at positions at which the device icons 501 are to be disposed.

Consequently, in the case where the floor plan 500 includes arrangement information for the device icons 501, the display control section 103 may generate the basic screen of FIG. 5 by automatically disposing the device icons 501 on the floor plan 500 on the basis of the arrangement information included in the floor plan 500. In this case, it is not necessary for the user to perform an operation of moving the device icons 501 to appropriate positions on the floor plan 500.

For example, in an exemplary floor plan 4401 for the first floor of FIG. 7, the display control section 103 detects a position provided with a text "TELEVISION SET", automatically disposes the device icon 501 for the television set at the detected position, and registers the detected position in the arrangement 3104 of the device list 3100.

In an exemplary floor plan 4501 for the first floor of FIG. 8, the display control section 103 detects a position provided with an image for the "television set", automatically disposes the device icon 501 for the television set at the detected position, and registers the detected position in the arrangement 3104 of the device list 3100. In an exemplary floor plan 4601 for the first floor of FIG. 9, the display control section 103 detects a position provided with an image in the shape of a "circle filled with oblique lines", automatically disposes the device icon 501 for the television set at the detected position, and registers the detected position in the arrangement 3104 of the device list 3100.

The display control section 103 may detect the display position of arrangement information by recognizing the arrangement information included in the floor plan 500 using a text recognition technology or an image recognition technology commonly utilized.

Figure 10:
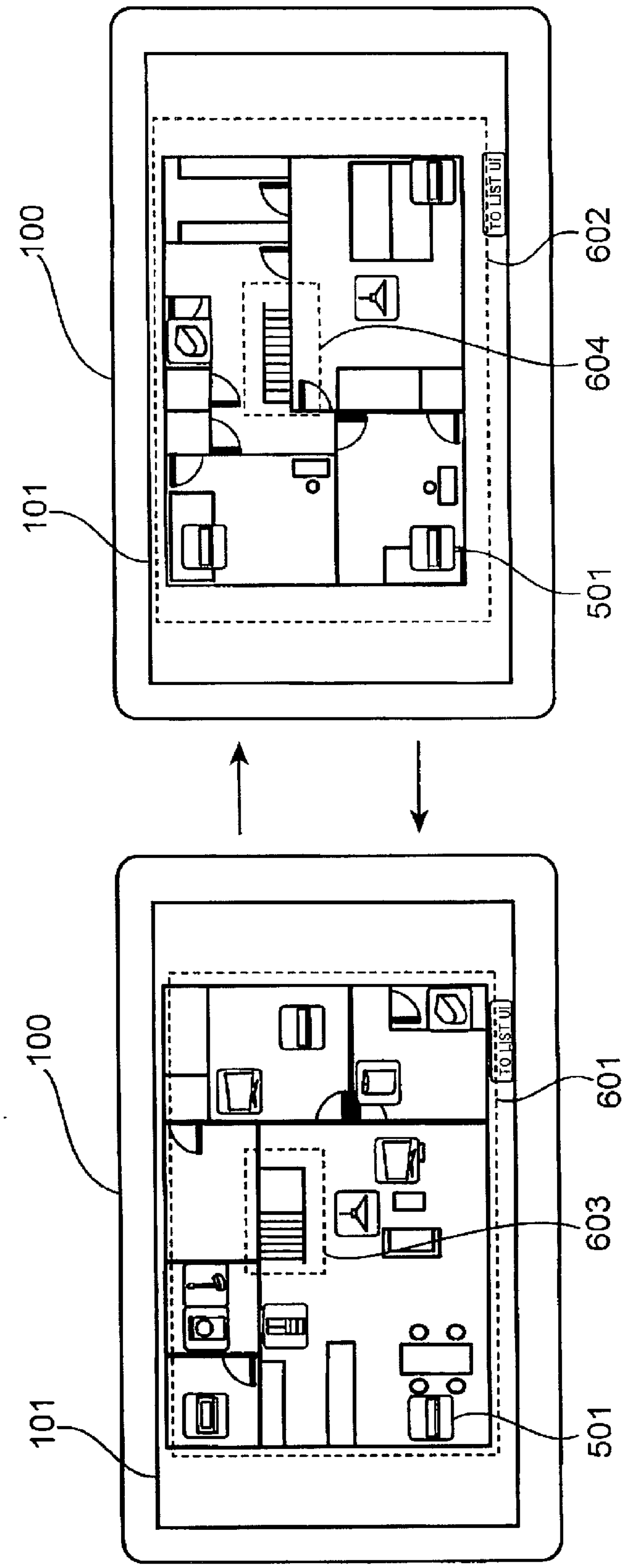
FIG. 10 is a diagram showing an example of transition between a first floor display state and a second floor display state of the basic screen of the home controller according to the embodiment of the present disclosure.

FIG. 10 is a diagram illustrating a method of switching the floor display on the basic screen of the home controller 100. FIG. 10 illustrates a case where the house has two floors, namely the first floor and the second floor. With a floor plan 601 for the first floor displayed on the basic screen of the home controller 100, the touch panel control section 102 senses a tap on a staircase region 603 on the first floor performed by the user. Then, the display control section 103 switches the floor display on the basic screen from the first floor to the second floor. Similarly, with a floor plan 602 for the second floor displayed on the basic screen of the home controller 100, the touch panel control section 102 senses a tap on a staircase region 604 on the second floor performed by the user. Then, the display control section 103 switches the floor display on the basic screen from the second floor to the first floor.

Here, the touch panel control section 102 may judge that the staircase region 603 is tapped on if the position tapped on by the user is positioned within a region surrounded by four vertexes of a staircase registered in a room type 2902 of room information 2900 (see FIG. 32).

Further, the floor display may be switched by not only tapping on the staircase region 603 but also a swipe operation on the display 101. With the floor plan 601 for the first floor displayed on the basic screen of the home controller 100, the touch panel control section 102 senses a swipe operation performed from the right to the left on the display 101 by the user. Then, the display control section 103 switches the floor display on the basic screen from the first floor to the second floor. Similarly, with the floor plan 602 for the second floor displayed on the basic screen of the home controller 100, the touch panel control section 102 senses a swipe operation performed from the left to the right on the display 101 by the user. Then, the display control section 103 switches the floor display on the basic screen from the second floor to the first floor. The floor display may be switched by a swipe operation in the vertical direction.

Figure 11:
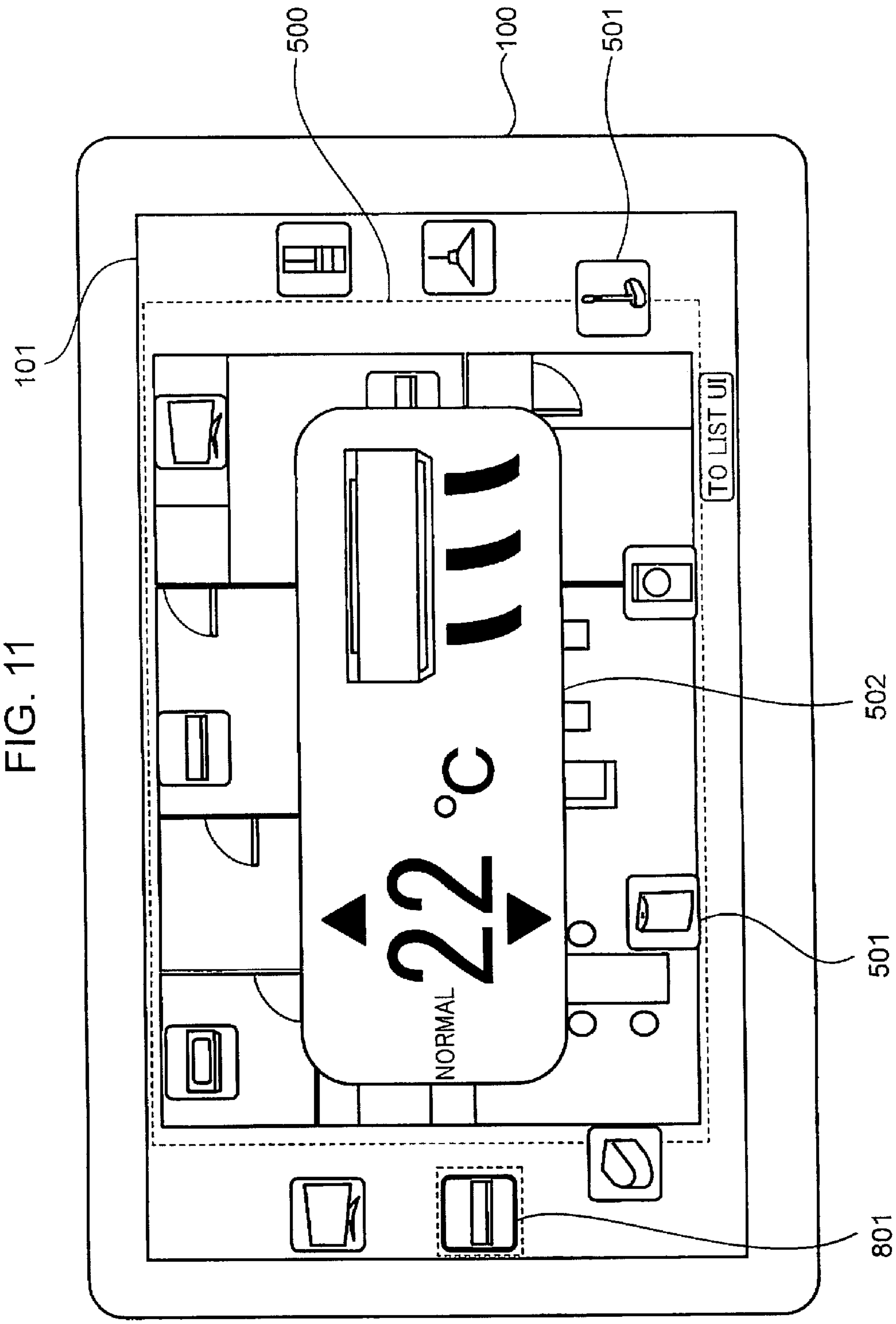
FIG. 11 is a diagram showing the configuration of the display state of a device control screen of the home controller according to the embodiment of the present disclosure.

FIG. 11 is a diagram showing the configuration of the display state of the device control screen 502 of the home controller 100. In the basic screen shown in FIG. 5, when the touch panel control section 102 senses that the user selects the device icon 501, the display control section 103 causes the display 101 to display the device control screen 502 corresponding to the selected device icon 501. The device control screen 502 is a control screen that is specific to each device 200 and that allows control or confirmation of the state of the device 200. For example, in FIG. 11, a device icon 801 for the air conditioner is selected by the user, and the temperature setting and the air flow direction are controlled using the device control screen 502 for the air conditioner.

An image of the air conditioner is displayed in the device control screen 502 to allow the user to immediately recognize that the device control screen 502 corresponds to the air conditioner. This prevents an erroneous operation. An image that indicates the air flow direction is displayed on the lower side of the image of the air conditioner to allow the user to select a desired air flow direction by repeatedly tapping on the image, for example. A numeral displayed within the device control screen 502 indicates the current set temperature of the air conditioner. A button in the shape of a triangle that points upward in the device control screen 502 is a temperature increase button. A button in the shape of a triangle that points downward is a temperature decrease button. Pressing the temperature increase button once increases the set temperature of the air conditioner by a predetermined temperature (for example, 0.5 degrees). Pressing the temperature decrease button once decreases the set temperature of the air conditioner by a predetermined temperature (for example, 0.5 degrees).

Examples of the method of disposing the device icons 501 in the display state of the device control screen 502 include the following methods.

A first method is to dispose the device icons 501 outside the display region of the device control screen 502 as shown in FIG. 11. When the touch panel control section 102 senses that a certain device icon 501 is tapped on by the user, the display control section 103 disposes all the device icons 501 at locations outside the display region of the device control screen 502 and inside the display region of the display 101 irrespective of whether or not the locations are inside the display region of the floor plan 500. In the example of FIG. 11, the device icons 501 are disposed in an elliptical arrangement so as to surround the device control screen 502. That is, when a certain device icon 501 is selected by the user and the device control screen 502 for the device 200 corresponding to the device icon 501 is displayed, the display control section 103 retracts all the device icons 501 out of the display region of the device control screen 502.

This prevents the device icons 501 from being hidden by the device control screen 502. Therefore, in the case where the device control screen 502 for a device 200 is currently displayed and the user attempts to cause the device control screen 502 for another device 200 to be displayed, it is not necessary for the user to temporarily erase the currently displayed device control screen 502 and search for the device icon 501 for the relevant device 200.

Here, the display control section 103 may decide the arrangement position of each device icon 501 on the outer periphery of an ellipse having a shape determined in advance in accordance with the size of the device control screen 502, and dispose the device icon 501 at the decided position, for example. Examples of the method of deciding the arrangement position include a method of arranging all the device icons 501 as display targets at equal intervals on the outer periphery of an ellipse, and a method of disposing the device icons 501 such that the angles formed by lines connecting between adjacent device icons 501 and the center of an ellipse are equal to each other. Alternatively, the display control section 103 may divide the outer periphery of an ellipse into four sections corresponding to the upper, lower, left, and right portions of the device control screen 502, and dispose the device icons 501 such that the number of device icons 501 in each section is the same and the device icons 501 in each section are arranged at equal intervals. The device icon 501 disposed at the closest position on the floor plan 500 may be disposed at the decided arrangement position.

In the foregoing description, the device icons 501 are arranged in an elliptical arrangement. However, the embodiment is not limited thereto, and the device icons 501 may be arranged in a circular arrangement. Also in this case, the arrangement position of the device icons 501 may be decided using the same method as in the case where the device icons 501 are arranged in an elliptical arrangement. Other examples of the shape of arrangement of the device icons 501 used when the device icons 501 are retracted out of the display region of the device control screen 502 include polygonal arrangements such as triangular, rectangular, and pentagonal arrangements.

Figure 13:
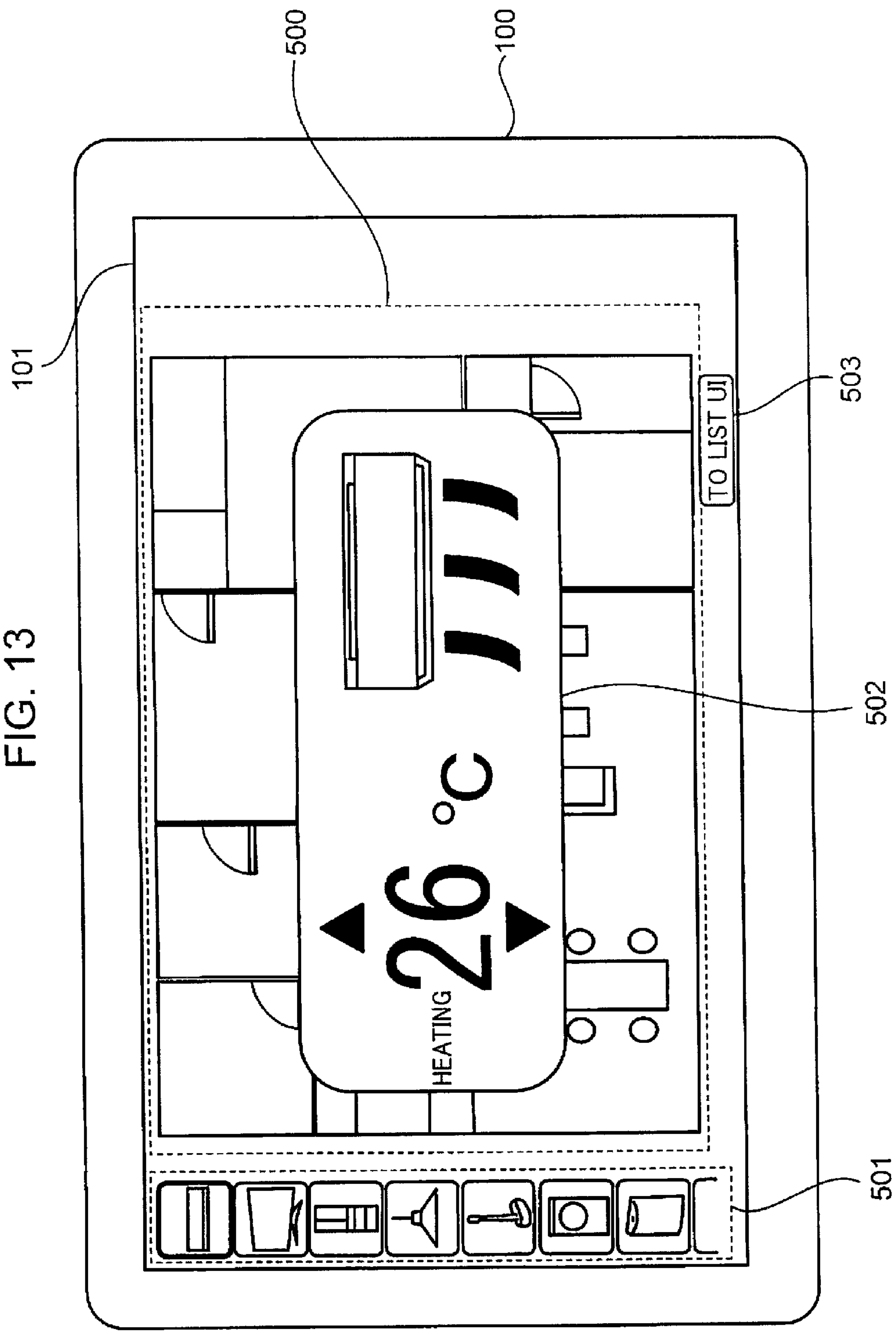
FIG. 13 is a diagram showing the configuration of the display state of a device control screen of the home controller according to the embodiment of the present disclosure.

A second method is to dispose the device icons 501 in one line outside the display region of the device control screen 502 and the floor plan 500 and inside the display region of the display 101 as shown in FIG. 13. When the touch panel control section 102 senses that a certain device icon 501 is tapped on by the user, the display control section 103 disposes all the device icons 501 in one vertical line on the left side of the display region of the floor plan 500. That is, the display control section 103 retracts all the device icons 501 to a vacant space outside the display region of the floor plan 500 and inside the display region of the display 101.

In FIG. 13, the device icons 501 are disposed on the left side of the floor plan 502. However, the embodiment is not limited thereto, and the device icons 501 may be disposed in one vertical line on the right side of the floor plan 502, or may be disposed in one horizontal line on the upper or lower side of the floor plan 500.

In the case where all the device icons 501 cannot be disposed on the left side of the floor plan 500, the display control section 103 may scroll the device icons 501 upward or downward in accordance with a swipe operation performed upward or downward on the device icons 501 disposed in one vertical line on the left side to cause the device icons 501, which have been hidden, to be displayed within the display 101.

This allows the device icons 501, which have been hidden, to be displayed within the display 101 to allow the user to select the device icons 501. In the case where the device icons 501 are displayed in one horizontal line and all the device icons 501 may not displayed, the display control section 103 may scroll the device icons 501 leftward or rightward in accordance with a swipe operation performed leftward or rightward on the device icons 501 disposed in one horizontal line to cause the device icons 501, which have been hidden, to be displayed within the display 101.

In the display state of the device control screen 502, the display control section 103 may display the device icon 501 selected by the user in a display mode that is different from that for the unselected device icons 501. This allows the user to easily recognize the selected device icon 501.

For example, as shown in FIG. 11, the display control section 103 may display the selected device icon 801 in a color that is different from that of the other unselected device icons 501. Specifically, the display control section 103 may display a background portion of the selected device icon 501 in a color that is different from that of background portions of the unselected device icons 501. It should be noted, however, that such a display mode is merely exemplary, and the display control section 103 may make the selected device icon 501 brighter than the unselected device icons 501, may make the selected device icon 501 denser than the unselected device icons 501, or may cause the selected device icon 501 to flash on and off at a constant cycle.

In the display state of the device control screen 502, the device icon 501 selected by the user may be disposed as distinguished from the unselected device icons 501. This allows the user to easily recognize the selected device icon 501.

Figure 12:
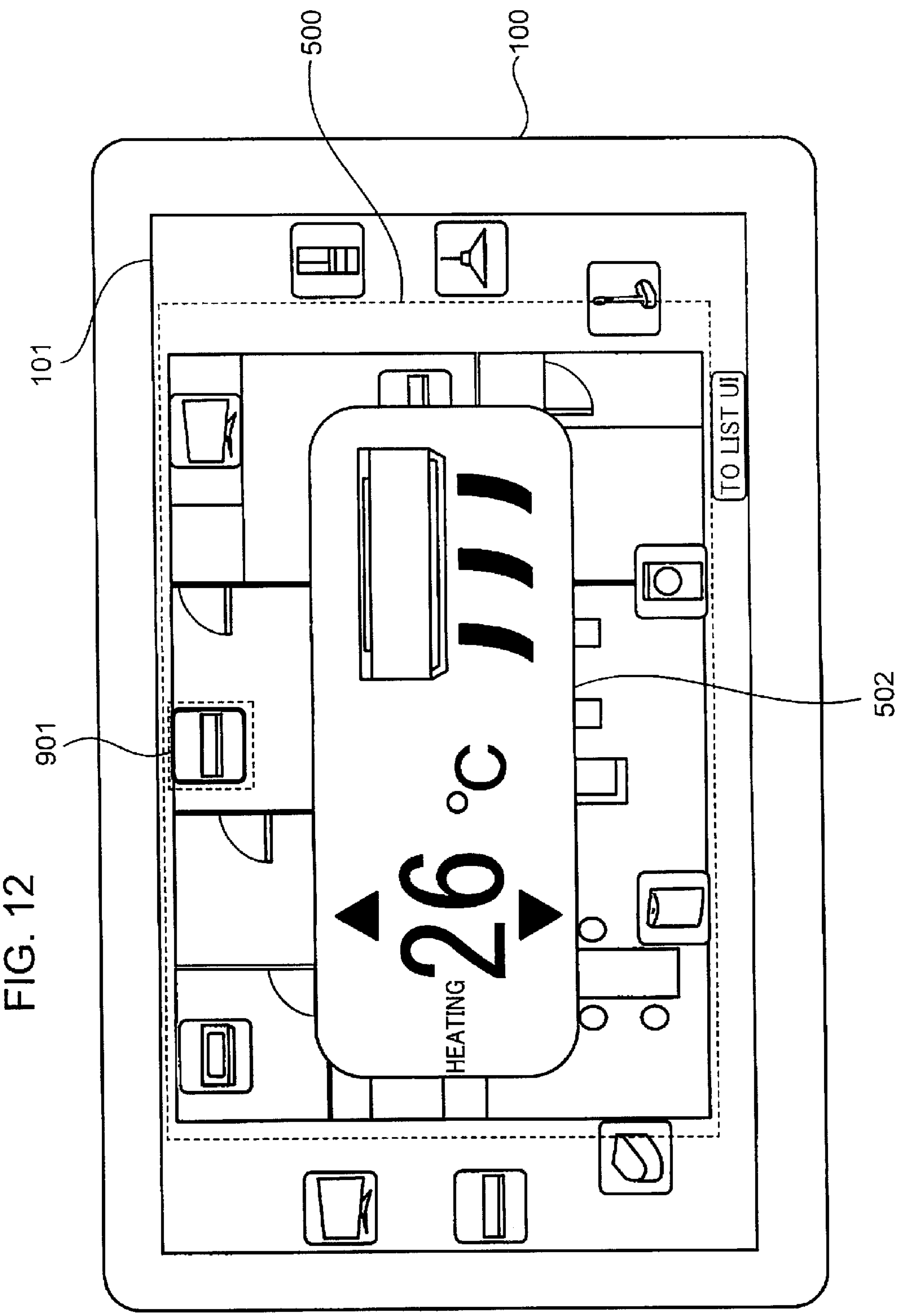
FIG. 12 is a diagram showing a device icon arrangement example of the display state of the device control screen of the home controller according to the embodiment of the present disclosure.

For example, as shown in FIG. 12, the display control section 103 may dispose a selected device icon 901 at the uppermost position on the outer periphery of an ellipse. Besides, for example, the display control section 103 may dispose the selected device icon 501 at a particular position (for example, the lowermost position, the rightmost position, or the leftmost position) on the outer periphery of an ellipse. In any event, the display control section 103 may dispose the device icon 501 selected by the user at a particular location that is easily recognizable by the user.

Figure 14:
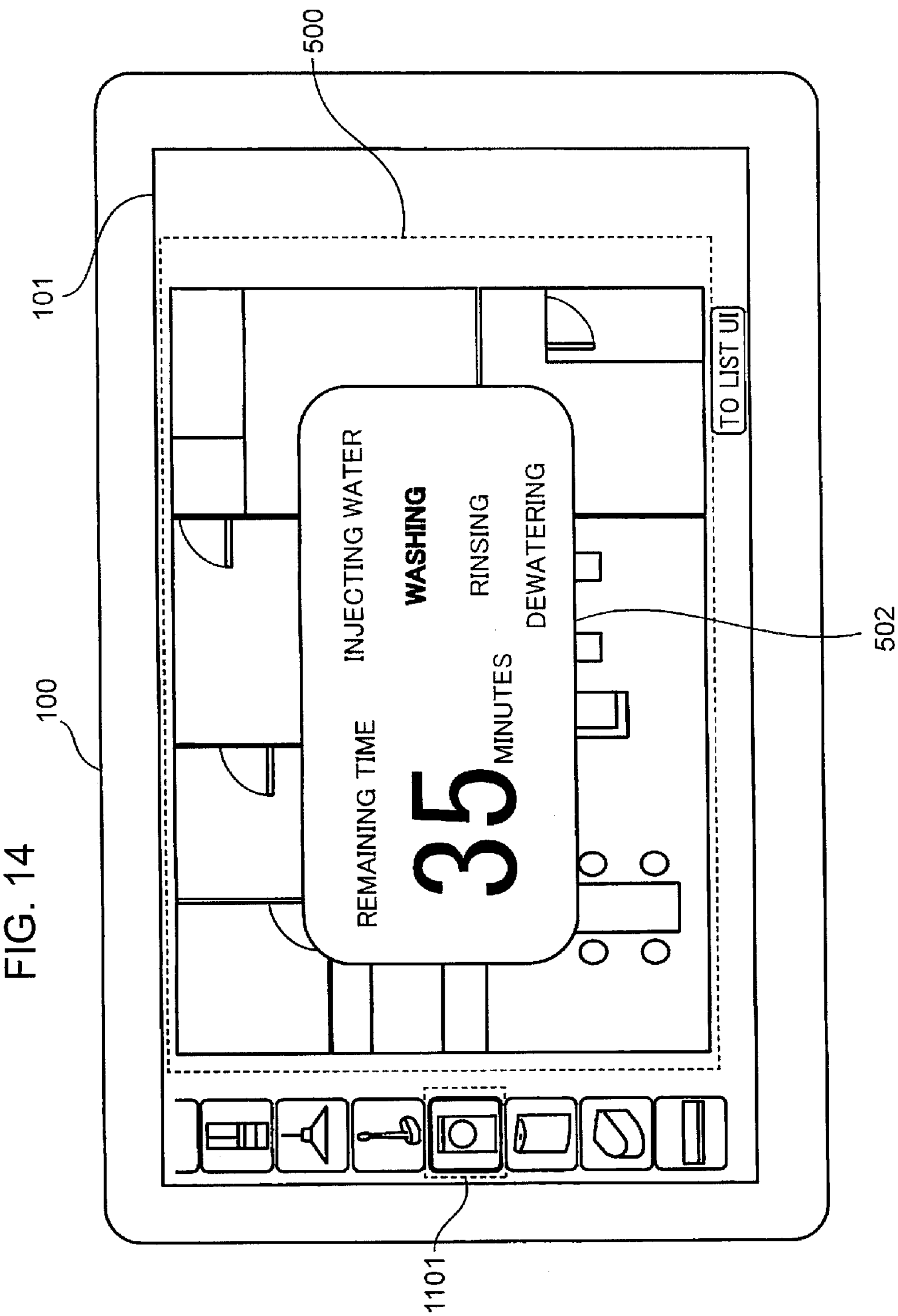
FIG. 14 is a diagram showing a device icon arrangement example of the display state of the device control screen of the home controller according to the embodiment of the present disclosure.

Besides, for example, as shown in FIG. 14, the display control section 103 may scroll an array of the device icons 501 such that a selected device icon 1101 is disposed within the display region of the display 101. In the example of FIG. 14, the device icons 501 are scrolled such that the selected device icon 1101 is disposed at the center of a line of icons displayed in one vertical line on the left side of the floor plan 500. This allows the user to easily recognize the selected device icon 501. Although the device icon 1101 is disposed at the center of the line of icons in FIG. 14, the device icon 1101 may be disposed at any other conspicuous position. For example, the device icon 1101 may be disposed at the top or bottom position of the line of icons.

The order of arrangement of the device icons 501 taken when the device icons 501 are retracted out of the display region of the floor plan 500 may be determined such that devices 200 that are closer in position of arrangement on the floor plan 500 to the device icon 501 selected by the user are disposed to be closer in order of arrangement to the selected device icon 501. Alternatively, the order of arrangement of the device icons 501 may be determined such that the device icons 501 for devices 200 that are more likely to be used together with the device 200 selected by the user are disposed to be closer in order of arrangement to the device icon 501 for the device 200 selected by the user. For example, the television set and the Blu-ray recorder are highly likely to be used together by the user. Therefore, when the device icon 501 for the television set is selected by the user, the device icon 501 for the Blu-ray recorder may be displayed next to the device icon 501 for the television set. In order to embody such a configuration, a table that indicates combinations of devices 200 that are highly likely to be used together may be stored in advance in the storage section 104, and the arrangement of the device icons 501 may be decided in accordance with the table.

In any of the methods of disposing the device icons 501 taken when the device control screen 502 is displayed described above, in addition, the display control section 103 may dispose the device icons 501 as grouped under particular conditions.

Figure 15:
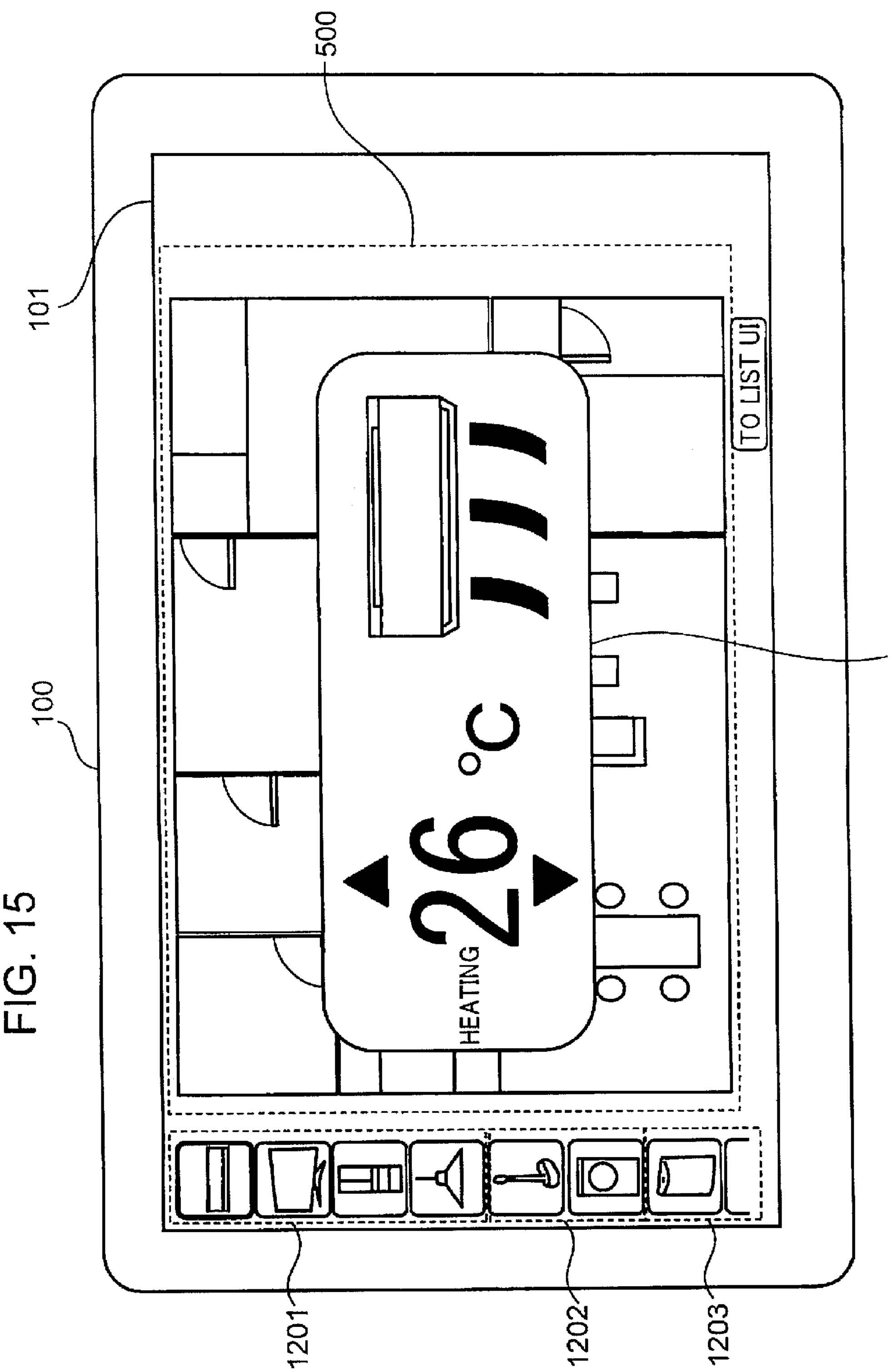
FIG. 15 is a diagram showing a device icon arrangement example of the display state of the device control screen of the home controller according to the embodiment of the present disclosure.

For example, in FIG. 15, the device icons 501 are grouped in accordance with the location at which the devices 200 are disposed. The devices 200 disposed in the living room are grouped as device icons 1201. The devices 200 disposed in a lavatory are grouped as device icons 1202. The devices 200 disposed in a bedroom are grouped as device icons 1203. Then, the display order is set to each group, and the grouped device icons 501 are disposed in one vertical line on the left side of the floor plan 500 in accordance with the display order. The display order of the groups may be determined such that groups that are positioned closer to the room in which the device 200 selected by the user is disposed are closer in display order to the group for the room in which the device 200 selected by the user is disposed.

Besides, the display control section 103 may dispose the device icons 501 as grouped in accordance with the type of the devices 200. For example, in FIG. 16, two device icons 501 for the television set are disposed on the left side of the floor plan 500 as grouped as device icons 2301, and two device icons 501 for the air conditioner are disposed on the left side of the floor plan 500 as grouped as device icons 2302 for the air conditioner. Consequently, the display control section 103 may group the device icons 501 in accordance with the device type by disposing the device icons 501 for the devices 200 of the same type to be continuous.

The display control section 103 may discriminate the type of the devices 200 in accordance with the content registered in a device type 3102 of the device list 3100 (see FIG. 35).

Although the device icons 501 for the devices 200 of the same type are grouped into one group in the foregoing description, the embodiment is not limited thereto. For example, the display control section 103 may classify the devices 200 into categories matching the device type, group the device icons 501 in accordance with the category, and dispose the device icons 501 on the left side of the floor plan 500 in groups.

Figure 16:
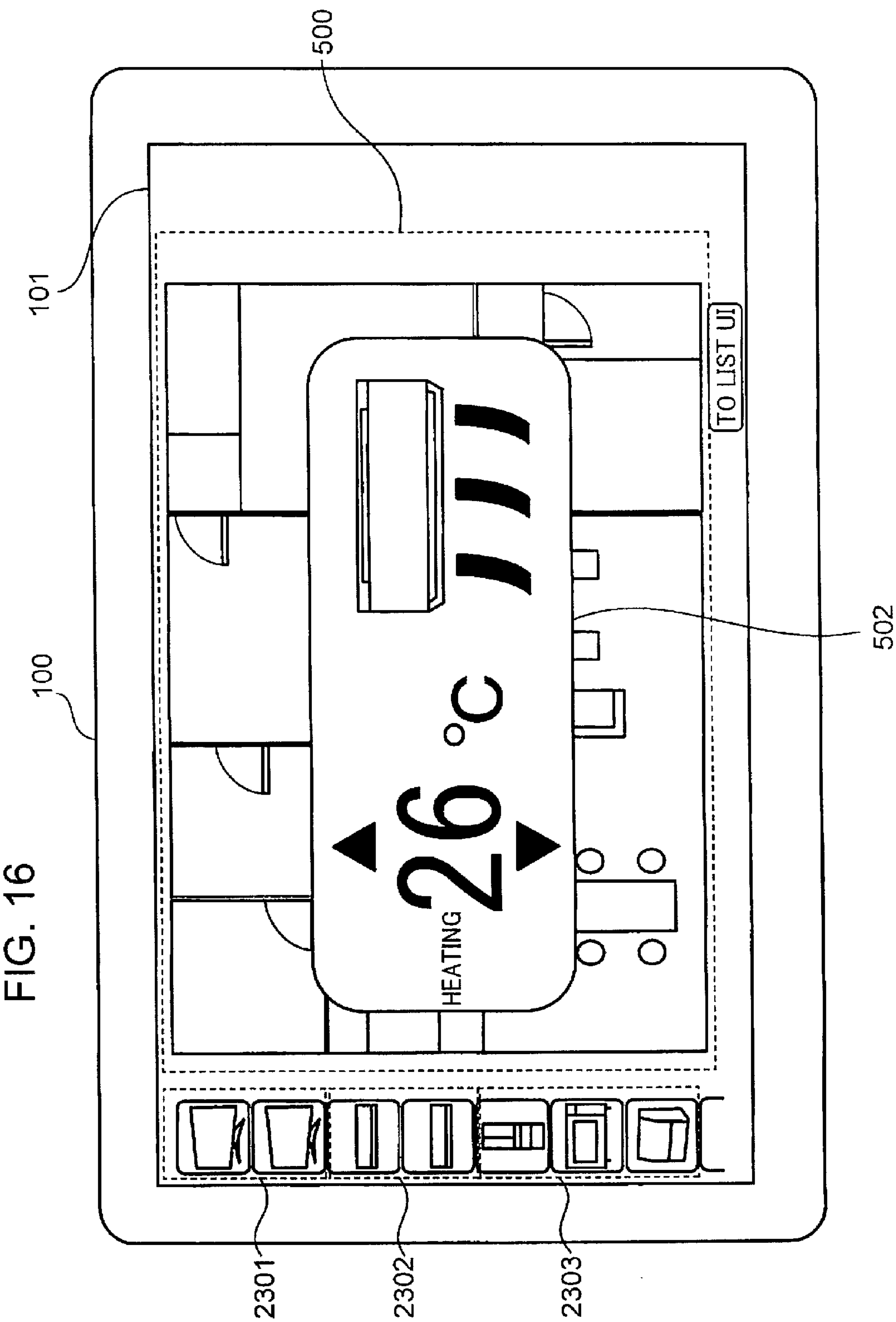
FIG. 16 is a diagram showing a device icon arrangement example of the display state of the device control screen of the home controller according to the embodiment of the present disclosure.

For example, as shown in the lower left of FIG. 16, three device icons 501 for the refrigerator, a microwave oven, and a dish washing/drying machine are classified into a cooking device category, and therefore the three device icons are grouped as device icons 2303 for the cooking devices and disposed on the left side of the floor plan 500.

Examples of the other categories include entertainment devices and air-conditioning devices. The entertainment device category includes devices 200 such as a television set, a recorder, a player, and a home theater system. The air-conditioning device category includes devices 200 such as an air conditioner, an air purifier, a humidifier, a dehumidifier, and a home air circulation system.

For example, if the device icons 501 for the television set, the recorder, the air conditioner, and the air purifier are disposed on the floor plan 500 and the device icon 501 for the television set is selected by the user, the device icons 501 for the television set and the recorder classified into the entertainment device category are grouped into one group and disposed on the left side of the floor plan 500, and the device icons 501 for the air conditioner and the air purifier classified into the air-conditioning device category are grouped into one group and disposed on the left side of the floor plan 500.

The display control section 103 may determine the category of the devices 200 from the content registered in the device type 3102 of the device list 3100. In this case, a classification table for determining the category of the devices 200 from the content registered in the device type 3102 may be stored in advance in the storage section 104, and the display control section 103 may reference the classification table to discriminate the category of the devices 200.

A variety of manners of classifying the devices 200 according to the device type may be adopted besides that described above. For example, as shown in FIG. 24, the devices 200 may be classified into household appliance, air-conditioning, and facility categories.

The method of grouping the device icons 501 on the basis of particular conditions and disposing the device icons 501 as described above may also be applied to the display mode in which the device icons 501 are retracted so as to surround the device control screen 502 as shown in FIG. 11.

Figure 17B:
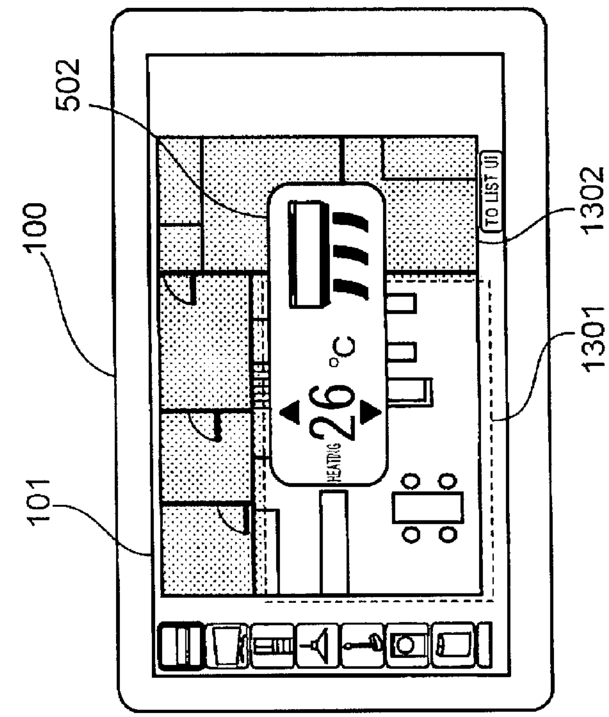
FIGS. 17 A and B are diagrams showing a configuration example of the display state of the device control screen of the home controller according to the embodiment of the present disclosure.
Figure 17A:
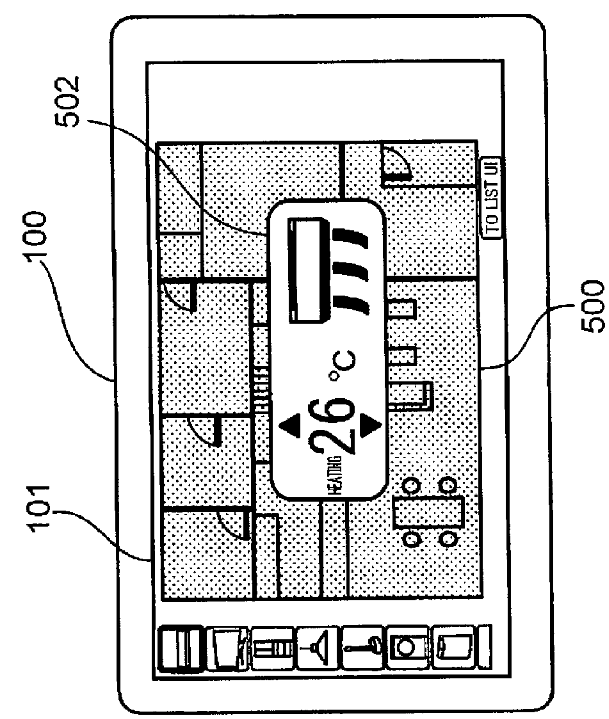

FIGS. 17A and 17B are each a diagram showing a method of displaying the floor plan 500 with the device control screen 502 displayed. As shown in FIGS. 17A and 17B, there are two types of the method of displaying the floor plan 500. In a first display method, as shown in FIG. 17A, the entire floor plan 500 is covered by a translucent gray layer (in the drawing, indicated by dots).

In this case, the background of the device control screen 502 is turned into a gray color to emphasize the device control screen 502, which allows the user to more definitely recognize the device control screen 502. In addition, the gray layer is translucent, and the floor plan 500 is not completely hidden. This allows the device control screen 502 to be operated with presence. The gray layer is image data having a color with low brightness such as gray and set to predetermined transparency.

The display control section 103 may decide the display order of the device control screen 502, the gray layer, and the floor plan 500 such that the device control screen 502 is the uppermost layer and the floor plan 500 is the lowermost layer, and synthesize these images. This prevents the device control screen 502 from being displayed as covered by the gray layer.

In a second display method, as shown in FIG. 17B, a non-control target region 1302 in the floor plan 500 is covered by a translucent gray layer (the region with dots in the drawing), and a control target region 1301 is not covered by the translucent gray layer. This allows the user to operate the device control screen 502 while being conscious of the control target region 1301, which allows operation with presence. Here, the control target region 1301 refers to a region on the floor plan 500 that corresponds to a room in which the device 200 represented by the device icon 501 selected by the user is disposed, and the non-control target region 1302 refers to a region on the floor plan 500 other than the room. For example, in the case where the control target device is the air conditioner installed in the living room, the control target region 1301 is the region on the floor plan 500 corresponding to the living room, and the non-control target region 1302 is the region on the floor plan 500 other than the living room.

For example, it is assumed that the user selects the device icon 501 for the air conditioner with a device ID 3101 of A shown in FIG. 35. In this case, the display control section 103 specifies the position (X10, Y100, Z1) of the air conditioner from the content registered in the arrangement 3104 of the air conditioner. Next, the display control section 103 references the room information 2900 to decide in which room the specified position (X10, Y100, Z1) is positioned. Here, it is assumed that the position (X10, Y100, Z1) is positioned within a region surrounded by vertexes with vertex IDs of F, G, H, I, L, O, and N. Then, the display control section 103 determines that the air conditioner is disposed in the living room with a room ID of A. Then, the display control section 103 generates a gray layer with the region of the living room defined as the control target region 1301 and with the region on the floor plan 500 other than the living room defined as the non-control target region 1302.

Next, transition between the display state of the basic screen and the display state of the device control screen 502 will be described using FIG. 18. In the basic screen shown in the left diagram of FIG. 18, the user selects the device icon 501 for the device 200 (here, the air conditioner) that is desired to be controlled, and the touch panel control section 102 senses the selection. Then, as shown in the right diagram of FIG. 18, the display control section 103 displays the device control screen 502 corresponding to the selected device icon 501 as overlapped on the floor plan 500. This results in transition from the display state of the basic screen to the display state of the device control screen 502.

Figure 18:
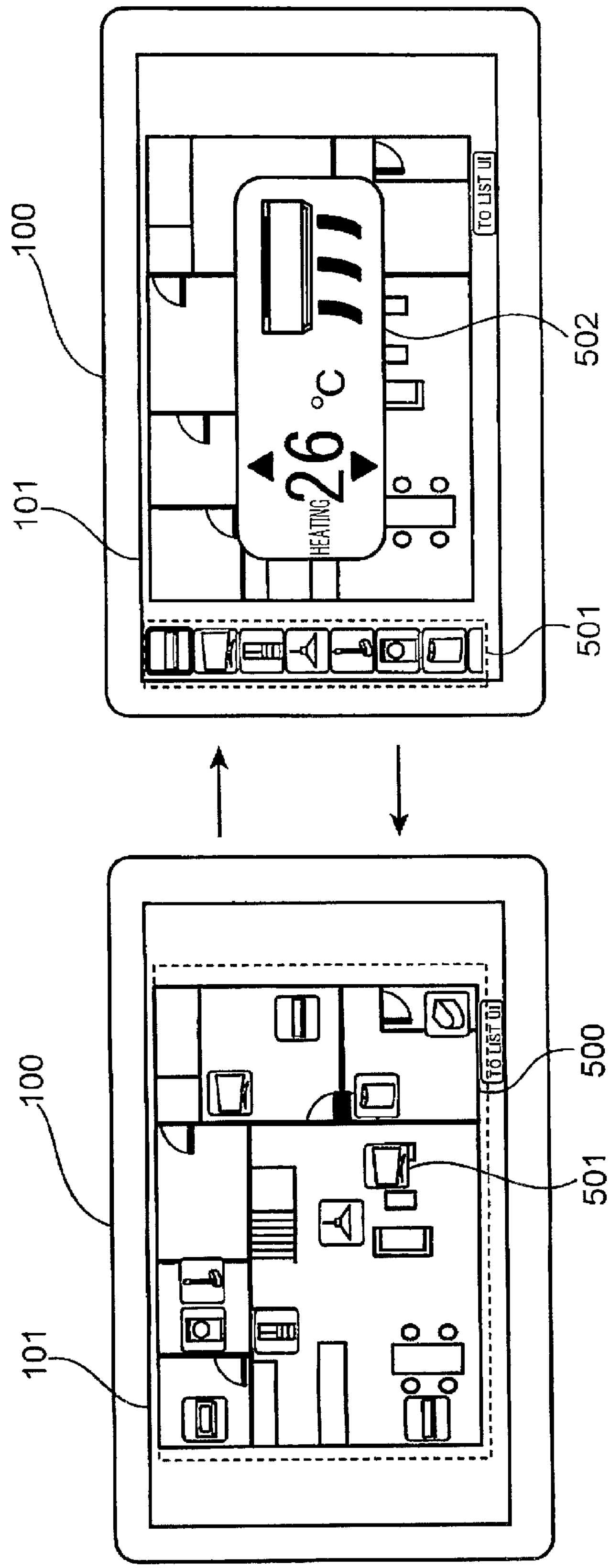
FIG. 18 is a diagram showing an example of transition between the basic screen of the home controller and the display state of the device control screen according to the embodiment of the present disclosure.

On the other hand, as shown in the right diagram of FIG. 18, in the display state of the device control screen 502, the user taps on the device icon 501 for the air conditioner corresponding to the device control screen 502 or a location outside the display region of the device control screen 502 (for example, the display region of the floor plan 500 outside the display region of the device control screen 502), and the touch panel control section 102 senses the tap. Then, as shown in the left diagram of FIG. 18, the display control section 103 erases the device control screen 502, and returns from the display state of the device control screen 502 to the display state of the basic screen. At this time, the display control section 103 returns the device icon 501 to the original arrangement position on the floor plan 500.

The operation described above is the same for the floor plan 500 for any floor displayed in the basic screen. For example, as shown in the left diagram of FIG. 19, in the case where the basic screen displays the floor plan 602 for the second floor, the user taps on the device icon 501 for the device 200 (here, the air conditioner) that is desired to be controlled, and the touch panel control section 102 senses the tap. Then, as shown in the right diagram of FIG. 19, the display control section 103 displays the device control screen 502 corresponding to the selected device icon 501 as overlapped on the floor plan 602 for the second floor.

Figure 19:
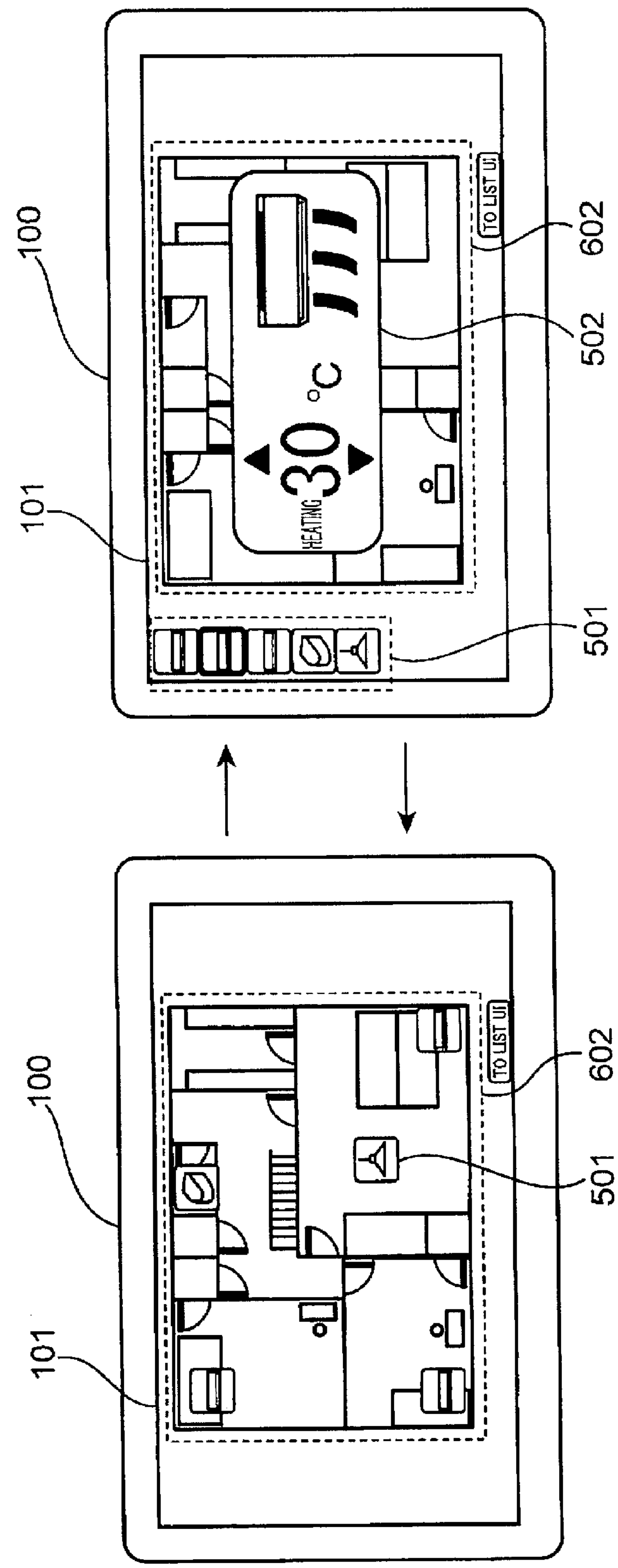
FIG. 19 is a diagram showing an example of transition between the second floor display state of the basic screen of the home controller and the display state of the device control screen for the second floor according to the embodiment of the present disclosure.

On the other hand, as shown in the right diagram of FIG. 19, in the display state of the device control screen 502 for the air conditioner, the user taps on the device icon 501 for the air conditioner corresponding to the device control screen 502 being displayed or a location outside the display region of the device control screen 502 (for example, the display region of the floor plan 500 outside the display region of the device control screen 502), and the touch panel control section 102 senses the tap. Then, as shown in the left diagram of FIG. 19, the display control section 103 erases the device control screen 502, and returns from the display state of the device control screen 502 to the display state of the basic screen in which the floor plan 602 for the second floor is displayed.

Figure 20:
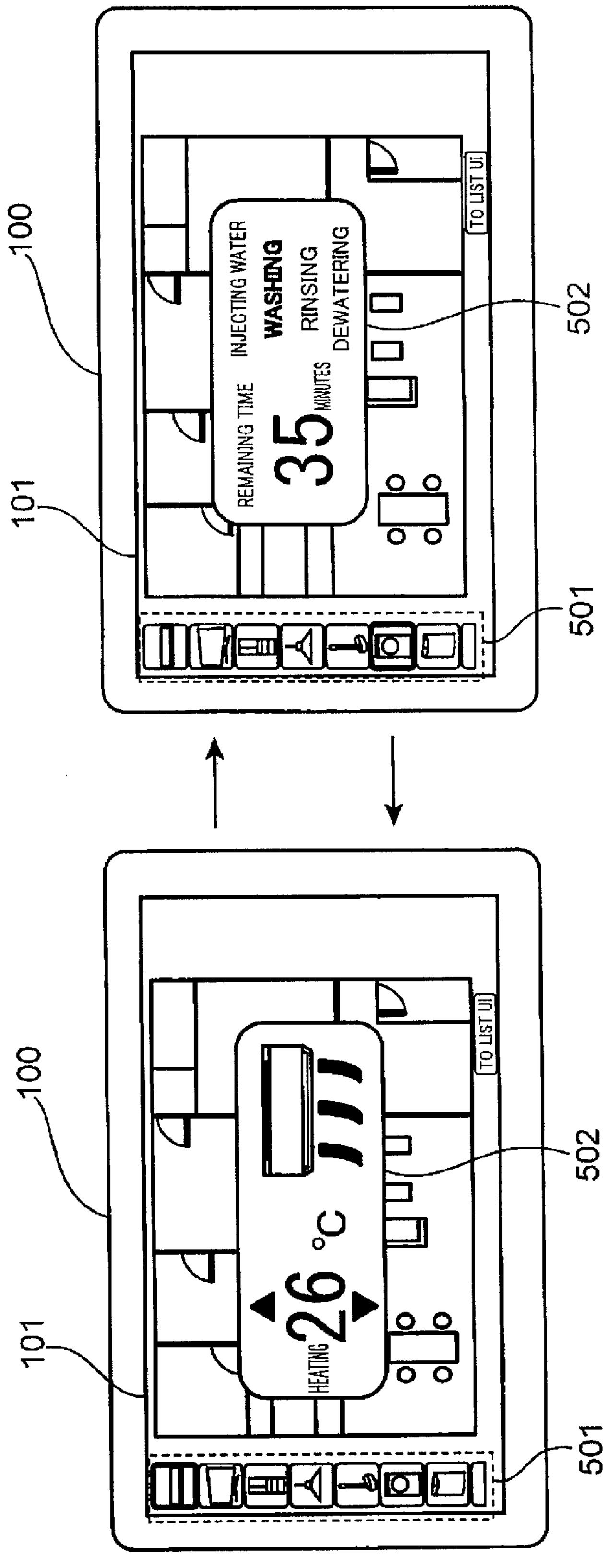
FIG. 20 is a diagram showing an example of transition from the display state of the device control screen of a certain device to the display state of the device control screen of another device according to the embodiment of the present disclosure.

Next, a method of switching from the display state of a certain device control screen 502 to the display state of another device control screen 502 will be described using FIG. 20. As shown in the left diagram of FIG. 20, in the display state of the device control screen 502 for the air conditioner, the user taps on the device icon 501 for the washing machine which is different from the device icon 501 for the air conditioner, and the touch panel control section 102 senses the tap. Then, as shown in the right diagram of FIG. 20, the display control section 103 erases the device control screen 502 which has been displayed, and displays the device control screen 502 corresponding to the device icon 501 for the washing machine as overlapped on the floor plan 500. Switching in the opposite direction is performed in the same manner.

Consequently, when the user successively selects different device icons 501, switching is successively performed between the device control screens 502, which allows the user to successively control different devices 200. That is, in causing another device control screen 502 to be displayed while a certain device control screen 502 is displayed, it is no longer necessary for the user to input an operation of erasing the certain device control screen 502, and switching can be performed between the device control screens 502 with one touch operation.

In the display state of the device control screen 502, in the case where the user taps on the device icon 501 corresponding to the device control screen 502 being displayed, the display control section 103 may only erase the device control screen 502, and may not return to the basic screen. Such screen transition is shown in FIG. 21.

Figure 21:
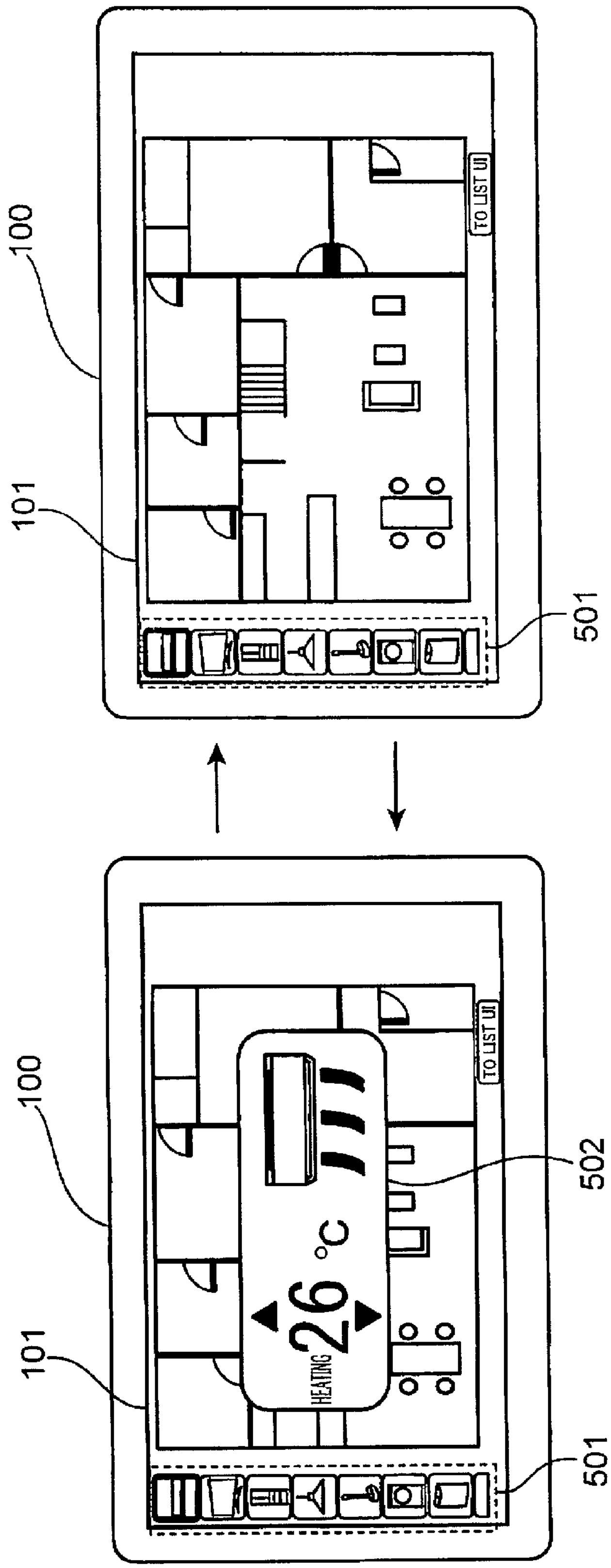
FIG. 21 is a diagram showing an example of transition between the display state and the hidden state of the device control screen of the home controller according to the embodiment of the present disclosure.

In the left diagram of FIG. 21, the device icon 501 for the air conditioner is selected by the user, and therefore the device control screen 502 for the air conditioner is displayed, and all the device icons 501 are displayed in one vertical line on the left side of the floor plan 500. In this state, the user taps on the device icon 501 for the air conditioner, and the touch panel control section 102 senses the tap. Then, as shown in the right diagram of FIG. 21, the display control section 103 erases only the device control screen 502 for the air conditioner with the device icons 501 kept displayed in one vertical line. In this case, the device icons 501 do not move onto the floor plan 500, and therefore a user's desire to cause only the floor plan 500 to be displayed may be met.

On the other hand, in the hidden state of the device control screen 502, the user selects a desired device icon 501, and the touch panel control section 102 senses the selection. Then, the display control section 103 displays the device control screen 502 corresponding to the selected device icon 501. For example, in the right diagram of FIG. 21, when the user selects the device icon 501 for the air conditioner from the device icons 501 disposed in one vertical line on the left side of the floor plan 500, the device control screen 502 for the air conditioner is displayed as shown in the left diagram of FIG. 21.

Figure 22:
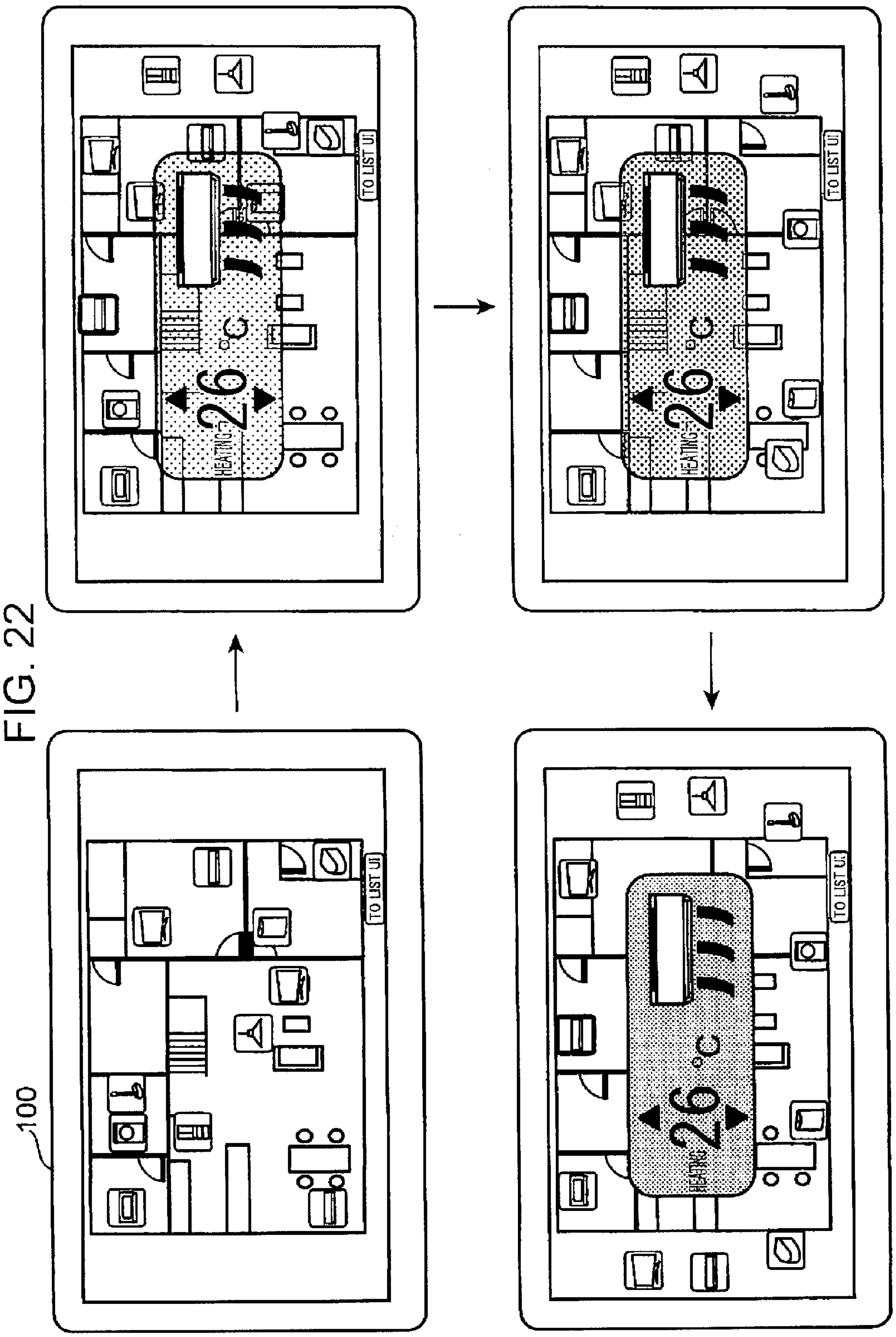
FIG. 22 is a diagram showing an example of an animation for transition from the basic screen of the home controller to the display state of the device control screen according to the embodiment of the present disclosure.

Next, transition from the display state of the basic screen to the display state of the device control screen 502 represented through an animation will be described using FIG. 22. As shown in the upper left diagram of FIG. 22, the user selects the device icon 501 for the air conditioner, for example, in the basic screen. Then, the display control section 103 gradually lowers the transparency of the device control screen 502 for the air conditioner in the order of the upper right diagram, the lower right diagram, and the lower left diagram of FIG. 22 to a final transparency of 0. At the same time, the display control section 103 moves all the device icons 501 onto the outer periphery of an ellipse that surrounds the device control screen 502.

Figure 23:
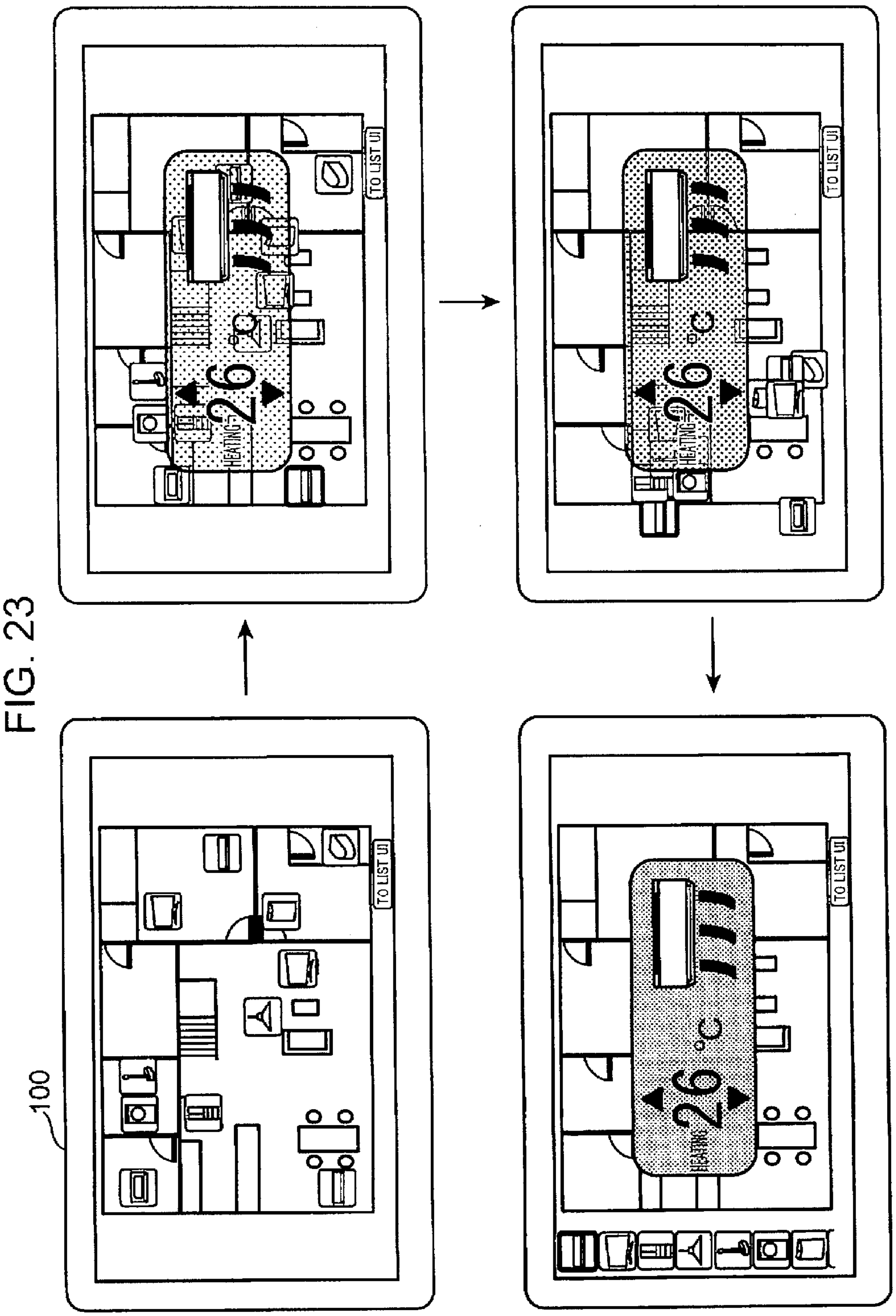
FIG. 23 is a diagram showing an example of an animation for transition from the basic screen of the home controller to the display state of the device control screen according to the embodiment of the present disclosure.

Next, transition from the display state of the basic screen to the display state of the device control screen 502 represented through an animation will be described using FIG. 23. As shown in the upper left diagram of FIG. 23, the user selects the device icon 501 for the device 200 which is the air conditioner, for example, in the basic screen. Then, the display control section 103 gradually decreases the transparency of the device control screen 502 for the air conditioner in the order of the upper right diagram, the lower right diagram, and the lower left diagram of FIG. 23 to a final transparency of 0. At the same time, the display control section 103 moves all the device icons to the left side of the floor plan 500.

Consequently, representing the screen transition through an animation can enhance the interest of the user in operating the device control screen 502 through screen rendering shown since the device icon 501 is selected until the device control screen 502 is displayed.

Figure 24:
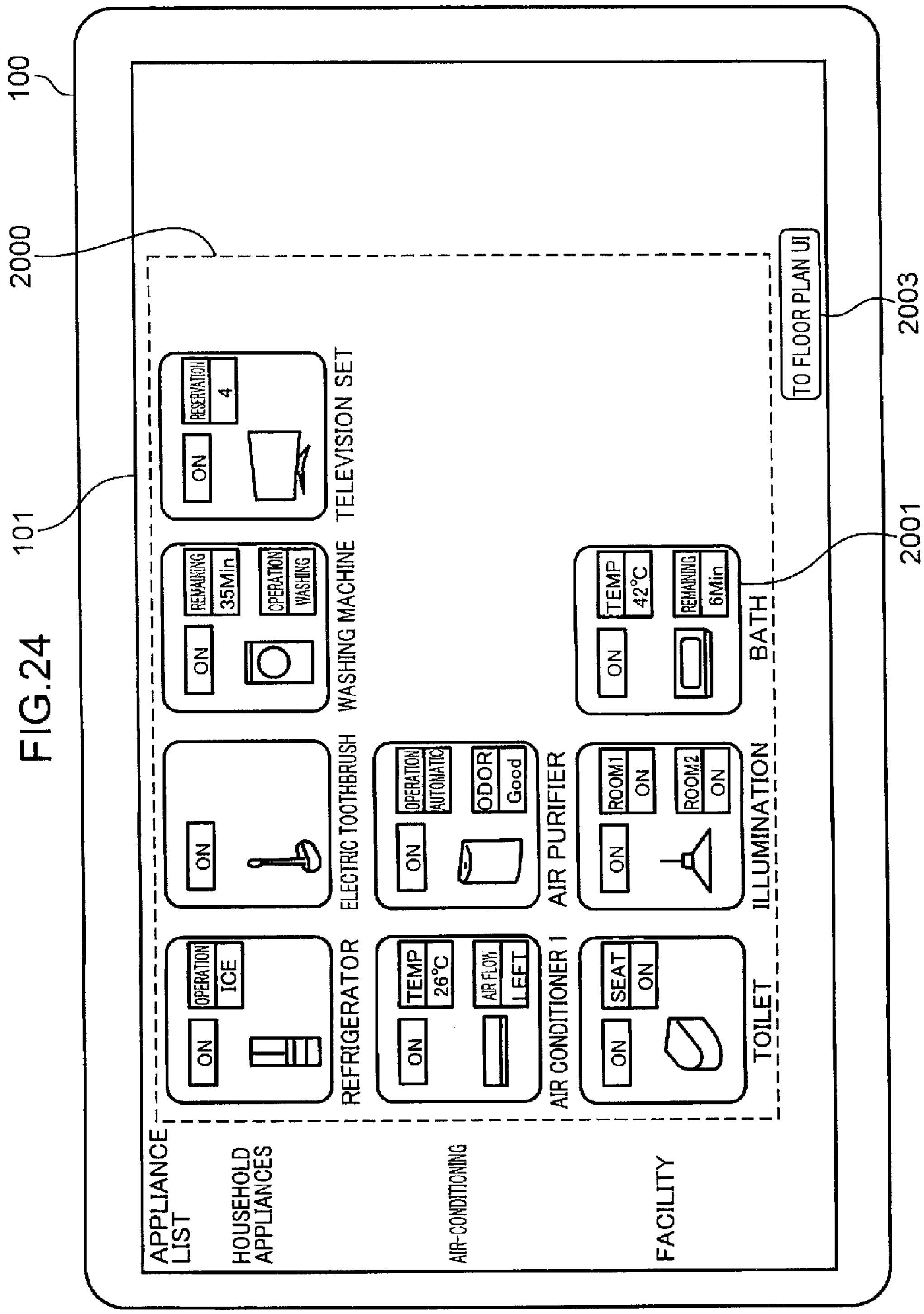
FIG. 24 is a diagram showing the configuration of a device icon list display screen of the home controller according to the embodiment of the present disclosure.

FIG. 24 is a diagram showing the configuration of a device list display screen. The device list display screen is displayed when the user taps on the device list display change button 503 in the basic screen shown in FIG. 5.

As shown in FIG. 24, the device list display screen includes a device list 2000, device details icons 2001, and a basic screen display button 2003.

When the user taps on the device details icon 2001 and the touch panel control section 102 senses the tap, the display control section 103 causes the device control screen 502 to be displayed as overlapped on the device list 2000. This allows the user to cause the device control screen 502 to be displayed and operate the device 200 as in the case where the device icon 501 is tapped on.

The device details icon 2001 is prepared for each device 200. The device details icon 2001 is different from the device icon 501 in representing not only an image representing the device 200 but also the on/off state and the operation state of the device 200. For example, the device details icon 2001 for the refrigerator displayed in the upper left of FIG. 24 displays not only an image of the refrigerator but also "ON", which indicates that the refrigerator is currently turned on, and "OPERATION/ICE", which indicates that the refrigerator is currently making ice.

In the device list 2000, the device details icons 2001 are displayed as classified on the basis of a classification criterion determined in advance. Examples of the classification criterion determined in advance include the type of the device 200, the room in which the device 200 is disposed, and the status of use of the device 200. In FIG. 24, the type of the device 200 is used as the classification criterion, and the device details icons 2001 are classified into three categories, namely the household appliance, air-conditioning, and facility categories.

In the example of FIG. 24, the refrigerator, an electric toothbrush, the washing machine, and the television set are classified into the household appliance category, the air conditioner and the air purifier are classified into the air-conditioning category, and the toilet, the illumination device, and the bath are classified into the facility category. In this case, a classification table that determines into which of the household appliance, air-conditioning, and facility categories each device 200 is classified on the basis of the content registered in the device type 3102 of the device list 3100 (see FIG. 35) is stored in advance in the storage section 104. Then, the display control section 103 may reference the classification table to classify each device into a category.

Returning to FIG. 24, the button with a text "TO FLOOR PLAN UI" displayed at the lower right of the device list 2000 is the basic screen display button 2003. The basic screen display button 2003 is a button for switching the screen from the device list display screen to the basic screen.

Although switching can be made between the basic screen and the device list display screen in the foregoing description, the device list display screen may be utilized as the basic screen in place of the basic screen shown in FIG. 5. In this case, the basic screen display button 2003 may be omitted.

In the foregoing description, one device details icon 2001 is correlated with one device 200. However, the embodiment is not limited thereto, and one device details icon 2001 may be correlated with a plurality of devices 200 so that the one device details icon 2001 may be used in common to the plurality of devices 200. For example, in the case where there are two illumination devices in a living room, the two illumination devices may be represented by one device details icon 2001.

In this case, when the device details icon 2001 representing the two illumination devices is tapped on by the user, the display control section 103 causes the display 101 to display a device control screen 502 that allows simultaneous control of the two illumination devices. In this case, the same effect as that obtained in the case where one device icon 501 is used in common to a plurality of devices 200 is obtained. In the case where one device details icon 2001 is used in common to a plurality of illumination devices, the device details icon 2001 may display the on/off state and the operation state of each of two illumination devices.

In the basic screen, the device details icon 2001 may be used in place of the device icon 501. In the device list display screen, the device icon 501 may be used in place of the device details icon 2001. In addition, the device control screen 502 displayed in the case where the device details icon 2001 is selected and the device control screen 502 displayed in the case where the device icon 501 is selected may be the same as or different from each other. For example, the device details icon 2001 contains more information than that of the device icon 501, and therefore the device control screen 502 displayed in the case where the device details icon 2001 is selected may include more buttons and states than those of the device control screen 502 displayed in the case where the device icon 501 is selected.

Figure 25:
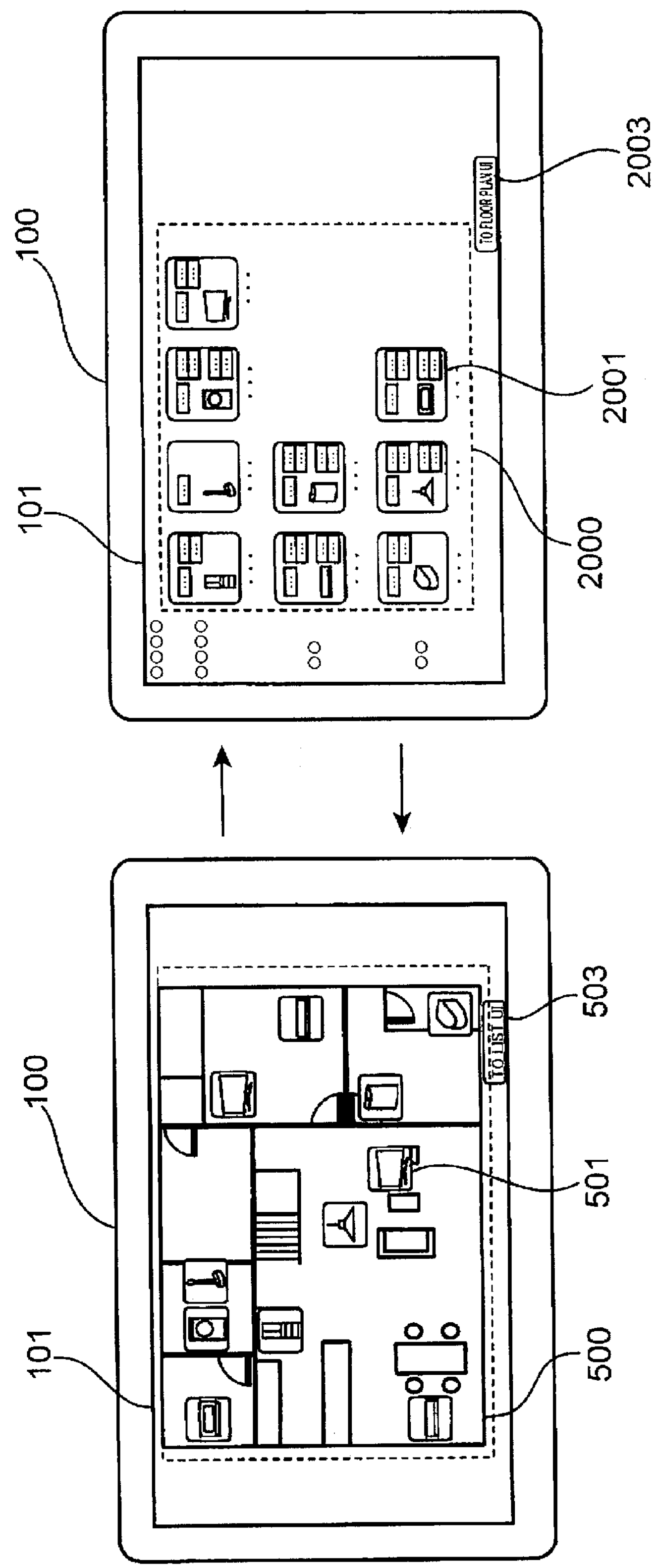
FIG. 25 is a diagram showing an example of transition between the basic screen of the home controller and the device icon list display screen according to the embodiment of the present disclosure.

FIG. 25 is a diagram showing screen transition between the basic screen and the device list display screen. In the basic screen shown in the left diagram of FIG. 25, when the device list display change button 503 is selected by the user, display on the display 101 is switched to the device list display screen shown in the right diagram of FIG. 25. On the other hand, in the device list display screen shown in the right diagram of FIG. 25, when the basic screen display button 2003 is selected by the user, display on the display 101 is switched to the basic screen shown in the left diagram of FIG. 25.

Specifically, when the touch panel control section 102 senses a tap on the basic screen display button 2003, the display control section 103 switches the display screen on the display 101 to the basic screen showing the device list display screen. On the other hand, in the display state of the basic screen, when the touch panel control section 102 senses a tap on the device list display change button 503, the display control section 103 switches the display screen on the display 101 from the basic screen to the device list display screen.

For example, in the case where the device list display screen is selected for display, and in the case where the user attempts to operate the television set located in front of the user, the device list display screen includes only one device details icon 2001 for the television set if there is only one television set in the house. This allows the user to directly select the device details icon 2001 for the television set without an erroneous operation, and to cause the device control screen 502 corresponding to the television set to be displayed.

On the other hand, in the case where the device list display screen is selected, the device list display screen focuses on the individual devices 200, and thus the relationship between the device 200 and the location at which the device 200 is disposed is unclear, although it is possible to operate or confirm the state of the individual devices 200. Therefore, for a plurality of devices 200 installed within the same building, such as the air conditioners or the illumination devices, for example, it is unclear the air conditioner or the illumination device in which room is the control target, which may incur an erroneous operation.

Thus, in the embodiment, the basic screen is provided in addition to the device list display screen to allow selection from the basic screen and the device list display screen.

Consequently, in the case where the basic screen is selected, the relationship between the device 200 and the location at which the device 200 is disposed is made definite. Therefore, also for a plurality of devices 200 of the same type installed in the same building, such as the air conditioners or illumination devices, for example, a discrimination as to the air conditioner or the illumination device in which room is the control target is facilitated. This prevents the air conditioner or the illumination device installed in a room that is different from the desired room from being erroneously operated.

Figure 26:
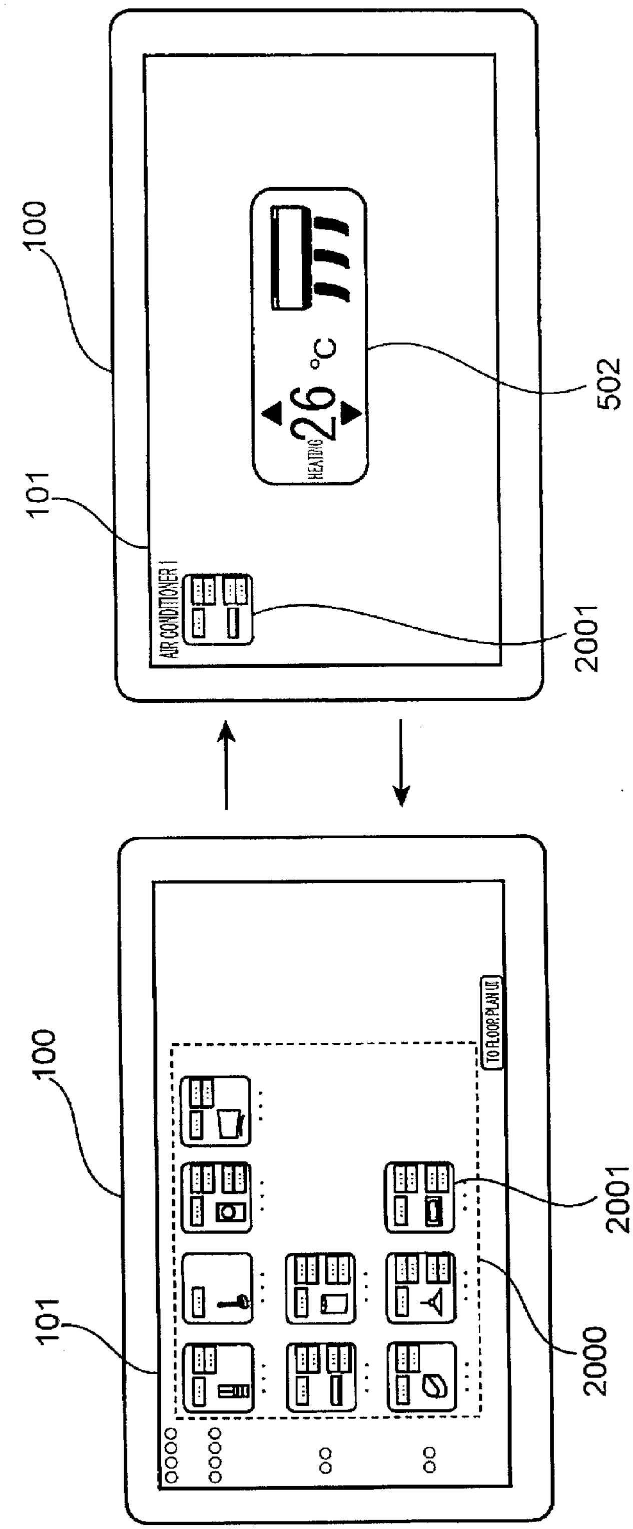
FIG. 26 is a diagram showing an example of transition between the device icon list display screen of the home controller and the display state of the device control screen according to the embodiment of the present disclosure.

FIG. 26 is a diagram showing screen transition between the display state of the device list display screen and the display state of the device control screen 502. In the device list display screen shown in the left diagram of FIG. 26, the user selects the device details icon 2001 for the device 200 (here, the air conditioner) that is desired to be controlled, and the touch panel control section 102 senses the selection. Then, as shown in the right diagram of FIG. 26, the display control section 103 displays the device control screen 502 for the air conditioner corresponding to the selected device details icon 2001 as overlapped on the device list display screen. This results in transition from the display state of the device list display screen to the display state of the device control screen 502.

In the example in the right drawing of FIG. 26, the display control section 103 hides the device details icons 2001 for devices other than the air conditioner selected by the user, and only the device details icon 2001 for the air conditioner is displayed at a position that is different from that in the device control screen 502. This allows the user to definitely recognize the device details icon 2001 that the user himself/herself selected.

On the other hand, as shown in the right diagram of FIG. 26, in the display state of the device control screen 502, the user selects the device details icon 2001 for the air conditioner, and the touch panel control section 102 senses the selection. Then, as shown in the left diagram of FIG. 26, the display control section 103 erases the device control screen 502, and returns from the display state of the device control screen 502 to the display state of the device list display screen.

Although only one device details icon 2001 is displayed in the display state of the device control screen 502 shown in the right diagram of FIG. 26, other device details icons 2001 that are not selected by the user may be displayed in the same manner as in FIG. 13. In this case, the plurality of device details icons 2001 may be displayed in one line at an end of the screen as shown in FIG. 13, or may be displayed so as to surround the device control screen 502 as shown in FIG. 12.

According to the configuration, the user can successively select the device details icons 2001 in the display state of the device control screen 502 to successively display other device control screens 502. Consequently, in causing another device control screen 502 to be displayed while a certain device control screen 502 is displayed, it is no longer necessary for the user to input an operation of erasing the certain device control screen 502, and switching can be performed between the device control screens 502 with one touch operation.

Figure 27:
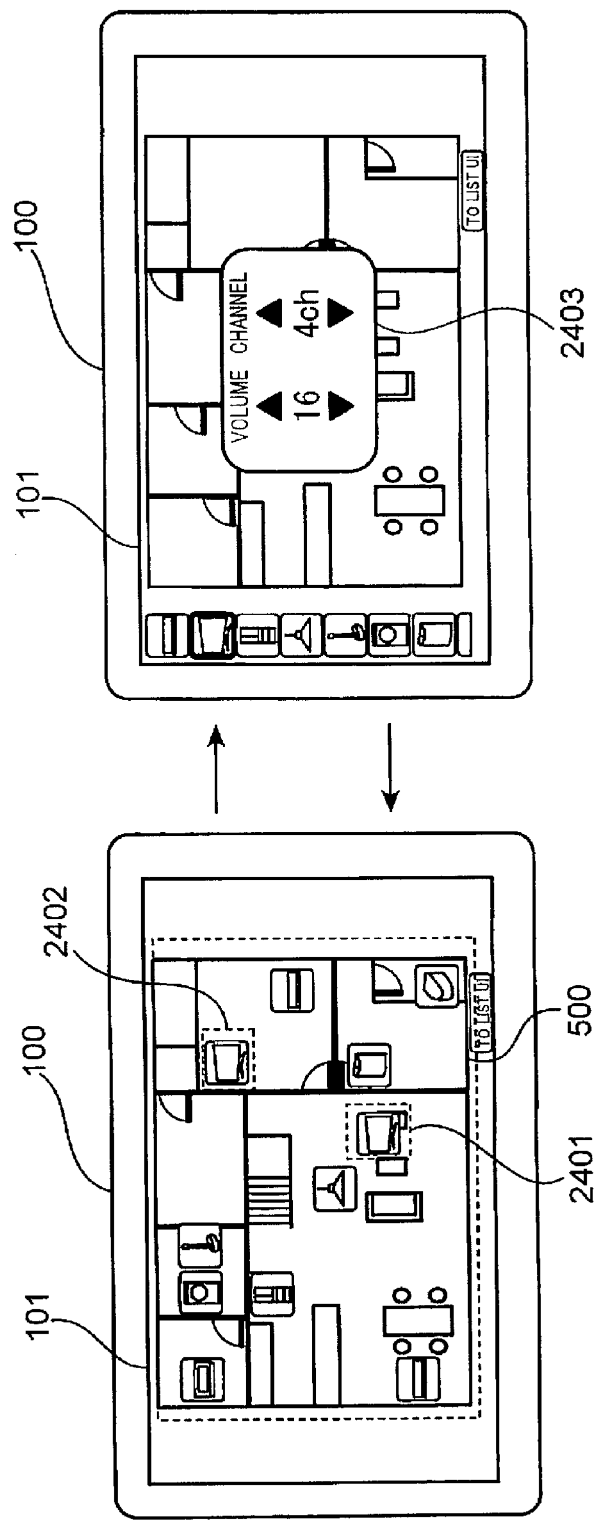
FIG. 27 is a diagram showing an example of transition between the basic screen of the home controller and the display state of the device control screen according to the embodiment of the present disclosure.

FIG. 27 is a diagram showing screen transition between the display state of the basic screen and the display state of the device control screen 502 performed in the case where the basic screen includes a plurality of device icons 501 representing the devices 200 of the same type. As shown in the left diagram of FIG. 27, the basic screen includes two device icons 501 for the television set. Here, the device icon 501 for a television set A is represented as a device icon 2401, and the device icon 501 for a television set B is represented as a device icon 2402. At this time, the user can intuitively select a television set that is desired to be controlled from the floor plan 500, and operate the television set.

For example, in the right diagram of FIG. 27, the device icon 2401 for the television set A is selected, and a device control screen 2403 for the television set A is displayed. Consequently, even if there are a plurality of device icons 501 for the devices 200 of the same type, each device icon 501 is disposed at a position on the floor plan 500 corresponding to the actual installation position. This allows the user to intuitively select the device icon 501 for a device 200 that is desired to be controlled in accordance with the display position on the floor plan 500, which prevents the device control screen 502 for another device 200 from being erroneously displayed.

Figure 28:
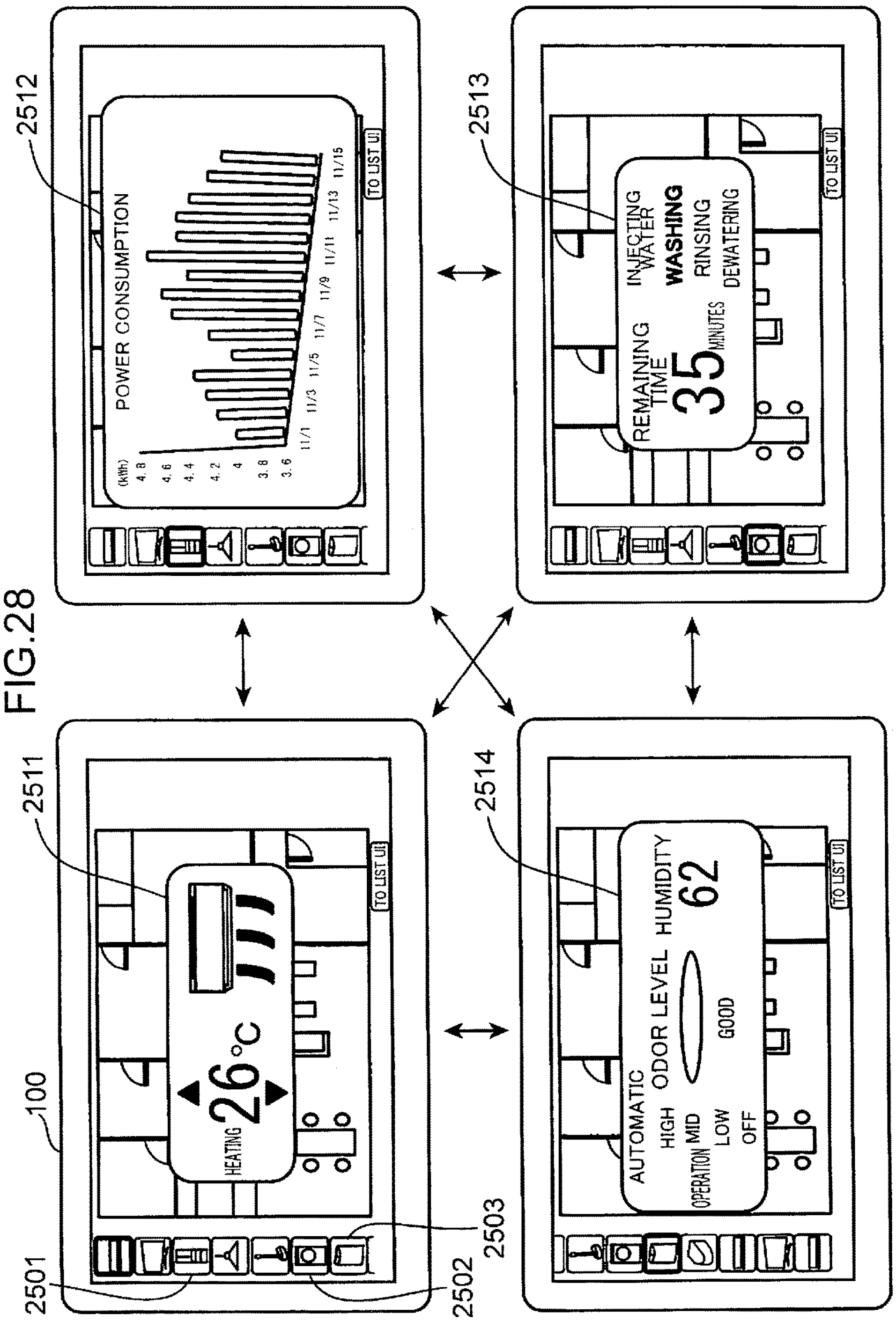
FIG. 28 is a diagram showing how the home controller successively transitions among the display states of the device control screens for different devices according to the embodiment of the present disclosure.

FIG. 28 is a diagram showing screen transition performed in the case where different device icons 501 are successively selected in the display state of the device control screen 502 to successively switch between the device control screens 502. In the upper left diagram, a device control screen 2511 for the air conditioner is displayed. When the device icon 2501 for the refrigerator is selected in this state, a device control screen 2512 for the refrigerator is displayed on the display 101 as shown in the upper right diagram. When the device icon 2502 for the washing machine is selected in the upper left diagram, a device control screen 2513 for the washing machine is displayed as shown in the lower right diagram. When the device icon 2503 for the air purifier is selected in the upper left diagram, a device control screen 2514 for the air purifier is displayed as shown in the lower left diagram. Such screen transition is performed in the same manner in the upper right diagram, the lower right diagram, and the lower left diagram.

Consequently, when the user selects the device icon 501 in the display state of the device control screen 502, the device control screen 502 corresponding to the device icon 501 can be directly displayed. Therefore, in the case where another device control screen 502 is to be displayed while a certain device control screen 502 is displayed, the other device control screen 502 can be displayed with one touch operation without inputting an operation of erasing the device control screen 502 being displayed. This allows the user to smoothly switch between the device control screens 502.

Figure 29:
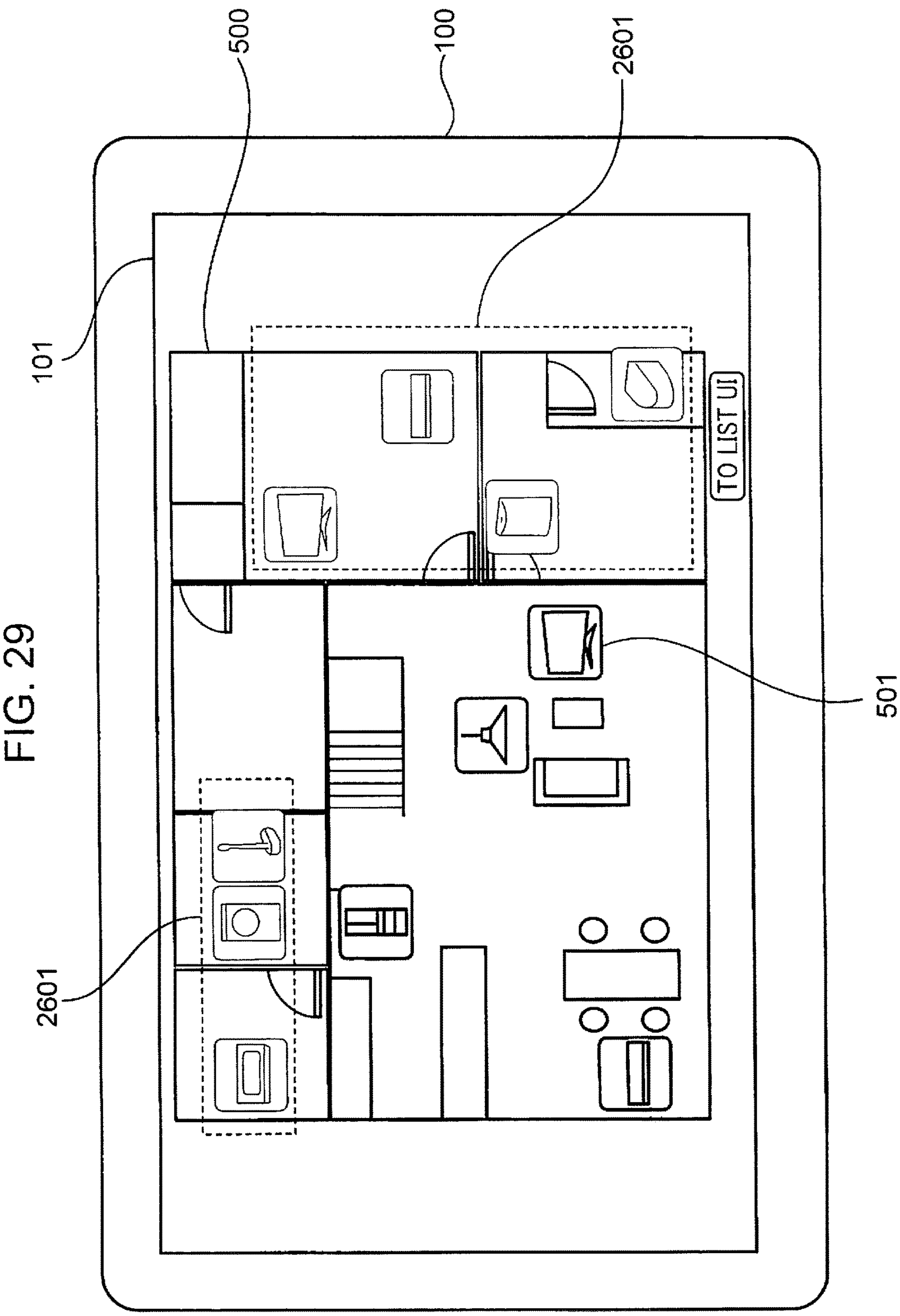
FIG. 29 is a diagram showing an example of display on the basic screen of devices that cannot be detected on a network according to the embodiment of the present disclosure.

FIG. 29 is a diagram showing an example of display on the basic screen of the device icons 501 for incommunicable devices 200 that cannot be detected on the network. The device management section 105 detects a device 200 that cannot be detected on the network and a device 200 that does not respond to a control command even though registered in the device list 3100 as incommunicable devices 200. Then, the display control section 103 displays the device icons 501 for the incommunicable devices 200 in a display mode that is different from that for the device icons 501 for communicable devices 200.

For example, in FIG. 29, the device icons 501 for the incommunicable devices 200 are represented as device icons 2601. The device icons 2601 are displayed translucently. This allows the user to immediately recognize that the devices 200 indicated by the device icons 2601 are currently out of order or cannot be controlled because of occurrence of a communication failure.

Although the device icons 2601 are displayed translucently in FIG. 29, the embodiment is not limited thereto. For example, the device icons 2601 may be displayed in a fainter color or more darkly than the other device icons 501, or provided with an annotation mark.

Figure 30:
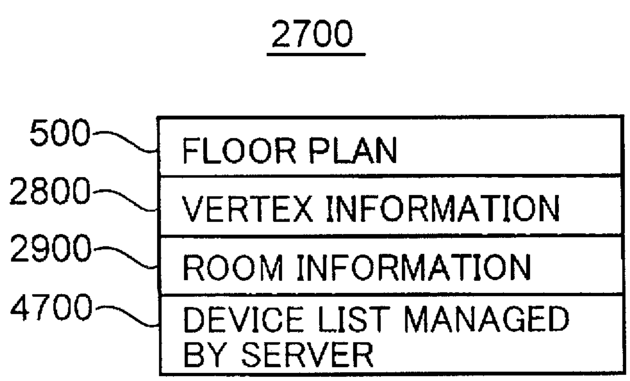
FIG. 30 is a diagram showing the configuration of home information according to the embodiment of the present disclosure.

FIG. 30 is a diagram showing the configuration of home information 2700. The home information 2700 is managed by the server 300 for each house, and the home controller 100 controls display on the basic screen, the device control screen 502, and so forth on the basis of the home information 2700. As shown in FIG. 30, the home information 2700 includes the floor plan 500, vertex information 2800, the room information 2900, and a device list 4700 managed by the server.

As shown in FIG. 6, the floor plan 500 is a plan view that is prepared for each floor of a house and that planarly represents the arrangement and the shape of one or more rooms forming the floor. In the embodiment, the floor plan 500 includes a plan view formed from image data represented in a bitmap format, for example.

The vertex information 2800 is information for adapting the floor plan 500 to a two-dimensional coordinate-axis space to allow the home controller 100 to interpret the floor plan 500. The room information 2900 is information for deciding the regions of rooms from the vertex information 2800. The vertex information 2800, the room information 2900, and the device list 4700 managed by the server will be described in detail below.

FIG. 31 is a diagram showing the configuration of the vertex information 2800. As shown in FIG. 31, the vertex information 2800 includes a vertex ID 2801 and a vertex coordinate 2802. The vertex ID 2801 is an identifier that identifies a vertex on the floor plan 500. The vertex coordinate 2802 is a coordinate represented in the format of (X coordinate, Y coordinate, floor number), and indicates the position of a vertex of a partition line or the like represented on the floor plan 500. For example, the vertex with a vertex ID of B has a vertex coordinate (X20, Y0, Z1), which represents the position on the first floor (the ground floor) with an X coordinate of 20 and a Y coordinate of 0.

Figure 33:
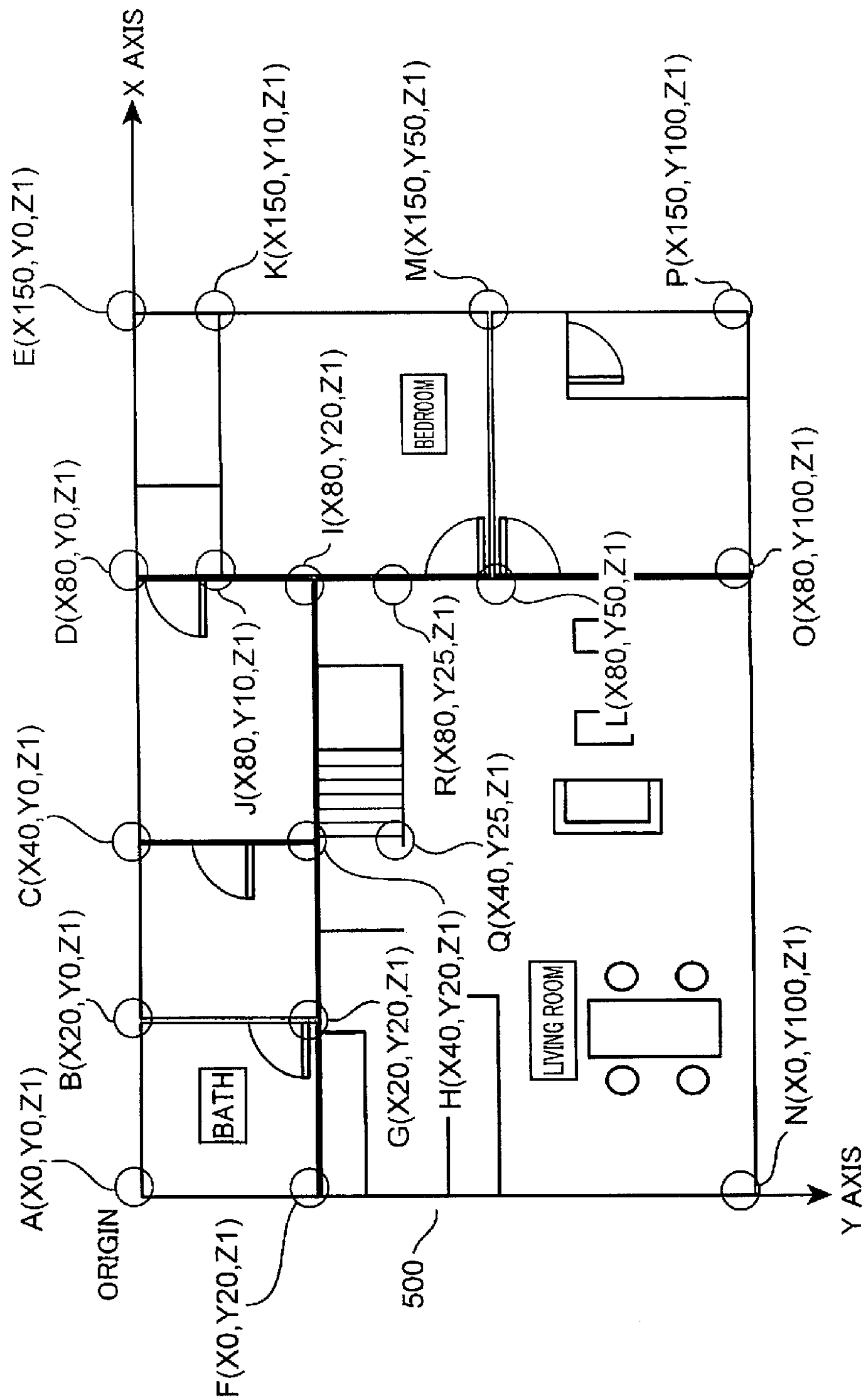
FIG. 33 is a diagram showing an example of the correspondence between the vertex information and the floor plan for the first floor according to the embodiment of the present disclosure.

FIG. 33 is a diagram showing the correlation between each vertex registered in the vertex information 2800 and the floor plan 500. It should be noted, however, that in FIG. 33, the upper left vertex of the floor plan 500 is the origin (with an X coordinate of 0 and a Y coordinate of 0). For example, the vertex with a vertex ID of A has a vertex coordinate (X0, Y0, Z), and therefore is positioned at the origin. Meanwhile, the vertex with a vertex ID of B has a vertex coordinate (X20, Y0, Z1), and therefore is positioned at the upper right vertex of the bath.

FIG. 32 is a diagram showing the configuration of the room information 2900. As shown in FIG. 32, the mom information 2900 includes a room ID 2901, the room type 2902, and a room coordinate 2903. The room ID 2901 is an identifier that identifies a room on the floor plan 500. The room type 2902 indicates the type of the room. The room coordinate 2903 is expressed by a set of the vertex IDs 2801, and decides the region of the room on the floor plan 500. For example, the room with a room ID of C is the bath, and indicates a region formed by connecting the vertexes with vertex IDs of A, B, G, and F sequentially in this order on the floor plan 500. The room information 2900 includes not only information on the rooms but also information on the staircase. The region with a room ID of D formed by connecting the vertexes with vertex IDs of H, 1, R, and Q sequentially in this order represents the staircase.

Consequently, with the vertex information 2800 and the room information 2900 provided, the home controller 100 can specify the regions of the rooms represented on the floor plan 500 by plotting the vertexes indicated by the vertex information 2800 on the image data for the floor plan 500 and connecting the vertexes indicated by the room coordinate 2903, and recognize the type of the rooms from the room type 2902.

The vertex information 2800 may be generated by a system administrator by causing the floor plan 500 to be displayed on a display of a personal computer, detecting vertexes from the displayed floor plan, and inputting the vertex ID and the vertex coordinate of the detected vertexes to the personal computer. The vertex information 2900 may also be generated by the system administrator by detecting rooms from the floor plan displayed on a display, and inputting the room ID, the room type, and the room coordinate of the detected rooms to a personal computer. Alternatively, the vertex information 2800 and the room information 2900 may be generated by taking in CAD data which are the original data for the floor plan 500.

FIG. 34 is a diagram showing the configuration of the device list 4700 managed by the server 300. As shown in FIG. 34, the device list 4700 includes a device ID 4701, a device type 4702, a model number 4703, an arrangement 4704, a capability information 4705, and a control command transmission destination 4706.

The device ID 4701 is the identifier of the device 200. The device type 4702 indicates the type of the device 200. The model number 4703 indicates the model number of the device 200. The arrangement 4704 is a coordinate represented in the format of (X coordinate, Y coordinate, floor number) as with the vertex coordinate 2802, and indicates the arrangement of the device icon 501 corresponding to the device 200 on the floor plan 500.

The display control section 103 can dispose the device icon 501 on the floor plan 500 on the basis of the arrangement 4704, and display the basic screen and so forth. The capability information 4705 indicates the content for control of the device 200 and the state that can be acquired from the device 200. For example, the air conditioner with a device ID of A can be controlled for the temperature, the air flow direction, and the air flow amount. The control command transmission destination 4706 indicates the transmission destination of a control command for controlling the device 200. For example, the control command transmission destination 4706 for the air conditioner with a device ID of A is the device, and therefore a control command is directly transmitted from the home controller 100 to the device 200. Meanwhile, the control command transmission destination 4706 for the refrigerator with a device ID of C is the server, and therefore a control command is transmitted from the home controller 100 to the device 200 via the server 300. The control command is a command for operating the device 200 or confirming the state of the device 200.

The current state of the device 200 may be registered in the device list 4700. This allows the server 300 to notify the home controller 100 of the state of the relevant device 200 in the case where a request for confirmation of the state of the device 200 is made from the home controller 100.

As discussed above, in order to dispose the device icon 501 on the floor plan 500 on the basis of the actual arrangement of the device 200 within the house, the user moves the device icon 501 to an appropriate position on the floor plan 500. Thus, for the device icon 501 of which the arrangement on the floor plan 500 is not specified by the user, a value that indicates an unset arrangement such as (0, 0, 0) is set as the value of the arrangement 4704. The display control section 103 displays the device icon 501 with the arrangement 4704 unset at a position on the display 101 determined in advance.

The device list 4700 managed by the server may be omitted from the home information 2700. In this case, the home controller 100 may directly acquire from the device 200 information corresponding to the device type 4702, the model number 4703, and the capability information 4705 provided in the device list 4700 managed by the server.

FIG. 35 is a diagram showing the configuration of the device list 3100 managed by the home controller 100. The home controller 100 disposes the device icons 501 on the floor plan 500 in the basic screen and controls the devices 200 on the basis of information in the device list 3100.

The device list 3100 includes the device ID 3101, the device type 3102, a model number 3103, the arrangement 3104, capability information 3105, a control command transmission destination 3106, and an IP address 3107. The device ID 3101 to the control command transmission destination 3106 are the same in content as those with the same name in FIG. 34.

In the device list 3100, the content of the device type 3102, the model number 3103, the arrangement 3104, the capability information 3105, the control command transmission destination 3106 can be acquired by the device management section 105 by transmitting the device list 4700 from the server 300. The IP address 3107 is acquired from the device 200 by the device management section 105. It should be noted, however, that the device management section 105 may give priority to the content of the device type 3102, the model number 3103, the capability information 3105, and the control command transmission destination 3106 that can be directly acquired from the device 200 in the case where such content is available.

The control command transmission destination 3106 may be determined in advance by the home controller system, may be automatically decided on the basis of the state of the network to which the home controller 100 is connected, or may be set by the user, rather than being acquired from the server 300 or the device 200.

Next, the flow of control performed on the device 200 by the home controller 100 will be described using the drawings.

Figure 36:
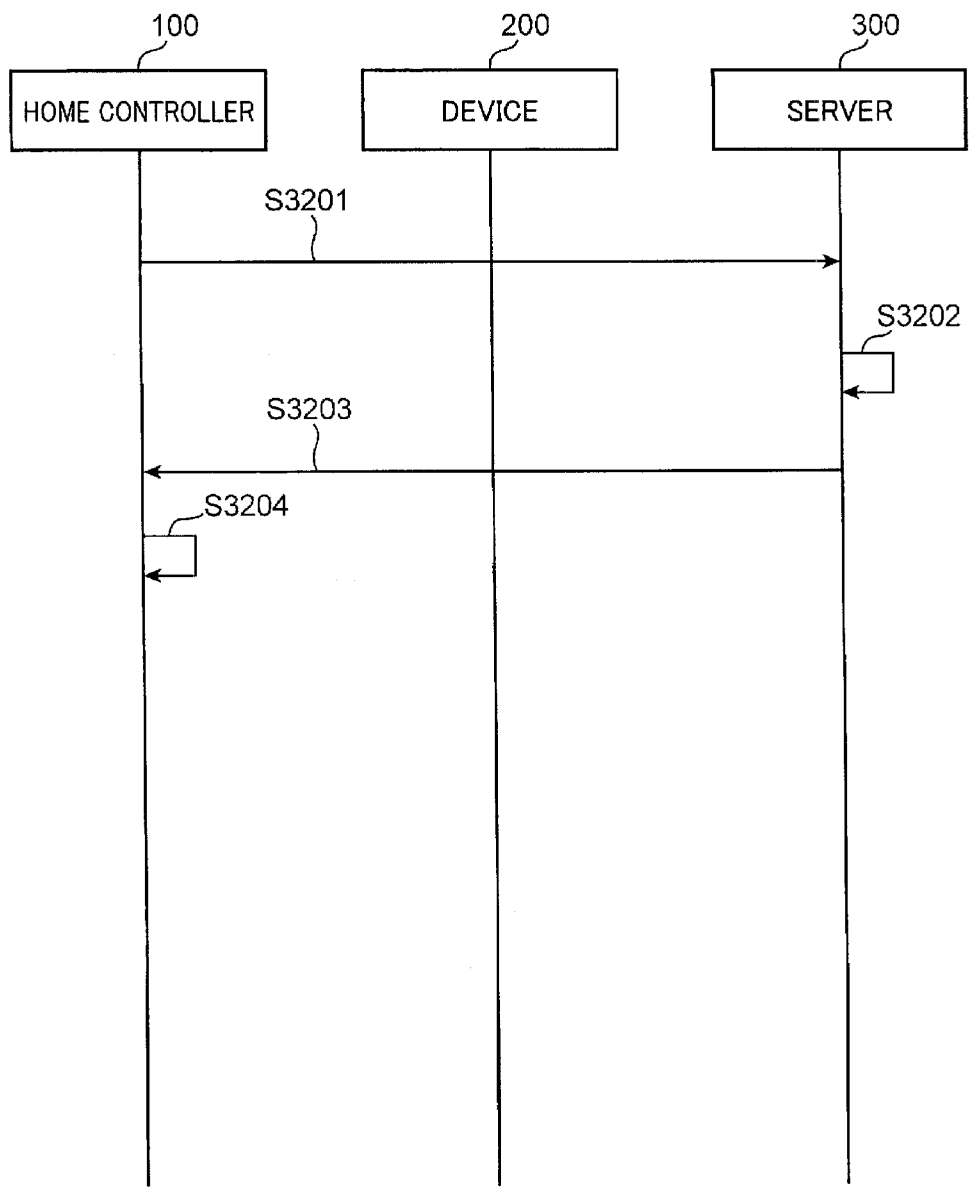
FIG. 36 is a sequence diagram showing the flow of a process for the home controller to acquire the home information from the server according to the embodiment of the present disclosure.

FIG. 36 is a sequence diagram showing the flow of a process for the home controller 100 to acquire the home information 2700 from the server 300. The home controller 100 acquires the home information 2700 from the server 300 at desired timing such as when the home controller 100 is initially utilized or started, and generates the basic screen shown in FIG. 5 on the basis of the acquired home information 2700.

First, the device management section 105 of the home controller 100 transmits a home information request to the server 300 (S3201). Here, the home information request includes at least a home controller ID that indicates a user or a home that utilizes the home controller 100. The home information management section 301 of the server 300 which receives the home information request searches the storage section 304 for the home information 2700 corresponding to the home controller ID (S3202), and transmits the home information 2700 to the home controller 100 (S3203). The device management section 105 of the home controller 100 stores the home information 2700 received from the server 300 in the storage section 104, and the display control section 103 generates a basic screen on the basis of the home information 2700, and displays the basic screen on the display 101 (S3204).

Next, the flow of a process for the home controller 100 to detect the device 200 on the network after the home controller 100 is connected to the network will be described using FIG. 37.

Figure 37:
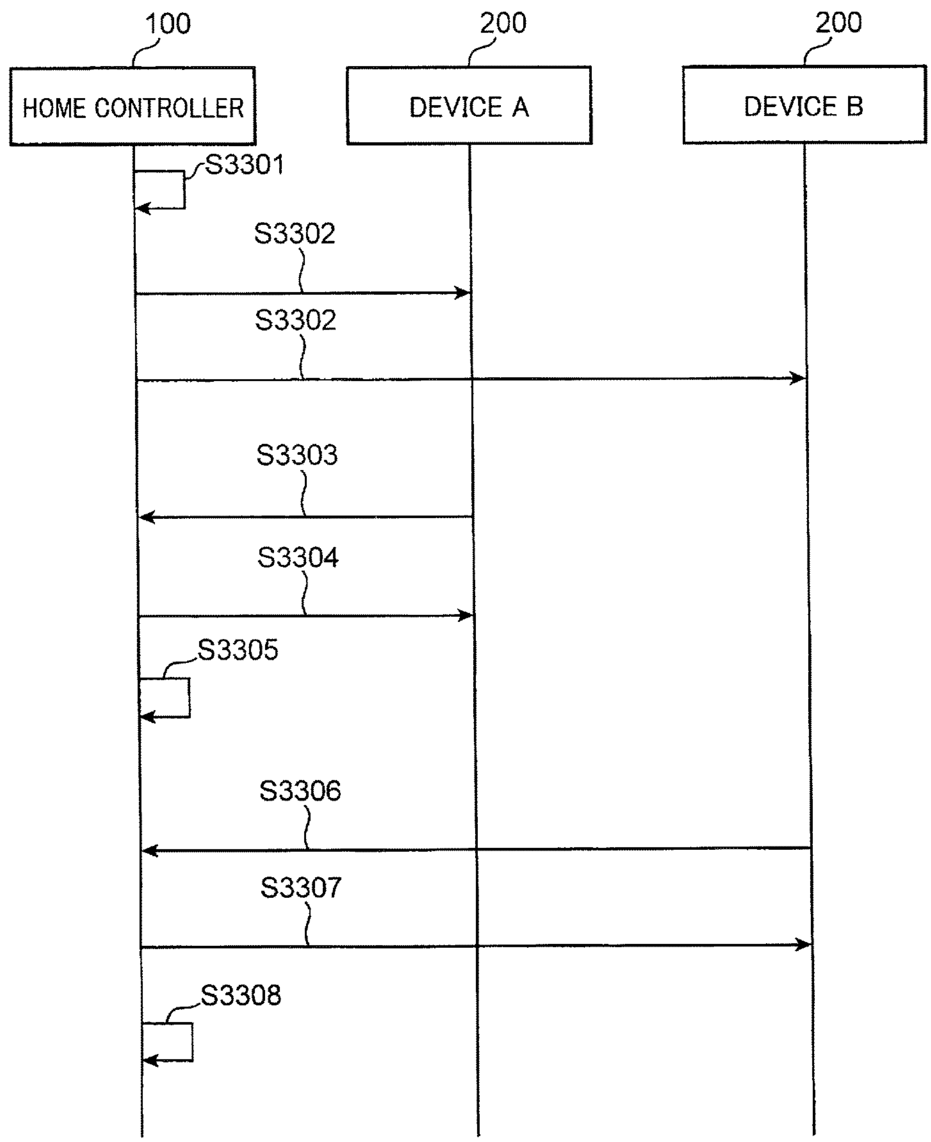
FIG. 37 is a sequence diagram showing the flow of a process for the home controller to detect a device on a network when the home controller is connected to the network according to the embodiment of the present disclosure.

In FIG. 37, a device A 200 with a device ID of A and a device B 200 of a device ID of B shown in FIG. 31 are connected to the network.

When the home controller 100 is connected to the network when the home controller 100 is initially utilized or turned on (S3301), the device management section 105 of the home controller 100 broadcasts a device search request to all the devices 200 on the network (S3302). The device A 200 which receives the device search request returns a device search response to the home controller 100 (S3303). The home controller 100 which receives the device search response acquires device information from the device A 200 (S3304), and updates the display screen (S3305).

Similarly, the device B 200 which receives the device search request returns a device search response to the home controller 100 (S3306). The home controller 100 which receives the device search response acquires device information from the device B 200 (S3307), and updates the display screen (S3308). Here, the device information is information that represents the device type, the model number, the capability information, and so forth of the device 200. The device management section 105 of the home controller 100 generates the device list 3100 (see FIG. 35) on the basis of the device information.

Figure 38:
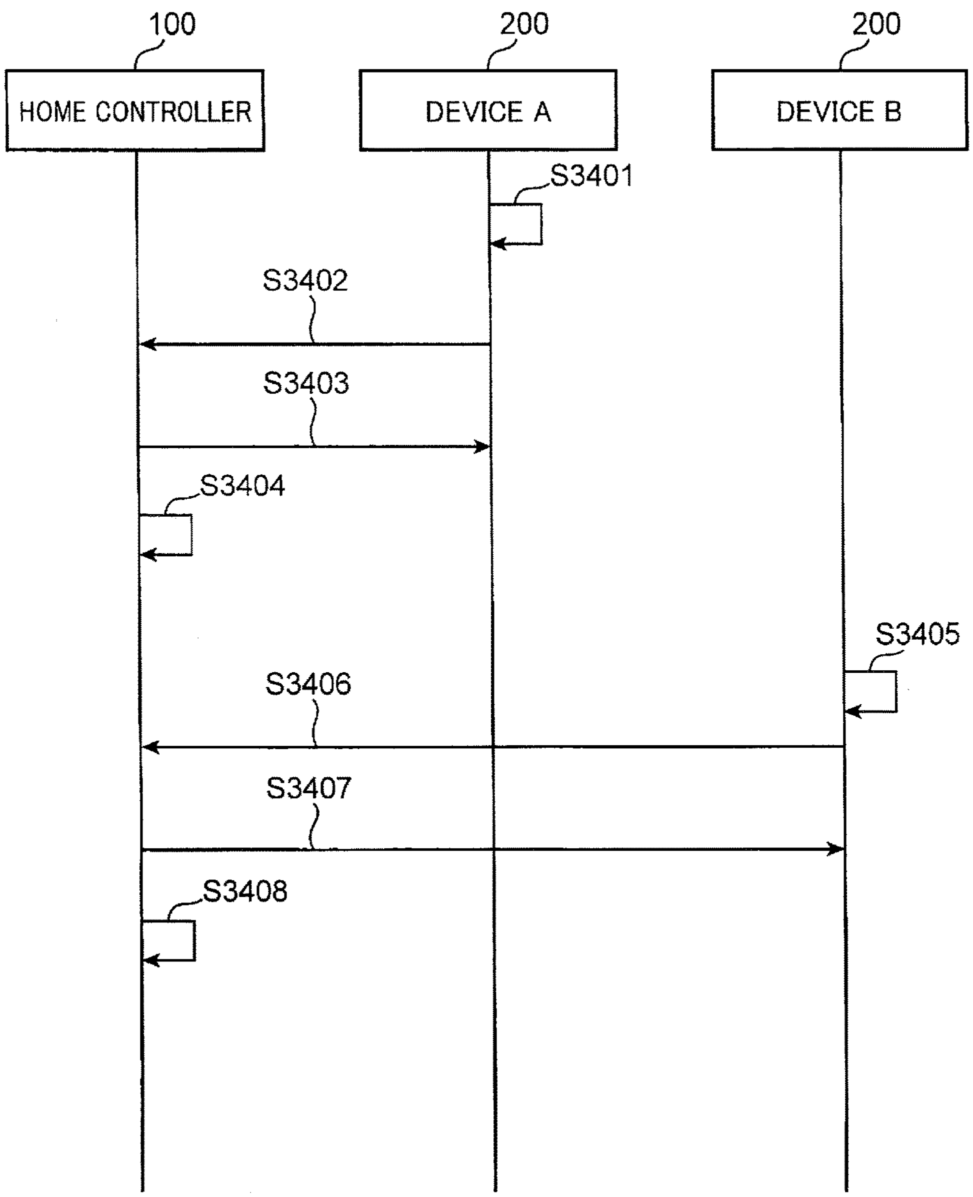
FIG. 38 is a sequence diagram showing the flow of a process for the home controller to detect a device on a network when the device is connected to the network according to the embodiment of the present disclosure.

Next, the flow of a process for the home controller 100 to detect the device 200 on the network when the device 200 is connected to the network will be described using FIG. 38. When the device A 200 is connected to the network when the device A 200 is initially utilized or turned on (S3401), a network connection notification is broadcast to all the home controllers 100 on the network (S3402). In the home controller 100 which receives the network connection notification, the device management section 105 acquires device information from the device A 200 (S3403), and the display control section 103 updates the display screen (S3404). When the device B 200 is connected to the network, the same process as for the device A 200 is performed (S3405 to S3408).

Here, the update of the display screen of the home controller 100 in FIGS. 37 and 38 (S3305, S3308, S3404, and S3408) will be described. The home controller 100 hides the device icon 501 corresponding to the device 200 until the device search response or the network connection notification is received from the device 200, that is, until the device 200 is detected on the network. Then, the home controller 100 which receives the device search response displays the device icon 501 for the corresponding device 200 on the screen. Alternatively, the home controller 100 displays the device icon 501 for the undetected device 200 in a faint color (for example, translucently) compared to the device icon 501 for the detected device 200. Then, the home controller 100 which receives the device search response changes the color of the device icon 501 for the undetected device 200 to the same color as the color of the device icon 501 for the detected device 200.

Figure 39A:
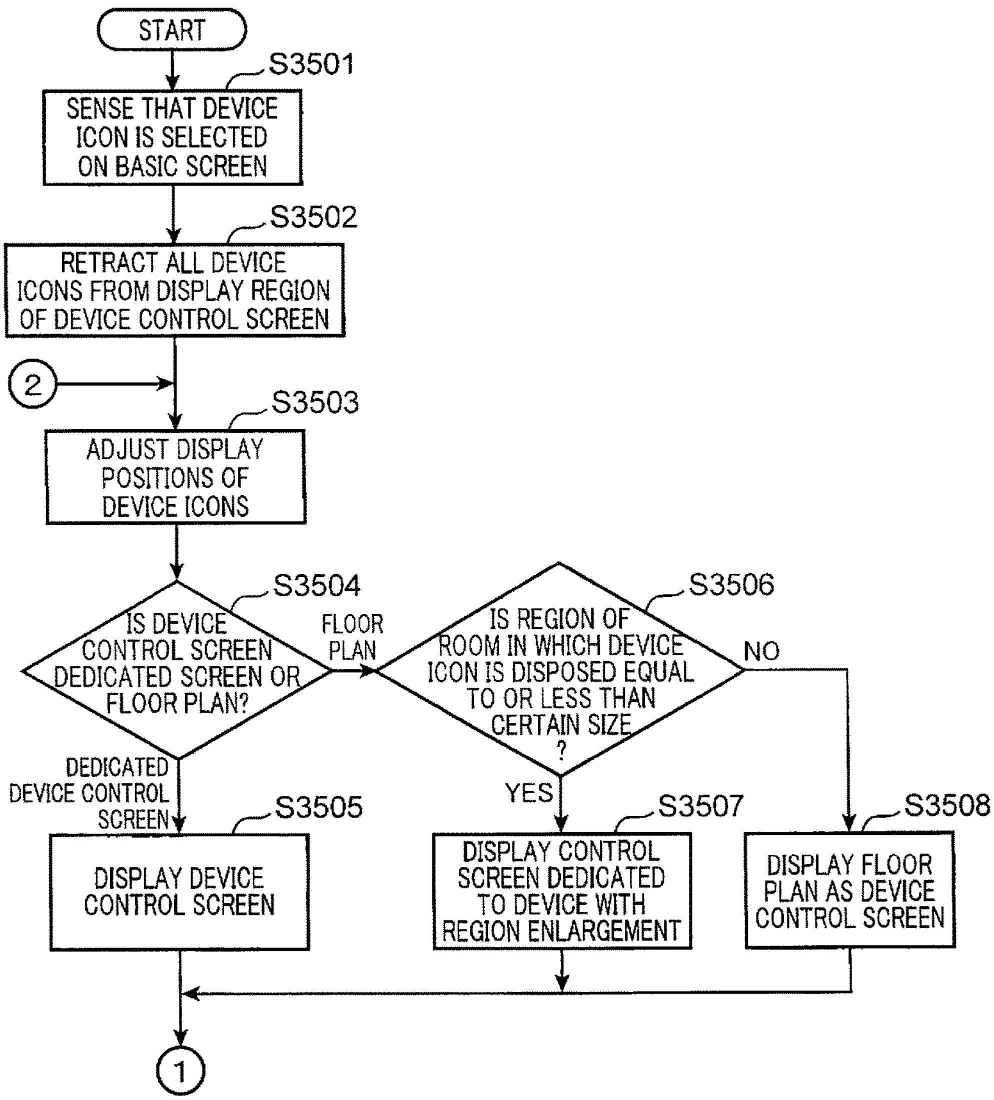
FIG. 39A is a flowchart showing the flow of a process for the home controller to control a device according to the embodiment of the present disclosure.
Figure 39B:
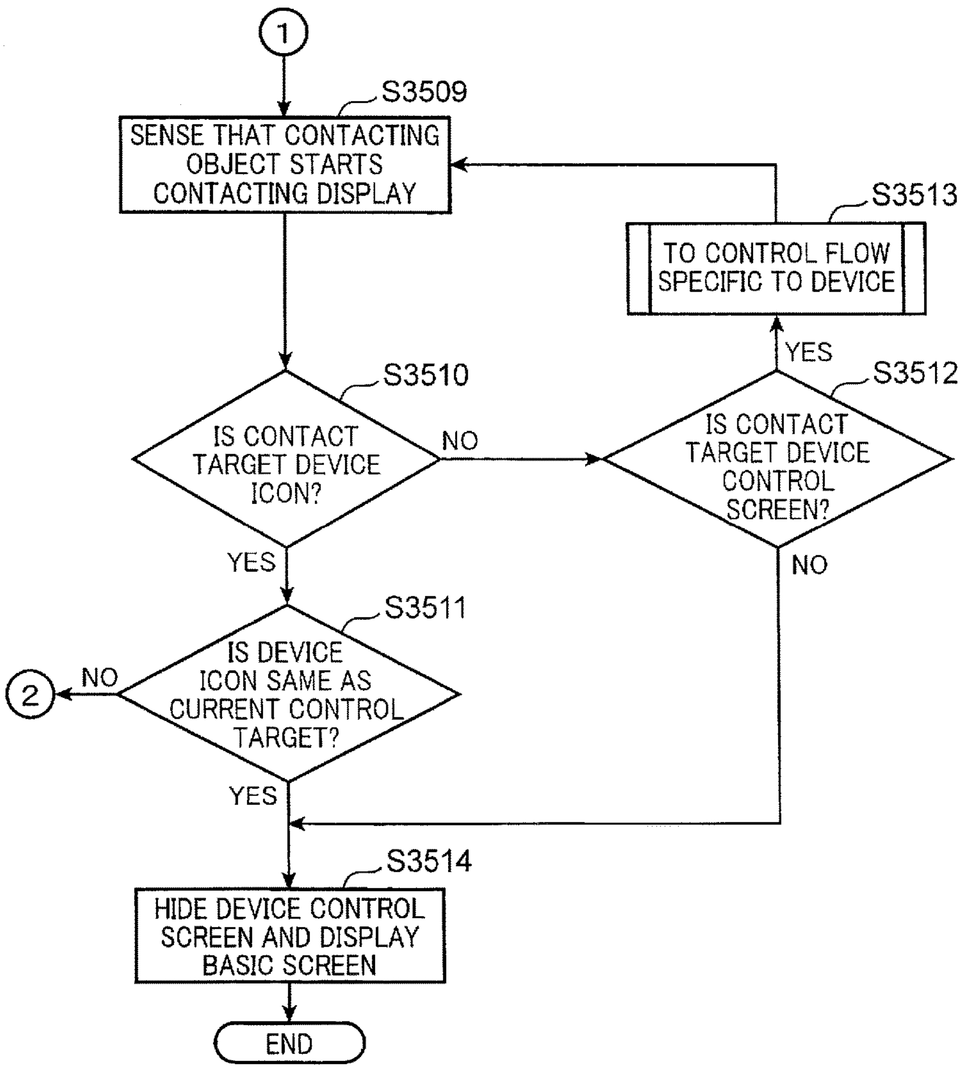
FIG. 39B is a flowchart showing the flow of a process for the home controller to control a device according to the embodiment of the present disclosure.

FIGS. 39A and 39B are each a flowchart showing the flow of a process for the home controller 100 to control the device 200 according to the present disclosure.

First, the touch panel control section 102 senses that the device icon 501 representing a certain device 200 is selected by the user on the basic screen (S3501). Next, the display control section 103 retracts all the device icons 501 out of the display region of the device control screen 502 (S3502). In this case, the device icons 501 are retracted as shown in FIGS. 11 and 13.

Next, the display control section 103 adjusts the display positions of the retracted device icons 501 (S3503). For example, the selected device icons 501 are adjusted so as to be displayed at particular positions as shown in FIGS. 12 and 14.

Next, the display control section 103 judges whether the device control screen 502 corresponding to the device icon 501 selected by the user is a dedicated screen or a floor plan (S3504).

Here, the device control screen 502 which is a dedicated screen refers to the device control screen 502 prepared separately from the floor plan and displayed as overlapped on the floor plan as shown in FIG. 13. On the other hand, the device control screen 502 which is a floor plan refers to the device control screen 502 which is the floor plan itself.

For example, if the illumination device can be turned on and off or adjusted for the brightness by the user by directly tapping on the region of a room on the floor plan in which the illumination device is disposed, the illumination device can be operated with presence. In the case where the user attempts to operate a plurality of illumination devices installed in the living room at the same time, meanwhile, the entire screen is covered by the device control screens 502 dedicated to the illumination devices if the device control screens 502 dedicated to the individual illumination devices are displayed on the floor plan at the same time, which lowers the viewability.

Thus, in the following description, it is assumed that the device control screen 502 for the illumination device is a floor plan. Specifically, when the user selects the device icon 501 for the illumination device installed in a certain room in the basic screen, all the device icons 501 are retracted out of the display region of the floor plan, and the floor plan becomes ready to receive an operation for the illumination device in the room. Then, when the user taps on the region of the room on the floor plan in which the selected illumination device is installed, one or more illumination devices within the room can be operated at the same time.

For example, when the user taps on the region of a room with the illumination devices in the room turned off, one or more illumination devices in the room are turned on at the same time. Next, when the user taps on the region, the one or more illumination devices are turned off at the same time.

In the case where the device control screen 502 is a floor plan in S3504, and if the region of the room in which the device icon 501 is disposed is equal to or less than a certain size (YES in S3506), the display control section 103 causes the device control screen 502 dedicated to the device in which the region of the room is displayed as enlarged to be displayed as overlapped on the floor plan (S3507). Here, for example, a floor plan formed by clipping the floor plan of the relevant room from the floor plan for the entire floor and enlarging the clipped floor plan is displayed as overlapped on the floor plan for the entire floor.

If the region of the room in which the device icon 501 is disposed is not equal to or less than the certain size (NO in S3506), on the other hand, the display control section 103 displays the floor plan as the device control screen 502 (S3508).

Information as to whether a dedicated screen or a floor plan is adopted as the device control screen 502 for each device 200 is stored in advance in the storage section 104. Thus, the display control section 103 may reference the information to determine whether the device control screen 502 is a dedicated screen or a floor plan.

In addition, the display control section 103 may calculate the size of the relevant room by specifying the vertexes of the relevant room from the room information 2900, specifying the coordinates of the specified vertexes from the vertex information 2800, and calculating the area of a region surrounded by the specified coordinates of the vertexes. Then, the result of determination in S3506 may be NO if the size of the room is not equal to or less than the certain size determined in advance, and the result of determination in S3506 may be YES if the size of the room is equal to or less than the certain size.

In the case where the device control screen 502 is a dedicated screen in S3504, on the other hand, the display control section 103 displays the dedicated screen as overlapped on the floor plan (S3505).

In S3509, the touch panel control section 102 senses that a contacting object (here, a finger of the user) starts contacting the display 101.

Next, the touch panel control section 102 determines whether or not the contact target is the device icon 501 (S3510).

If it is determined that the device icon 501 is contacted (YES in S3510), the touch panel control section 102 determines whether or not the contacting object contacts the same device icon 501 as the device icon 501 selected in S3501 (S3511). In the case where it is determined that the contacting object contacts the same device icon 501 as the device icon 501 selected in S3501 (YES in S3511), the display control section 103 hides the device control screen 502 being displayed to display the basic screen (S3514).

In the case where the touch panel control section 102 determines that the device icon 501 is not contacted (NO in S3510), the touch panel control section 102 further determines whether or not the contact target is the device control screen 502 (S3512). In the case where it is determined that the contact target is not the device control screen 502 (NO in S3512), the display control section 103 hides the device control screen 502 being displayed, and the basic screen is displayed (S3514).

If the touch panel control section 102 determines that the contacting object contacts a button or the like within the device control screen 502 (YES in S3512), on the other hand, the process is advanced to S3513, where a control flow that is specific to the device is executed (S3513).

Figure 40:
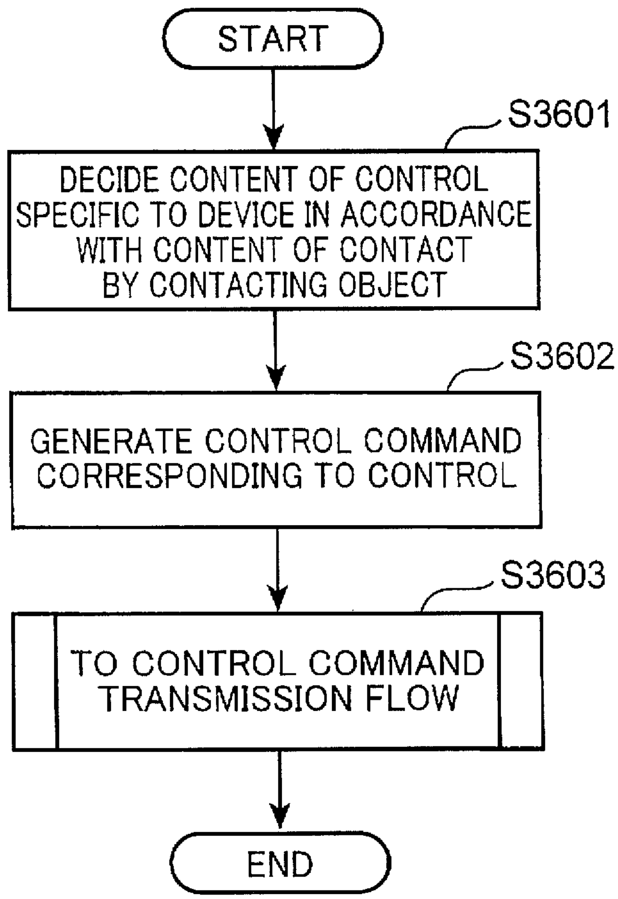
FIG. 40 is a flowchart showing the flow of a process for the home controller to generate a control command for a device in accordance with the content of a contact by a contacting object according to the embodiment of the present disclosure.

Next, the control flow that is specific to the device executed in S3513 will be described in detail using FIG. 40. First, the device control section 106 decides the content of control that is specific to the device in accordance with the content of a contact by the contacting object (S3601). Next, the device control section 106 generates a control command according to the content of control (S3602). It is assumed that the user taps on the button for raising the temperature with the device control screen 502 for the air conditioner displayed as shown in FIG. 11 and the touch panel control section 102 senses the tap. Then, the device control section 106 generates a control command for raising the temperature of the air conditioner. Next, the device control section 106 advances the process to S3603, where a control command transmission flow is executed.

Next, the control command transmission flow executed in S3603 will be described in detail using FIG. 41. First, the device control section 106 determines whether or not the home controller 100 is connected to the home network (S3701). If the home controller 100 is connected to the home controller (YES in S3701), the device control section 106 checks the transmission destination of a control command in accordance with the content of the control command transmission destination 3106 of the device list 3100 (S3702). Here, the home network is a network provided within the home of the user. Thus, the result of determination in S3701 is NO if the user operates the home controller 100 from a location away from the home, and the result of determination in S3701 is YES if the user operates the home controller 100 from a location within the home.

If the transmission destination of a control command is "DEVICE" in S3702, the device control section 106 transmits a control command to the relevant device 200 (S3703). If the transmission destination of a control command is "SERVER" in S3702, on the other hand, the device control section 106 transmits a control command to the server 300 (S3704).

For example, in the device list 3100, the control command transmission destination 3106 of the air conditioner is "DEVICE", and therefore the device control section 106 transmits a control command to the air conditioner. On the other hand, in the device list 3100, the control command transmission destination 3106 of the refrigerator is "SERVER", and therefore the device control section 106 transmits a control command to the server 300.

Meanwhile, in the case where it is judged in S3701 that the home controller 100 is not connected to the home network (NO in S3701), the process in S3704 is performed.

In S3705, the device control section 106 receives the control result from the device 200. Next, in the case where transmission of a control command to all the devices 200 that are operated at the same time is completed (YES in S3706), the device control section 106 advances the process to S3707. In the case where transmission of a control command to all the devices 200 that are operated at the same time is not completed (NO in S3706), on the other hand, the device control section 106 returns the process to S3702, and repeats the processes in and after S3702.

For example, in the case where two illumination devices are installed in the same room and the two illumination devices are set in advance to be operated at the same time, the device control section 106 transmits a control command to each of the two illumination devices. The result of determination in S3706 is NO for devices 200 that are not operated at the same time as other devices 200.

Next, the display control section 103 updates the screen displayed on the display 101 (S3707). For example, if the set temperature of the air conditioner is changed, the device control screen 502 is updated such that the temperature display is flashed on and off, for example, until the set temperature of the air conditioner is changed by a control command and the temperature display stops flashing when the set temperature of the air conditioner is changed by a control command. In the example of the illumination device, the screen is updated such that the region on the floor plan of a room in which the illumination device is installed becomes brighter than other regions in the case where the illumination device is turned on.

Figure 42:
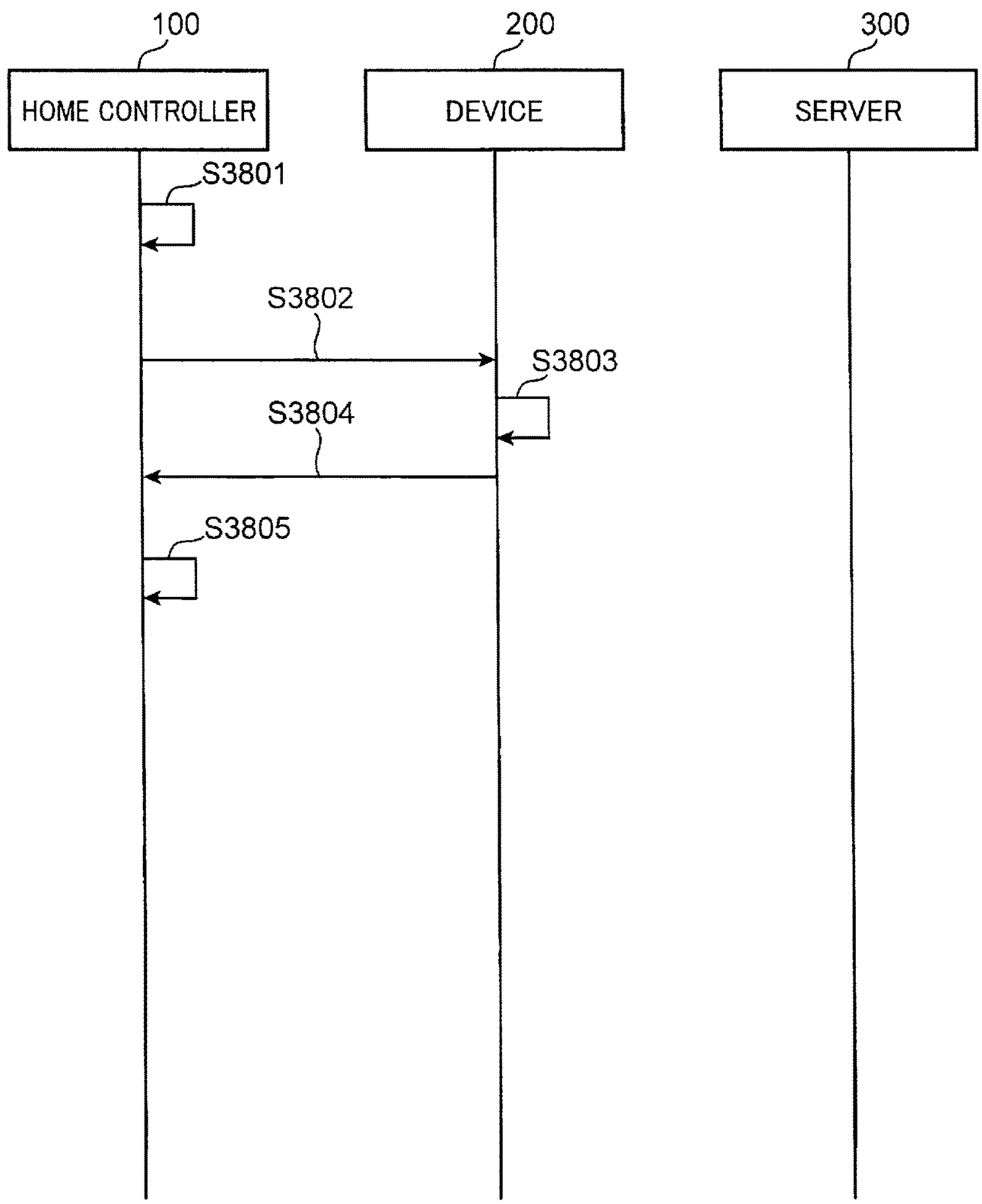
FIG. 42 is a sequence diagram showing the flow of a process for the home controller to directly control a device according to the embodiment of the present disclosure.

Next, the flow of a process for the home controller 100 to directly control the device 200 will be described using FIG. 42. First, the touch panel control section 102 of the home controller 100 senses a user operation on the device control screen 502 (S3801). Next, the device control section 106 of the home controller 100 generates a control command according to the user operation, and transmits the control command to the device 200 (S3802).

The device 200 which receives the control command executes the control command (S3803), and transmits the control result to the home controller 100 (S3804). The display control section 103 of the home controller 100 which receives the control result updates the display screen in accordance with the control result (S3805).

Figure 43:
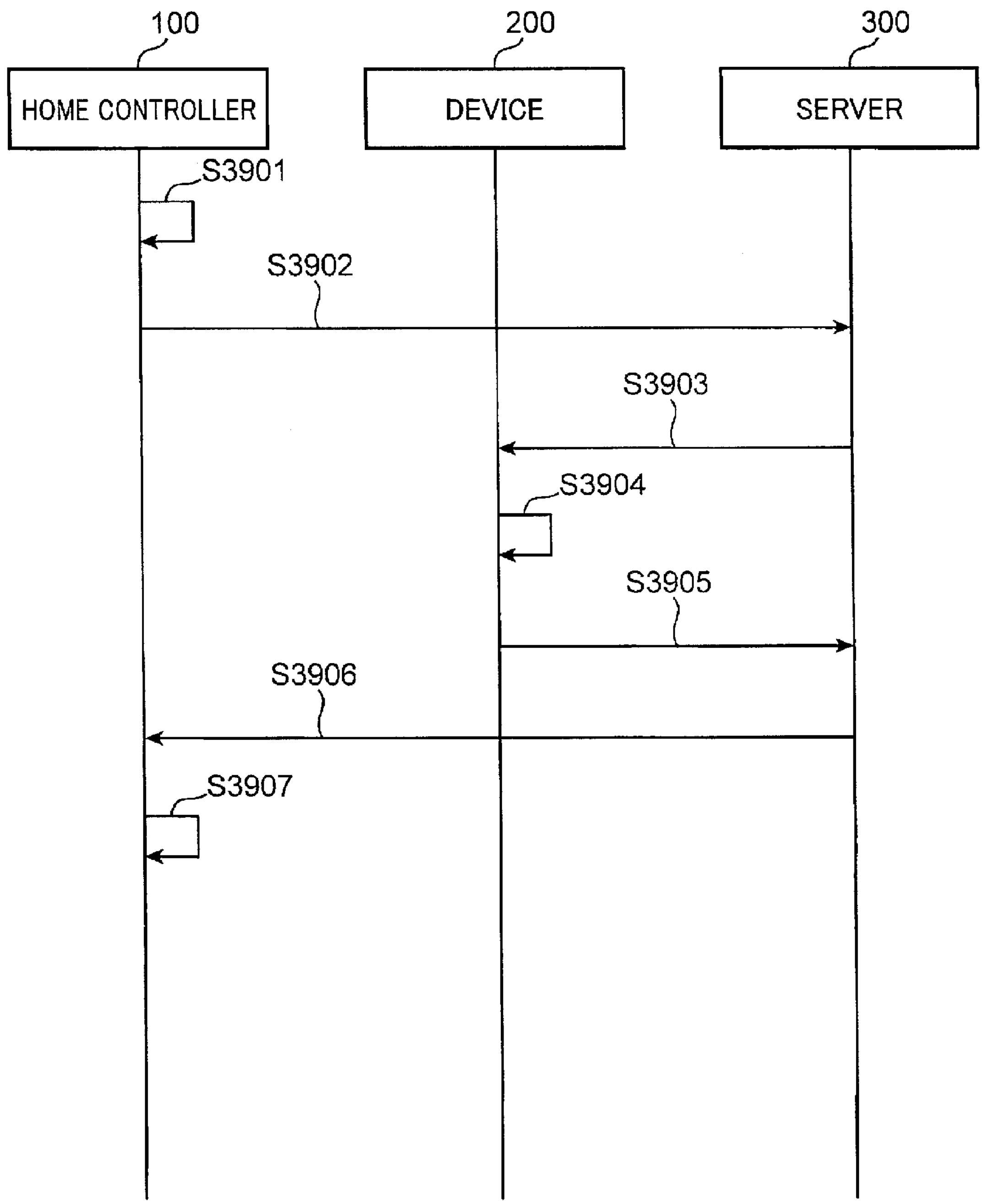
FIG. 43 is a sequence diagram showing the flow of a process for the home controller to control a device by way of the server according to the embodiment of the present disclosure.

Next, the flow of a process for the home controller 100 to control the device 200 by way of the server 300 will be described using FIG. 43. First, the touch panel control section 102 of the home controller 100 senses a user operation on the device control screen 502 (S3901). Next, the device control section 106 of the home controller 100 generates a control command according to the user operation, and transmits the control command to the server 300 (S3902).

The server 300 which receives the control command transmits the relevant control command to the device 200 (S3903). The device 200 which receives the control command executes the control command (S3904), and transmits the control result to the server 300 (S3905). The server 300 which receives the control result transmits the control result to the home controller 100 (S3906). The display control section 103 of the home controller 100 which receives the control result updates the display screen in accordance with the control result (S3907).

Figure 44:
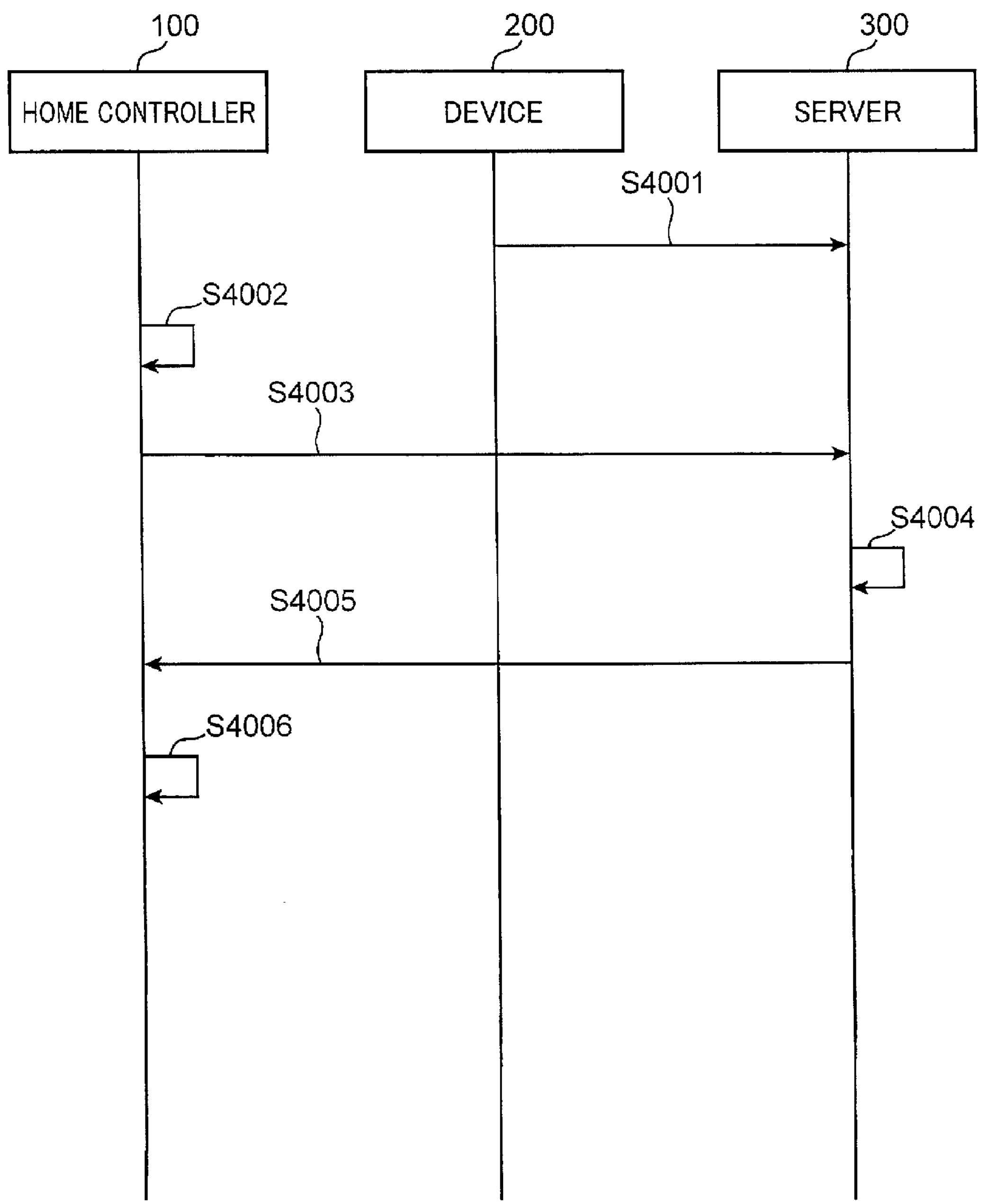
FIG. 44 is a sequence diagram showing the flow of a process for the home controller to acquire the state of a device from the server according to the embodiment of the present disclosure.

Next, the flow of a process for the home controller 100 to confirm the device state of the device 200 by way of the server 300 will be described using FIG. 44. First, the device 200 transmits the current device state to the server 300 (S4001). Here, the device 200 transmits the device state to the server 300 when the device 200 is turned on, when the device 200 is turned off, when the device state is changed, or regularly to cause the server 300 to store the device state. The process in S4001 may be executed asynchronously with the processes in S4002 to S4006.

Next, the touch panel control section 102 of the home controller 100 senses a user operation on the device control screen 502 (S4002). Next, the device control section 106 of the home controller 100 generates a control command according to the user operation, and transmits the control command to the server 300 (S4003). Here, a control command for confirming the device state of the device 200 is generated.

The server 300 which receives the control command searches for the current device state of the relevant device 200 (S4004), and transmits the device state of the relevant device 200 to the home controller 100 as the control result (S4005). The display control section 103 of the home controller 100 which receives the control result updates the display screen in accordance with the control result (S4006). For example, if the device control screen 502 for the device 200 is displayed on the display 101, the content of the device control screen 502 for the device 200 is updated in accordance with the control result.

Figure 45:
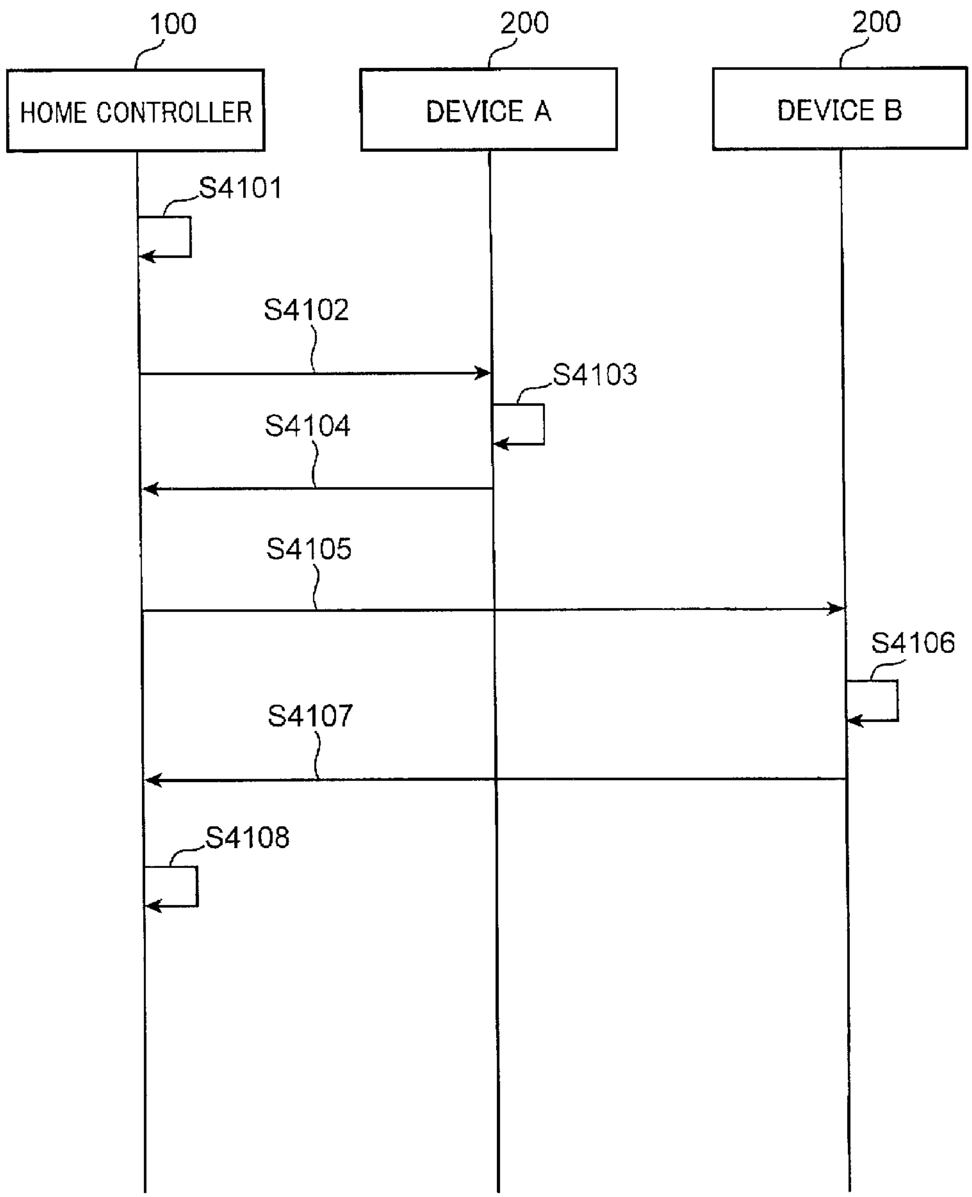
FIG. 45 is a sequence diagram showing the flow of a process for the home controller to directly control devices in the case where the home controller controls a plurality of devices with one operation according to the embodiment of the present disclosure.

Next, the flow of a process for the home controller 100 to directly control the devices 200 in the case where the home controller 100 controls a plurality of devices 200 with one operation will be described using FIG. 45. Here, a case where the home controller 100 controls the device A 200 and the device B 200 is described as an example.

First, the touch panel control section 102 of the home controller 100 senses a user operation on the device control screen 502 (S4101). Next, the device control section 106 of the home controller 100 generates a control command according to the user operation, and transmits the control command to the device A 200 (S4102).

The device A 200 which receives the control command executes the control command (S4103), and transmits the control result to the home controller 100 (S4104).

Next, the device control section 106 of the home controller 100 transmits to the device B 200 a control command that is the same as the control command transmitted to the device A 200 (S4105). The device B 200 which receives the control command executes the control command (S4106), and transmits the control result to the home controller 100 (S4107).

The display control section 103 of the home controller 100 which receives the control result updates the display screen in accordance with the control result (S4108). In this case, for example, if the device control screens 502 for the devices A 200 and B 200 are displayed on the display 101, the content of the device control screens 502 for the devices A 200 and B 200 is updated in accordance with the control result.

Figure 46:
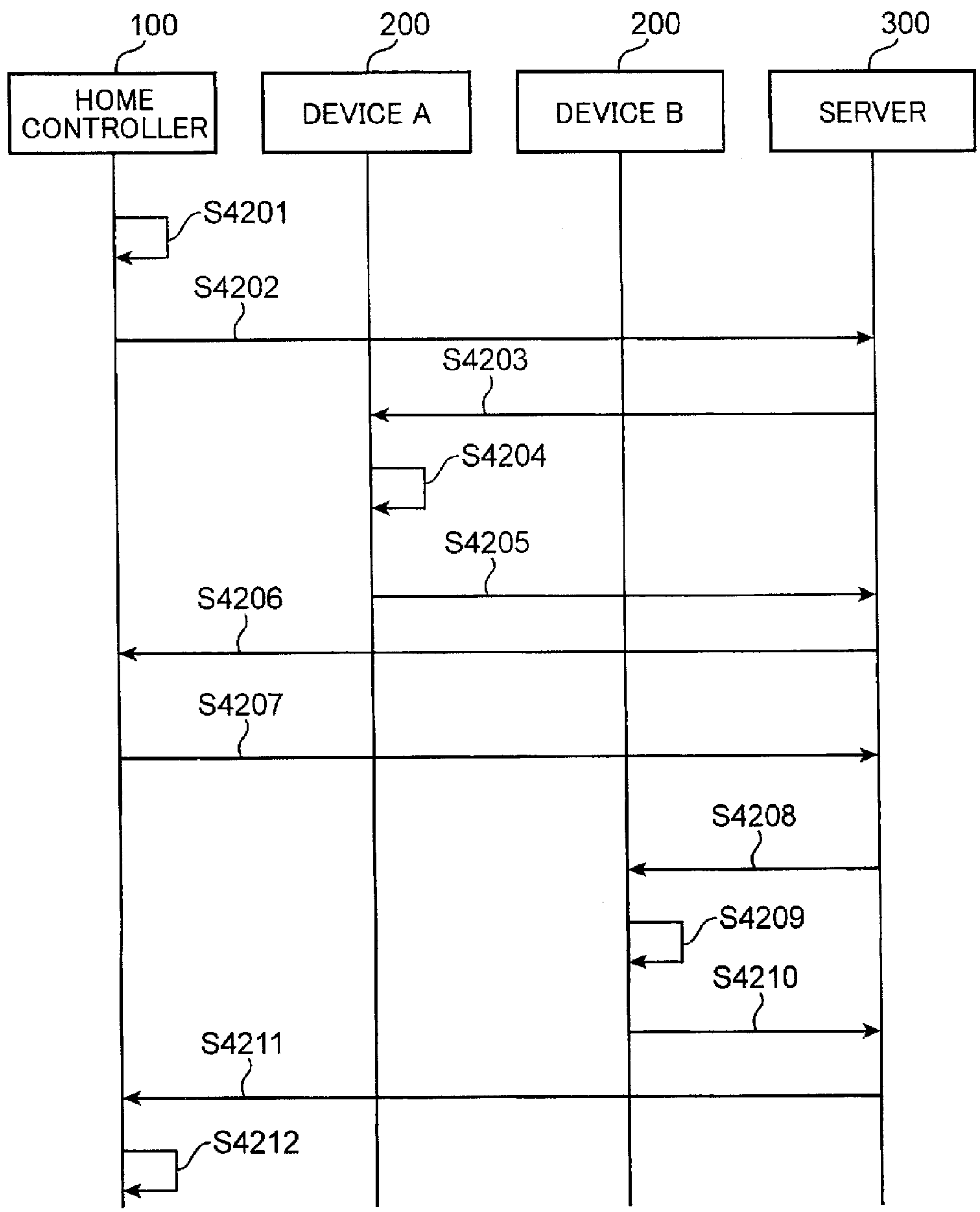
FIG. 46 is a sequence diagram showing the flow of a process for the home controller to control devices by way of the server in the case where the home controller controls a plurality of devices with one operation according to the embodiment of the present disclosure.

Next, the flow of a process for the home controller 100 to control the devices 200 by way of the server 300 in the case where the home controller 100 controls a plurality of devices 200 with one operation will be described using FIG. 46. Here, a case where the home controller 100 controls the device A 200 and the device B 200 is described as an example. In addition, it is assumed that the devices A 200 and B 200 are represented by one device icon 501, and controlled using one device control screen 502.

First, the touch panel control section 102 of the home controller 100 senses a user operation on the device control screen 502 (S4201).

Next, the device control section 106 of the home controller 100 generates a control command for the device A 200 according to the user operation, and transmits the control command to the server 300 (S4202).

The server 300 which receives the control command for the device A 200 transmits the control command to the device A 200 (S4203). The device A 200 which receives the control command executes the control command (S4204), and transmits the control result to the server 300 (S4205). The server 300 which receives the control result transmits the control result to the home controller 100 (S4206).

Similarly, the device control section 106 of the home controller 100 generates a control command for the device B 200 according to the user operation, and transmits the control command to the server 300 (S4207).

The server 300 which receives the control command transmits the control command to the device B 200 (S4208). The device B 200 which receives the control command executes the control command (S4209), and transmits the control result to the server 300 (S4210). The server 300 which receives the control result transmits the control result to the home controller 100 (S4211).

Then, the display control section 103 of the home controller 100 updates the display screen in accordance with the control result (S4212).

Figure 47:
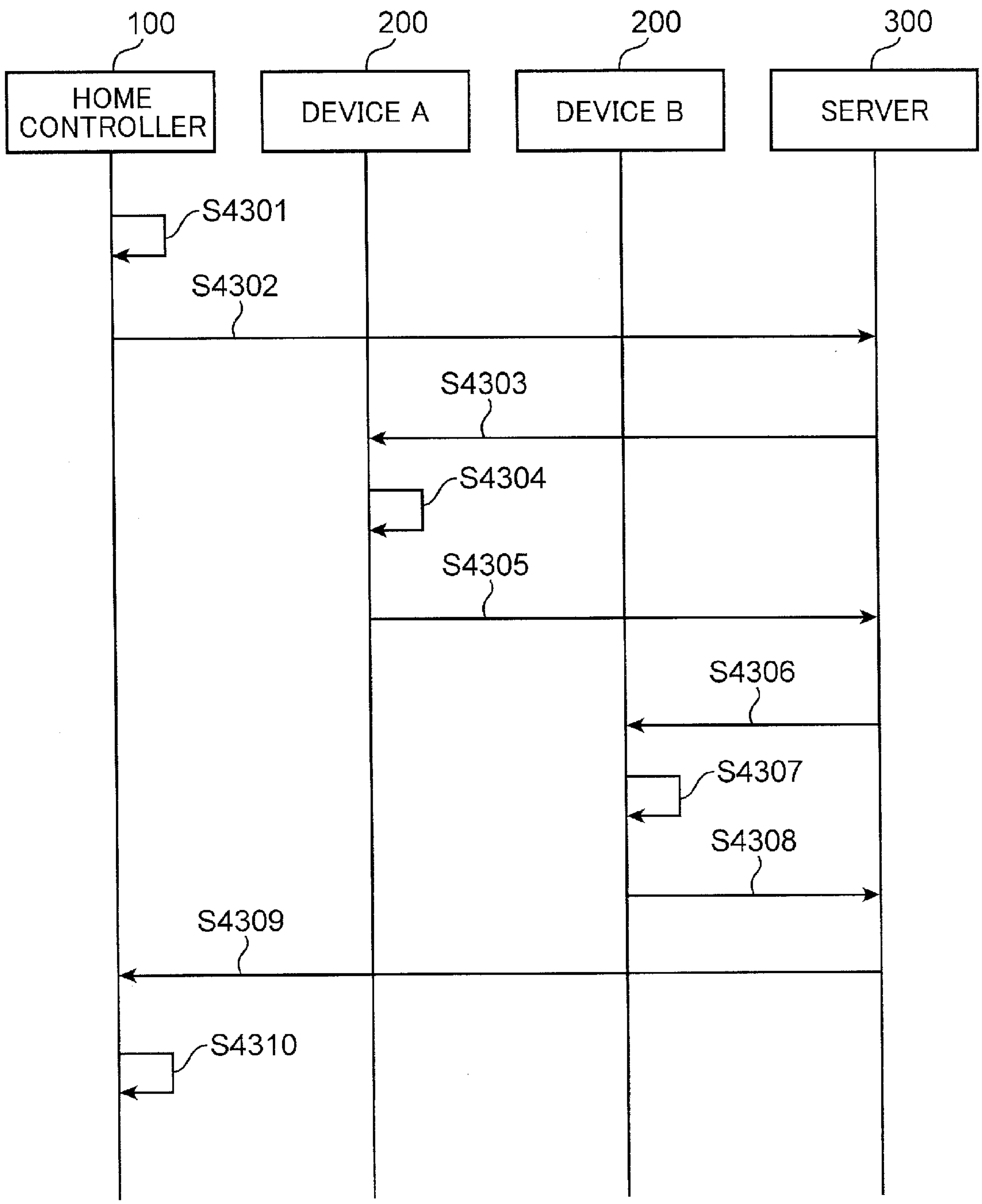
FIG. 47 is a sequence diagram showing the flow of a process for the home controller to control devices by way of the server in the case where the home controller controls a plurality of devices with one operation according to the embodiment of the present disclosure.

Next, the flow of a process for the home controller 100 to control the devices 200 by way of the server 300 in the case where the home controller 100 controls a plurality of devices 200 with one operation will be described using FIG. 47. Here, a case where the home controller 100 controls the device A 200 and the device B 200 is described as an example. In addition, it is assumed that the devices A 200 and B 200 are represented by one device icon 501, and controlled using one device control screen 502.

First, the touch panel control section 102 of the home controller 100 senses a user operation on the device control screen 502 (S4301).

Next, the device control section 106 of the home controller 100 generates a control command for the device A 200 and the device B 200 in accordance with the user operation, and transmits the control command to the server 300 (S4302).

The server 300 which receives the control command transmits the control command to the device A 200 (S4303). The device A 200 which receives the control command executes the control command (S4304), and transmits the control result to the server 300 (S4305).

Similarly, the server 300 transmits the control command to the device B 200 (S4306). The device B 200 which receives the control command executes the control command (S4307), and transmits the control result to the server 300 (S4308). The server 300 which receives the control result for the device A 200 and the device B 200 transmits the control result to the home controller 100 (S4309).

Then, the display control section 103 of the home controller 100 updates the display screen in accordance with the control result (S4310).

Figure 48:
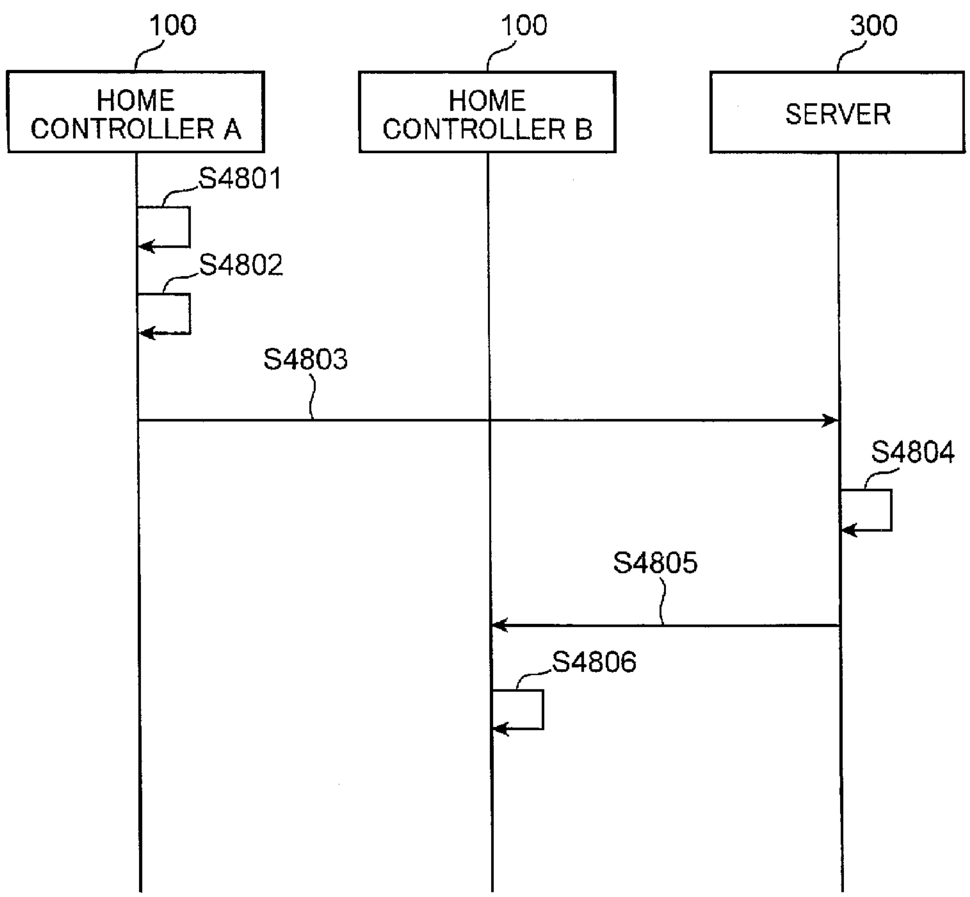
FIG. 48 is a sequence diagram showing the flow of a process for a case where a device icon is moved in the home controller according to the embodiment of the present disclosure.

Next, the flow of a process for a case where the device icon 501 is moved in the home controller 100 will be described using FIG. 48. Here, it is assumed that the user owns two home controllers A 100 and A 200.

When the touch panel control section 102 of the home controller A 100 senses movement of the device icon 501 (S4801), the display control section 103 updates the display screen (S4802). Here, the display control section 103 displays the device icon 501 moved in accordance with the amount of a drag performed on the device icon 501 by the user.

The device management section 105 of the home controller A 100 transmits to the server 300 a device list update notification including the coordinate on the floor plan 500 after the drag (S4803). Here, the device management section 105 of the home controller A 100 updates the content of the arrangement 3104 of the relevant device 200 in the device list 3100 managed by the device management section 105 itself with the coordinate after the drag.

The server 300 which receives the device list update notification updates the device list 4700 (S4804). In this case, the home information management section 301 of the server 300 updates the content of the arrangement 4704 of the relevant device 200 in the device list 4700 with the coordinate included in the device list update notification.

Subsequently, the server 300 transmits the device list update notification to the home controller B 100 (S4805). The home controller B 100 which receives the device list update notification updates the display screen (S4806). Here, the device management section 105 of the home controller B 100 updates the content of the arrangement 3104 of the relevant device 200 in the device list 3100 managed by the device management section 105 itself with the coordinate included in the device list update notification.

The device icon 501 is disposed at an appropriate position on the floor plan 500 through the process described above. Because the home controller B 100 is notified of the update of the arrangement position of the device icon 501 performed by the home controller A 100 by way of the server 300, the arrangement position of the device icon 501 after the update is shared among the home controllers A 100 and B 100 and the server 300. Therefore, it is possible to avoid trouble in which the arrangement position of the device icon 501 is different between the home controller A 100 and the home controller B 100.

Figure 49:
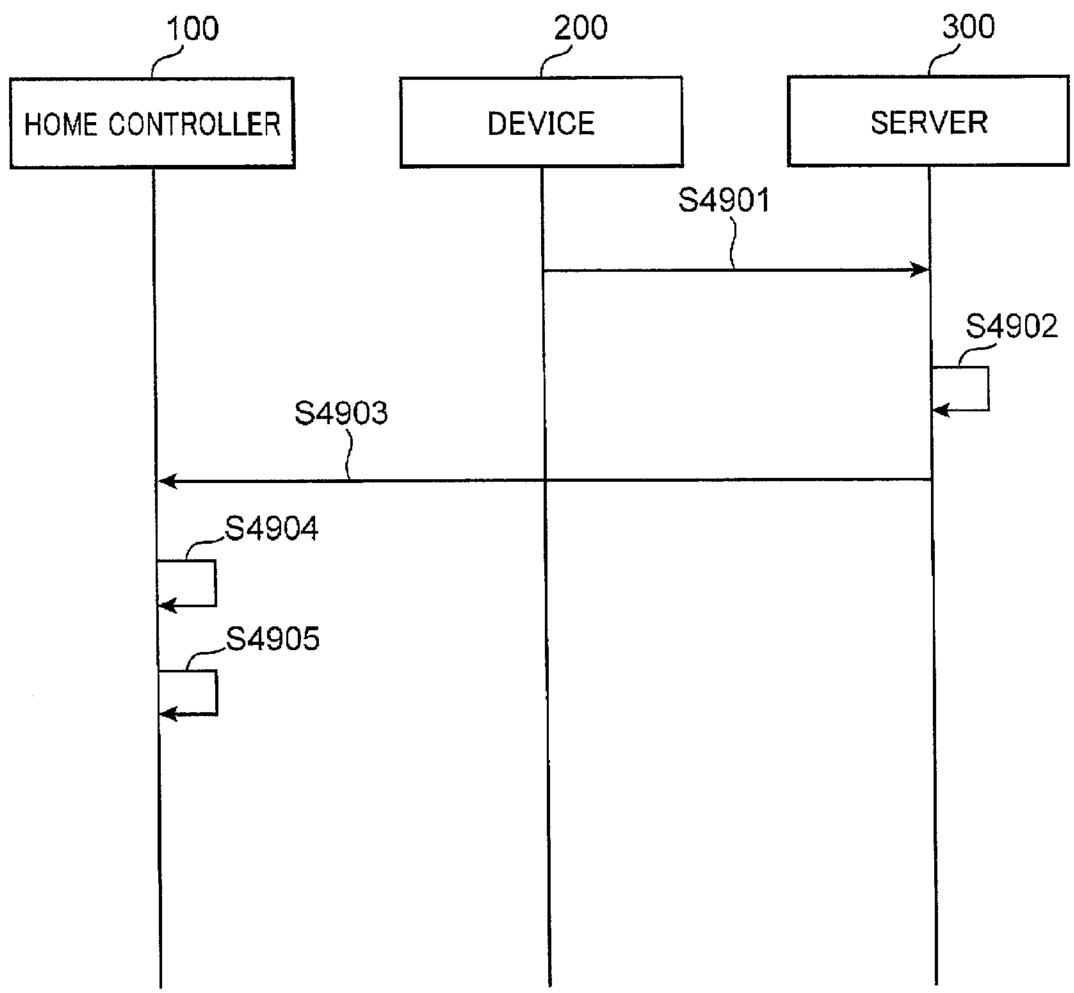
FIG. 49 is a sequence diagram showing the flow of a process for updating the device lists of the home controller and the server according to the embodiment of the present disclosure.

Next, an example of a process for updating the device lists of the home controller 100 and the server 300 will be described using, FIG. 49. The device 200 transmits the device state indicating the current state of the device 200 itself to the server 300 (S4901). Here, the device 200 may regularly transmit the device state, or may transmit the device state when the state is varied. The server 300 updates the device list 4700 in accordance with the content of the received device state (S4902). Here, in the case where the device list 4700 does not contain information on the device 200, the server 300 adds information on the device 200 as a new device. Then, the server 300 transmits a device list update notification to the home controller 100 (S4903). The device management section 105 of the home controller 100 updates the device list 3100 in accordance with the content of the received device list update notification (S4904). Here, in the case where the device list 3100 does not contain information on the device 200, the device management section 105 adds information on the device 200 as a new device. Then, the display control section 103 of the home controller 100 updates the display screen (S4905).

Consequently, the server 300 is notified of variation in state of the device 200, which allows the server 300 to monitor variation in state of the device 200. The server 300 to which the device state is transmitted from the device 200 notifies the home controller 100 of variation in state of the device 200, which allows the home controller 100 to recognize the current state of the device 200. In the case where a new device 200 is connected to the home network, the server 300 and the home controller 100 can add the new device. Hence, it is possible to prevent occurrence of deviation between the actual state of the device 200 and the state of the device 200 recognized by the home controller 100.

Figure 50:
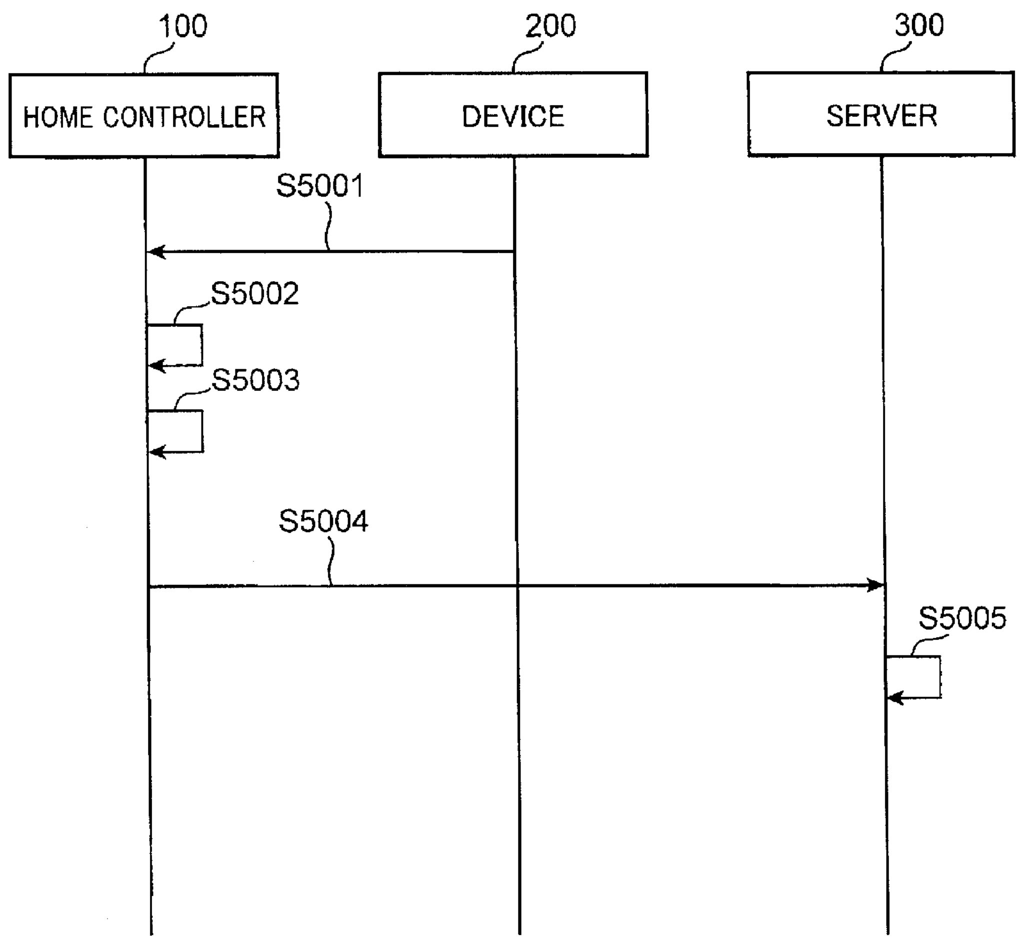
FIG. 50 is a sequence diagram showing the flow of a process for updating the device lists of the home controller and the server according to the embodiment of the present disclosure.

Next, another example of the process for updating the device lists of the home controller 100 and the server 300 will be described using FIG. 50. The device 200 transmits the device state to the home controller 100 (S5001). Here, the device 200 may regularly transmit the device state, or may transmit the device state when the state is varied.

The device management section 105 of the home controller 100 updates the device list 3100 in accordance with the content of the received device state (S5002). Here, in the case where the device list 3100 does not contain information on the device 200, the device management section 105 adds information on the device 200 as a new device. Then, the display control section 103 updates the display screen (S5003). Then, the device management section 105 of the home controller 100 transmits a device list update notification to the server 300 (S5004). The server 300 updates the device list 4700 in accordance with the received device list update notification (S5005). Here, in the case where the device list 4700 does not contain information on the device 200, the server 300 adds information on the device 200 as a new device.

Figure 51:
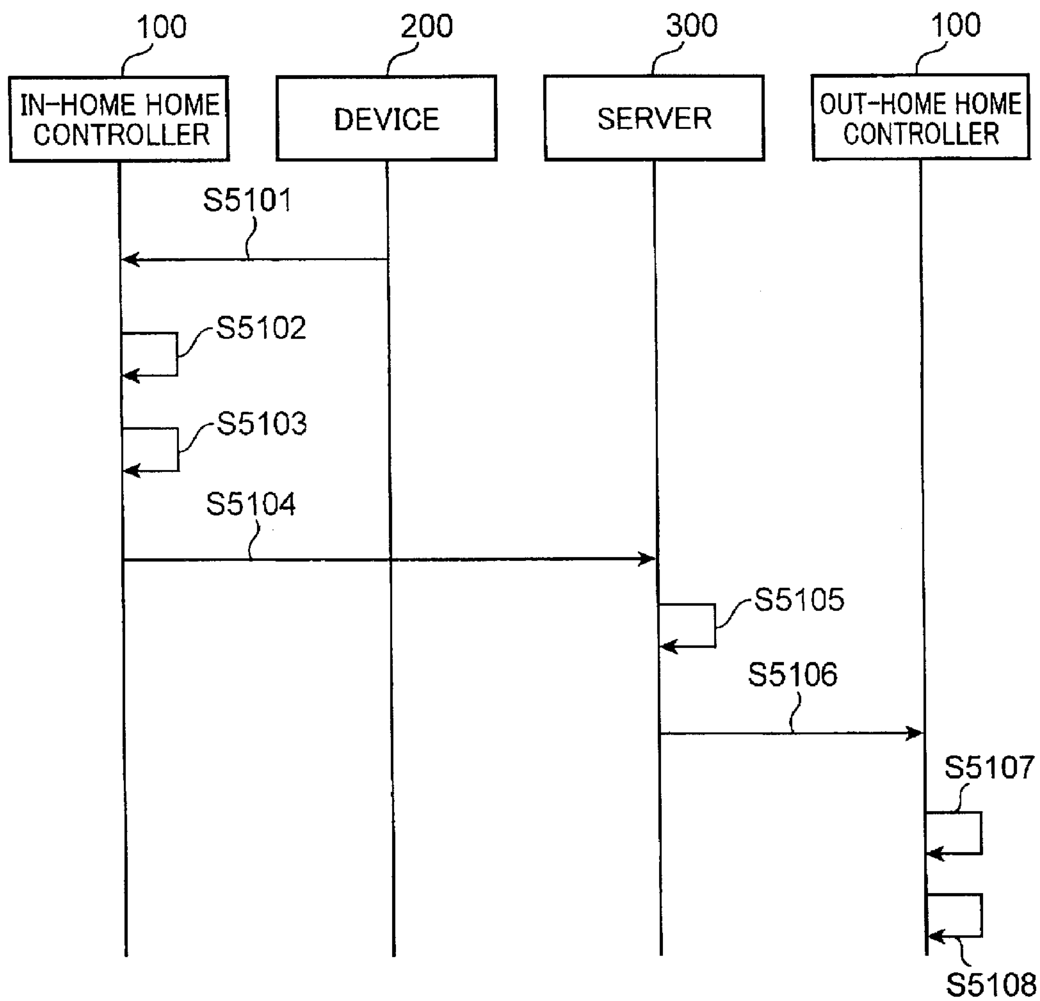
FIG. 51 is a sequence diagram showing the flow of a process for updating the device lists of the home controller and the server according to the embodiment of the present disclosure.

Next, still another example of a process in which the home controller 100 and the server 300 update the device list will be described using FIG. 51. In FIG. 51, a case where the user owns two home controllers 100, namely an in-home home controller 100 and an out-home home controller 100, is described as an example. Here, the out-home home controller 100 is a home controller 100 taken away from the home by the user, and the in-home home controller 100 is a home controller 100 kept at the home by the user.

The device 200 transmits the device state to the in-home home controller 100 (S5101). The in-home home controller 100 updates the device list 3100 in accordance with the content of the received device state (S5102). Here, in the case where the device list 3100 does not contain information on the device 200, the device management section 105 adds information on the device 200 as a new device. Then, the display screen is updated (S5103). Then, the in-home home controller 100 transmits a device list update notification to the server 300 (S5104).

The server 300 updates the device list 4700 in accordance with the content of the received device list update notification (S5105). Here, in the case where the device list 4700 does not contain information on the device 200, the server 300 adds information on the device 200 as a new device. Then, the server 300 transmits a device list update notification to the out-home home controller 100 (S5106). The out-home home controller 100 updates the device list 3100 in accordance with the content of the received device list update notification (S5107). Here, in the case where the device list 3100 does not contain information on the device 200, the device management section 105 of the out-home home controller 100 adds information on the device 200 as a new device. Then, the display screen is updated (S5108).

According to the example, even in the case where one home controller 100 is located away from the home and the other home controller 100 is located in the home, it is possible to prevent occurrence of deviation between the states of the device 200 recognized by the two home controllers 100.

The sequences and the process flows described above are merely exemplary, and the order of the steps may be changed and some of the steps may be omitted as long as the intended process may be embodied. For example, a control command may be transmitted to the device A 200 and the device B 200 asynchronously.

In the foregoing description, a plan view that planarly represents the position and the shape of rooms forming each floor is adopted as the floor plan 500. However, the embodiment is not limited thereto, and a diagram that schematically shows how many rooms of what type are located on each floor may be adopted as the floor plan.

Figure 52:
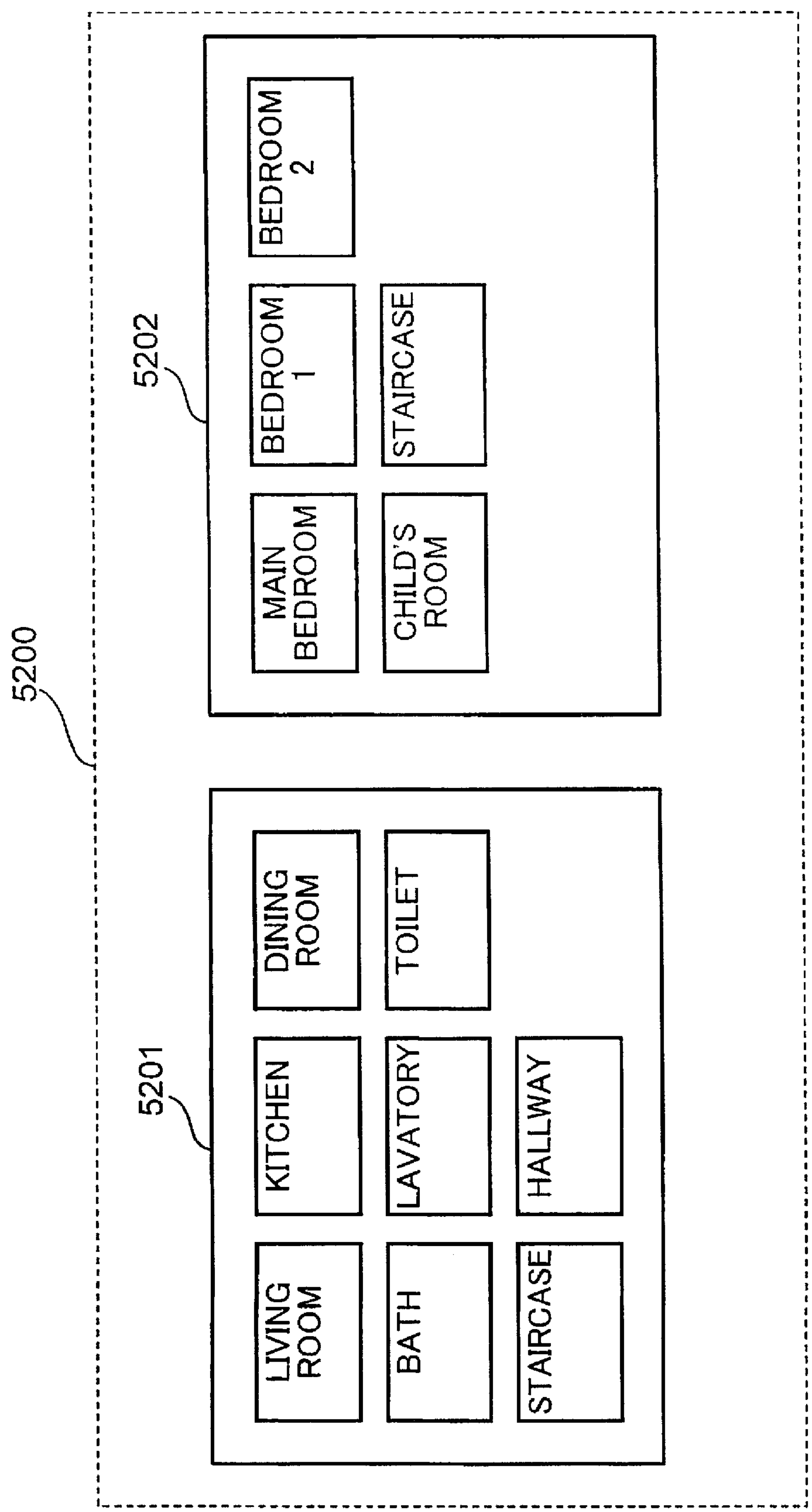
FIG. 52 is a diagram showing a floor plan in another pattern according to the embodiment of the present disclosure.

Floor plans in other patterns will be specifically described below. FIG. 52 is a diagram showing a floor plan 5200 in another pattern. In the floor plan 5200, rooms forming one floor are each represented by one rectangular block, and the moms on the one floor are disposed in a matrix. The blocks have the same size, and are each provided with the name of the room.

In the floor plan 5200, the name and the number of the rooms forming each floor are indicated, but the relative size and the position in the floor of the rooms are not represented. In the embodiment, such a diagram is treated as the floor plan 5200. That is, in the embodiment, any diagram that represents at least what rooms are provided on each floor are treated as the floor plan.

For example, it is seen that a floor plan 5201 for the first floor includes rooms such as a living room, a kitchen, a dining room, a bath, a lavatory, a toilet, a staircase, and a hallway. Meanwhile, it is seen that a floor plan 5202 for the second floor includes rooms such as a main bedroom, a bedroom 1, a bedroom 1, a child's room, and a staircase.

The user can drag and move a desired room on the floor plan 5200 to change the position of the room on the floor plan 5200. In the case where a large number of devices 200 are disposed within a room and all the device icons 501 cannot be displayed within the room on the floor plan 5200 using a default room size, the display control section 103 may increase the size of the room such that all the device icons 501 can be accommodated within the room.

Figure 53:
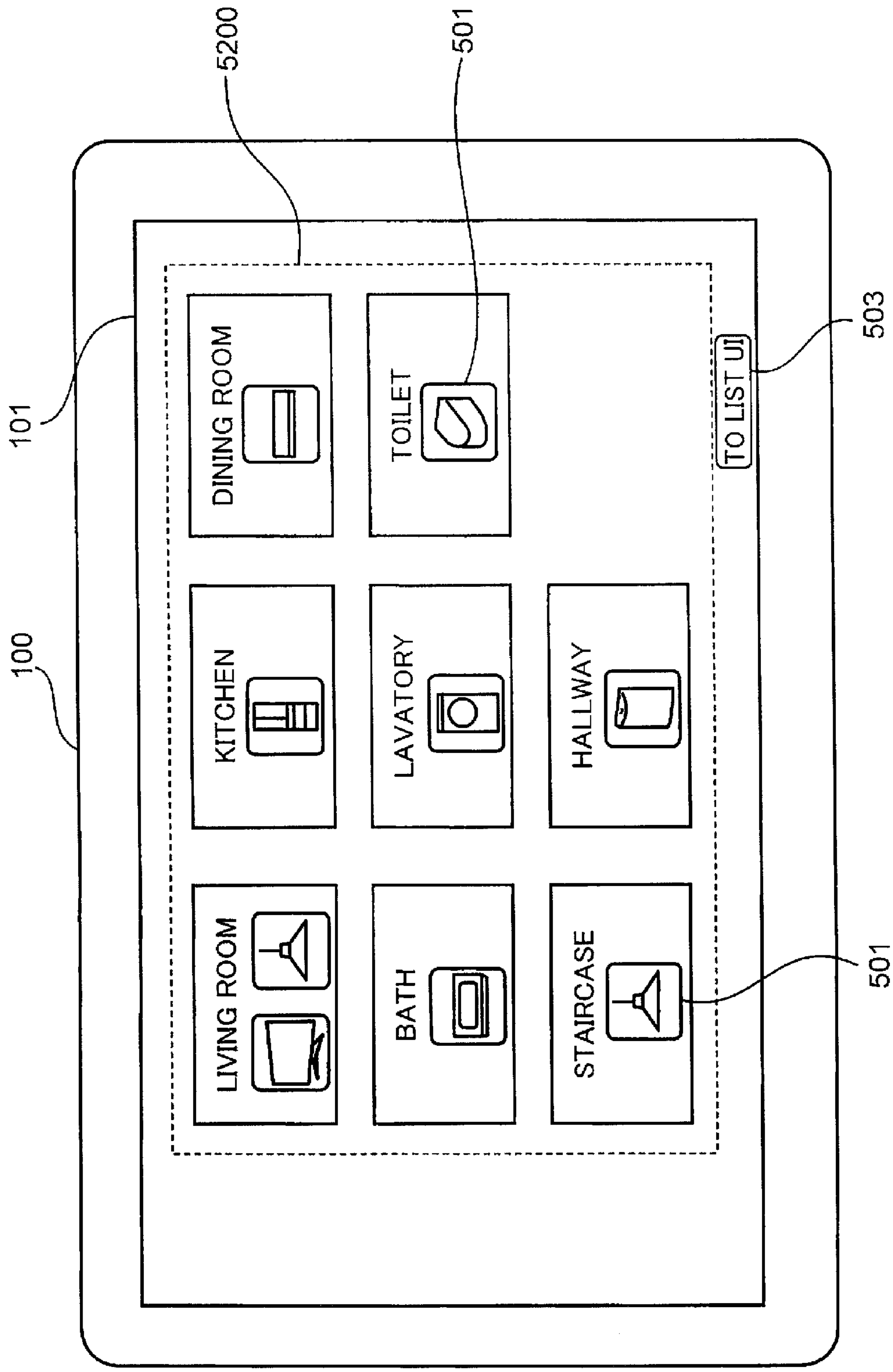
FIG. 53 is a diagram showing the configuration of a basic screen that adopts the floor plan shown in FIG. 52.

FIG. 53 is a diagram showing the configuration of a basic screen that adopts the floor plan 5200. The floor plan 5200 is displayed on the basic screen. In addition, the device icons 501 for the devices 200 actually disposed are displayed within each room.

For example, the device icons 501 for the television set and the illumination device are displayed in the living room, and therefore it is seen that the television set and the illumination device are installed in the living room.

The device list display change button 503 is a button for switching the screen display from the basic screen to the device list display screen discussed earlier (see FIG. 24).

Figure 54:
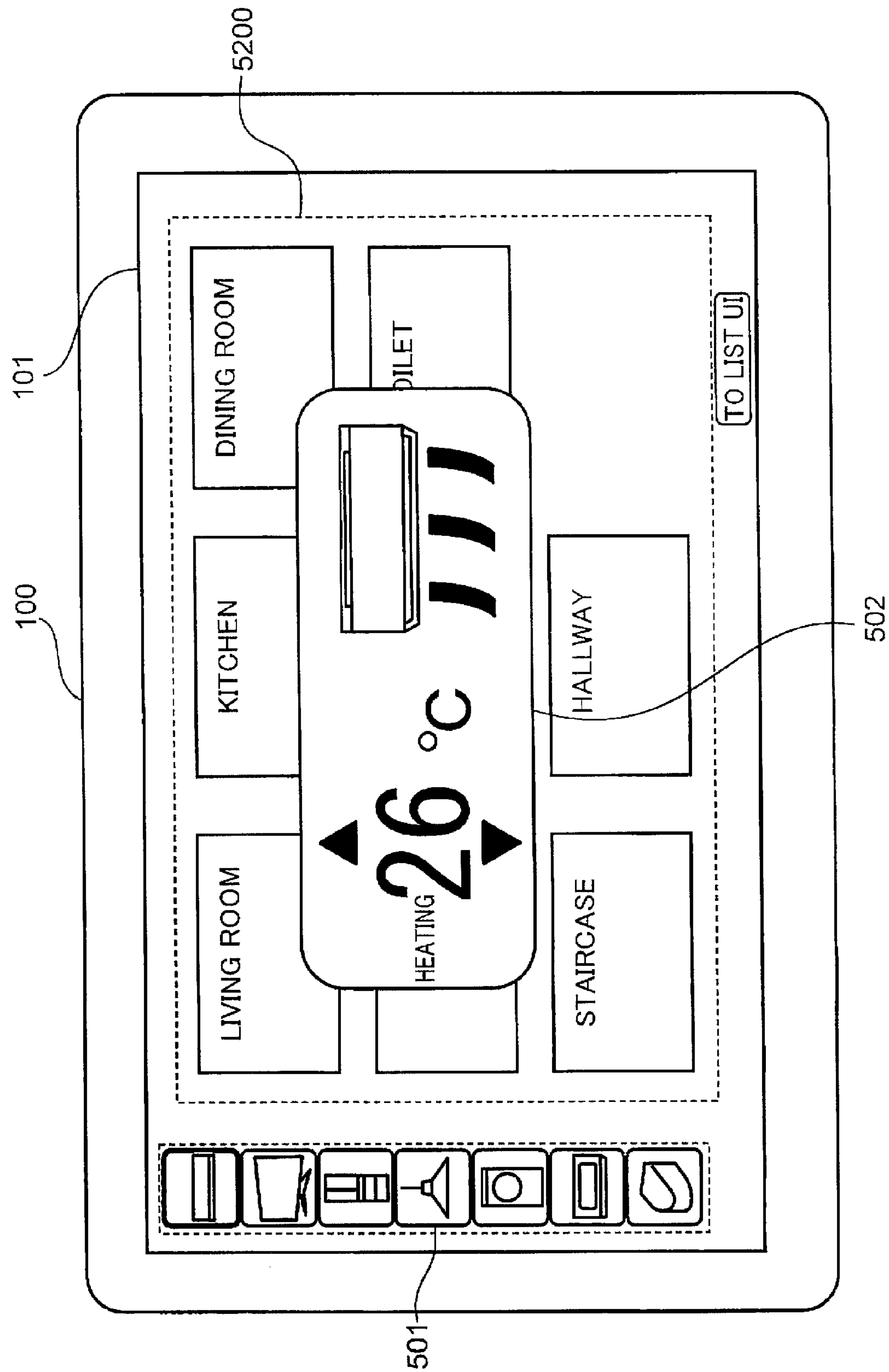
FIG. 54 is a diagram showing the display state of a device control screen for a case where the floor plan shown in FIG. 52 is adopted.

FIG. 54 is a diagram showing the display state of the device control screen 502 for a case where the floor plan 5200 shown in FIG. 52 is adopted. In the basic screen shown in FIG. 53, when the touch panel control section 102 senses that the user selects the device icon 501, the display control section 103 causes the display 101 to display the device control screen 502 corresponding to the selected device icon 501. In FIG. 54, the device icon 501 for the air conditioner is selected, and therefore the device control screen 502 for the air conditioner is displayed as overlapped on the floor plan 5200.

In displaying the device control screen 502, the display control section 103 disposes the device icons 501 displayed on the floor plan 5200 outside the display region of the device control screen 502. In the example of FIG. 54, all the device icons 501 are disposed in one vertical line on the left side of the floor plan 5200.

In disposing the device icons 501 in one vertical line on the left side of the floor plan 5200, the display control section 103 may group the device icons 501 under particular conditions. For example, the device icons 501 may be grouped in accordance with the room, may be grouped in accordance with the type of the device 200, or may be grouped in accordance with the category based on the type of the device 200.

In the example of FIG. 54, the device icons 501 are disposed on the left side of the floor plan 5200. However, the device icons 501 may be disposed in one vertical line on the right side of the floor plan 5200, or may be disposed in one horizontal line on the upper or lower side of the floor plan 5200.

In the case where all the device icons 501 cannot be displayed on the left side of the floor plan 5200, the display control section 103 may scroll the device icons 501 upward or downward in accordance with a swipe operation performed upward or downward on the device icons 501 disposed in one line on the left side to cause the device icons 501, which have been hidden, to be displayed within the display 101.

In disposing the device icons 501 in one vertical line on the left side of the floor plan 5200, the display control section 103 may display the device icon 501 selected by the user in a display mode that is different from that for the unselected device icons 501. For example, the selected device icon 501 may be displayed in a color that is different from that of the unselected device icons 501, may be displayed more brightly than the unselected device icons 501, may be displayed more densely than the unselected device icons 501, or may be flashed on and off at a constant cycle.

The display control section 103 may scroll an array of the device icons 501 such that the device icon 501 selected by the user is positioned at a conspicuous position (for example, the top, middle, or bottom position) in the line of icons.

In displaying the device control screen 502, the display control section 103 may dispose all the device icons 501 on the outer periphery of an ellipse as shown in FIG. 12.

Next, transition between the display state of the basic screen and the display state of the device control screen 502 will be described using FIG. 55.

Figure 55:
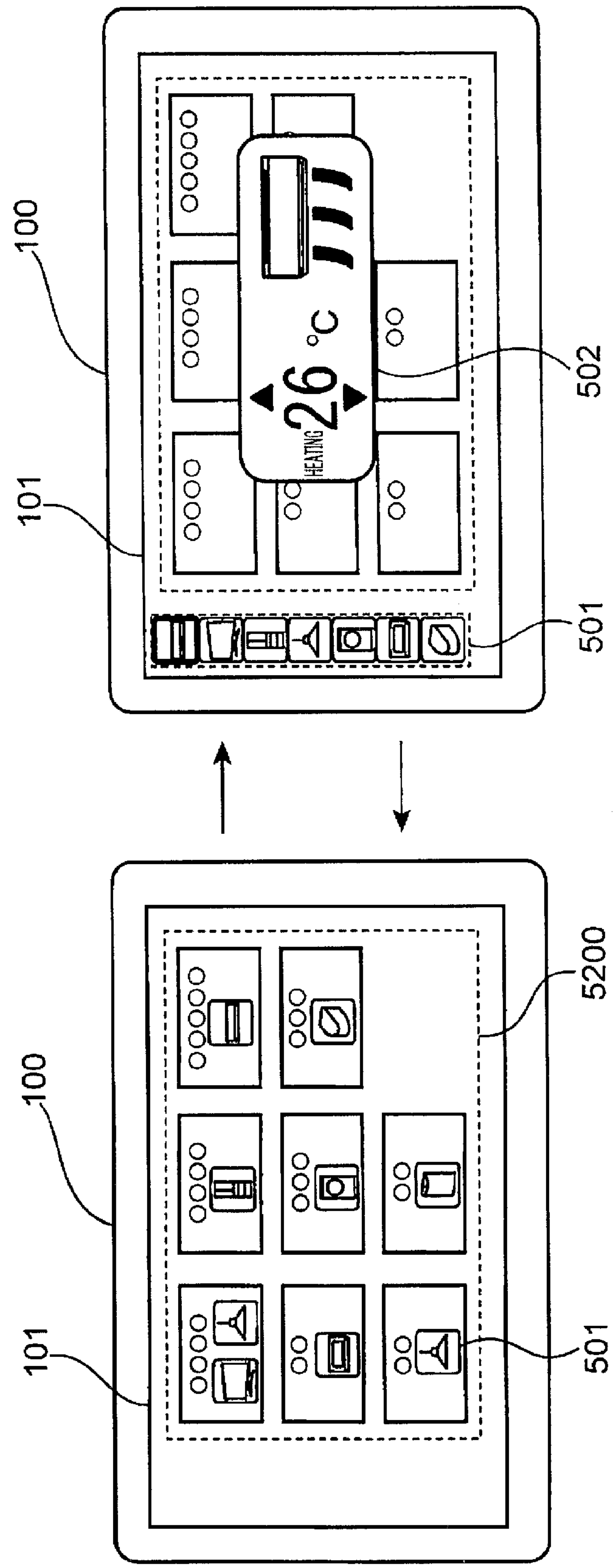
FIG. 55 is a diagram illustrating transition between the display state of the basic screen and the display state of the device control screen.

In the basic screen shown in the left diagram of FIG. 55, the user selects the device icon 501 for the device 200 (here, the air conditioner) that is desired to be controlled, and the touch panel control section 102 senses the selection. Then, as shown in the right diagram of FIG. 55, the display control section 103 displays the device control screen 502 corresponding to the selected device icon 501 as overlapped on the floor plan 5200. This results in transition from the display state of the basic screen to the display state of the device control screen 502.

On the other hand, as shown in the right diagram of FIG. 55, in the display state of the device control screen 502, the user selects the device icon 501 for the air conditioner corresponding to the device control screen 502 or a location outside the display region of the device control screen 502 (for example, the display region of the floor plan 5200 outside the display region of the device control screen 502), and the touch panel control section 102 senses the selection. Then, as shown in the left diagram of FIG. 55, the display control section 103 erases the device control screen 502, and returns from the display state of the device control screen 502 to the display state of the basic screen.

Figure 56:
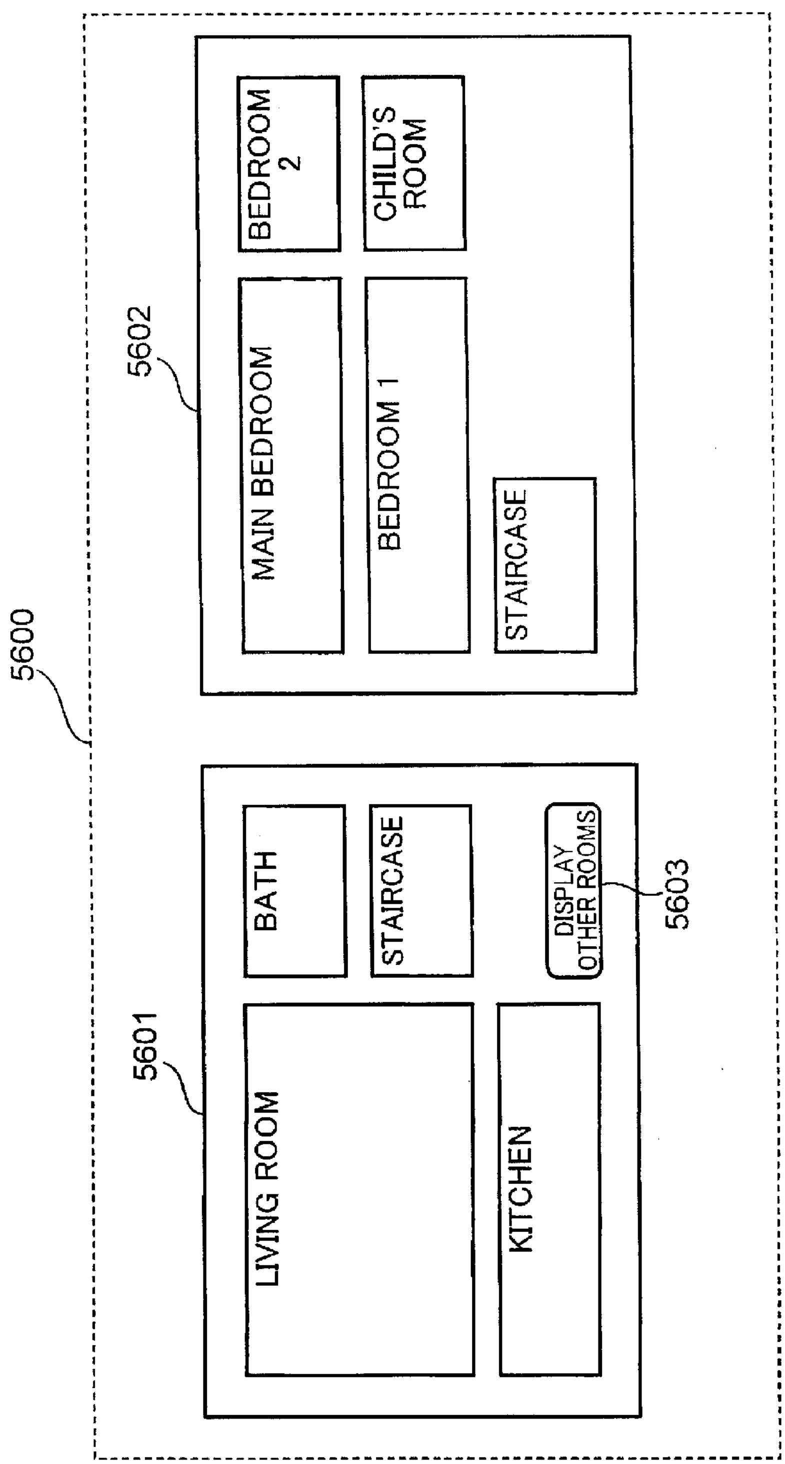
FIG. 56 is a diagram showing the configuration of a floor plan in which the size of each room is varied in accordance with the actual room size in the floor plan shown in FIG. 52.

FIG. 56 is a diagram showing the configuration of a floor plan 5600 for a case where the size of each block is varied in accordance with the actual room size in the floor plan 5200 shown in FIG. 52.

In the left diagram of FIG. 56, a floor plan 5601 for the first floor is shown. In the right diagram of FIG. 56, a floor plan 5602 for the second floor is shown.

In the floor plan 5601 for the first floor, the living room is the largest in terms of the room size, and is followed by the kitchen, the bath, and the staircase. Therefore, the sizes of the rooms are displayed in this order. Also in the floor plan 5602 for the second floor, the rooms are represented in accordance with the actual room size. In this case, information that indicates the actual room size may be registered in advance in room information 6800 to be discussed later, and the display control section 103 may decide the size of each room in accordance with the information.

Figure 57:
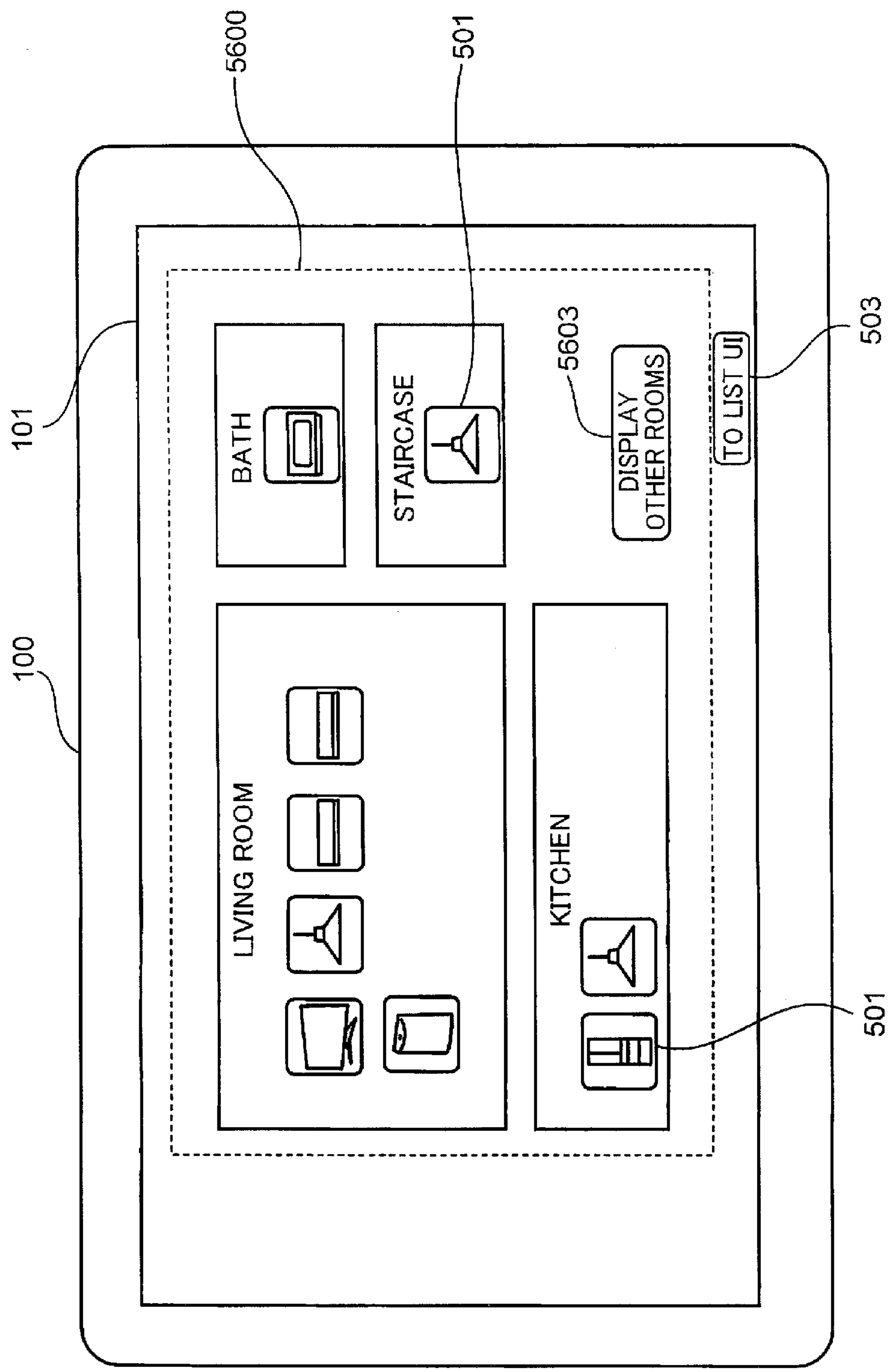
FIG. 57 is a diagram showing the configuration of a basic screen that adopts the floor plan shown in FIG. 56.

FIG. 57 is a diagram showing the configuration of a basic screen that adopts the floor plan 5600 shown in FIG. 56. In the floor plan 5600, each room is displayed with a size matching the actual size. In addition, the device icons 501 for the devices 200 actually disposed are displayed in each room.

In the case where the mode in which each room is represented with a size matching the actual room size on the floor plan 5600 is adopted, displaying all the rooms within the display 101 may result in small display of the rooms to make a user operation difficult. Thus, a room display button 5603 with a text "DISPLAY OTHER ROOMS" is provided in FIG. 57.

When the user selects the room display button and the touch panel control section 102 senses the selection, the display control section 103 switches the screen display to the floor plan 5600 which displays the remaining rooms.

In the example of FIG. 57, the floor plan 5600 is partitioned into the floor plan 5601 for the first floor and the floor plan 5602 for the second floor. Therefore, when the room display button 5603 is selected, the display control section 103 switches display on the display 101 to the floor plan 5602 for the second floor. In this case, the room display button 5603 is also provided on the floor plan 5602 for the second floor. Therefore, when the room display button 5603 is selected, the display control section 103 switches display on the display 101 to the floor plan 5601 for the first floor.

Although the floor plan is provided for each floor in the example of FIG. 57, the embodiment is not limited thereto. For example, in the case where the floor plan 5601 for the first floor cannot be displayed on the display 101 at the same time, the display control section 103 may divide the floor plan 5601 for the first floor, and display a divided portion of the floor plan 5601 on the display 101. In this case, when the room display button 5603 is selected, a hidden portion of the floor plan 5601 for the first floor may be displayed.

In the case where the floor plan 5601 for the first floor and the floor plan 5602 for the second floor can be displayed on the display 101 at the same time, the display control section 103 may display the floor plan 5601 for the first floor and the floor plan 5602 for the second floor on the display 101 at the same time. In this case, the room display button 5603 is omitted from the floor plan 5600.

In the case where the staircase is tapped on on the floor plan 5600, the display control section 103 may switch between the floor plan 5601 for the first floor and the floor plan 5602 for the second floor.

Figure 58:
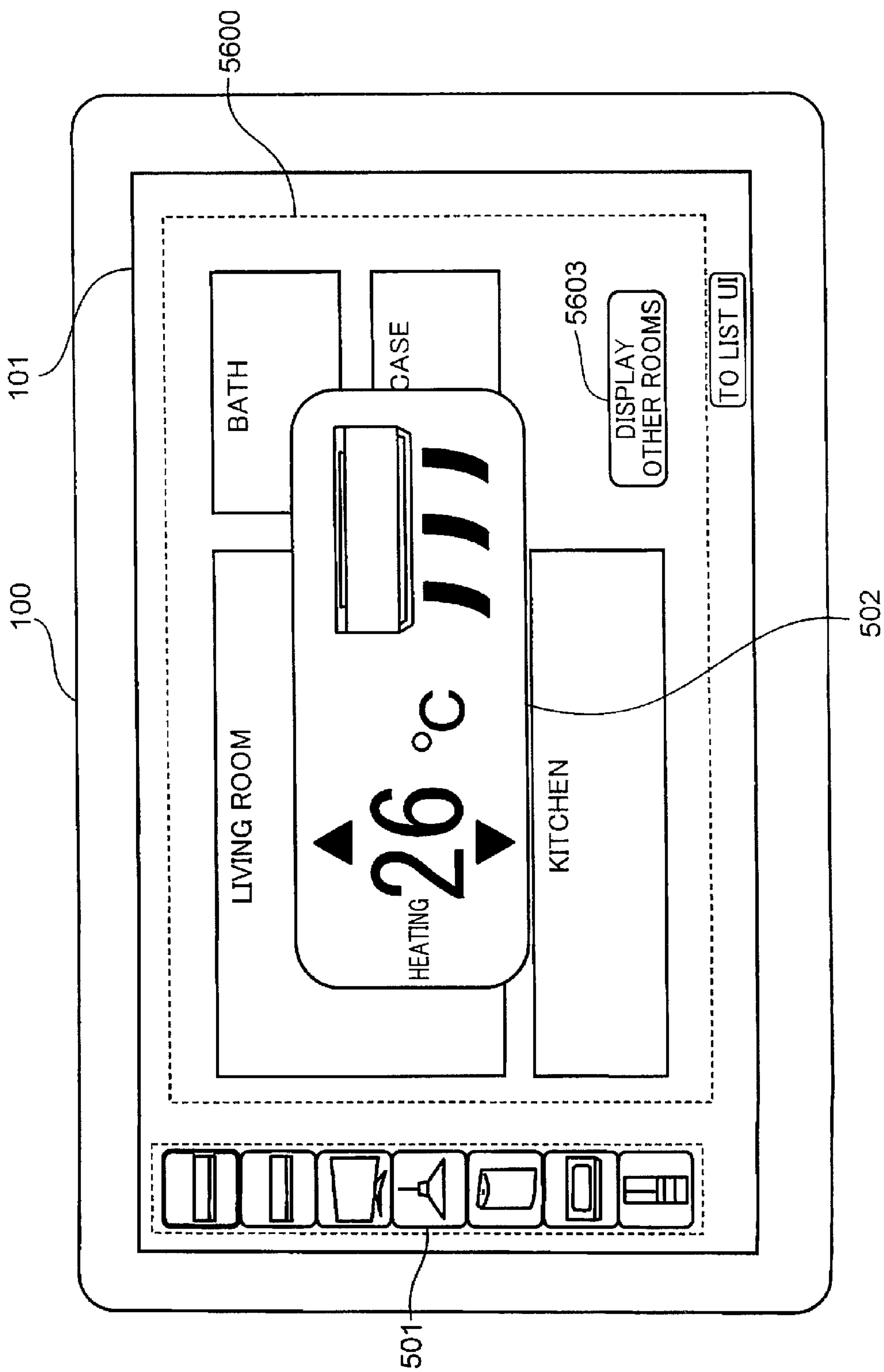
FIG. 58 is a diagram showing the display state of a device control screen for a case where the floor plan shown in FIG. 56 is adopted as the floor plan.

FIG. 58 is a diagram showing the display state of the device control screen 502 for a case where the floor plan 5600 shown in FIG. 56 is adopted as the floor plan. In FIG. 58, as in FIG. 54, the device control screen 502 for the air conditioner is displayed. FIG. 58 is otherwise the same as FIG. 54, and therefore is not described.

Figure 59:
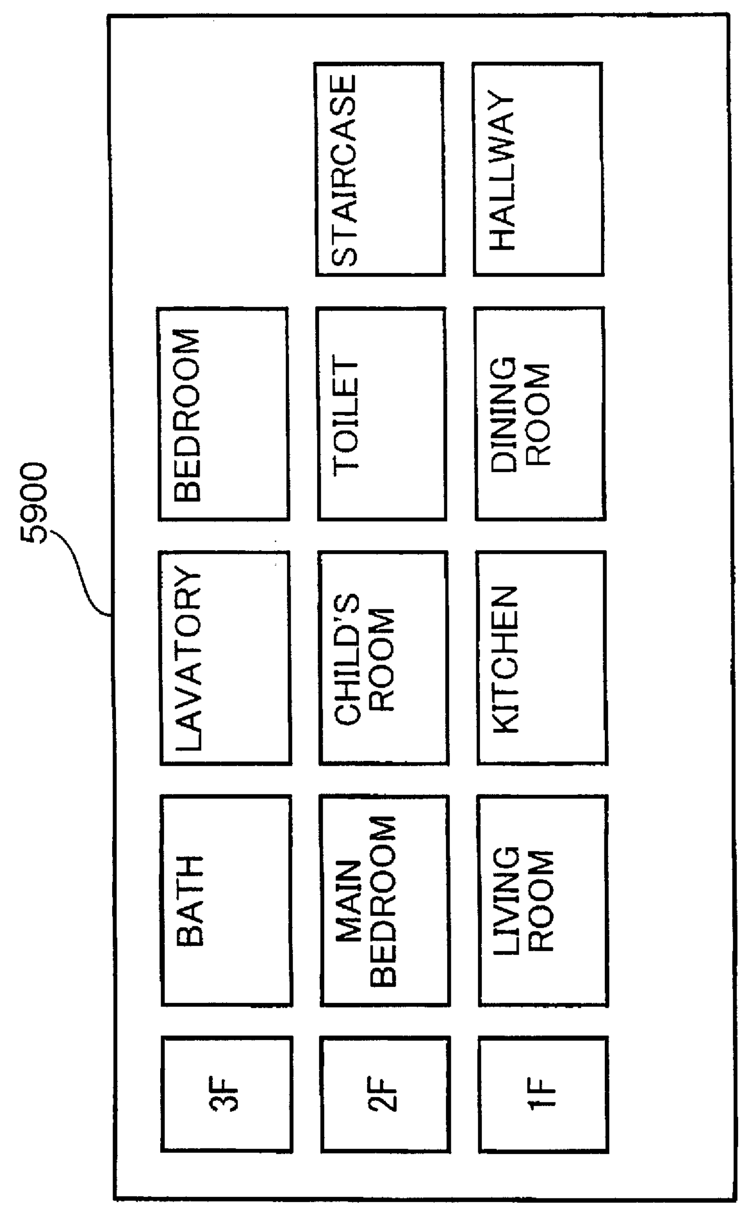
FIG. 59 is a diagram showing a floor plan in still another pattern according to the embodiment of the present disclosure.

FIG. 59 is a diagram showing a floor plan 5900 in still another pattern according to the embodiment of the disclosure. The floor plan 5900 of FIG. 59 is the same as the floor plan 5200 in that rooms are represented by blocks of the same size, but is different from the floor plan 5200 in arrangement of the rooms. Specifically, in the floor plan 5900, the floor numbers are displayed in the vertical direction, and the rooms forming the same floor are arranged in one horizontal line. In the example of FIG. 59, the house has three floors, namely the first floor to the third floor, and therefore the rooms forming the third floor are disposed in the first line, the rooms forming the second floor are disposed in the second line, and the rooms forming the first floor are disposed in the third line. The floor number such as 1F, 2F, and 3F is indicated at the left end of each line. It is seen at a glance from the floor plan 5900 on which floor each room is disposed.

Also in the floor plan 5900, the size of each room may be varied in accordance with the actual room size. In the floor plan 5900, in addition, in the case where all the rooms cannot be displayed within the display region of the display 101, the floor plan 5900 may be scrolled in the horizontal direction so that a desired room can be displayed on the display 101.

For example, in the case where there are further rooms on the second floor, when the touch panel control section 102 senses that the user performs a swipe operation from the left to the right, the display control section 103 may scroll the rooms forming the second floor, or the rooms forming the first floor to the third floor, from the left to the right in accordance with the amount of the swipe operation.

Figure 60:
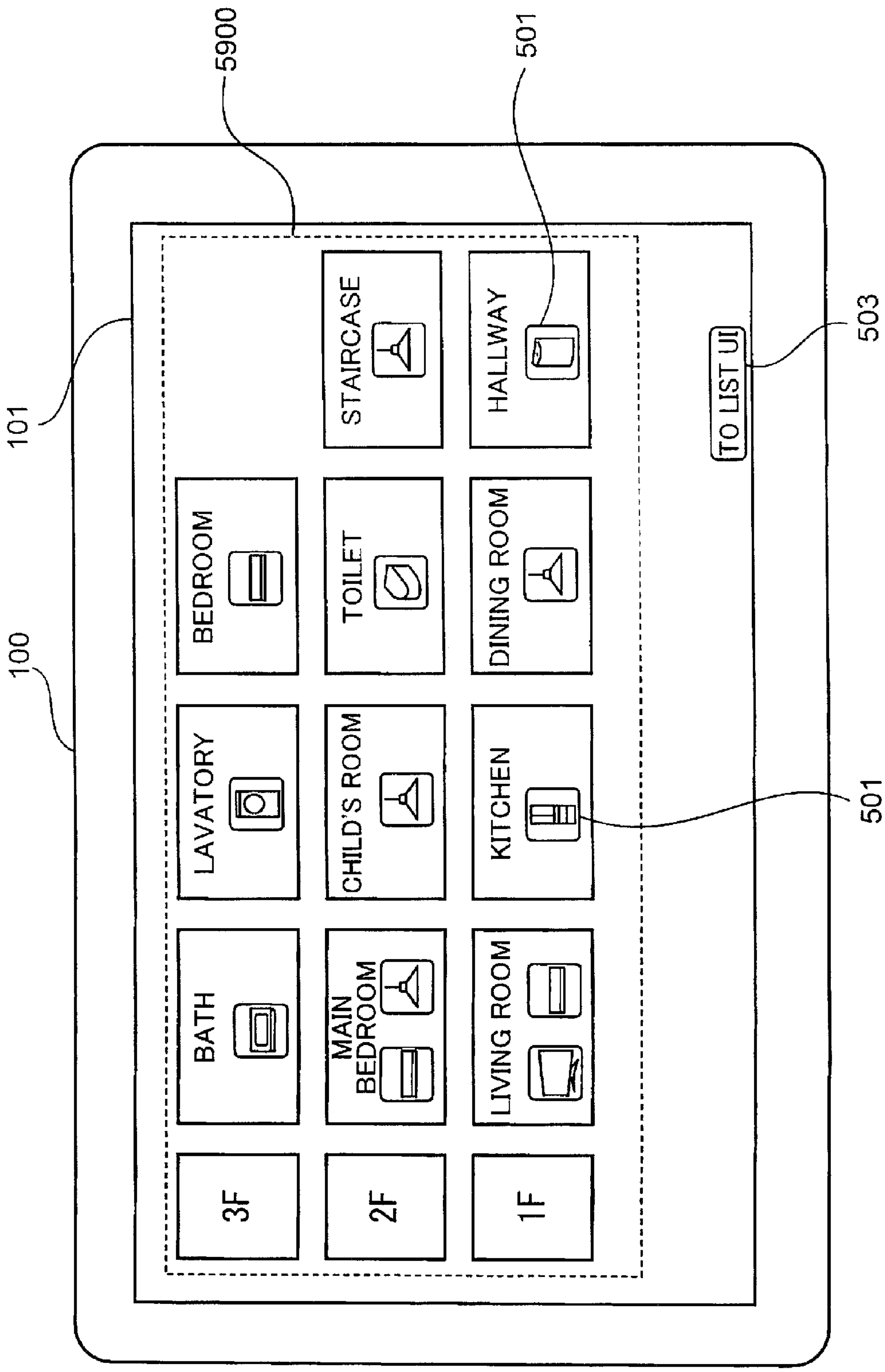
FIG. 60 is a diagram showing the configuration of a basic screen that adopts the floor plan shown in FIG. 59.

FIG. 60 is a diagram showing the configuration of a basic screen that adopts the floor plan 5900 shown in FIG. 59. The floor plan 5900 is displayed on the basic screen. In addition, the device icons 501 for the devices 200 actually disposed are displayed within each room. The device list display change button 503 is a button for switching the screen display from the basic screen to the device list display screen discussed earlier (see FIG. 24).

Figure 61:
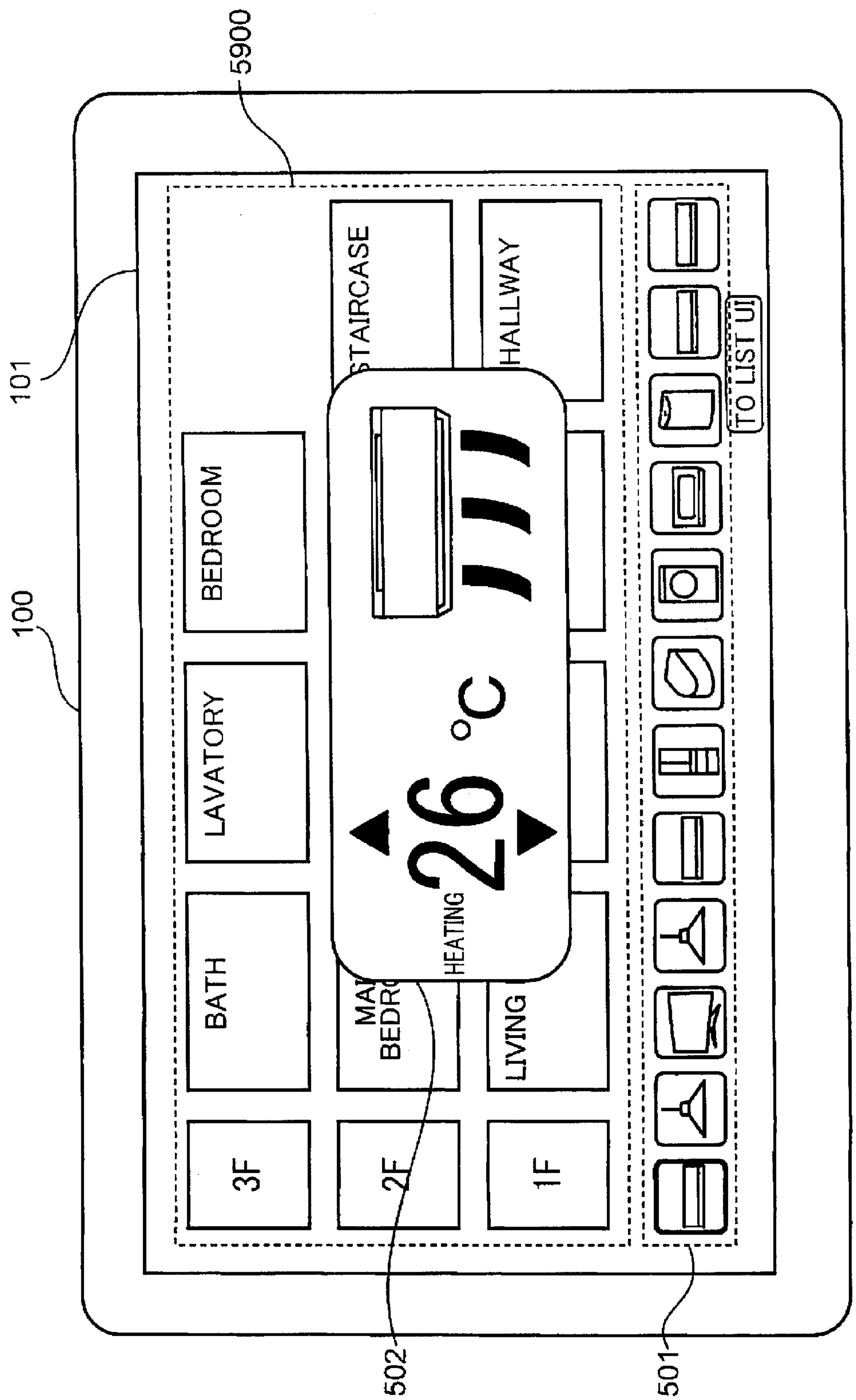
FIG. 61 is a diagram showing the display state of a device control screen for a case where the floor plan shown in FIG. 59 is adopted.

FIG. 61 is a diagram showing the display state of the device control screen 502 for a case where the floor plan 5900 shown in FIG. 59 is adopted. In the basic screen shown in FIG. 60, when the touch panel control section 102 senses that the user selects the device icon 501, the display control section 103 causes the display 101 to display the device control screen 502 corresponding to the selected device icon 501. In FIG. 61, the device icon 501 for the air conditioner is selected, and therefore the device control screen 502 for the air conditioner is displayed as overlapped on the floor plan 5900. In displaying the device control screen 502, the display control section 103 disposes the device icons 501 displayed on the floor plan 5900 outside the display region of the device control screen 502. In the example of FIG. 61, all the device icons 501 are disposed in one horizontal line on the lower side of the floor plan 5900.

In disposing the device icons 501 in one vertical line on the lower side of the floor plan 5900, the display control section 103 may group the device icons 501 under particular conditions. For example, the device icons 501 may be grouped in accordance with the room, may be grouped in accordance with the type of the device 200, or may be grouped in accordance with the category based on the type of the device 200.

In the example of FIG. 61, the device icons 501 are disposed on the lower side of the floor plan 5900. However, the device icons 501 may be disposed in one horizontal line on the upper side of the floor plan 5900, or may be disposed in one vertical line on the left or right side of the floor plan 5900.

In the case where all the device icons 501 cannot be disposed on the lower side of the floor plan 500, the display control section 103 may scroll the device icons 501 leftward or rightward in accordance with a swipe operation performed leftward or rightward on the device icons 501 disposed in one horizontal line on the lower side to cause the device icons 501, which have been hidden, to be displayed within the display 101.

In disposing the device icons 501 in one horizontal line on the lower side of the floor plan 5900, the display control section 103 may display the device icon 501 selected by the user in a display mode that is different from that for the unselected device icons 501. For example, the selected device icon 501 may be displayed in a color that is different from that of the unselected device icons 501, may be displayed more brightly than the unselected device icons 501, may be displayed more densely than the unselected device icons 501, or may be flashed on and off at a constant cycle.

The display control section 103 may scroll an array of the device icons 501 such that the device icon 501 selected by the user is positioned at a conspicuous position (for example, the leftmost, middle, or rightmost position) in the line of icons.

In displaying the device control screen 502, the display control section 103 may dispose all the device icons 501 on the outer periphery of an ellipse as shown in FIG. 12.

In the floor plan 5900, the rooms on all the floors are displayed on the display 101 at the same time, which may result in small display of the rooms to make a user operation difficult. Thus, the display control section 103 may display the floor plan 5900 as enlarged in accordance with the user operation. Specifically, when the user performs an operation of pinching out on a certain room in the floor plan 5900 and the touch panel control section 102 senses the operation, the display control section 103 may display the room on the display 101 as enlarged at an enlargement scale matching the amount of the pinch out.

Figure 62:
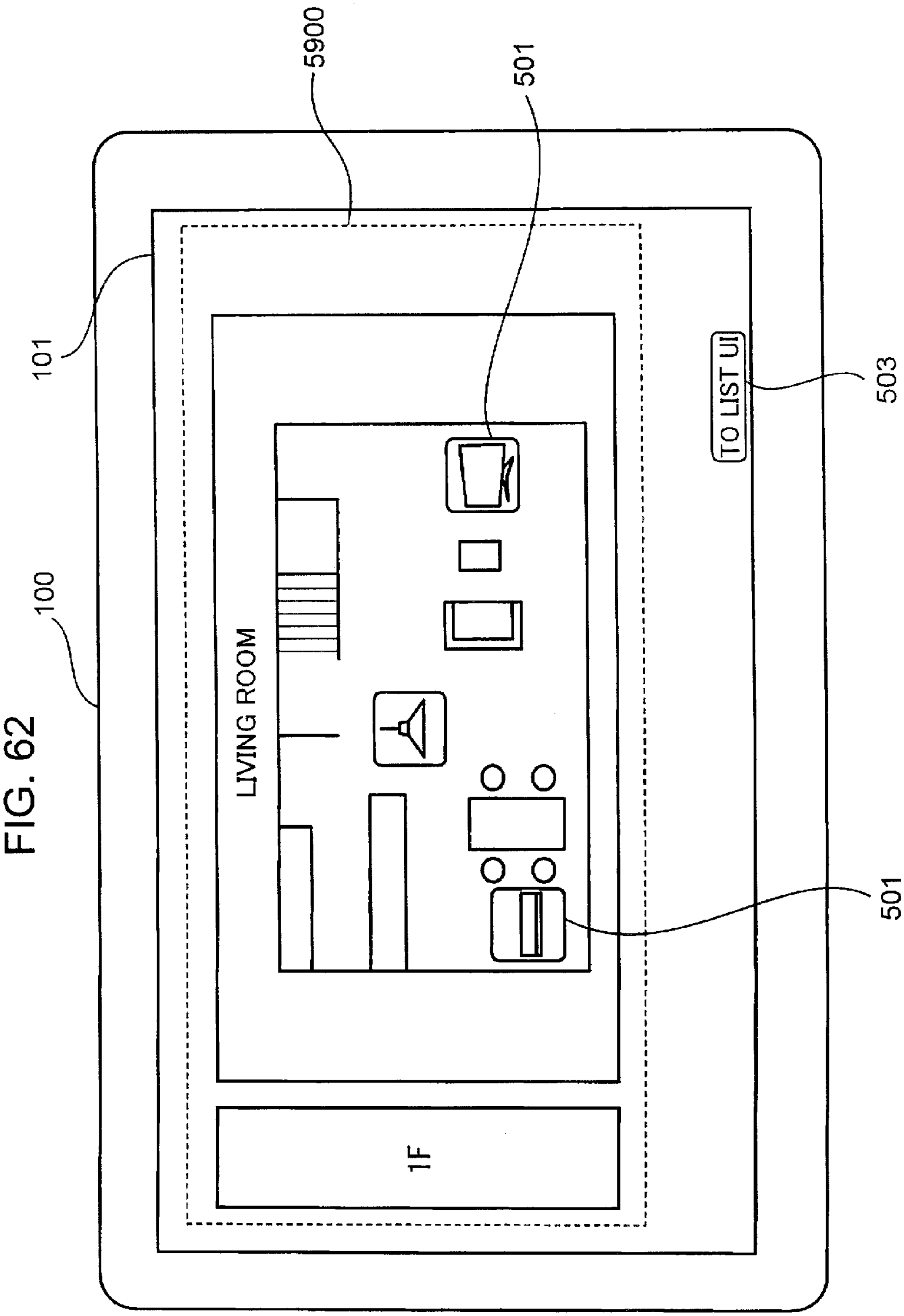
FIG. 62 is a diagram showing a floor plan displayed on a display in the case where a user performs a pinch-out operation on a room in the floor plan shown in FIG. 59.

FIG. 62 is a diagram showing a floor plan that displays a certain room in the floor plan 5900 as enlarged. As shown in FIG. 62, the display control section 103 may display a plan view that planarly represents the shape of the relevant room as overlapped on the floor plan 5900. Alternatively, the display control section 103 may switch to displaying the plan view. This allows the user to grasp the configuration of the rooms in the house and the devices 200 disposed in each room on the floor plan 5900 shown in FIG. 60, and to grasp the actual arrangement position of the devices 200 in the enlarged room on the floor plan 5900 shown in FIG. 62.

In the floor plan 5900 not displayed as enlarged shown in FIG. 60, it is not necessary for the display control section 103 to display the device icons 501 for all the devices 200 disposed within the rooms, and the display control section 103 may display only some of the device icons 501.

In this case, the display control section 103 may display one or a plurality of (for example, two) device icons 501 frequently used by the user on the floor plan 5900. Alternatively, the display control section 103 may not display the device icons 501 on the floor plan 5900 not displayed as enlarged. This prevents the viewability of the floor plan 5900 from being lowered because of an increased number of the device icons 501 displayed on the floor plan 5900 not displayed as enlarged.

Figure 63:
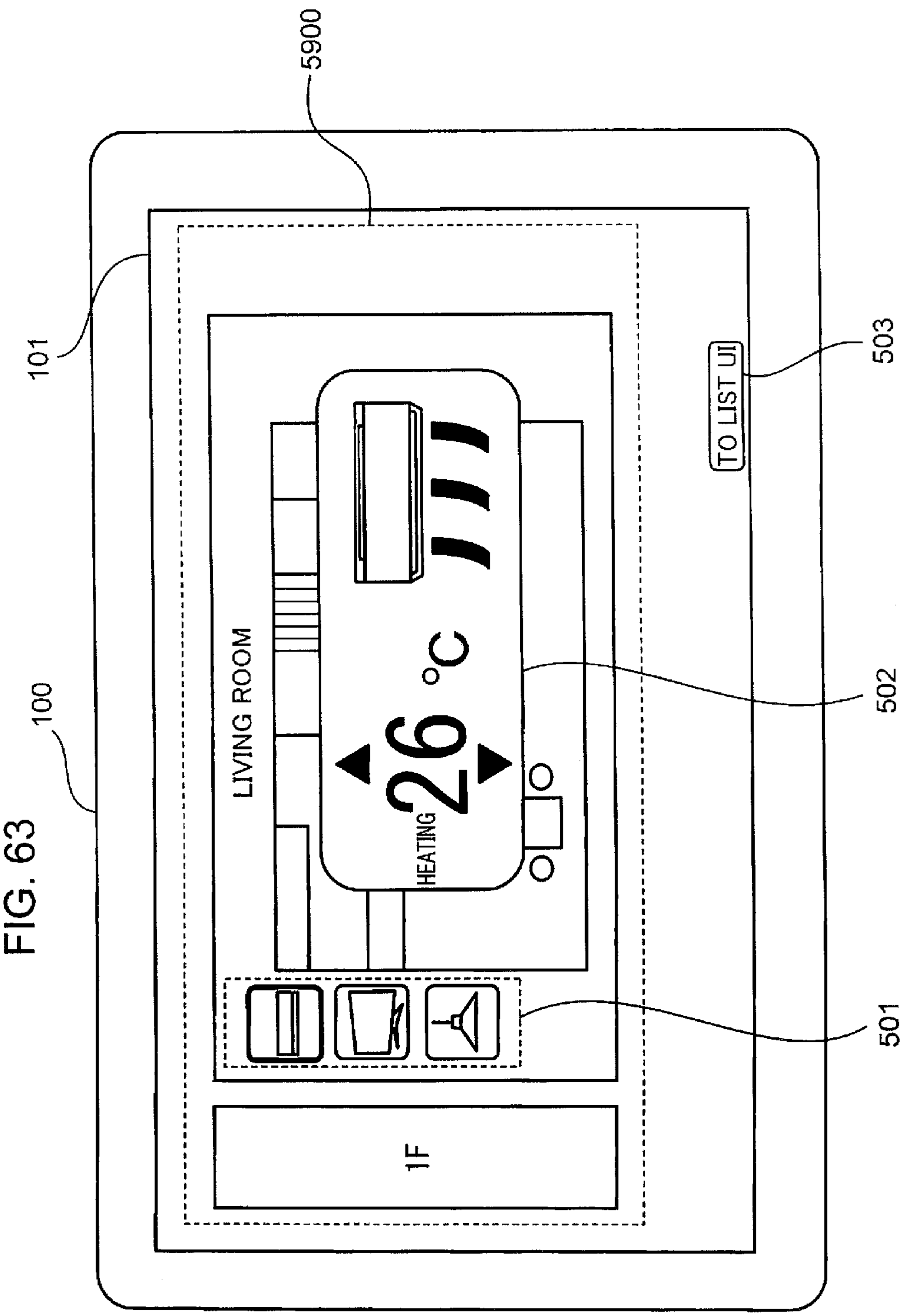
FIG. 63 is a diagram showing the display state of a device control screen in the floor plan displayed as enlarged shown in FIG. 62.

FIG. 63 is a diagram showing the display state of the device control screen 502 in the floor plan 5900 displayed as enlarged shown in FIG. 62. In FIG. 63, as in FIG. 54, the device control screen 502 for the air conditioner is displayed. In FIG. 63, only the device icons 501 disposed in the room (living room) displayed as enlarged are displayed on the left side of the plan view and in the block of the living room. In the example of FIG. 62, the device icons 501 for the air conditioner, the illumination device, and the television set are displayed in the living room within the plan view, and the device icon 501 for the air conditioner is selected by the user. Therefore, the device icons 501 are displayed in one vertical line on the left side of the plan view.

In the case where a certain room is displayed as enlarged, it is highly likely that the user operates the device 200 disposed within the room. In the case where a certain room is displayed as enlarged, in addition, the device icons 501 for devices in the other rooms are not displayed on the display 101. Therefore, if the device icons 501 for devices disposed in the other rooms are displayed on the left side of the plan view when the user selects a certain device icon 501, the user may be given a sense of wrongness.

Figure 64:
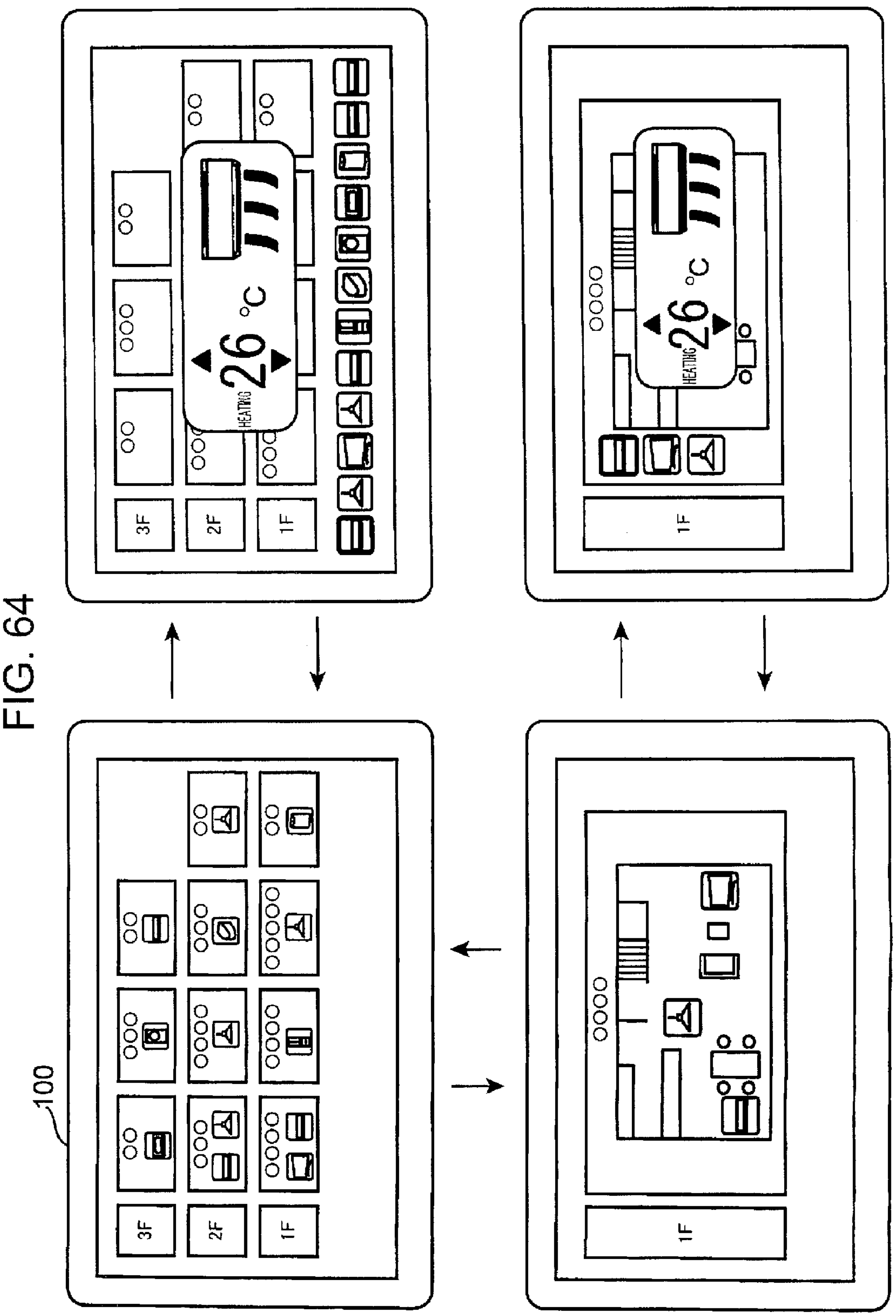
FIG. 64 is a diagram showing screen transition from the display state of the basic screen to the display state of the device control screen.

Thus, in the case where a certain room is displayed as enlarged, the display control section 103 causes only the device icons 501 for the devices 200 disposed in the room to be displayed in one vertical line on the left side of the plan view. In the example of FIG. 64, the device icons 501 are displayed on the left side of the plan view. However, the device icons 501 may be displayed in one vertical line on the right side of the plan view, or may be displayed in one horizontal line on the upper or lower side of the plan view.

FIG. 64 is a diagram showing screen transition from the display state of the basic screen to the display state of the device control screen 502. It is assumed that the user taps on the device icon 501 for the air conditioner, for example, in the basic screen which displays the floor plan 5900 not displayed as enlarged as shown in the upper left diagram of FIG. 64. Then, as shown in the upper right diagram of FIG. 64, the display control section 103 displays the device control screen 502 for the air conditioner as overlapped on the basic screen. In the screen shown in the upper right diagram of FIG. 64, on the other hand, when the user taps on a region on the floor plan 5900 other than the device control screen 502 or taps on the device icon 501 for the air conditioner, the display control section 103 returns the screen display to the basic screen shown in the upper left diagram of FIG. 64.

It is assumed that the user pinches out on the living room in the basic screen shown in the upper left diagram of FIG. 64. Then, as shown in the lower left diagram of FIG. 64, the display control section 103 enlarges the block of the living room, and at the same time displays the plan view of the living room having a size matching the size of the enlarged block as overlapped on the enlarged block. It is assumed that the user pinches in on the living room in the lower left diagram of FIG. 64. Then, the display control section 103 returns the screen display to the basic screen shown in the upper left diagram of FIG. 64.

When the device icon 501 for the air conditioner, for example, is selected in the basic screen shown in the lower left diagram of FIG. 64, the display control section 103 displays the device control screen 502 for the air conditioner as overlapped on the plan view as shown in the lower right diagram of FIG. 64. In the lower right diagram of FIG. 64, when the user taps on a region on the floor plan 5900 other than the device control screen 502 or on the device icon 501 for the air conditioner, the display control section 103 returns the screen display to the screen shown in the lower left diagram of FIG. 64.

Figure 65:
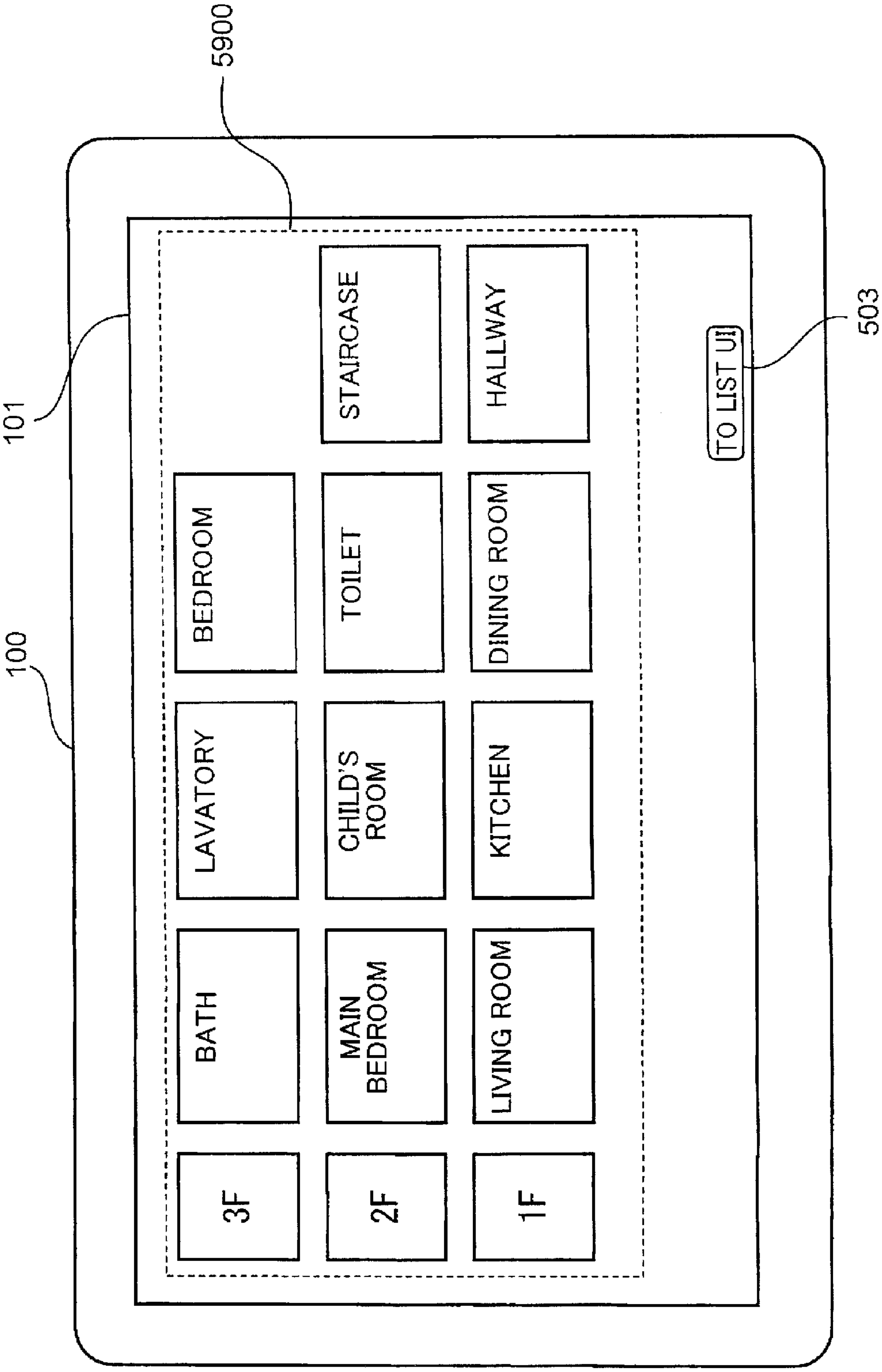
FIG. 65 is a diagram showing the configuration of a basic screen which adopts the floor plan shown in FIG. 59 and in which device icons are not displayed.

FIG. 65 is a diagram showing the configuration of a basic screen 5900 which adopts the floor plan shown in FIG. 59 and in which device icons 501 are not displayed. In the mode shown in FIG. 65, only rooms forming each floor are displayed, and the device icons 501 are not displayed.

Figure 66:
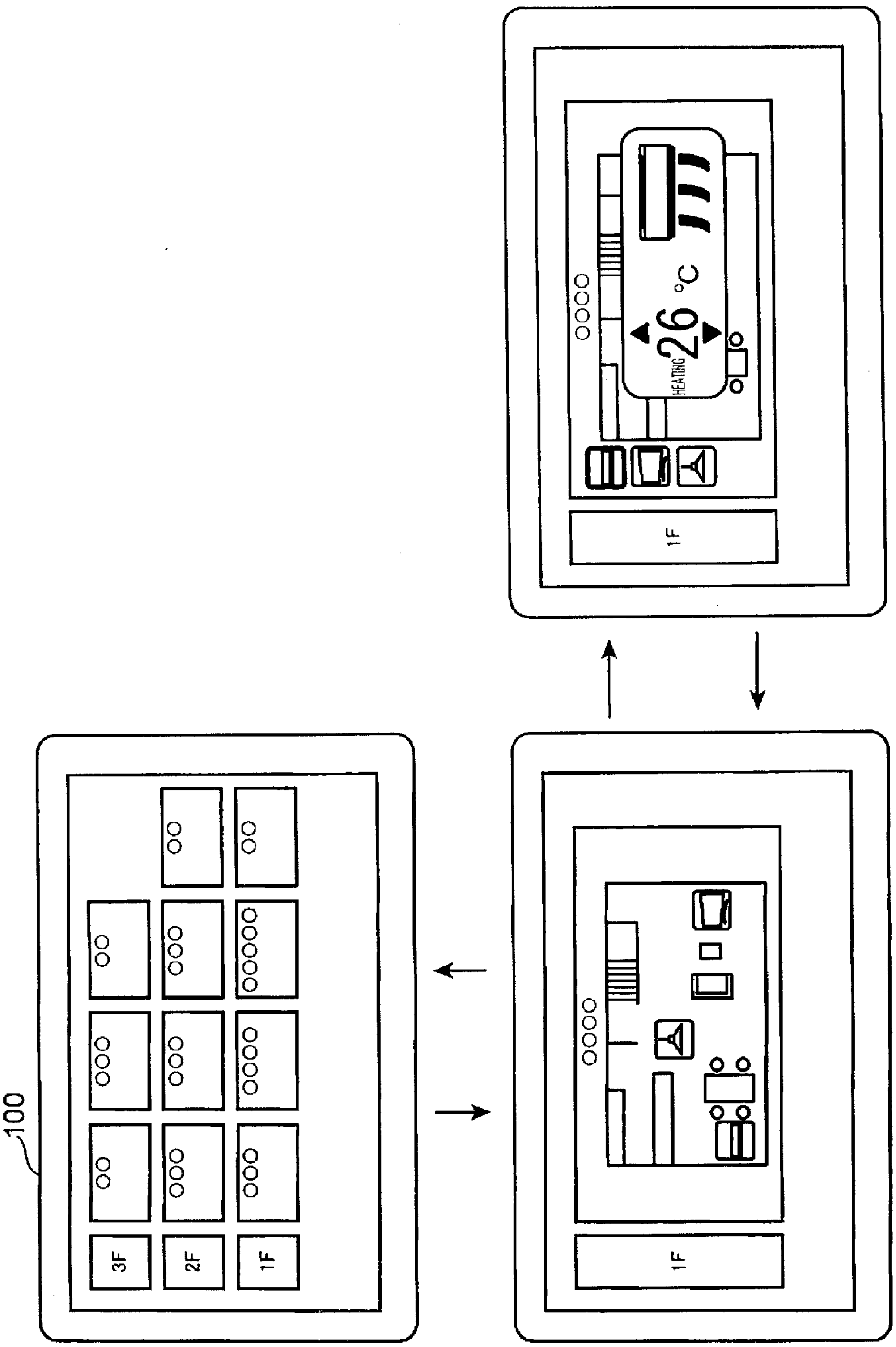
FIG. 66 is a diagram showing screen transition from the display state of the basic screen to the display state of the device control screen for a case where the basic screen in which device icons are not displayed is adopted.

FIG. 66 is a diagram showing screen transition from the display state of the basic screen to the display state of the device control screen 502 for a case where the basic screen in which device icons 501 are not displayed is adopted. It is assumed that the user pinches out on the living room, for example, in the basic screen shown in the upper left diagram of FIG. 66. Then, as shown in the lower left diagram of FIG. 66, the display control section 103 displays the block of the living room as enlarged, and displays the plan view of the living room as overlapped on the block displayed as enlarged. It is assumed that the user taps on the device icon 501 for the air conditioner, for example, in the screen shown in the lower left diagram of FIG. 66. Then, as shown in the lower right diagram of FIG. 66, the display control section 103 displays the device control screen 502 for the air conditioner as overlapped on the plan view of the living room, and disposes the device icons 501 for the living room in one vertical line on the left side of the plan view of the living room. In the lower right diagram of FIG. 66, when the user taps on a region on the floor plan 5900 and outside the display region of the device control screen 502, the display control section 103 returns the display screen to the screen shown in the lower left diagram of FIG. 66.

Figure 67:
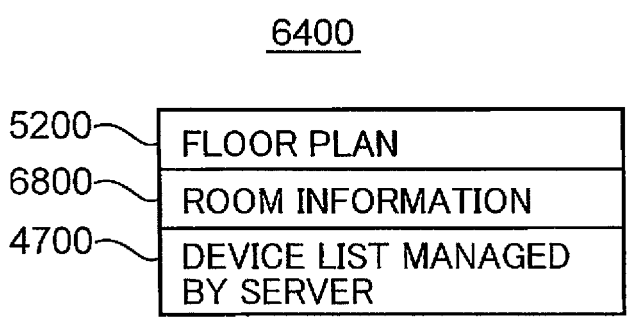
FIG. 67 is a diagram showing the configuration of the home information for a case where the floor plan shown in FIG. 52 is adopted.

FIG. 67 is a diagram showing the configuration of the home information 2700 for a case where the floor plan 5200 shown in FIG. 52 is adopted. As shown in FIG. 67, the home information 6400 includes the floor plan 5200, the room information 6800, and the device list 4700 managed by the server. In the floor plan 5200, the display positions of the rooms are determined in advance. Therefore, the vertex information 2800 included in the home information 2700 is omitted from the home information 6400.

The floor plan 5200 is image data obtained by representing the floor plan 5200 shown in FIG. 52 in a bitmap format, for example. Alternatively, the floor plan 5200 may be information that prescribes the color, the shape, the size, and so forth for displaying the floor plan 5200. The room information 6800 is information for deciding the regions of rooms from the floor plan 5200.

FIG. 68 is a diagram showing the configuration of room information 6800 shown in FIG. 67. As shown in FIG. 68, the room information 6800 includes a room ID 6801, a room type 6802, a floor level 6803, and a display position 6804. The room ID 6801 is an identifier that identifies a room on the floor plan 5200. The room type 6802 indicates the type of the room. The floor level 6803 indicates the floor level (floor) on which the room is disposed. The display position 6804 indicates the arrangement position of the room on the floor plan 5200.

Figure 69:
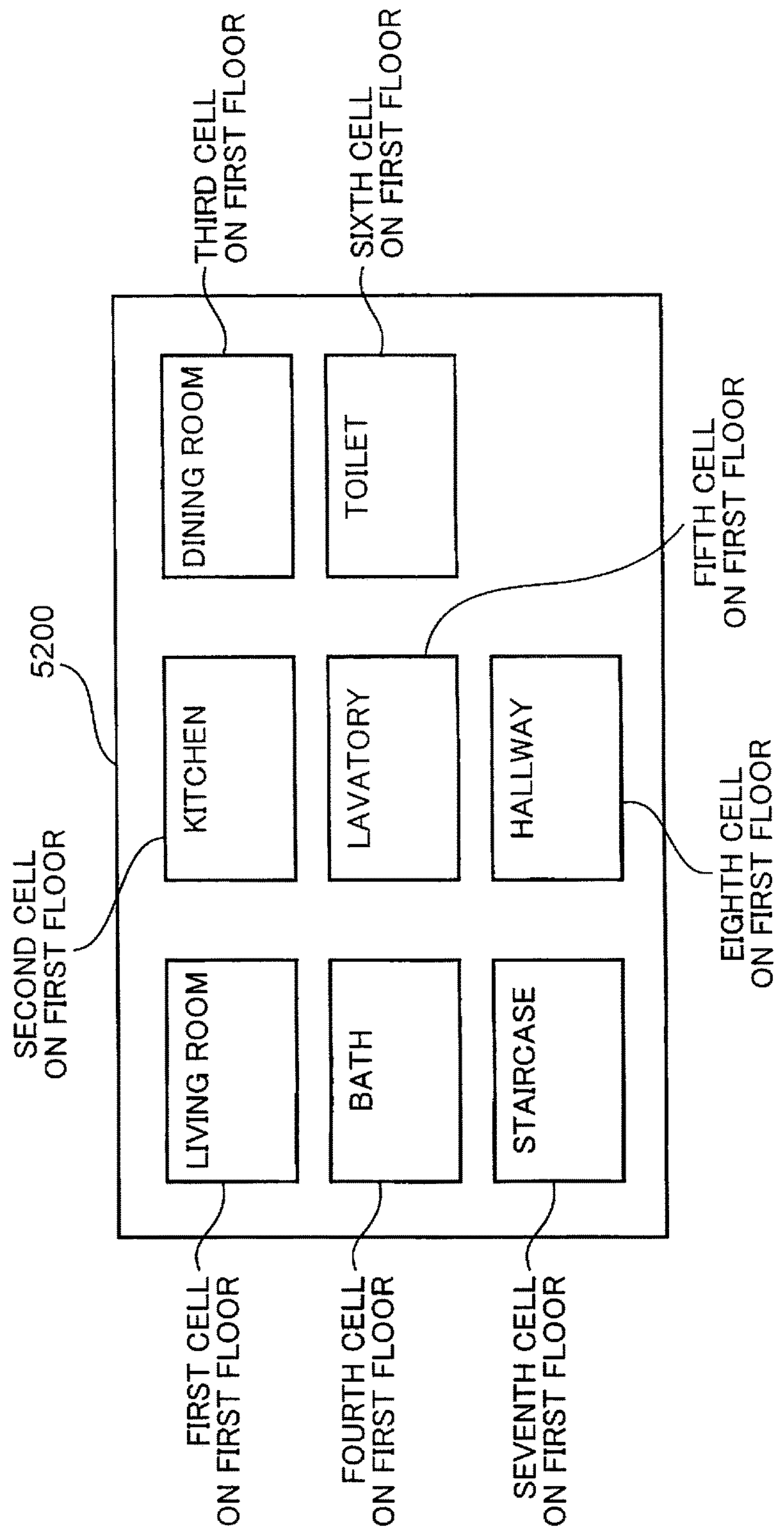
FIG. 69 is a diagram showing an example of the correspondence between the display position in the room information shown in FIG. 67 and the floor plan.

FIG. 69 is a diagram showing an example of the correspondence between the display position 6804 in the room information 6800 and the floor plan 5200. As shown in FIG. 69, the order of the blocks on the floor plan 5200 is prescribed such that the block in the first row and the first column corresponds to the first cell, the block in the first row and the second column corresponds to the second cell, the block in the first row and the third column corresponds to the third cell, the block in the second row and the first column corresponds to the fourth cell, and so forth.

For example, the room with a room ID 6801 of A has a display position 6804 of "FIRST CELL ON FIRST FLOOR". Therefore, as shown in FIG. 69, the display control section 103 interprets the block in the first cell (in the first row and the first column) on the floor plan 5201 for the first floor as the living room.

In the example of FIG. 69, the blocks are disposed in three horizontal lines, and therefore the cell in the second row and the first column corresponds to the fourth cell, and the cell in the third row and the first column corresponds to the seventh cell. It should be noted, however, that this is merely exemplary. For example, in the case where the cells are arranged in four columns in the horizontal direction, the correlation between the order of the cells and the arrangement positions of the blocks is changed as appropriate in accordance with the number of blocks in the horizontal direction, and the cell in the second row and the first column corresponds to the fifth cell, and the cell in the third row and the first column corresponds to the ninth cell.

FIG. 70 is a diagram showing the configuration of a device list 4700 managed by the server 300 for a case where the floor plan 5200 shown in FIG. 52 is adopted. It is not necessary for the floor plan 5200 to indicate the arrangement position of the device 200 in the room. Therefore, in the device list 4700 shown in FIG. 70, unlike FIG. 34, the room type 6802 is registered in the arrangement 4704. The device list 4700 shown in FIG. 70 is otherwise the same as the device list 4700 shown in FIG. 34. For example, the air conditioner with a device ID 4701 of A is disposed in the living room, and therefore "LIVING ROOM" is registered in the arrangement 4704. In the example of FIG. 70, the room type 6802 is adopted as the arrangement 4704. However, any other information that specifies a room may be registered. For example, the room ID 6801 may be adopted as the arrangement 4704.

FIG. 71 is a diagram showing the configuration of a device list 3100 managed by the home controller 100 for a case where the floor plan 5200 shown in FIG. 52 is adopted. Also in the device list 3100 of FIG. 71, for the same reason as that for the device list 4700 of FIG. 70, the room type 6802 is registered in the arrangement 3104. The device list 3100 of FIG. 71 is otherwise the same as the device list 3100 shown in FIG. 35. Also in FIG. 71, the room ID 6801 may be adopted as the arrangement 3104.

Next, the device list 3100 for a case where the plan view of a certain room is displayed in the case where a pinch-out operation is performed on the room on the basic screen of the floor plan 5900 as shown in FIG. 62 will be described. In this case, the room information 6800 shown in FIG. 68 may include an item of the plan view of the room. Then, image data for the plan view of the relevant room may be registered in the item of the plan view of the room. For the plan view of the room, as shown in FIG. 33, the origin may be set at the left end of the room, for example, the X axis and the Y axis may be set in the horizontal direction and the vertical direction, respectively, and the position of the room may be represented by the X and Y coordinates.

Meanwhile, not only the room type 6802 but also the coordinate in the room is registered in the arrangement 3104 of the device list 3100 shown in FIG. 71. This allows the display control section 103 to discriminate from the content of the arrangement 3104 at what position on the plan view representing the room the device icon 501 is to be disposed.

In the embodiment, the server 300 is not an essential constituent element, and various types of information managed by the server 300 (such as the home information 2700 and the state of the devices 200) may be managed by the home controller 100. This allows the embodiment described above to be embodied without the server 300. In this case, it is not necessary for the home controller 100 to manage information on the entire house, and it is only necessary to manage information related to the devices 200 controlled by the home controller 100 and the house in which the devices 200 are disposed.

(Control of Specific Target Device)

An embodiment of an aspect that does not limit target device type has been described above. Hereinafter, an embodiment of an aspect in which a target device is a specific target device will be described in detail. A specific target device is a device of a type storing a set content at the time power of the device has been turned off among the devices 200. In other words, a specific target device is a device which, when power is turned on, starts operation according to a set content at the time power of the device has been previously turned off. In the present embodiment, examples of a specific target device include the air conditioner 201 and the television set 209. As examples of the specific target device, an embodiment of an air conditioner will be described first, and an embodiment of a television set will be subsequently described.

(Control Screen of Air Conditioner)

FIGS. 72 to 75 are, respectively, diagrams showing an example of a control screen of an air conditioner that is displayed on the display 101 of the home controller 100. FIG. 76 is a diagram showing an example of transition of a display screen of the display 101 of the home controller 100. An upper diagram in FIG. 76 represents the basic screen shown in FIG. 5 and a lower diagram in FIG. 76 represents the display screen shown in FIG. 72.

For example, as shown in the upper diagram in FIG. 76, a basic screen including the floor plan 500, the device icons 501, and the like is displayed by the display control section 103 on the display 101 of the home controller 100. In this display state, when the user taps (selects) a device icon 10201 (corresponding to an example of the device icon representing the specific target device according to an aspect of the present disclosure) of an air conditioner disposed in a room 10200 in which an air conditioner is installed, the selection is sensed by the touch panel control section 102. As a result, as shown in FIGS. 72 to 75 and in the lower diagram in FIG. 76, the display control section 103 displays a control screen 10100 of an air conditioner on the display 101.

In this control of an air conditioner, as shown in FIGS. 72 to 75 and in the lower diagram in FIG. 76, the floor plan 500 and the control screen 10100 of the air conditioner share the same display content. In other words, when the user selects the device icon 10201 of the air conditioner, the floor plan 500 also functions as the control screen 10100 of the air conditioner.

For example, on the basic screen represented by the upper diagram in FIG. 76, when the user selects the device icon 10201 of the air conditioner that is disposed in the room 10200 in which the air conditioner is installed, the selection is sensed by the touch panel control section 102. As a result, the display control section 103 displays the control screen 10100 of the air conditioner on the display 101. Therefore, as shown in FIGS. 72 to 75 and in the lower diagram in FIG. 76, a control target region 10101 of an air conditioner that is included in the control screen 10100 of the air conditioner is a region corresponding to the room 10200 in which the air conditioner is installed.

In addition, when the touch panel control section 102 senses selection of the device icon 10201 of the air conditioner by the user in the basic screen display state (for example, the upper diagram in FIG. 76), as described above, the display control section 103 moves the device icons 501 out of a display region of the control screen 10100 of the air conditioner (the floor plan 500) as shown in FIGS. 72 to 75 and in the lower diagram in FIG. 76. In the example shown in FIGS. 72 to 75 and in the lower diagram in FIG. 76, the device icons 501 are aligned in a single vertical column at a left end in the display screen of the display 101 so as to avoid the display region of the floor plan 500.

Figure 72:
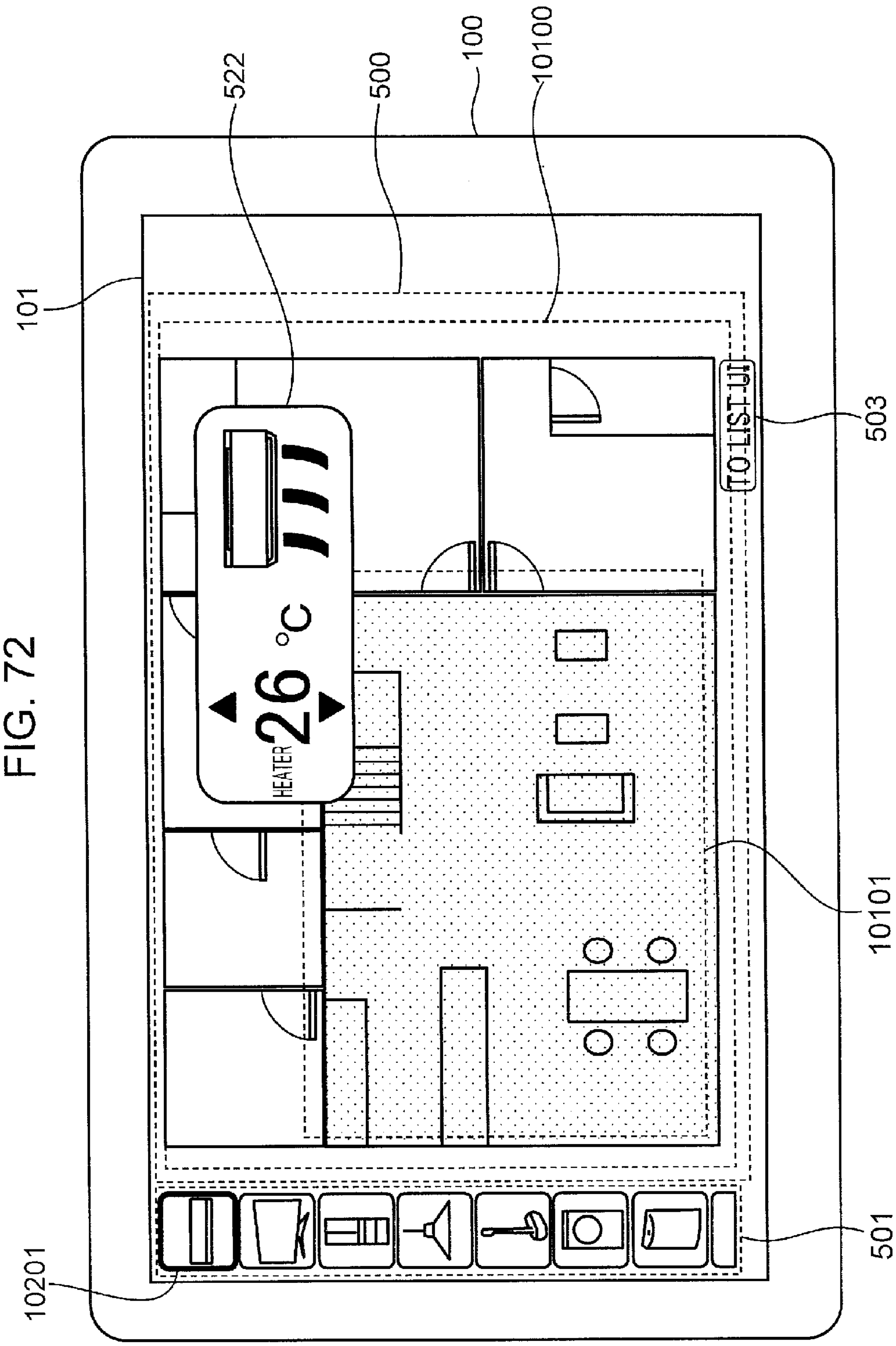
FIG. 72 is a diagram showing an example of a control screen of an air conditioner that is displayed on a display of a home controller according to an embodiment of the present disclosure.

In addition, in the example shown in FIG. 72, the selected device icon 10201 of the air conditioner is displayed so as to be distinguished from unselected device icons by, for example, being enclosed in a bold frame. Moreover, a mode of displaying the selected device icon 10201 of the air conditioner so as to be distinguished from unselected device icons is not limited to a mode involving enclosing the selected device icon 10201 in a bold frame. As described earlier, the display control section 103 can adopt various modes such as displaying the selected device icon 10201 of the air conditioner in a color that differs from that of the unselected device icons and displaying the selected device icon 10201 with higher brightness.

In addition, as shown in FIGS. 72 to 75, the display control section 103 displays a detail control screen 522 in the control screen 10100 of the air conditioner. The detail control screen 522 is configured in a similar manner to the device control screen 502 (for example, FIG. 12). Specifically, the detail control screen 522 displays an image of an air conditioner to enable the user to quickly recognize that the detail control screen 522 belongs to an air conditioner in order to prevent a misoperation. An image representing an air flow direction is displayed below the image of the air conditioner. For example, by repetitively tapping this image, the user can select a desired air flow direction. A numerical value displayed in the detail control screen 522 represents a current set temperature of the air conditioner. In addition, on the detail control screen 522, a button shaped in an upward-pointing triangle is a higher temperature button and a button shaped in a downward-pointing triangle is a lower temperature button. When the higher temperature button is tapped once, the set temperature of the air conditioner rises by a prescribed temperature (for example, 0.5 degrees), and when the lower temperature button is tapped once, the set temperature of the air conditioner falls by a prescribed temperature (for example, 0.5 degrees). Furthermore, an operation mode of the air conditioner is displayed at a left end of the detail control screen 522. For example, "heater" is displayed in FIG. 72 and "cooler" is displayed in FIG. 73.

Figure 73:
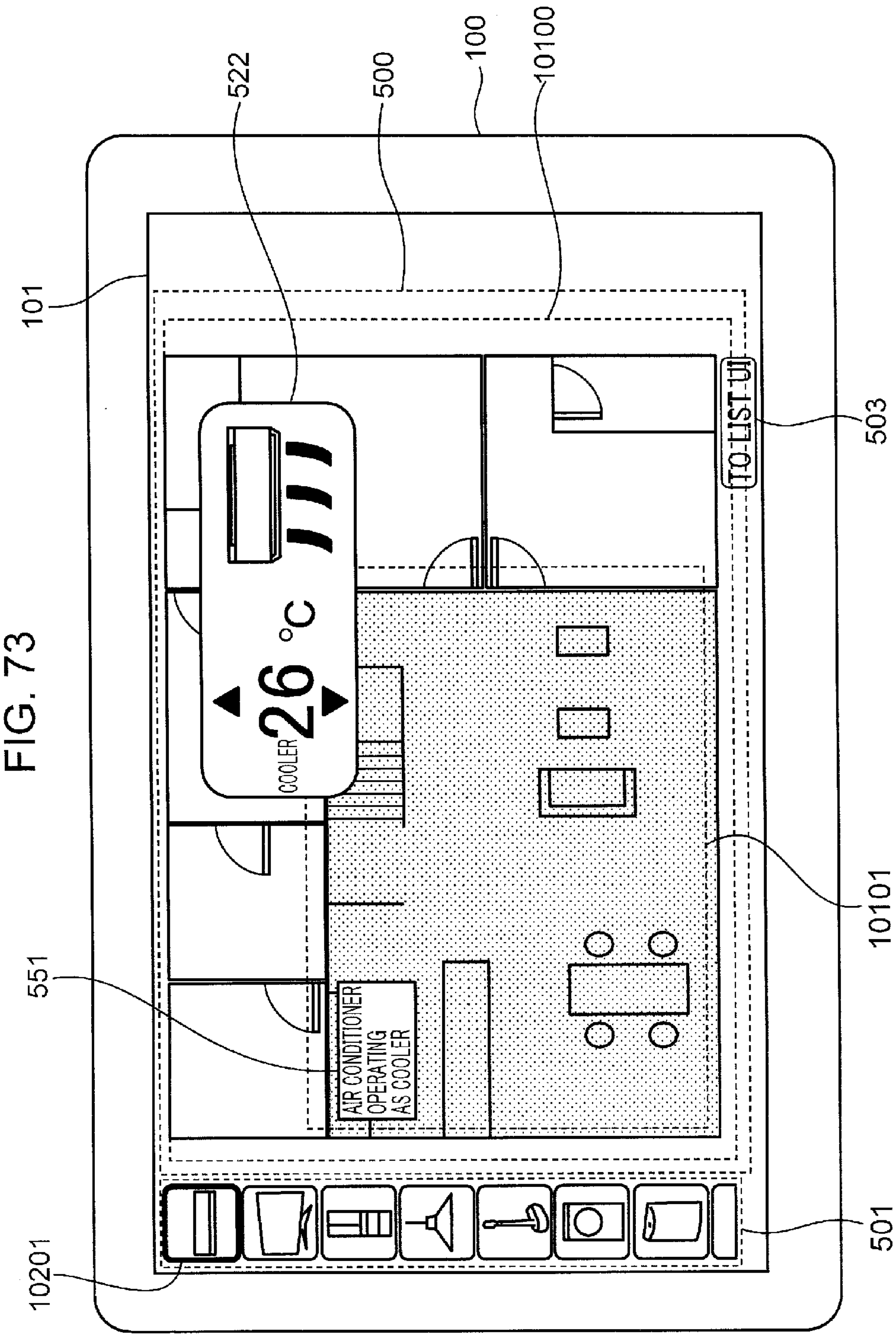
FIG. 73 is a diagram showing an example of a control screen of an air conditioner that is displayed on a display of a home controller according to an embodiment of the present disclosure.
Figure 74:
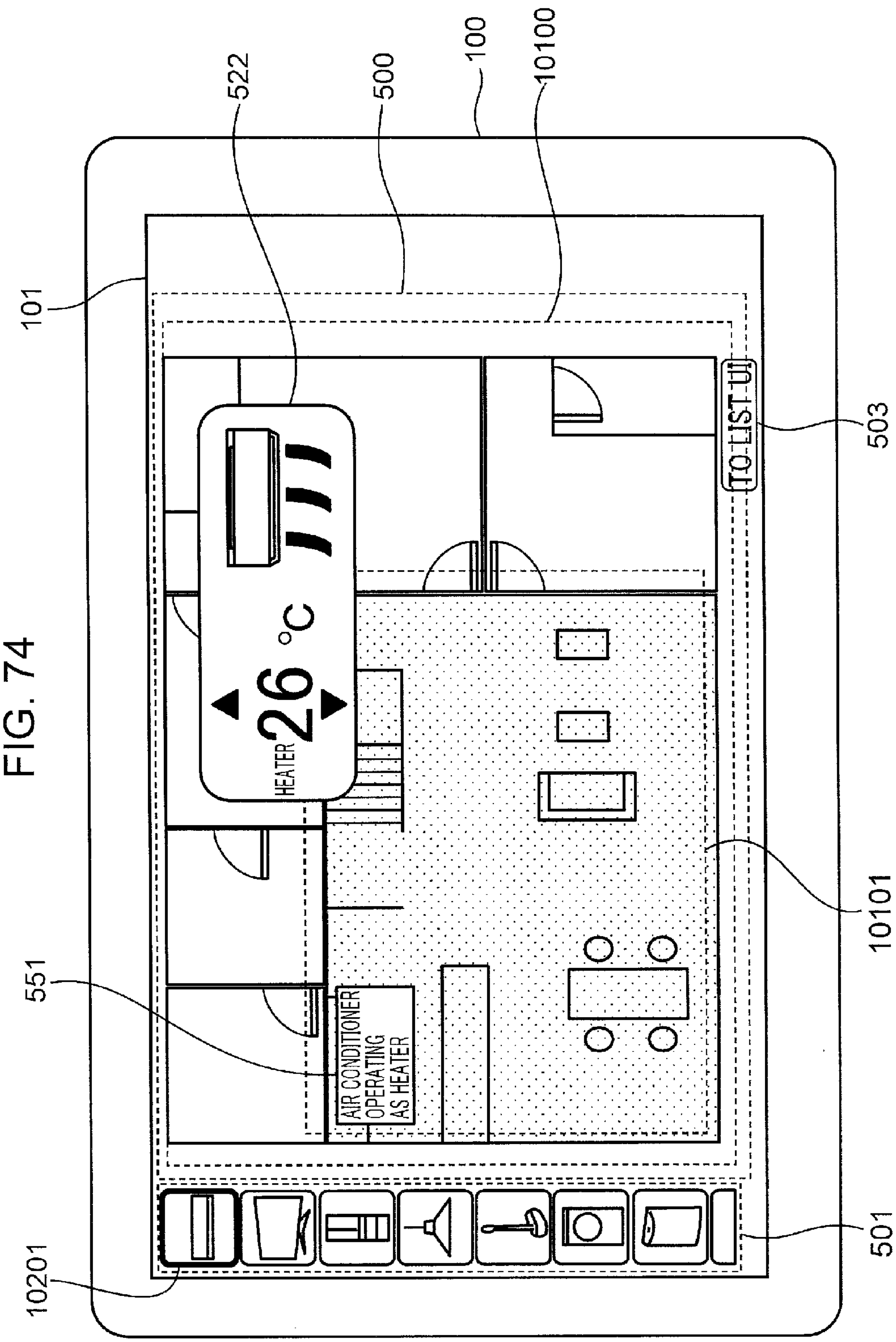
FIG. 74 is a diagram showing an example of a control screen of an air conditioner that is displayed on a display of a home controller according to an embodiment of the present disclosure.

FIGS. 72 and 74 show the control screen 10100 of the air conditioner when the air conditioner is operating in the heater mode. In FIGS. 72 and 74, the display control section 103 displays the control target region 10101 of the air conditioner in a warm color (for example, red). FIG. 73 shows the control screen 10100 of the air conditioner when the air conditioner is operating in the cooler mode. In FIG. 73, the display control section 103 displays the control target region 10101 of the air conditioner in a cold color (for example, blue).

By displaying the control target region 10101 of the air conditioner in a warm color, the user can instantaneously recognize that the air conditioner installed in a room corresponding to the control target region 10101 of the air conditioner is operating with its operation mode set to the heater mode. In a similar manner, by displaying the control target region 10101 of the air conditioner in a cold color, the user can instantaneously recognize that the air conditioner installed in a room corresponding to the control target region 10101 of the air conditioner is operating with its operation mode set to the cooler mode.

Figure 75:
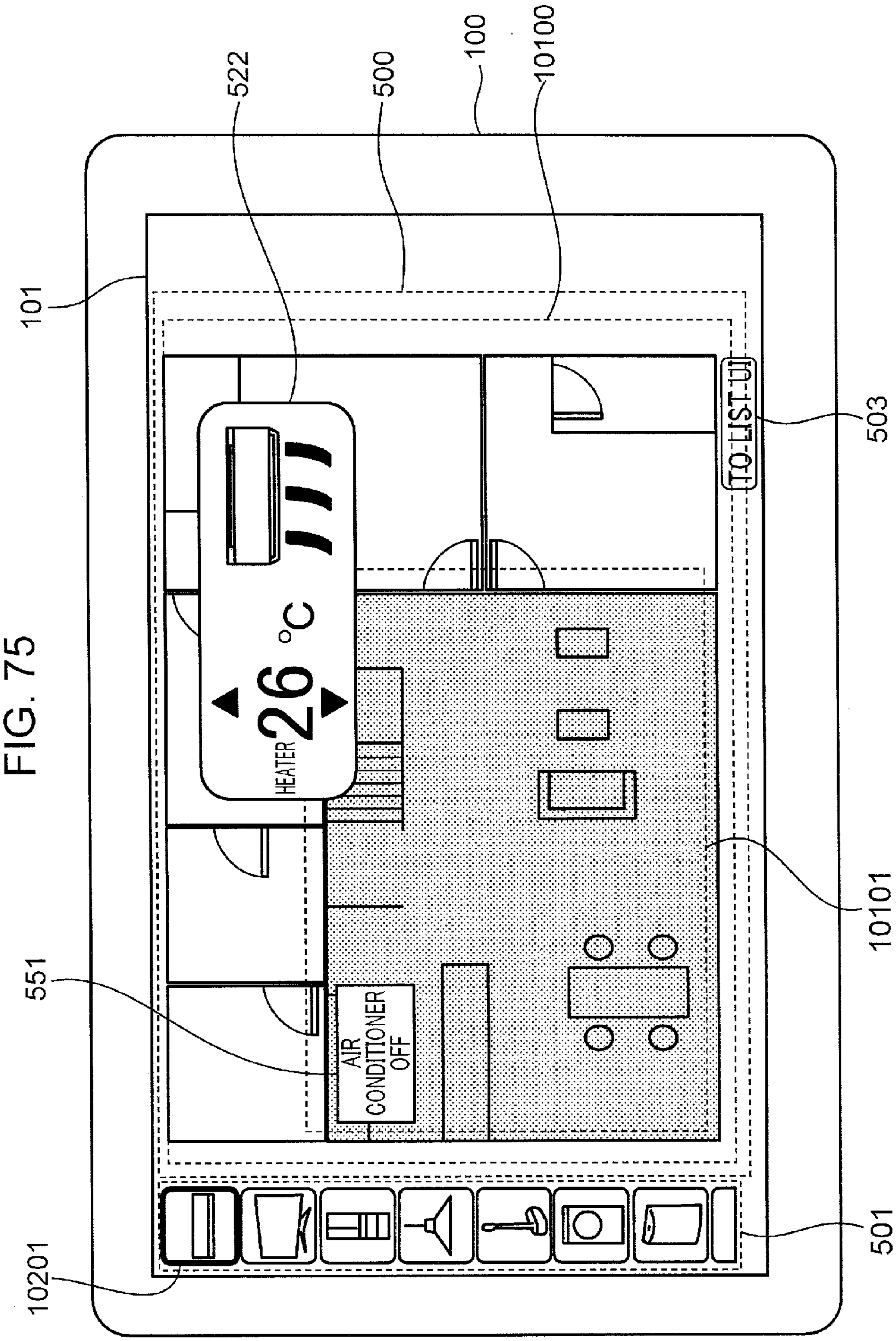
FIG. 75 is a diagram showing an example of a control screen of an air conditioner that is displayed on a display of a home controller according to an embodiment of the present disclosure.
Figure 76:
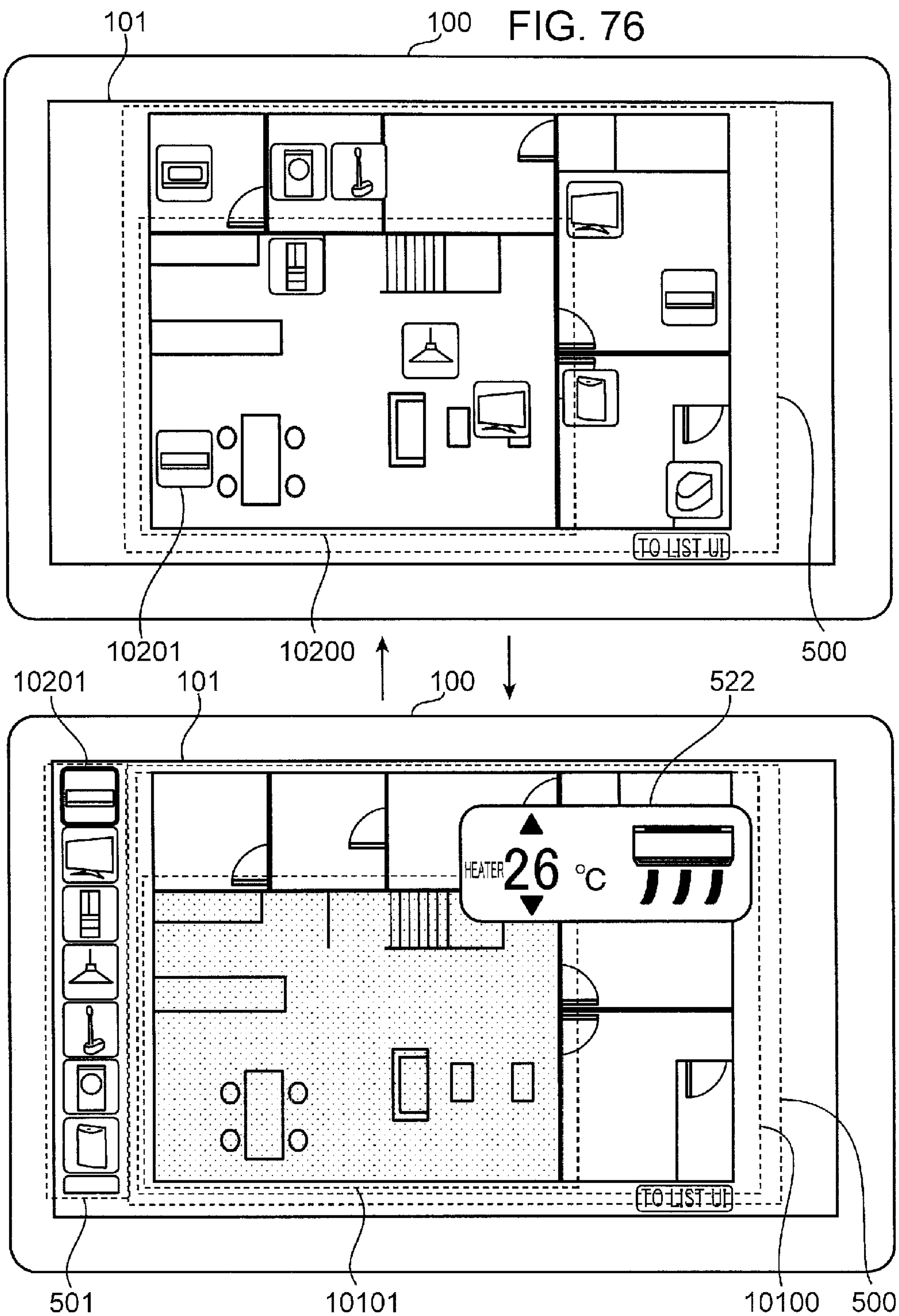
FIG. 76 is a diagram showing an example of transition of a display screen of a display of a home controller according to an embodiment of the present disclosure.

FIG. 75 shows the control screen 10100 of the air conditioner when the air conditioner is not in operation. In FIG. 75, the display control section 103 displays the control target region 10101 of the air conditioner darkly with brightness (for example, signal level 64 in case of 8 bits) lower than specified brightness (for example, signal level 128 in case of 8 bits) and in, for example, gray. By displaying the control target region 10101 of the air conditioner darkly in gray, the user can instantaneously recognize that the air conditioner installed in a room corresponding to the control target region 10101 of the air conditioner is not operating.

As described above, by controlling a color and brightness of the displayed control target region 10101 of the air conditioner, the user can instantaneously recognize an operation state of the air conditioner that is installed in a room. As a result, a misoperation by the user can be prevented and an unnecessary increase in the number of process steps can be avoided.

In FIGS. 73 to 75, the display control section 103 further displays an operation state display section 551 in the control target region 10101 of the air conditioner. In FIG. 73, the display control section 103 displays the operation state display section 551 including the description "air conditioner operating as cooler". In FIG. 74, the display control section 103 displays the operation state display section 551 including the description reading "air conditioner operating as heater". In FIG. 75, the display control section 103 displays the operation state display section 551 including the description "air conditioner off". As shown, by displaying the operation state display section 551 in the control target region 10101 of the air conditioner, the user can visually recognize an operation state of the air conditioner that is installed in the room through characters.

Figure 77:
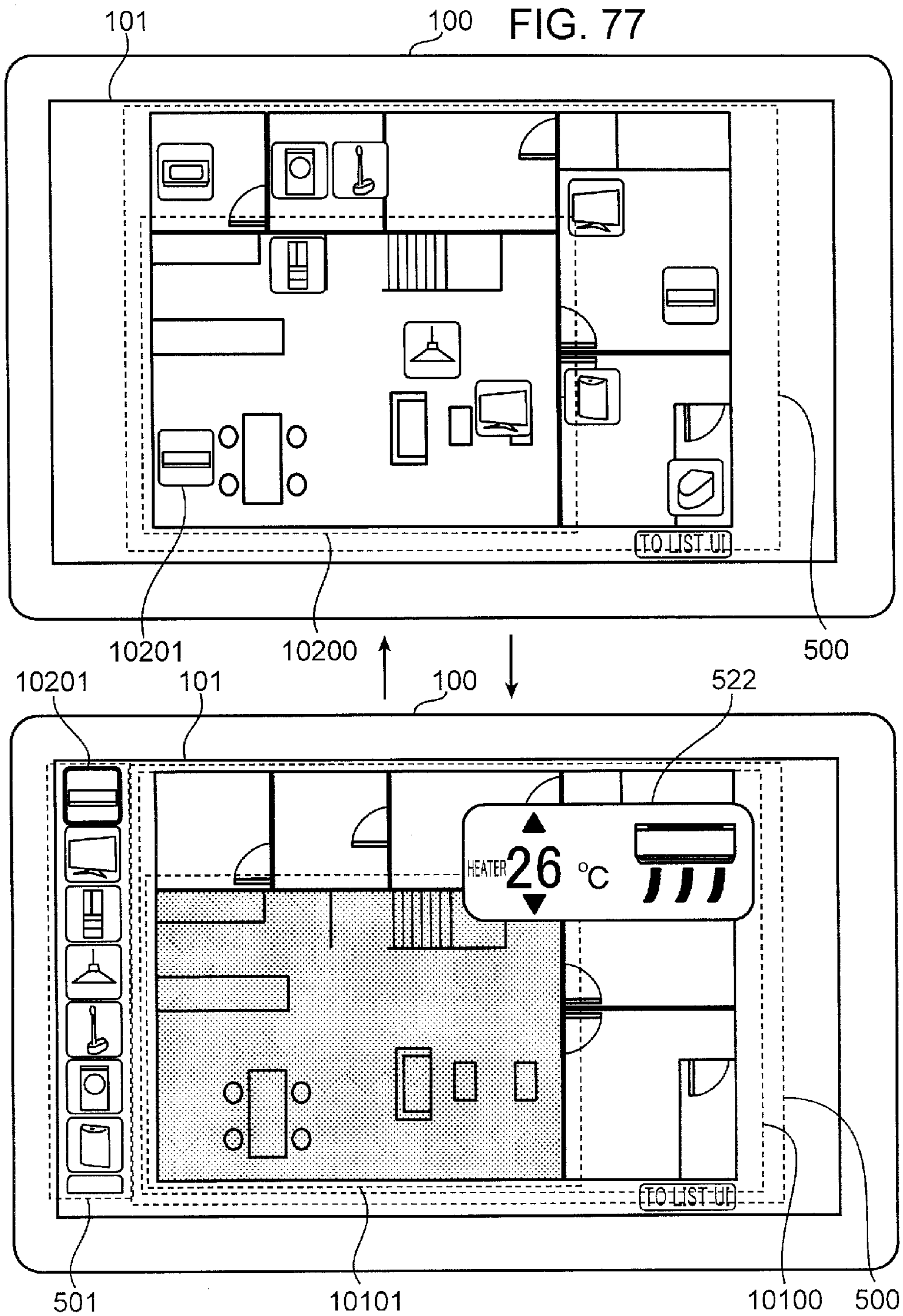
FIG. 77 is a diagram showing an example of transition of a display screen of a display of a home controller according to an embodiment of the present disclosure.
Figure 78:
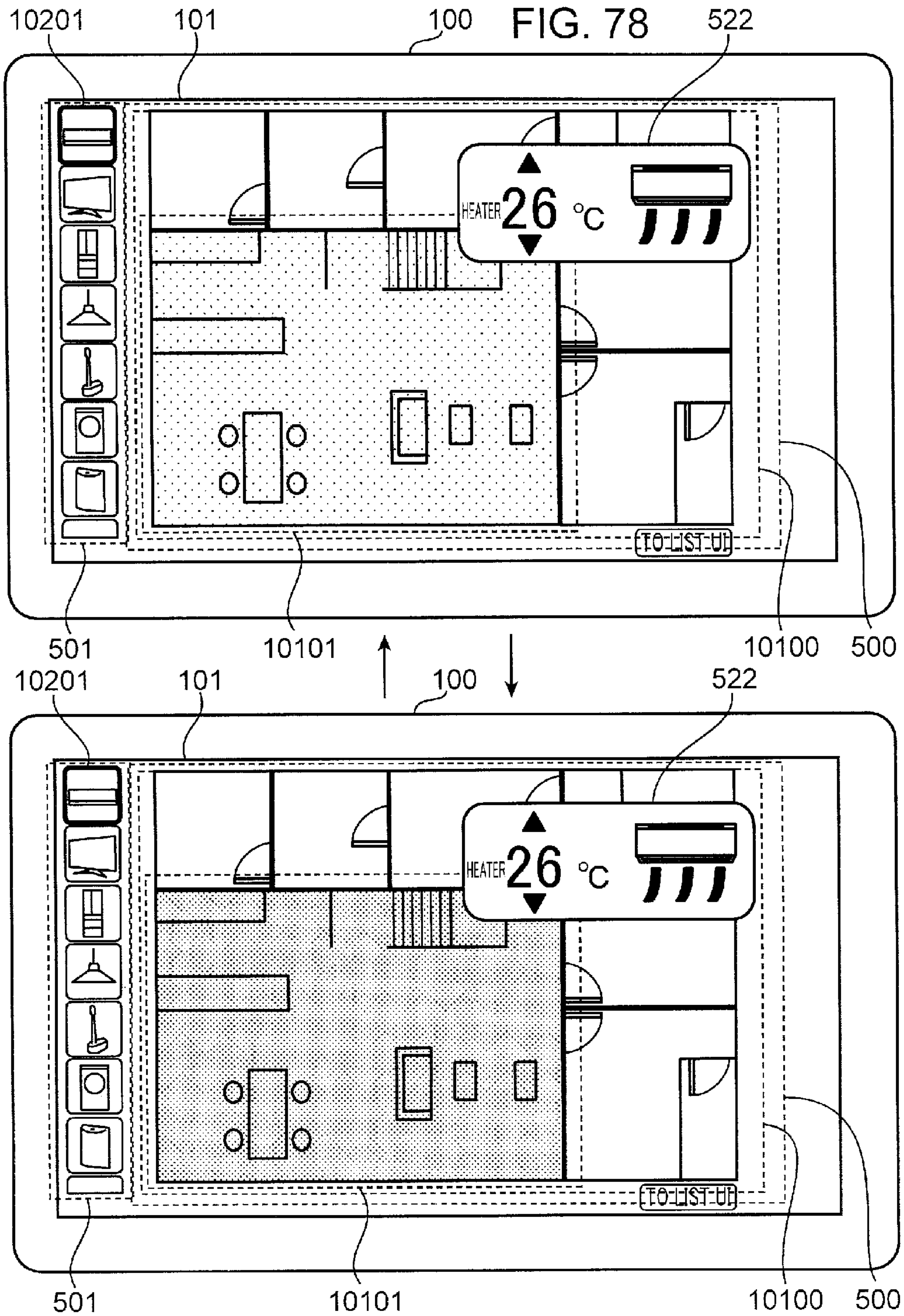
FIG. 78 is a diagram showing an example of transition of a display screen of a display of a home controller according to an embodiment of the present disclosure.
Figure 79:
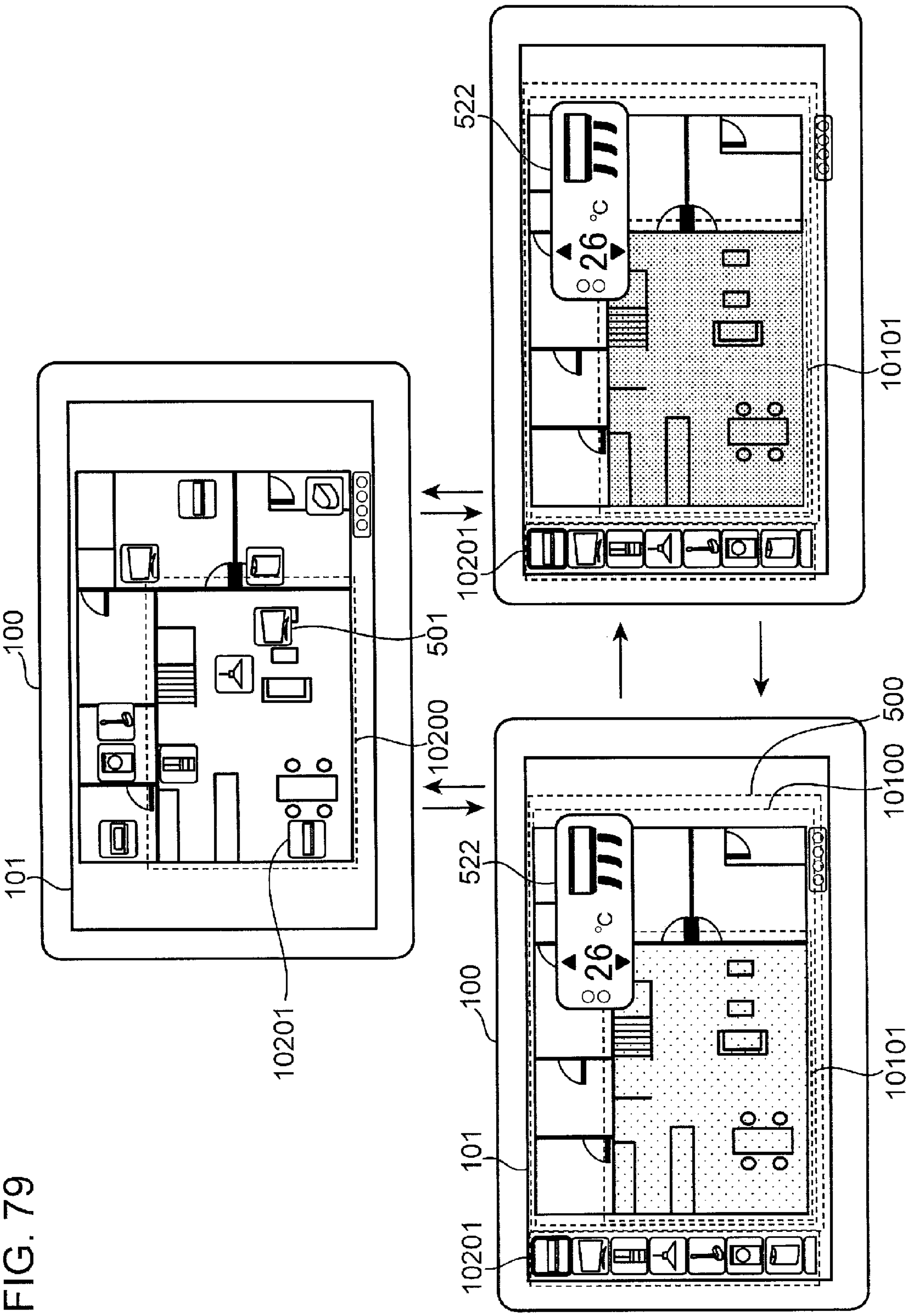
FIG. 79 is a diagram showing an example of transition of a display screen of a display of a home controller according to an embodiment of the present disclosure.

FIGS. 77 to 79 are diagrams showing an example of transition of a display screen of the display 101 of the home controller 100. An upper diagram in FIG. 77 represents the basic screen shown in FIG. 5 and a lower diagram in FIG. 77 represents an example of a control screen of an air conditioner when the air conditioner is not operating. An upper diagram in FIG. 78 represents the display screen shown in FIG. 72 and a lower diagram in FIG. 78 represents the display screen represented by the lower diagram in FIG. 77. An upper diagram in FIG. 79 represents the basic screen shown in FIG. 5, a lower left diagram in FIG. 79 represents the display screen shown in FIG. 72, and a lower right diagram in FIG. 79 represents the display screen represented by the lower diagram in FIG. 77.

When the user selects a device icon of an air conditioner in the room 10200 in which the air conditioner is installed in a state where the basic screen represented by the upper diagram in FIG. 79 (the upper diagram in FIG. 76, the upper diagram in FIG. 77) is being displayed on the display 101, the selection is sensed by the touch panel control section 102. Subsequently, the display control section 103 acquires status 1709 of the air conditioner installed in the room 10200 from a device list 1700 to be described later with reference to FIG. 144B. Based on state information of the air conditioner that is included in the acquired status 1709, the display control section 103 controls display of the control target region 10101 of the air conditioner that is included in the control screen 10100 of the air conditioner.

When the air conditioner in the room 10200 has been turned on in, for example, the heater mode, as shown in the lower left diagram in FIG. 79 (the lower diagram in FIG. 76), the display control section 103 displays the control target region 10101 of the air conditioner in a warm color. In addition, the display control section 103 displays the detail control screen 522 on the display 101.

On the other hand, when the air conditioner in the room 10200 has been turned off, as shown in the lower right diagram in FIG. 79 (the lower diagram in FIG. 77), the display control section 103 displays the control target region 10101 of the air conditioner darkly with brightness lower than the specified brightness. Furthermore, the display control section 103 displays the detail control screen 522 on the display 101.

When the user selects the control target region 10101 of the air conditioner in a display state shown in the lower left diagram in FIG. 79 (the upper diagram in FIG. 78), the selection is sensed by the touch panel control section 102. Subsequently, as shown in the lower right diagram in FIG. 79 (the lower diagram in FIG. 78), the display control section 103 displays the control target region 10101 of the air conditioner darkly with brightness lower than the specified brightness.

The device control section 106 generates a control command (an example of the on-off control command) for turning off the power of the air conditioner of the room 10200 (for example, the living room) corresponding to the control target region 10101 of the air conditioner. The device control section 106 transmits the generated control command to the air conditioner in the room 10200 (for example, the living room) via the communication control section 107 and the network.

On the other hand, when the user selects the control target region 10101 of the air conditioner in a display state shown in the lower right diagram in FIG. 79 (the lower diagram in FIG. 78), the selection is sensed by the touch panel control section 102. Subsequently, as shown in the lower left diagram in FIG. 79 (the upper diagram in FIG. 78), the display control section 103 displays the control target region 10101 of the air conditioner in a warm color (for example, red).

The device control section 106 generates a control command (an example of the on-off control command) for turning on the power of the air conditioner of the room 10200 (for example, the living room) corresponding to the control target region 10101 of the air conditioner. The device control section 106 transmits the generated control command to the air conditioner in the room 10200 (for example, the living room) via the communication control section 107 and the network.

When the user selects the device icon 10201 of the air conditioner or the outside of the control target region 10101 of the air conditioner (for example, a display region of the floor plan 500 that is outside the display region of the control target region 10101 of the air conditioner) in the display state represented by the lower left diagram in FIG. 79 (the lower diagram in FIG. 76) or the lower right diagram in FIG. 79 (the lower diagram in FIG. 77), the selection is sensed by the touch panel control section 102. Subsequently, as shown in the upper diagram in FIG. 79 (the upper diagram in FIG. 76, the upper diagram in FIG. 77), the display control section 103 restores the display screen of the display 101 to a basic screen display state.

As described above with reference to FIGS. 72 to 79, when the device icon 10201 of the air conditioner is selected by the user, the floor plan 500 functions as the control screen 10100 of the air conditioner. Therefore, control of an on-off state of the air conditioner can be performed without having to display an operation screen for operating the air conditioner on the display 101. As a result, a step where the display control section 103 displays an operation screen on the display 101 separately from the floor plan 500 is no longer necessary and an increase in the number of process steps performed by the display control section 103 (the home controller 100) can be prevented.

(Device Icon Used in Common of Air Conditioner)

Figure 80:
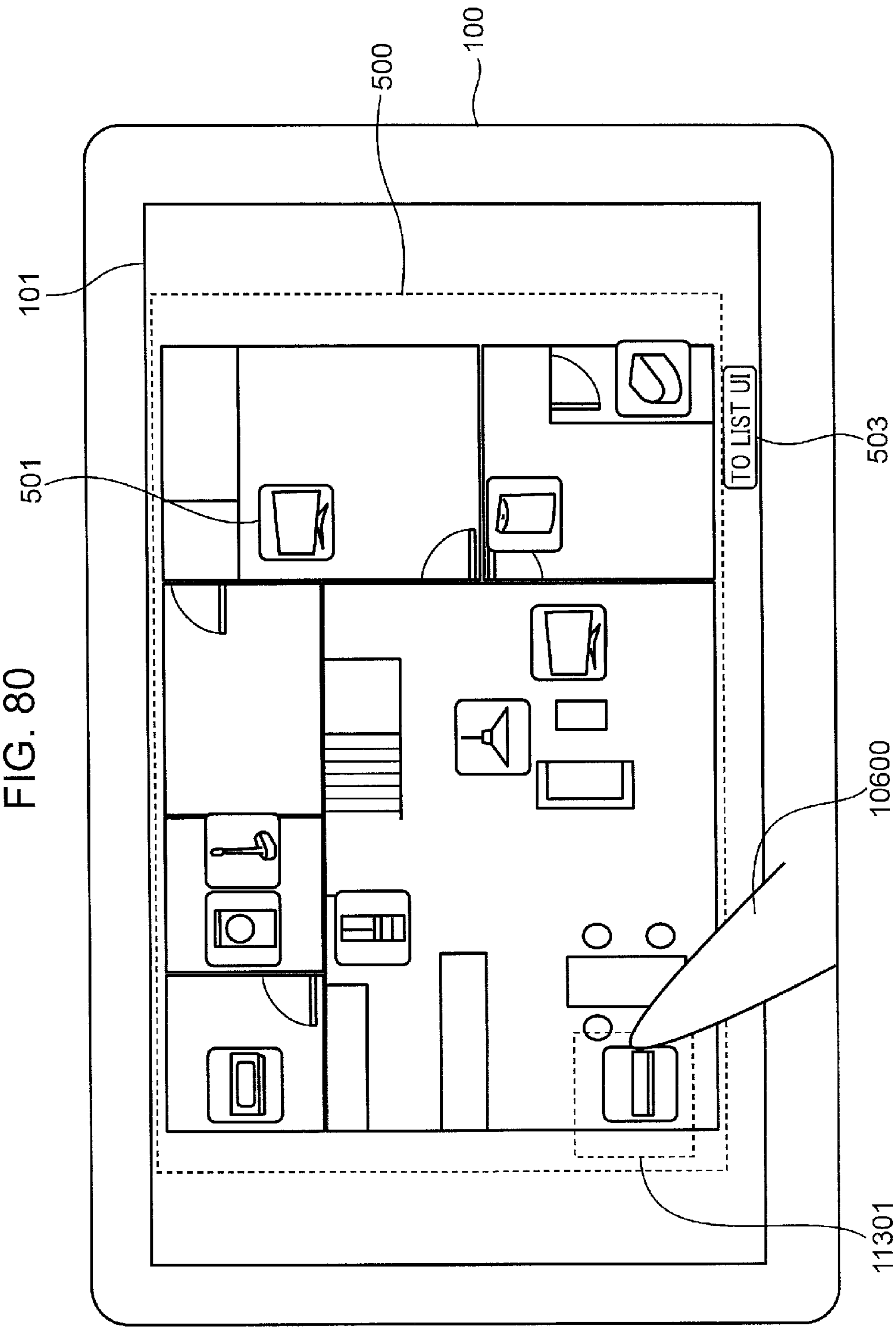
FIG. 80 is a diagram showing a basic screen that is displayed on a display of a home controller when one device icon of the air conditioner is used in common to control air conditioners in a plurality of rooms according to an embodiment of the present disclosure.
Figure 81:
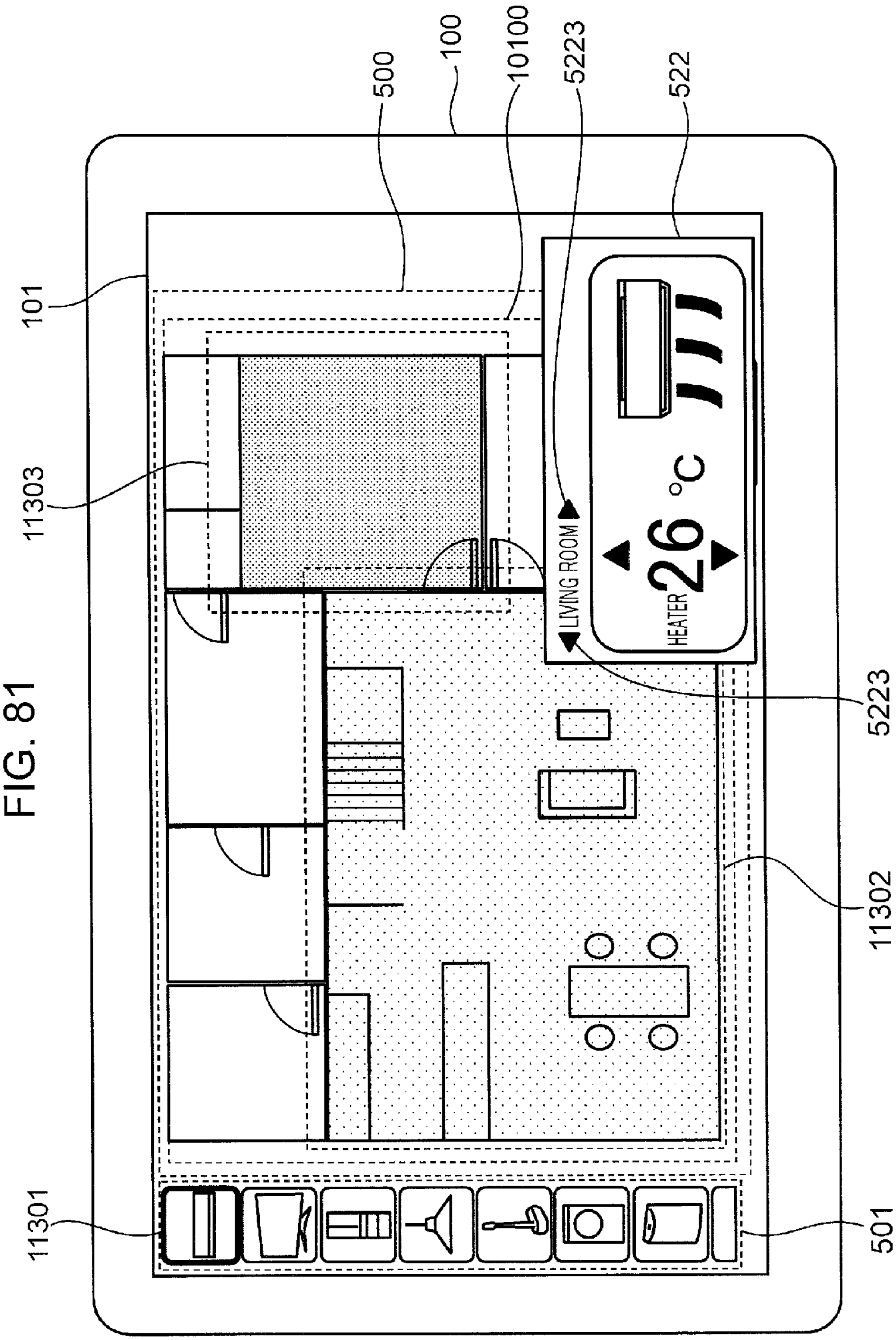
FIG. 81 is a diagram showing a control screen of an air conditioner that is displayed on a display of a home controller when a device icon of an air conditioner is used in common according to an embodiment of the present disclosure.
Figure 82:
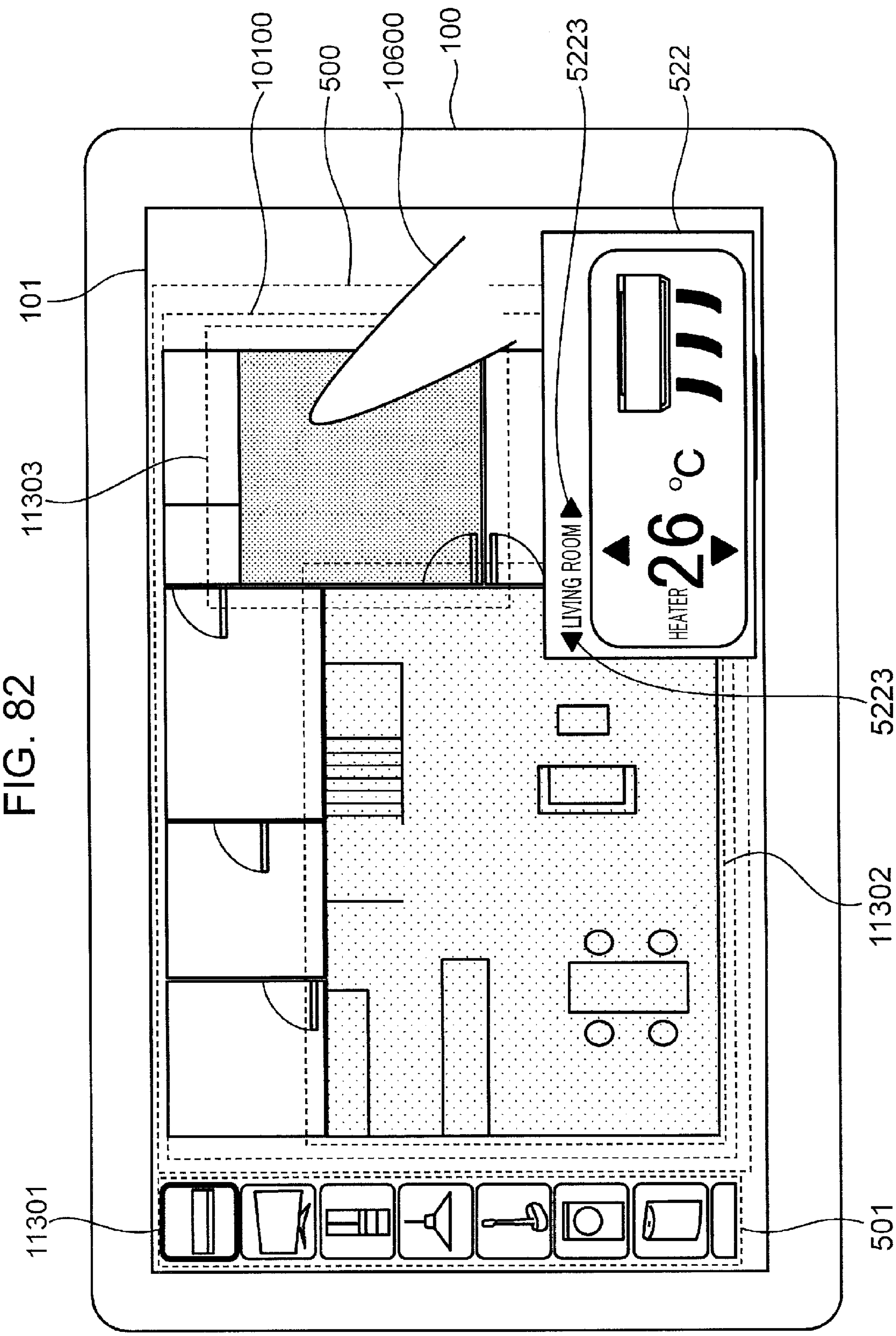
FIG. 82 is a diagram showing a control screen of an air conditioner that is displayed on a display of a home controller when a device icon of an air conditioner is used in common according to an embodiment of the present disclosure.
Figure 83:
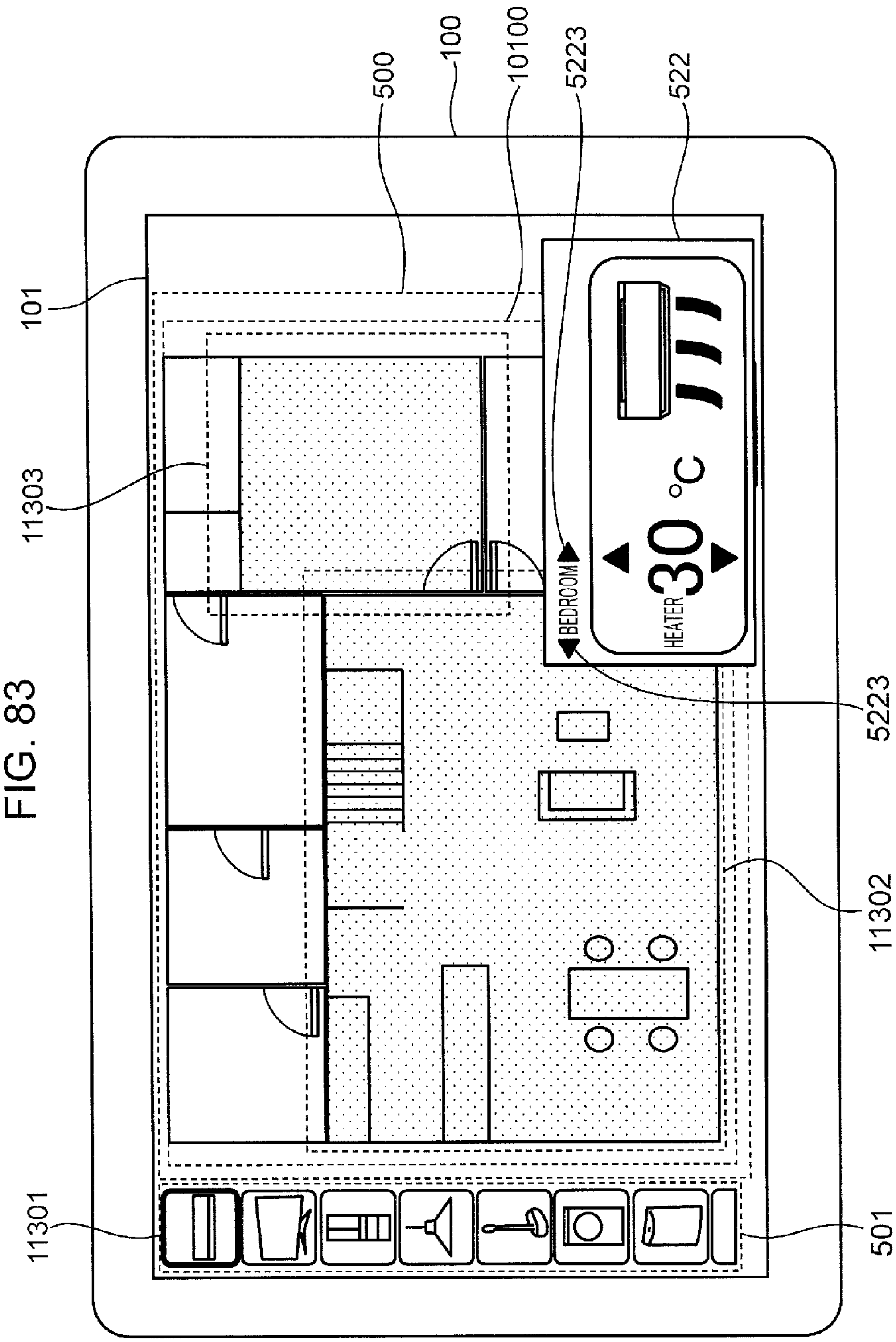
FIG. 83 is a diagram showing a control screen of an air conditioner that is displayed on a display of a home controller when a device icon of an air conditioner is used in common according to an embodiment of the present disclosure.
Figure 84:
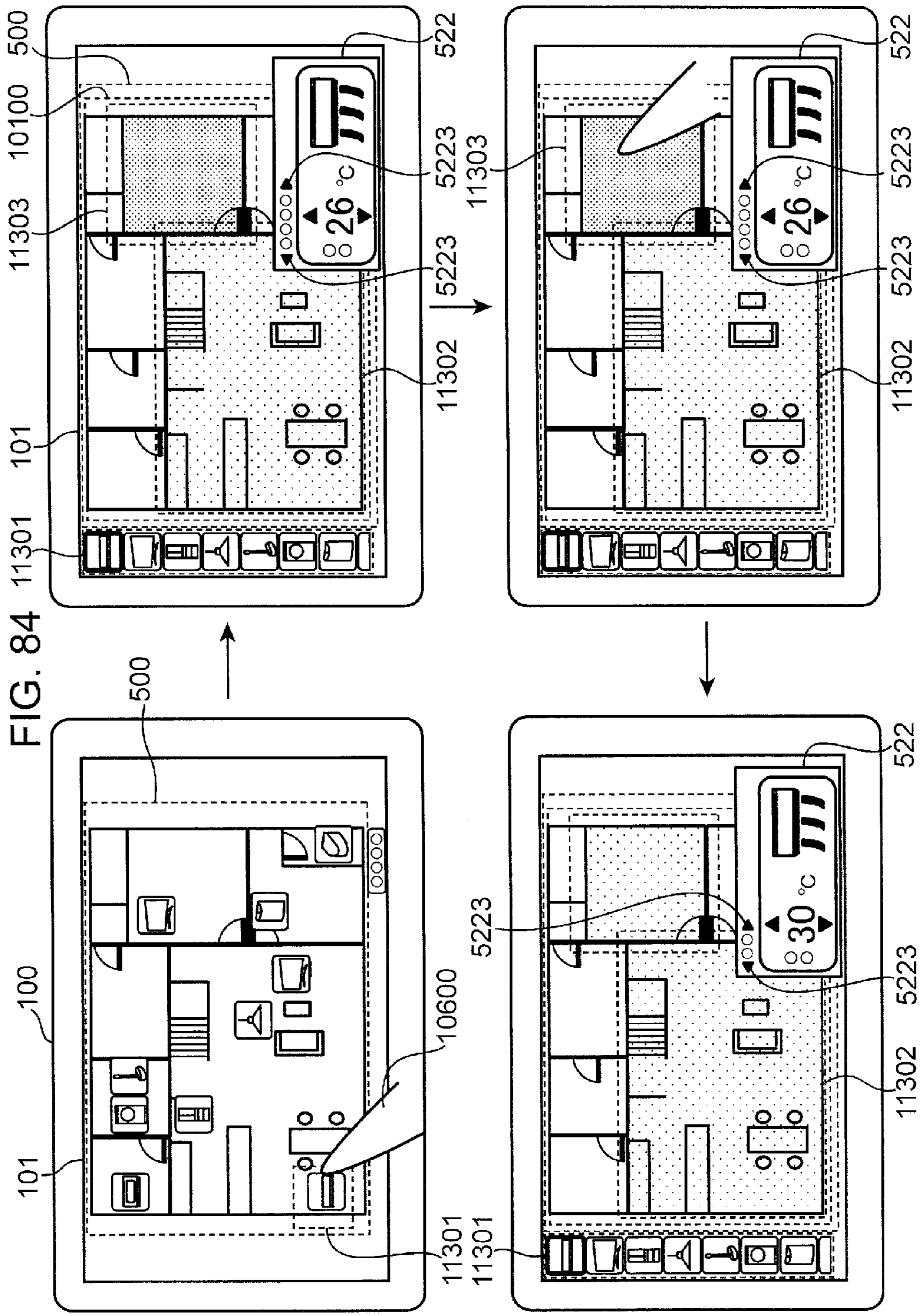
FIG. 84 is a diagram showing an example of transition of a display screen of a display of a home controller when one device icon of the air conditioner is used in common to control air conditioners in a plurality of rooms according to an embodiment of the present disclosure.

FIG. 80 is a diagram showing a basic screen that is displayed on the display 101 of the home controller 100 when one device icon of the air conditioner is used in common to control air conditioners in a plurality of rooms. FIGS. 81 to 83 are diagrams showing the control screen 10100 of the air conditioner that is displayed on the display 101 of the home controller 100 when a device icon of an air conditioner is used in common. FIG. 84 is a diagram showing an example of a transition of a display screen of the display 101 of the home controller 100 when one device icon of the air conditioner is used in common to control air conditioners in a plurality of rooms. An upper left diagram in FIG. 84 represents the basic screen shown in FIG. 80, an upper right diagram in FIG. 84 represents the display screen shown in FIG. 81, a lower right diagram in FIG. 84 represents the display screen shown in FIG. 82, and a lower left diagram in FIG. 84 represents the display screen shown in FIG. 83.

On the basic screen shown in FIG. 80 (the upper left diagram in FIG. 84), a used-in-common device icon 11301 of an air conditioner is displayed in the living room. In the present embodiment, the used-in-common device icon 11301 of the air conditioner is also used by an air conditioner in the bedroom. Therefore, a device icon of an air conditioner is not displayed in the bedroom (an upper left room in the floor plan 500 shown in FIG. 80) on the basic screen shown in FIG. 80 (the upper left diagram in FIG. 84).

As shown in FIG. 80 (the upper left diagram in FIG. 84), the display control section 103 displays a basic screen on the display 101 of the home controller 100. When the user selects the used-in-common device icon 11301 of the air conditioner using a contacting object (for example, a finger of the user) 10600 in this display state, the selection is sensed by the touch panel control section 102. Subsequently, the display control section 103 acquires status 1709 of each of the air conditioners of rooms (for example, the living room and the bedroom) which uses in common the used-in-common device icon 11301 of the air conditioner from the device list 1700 to be described later with reference to FIG. 144B. In this case, it is assumed that the air conditioner in the living room is operating in the heater mode and the air conditioner in the bedroom has been turned off. The display control section 103 moves the respective device icons as shown in FIG. 81 (the upper right diagram in FIG. 84) and displays the control screen 10100 of the air conditioner on the display 101.

The control screen 10100 of the air conditioner shown in FIG. 81 (the upper right diagram in FIG. 84) includes a first control target region 11302 of an air conditioner and a second control target region 11303 of an air conditioner. In addition, as described with reference to FIG. 72, the control screen 10100 of the air conditioner includes the same display contents as the floor plan 500 (FIG. 72). As shown in FIG. 81 (the upper right diagram in FIG. 84), the display control section 103 displays the first control target region 11302 of the air conditioner in a warm color (for example, red). Accordingly, it is shown that the air conditioner of the room (for example, the living room) corresponding to the first control target region 11302 has been turned on in the heater mode. The display control section 103 displays the second control target region 11303 of the air conditioner darkly with brightness lower than the specified brightness. Accordingly, it is shown that the air conditioner of the room (for example, the bedroom) corresponding to the second control target region 11303 has been turned off.

In addition, the display control section 103 displays the detail control screen 522 of the air conditioner of the room corresponding to the first control target region 11302 on the display 101. As shown in FIG. 81, a name of the room ("living room" in FIG. 81) is described on the detail control screen 522. The display control section 103 displays the detail control screen 522 of the air conditioner of whichever room in which the air conditioner has been turned on among the respective rooms corresponding to the first control target region 11302 and the second control target region 11303 on the display 101. When both air conditioners of the respective rooms corresponding to the first control target region 11302 and the second control target region 11303 have been turned on, the display control section 103 displays the detail control screen 522 of the air conditioner of a room with the largest size (for example, the living room) on the display 101.

When the user selects the second control target region 11303 of the air conditioner using the contacting object 10600 as shown in FIG. 82 (lower right diagram in FIG. 84) in a state where the control screen 10100 of the air conditioner is being displayed on the display 101 by the display control section 103 as shown in FIG. 81 (upper right diagram in FIG. 84), the selection is sensed by the touch panel control section 102. Consequently, as shown in FIG. 83 (the lower left diagram in FIG. 84), the display control section 103 displays the second control target region 11303 of the air conditioner in a warm color. The display control section 103 switches the detail control screen 522 to be displayed on the display 101 from the detail control screen 522 of the room (for example, the living room) corresponding to the first control target region 11302 of the air conditioner to the detail control screen 522 of the room (for example, the bedroom) corresponding to the second control target region 11303 of the air conditioner.

The device control section 106 generates a control command (an example of the first on-off control command) for turning on the power of the air conditioner of the room (for example, the bedroom) corresponding to the second control target region 11303 of the air conditioner. The device control section 106 transmits the generated control command to the air conditioner in the room (for example, the bedroom) corresponding to the second control target region 11303 of the air conditioner via the communication control section 107 and the network.

As described above with reference to FIGS. 80 to 84, by using the used-in-common device icon 11301 of the air conditioner, the air conditioners in two control target regions including the first control target region 11302 of the air conditioner and the second control target region 11303 of the air conditioner can be controlled. Therefore, the number of device icons of air conditioners on the basic screen that are displayed on the display 101 can be reduced. As a result, the basic screen displayed on the display 101 can be prevented from becoming cluttered by a large number of device icons.

Moreover, while the used-in-common device icon 11301 of the air conditioner is used in common in order to control air conditioners in two rooms in FIGS. 80 to 84, the home controller 100 according to the present embodiment is not limited thereto. For example, the used-in-common device icon 11301 of the air conditioner may be used in order to control air conditioners in three or more rooms. In addition, generally, air conditioners are installed in all of the rooms. Therefore, the used-in-common device icon 11301 of the air conditioner may be used in order to control the air conditioners in all of the rooms. This also applies to other display examples using the used-in-common device icon 11301 of the air conditioner to be described later.

(Another Example of Control Screen of Air Conditioner)

Figure 85:
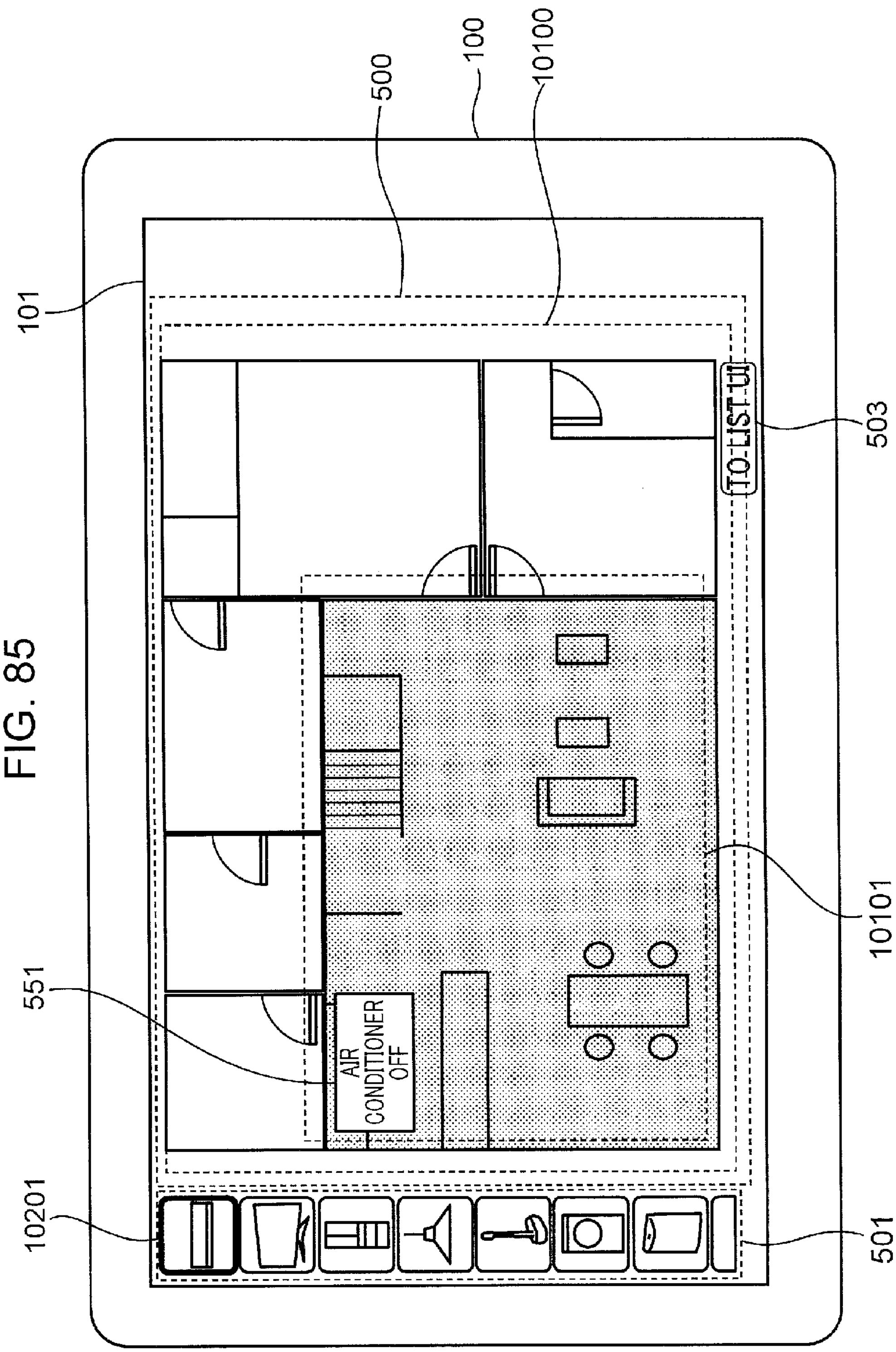
FIG. 85 is a diagram showing another example of a control screen of an air conditioner that is displayed on a display of a home controller according to an embodiment of the present disclosure.

FIG. 85 is a diagram showing another example of a control screen of an air conditioner that is displayed on the display 101 of the home controller 100. In FIG. 85, the display control section 103 displays the control target region 10101 of the air conditioner darkly with brightness lower than the specified brightness. In addition, the display control section 103 displays the operation state display section 551 including a description reading "air conditioner off" in the control target region 10101 of the air conditioner. Accordingly, it is shown that power of the air conditioner in the room (for example, the living room in FIG. 85) corresponding to the control target region 10101 of the air conditioner has been turned off. In FIG. 85, unlike the example shown in FIG. 75, the display control section 103 does not display a detail control screen on the display 101.

Figure 86:
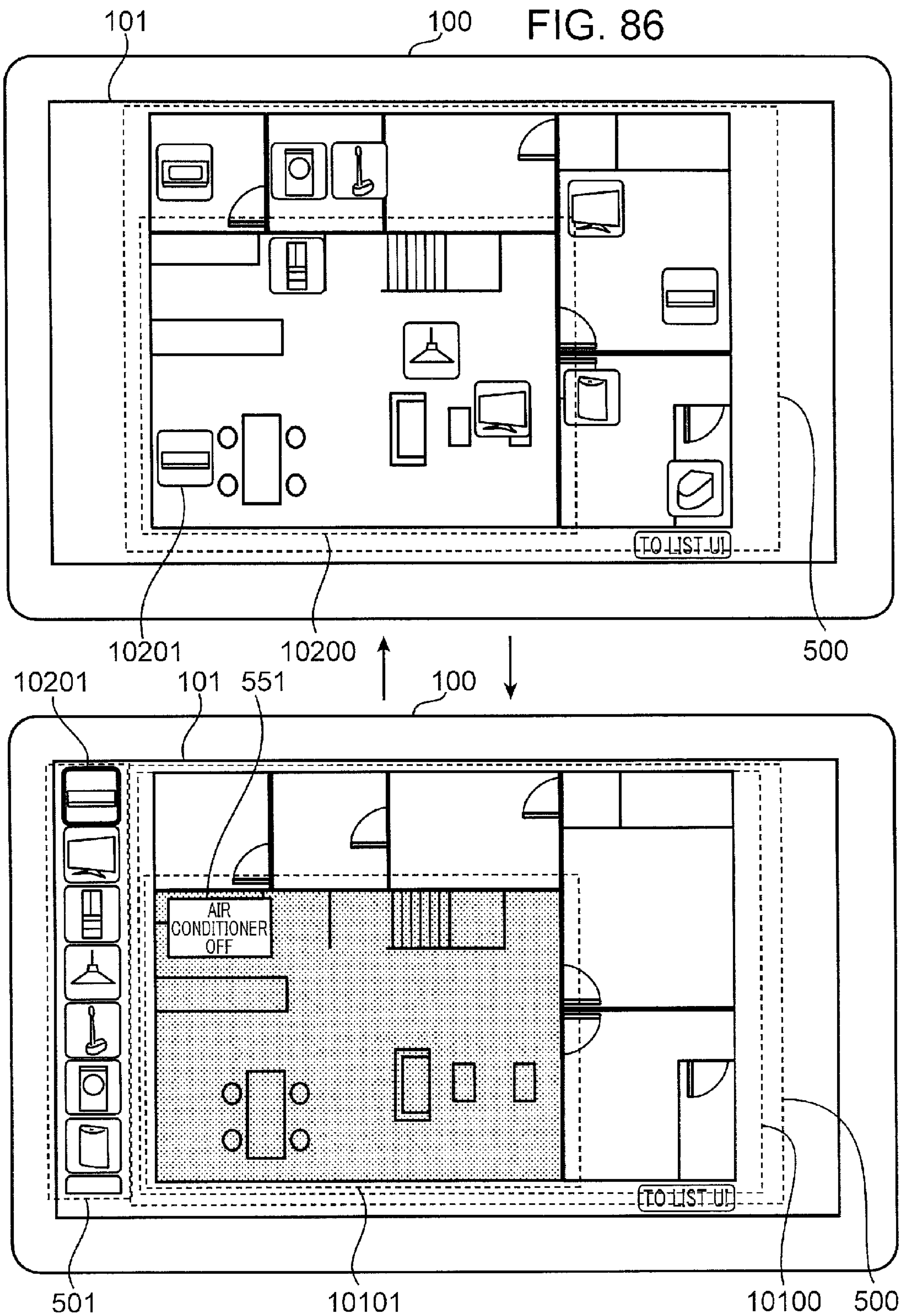
FIG. 86 is a diagram showing an example of transition of a display screen of a display including the control screen of an air conditioner shown in FIG. 85 according to an embodiment of the present disclosure.
Figure 87:
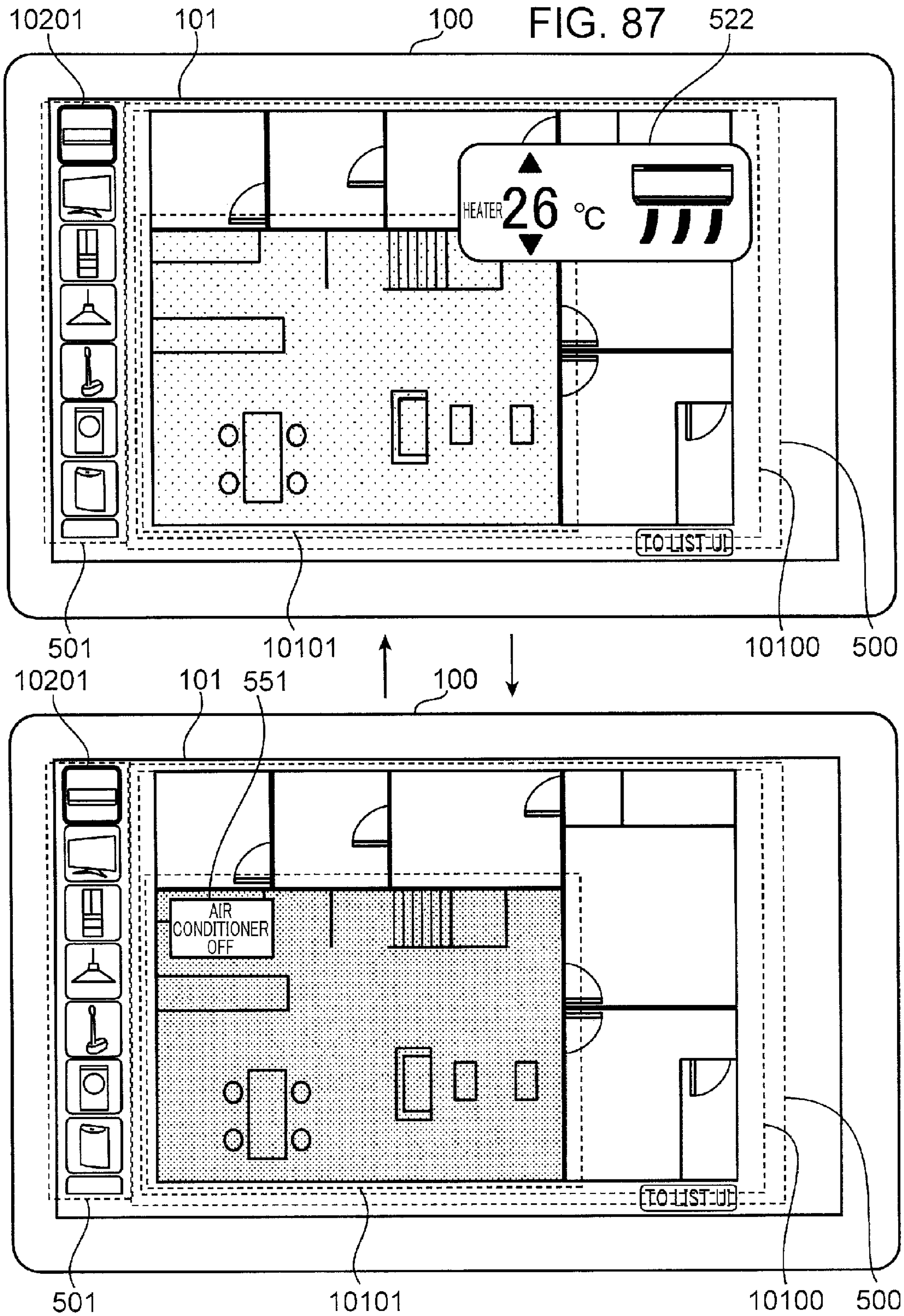
FIG. 87 is a diagram showing an example of transition of a display screen of a display including the control screen of an air conditioner shown in FIG. 85 according to an embodiment of the present disclosure.
Figure 88:
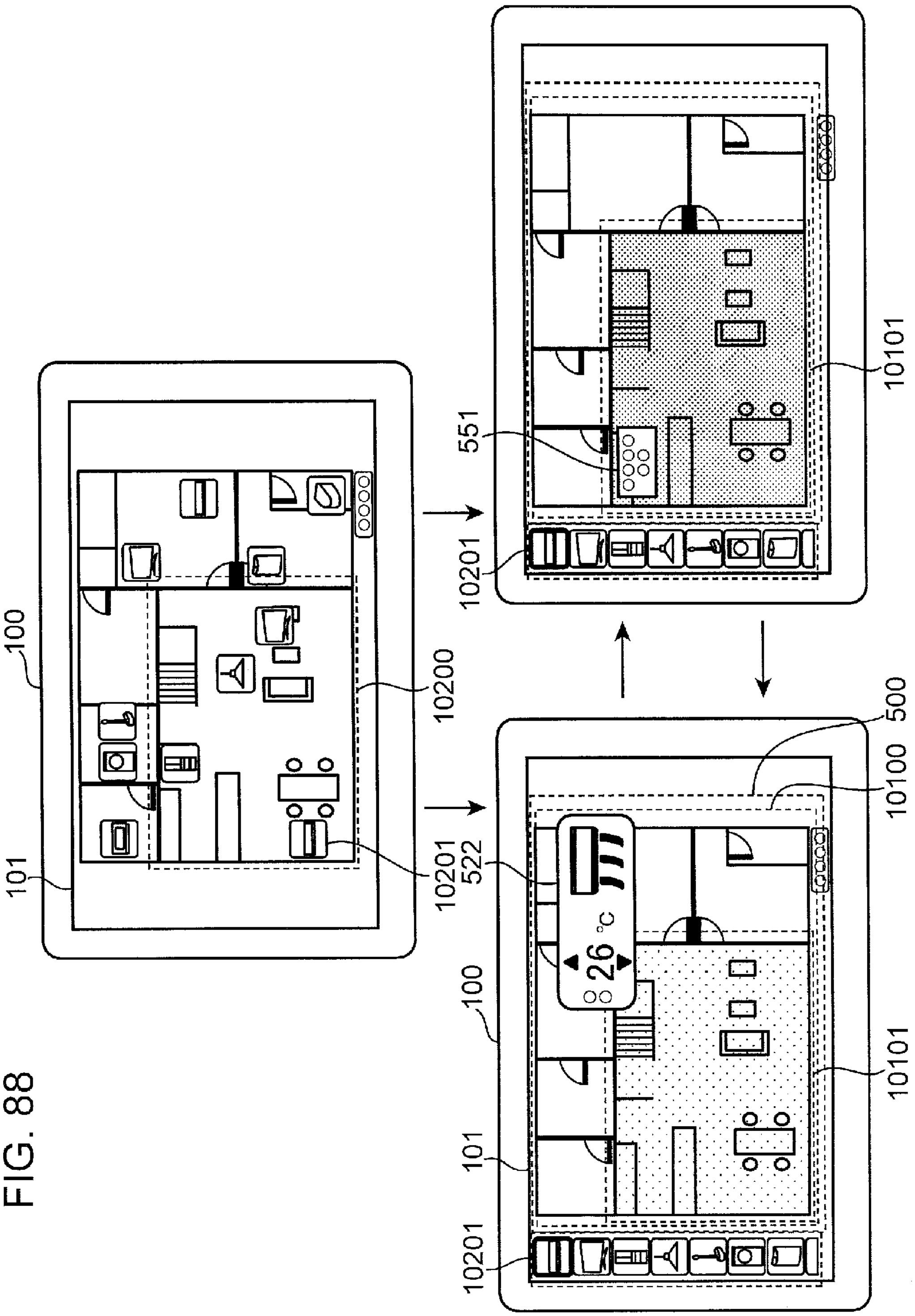
FIG. 88 is a diagram showing an example of transition of a display screen of a display including the control screen of an air conditioner shown in FIG. 85 according to an embodiment of the present disclosure.

FIGS. 86 to 88 are diagrams showing an example of transition of a display screen of the display 101 including the control screen of the air conditioner shown in FIG. 85. An upper diagram in FIG. 86 represents the basic screen shown in FIG. 5 and a lower diagram in FIG. 86 represents the control screen of the air conditioner shown in FIG. 85. An upper diagram in FIG. 87 represents the display screen shown in FIG. 72 and a lower diagram in FIG. 87 represents the display screen shown in FIG. 85. An upper diagram in FIG. 88 represents the basic screen shown in FIG. 5, a lower left diagram in FIG. 88 represents the display screen shown in FIG. 72, and a lower right diagram in FIG. 88 represents the display screen shown in FIG. 85. The upper diagram and the lower left diagram in FIG. 88 are respectively the same as the upper diagram and the lower left diagram in FIG. 79. A transition of the display screen between the upper diagram and the lower left diagram in FIG. 88 is performed in exactly the same manner as the transition of the display screen between the upper diagram and the lower left diagram in FIG. 79.

When the user selects the device icon 10201 of the air conditioner that is displayed in a region of the room 10200 in which the air conditioner is installed in a display state of the basic screen represented by the upper diagram in FIG. 86 (the upper diagram in FIG. 88), the selection is sensed by the touch panel control section 102. Subsequently, the display control section 103 acquires status 1709 of the air conditioner of the room 10200 (for example, the living room) from the device list 1700 to be described later with reference to FIG. 144B.

When the acquired status 1709 represents an off state, the display control section 103 displays the control target region 10101 of the air conditioner darkly with brightness lower than the specified brightness as shown in the lower diagram in FIG. 86 (the lower right diagram in FIG. 88). In addition, the display control section 103 displays the operation state display section 551 including a description reading "air conditioner off" in the control target region 10101 of the air conditioner.

On the other hand, when the acquired status 1709 represents an on state in the heater mode, the display control section 103 displays the control target region 10101 of the air conditioner in a warm color (for example, red) as shown in the lower left diagram in FIG. 88. In addition, the display control section 103 displays the detail control screen 522 of the air conditioner in the living room.

When the user selects the control target region 10101 of the air conditioner in a display state shown in the upper diagram in FIG. 87 (the lower left diagram in FIG. 88), the selection is sensed by the touch panel control section 102. Subsequently, as shown in the lower diagram in FIG. 87 (the lower right diagram in FIG. 88), the display control section 103 displays the control target region 10101 of the air conditioner darkly with brightness lower than the specified brightness. The display control section 103 erases the detail control screen 522 from the display 101. The display control section 103 displays the operation state display section 551 including a description reading "air conditioner off" in the control target region 10101 of the air conditioner.

The device control section 106 generates a control command (an example of the on-off control command) for turning off the power of the air conditioner. The device control section 106 transmits the generated control command to the air conditioner in the room 10200 (for example, the living room) via the communication control section 107 and the network.

On the other hand, when the user selects the control target region 10101 of the air conditioner in a display state shown in the lower diagram in FIG. 87 (the lower right diagram in FIG. 88), the selection is sensed by the touch panel control section 102. Subsequently, as shown in the upper diagram in FIG. 87 (the lower left diagram in FIG. 88), the display control section 103 displays the control target region 10101 of the air conditioner in a warm color. The display control section 103 erases the operation state display section 551 from the display 101. The display control section 103 displays the detail control screen 522 of the air conditioner in the room 10200 on the display 101.

The device control section 106 generates a control command (an example of the on-off control command) for turning on the power of the air conditioner. The device control section 106 transmits the generated control command to the air conditioner in the room 10200 (for example, the living room) via the communication control section 107 and the network.

In the display example shown in FIGS. 85 to 88, the display control section 103 displays the detail control screen 522 on the display 101 only when the power of the air conditioner is turned on. The display control section 103 does not display the detail control screen 522 on the display 101 when the power of the air conditioner is turned off. Since the air conditioner is not operating when the power of the air conditioner is turned off, no problems should occur by not displaying the detail control screen 522 on the display 101.

In the display example shown in FIGS. 85 to 88, when the power of the air conditioner is turned off, the display control section 103 does not display the detail control screen 522 on the display 101 but displays the operation state display section 551 on the display 101. Therefore, according to the display example shown in FIGS. 85 to 88, the user can be clearly notified that power of the air conditioner is turned off.

(Yet Another Example of Control Screen of Air Conditioner)

Figure 89:
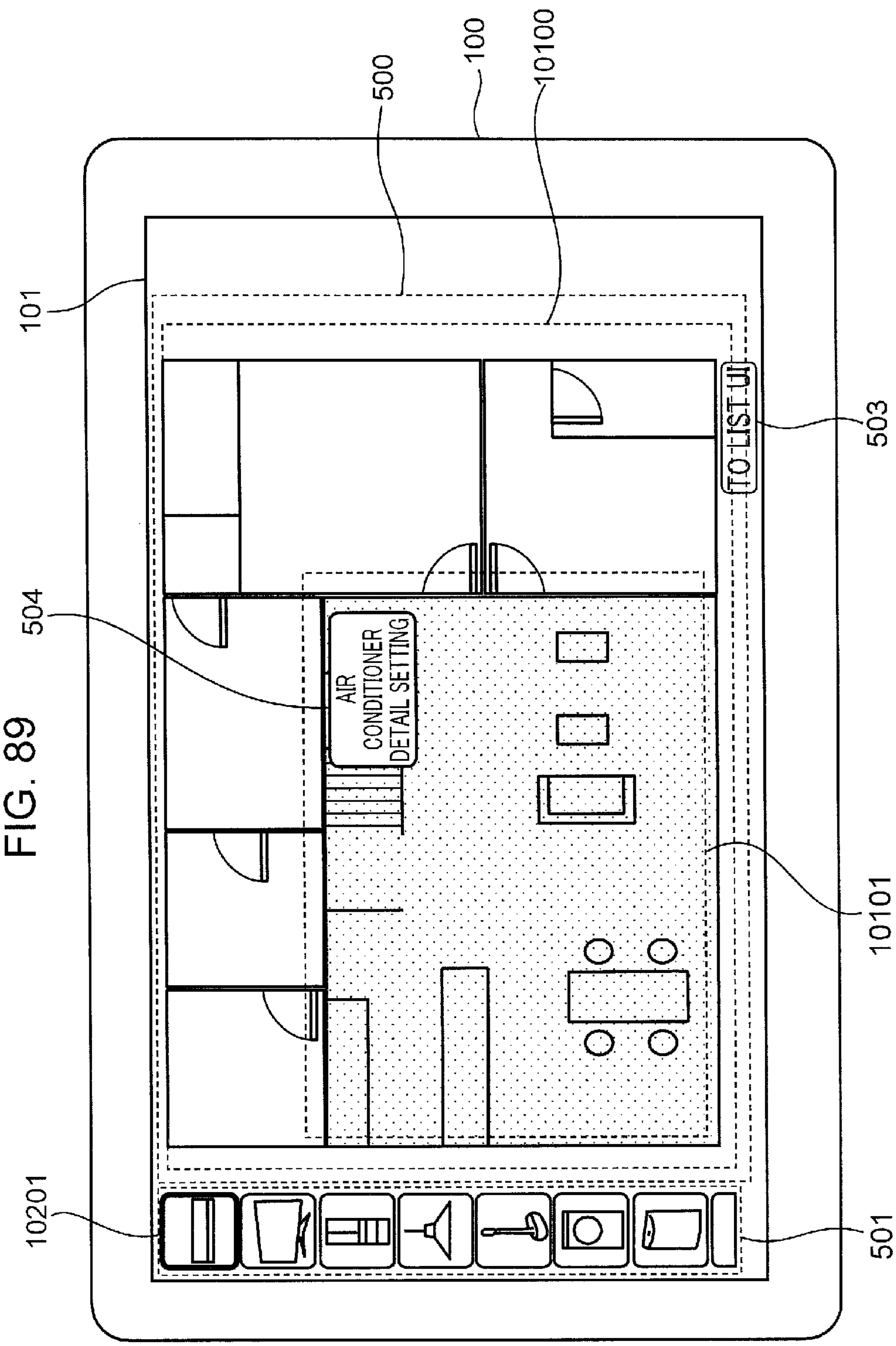
FIG. 89 is a diagram showing yet another example of a control screen of an air conditioner that is displayed on a display of a home controller according to an embodiment of the present disclosure.
Figure 90:
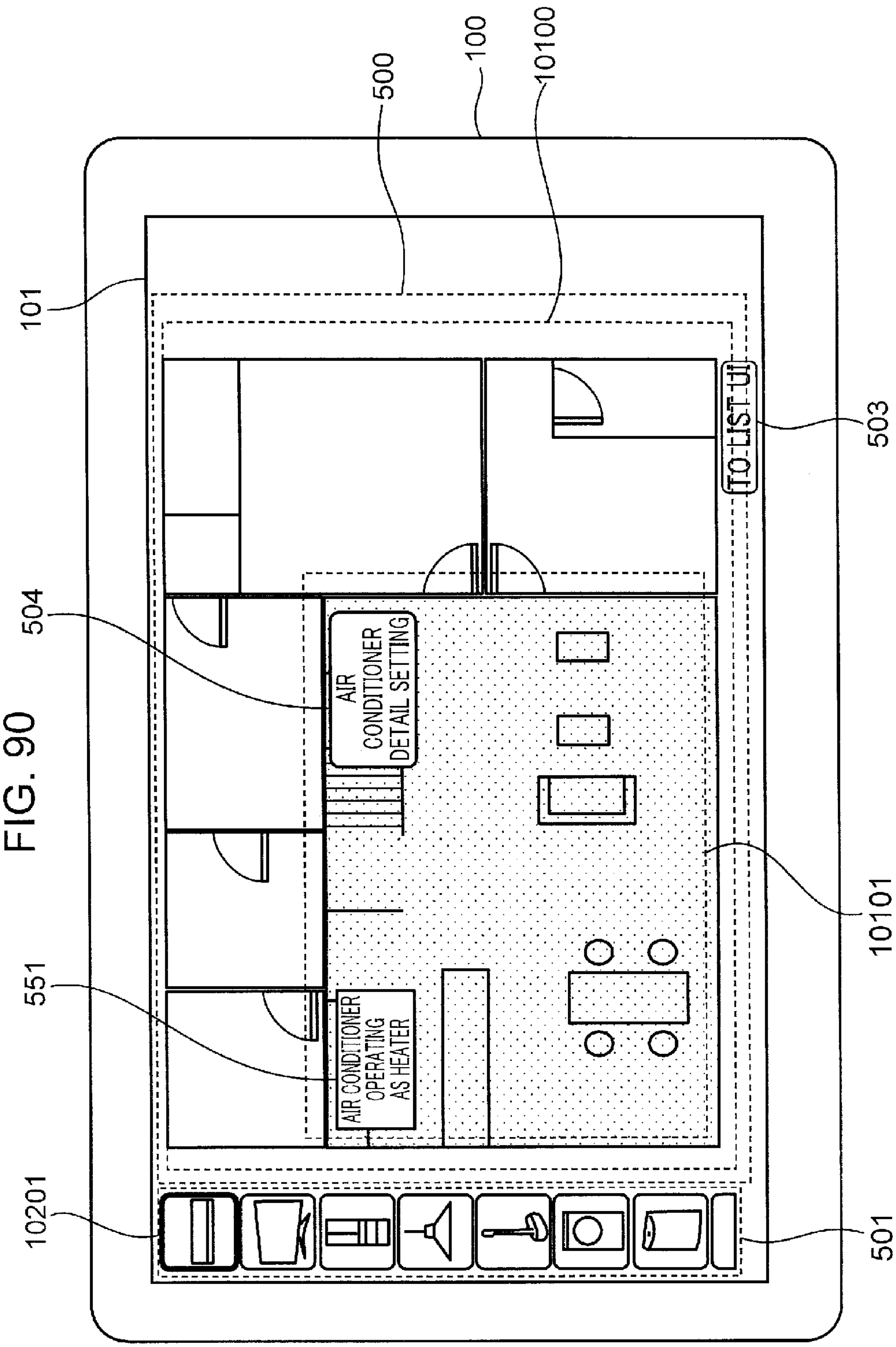
FIG. 90 is a diagram showing yet another example of a control screen of an air conditioner that is displayed on a display of a home controller according to an embodiment of the present disclosure.
Figure 91:
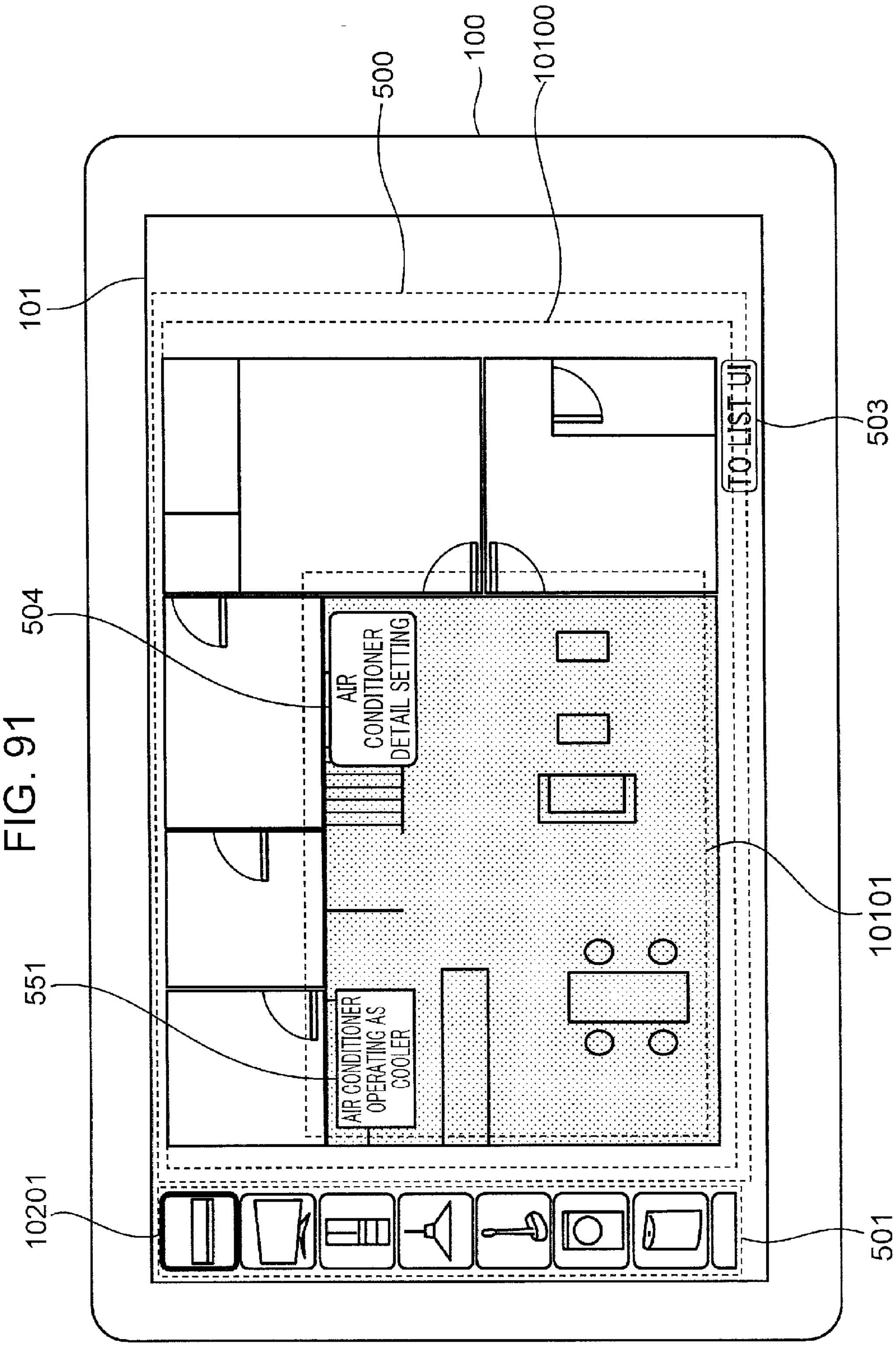
FIG. 91 is a diagram showing yet another example of a control screen of an air conditioner that is displayed on a display of a home controller according to an embodiment of the present disclosure.
Figure 92:
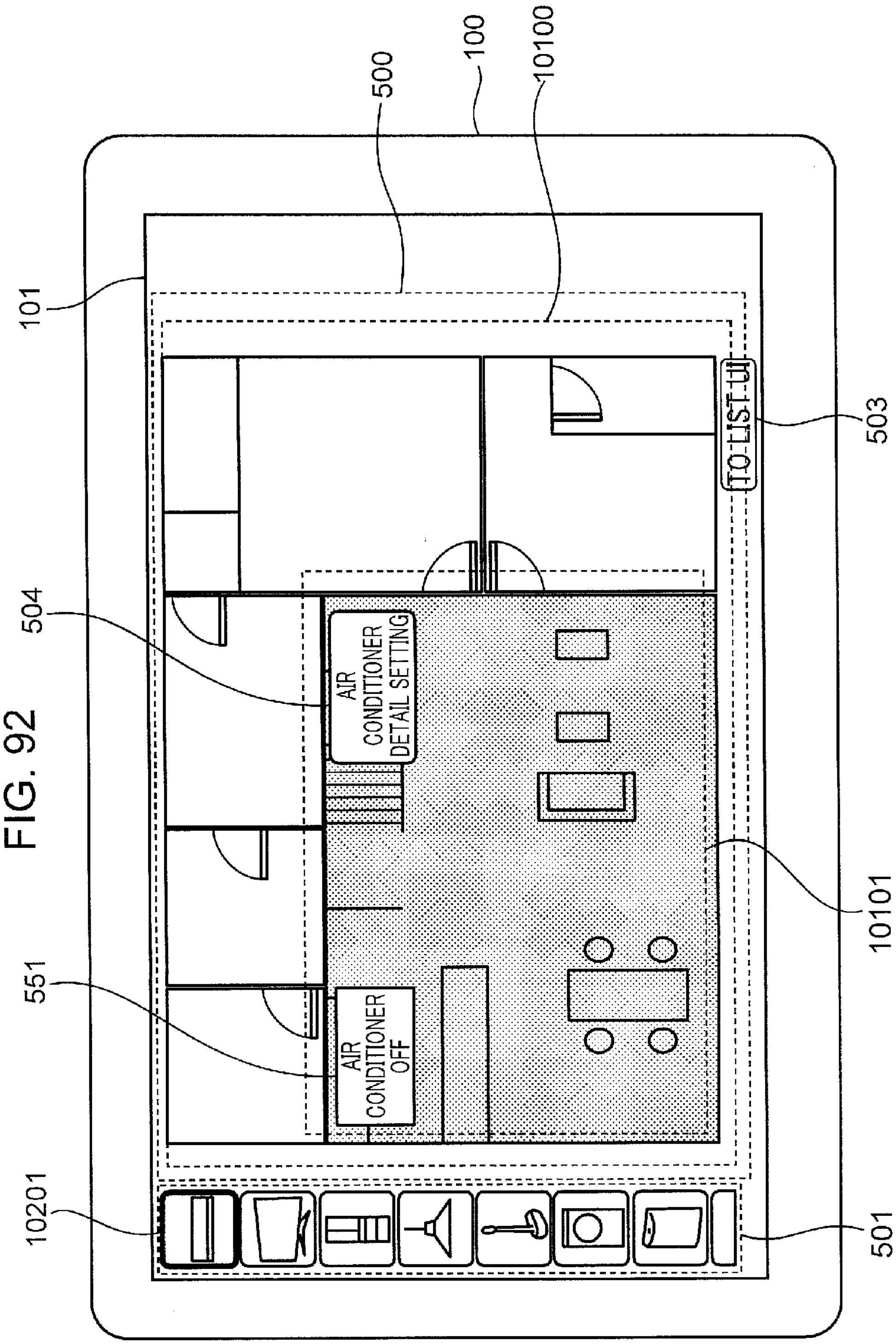
FIG. 92 is a diagram showing yet another example of a control screen of an air conditioner that is displayed on a display of a home controller according to an embodiment of the present disclosure.

FIGS. 89 to 92 are, respectively, diagrams showing yet another example of a control screen of an air conditioner that is displayed on the display 101 of the home controller 100. In FIGS. 89 to 92, the display control section 103 displays a detail setting button 504 in the control target region 10101 of the air conditioner. In FIGS. 90 to 92, the display control section 103 further displays the operation state display section 551 in the control target region 10101 of the air conditioner.

In FIG. 89, the display control section 103 displays the control target region 10101 of the air conditioner in a warm color (for example, red). In FIG. 90, the display control section 103 displays the control target region 10101 of the air conditioner in a warm color (for example, red) and, at the same time, displays the operation state display section 511 including a description reading "air conditioner operating as heater". In FIG. 91, the display control section 103 displays the control target region 10101 of the air conditioner in a cold color (for example, blue) and, at the same time, displays the operation state display section 511 including a description reading "air conditioner operating as cooler". In FIG. 92, the display control section 103 displays the control target region 10101 of the air conditioner darkly with brightness lower than the specified brightness and, at the same time, displays the operation state display section 511 including a description reading "air conditioner off".

As shown in FIGS. 89 to 92, the detail setting button 504 includes a description reading "air conditioner detail setting". The detail setting button 504 is a button for displaying the detail control screen 522 on the display 101. When the user desires to perform detailed setting of the air conditioner, by selecting the detail setting button 504, the detail control screen 522 is displayed on the display 101.

Figure 93:
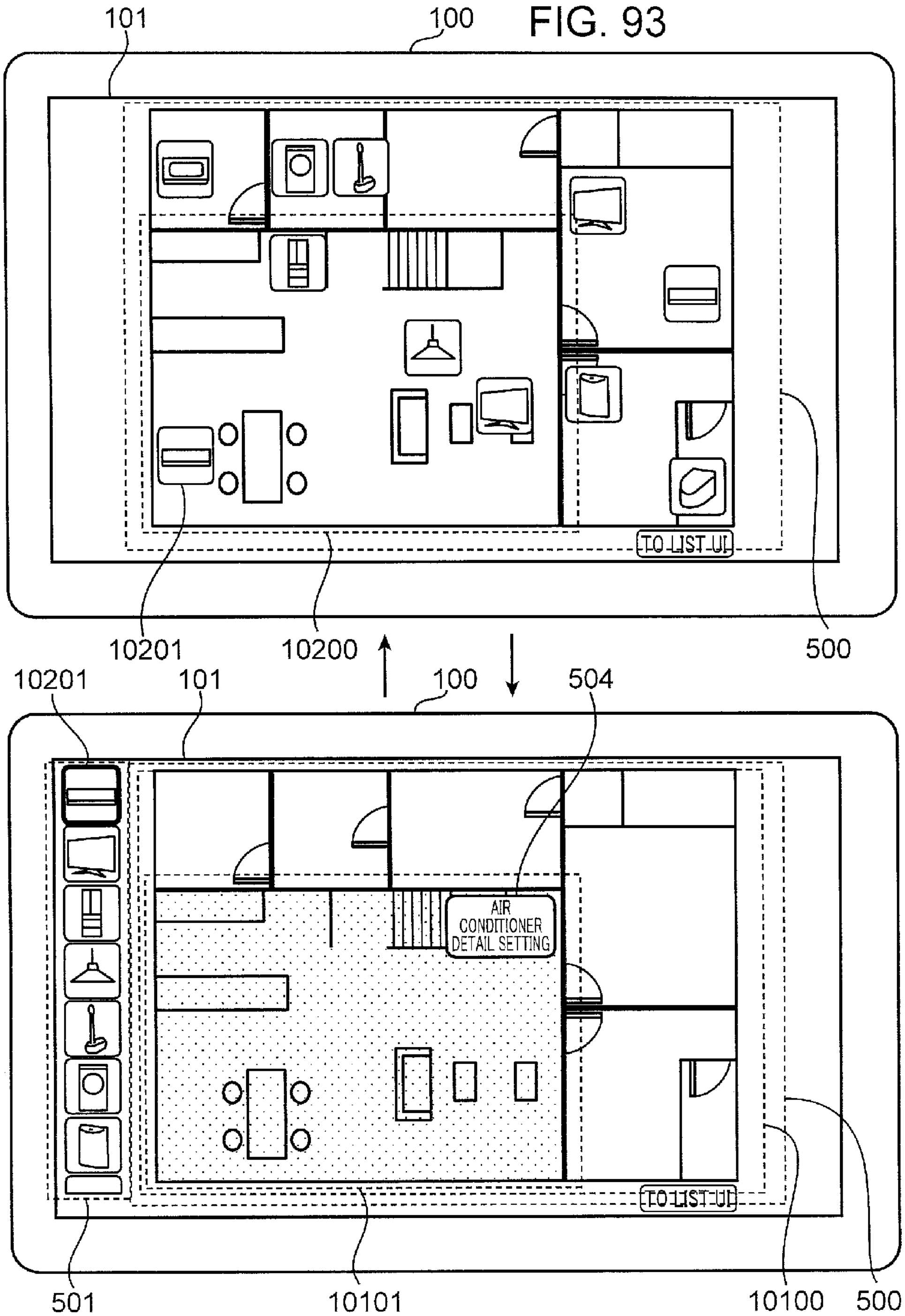
FIG. 93 is a diagram showing an example of transition of a display screen of a display including the display screen shown in FIG. 89 according to an embodiment of the present disclosure.
Figure 94:
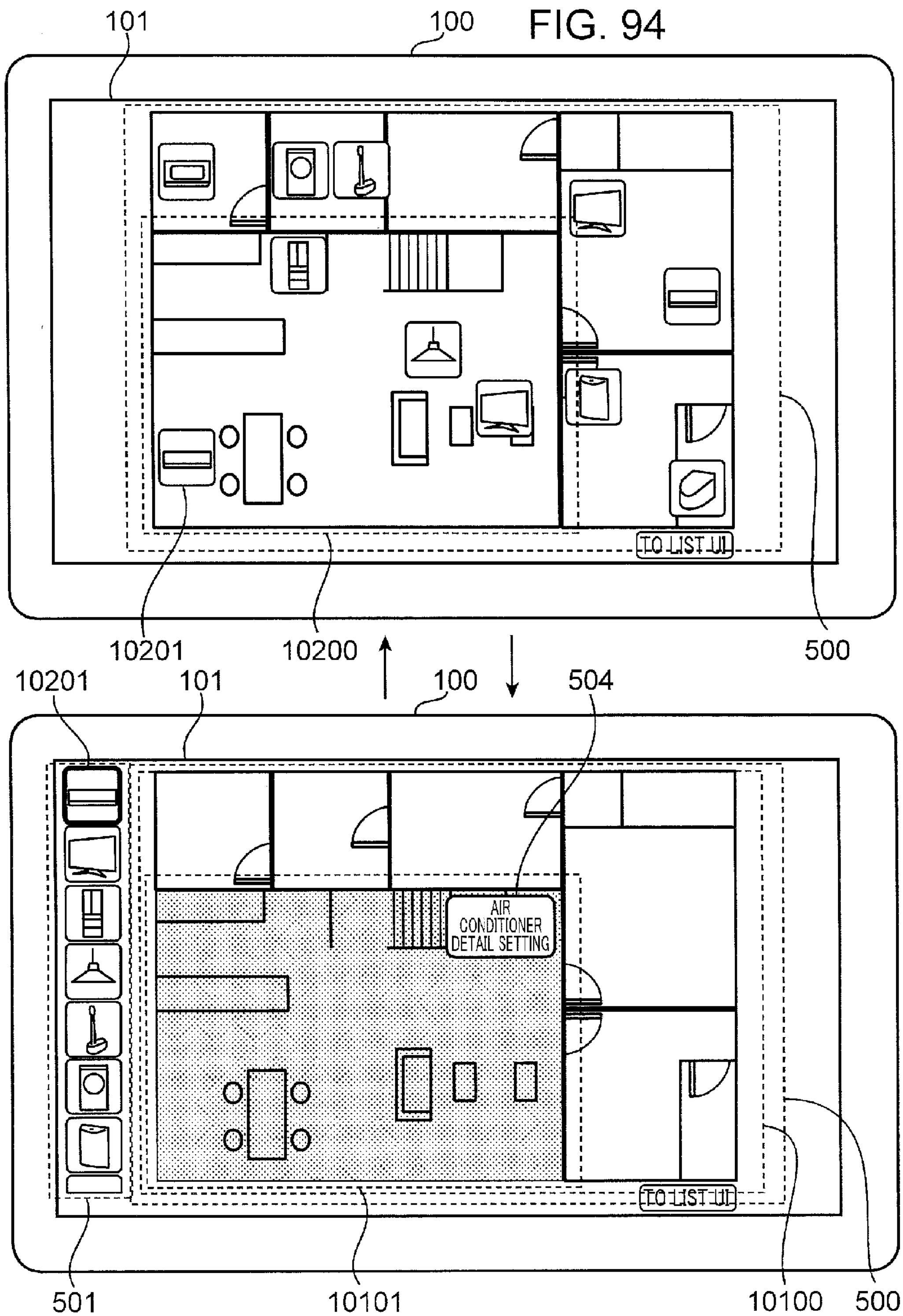
FIG. 94 is a diagram showing an example of transition of a display screen of a display including the display screen shown in FIG. 89 according to an embodiment of the present disclosure.
Figure 95:
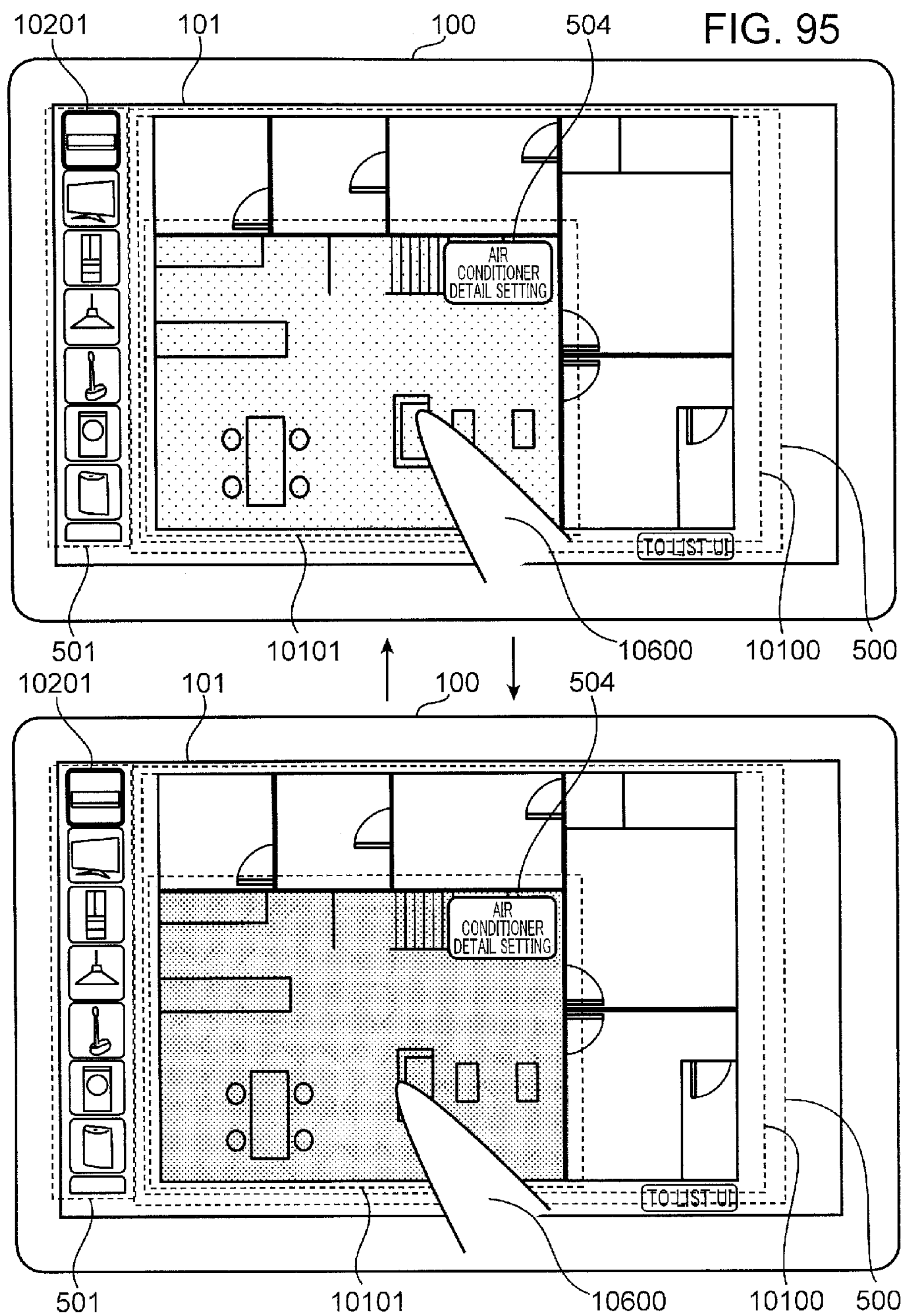
FIG. 95 is a diagram showing an example of transition of a display screen of a display including the display screen shown in FIG. 89 according to an embodiment of the present disclosure.
Figure 96:
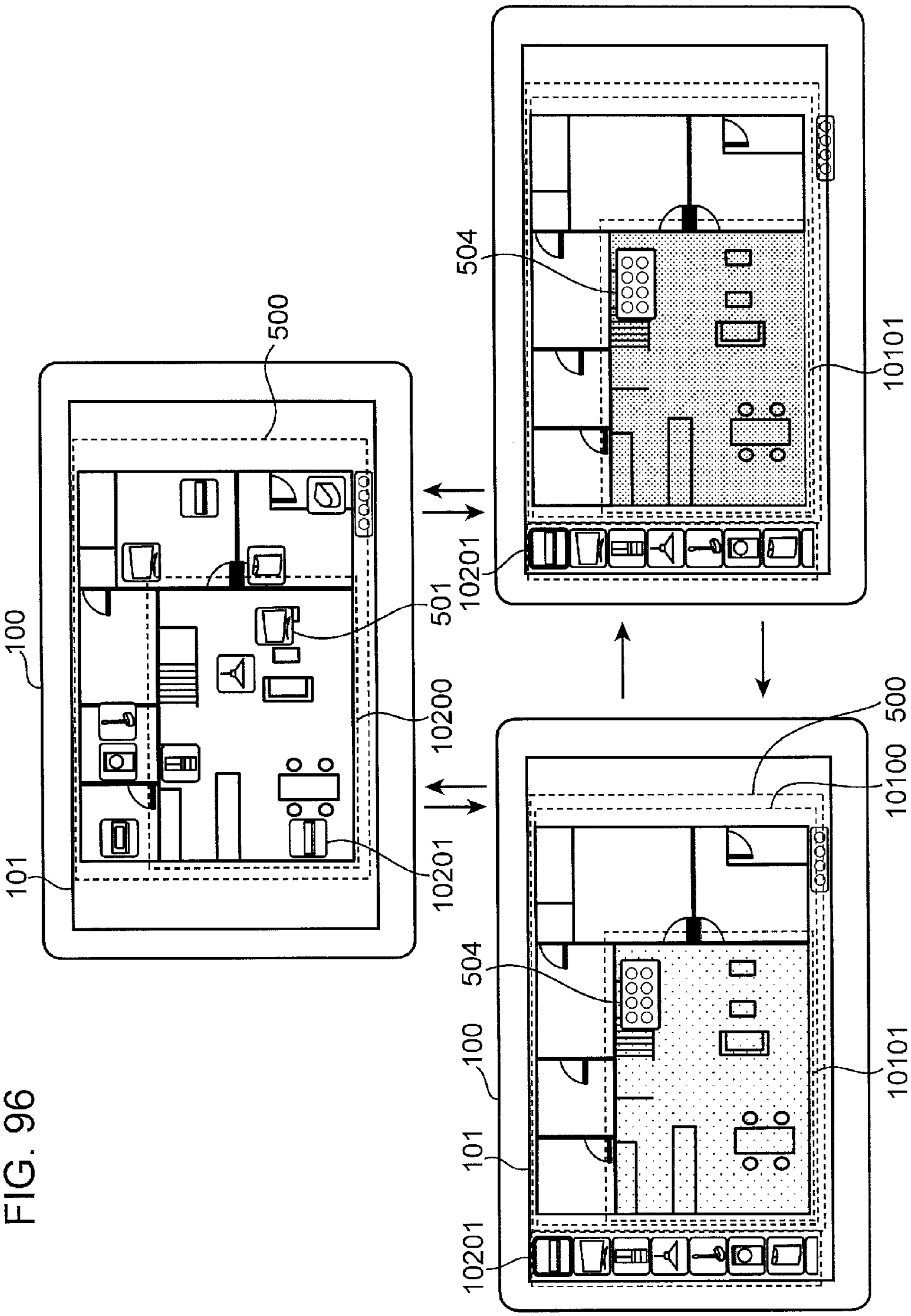
FIG. 96 is a diagram showing an example of transition of a display screen of a display including the display screen shown in FIG. 89 according to an embodiment of the present disclosure.

FIGS. 93 to 96 are diagrams showing an example of transition of a display screen of the display 101 including the display screen shown in FIG. 89. An upper diagram in FIG. 93 represents the basic screen shown in FIG. 5 and a lower diagram in FIG. 93 represents the display screen shown in FIG. 89. An upper diagram in FIG. 94 represents the basic screen shown in FIG. 5 and a lower diagram in FIG. 94 represents the display screen shown in FIG. 92 on which the operation state display section 551 is not displayed. An upper diagram in FIG. 95 represents the display screen shown in FIG. 89 and a lower diagram in FIG. 95 represents the display screen represented by the lower diagram in FIG. 94. An upper diagram in FIG. 96 represents the basic screen shown in FIG. 5, a lower right diagram in FIG. 96 represents the display screen shown in FIG. 92 on which the operation state display section 551 is not displayed, and a lower left diagram in FIG. 96 represents the display screen shown in FIG. 89.

When the user selects the device icon 10201 of the air conditioner that is displayed in the room 10200 in which the air conditioner is installed in a display state of the basic screen represented by the upper diagram in FIG. 93 (the upper diagram in FIG. 96), the selection is sensed by the touch panel control section 102. Subsequently, the display control section 103 acquires status 1709 of the air conditioner in the room 10200 from the device list 1700 to be described later with reference to FIG. 144B. The display control section 103 moves the respective device icons as shown in the lower diagram in FIG. 93 (the lower left diagram in FIG. 96) or the lower diagram in FIG. 94 (the lower right diagram in FIG. 96) and displays the control screen 10100 of the air conditioner on the display 101.

When the acquired status 1709 represents an on state in the heater mode, the display control section 103 displays the control target region 10101 of the air conditioner in a warm color (for example, red) as shown in the lower diagram in FIG. 93 (the lower left diagram in FIG. 96). In addition, the display control section 103 displays the detail setting button 504 in the control target region 10101 of the air conditioner.

On the other hand, when the acquired status 1709 represents an off state, the display control section 103 displays the control target region 10101 of the air conditioner darkly with brightness lower than the specified brightness as shown in the lower diagram in FIG. 94 (the lower right diagram in FIG. 96). In addition, the display control section 103 displays the detail setting button 504 in the control target region 10101 of the air conditioner.

When the user selects the device icon 10201 of the air conditioner or the outside of the control target region 10101 of the air conditioner (for example, a display region of the floor plan 500 that is outside the display region of the control target region 10101 of the air conditioner) in the display state represented by the lower diagram in FIG. 93 (the lower left diagram in FIG. 96) or the lower diagram in FIG. 94 (the lower right diagram in FIG. 96), the selection is sensed by the touch panel control section 102. Subsequently, the display control section 103 restores the display screen of the display 101 to a basic screen display state (the upper diagram in FIG. 93, the upper diagram in FIG. 94, the upper diagram in FIG. 96).

When the user selects the control target region 10101 of the air conditioner in a display state shown in the upper diagram in FIG. 95 (the lower left diagram in FIG. 96), the selection is sensed by the touch panel control section 102. Subsequently, as shown in the lower diagram in FIG. 95 (the lower right diagram in FIG. 96), the display control section 103 displays the control target region 10101 of the air conditioner darkly with brightness lower than the specified brightness. The device control section 106 generates a control command (an example of the on-off control command) for turning off the power of the air conditioner. The device control section 106 transmits the generated control command to the air conditioner in the room 10200 (for example, the living room) via the communication control section 107 and the network.

On the other hand, when the user selects the control target region 10101 of the air conditioner in a display state shown in the lower diagram in FIG. 95 (the lower right diagram in FIG. 96), the selection is sensed by the touch panel control section 102. Subsequently, as shown in the upper diagram in FIG. 95 (the upper left diagram in FIG. 96), the display control section 103 displays the control target region 10101 of the air conditioner in a warm color (for example, red). The device control section 106 generates a control command (an example of the on-off control command) for turning on the power of the air conditioner. The device control section 106 transmits the generated control command to the air conditioner in the room 10200 (for example, the living room) via the communication control section 107 and the network.

Figure 97:
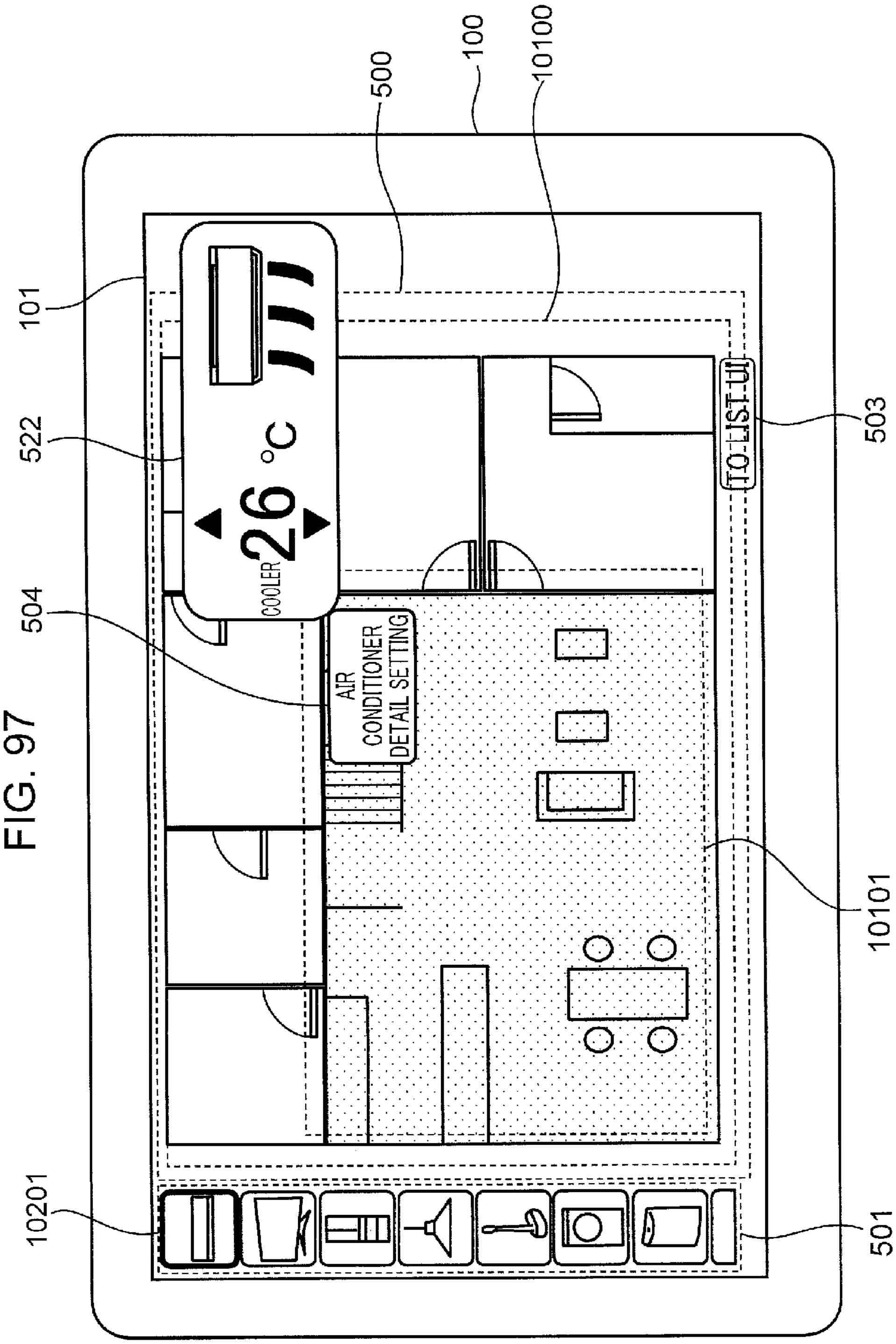
FIG. 97 is a diagram showing an example where a detail control screen is displayed on a display of a home controller according to an embodiment of the present disclosure.

FIG. 97 is a diagram showing an example where the detail control screen 522 is displayed on the display 101 of the home controller 100. As shown in FIG. 89, when the user taps (selects) the detail setting button 504 in a state where the detail setting button 504 is displayed, the selection is sensed by the touch panel control section 102. Subsequently, as shown in FIG. 97, the display control section 103 displays the detail control screen 522 of the air conditioner on the display 101.

Figure 98:
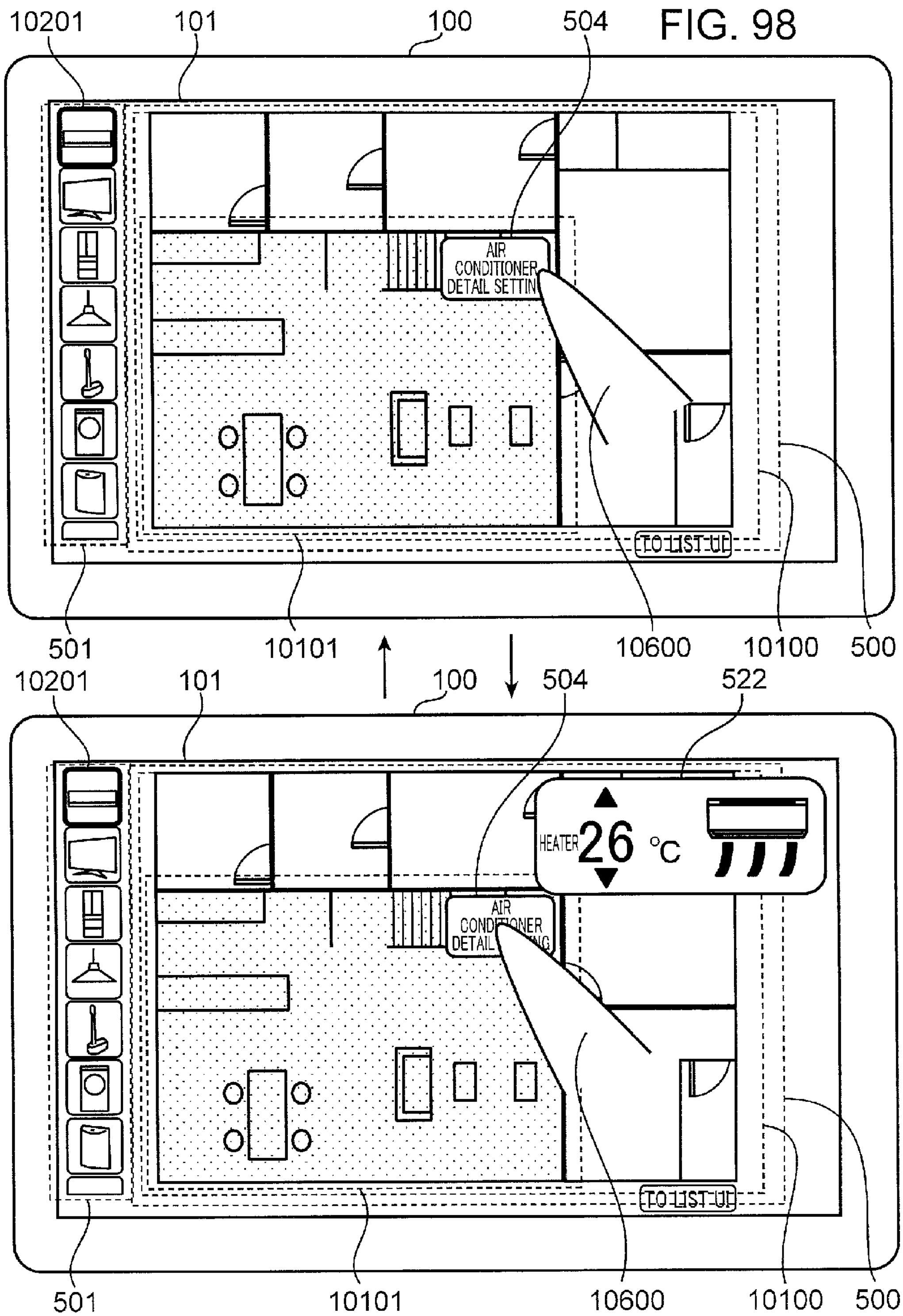
FIG. 98 is a diagram showing an example of transition of a display screen of a display that displays a detail setting button according to an embodiment of the present disclosure.
Figure 99:
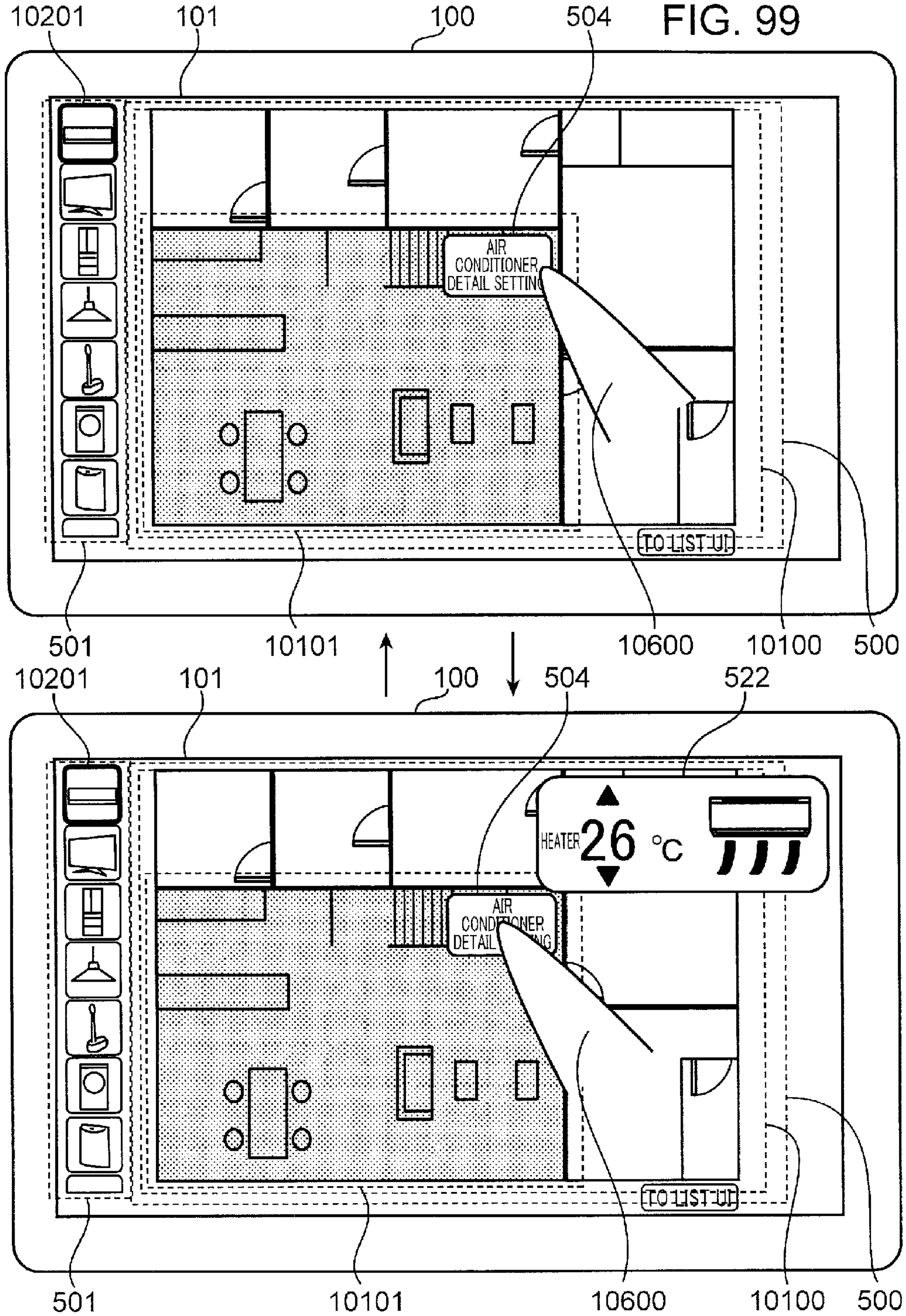
FIG. 99 is a diagram showing an example of transition of a display screen of a display that displays a detail setting button according to an embodiment of the present disclosure.
Figure 100:
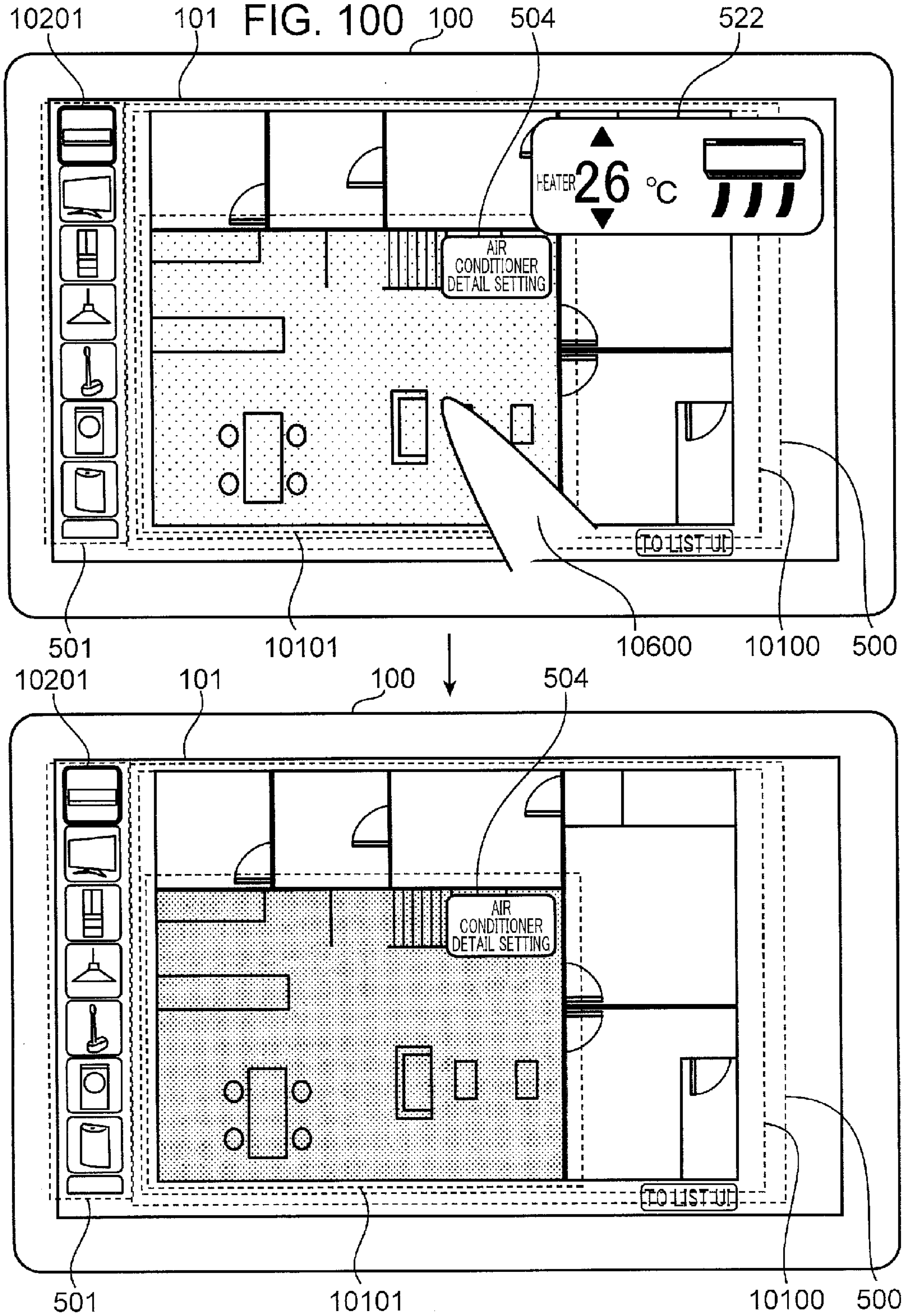
FIG. 100 is a diagram showing an example of transition of a display screen of a display that displays a detail setting button according to an embodiment of the present disclosure.

FIGS. 98 to 100 are, respectively, diagrams showing an example of transition of a display screen of the display 101 on which the detail setting button 504 is displayed.

An upper diagram in FIG. 98 represents the display screen shown in FIG. 89 and a lower diagram in FIG. 98 represents the display screen shown in FIG. 97. When the user taps (selects) the detail setting button 504 in the display state shown in the upper diagram in FIG. 98 (FIG. 89), the selection is sensed by the touch panel control section 102. Subsequently, as shown in the lower diagram in FIG. 98 (FIG. 97), the display control section 103 displays the detail control screen 522 of the air conditioner on the display 101.

On the other hand, when the user taps (selects) the detail setting button 504 in the display state shown in the lower diagram in FIG. 98 (FIG. 97), the selection is sensed by the touch panel control section 102. Subsequently, as shown in the upper diagram in FIG. 98 (FIG. 89), the display control section 103 erases the detail control screen 522 of the air conditioner from the display 101.

An upper diagram and a lower diagram in FIG. 99 are similar to the upper diagram and the lower diagram in FIG. 98 with the exception of the control target region 10101 of the air conditioner being displayed with brightness lower than the specified brightness. In FIG. 99, a transition of a display screen is performed in a similar manner to FIG. 98. When selection of the detail setting button 504 by the user is sensed by the touch panel control section 102 in a state where the detail control screen 522 is not displayed (the upper diagram in FIG. 99), the display control section 103 displays the detail control screen 522 on the display 101 (the lower diagram in FIG. 99).

On the other hand, when selection of the detail setting button 504 by the user is sensed by the touch panel control section 102 in a state where the detail control screen 522 is being displayed (the lower diagram in FIG. 99), the display control section 103 erases the displayed detail control screen 522 from the display 101 (the upper diagram in FIG. 99).

An upper diagram in FIG. 100 represents the display screen shown in FIG. 97. When the user selects the control target region 10101 of the air conditioner in a display state shown in the upper diagram in FIG. 100 (FIG. 97), the selection is sensed by the touch panel control section 102. Subsequently, as shown in the lower diagram in FIG. 100, the display control section 103 displays the control target region 10101 of the air conditioner darkly with brightness lower than the specified brightness. Furthermore, the display control section 103 erases the detail control screen 522 from the display 101.

The device control section 106 generates a control command (an example of the on-off control command) for turning off the power of the air conditioner. The device control section 106 transmits the generated control command to the air conditioner in the room 10200 (for example, the living room) via the communication control section 107 and the network.

In the example of transition of a display screen shown in FIG. 100, when the power of the air conditioner is turned off, the detail control screen 522 is erased from the display 101. Therefore, according to the example of transition of a display screen shown in FIG. 100, an on-off state of the power of the air conditioner can be clearly indicated.

(Device Icon Used in Common of Air Conditioner when Detail Setting Button is Displayed)

Figure 101:
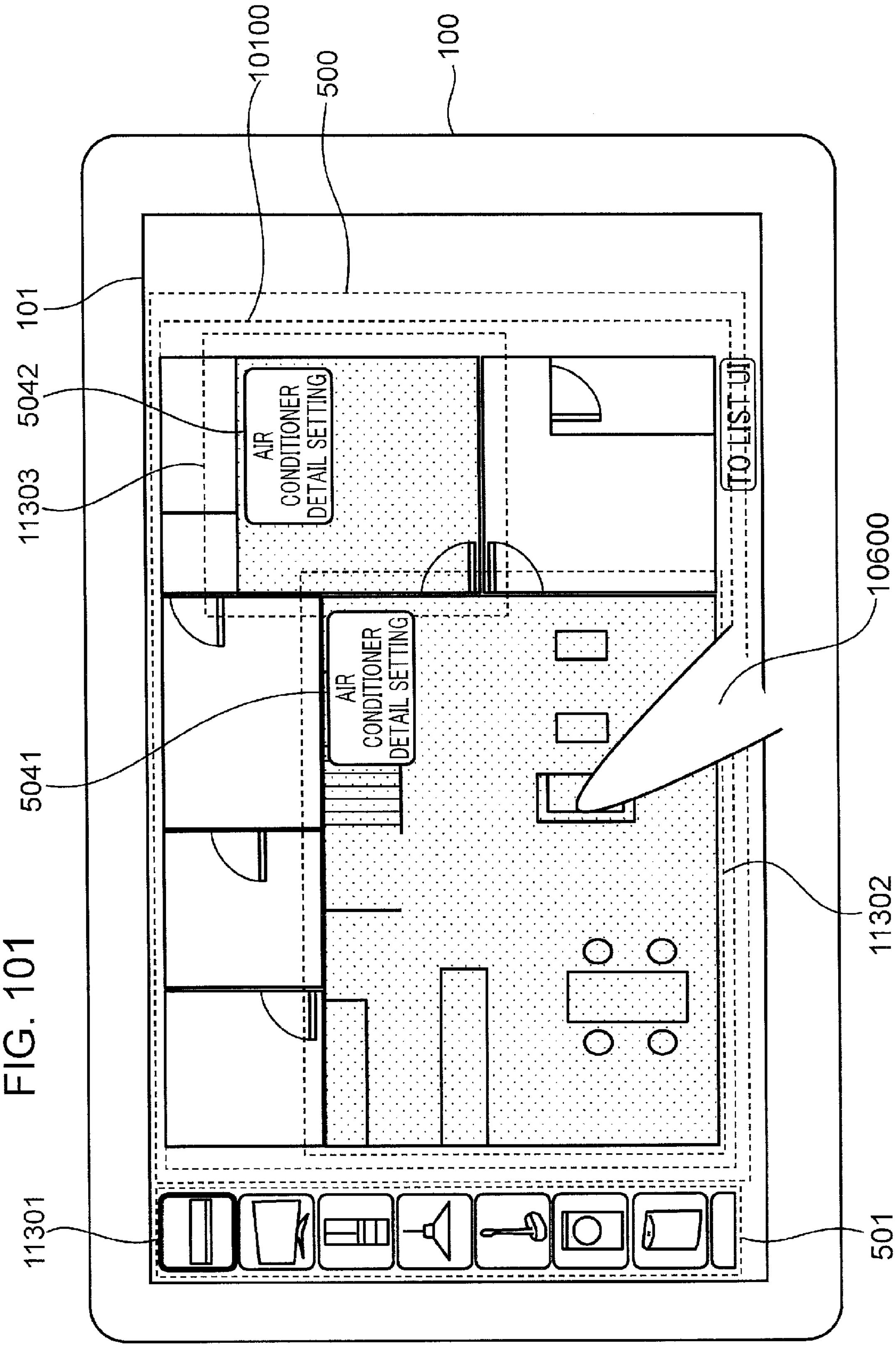
FIG. 101 is a diagram showing a control screen of an air conditioner displaying a detail setting button when one device icon of the air conditioner is used in common to control air conditioners in a plurality of rooms according to an embodiment of the present disclosure.
Figure 102:
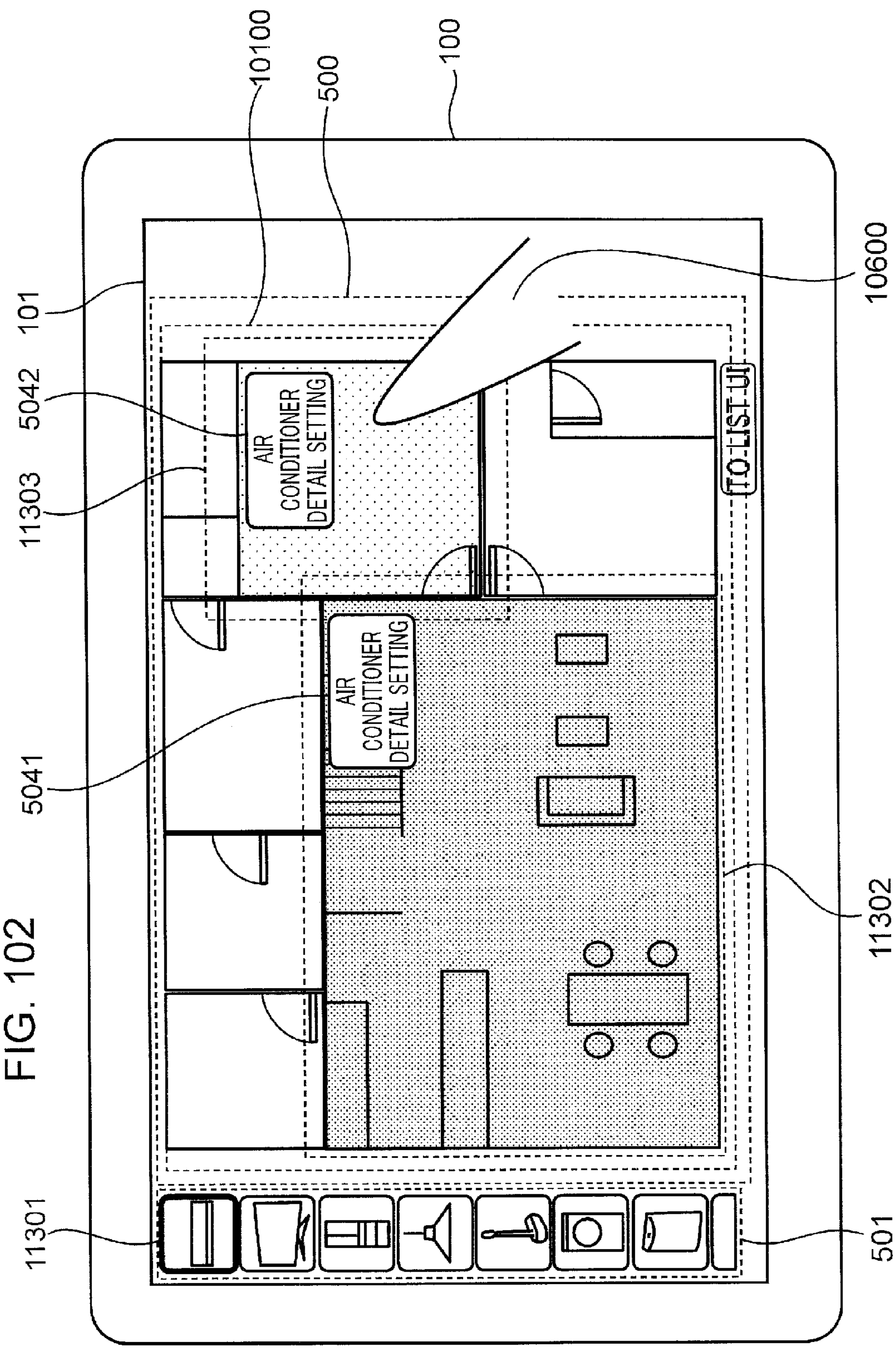
FIG. 102 is a diagram showing a control screen of an air conditioner displaying a detail setting button when one device icon of the air conditioner is used in common to control air conditioners in a plurality of rooms according to an embodiment of the present disclosure.
Figure 103:
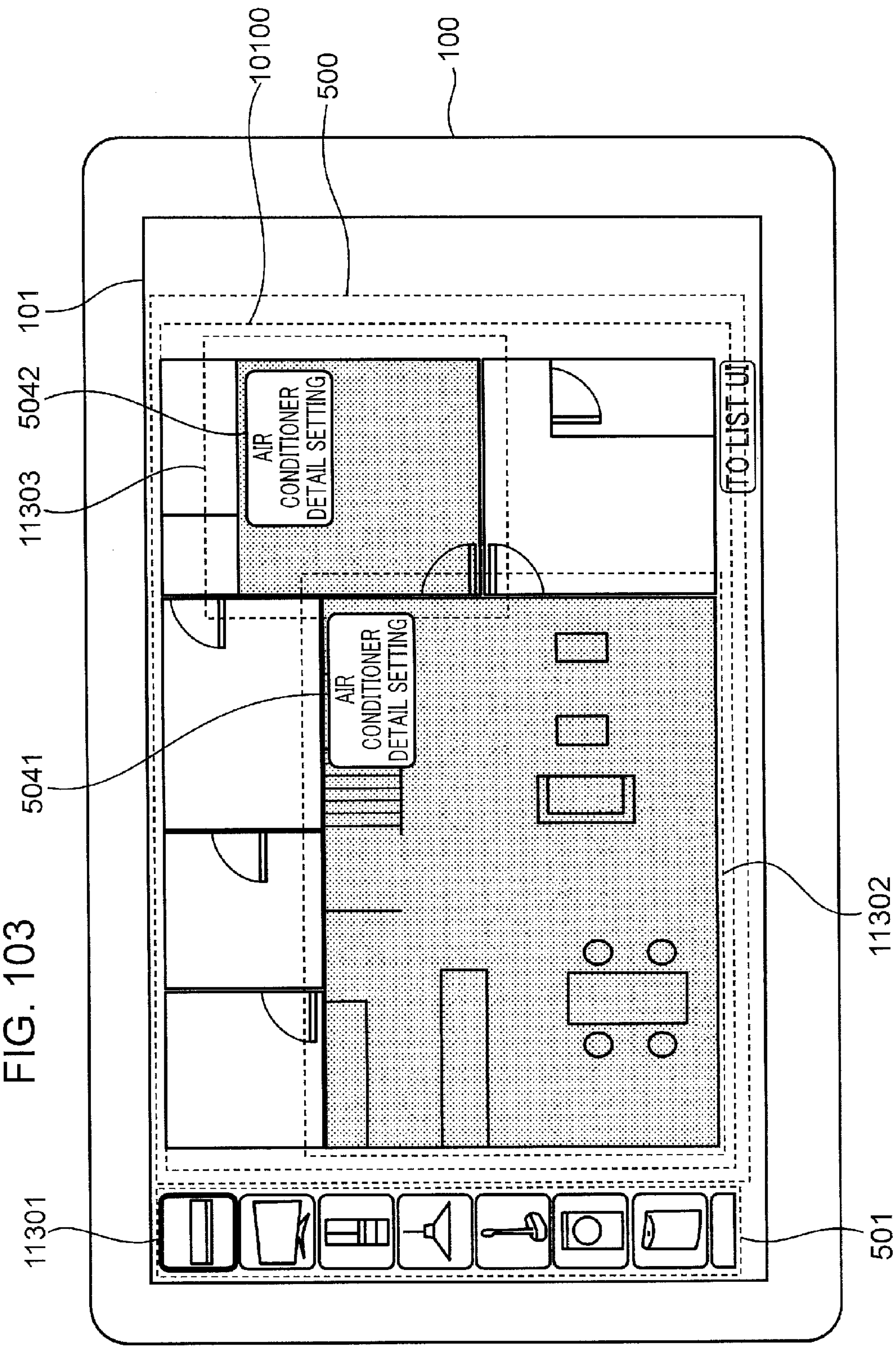
FIG. 103 is a diagram showing a control screen of an air conditioner displaying a detail setting button when one device icon of the air conditioner is used in common to control air conditioners in a plurality of rooms according to an embodiment of the present disclosure.
Figure 104:
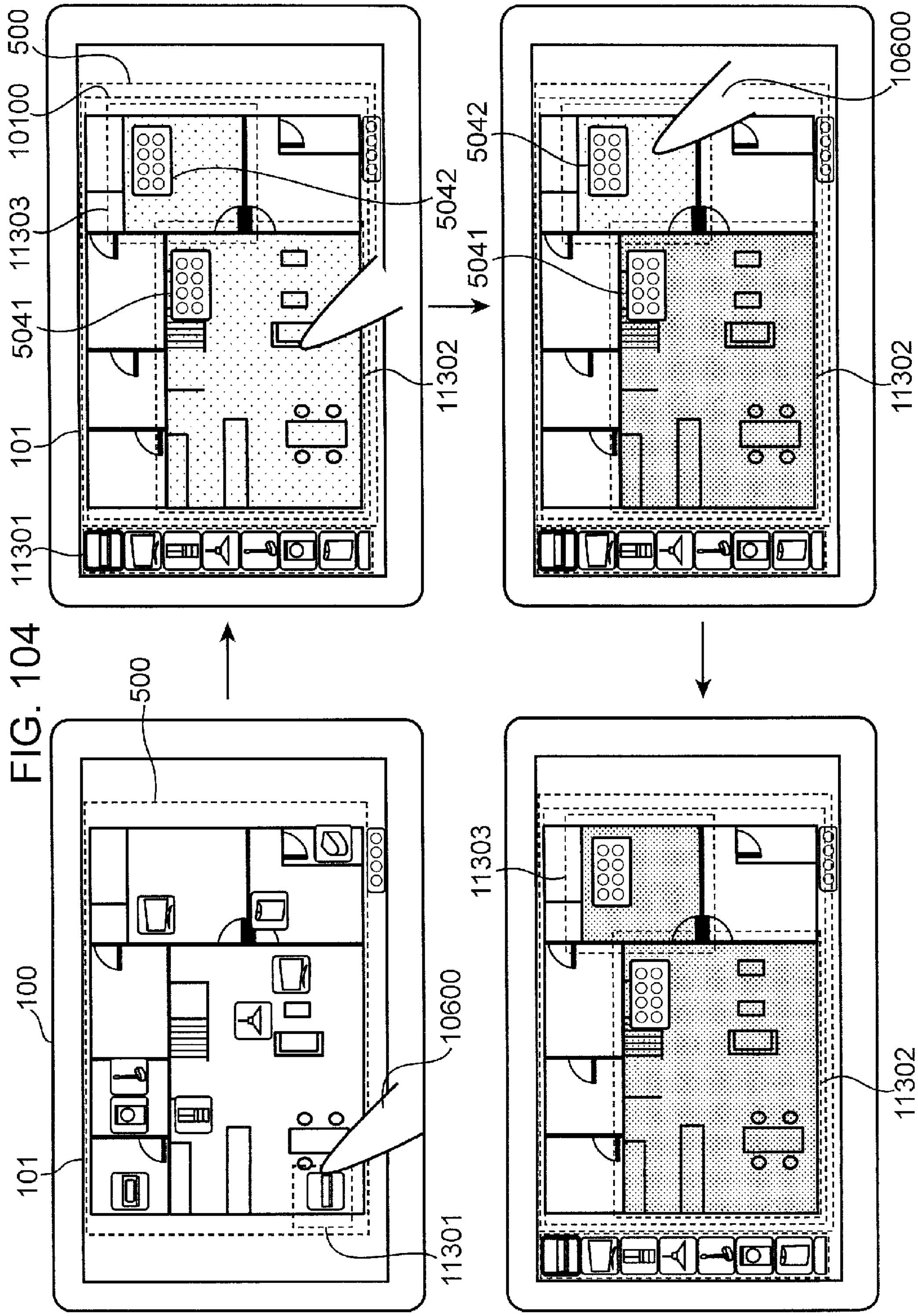
FIG. 104 is a diagram showing an example of transition of a display screen of a display of a home controller when a device icon of an air conditioner is used in common according to an embodiment of the present disclosure.

FIGS. 101 to 103 are, respectively, diagrams showing the control screen 10100 of the air conditioner displaying a detail setting button when one device icon of the air conditioner is used in common to control air conditioners in a plurality of rooms. FIG. 104 is a diagram showing an example of transition of a display screen of the display 101 of the home controller 100 when a device icon of the air conditioner is used in common. An upper left diagram in FIG. 104 represents the basic screen shown in FIG. 80, an upper right diagram in FIG. 104 represents the display screen shown in FIG. 101, a lower right diagram in FIG. 104 represents the display screen shown in FIG. 102, and a lower left diagram in FIG. 104 represents the display screen shown in FIG. 103.

First, when the user selects the used-in-common device icon 11301 of the air conditioner using the contacting object 10600 on the basic screen shown in the upper left diagram in FIG. 104 (FIG. 80), the selection is sensed by the touch panel control section 102. Subsequently, the display control section 103 acquires status 1709 of each of the air conditioners of rooms (for example, the living room and the bedroom) which uses in common the uses in common the used-in-common device icon 11301 of the air conditioner from the device list 1700 to be described later with reference to FIG. 144B. In this case, it is assumed that air conditioners in the living room and the bedroom are both operating in the heater mode. The display control section 103 moves the respective device icons as shown in FIG. 101 (the upper right diagram in FIG. 104) and displays the control screen 10100 of the air conditioner on the display 101.

Based on the acquired status 1709, the display control section 103 displays the first control target region 11302 of the air conditioner and the second control target region 11303 of the air conditioner in a warm color (for example, red) as shown in FIG. 101 (the upper right diagram in FIG. 104). Accordingly, it is shown that the room (for example, the living room) corresponding to the first control target region 11302 and the room (for example, the bedroom) corresponding to the second control target region 11303 are in an on state in the heater mode. In addition, the display control section 103 displays a detail setting button 5041 in the first control target region 11302 of the air conditioner and displays a detail setting button 5042 in the second control target region 11303 of the air conditioner.

Next, when the user selects the first control target region 11302 of the air conditioner using the contacting object 10600 in the display state shown in FIG. 101 (the upper right diagram in FIG. 104), the selection is sensed by the touch panel control section 102. Subsequently, as shown in FIG. 102 (the lower right diagram in FIG. 104), the display control section 103 displays the first control target region 11302 of the air conditioner darkly with brightness lower than the specified brightness. Accordingly, it is shown that the air conditioner of the room (for example, the living room) corresponding to the first control target region 11302 has been turned off.

The device control section 106 generates a control command (an example of the first on-off control command) for turning off the power of the air conditioner. The device control section 106 transmits the generated control command to the air conditioner in the living room (an example of the first room) corresponding to the first control target region 11302 via the communication control section 107 and the network.

Next, when the user selects the second control target region 11303 of the air conditioner using the contacting object 10600 in the display state shown in FIG. 102 (the lower right diagram in FIG. 104), the selection is sensed by the touch panel control section 102. Subsequently, as shown in FIG. 103 (the lower left diagram in FIG. 104), the display control section 103 displays the second control target region 11303 of the air conditioner darkly with brightness lower than the specified brightness. Accordingly, it is shown that the air conditioner of the room (for example, the bedroom) corresponding to the second control target region 11303 has been turned off.

The device control section 106 generates a control command (an example of the second on-off control command) for turning off the power of the air conditioner. The device control section 106 transmits the generated control command to the air conditioner in the bedroom (an example of the second room) corresponding to the second control target region 11303 via the communication control section 107 and the network.

Figure 105:
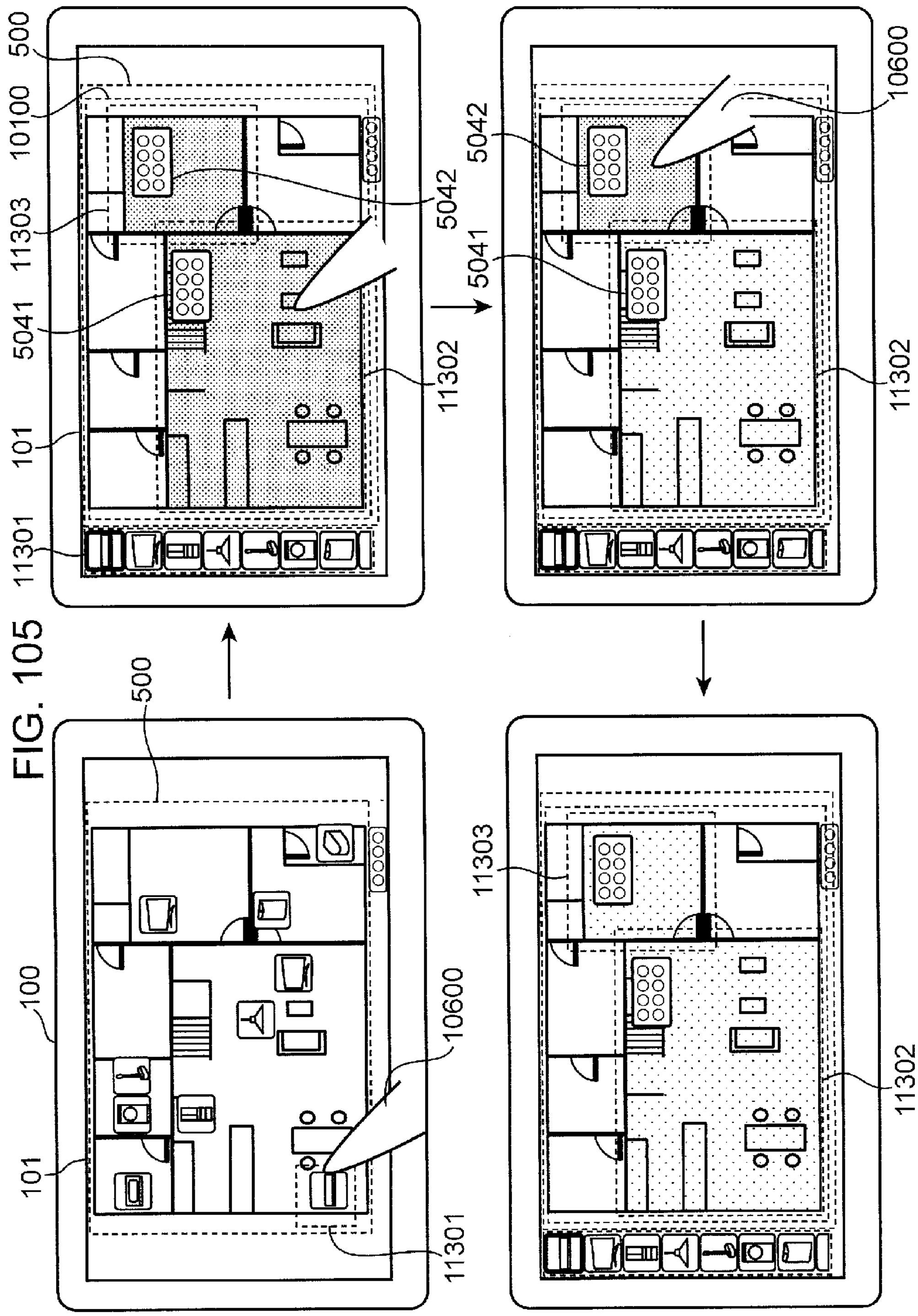
FIG. 105 is a diagram showing an example of transition that differs from FIG. 104 of a display screen of a display of a home controller when one device icon of the air conditioner is used in common to control air conditioners in a plurality of rooms according to an embodiment of the present disclosure.

FIG. 105 is a diagram showing an example of a transition that differs from FIG. 104 of a display screen of the display 101 of the home controller 100 when one device icon of the air conditioner is used in common to control air conditioners in a plurality of rooms. An upper left diagram in FIG. 105 represents the basic screen shown in FIG. 80 and an upper right diagram, a lower right diagram, and a lower left diagram in FIG. 105 represent the control screen 10100 of the air conditioner.

First, when the user selects the used-in-common device icon 11301 of the air conditioner using the contacting object 10600 on the basic screen shown in the upper left diagram in FIG. 105, the selection is sensed by the touch panel control section 102. Subsequently, the display control section 103 acquires status 1709 of each of the air conditioners of rooms (for example, the living room and the bedroom) which uses in common the used-in-common device icon 11301 of the air conditioner from the device list 1700 to be described later with reference to FIG. 144B. In this case, it is assumed that both air conditioners in the living room and the bedroom have been turned off. The display control section 103 moves the respective device icons as shown in the upper right diagram in FIG. 105 and displays the control screen 10100 of the air conditioner on the display 101.

Based on the acquired status 1709, the display control section 103 displays the first control target region 11302 of the air conditioner and the second control target region 11303 of the air conditioner darkly with brightness lower than the specified brightness as shown in the upper right diagram in FIG. 105. Accordingly, it is shown that the air conditioners in the room (for example, the living room) corresponding to the first control target region 11302 and the room (for example, the bedroom) corresponding to the second control target region 11303 have been turned off. In addition, the display control section 103 displays the detail setting button 5041 in the first control target region 11302 of the air conditioner and displays the detail setting button 5042 in the second control target region 11303 of the air conditioner.

Next, when the user selects the first control target region 11302 of the air conditioner using the contacting object 10600 in the display state shown in the upper right diagram in FIG. 105, the selection is sensed by the touch panel control section 102. Subsequently, based on the acquired status 1709, the display control section 103 determines that the air conditioner in the room (for example, the living room) corresponding to the first control target region 11302 of the air conditioner has been operating in the heater mode when the power of the air conditioner had previously been turned off. Based on this determination, the display control section 103 displays the first control target region 11302 of the air conditioner in a warm color (red) as shown in the lower right diagram in FIG. 105. Accordingly, it is shown that the air conditioner of the room (for example, the living room) corresponding to the first control target region 11302 is operating in the heater mode.

The device control section 106 generates a control command (an example of the first on-off control command) for turning on the power of the air conditioner. The device control section 106 transmits the generated control command to the air conditioner in the living room (an example of the first room) corresponding to the first control target region 11302 via the communication control section 107 and the network.

Next, when the user selects the second control target region 11303 of the air conditioner using the contacting object 10600 in the display state shown in the lower right diagram in FIG. 105, the selection is sensed by the touch panel control section 102. Subsequently, based on the acquired status 1709, the display control section 103 determines that the air conditioner in the room (for example, the bedroom) corresponding to the second control target region 11303 of the air conditioner has been operating in the heater mode when the power of the air conditioner had previously been turned off. Based on this determination, the display control section 103 displays the second control target region 11303 of the air conditioner in a warm color (for example, red) as shown in the lower left diagram in FIG. 105. Accordingly, it is shown that the air conditioner of the room (for example, the living room) corresponding to the first control target region 11302 is operating in the heater mode.

The device control section 106 generates a control command (an example of the second on-off control command) for turning on the power of the air conditioner. The device control section 106 transmits the generated control command to the air conditioner in the bedroom (an example of the second room) corresponding to the second control target region 11303 via the communication control section 107 and the network.

Figure 106:
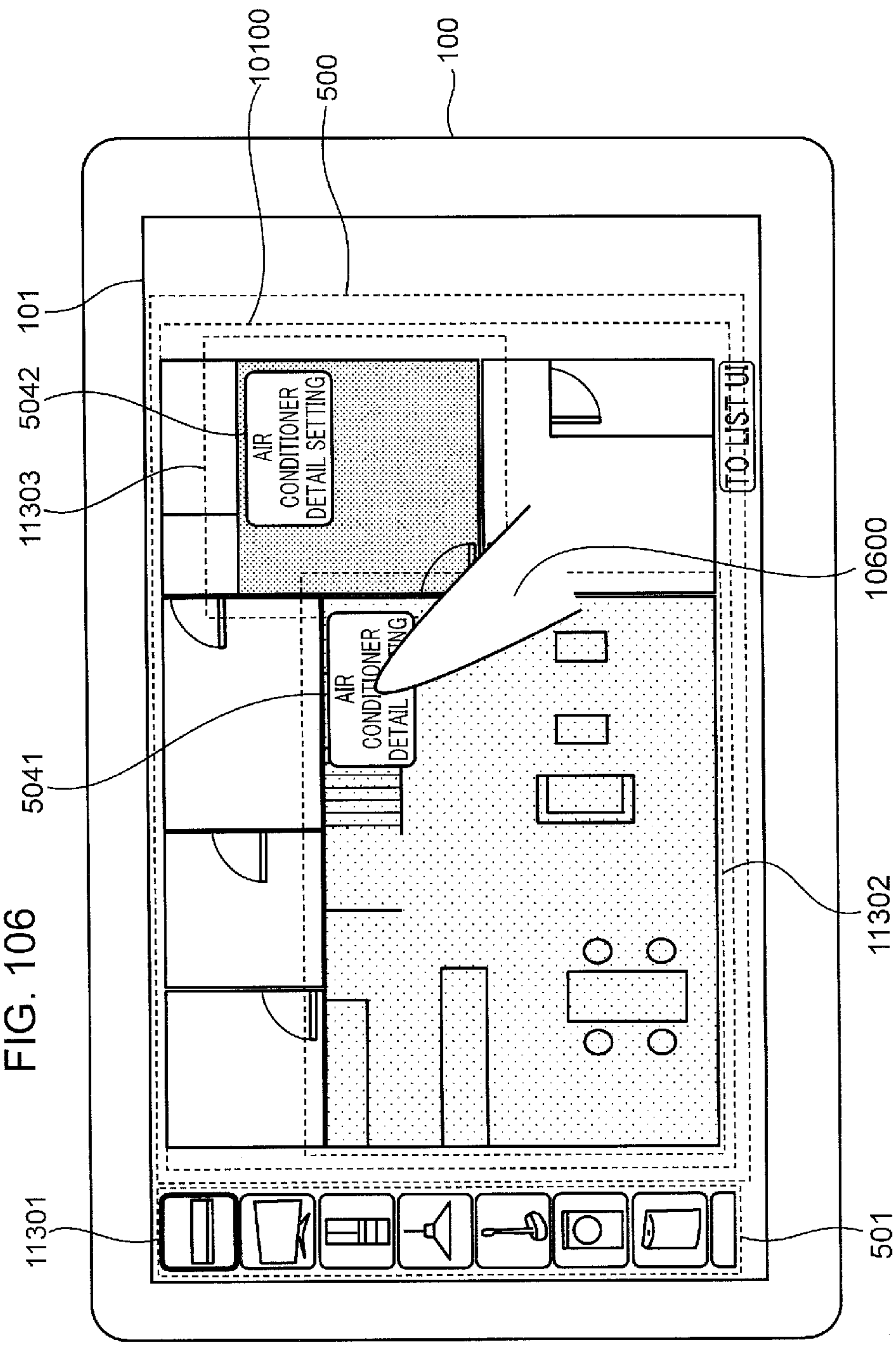
FIG. 106 is a diagram showing another example of a control screen of an air conditioner that displays a detail setting button according to an embodiment of the present disclosure.
Figure 107:
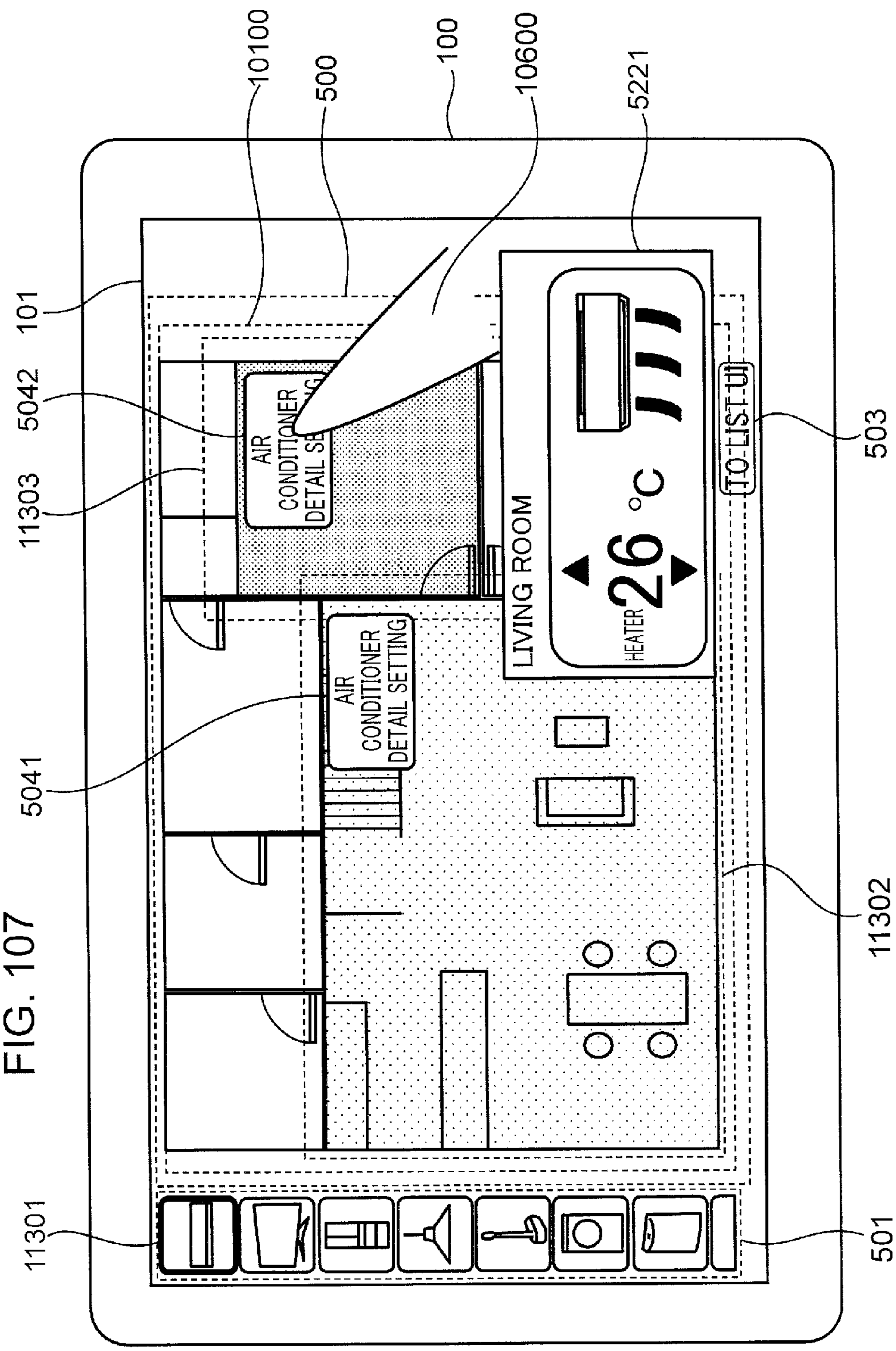
FIG. 107 is a diagram showing another example of a control screen of an air conditioner that displays a detail setting button according to an embodiment of the present disclosure.
Figure 108:
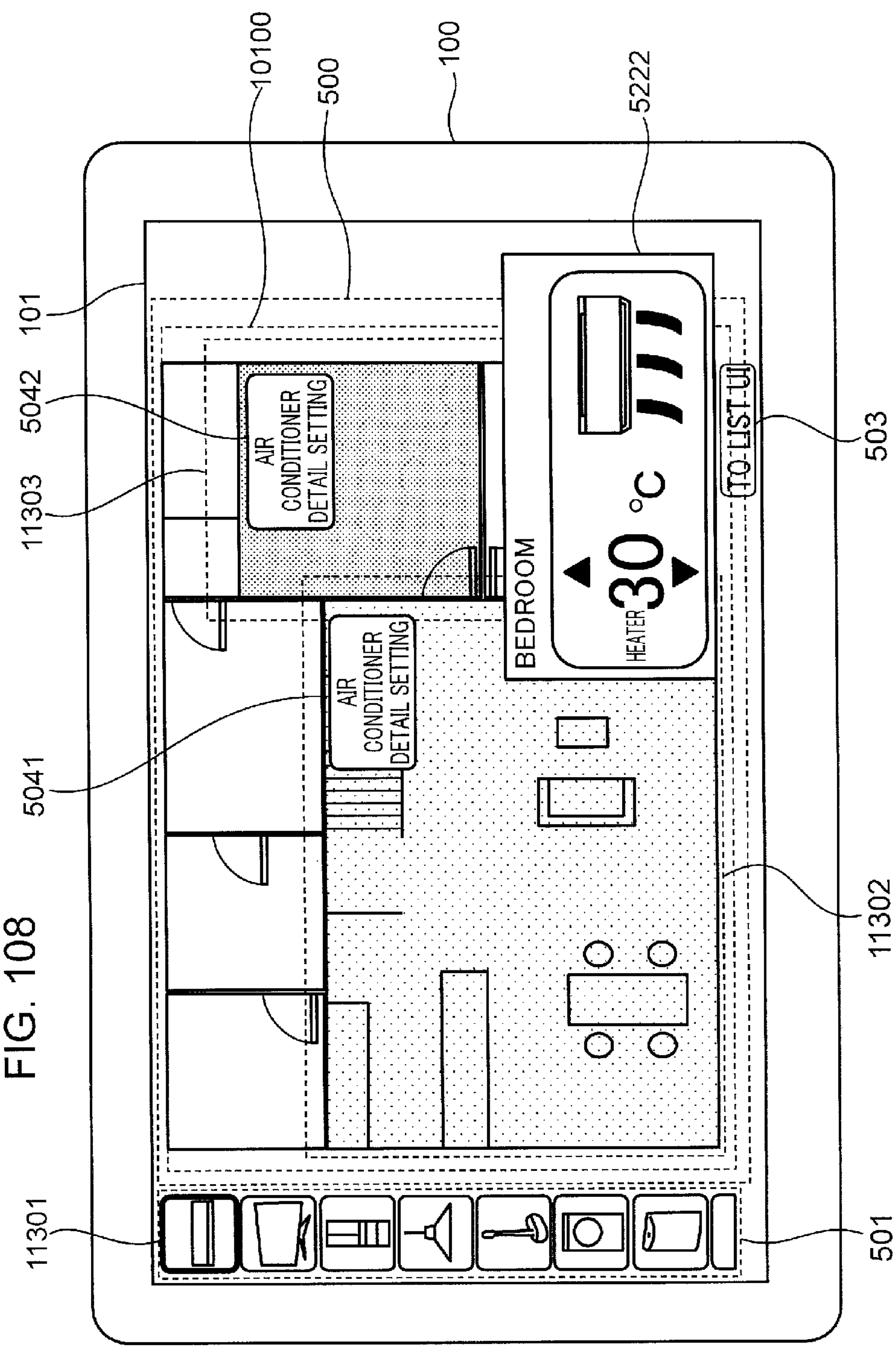
FIG. 108 is a diagram showing another example of a control screen of an air conditioner that displays a detail setting button according to an embodiment of the present disclosure.
Figure 109:
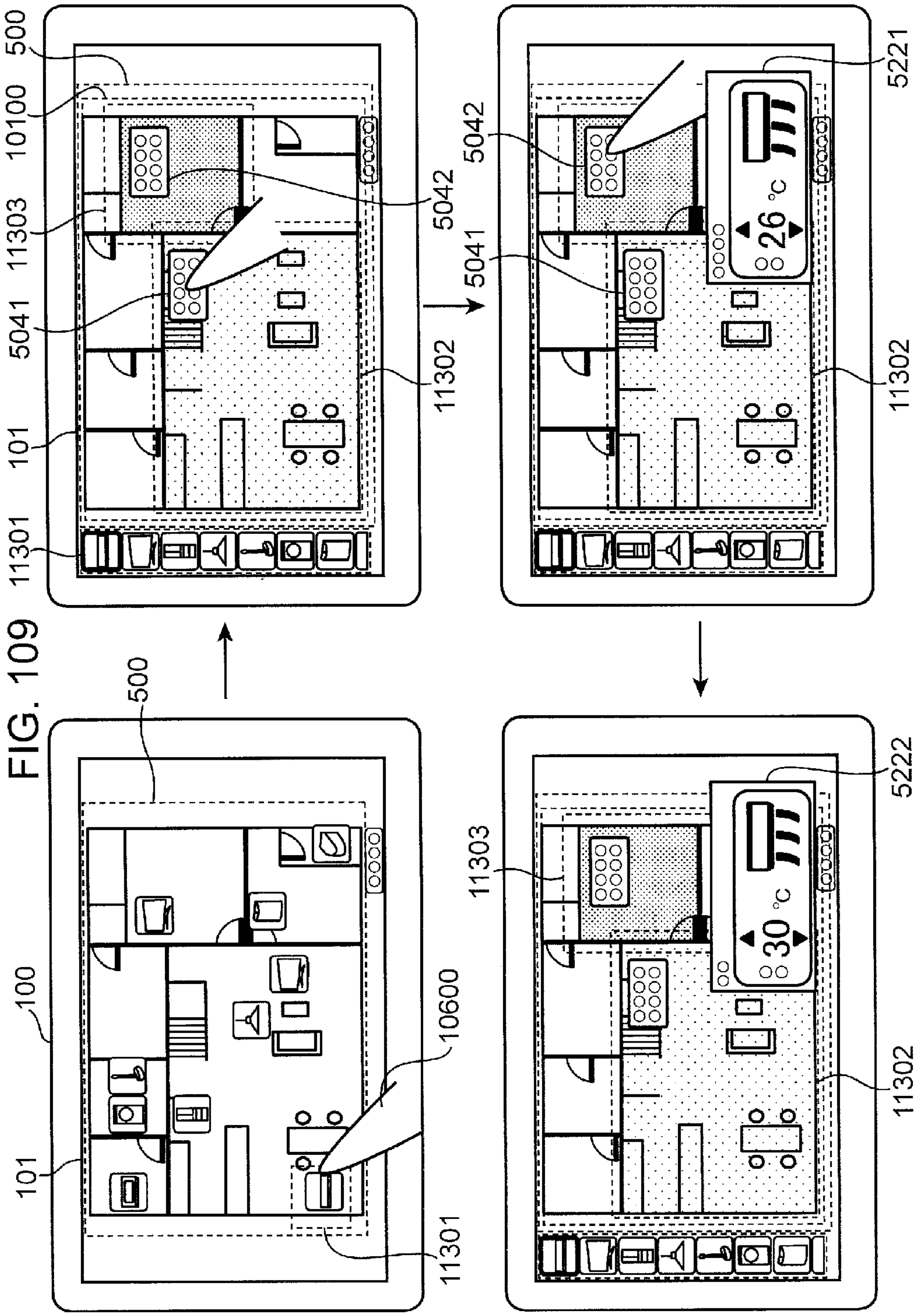
FIG. 109 is a diagram showing yet another example of transition of a display screen of a display of a home controller when one device icon of the air conditioner is used in common to control air conditioners in a plurality of rooms according to an embodiment of the present disclosure.

FIGS. 106 to 108 are diagrams showing another example of the control screen 10100 of the air conditioner which displays a detail setting button. FIG. 109 is a diagram showing yet another example of a transition of a display screen of the display 101 of the home controller 100 when one device icon of the air conditioner is used in common to control air conditioners in a plurality of rooms. An upper left diagram in FIG. 109 represents the basic screen shown in FIG. 80, an upper right diagram in FIG. 109 represents the display screen shown in FIG. 106, a lower right diagram in FIG. 109 represents the display screen shown in FIG. 107, and a lower left diagram in FIG. 109 represents the display screen shown in FIG. 108.

First, when the user selects the used-in-common device icon 11301 of the air conditioner using the contacting object 10600 on the basic screen shown in the upper left diagram in FIG. 109 (FIG. 80), the selection is sensed by the touch panel control section 102. Subsequently, the display control section 103 acquires status 1709 of each of the air conditioners of rooms (for example, the living room and the bedroom) which uses in common the used-in-common device icon 11301 of the air conditioner from the device list 1700 to be described later with reference to FIG. 144B. In this case, it is assumed that the air conditioner in the living room is operating in the heater mode and the air conditioner in the bedroom has been turned off. The display control section 103 moves the respective device icons as shown in FIG. 106 (the upper right diagram in FIG. 109) and displays the control screen 10100 of the air conditioner on the display 101.

Based on the acquired status 1709, as shown in FIG. 106 (the upper right diagram in FIG. 109), the display control section 103 displays the first control target region 11302 of the air conditioner in a warm color (for example, red) and displays the second control target region 11303 of the air conditioner darkly with brightness lower than the specified brightness. Accordingly, it is shown that the room (for example, the living room) corresponding to the first control target region 11302 is in an on state in the heater mode and the room (for example, the bedroom) corresponding to the second control target region 11303 is in an off state. In addition, the display control section 103 displays the detail setting button 5041 in the first control target region 11302 of the air conditioner and displays the detail setting button 5042 in the second control target region 11303 of the air conditioner.

Next, when the user selects the detail setting button 5041 that is displayed in the first control target region 11302 of the air conditioner using the contacting object 10600 in the display state shown in FIG. 106 (the upper right diagram in FIG. 109), the selection is sensed by the touch panel control section 102. Consequently, as shown in FIG. 107 (the lower right diagram in FIG. 109), the display control section 103 displays a detail control screen 5221 of the room (for example, the living room) corresponding to the first control target region 11302 of the air conditioner on the display 101.

As shown in FIG. 107, the detail control screen 5221 includes a description reading "living room". Due to the description, it is clearly shown that the detail control screen 5221 is a detail control screen of the air conditioner in the living room. In this manner, by displaying the detail control screen 5221 on the display 101, settings of the air conditioner in the living room can be controlled in detail.

Next, when the user selects the detail setting button 5042 that is displayed in the second control target region 11303 of the air conditioner using the contacting object 10600 in the display state shown in FIG. 107 (the lower right diagram in FIG. 109), the selection is sensed by the touch panel control section 102. Consequently, as shown in FIG. 108 (the lower left diagram in FIG. 109), the display control section 103 displays a detail control screen 5222 of the room (for example, the bedroom) corresponding to the second control target region 11303 of the air conditioner on the display 101 in place of the detail control screen 5221.

As shown in FIG. 108, the detail control screen 5222 includes a description reading "bedroom". Due to the description, it is clearly shown that the detail control screen 5222 is a detail control screen of the air conditioner in the bedroom. In this manner, by displaying the detail control screen 5222 on the display 101, settings of the air conditioner in the bedroom can be controlled in detail.

Figure 110:
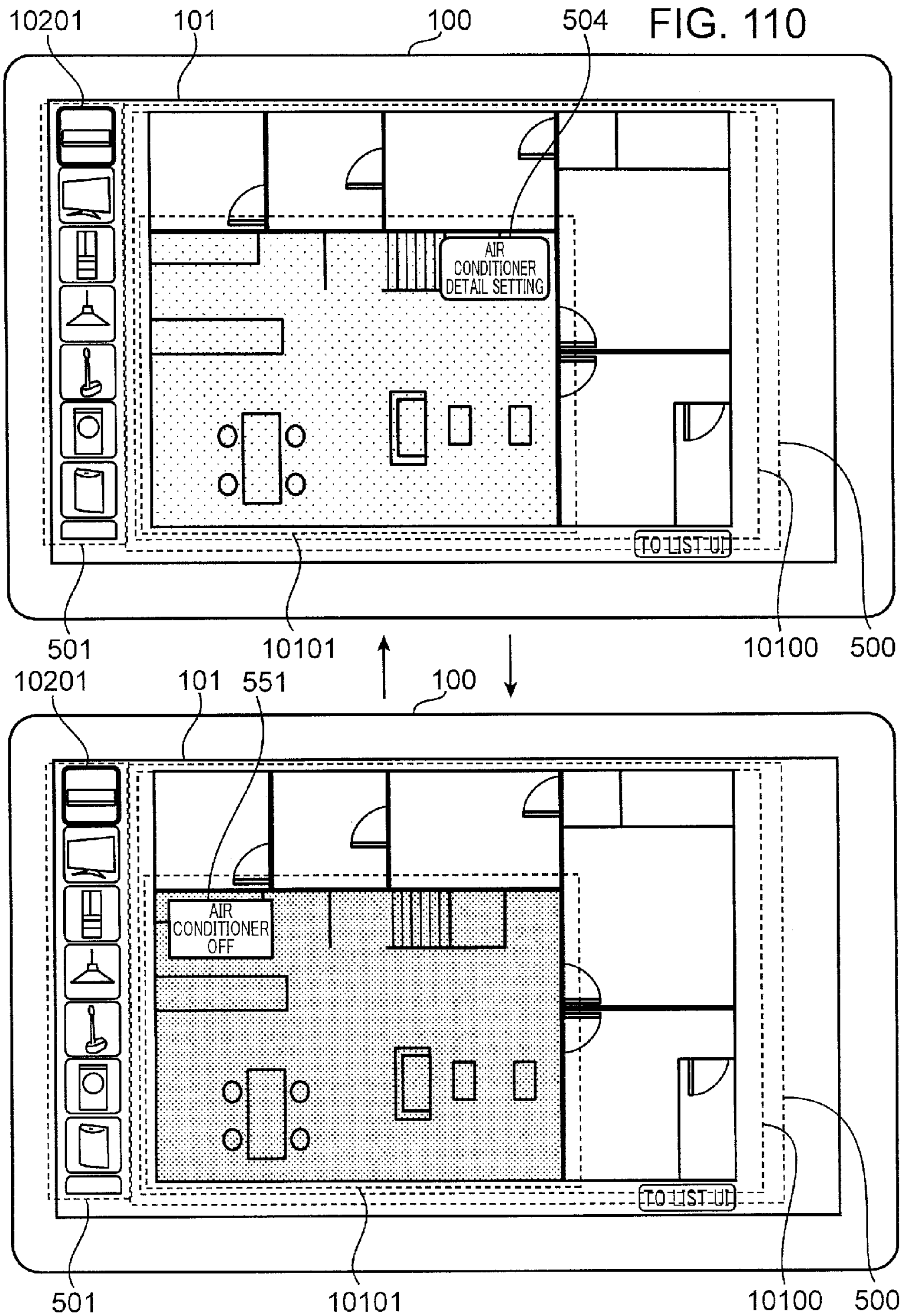
FIG. 110 is a diagram showing an example of transition of a display screen of a display of a home controller including another display example of a detail setting button according to an embodiment of the present disclosure.
Figure 111:
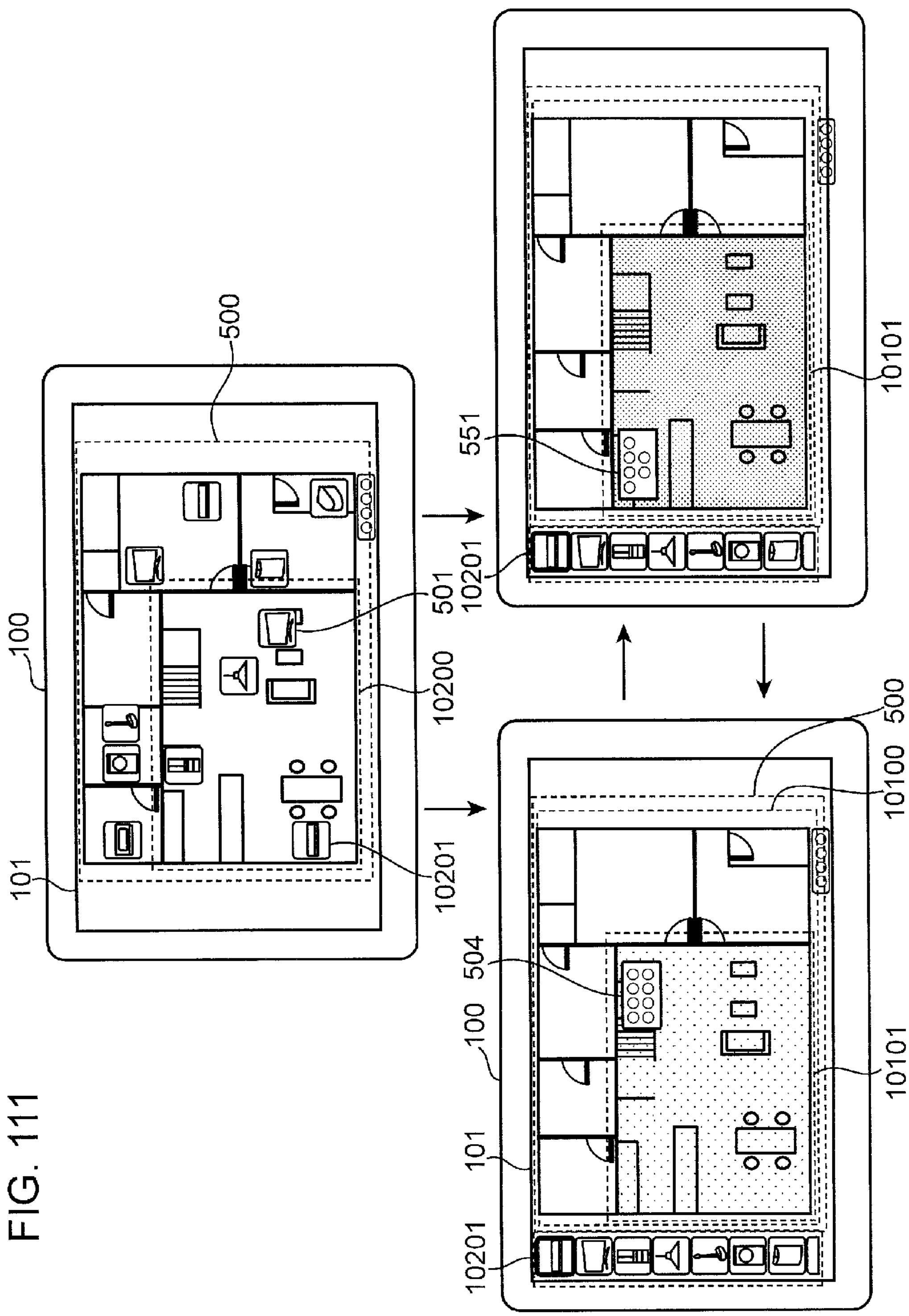
FIG. 111 is a diagram showing an example of transition of a display screen of a display of a home controller including another display example of a detail setting button according to an embodiment of the present disclosure.

FIGS. 110 and 111 are diagrams showing an example of transition of a display screen of the display 101 of the home controller 100 including another display example of a detail setting button. An upper diagram in FIG. 110 represents the display screen shown in FIG. 89 and a lower diagram in FIG. 110 represents the display screen shown in FIG. 85. An upper diagram in FIG. 111 represents the basic screen shown in FIG. 80, a lower left diagram in FIG. 111 represents the display screen shown in FIG. 89 (the upper diagram in FIG. 110), and a lower right diagram in FIG. 111 represents the display screen shown in FIG. 85 (the lower diagram in FIG. 110).

When the user selects the device icon 10201 of the air conditioner that is displayed in the room 10200 in which the air conditioner is installed in a display state of the basic screen represented by the upper diagram in FIG. 111 (FIG. 80), the selection is sensed by the touch panel control section 102. Subsequently, the display control section 103 acquires status 1709 of the air conditioner in the room 10200 from the device list 1700 to be described later with reference to FIG. 144B. The display control section 103 moves the respective device icons as shown in the lower left diagram in FIG. 111 or the lower right diagram in FIG. 111 and displays the control screen 10100 of the air conditioner on the display 101.

When the acquired status 1709 of the air conditioner represents an on state in the heater mode, the display control section 103 displays the control target region 10101 of the air conditioner in a warm color (for example, red) as shown in the upper diagram in FIG. 110 (the lower left diagram in FIG. 111). In addition, the display control section 103 displays the detail setting button 504 in the control target region 10101 of the air conditioner.

On the other hand, when the acquired status 1709 of the air conditioner represents an off state, the display control section 103 displays the control target region 10101 of the air conditioner darkly with brightness lower than the specified brightness as shown in the lower diagram in FIG. 110 (the lower right diagram in FIG. 111). In addition, the display control section 103 displays the operation state display section 551 in the control target region 10101 of the air conditioner.

When the user selects the control target region 10101 of the air conditioner in a display state shown in the upper diagram in FIG. 110 (the lower left diagram in FIG. 111), the selection is sensed by the touch panel control section 102. Subsequently, as shown in the lower diagram in FIG. 110 (the lower right diagram in FIG. 111), the display control section 103 displays the control target region 10101 of the air conditioner darkly with brightness lower than the specified brightness. The display control section 103 erases the detail setting button 504 from the control target region 10101 of the air conditioner. The display control section 103 displays the operation state display section 551 including a description reading "air conditioner off" in the control target region 10101 of the air conditioner.

The device control section 106 generates a control command (an example of the on-off control command) for turning off the power of the air conditioner. The device control section 106 transmits the generated control command to the air conditioner in the room 10200 (for example, the living room) via the communication control section 107 and the network.

On the other hand, when the user selects the control target region 10101 of the air conditioner in a display state shown in the lower diagram in FIG. 110 (the lower right diagram in FIG. 111), the selection is sensed by the touch panel control section 102. Subsequently, based on the acquired status 1709, the display control section 103 determines that the air conditioner in the room (for example, the living room) corresponding to the control target region 10101 of the air conditioner has been operating in the heater mode when the power of the air conditioner had previously been turned off. Based on this determination, the display control section 103 displays the control target region 10101 of the air conditioner in a warm color (for example, red) as shown in the upper diagram in FIG. 110 (the lower left diagram in FIG. 111). Accordingly, it is shown that the air conditioner of the room (for example, the living room) corresponding to the control target region 10101 is operating in the heater mode.

The device control section 106 generates a control command (an example of the on-off control command) for turning on the power of the air conditioner. The device control section 106 transmits the generated control command to the air conditioner in the room (for example, the living room) corresponding to the control target region 10101 via the communication control section 107 and the network.

Figure 112:
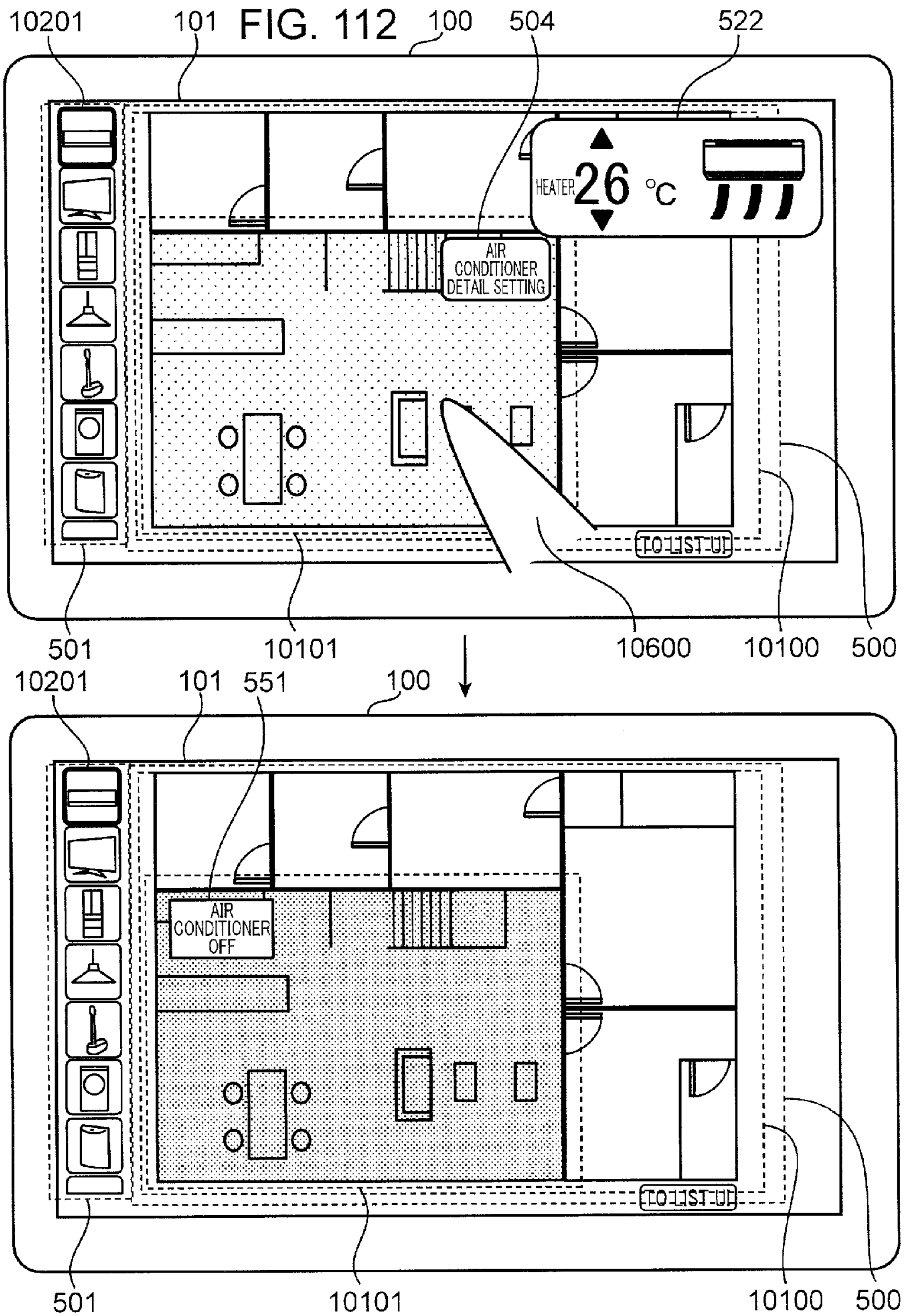
FIG. 112 is a diagram showing yet another example of transition of a display screen of a display of a home controller according to an embodiment of the present disclosure.

FIG. 112 is a diagram showing yet another example of transition of a display screen of the display 101 of the home controller 100. An upper diagram in FIG. 112 represents the display screen shown in FIG. 97 and a lower diagram in FIG. 112 represents the display screen shown in FIG. 85.

In the upper diagram in FIG. 112, the display control section 103 displays the control target region 10101 of the air conditioner in a warm color (for example, red). Accordingly, it is shown that the room (for example, the living room) corresponding to the control target region 10101 is in an on state and in the heater mode. The display control section 103 displays the detail setting button 504 in the control target region 10101 of the air conditioner. The display control section 103 displays the detail control screen 522 on the display 101.

When the user selects the control target region 10101 of the air conditioner in a display state shown in the upper diagram in FIG. 112, the selection is sensed by the touch panel control section 102. Subsequently, as shown in the lower diagram in FIG. 112, the display control section 103 displays the control target region 10101 of the air conditioner darkly with brightness lower than the specified brightness. The display control section 103 erases the detail setting button 504 from the control target region 10101 of the air conditioner. The display control section 103 erases the detail control screen 522 from the display 101. The display control section 103 displays the operation state display section 551 including a description reading "air conditioner off" in the control target region 10101 of the air conditioner.

The device control section 106 generates a control command (an example of the on-off control command) for turning off the power of the air conditioner. The device control section 106 transmits the generated control command to the air conditioner in the room 10200 (for example, the living room) via the communication control section 107 and the network. As described above, according to the example of transition of a display screen shown in FIG. 112, when the air conditioner is turned off, the detail control screen 522 in addition to the detail setting button 504 is erased from the display 101.

Figure 113:
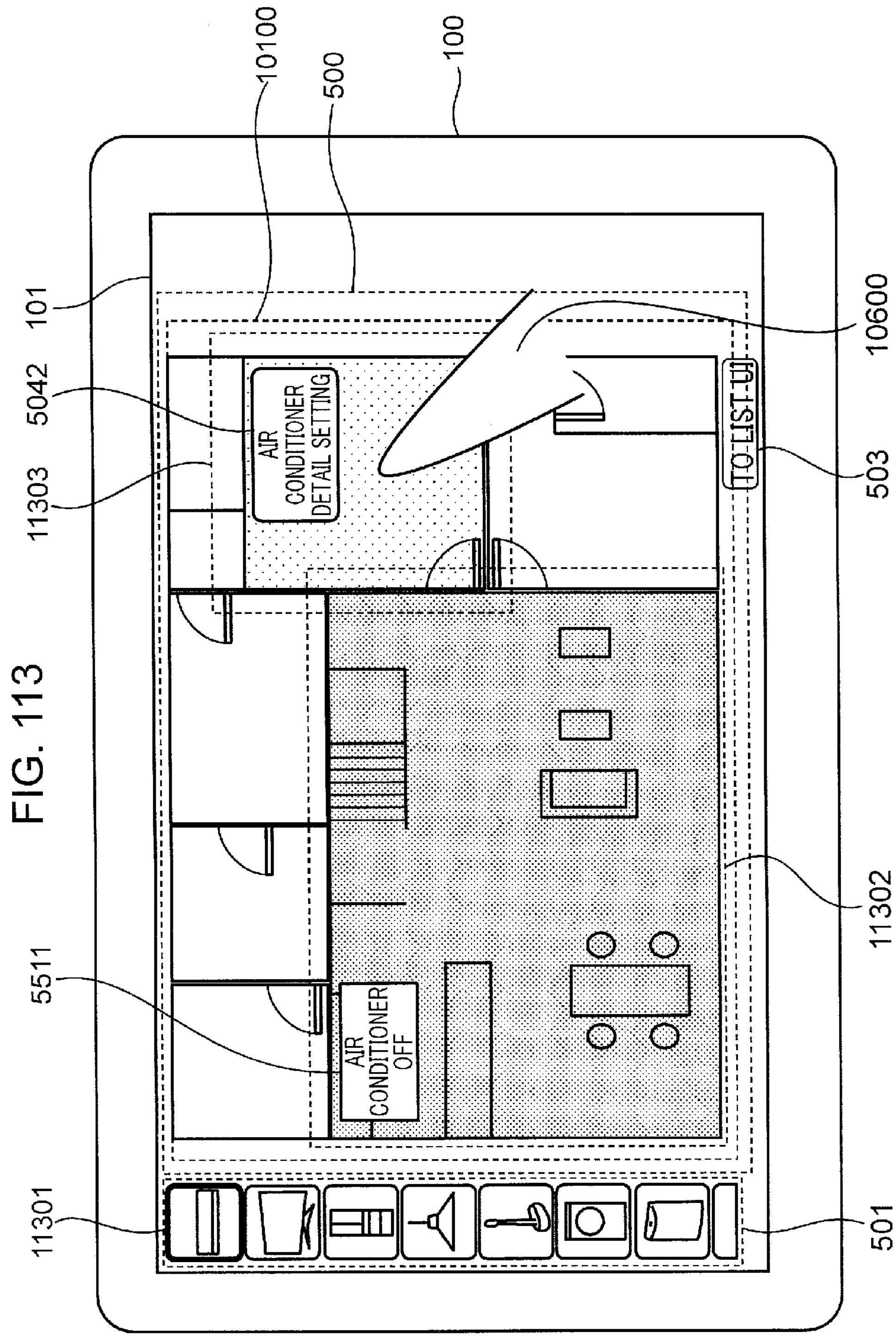
FIG. 113 is a diagram showing a control screen of an air conditioner including another display example of a detail setting button according to an embodiment of the present disclosure.
Figure 114:
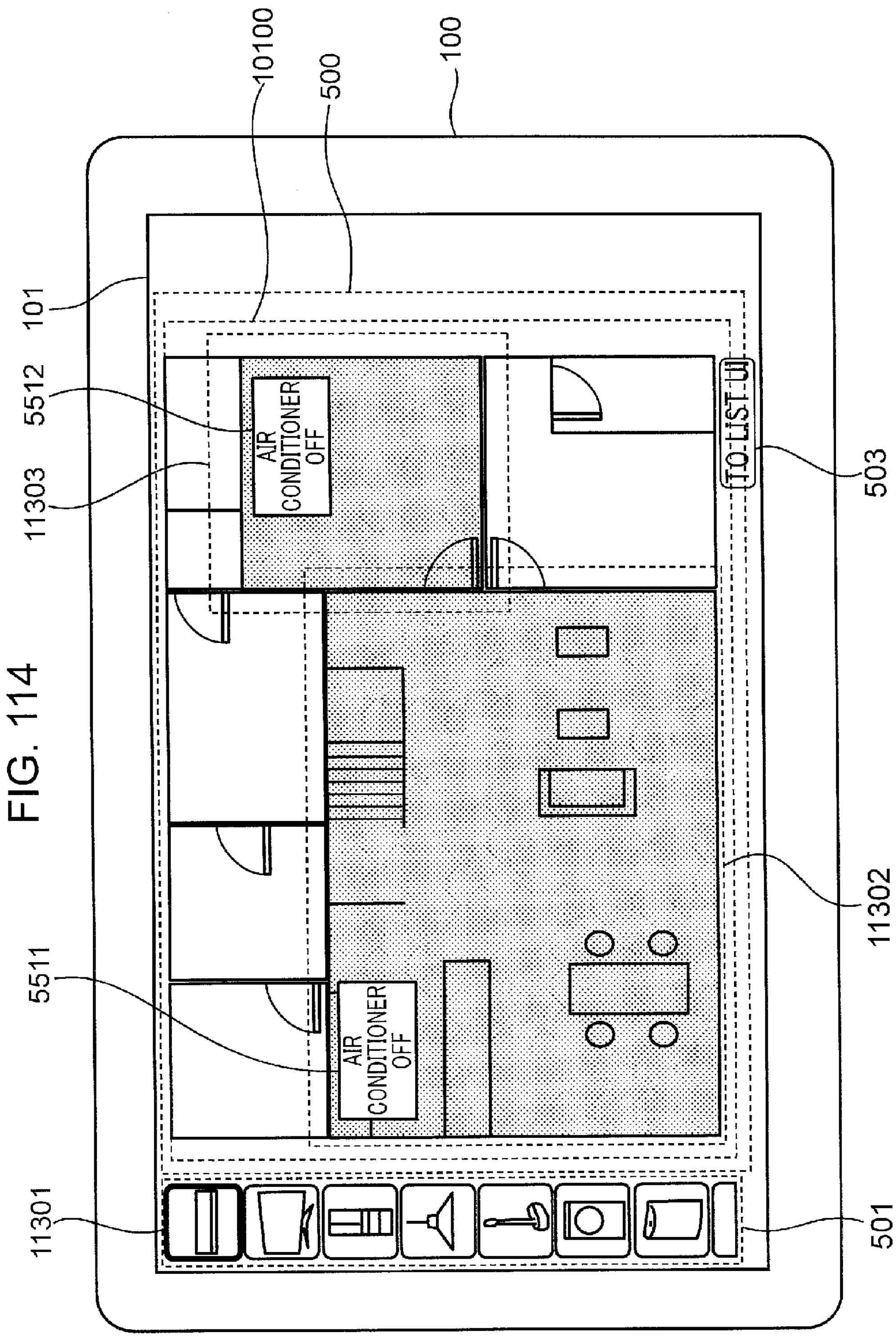
FIG. 114 is a diagram showing a control screen of an air conditioner including another display example of a detail setting button according to an embodiment of the present disclosure.
Figure 115:
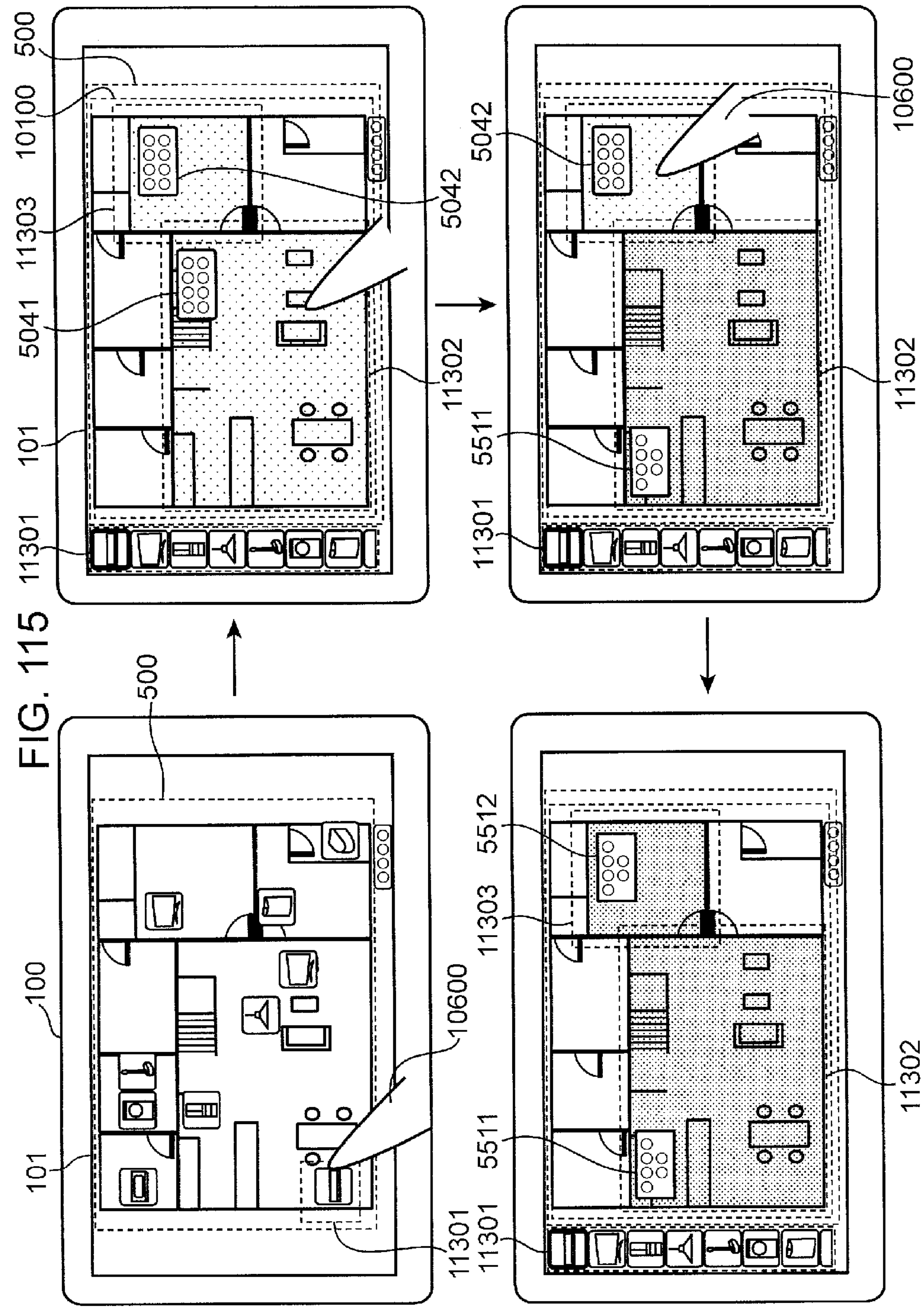
FIG. 115 is a diagram showing yet another example of transition of a display screen of a display of a home controller when one device icon of the air conditioner is used in common to control air conditioners in a plurality of rooms according to an embodiment of the present disclosure.

FIGS. 113 and 114 are diagrams showing the control screen 10100 of the air conditioner including another display example of a detail setting button. FIG. 115 is a diagram showing yet another example of a transition of a display screen of the display 101 of the home controller 100 when one device icon of the air conditioner is used in common to control air conditioners in a plurality of rooms. An upper left diagram in FIG. 115 represents the basic screen shown in FIG. 80, an upper right diagram in FIG. 115 represents the display screen shown in FIG. 101, a lower right diagram in FIG. 115 represents the display screen shown in FIG. 113, and a lower left diagram in FIG. 115 represents the display screen shown in FIG. 114.

First, when the user selects the used-in-common device icon 11301 of the air conditioner using the contacting object 10600 on the basic screen shown in the upper left diagram in FIG. 115 (FIG. 80), the selection is sensed by the touch panel control section 102. Subsequently, the display control section 103 acquires status 1709 of each of the air conditioners of rooms (for example, the living room and the bedroom) which uses in common the used-in-common device icon 11301 of the air conditioner from the device list 1700 to be described later with reference to FIG. 144B. In this case, it is assumed that air conditioners in the living room and the bedroom are both operating in the heater mode. The display control section 103 moves the respective device icons as shown in the upper right diagram in FIG. 115 (FIG. 101) and displays the control screen 10100 of the air conditioner on the display 101.

Based on the acquired status 1709, the display control section 103 displays the first control target region 11302 of the air conditioner and the second control target region 11303 of the air conditioner in a warm color (for example, red) as shown in the upper right diagram in FIG. 115 (FIG. 101). Accordingly, it is shown that the room (for example, the living room) corresponding to the first control target region 11302 and the room (for example, the bedroom) corresponding to the second control target region 11303 are in an on state in the heater mode. In addition, the display control section 103 displays the detail setting button 5041 in the first control target region 11302 of the air conditioner and displays the detail setting button 5042 in the second control target region 11303 of the air conditioner.

Next, when the user selects the first control target region 11302 of the air conditioner using the contacting object 10600 in the display state shown in the upper right diagram in FIG. 115 (FIG. 101), the selection is sensed by the touch panel control section 102. Subsequently, as shown in FIG. 113 (the lower right diagram in FIG. 115), the display control section 103 displays the first control target region 11302 of the air conditioner darkly with brightness lower than the specified brightness. The display control section 103 displays the operation state display section 5511 including a description reading "air conditioner off" in the first control target region 11302 of the air conditioner. Accordingly, it is shown that the air conditioner of the room (for example, the living room) corresponding to the first control target region 11302 of the air conditioner has been turned off. The display control section 103 erases the detail setting button 5041 from the first control target region 11302 of the air conditioner.

The device control section 106 generates a control command (an example of the first on-off control command) for turning off the power of the air conditioner. The device control section 106 transmits the generated control command to the air conditioner in the living room (an example of the first room) corresponding to the first control target region 11302 via the communication control section 107 and the network.

Next, when the user selects the second control target region 11303 of the air conditioner using the contacting object 10600 in the display state shown in FIG. 113 (the lower right diagram in FIG. 115), the selection is sensed by the touch panel control section 102. Subsequently, as shown in FIG. 114 (the lower left diagram in FIG. 115), the display control section 103 displays the second control target region 11303 of the air conditioner darkly with brightness lower than the specified brightness. The display control section 103 displays the operation state display section 5512 including a description reading "air conditioner off" in the second control target region 11303 of the air conditioner. Accordingly, it is shown that the air conditioner of the room (for example, the bedroom) corresponding to the second control target region 11303 has been turned off. The display control section 103 erases the detail setting button 5042 from the second control target region 11303 of the air conditioner.

The device control section 106 generates a control command (an example of the second on-off control command) for turning off the power of the air conditioner. The device control section 106 transmits the generated control command to the air conditioner in the bedroom (an example of the second room) corresponding to the second control target region 11303 via the communication control section 107 and the network.

Figure 116:
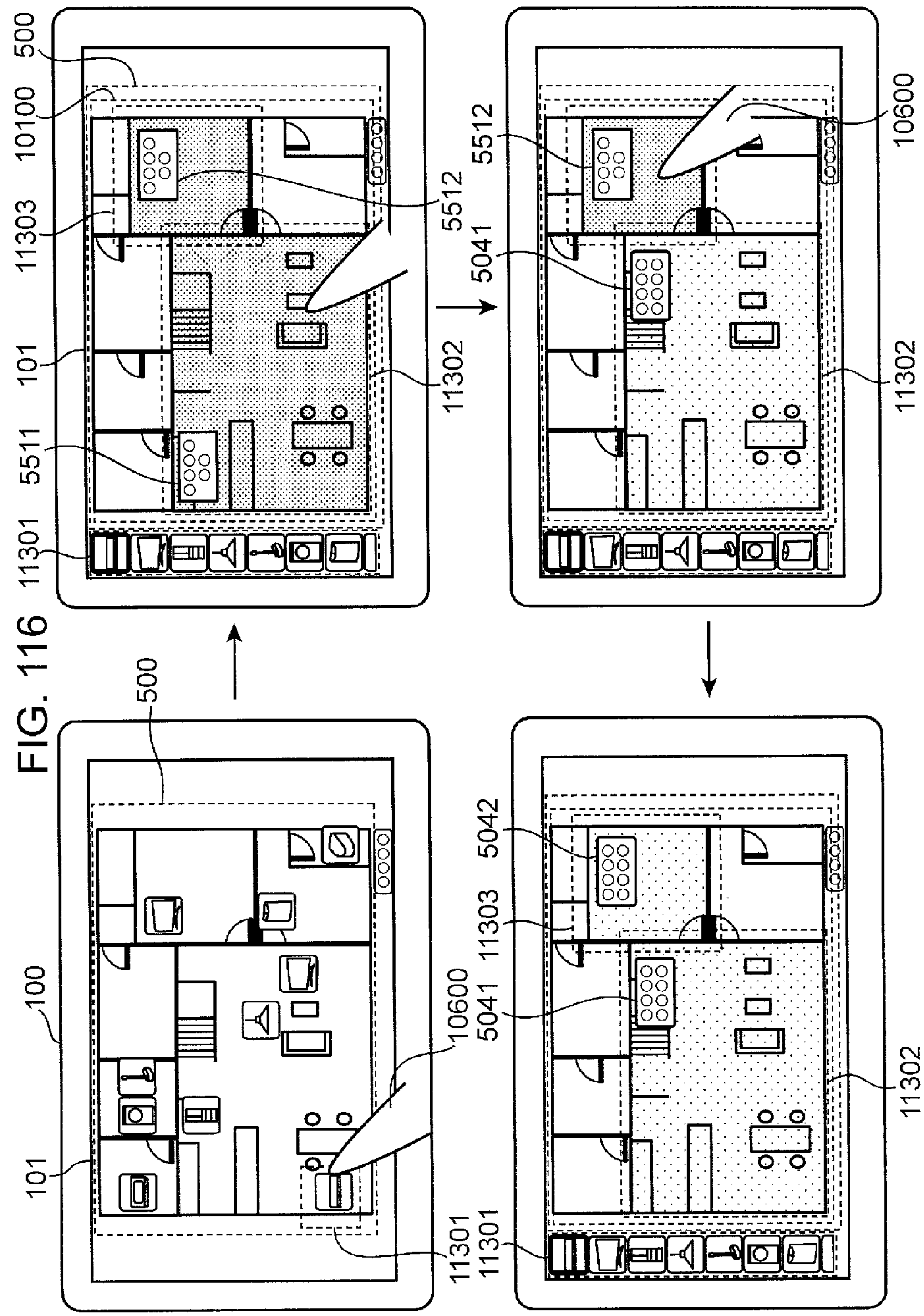
FIG. 116 is a diagram showing an example of transition that differs from FIG. 115 of a display screen of a display when one device icon of the air conditioner is used in common to control air conditioners in a plurality of rooms according to an embodiment of the present disclosure.

FIG. 116 is a diagram showing an example of a transition that differs from FIG. 115 of a display screen of the display 101 when one device icon of the air conditioner is used in common to control air conditioners in a plurality of rooms. An upper left diagram in FIG. 116 represents the basic screen shown in FIG. 80 and an upper right diagram, a lower right diagram, and a lower left diagram in FIG. 116 represent the control screen 10100 of the air conditioner.

First, when the user selects the used-in-common device icon 11301 of the air conditioner using the contacting object 10600 on the basic screen shown in the upper left diagram in FIG. 116 (FIG. 80), the selection is sensed by the touch panel control section 102. Subsequently, the display control section 103 acquires status 1709 of each of the air conditioners of rooms (for example, the living room and the bedroom) which uses in common the used-in-common device icon 11301 of the air conditioner from the device list 1700 to be described later with reference to FIG. 144B. In this case, it is assumed that both air conditioners in the living room and the bedroom have been turned off. The display control section 103 moves the respective device icons as shown in the upper right diagram in FIG. 116 and displays the control screen 10100 of the air conditioner on the display 101.

Based on the acquired status 1709, the display control section 103 displays the first control target region 11302 of the air conditioner and the second control target region 11303 of the air conditioner darkly with brightness lower than the specified brightness as shown in the upper right diagram in FIG. 116. In addition, the display control section 103 respectively displays the operation state display sections 5511 and 5512 including a description reading "air conditioner off" in the first control target region 11302 of the air conditioner and the second control target region 11303 of the air conditioner. Accordingly, it is shown that the air conditioners in the room (for example, the living room) corresponding to the first control target region 11302 and the room (for example, the bedroom) corresponding to the second control target region 11303 have been turned off.

Next, when the user selects the first control target region 11302 of the air conditioner using the contacting object 10600 in the display state shown in the upper right diagram in FIG. 116, the selection is sensed by the touch panel control section 102. Subsequently, based on the acquired status 1709, the display control section 103 determines that the air conditioner in the room (for example, the living room) corresponding to the first control target region 11302 of the air conditioner has been operating in the heater mode when the power of the air conditioner had previously been turned off. Based on this determination, the display control section 103 displays the first control target region 11302 of the air conditioner in a warm color (for example, red) as shown in the lower right diagram in FIG. 116. Accordingly, it is shown that the air conditioner of the room (for example, the living room) corresponding to the first control target region 11302 is operating in the heater mode. In addition, the display control section 103 displays the detail setting button 5041 in the first control target region 11302 of the air conditioner.

The device control section 106 generates a control command (an example of the first on-off control command) for turning on the power of the air conditioner. The device control section 106 transmits the generated control command to the air conditioner in the living room (an example of the first room) corresponding to the first control target region 11302 via the communication control section 107 and the network.

Next, when the user selects the second control target region 11303 of the air conditioner using the contacting object 10600 in the display state shown in the lower right diagram in FIG. 116, the selection is sensed by the touch panel control section 102. Subsequently, based on the acquired status 1709, the display control section 103 determines that the air conditioner in the room (for example, the bedroom) corresponding to the second control target region 11303 of the air conditioner has been operating in the heater mode when the power of the air conditioner had previously been turned off. Based on this determination, the display control section 103 displays the second control target region 11303 of the air conditioner in a warm color (for example, red) as shown in the lower left diagram in FIG. 116. Accordingly, it is shown that the air conditioner of the room (for example, the bedroom) corresponding to the second control target region 11303 is operating in the heater mode. In addition, the display control section 103 displays the detail setting button 5042 in the second control target region 11303 of the air conditioner.

The device control section 106 generates a control command (an example of the second on-off control command) for turning on the power of the air conditioner. The device control section 106 transmits the generated control command to the air conditioner in the bedroom (an example of the second room) corresponding to the second control target region 11303 via the communication control section 107 and the network.

Figure 117:
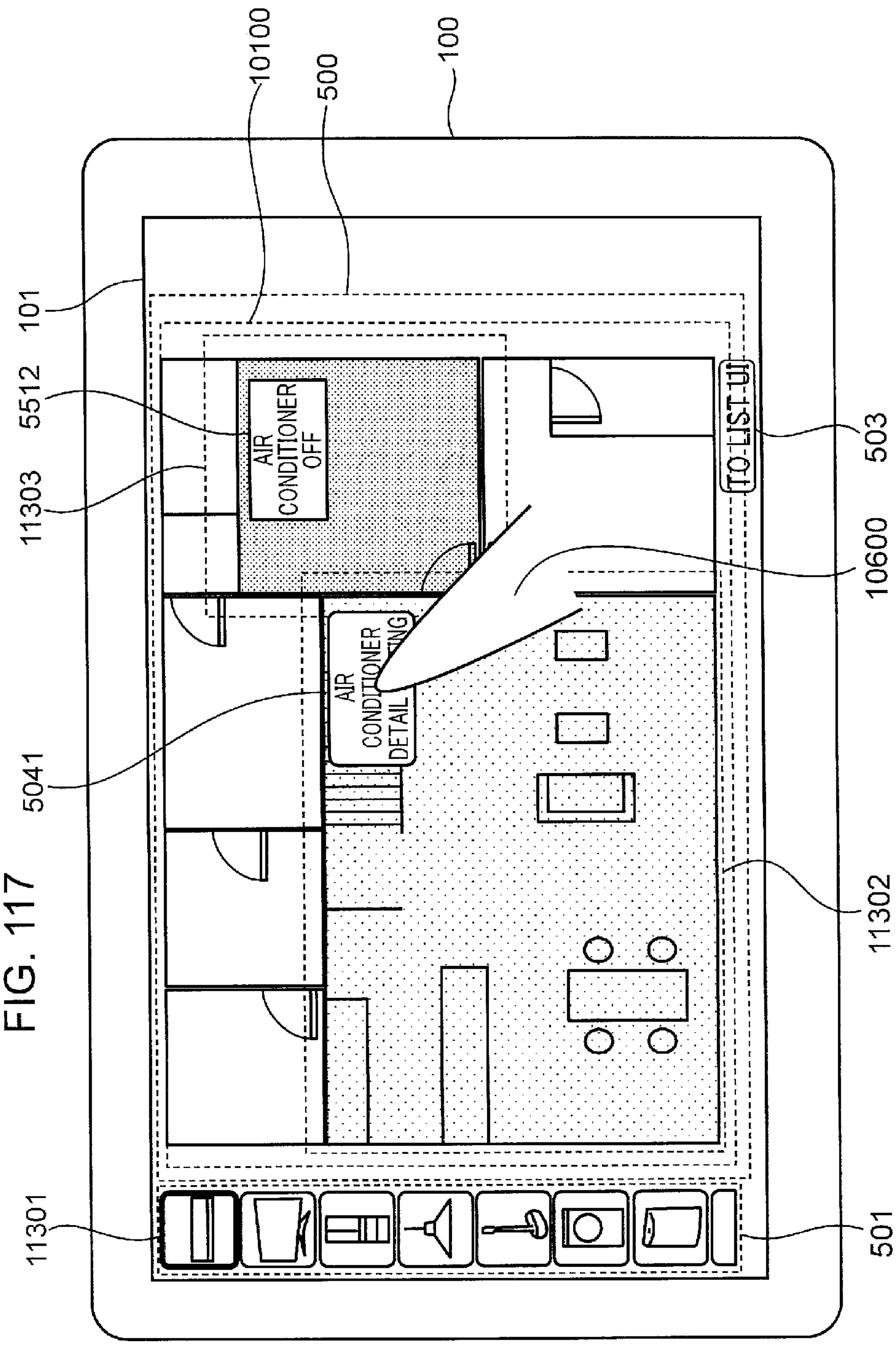
FIG. 117 is a diagram showing a control screen of an air conditioner including another display example of a detail control screen according to an embodiment of the present disclosure.
Figure 118:
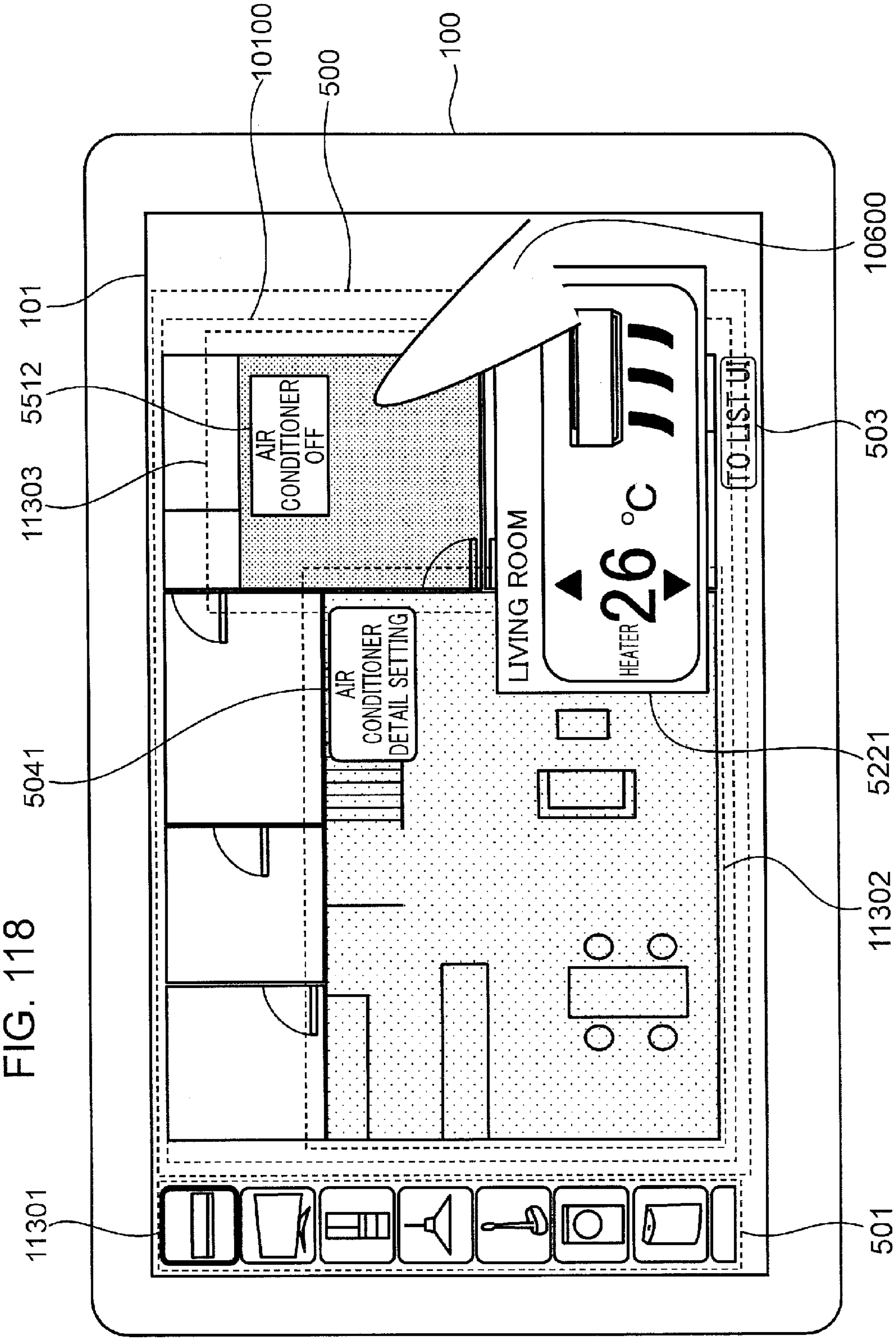
FIG. 118 is a diagram showing a control screen of an air conditioner including another display example of a detail control screen according to an embodiment of the present disclosure.
Figure 119:
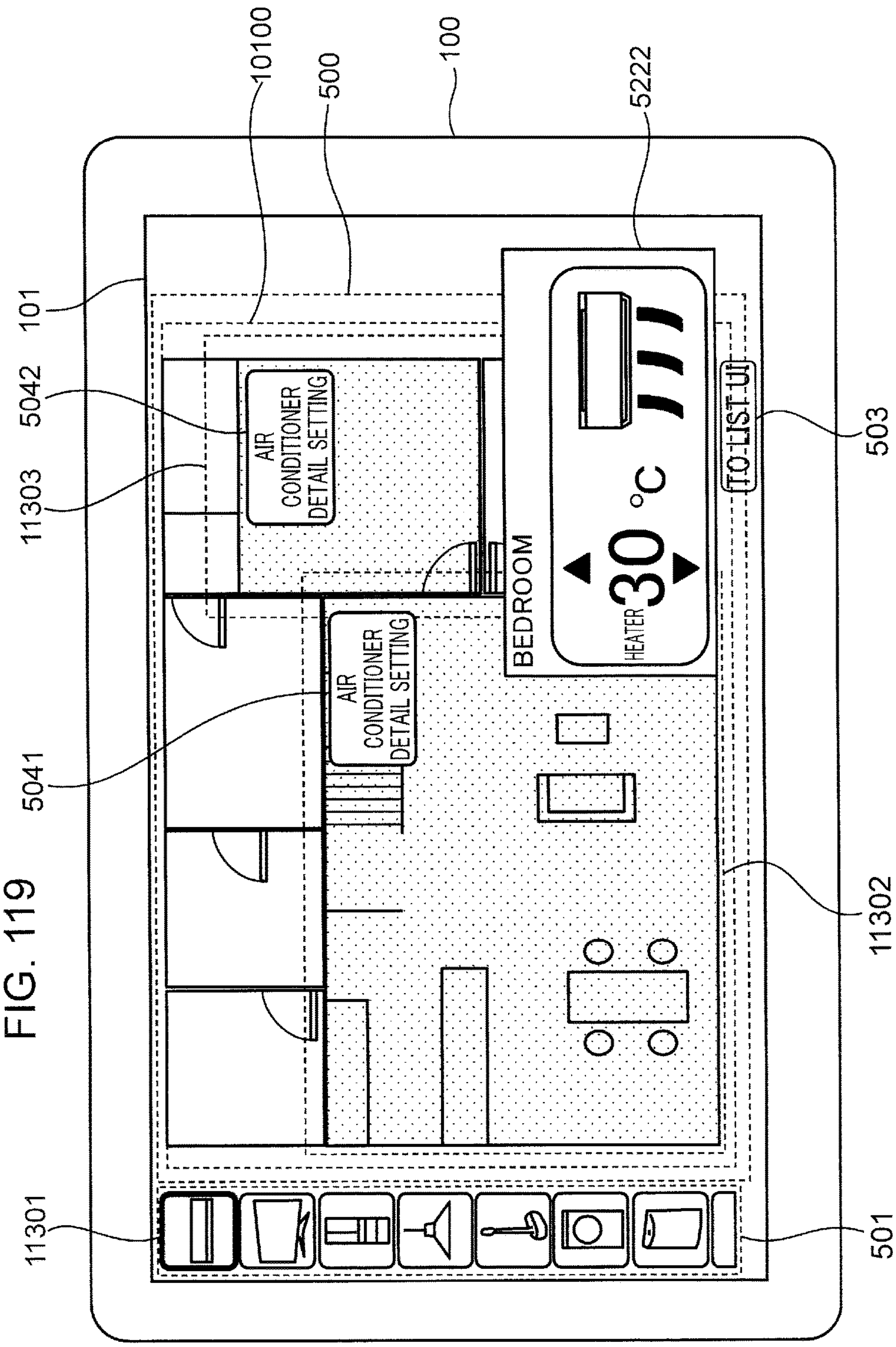
Figure 120:
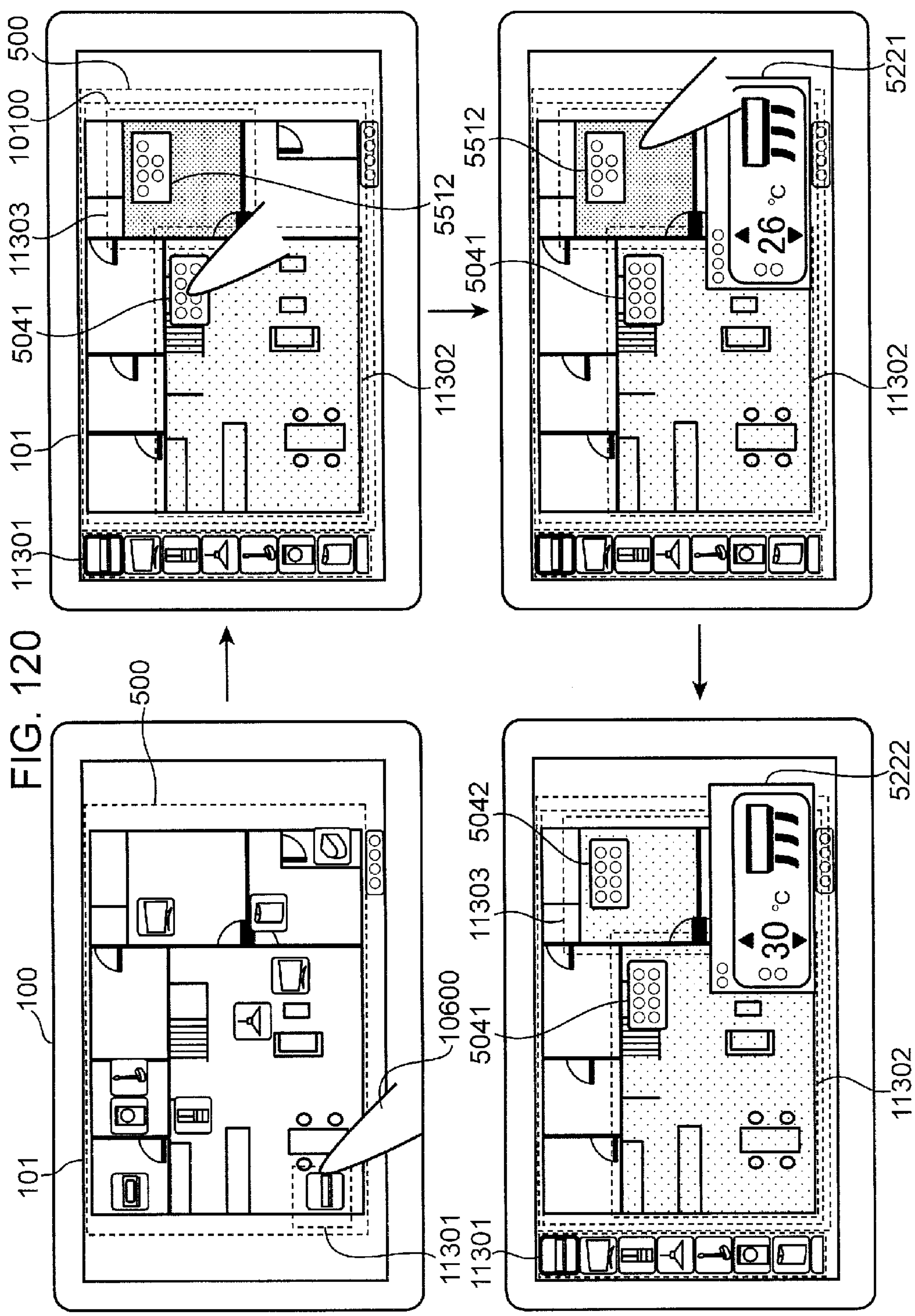

FIGS. 117 to 119 are diagrams showing the control screen 10100 of the air conditioner including another display example of a detail control screen. FIG. 120 is a diagram showing yet another example of a transition of a display screen of the display 101 when one device icon of the air conditioner is used in common to control air conditioners in a plurality of rooms. An upper left diagram in FIG. 120 represents the basic screen shown in FIG. 80, an upper right diagram in FIG. 120 represents the display screen shown in FIG. 117, a lower right diagram in FIG. 120 represents the display screen shown in FIG. 118, and a lower left diagram in FIG. 120 represents the display screen shown in FIG. 119.

First, when the user selects the used-in-common device icon 11301 of the air conditioner using the contacting object 10600 on the basic screen shown in the upper left diagram in FIG. 120 (FIG. 80), the selection is sensed by the touch panel control section 102. Subsequently, the display control section 103 acquires status 1709 of each of the air conditioners of rooms (for example, the living room and the bedroom) which uses in common the used-in-common device icon 11301 of the air conditioner from the device list 1700 to be described later with reference to FIG. 144B. In this case, it is assumed that the air conditioner in the living room is operating in the heater mode and the air conditioner in the bedroom has been turned off. The display control section 103 moves the respective device icons as shown in the upper right diagram in FIG. 120 (FIG. 117) and displays the control screen 10100 of the air conditioner on the display 101.

Based on the acquired status 1709, the display control section 103 displays the first control target region 11302 of the air conditioner in a warm color (for example, red) as shown in the upper right diagram in FIG. 120 (FIG. 117). Accordingly, it is shown that the air conditioner of the room (for example, the living room) corresponding to the first control target region 11302 has been turned on in the heater mode. The display control section 103 displays the detail setting button 5041 in the first control target region 11302 of the air conditioner.

The display control section 103 displays the second control target region 11303 of the air conditioner darkly with brightness lower than the specified brightness. In addition, the display control section 103 displays the operation state display section 5512 including a description reading "air conditioner off" in the second control target region 11303 of the air conditioner. Accordingly, it is shown that the air conditioner of the room (for example, the bedroom) corresponding to the second control target region 11303 has been turned off.

Next, when the user selects the detail setting button 5041 that is displayed in the first control target region 11302 of the air conditioner using the contacting object 10600 in the display state shown in the upper right diagram in FIG. 120 (FIG. 117), the selection is sensed by the touch panel control section 102. Consequently, as shown in FIG. 118 (the lower right diagram in FIG. 120), the display control section 103 displays the detail control screen 5221 of the room (for example, the living room) corresponding to the first control target region 11302 on the display 101.

Next, when the user selects the second control target region 11303 of the air conditioner using the contacting object 10600 in the display state shown in FIG. 118 (the lower right diagram in FIG. 120), the selection is sensed by the touch panel control section 102. Subsequently, based on the acquired status 1709, the display control section 103 determines that the air conditioner in the room (for example, the bedroom) corresponding to the second control target region 11303 of the air conditioner has been operating in the heater mode when the power of the air conditioner had previously been turned off. Based on this determination, the display control section 103 displays the second control target region 11303 of the air conditioner in a warm color (for example, red) as shown in FIG. 119 (the lower left diagram in FIG. 120). Accordingly, it is shown that the air conditioner of the room (for example, the bedroom) corresponding to the second control target region 11303 is operating in the heater mode.

The display control section 103 erases the operation state display section 5512 including a description reading "air conditioner off" from the second control target region 11303 of the air conditioner. In addition, the display control section 103 displays the detail setting button 5042 in the second control target region 11303 of the air conditioner. Furthermore, the display control section 103 displays the detail control screen 5222 of the room (for example, the bedroom) corresponding to the second control target region 11303 of the air conditioner on the display 101 in place of the detail control screen 5221.

The device control section 106 generates a control command (an example of the first on-off control command) for turning on the power of the air conditioner. The device control section 106 transmits the generated control command to the air conditioner in the bedroom (an example of the first room) corresponding to the second control target region 11303 via the communication control section 107 and the network.

As described above, in the example of transition of a display screen shown in FIGS. 117 to 120, when the user selects the second control target region 11303, the display control section 103 displays the detail control screen 5222 corresponding to the second control target region 11303 on the display 101. Therefore, the desired detail control screen 5222 can be displayed on the display 101 without having to select the detail setting button 5042 of the second control target region 11303.

In addition, the display control section 103 displays the detail control screen 5222 corresponding to the second control target region 11303 on the display 101 in place of the detail control screen 5221 that is being displayed. Therefore, a situation where the display screen becomes cluttered by both the detail control screen 5221 and the detail control screen 5222 being displayed on the display 101 can be avoided.

Figure 121:
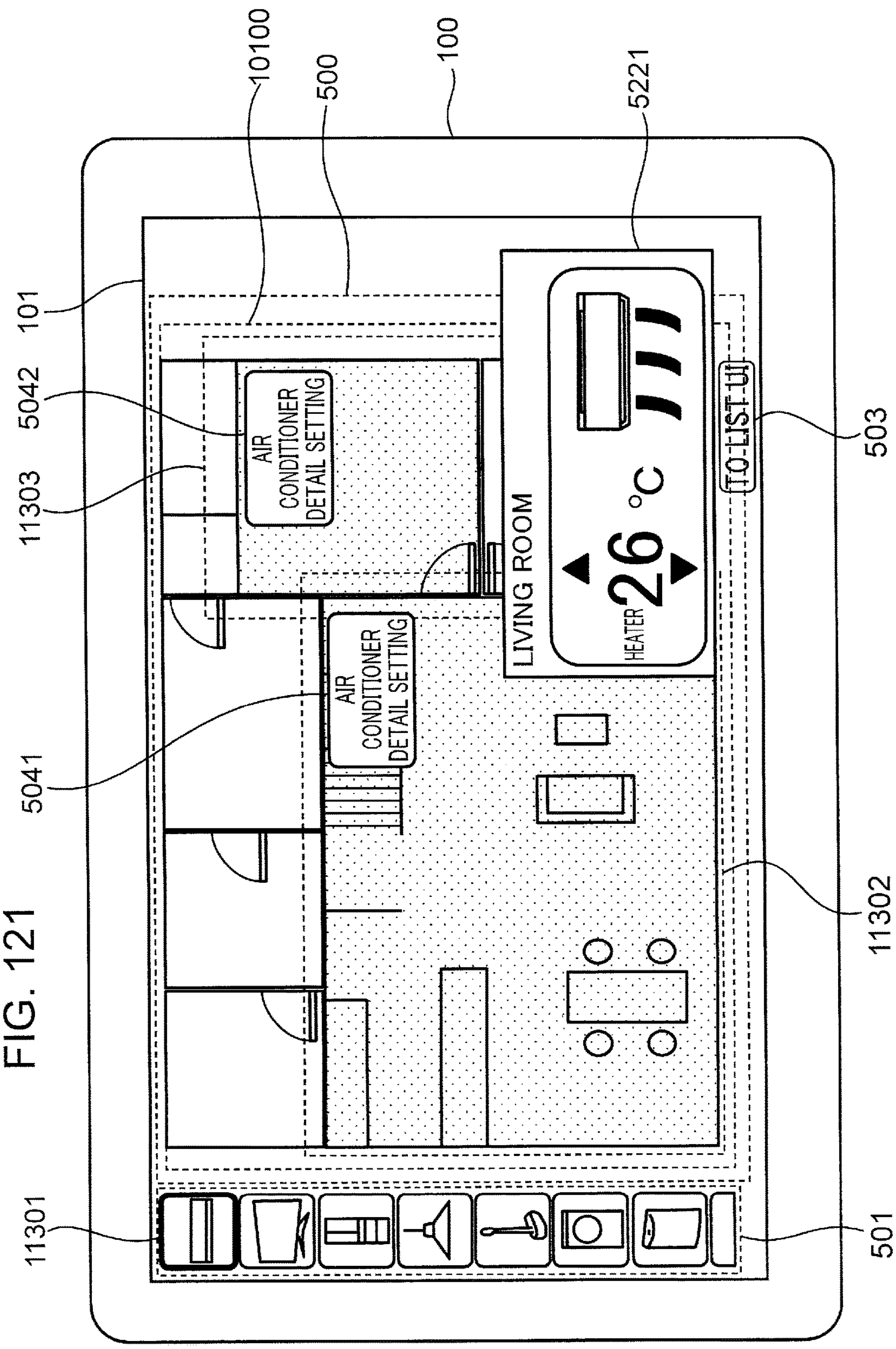

FIG. 121 is a diagram showing the control screen 10100 of the air conditioner including another display example of a detail control screen. In FIG. 121, the display control section 103 displays the detail control screen 5221 of the room corresponding to the first control target region 11302 on the display 101.

In the example of transition shown in FIG. 120, a transition is made from the display screen shown in FIG. 118 (the lower right diagram in FIG. 120) to the display screen shown in FIG. 119 (the lower left diagram in FIG. 120). Alternatively, a transition may be made from the display screen shown in FIG. 118 (the lower right diagram in FIG. 120) to the display screen shown in FIG. 121. In other words, instead of switching the detail control screen 5221 of the room corresponding to the first control target region 11302 to the detail control screen 5222 of the room corresponding to the second control target region 11303, the detail control screen 5221 may remain displayed on the display 101.

Even in this case, as shown in FIG. 121, the detail setting button 5042 is displayed in the second control target region 11303. Therefore, the detail control screen 5222 of the room corresponding to the second control target region 11303 can be displayed on the display 101 by selecting the detail setting button 5042.

Moreover, while the used-in-common device icon 11301 of the air conditioner is disposed on one of the rooms that are control targets in the description given above, the home controller 100 according to the present embodiment is not limited thereto.

Figure 122:
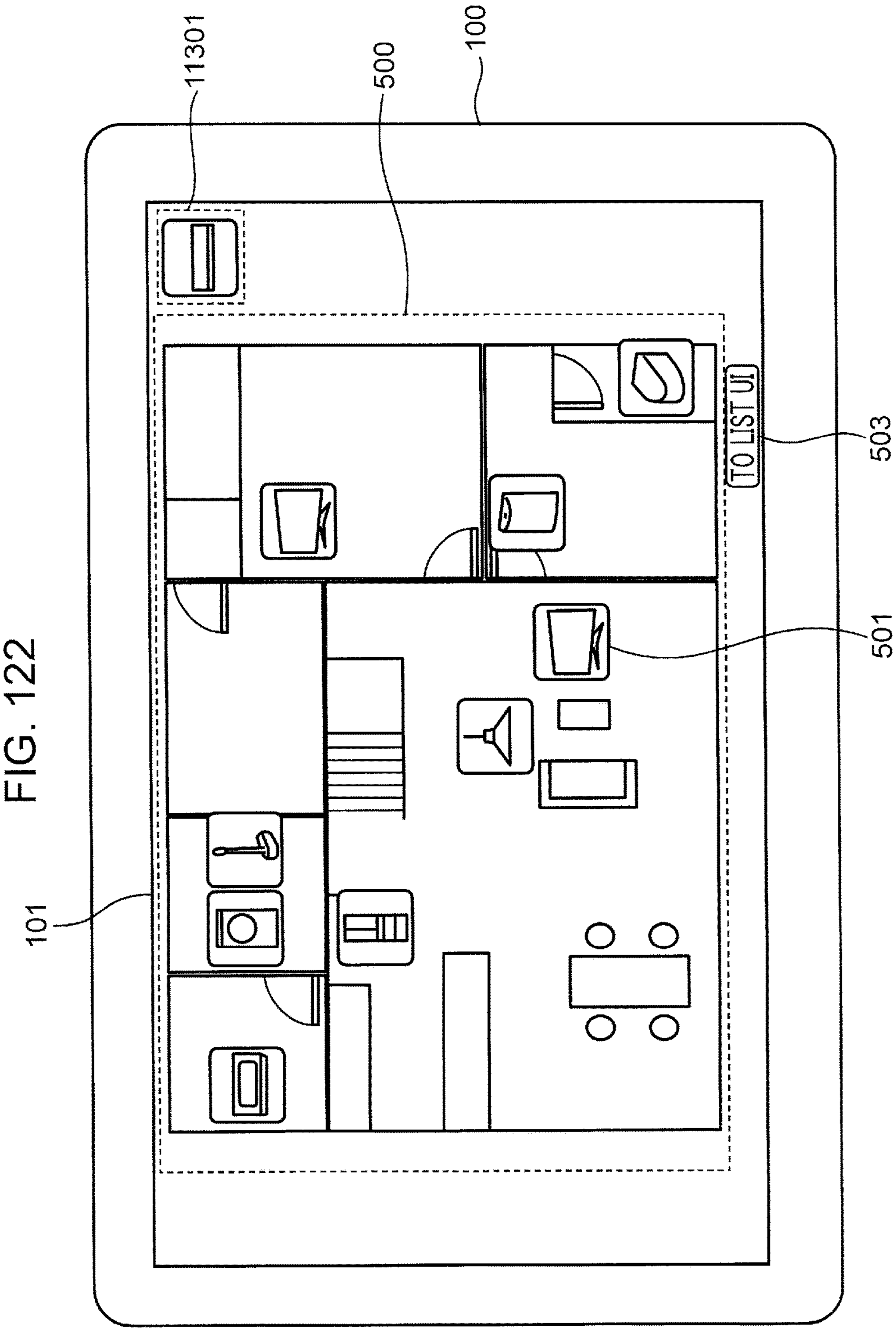

FIG. 122 is a diagram showing another example of arrangement of the used-in-common device icon 11301 of the air conditioner. In FIG. 122, the display control section 103 arranges the used-in-common device icon 11301 of the air conditioner outside of the display region of the floor plan 500. In particular, when the used-in-common device icon 11301 of the air conditioner is used in common to control the air conditioners of all of the rooms, as shown in FIG. 122, the display control section 103 favorably arranges the used-in-common device icon 11301 of the air conditioner outside of the display region of the floor plan 500. According to this arrangement, it can be shown that the used-in-common device icon 11301 of the air conditioner is used in common to control the air conditioners of all of the rooms instead of being limited to the control of a specific room.

Moreover, while the display control section 103 constructs the used-in-common device icon 11301 of the air conditioner using an image imitating an air conditioner in the description given above, alternatively, an icon constituted by characters reading, for example, "air conditioner mode" may be used. In addition, the icon constituted by characters reading "air conditioner mode" may be used in common to control the air conditioners of all of the rooms. In this manner, by adopting an icon constituted by characters reading "air conditioner mode", it can be shown that the air conditioners of all of the rooms can be controlled in the air conditioner mode.

(Control Screen of Television Set)

Figure 123:
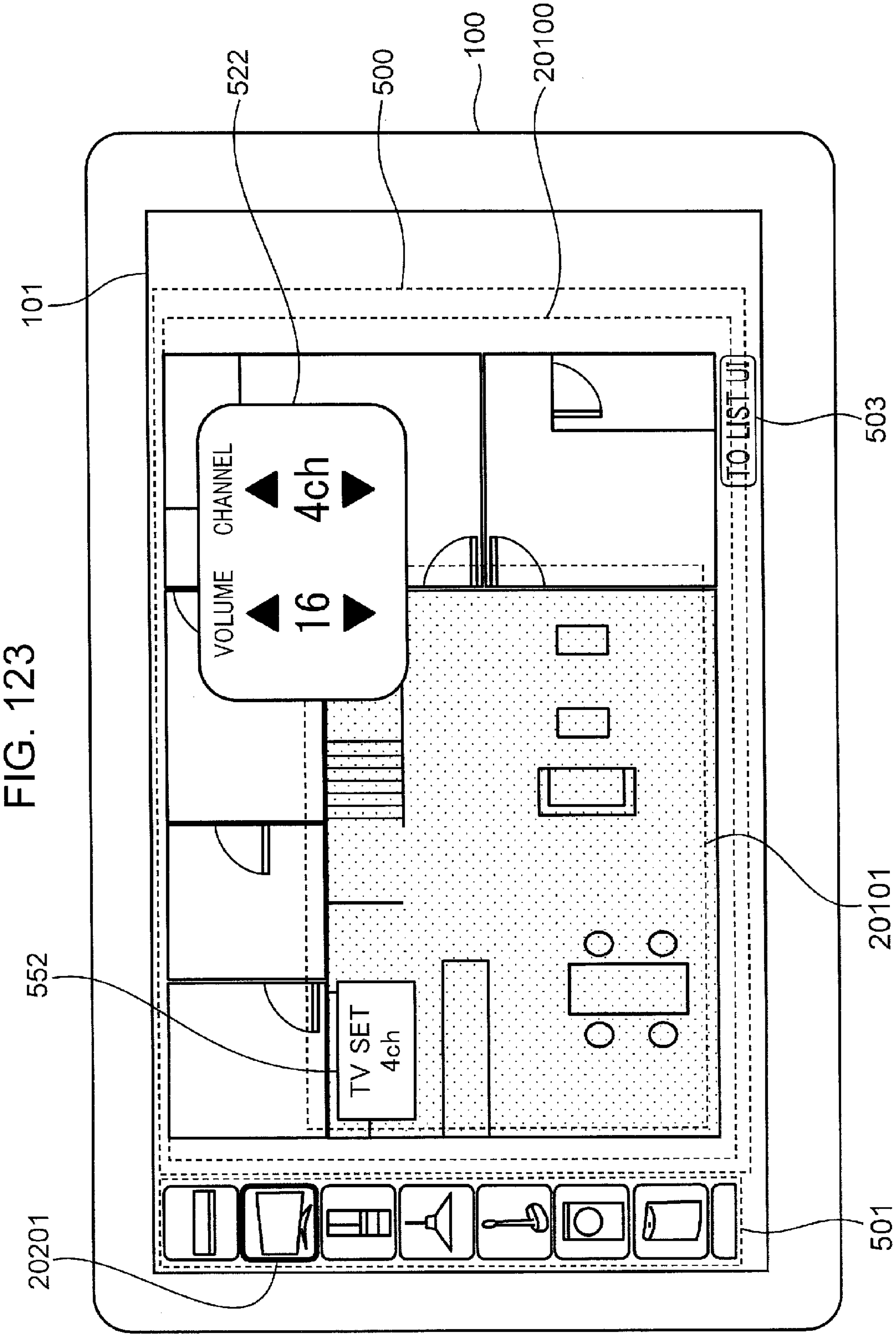
Figure 124:
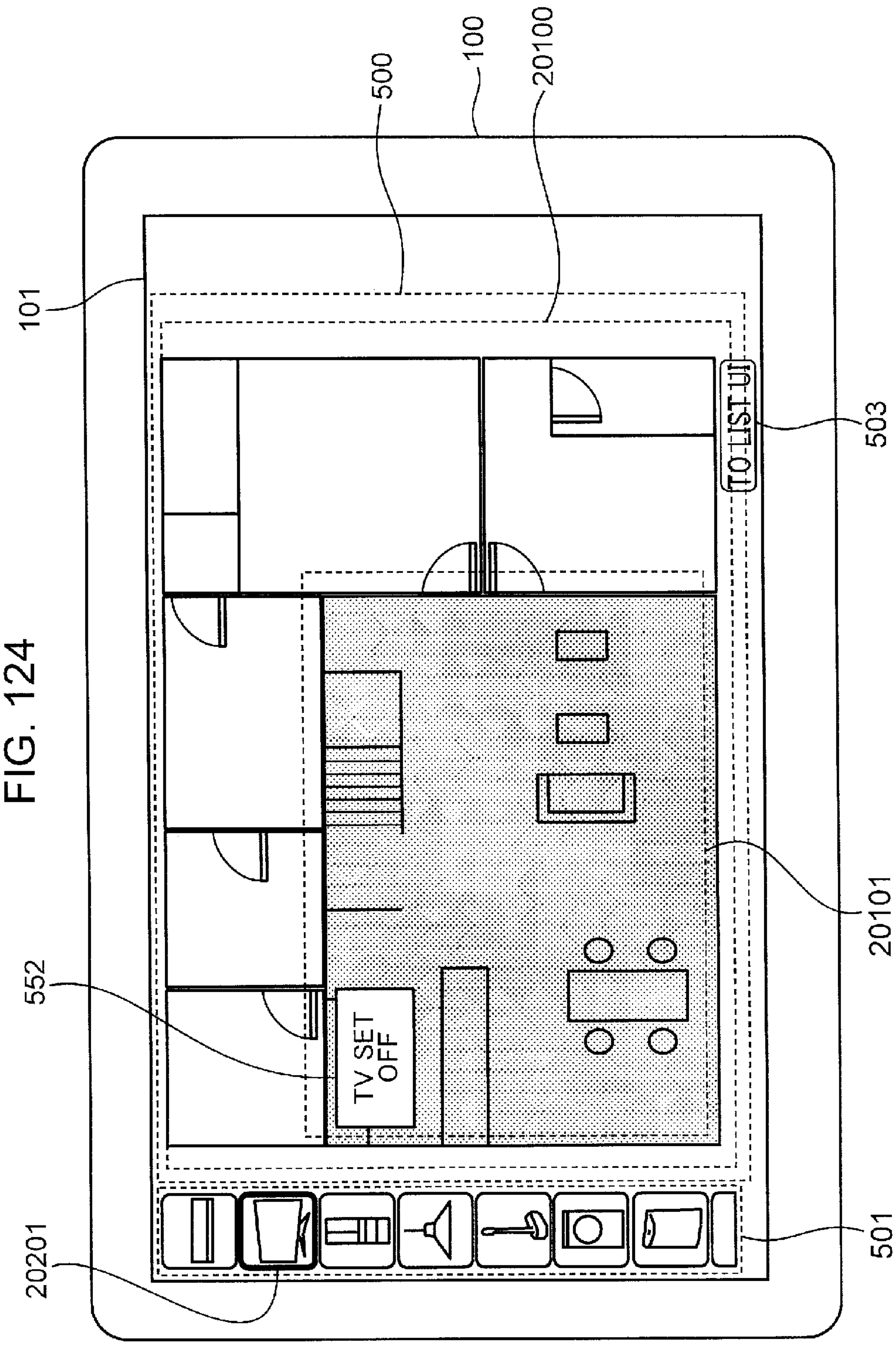
Figure 125:
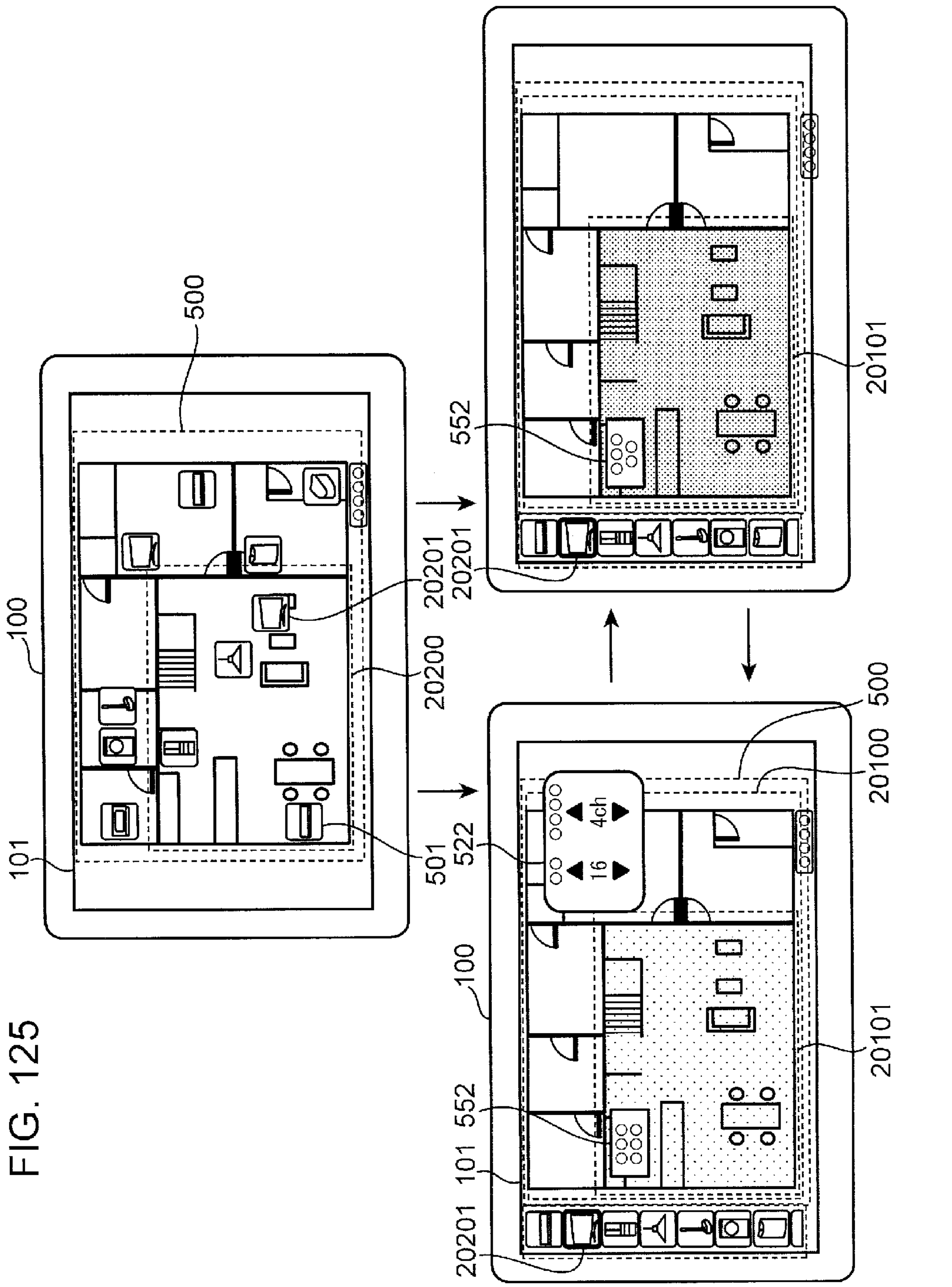

FIGS. 123 and 124 are diagrams showing an example of a control screen of a television set that is displayed on the display 101 of the home controller 100. FIG. 125 is a diagram showing an example of transition of a display screen of the display 101 of the home controller 100. An upper diagram in FIG. 125 represents the basic screen shown in FIG. 5, a lower left diagram in FIG. 125 represents the display screen shown in FIG. 123, and a lower right diagram in FIG. 125 represents the display screen shown in FIG. 124.

For example, as shown in the upper diagram in FIG. 125, the display control section 103 displays the basic screen including the floor plan 500, the device icons 501, and the like on the display 101 of the home controller 100. In this display state, when the user taps (selects) a device icon 20201 (corresponding to an example of the device icon representing the specific target device according to an aspect of the present disclosure) of a television set disposed in a room 20200 in which a television set is installed, the selection is sensed by the touch panel control section 102. Subsequently, the display control section 103 acquires status 1709 of the television set of the room 20200 (for example, the living room) from the device list 1700 to be described later with reference to FIG. 144B. Based on information of the acquired status 1709, the display control section 103 displays a control screen 20100 of a television set on the display 101 as shown in, for example, FIG. 123 (the lower left diagram in FIG. 125) and FIG. 124 (the lower right diagram in FIG. 125). Moreover, in the present embodiment, the room 10200 in which the air conditioner is installed and the room 20200 in which the television set is installed are the same room (for example, the living room).

In this control of the television set, as shown in FIGS. 123 to 125, the floor plan 500 and the control screen 20100 of the television set share the same display content in a similar manner to the control of the air conditioner. In other words, when the user selects the device icon 20201 of the television set, the floor plan 500 also functions as the control screen 20100 of the television set.

For example, on the basic screen represented by the upper diagram in FIG. 125, when the user selects the device icon 20201 of the television set that is disposed in the room 20200 in which the television set is installed, the selection is sensed by the touch panel control section 102. As a result, the display control section 103 displays the control screen 20100 of the television set on the display 101. Therefore, as shown in FIGS. 123 to 125, a control target region 20101 of a television set that is included in the control screen 20100 of the television set is a region corresponding to the room 20200 in which the television set is installed.

In addition, when the user selects the device icon 20201 of the television set in the basic screen display state (for example, the upper diagram in FIG. 125), the selection is sensed by the touch panel control section 102. Consequently, as described above, the display control section 103 moves the device icons 501 out of the display region of the control screen 20100 of the television set (the floor plan 500) as shown in FIG. 123 (the lower left diagram in FIG. 125) and FIG. 124 (the lower right diagram in FIG. 125). In the example shown in FIG. 123 (the lower left diagram in FIG. 125) and FIG. 124 (the lower right diagram in FIG. 125), the device icons 501 are aligned in a single vertical column at a left end in the display screen of the display 101 so as to avoid the display region of the floor plan 500. In addition, for example, in the example shown in FIG. 123, the selected device icon 20201 of the television set is displayed enclosed in a bold frame or the like in a similar manner to the device icon 10201 of the air conditioner described earlier so as to be distinguished from unselected device icons.

When the acquired status 1709 indicates that the television set in the room 20200 (for example, the living room) is operating, the display control section 103 displays the control target region 20101 of the television set brightly with brightness not lower than the specified brightness as shown in FIG. 123 (the lower left diagram in FIG. 125).

The display control section 103 displays an operation state display section 552 in the control target region 20101 of the television set. For example, when the acquired status 1709 indicates that the television set is tuned in channel 4, the display control section 103 displays the operation state display section 552 including a description reading "television set 4 ch" in the control target region 20101 of the television set as shown in FIG. 123.

When the acquired status 1709 indicates that the television set in the room 20200 (for example, the living room) is operating, the display control section 103 further displays a detail control screen 522 on the display 101. The detail control screen 522 is configured in a similar manner to the device control screen 2403 (FIG. 27). Specifically, the detail control screen 522 includes descriptions reading "volume" and "channel".

A numerical value described in correspondence to "volume" represents a current volume of the television set. A button shaped in an upward-pointing triangle which is described in correspondence to "volume" is a higher volume button and a button shaped in a downward-pointing triangle is a lower volume button. When the higher volume button is tapped once, the volume of the television set is increased by a prescribed level (for example, 1 notch), and when the lower volume button is tapped once, the volume of the television set is reduced by a prescribed level (for example, 1 notch).

A numerical value described in correspondence to "channel" represents a channel to which the television set is currently set. A button shaped in an upward-pointing triangle which is described in correspondence to "channel" is a higher channel button and a button shaped in a downward-pointing triangle is a lower channel button. When the higher channel button is tapped once, the channel of the television set is increased by, for example, one channel, and when the lower channel button is tapped once, the channel of the television set is reduced by, for example, one channel.

When the user taps (selects) the lower volume button, the higher volume button, the higher channel button, or the lower channel button, the selection is sensed by the touch panel control section 102. Subsequently, the device control section 106 generates a control command based on a sensing result of the touch panel control section 102. The device control section 106 transmits the generated control command to the television set in the room 20200 (for example, the living room) via the communication control section 107 and the network.

On the other hand, when the acquired status 1709 indicates that the television set in the room 20200 (for example, the living room) has been turned off, the display control section 103 displays the control target region 20101 of the television set darkly with brightness lower than the specified brightness as shown in FIG. 124 (the lower right diagram in FIG. 125). The display control section 103 displays the operation state display section 552 including a description reading "television set off" in the control target region 20101 of the television set. Accordingly, it is shown that the television set of the room (for example, the living room) corresponding to the control target region 20101 of the television set has been turned off.

When the user selects the control target region 20101 of the television set in a display state shown in FIG. 123 (the lower left diagram in FIG. 125), the selection is sensed by the touch panel control section 102. Subsequently, as shown in FIG. 124 (the lower right diagram in FIG. 125), the display control section 103 displays the control target region 20101 of the television set darkly with brightness lower than the specified brightness. The display control section 103 erases the detail control screen 522 from the display 101. The display control section 103 displays the operation state display section 552 including a description reading "television set off" in the control target region 20101 of the television set.

The device control section 106 generates a control command (an example of the on-off control command) for turning off the power of the television set. The device control section 106 transmits the generated control command to the television set in the room 20200 (for example, the living room) via the communication control section 107 and the network. As described above, in the example of transition of a display screen shown in FIGS. 124 and 125, when the television set is turned off, the detail control screen 522 is erased from the display 101.

When the user taps (selects) the device icon 20201 of the television set or the outside of the control target region 20101 of the television set (for example, a display region of the floor plan 500 that is outside the display region of the control target region 20101 of the television set) in the display state shown in the lower left diagram or the lower right diagram in FIG. 125, the selection is sensed by the touch panel control section 102. Subsequently, the display control section 103 restores the display screen of the display 101 to the basic screen display state (the upper diagram in FIG. 125).

In FIG. 123 (the lower left diagram in FIG. 125) and FIG. 124 (the lower right diagram in FIG. 125), the display control section 103 displays the operation state display section 552 in the control target region 20101 of the television set. Therefore, whether or not the television set is operating can be clearly shown.

Figure 126:
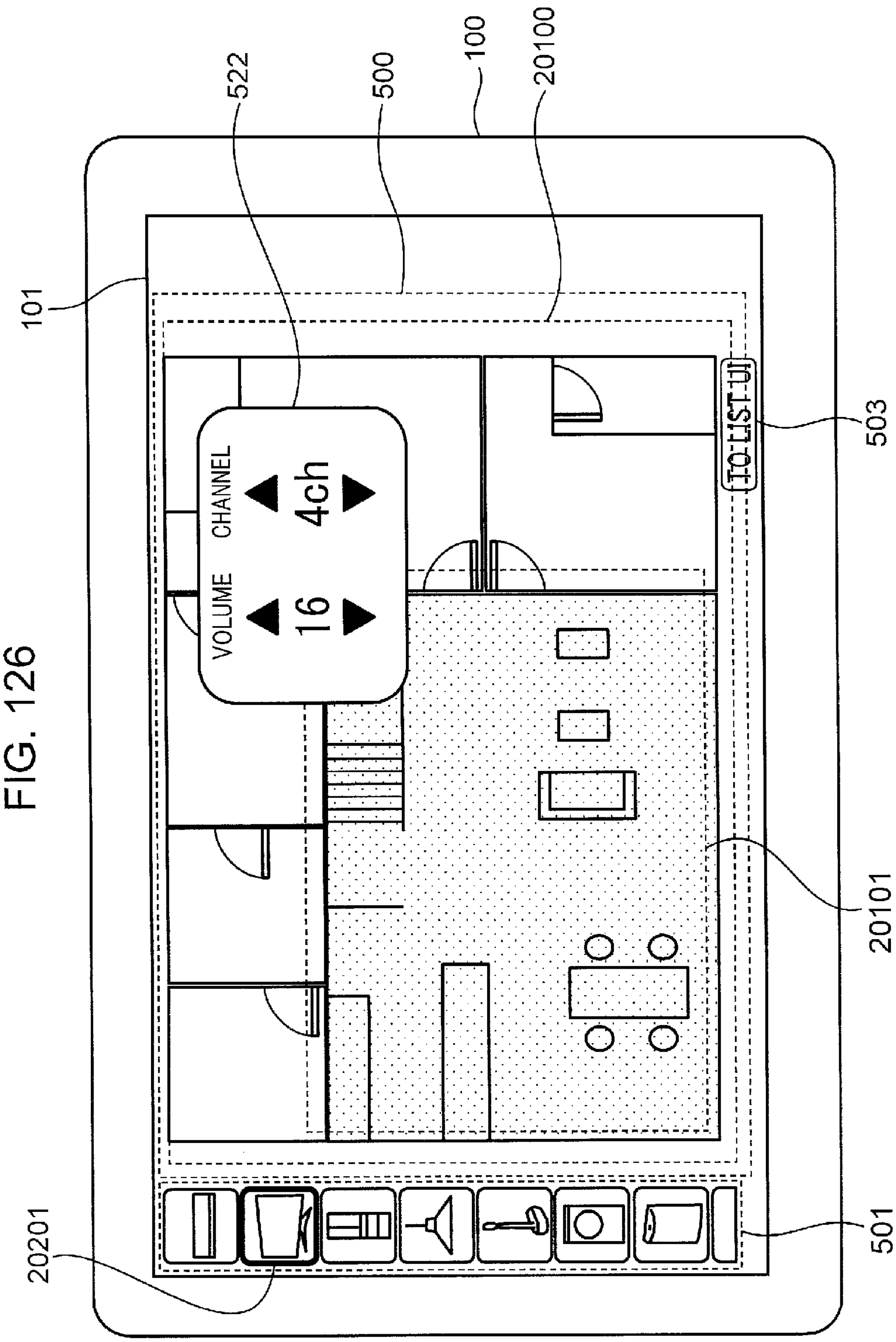
Figure 127:
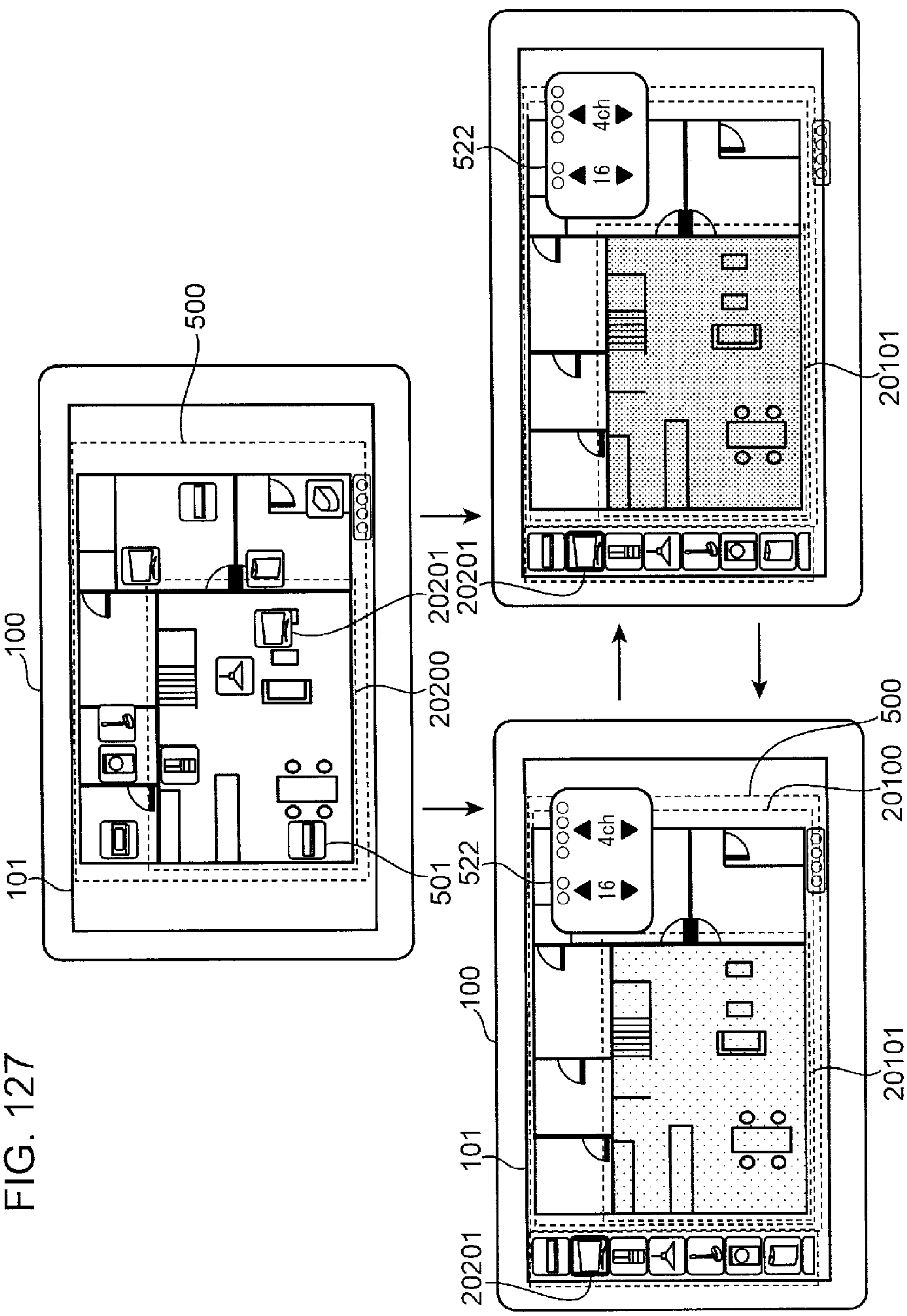

FIG. 126 is a diagram showing another example of a control screen of a television set that is displayed on the display 101. FIG. 127 is a diagram showing an example of transition of the display 101 including the display screen shown in FIG. 126. An upper diagram in FIG. 127 represents the basic screen shown in FIG. 5 and a lower left diagram in FIG. 127 represents the display screen shown in FIG. 126.

When the user selects the device icon 20201 of the television set that is disposed in the room 20200 in which the television set is installed in a state where the basic screen represented by the upper diagram in FIG. 127 (FIG. 5) is being displayed, the selection is sensed by the touch panel control section 102. Subsequently, the display control section 103 acquires status 1709 of the television set of the room 20200 (for example, the living room) from the device list 1700 to be described later with reference to FIG. 144B.

When the acquired status 1709 indicates that the television set in the room 20200 (for example, the living room) is operating, the display control section 103 displays the control target region 20101 of the television set brightly with brightness not lower than the specified brightness as shown in FIG. 126 (the lower left diagram in FIG. 127). Accordingly, it is shown that the television set in the room 20200 (for example, the living room) is operating. Furthermore, the display control section 103 displays the detail control screen 522 of the television set on the display 101.

On the other hand, when the acquired status 1709 indicates that the television set in the room 20200 (for example, the living room) has been turned off, the display control section 103 displays the control target region 20101 of the television set darkly with brightness lower than the specified brightness as shown in the lower right diagram in FIG. 127. Accordingly, it is shown that the television set of the room (for example, the living room) corresponding to the control target region 20101 of the television set has been turned off. Furthermore, the display control section 103 displays the detail control screen 522 of the television set on the display 101.

When the user selects the control target region 20101 of the television set in a display state shown in FIG. 126 (the lower left diagram in FIG. 127), the selection is sensed by the touch panel control section 102. Subsequently, as shown in the lower right diagram in FIG. 127, the display control section 103 displays the control target region 20101 of the television set darkly with brightness lower than the specified brightness.

The device control section 106 generates a control command (an example of the on-off control command) for turning off the power of the television set. The device control section 106 transmits the generated control command to the television set in the room 20200 (for example, the living room) via the communication control section 107 and the network.

On the other hand, when the user selects the control target region 20101 of the television set in a display state shown in the lower right diagram in FIG. 127, the selection is sensed by the touch panel control section 102. Subsequently, as shown in FIG. 126 (the lower left diagram in FIG. 127), the display control section 103 displays the control target region 20101 of the television set brightly with brightness not lower than the specified brightness.

The device control section 106 generates a control command (an example of the on-off control command) for turning on the power of the television set. The device control section 106 transmits the generated control command to the television set in the room 20200 (for example, the living room) via the communication control section 107 and the network.

Figure 128:
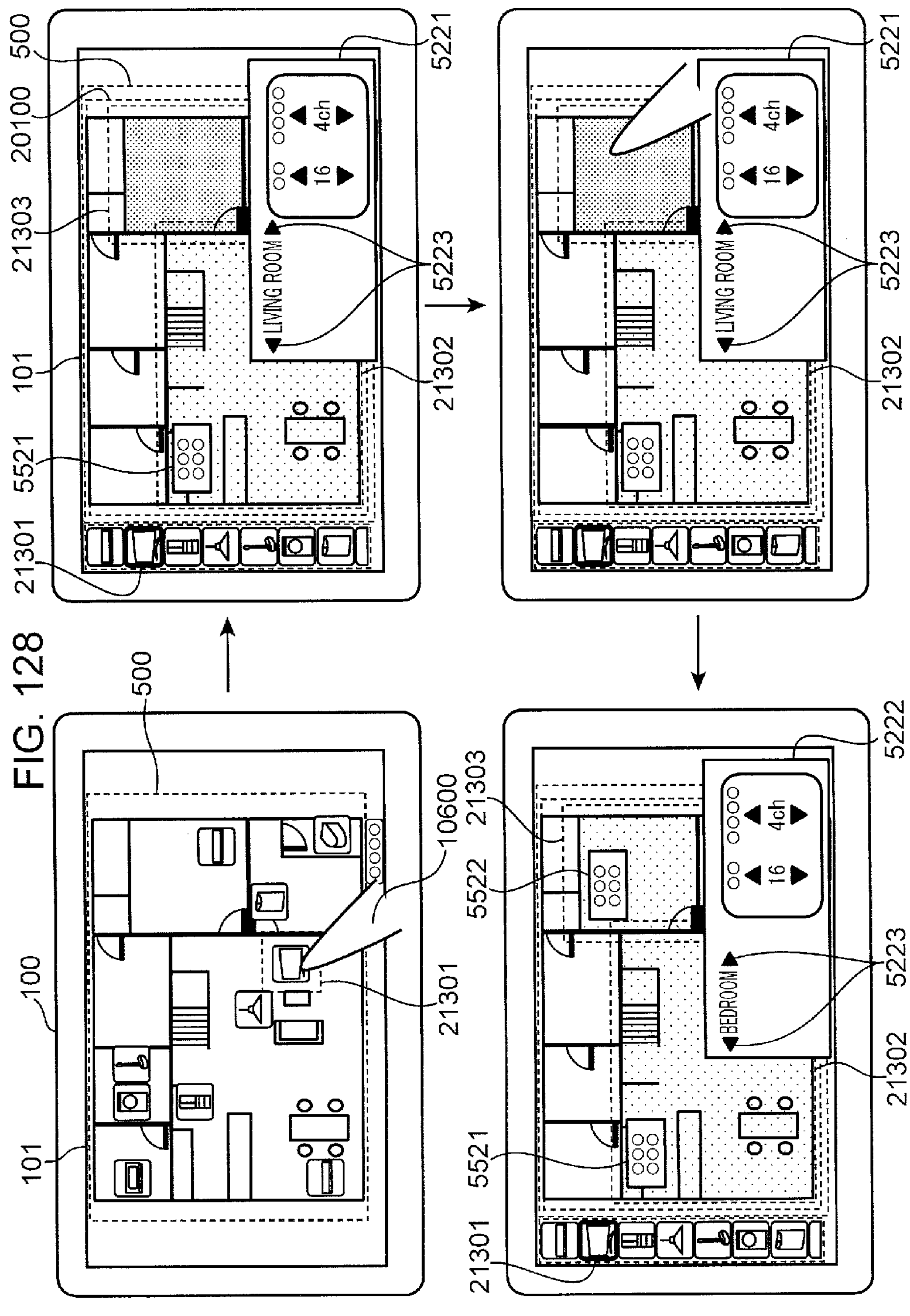

FIG. 128 is a diagram showing an example of a transition of a display screen of the display 101 when one device icon of the television set is used in common to control television sets in a plurality of rooms. An upper left diagram in FIG. 128 represents a basic screen displayed on the display 101 when the device icon of the television set is used in common. An upper right diagram, a lower right diagram, and a lower left diagram in FIG. 128 show the control screen 20100 of the television set.

In the basic screen shown in the upper left diagram in FIG. 128, a used-in-common device icon 21301 of a television set is displayed in the living room. In the present embodiment, the used-in-common device icon 21301 of the television set is also used by a television set in the bedroom. Therefore, the device icon of the television set is not displayed in the bedroom on the basic screen shown in the upper left diagram in FIG. 128.

When the user selects the used-in-common device icon 21301 of the television set using the contacting object 10600 on the basic screen shown in the upper left diagram in FIG. 128, the selection is sensed by the touch panel control section 102. Subsequently, the display control section 103 acquires status 1709 of the television set of the rooms (for example, the living room and the bedroom) which uses in common the used-in-common device icon 21301 of the television set from the device list 1700 to be described later with reference to FIG. 144B. In this case, it is assumed that the television set in the living room is operating with its "channel" tuned in to "4" and its "volume" set to "16" and that the power of the television set in the bedroom has been turned off. The display control section 103 moves the respective device icons as shown in the upper right diagram in FIG. 128 and displays the control screen 20100 of the television set on the display 101.

The control screen 20100 of the television set shown in the upper right diagram in FIG. 128 includes a first control target region 21302 of the television set and a second control target region 21303 of the television set. In addition, in a similar manner to the air conditioner described with reference to FIG. 72, the control screen 20100 of the television set includes the same display contents as the floor plan 500 (the upper left diagram in FIG. 128).

As shown in the upper right diagram in FIG. 128, the display control section 103 displays the first control target region 21302 of the television set brightly with brightness not lower than the specified brightness. Accordingly, it is shown that the television set of the room (for example, the living room) corresponding to the first control target region 21302 is turned on. The display control section 103 displays the second control target region 21303 of the television set darkly with brightness lower than the specified brightness. Accordingly, it is shown that the television set of the room (for example, the bedroom) corresponding to the second control target region 21303 is turned off.

In addition, the display control section 103 displays the detail control screen 5221 of the television set of the room corresponding to the first control target region 21302 on the display 101. As shown in the upper right diagram in FIG. 128, a name of the room ("living room" in FIG. 128) is described on the detail control screen 5221. The display control section 103 displays the detail control screen 5221 of the television set of the room in which the television set has been turned on among the respective rooms corresponding to the first control target region 21302 and the second control target region 21303 on the display 101. When both television sets of the respective rooms corresponding to the first control target region 21302 and the second control target region 21303 have been turned on, the display control section 103 displays the detail control screen 5221 of the television set of a room with the largest size (the living room in FIG. 128) on the display 101.

When the user selects the second control target region 21303 of the television set using the contacting object 10600 as shown in the lower right diagram in FIG. 128 in a state where the control screen 20100 of the television set is being displayed on the display 101 by the display control section 103 as shown in the upper right diagram in FIG. 128, the selection is sensed by the touch panel control section 102. Subsequently, as shown in the lower left diagram in FIG. 128, the display control section 103 displays the second control target region 21303 of the television set brightly with brightness not lower than the specified brightness. The display control section 103 switches the detail control screen to be displayed on the display 101 from the detail control screen 5221 of the room (for example, the living room) corresponding to the first control target region 21302 of the television set to the detail control screen 5222 of the room (for example, the bedroom) corresponding to the second control target region 21303 of the television set.

The device control section 106 generates a control command (an example of the first on-off control command) for turning on the power of the television set of the room (for example, the bedroom) corresponding to the second control target region 21303 of the television set. The device control section 106 transmits the generated control command to the television set in the room (for example, the bedroom) corresponding to the second control target region 21303 of the television set via the communication control section 107 and the network.

As described above, in the example of transition of a display screen shown in FIG. 128, when the user selects the second control target region 11303, the display control section 103 displays the detail control screen 5222 of the room corresponding to the second control target region 11303 on the display 101. Therefore, the desired detail control screen 5222 can be displayed on the display 101 without having to, for example, display a detail setting button.

In addition, the display control section 103 displays the detail control screen 5222 corresponding to the second control target region 11303 on the display 101 in place of the detail control screen 5221 that is being displayed. Therefore, a situation where the display screen becomes cluttered by both the detail control screen 5221 and the detail control screen 5222 being displayed on the display 101 can be avoided.

Figure 129:
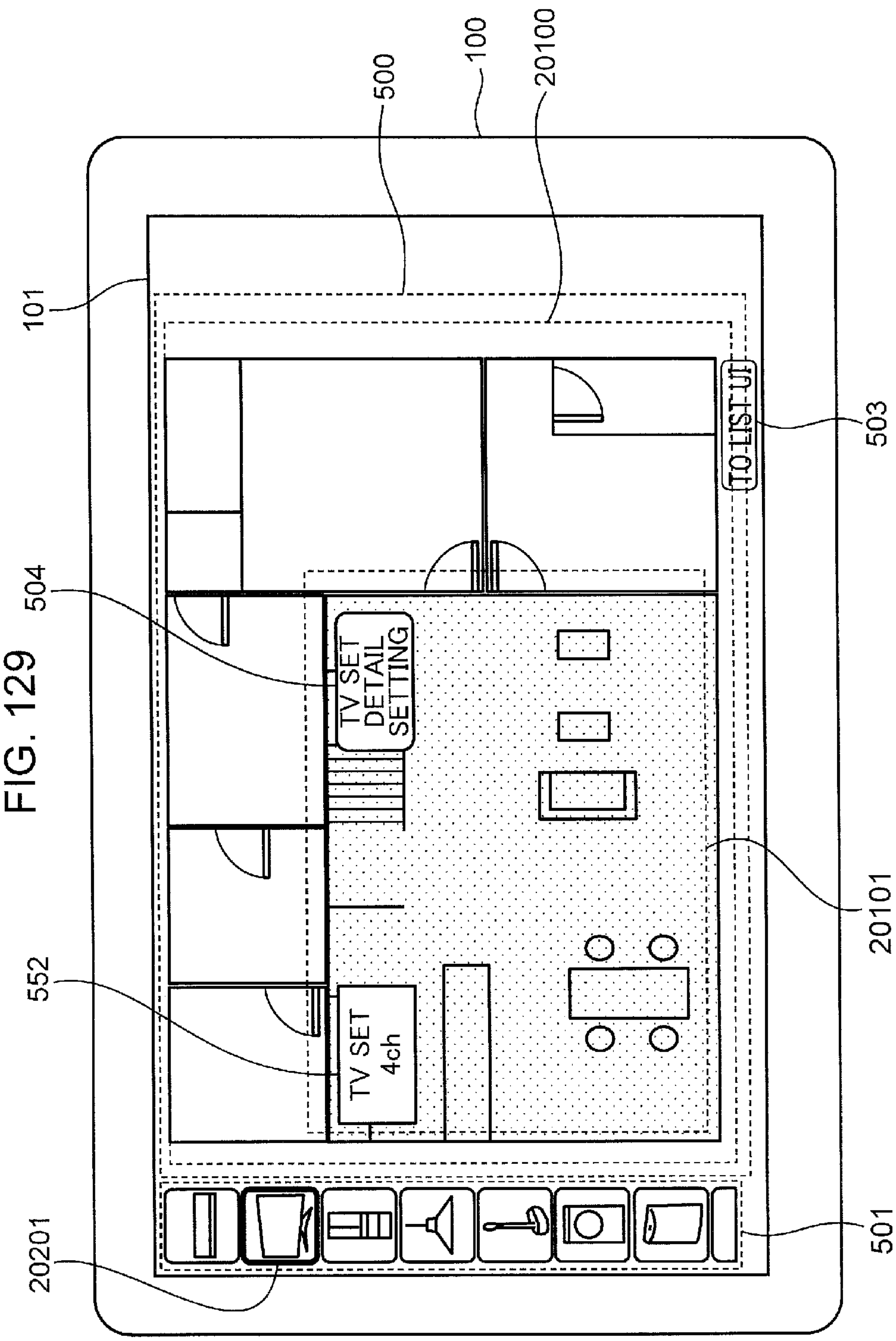

FIG. 129 is a diagram showing yet another example of a control screen of a television set that is displayed on the display 101 of the home controller 100. In FIG. 129, the display control section 103 displays a detail setting button 504 in the control target region 20101 of the television set. As shown in FIG. 129, the detail setting button 504 includes a description reading "television set detail setting". The detail setting button 504 is a button for displaying a detail control screen on the display 101. In FIG. 129, the display control section 103 further displays an operation state display section 552 in the control target region 20101 of the television set. In FIG. 129, the operation state display section 552 includes a description reading "television set 4 ch".

Figure 130:
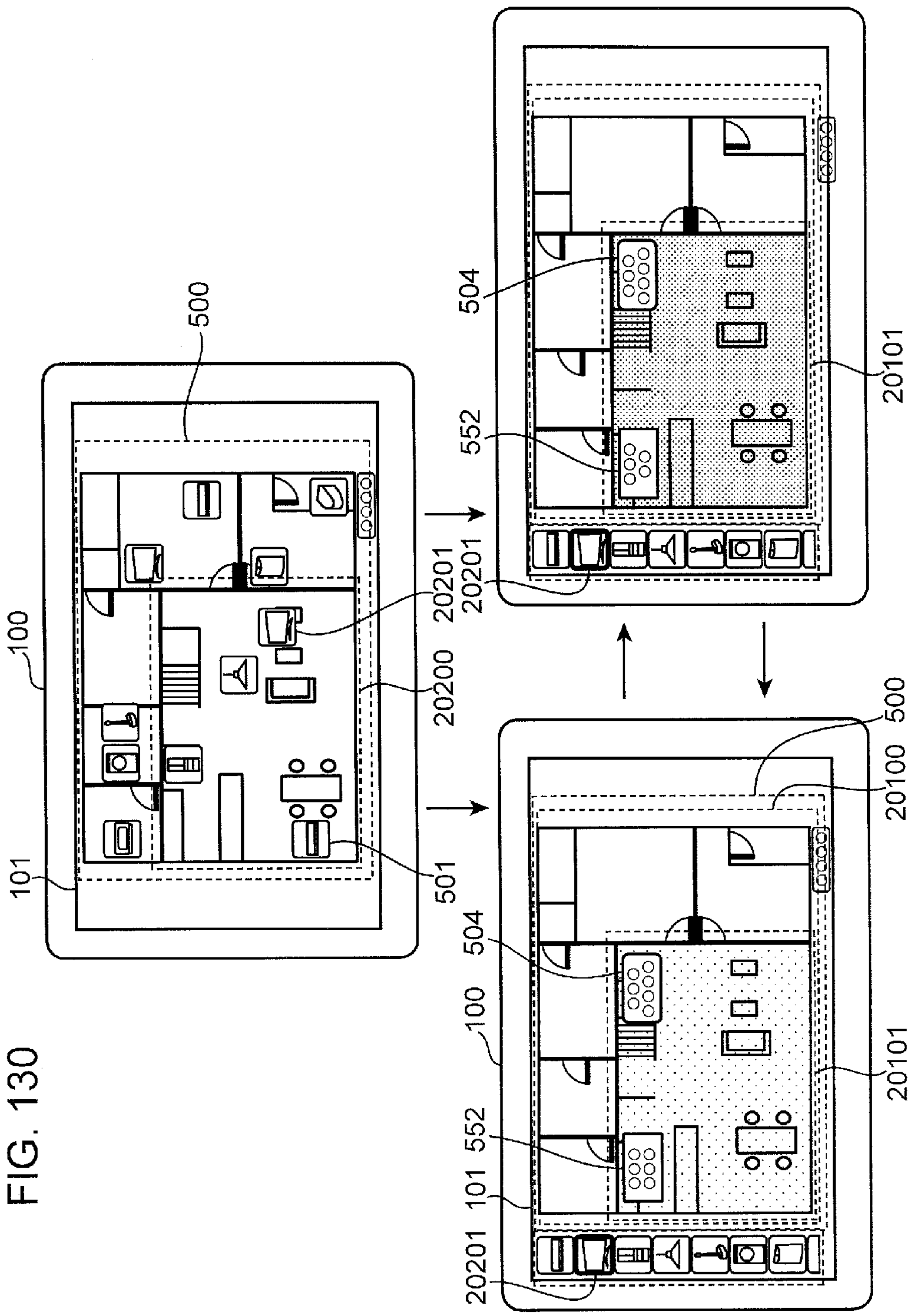

FIG. 130 is a diagram showing an example of transition of a display screen of the display 101 including the display screen shown in FIG. 129. An upper diagram in FIG. 130 represents the basic screen shown in FIG. 5 and a lower left diagram in FIG. 130 represents the display screen shown in FIG. 129.

When the user selects the device icon 20201 of the television set that is displayed in the room 20200 in which the television set is installed in a display state of the basic screen represented by the upper diagram in FIG. 130 (FIG. 5), the selection is sensed by the touch panel control section 102. Subsequently, the display control section 103 acquires status 1709 of the television set in the room 20200 from the device list 1700 to be described later with reference to FIG. 144B. The display control section 103 moves the respective device icons as shown in the lower left diagram or the lower right diagram in FIG. 130 and displays the control screen 20100 of the television set on the display 101.

When the acquired status 1709 indicates that the power is turned on and the "channel" is set to "4", the display control section 103 displays the control target region 20101 of the television set brightly with brightness not lower than the specified brightness as shown in FIG. 129 (the lower left diagram in FIG. 130). The display control section 103 displays the operation state display section 552 including a description reading "television set 4 ch" in the control target region 20101 of the television set. The display control section 103 displays the detail setting button 504 including a description reading "television set detail setting" in the control target region 20101 of the television set.

On the other hand, when the acquired status 1709 indicates that the power is turned off, the display control section 103 displays the control target region 20101 of the television set darkly with brightness lower than the specified brightness as shown in the lower right diagram in FIG. 130. The display control section 103 displays the operation state display section 552 including a description reading "television set off" in the control target region 20101 of the television set. The display control section 103 displays the detail setting button 504 in the control target region 20101 of the television set.

When the user selects the control target region 20101 of the television set in a display state shown in the lower left diagram in FIG. 130, the selection is sensed by the touch panel control section 102. Subsequently, as shown in the lower right diagram in FIG. 130, the display control section 103 displays the control target region 20101 of the television set darkly with brightness lower than the specified brightness. The device control section 106 generates a control command (an example of the on-off control command) for turning off the power of the television set. The device control section 106 transmits the generated control command to the television set in the room 20200 (for example, the living room) via the communication control section 107 and the network.

On the other hand, when the user selects the control target region 20101 of the television set in a display state shown in the lower right diagram in FIG. 130, the selection is sensed by the touch panel control section 102. Subsequently, as shown in the lower left diagram in FIG. 130, the display control section 103 displays the control target region 20101 of the television set brightly with brightness not lower than the specified brightness. The device control section 106 generates a control command (an example of the on-off control command) for turning on the power of the television set. The device control section 106 transmits the generated control command to the television set in the room 20200 (for example, the living room) via the communication control section 107 and the network.

FIG. 131 is a diagram showing yet another example of the control screen 20100 of the television set that is displayed on the display 101 of the home controller 100. FIG. 132 is a diagram showing an example of transition of a display screen of the display 101 including the display screen shown in FIG. 131. An upper diagram in FIG. 132 represents the display screen shown in FIG. 129 and a lower diagram in FIG. 132 represents the display screen shown in FIG. 131.

When the user selects the detail setting button 504 using the contacting object 10600 in the display state shown in the upper diagram in FIG. 132 (FIG. 129), the selection is sensed by the touch panel control section 102. Subsequently, as shown in the lower diagram in FIG. 132 (FIG. 131), the display control section 103 displays the detail control screen 522 of the television set on the display 101.

On the other hand, when the user selects the detail setting button 504 using the contacting object 10600 in the display state shown in the lower diagram in FIG. 132 (FIG. 131), the selection is sensed by the touch panel control section 102. Subsequently, as shown in the upper diagram in FIG. 132 (FIG. 129), the display control section 103 erases the detail control screen 522 of the television set from the display 101.

FIG. 133 is a diagram showing another example of transition of a display screen of the display 101 including the display screen shown in FIG. 131. An upper diagram in FIG. 133 represents the display screen shown in FIG. 131.

When the user selects the control target region 20101 of the television set using the contacting object 10600 in the display state shown in the upper diagram in FIG. 133 (FIG. 131), the selection is sensed by the touch panel control section 102. Subsequently, as shown in the lower diagram in FIG. 133, the display control section 103 erases the detail control screen 522 of the television set from the display 101. The display control section 103 displays the control target region 20101 of the television set darkly with brightness lower than the specified brightness. The display control section 103 changes the content of the description included in the operation state display section 552 from "television set 4 ch" to "television set off".

The device control section 106 generates a control command (an example of the on-off control command) for turning off the power of the television set of the room (for example, the living room) corresponding to the control target region 20101 of the television set. The device control section 106 transmits the generated control command to the television set in the room (for example, the living room) corresponding to the control target region 20101 of the television set via the communication control section 107 and the network.

FIG. 134 is a diagram showing another example of transition of a display screen of the display 101 including the display screen shown in FIG. 131. An upper diagram in FIG. 134 represents the display screen shown in FIG. 131 and a lower diagram in FIG. 134 represents the display screen shown in FIG. 124.

When the user selects the control target region 20101 of the television set using the contacting object 10600 in the display state shown in the upper diagram in FIG. 134 (FIG. 131), the selection is sensed by the touch panel control section 102. Subsequently, as shown in the lower diagram in FIG. 134, the display control section 103 erases the detail control screen 522 of the television set from the display 101. The display control section 103 displays the control target region 20101 of the television set darkly with brightness lower than the specified brightness. The display control section 103 changes the content of the description included in the operation state display section 552 from "television set 4 ch" to "television set off". The display control section 103 erases the detail setting button 504 from the control target region 20101 of the television set.

The device control section 106 generates a control command (an example of the on-off control command) for turning off the power of the television set of the room (for example, the living room) corresponding to the control target region 20101 of the television set. The device control section 106 transmits the generated control command to the television set in the room (for example, the living room) corresponding to the control target region 20101 of the television set via the communication control section 107 and the network.

FIGS. 135 to 137 are diagrams showing another example of a control screen of a television set when one device icon of a television set is used in common to control television sets in a plurality of rooms. FIG. 138 is a diagram showing an example of transition of a display screen of the display 101 including the control screen of the television set shown in FIGS. 135 to 137. An upper left diagram in FIG. 138 is the same as the upper left diagram in FIG. 128 and represents the basic screen displayed on the display 101 when the device icon of the television set is used in common. An upper right diagram in FIG. 138 represents the display screen shown in FIG. 135, a lower right diagram in FIG. 138 represents the display screen shown in FIG. 136, and a lower left diagram in FIG. 138 represents the display screen shown in FIG. 137.

When the user selects the used-in-common device icon 21301 of the television set using the contacting object 10600 on the basic screen shown in the upper left diagram in FIG. 138, the selection is sensed by the touch panel control section 102. Subsequently, the display control section 103 acquires status 1709 of the television set of the room (for example, the living room and the bedroom) which uses in common the used-in-common device icon 21301 of the television set from the device list 1700 to be described later with reference to FIG. 144B. In this case, it is assumed that the television sets of both the living room and the bedroom are operating with their "channel" set to "4" and "volume" set to "16". The display control section 103 moves the respective device icons as shown in FIG. 135 (the upper right diagram in FIG. 138) and displays the control screen 20100 of the television set on the display 101.

The control screen 20100 of the television set shown in FIG. 135 (the upper right diagram in FIG. 138) includes the first control target region 21302 of the television set and the second control target region 21303 of the television set. In addition, in a similar manner to the air conditioner described with reference to FIG. 72, the control screen 20100 of the television set includes the same display contents as the floor plan 500 (the upper left diagram in FIG. 138).

Based on the acquired status 1709, the display control section 103 displays the first control target region 21302 of the television set and the second control target region 21303 of the television set brightly with brightness not lower than the specified brightness as shown in FIG. 135 (the upper right diagram in FIG. 138). Accordingly, it is shown that the television sets in both the room (for example, the living room) corresponding to the first control target region 21302 and the room (for example, the bedroom) corresponding to the second control target region 21303 are operating.

Based on the acquired status 1709, the display control section 103 respectively displays the operation state display sections 5521 and 5522 including a description reading "television set 4 ch" in the first control target region 21302 and the second control target region 21303. The display control section 103 respectively displays the detail setting buttons 5041 and 5042 in the first control target region 21302 and the second control target region 21303.

Next, when the user selects the first control target region 21302 of the television set using the contacting object 10600 in the display state shown in FIG. 135 (the upper right diagram in FIG. 138), the selection is sensed by the touch panel control section 102. Subsequently, as shown in FIG. 136 (the lower right diagram in FIG. 138), the display control section 103 displays the first control target region 21302 of the television set darkly with brightness lower than the specified brightness. The display control section 103 switches the content of the description included in the operation state display section 5521 from "television set 4 ch" to "television set off".

The device control section 106 generates a control command (an example of the first on-off control command) for turning off the power of the television set of the room (for example, the living room) corresponding to the first control target region 21302 of the television set. The device control section 106 transmits the generated control command to the television set in the room (for example, the living room) corresponding to the first control target region 21302 of the television set via the communication control section 107 and the network.

Next, when the user selects the second control target region 21303 of the television set using the contacting object 10600 in the display state shown in FIG. 136 (the lower right diagram in FIG. 138), the selection is sensed by the touch panel control section 102. Subsequently, as shown in FIG. 137 (the lower left diagram in FIG. 138), the display control section 103 displays the second control target region 21303 of the television set darkly with brightness lower than the specified brightness. The display control section 103 switches the content of the description included in the operation state display section 5522 from "television set 4 ch" to "television set off".

The device control section 106 generates a control command (an example of the second on-off control command) for turning off the power of the television set of the room (for example, the bedroom) corresponding to the second control target region 21303 of the television set. The device control section 106 transmits the generated control command to the television set in the room (for example, the bedroom) corresponding to the second control target region 21303 of the television set via the communication control section 107 and the network.

FIG. 139 is a diagram showing another example of a transition of a display screen of the display 101 when one device icon of a television set is used in common to control television sets in a plurality of rooms. An upper left diagram in FIG. 139 is the same as the upper left diagram in FIG. 128 and represents the basic screen displayed on the display 101 when the device icon of the television set is used in common. An upper right diagram, a lower right diagram, and a lower left diagram in FIG. 139 show a control screen of a television set.

When the user selects the used-in-common device icon 21301 of the television set using the contacting object 10600 on the basic screen shown in the upper left diagram in FIG. 139, the selection is sensed by the touch panel control section 102. Subsequently, the display control section 103 acquires status 1709 of the television set of the room (for example, the living room and the bedroom) which uses in common the used-in-common device icon 21301 of the television set from the device list 1700 to be described later with reference to FIG. 144B. In this case, it is assumed that the television set in the living room is operating with its "channel" set to "4" and its "volume" set to "16" and that the television set in the bedroom has been turned off.

As shown in the upper right diagram in FIG. 139, the display control section 103 moves the respective device icons and displays the control screen 20100 of the television set including the first control target region 21302 and the second control target region 21303 of the television set on the display 101. The display control section 103 respectively displays the detail setting buttons 5041 and 5042 in the first control target region 21302 and the second control target region 21303.

Based on the acquired status 1709, as shown in the upper right diagram in FIG. 139, the display control section 103 displays the first control target region 21302 of the television set brightly with brightness not lower than the specified brightness. The display control section 103 displays the operation state display section 5521 including a description reading "television set 4 ch" in the first control target region 21302 of the television set. Accordingly, it is shown that the television set of the room (for example, the living room) corresponding to the first control target region 21302 is operating.

In addition, based on the acquired status 1709, the display control section 103 displays the second control target region 21303 of the television set darkly with brightness lower than the specified brightness. The display control section 103 displays the operation state display section 5522 including a description reading "television set off" in the second control target region 21303 of the television set. Accordingly, it is shown that the television set of the room (for example, the bedroom) corresponding to the second control target region 21303 is turned off.

Next, when the user selects the detail setting button 5041 that is displayed in the first control target region 21302 of the television set using the contacting object 10600 in the display state shown in the upper right diagram in FIG. 139, the selection is sensed by the touch panel control section 102. Consequently, as shown in the lower right diagram in FIG. 139, the display control section 103 displays the detail control screen 5221 of the room (for example, the living room) corresponding to the first control target region 21302 on the display 101. The detail control screen 5221 includes a description reading "living room" to clearly show that the detail control screen belongs to the living room.

When the user selects the detail setting button 5042 that is displayed in the second control target region 21303 using the contacting object 10600 in the display state shown in the lower right diagram in FIG. 139, the selection is sensed by the touch panel control section 102. Consequently, as shown in the lower left diagram in FIG. 139, the display control section 103 switches the detail control screen to be displayed from the detail control screen 5221 of the living room to the detail control screen 5222 of the bedroom.

FIG. 140 is a diagram showing yet another example of a transition of a display screen of the display 101 when one device icon of a television set is used in common to control television sets in a plurality of rooms. An upper left diagram in FIG. 140 is the same as the upper left diagram in FIG. 128 and represents the basic screen displayed on the display 101 when the device icon of the television set is used in common. An upper right diagram, a lower right diagram, and a lower left diagram in FIG. 140 show a control screen of a television set.

When the user selects the used-in-common device icon 21301 of the television set using the contacting object 10600 on the basic screen shown in the upper left diagram in FIG. 140, the selection is sensed by the touch panel control section 102. Consequently, the display control section 103 acquires status 1709 of the television set of the room (for example, the living room and the bedroom) which uses in common the used-in-common device icon 21301 of the television set from the device list 1700 to be described later with reference to FIG. 144B. In this case, it is assumed that both of the television sets in the living room and the bedroom are operating.

As shown in the upper right diagram in FIG. 140, the display control section 103 moves the respective device icons and displays the control screen 20100 of the television set including the first control target region 21302 and the second control target region 21303 of the television set on the display 101.

Based on the acquired status 1709, the display control section 103 displays the first control target region 21302 of the television set and the second control target region 21303 of the television set brightly with brightness not lower than the specified brightness as shown in the upper right diagram in FIG. 140. In addition, the display control section 103 respectively displays the detail setting buttons 5041 and 5042 in the first control target region 21302 and the second control target region 21303. Accordingly, it is shown that the television sets in both the room (for example, the living room) corresponding to the first control target region 21302 and the room (for example, the bedroom) corresponding to the second control target region 21303 are operating.

Next, when the user selects the first control target region 21302 of the television set using the contacting object 10600 in the display state shown in the upper right diagram in FIG. 140, the selection is sensed by the touch panel control section 102. Subsequently, as shown in the lower right diagram in FIG. 140, the display control section 103 displays the first control target region 21302 of the television set darkly with brightness lower than the specified brightness. The display control section 103 erases the detail setting button 5041 from the first control target region 21302 of the television set. The display control section 103 displays the operation state display section 5521 including a description reading "television set off" in the first control target region 21302. Accordingly, it is shown that the television set of the room (for example, the living room) corresponding to the first control target region 21302 has been turned off.

The device control section 106 generates a control command (an example of the first on-off control command) for turning off the power of the television set of the room (for example, the living room) corresponding to the first control target region 21302 of the television set. The device control section 106 transmits the generated control command to the television set in the living room (an example of the first room) corresponding to the first control target region 21302 of the television set via the communication control section 107 and the network.

Next, when the user selects the second control target region 21303 of the television set using the contacting object 10600 in the display state shown in the lower right diagram in FIG. 140, the selection is sensed by the touch panel control section 102. Subsequently, as shown in the lower left diagram in FIG. 140, the display control section 103 displays the second control target region 21303 of the television set darkly with brightness lower than the specified brightness. The display control section 103 erases the detail setting button 5042 from the second control target region 21303 of the television set. The display control section 103 displays the operation state display section 5522 including a description reading "television set off" in the second control target region 21303. Accordingly, it is shown that the television set of the room (for example, the bedroom) corresponding to the second control target region 21303 has been turned off.

The device control section 106 generates a control command (an example of the second on-off control command) for turning off the power of the television set of the room (for example, the bedroom) corresponding to the second control target region 21303 of the television set. The device control section 106 transmits the generated control command to the television set in the bedroom (an example of the second room) corresponding to the second control target region 21303 of the television set via the communication control section 107 and the network.

As described above, in the example of transition of a display screen shown in FIG. 140, when television sets in rooms corresponding to the first control target region 21302 and the second control target region 21303 of the television set are turned on, the display control section 103 respectively displays the detail setting buttons 5041 and 5042. On the other hand, when television sets of corresponding rooms are turned off, the display control section 103 displays the operation state display sections 5521 and 5522 including a description reading "television set off". Accordingly, an on-off state of a television set is clearly displayed.

FIG. 141 is a diagram showing another example of arrangement of the used-in-common device icon 21301 of the television set. In FIG. 141, instead of arranging the used-in-common device icon 21301 of the television set in one of the rooms that are control targets, the display control section 103 arranges the used-in-common device icon 21301 of the television set to the outside of the display region of the floor plan 500 in a similar manner to the case shown in FIG. 122.

FIG. 142 is a diagram showing yet another example of a control screen of an air conditioner that is displayed on a display of a home controller when a device icon of an air conditioner is used in common. FIG. 143 is a diagram showing yet another example of a detail control screen of a room.

In FIG. 142, the display control section 103 displays device icons 501 which include the used-in-common device icon 11301 of the air conditioner and which have been moved out of the floor plan 500 and the control screen 10100 of the air conditioner including the first control target region 11302 and the second control target region 11303 on the display 101. Furthermore, the display control section 103 displays a detail setting display button 5040 to the outside of a region of the control screen 10100 of the air conditioner on the display 101. In the example shown in FIG. 142, the detail setting display button 5040 is displayed at a top right corner of the display 101.

When the user performs a leftward sliding action while keeping a contacting object in contact with the detail setting display button 5040 in the display state shown in FIG. 142, the touch panel control section 102 senses the sliding action. Consequently, the display control section 103 displays the detail control screen 5221 of the room (the living room in FIG. 142) corresponding to the first control target region 11302 and the detail control screen 5222 of the room (the bedroom in FIG. 142) corresponding to the second control target region 11303 on the display 101 in a mode where the detail control screens are pulled out by the detail setting display button 5040.

When the user slides the detail setting display button 5040 to a left end of the display 101 using a contacting object, the display control section 103 displays the detail control screen 5221 of the living room and the detail control screen 5222 of the bedroom on the display 101 as shown in FIG. 143.

Moreover, when the user taps the detail setting display button 5040 with the contacting object in the display state shown in FIG. 142, the detail control screen 5221 of the living room and the detail control screen 5222 of the bedroom may be displayed on the display 101 as shown in FIG. 143.

FIG. 144A is a diagram showing a configuration example of a device list managed by the server 300 which differs from that shown in FIG. 34. In the example shown in FIG. 144A, a device list 1600 includes a device ID 1601, a device type 1602, a model number 1603, an arrangement 1604, capability information 1605, a control command transmission destination 1606, status 1608, and a specific target device flag 1609.

The device ID 1601, the device type 1602, the model number 1603, the arrangement 1604, the capability information 1605, and the control command transmission destination 1606 are respectively the same as the device ID 4701, the device type 4702, the model number 4703, the arrangement 4704, the capability information 4705, and the control command transmission destination 4706 described earlier with reference to FIG. 34.

The device ID 1601 is an identifier of the device 200. The device type 1602 represents a type of the device 200. The model number 1603 represents a model number of the device 200. The arrangement 1604 represents a room in which the device 200 is installed.

The capability information 1605 represents a content in which the device 200 can be controlled and a state that can be acquired from the device 200. For example, with respect to an air conditioner with device ID of A, temperature, air flow direction, and air flow amount can be controlled. A control command transmission destination 1606 represents a transmission destination of a control command for controlling the device 200. For example, with the air conditioner with a device ID of A, since the control command transmission destination 1606 is a device, the control command is directly transmitted from the home controller 100 to the device 200. A control command is a command for operating the device 200 or checking the state of the device 200.

The status 1608 represents current status of the device 200 or a set content at the time power of the device 200 had previously been turned off. For example, FIG. 144A shows that the air conditioner with a device ID of A is currently operating at a set temperature of 27° C. in the heater mode. FIG. 144A also shows that the television set with a device ID of B is currently operating, a volume thereof is set to “16”, and a channel thereof is set to “4 ch”. FIG. 144A also shows that the air conditioner with a device ID of C is currently turned off and that the air conditioner has been operating at a set temperature of 25° C. and in the heater mode at the time power had previously been turned off. FIG. 144A also shows that the television set with a device ID of D is currently turned off and that a volume thereof has been set to “16” and a channel thereof has been set to “4 ch” at the time power had previously been turned off.

The specific target device flag 1609 represents whether or not each device is a specific target device. For example, FIG. 144A shows that the air conditioners with device IDs of A and C and the television sets with device IDs of B and D are specific target devices and that the washing machine with a device ID of E and a refrigerator with a device ID of F are not specific target devices.

Moreover, the device list 1600 that is managed by the server may be omitted from home information 1300. In this case, the home controller 100 may directly acquire information corresponding to the device type 1602, the model number 1603, and the capability information 1605 described in the device list 1600 that is managed by the server from the device 200.

FIG. 144B is a diagram showing a configuration example of a device list managed by the home controller 100 which differs from that shown in FIG. 35. Based on information of a device list 1700, the home controller 100 arranges a device icon 501 on the basic screen and controls the device 200.

The device list 1700 includes a device ID 1701, a device type 1702, a model number 1703, an arrangement 1704, capability information 1705, a control command transmission destination 1706, an IP address 1707, status 1709, and a specific target device flag 1710. The device ID 1701 to the control command transmission destination 1706, the status 1709, and the specific target device flag 1710 share the same contents with items having the same names in FIG. 144A.

In the device list 1700, contents of the device type 1702, the model number 1703, the arrangement 1704, the capability information 1705, the control command transmission destination 1706, the status 1709, and the specific target device flag 1710 can be acquired by the device management section 105 by having the server 300 transmit the device list 1600. The IP address 1707 is acquired by the device management section 105 from the device 200. However, when the device type 1702, the model number 1703, the capability information 1705, and the control command transmission destination 1706 can be directly acquired from the device 200, the device management section 105 may prioritize such directly acquired contents.

Moreover, instead of acquiring the control command transmission destination 1706 from the server 300 or the device 200, contents determined in advance by the home controller system may be adopted as the control command transmission destination 1706, the control command transmission destination 1706 may be automatically determined based on a state of a network to which the home controller 100 is connected, or the control command transmission destination 1706 may be set by the user.

As shown in FIGS. 144A and 144B, in the present embodiment, device lists are managed by both the home controller 100 and the server 300. Alternatively, only one of the home controller 100 and the server 300 or, for example, only the server 300 may manage a device list, and the other of the home controller 100 and the server 300 or, for example, the home controller 100 acquire the device list from the server 300 whenever necessary. In this case, the IP address 1707 included in the device list 1700 managed by the home controller 100 may be also managed by the server 300.

Moreover, while the arrangements 1604 and 1704 are respectively represented in FIGS. 144A and 144B by room names such as "living room" for the sake of brevity, the arrangements 1604 and 1704 actually include coordinate data as shown in FIGS. 34 and 35.

(Control Flow of Specific Target Device)

Next, a flow of a process by which the home controller 100 controls a specific target device will be described. In the present embodiment, as described with respect to the various examples of transition of a display screen of the display 101, there are four display patterns in correspondence to an on-off state of a specific target device for displaying the detail setting button 504 and the detail control screen 522. Hereinafter, a pattern where the detail control screen 522 is displayed in both an on state and an off state of the specific target device and the detail setting button 504 is not displayed will be referred to as a display pattern P1. A pattern where the detail control screen 522 is displayed only in an on state of the specific target device and the detail setting button 504 is not displayed will be referred to as a display pattern P2. A pattern where the detail setting button 504 is displayed in both an on state and an off state of the specific target device will be referred to as a display pattern P3. A pattern where the detail setting button 504 is displayed only in an on state of the specific target device will be referred to as a display pattern P4.

FIGS. 145A and 145B are flow diagrams showing an example of a flow of a process by which the home controller 100 controls the specific target device. The flow diagrams represent an example of the display pattern P1 or P3.

First, the touch panel control section 102 senses that a device icon 501 representing a given device 200 has been selected by the user on the basic screen (S12201). Next, the display control section 103 moves all device icons 501 out of the display region of the control screen of the device (S12202). In this case, for example, as shown in FIG. 72, the device icons 501 are moved outside the display region of the control screen 10100 of the air conditioner.

Next, the display control section 103 adjusts display positions of the moved device icons 501 (S12203). For example, as shown in FIG. 72 or FIG. 123, the display control section 103 adjusts display positions so that the selected device icons 10201 and 20201 are displayed on the display 101.

Next, the touch panel control section 102 determines whether or not a device corresponding to the device icon selected by the user is a specific target device (S12204). When the device corresponding to the selected device icon is not the specific target device (NO in S12204), the display control section 103 displays a control screen of the device corresponding to the selected device icon on the display 101 (S12205) and the process advances to S12211.

On the other hand, when the touch panel control section 102 determines in S12204 that the device corresponding to the selected device icon is the specific target device (YES in S12204), the display control section 103 displays the floor plan 500 as the control screen of the specific target device (for example, the control screen 20100 of the television set) on the display 101 (S12206). Subsequently, the display control section 103 acquires an operation state of the specific target device from the status 1709 in the device list 1700 (S12207).

Next, the display control section 103 draws a control screen based on the acquired operation state of the specific target device (S12208). Subsequently, the display control section 103 displays the detail setting button 504 or the detail control screen 522 of the specific target device on the display 101 (S12210) and the process advances to S12211.

When a start of contact made by the contacting object 10600 with the display 101 is sensed by the touch panel control section 102 in S12211, the touch panel control section 102 determines whether or not a contact target is the device icon 501 (S12212).

When the touch panel control section 102 determines that the contact is with the device icon 501 (YES in S12212), the touch panel control section 102 determines whether or not the contacting object 10600 has made contact with the same device icon as the device icon of the device selected in S12201 (S12213). If not the same device icon (NO in S12213), the process returns to S12203. On the other hand, when it is determined that the contacting object 10600 has made contact with the device icon of the device selected in S12201 (YES in S12213), the display control section 103 hides the control screen of the device and displays the basic screen on the display 101 (S12214) to finish the present flow.

On the other hand, when the touch panel control section 102 determines in S12212 that the contact is not with the device icon 501 (NO in S12212), the touch panel control section 102 further determines whether or not the contact target is the control screen of the device (S12215). When it is determined that the contact target is not the control screen of the device (NO in S12215), the process is advanced to S12214.

On the other hand, when the touch panel control section 102 determines in S12215 that the contacting object 10600 has made contact with a button or the like in the control screen of the device (YES in S12215), the process is advanced to the control flow (in case of the specific target device, FIG. 147 to be described later) of the device (S12216) and the process subsequently returns to S12211.

Moreover, in S12207, the display control section 103 acquires an operation state of the specific target device from the status 1709 in the device list 1700. Alternatively, the display control section 103 may acquire an operation state of the specific target device from the server 300. Further alternatively, the display control section 103 may acquire an operation state directly from the specific target device.

In addition, in S12210, the display control section 103 displays the detail control screen 522 on the display 101 in case of the display pattern P1 and displays the detail setting button 504 on the display 101 in case of the display pattern P3.

(Control Flow of Specific Target Device)

FIGS. 146A and 146B are flow diagrams showing another example of a flow of a process by which the home controller 100 controls the specific target device. The flow diagrams represent an example of the display pattern P2 or P4.

S14601 to S14608 are the same as S12201 to S12208 in FIG. 145A. Following S14608, the display control section 103 determines whether or not the operation state of the specific target device is off (S14609). When the operation state of the specific target device is off (YES in S14609), the process is advanced to S14611.

On the other hand, when the operation state of the specific target device is not off (NO in S14609), the display control section 103 displays the detail setting button 504 or the detail control screen 522 of the specific target device on the display 101 (S14610) and the process is advanced to S14611. S14611 to S14616 are the same as S12211 to S12216 in FIG. 145B.

Moreover, in S14607, the display control section 103 may acquire the operation state of the specific target device from the server 300 in a similar manner to S12207. Furthermore, the display control section 103 may acquire an operation state directly from the specific target device.

In addition, in S14610, the display control section 103 displays the detail control screen 522 on the display 101 in case of the display pattern P2 and displays the detail setting button 504 on the display 101 in case of the display pattern P4.

FIG. 147 is a flow chart showing a flow of a process by which the home controller 100 generates a control command of the specific target device in accordance with a content of a contact made by the contacting object 10600.

First, the touch panel control section 102 determines whether or not contact made by the contacting object 10600 has been sensed in the control target region of the device on the floor plan 500 (in other words, the control screen of the device) (S12301). When contact made by the contacting object 10600 had not been sensed in the control target region of the device (NO in S12301), the touch panel control section 102 determines whether or not contact made by the contacting object 10600 has been sensed on the detail control screen 522 of the device (S12304).

When contact made by the contacting object 10600 had also not been sensed on the detail control screen 522 of the device (NO in S12304), the touch panel control section 102 determines whether or not contact made by the contacting object 10600 has been sensed on the detail setting button 504 of the device (S12306). When contact made by the contacting object 10600 had also not been sensed on the detail setting button 504 of the device (NO in S12306), the present flow is terminated.

On the other hand, when the touch panel control section 102 senses contact made by the contacting object 10600 in the control target region of the device in S12301 (YES in S12301), the process is advanced to S12302. In addition, when the touch panel control section 102 senses contact made by the contacting object 10600 on the detail control screen 522 of the device in S12304 (YES in S12304), the process is advanced to S12305.

When the touch panel control section 102 senses contact made by the contacting object 10600 on the detail setting button 504 of the device in S12306 (YES in S12306), the display control section 103 switches between display and non-display of the detail control screen 522 (S12307) and terminates the present flow. In other words, in S12307, when the detail control screen 522 is displayed, the detail control screen 522 is erased, and when the detail control screen 522 is not displayed, the detail control screen 522 is displayed.

In S12302, the device control section 106 generates a control command for turning off the device if the device is turned on and generates a control command for turning on the device if the device is turned off, and subsequently the process advances to S12303. In S12305, the device control section 106 generates a control command corresponding to the control selected on the detail control screen 522, and the process advances to S12303.

In S12303, the process is advanced to a control command transmission flow and, subsequently, the display control section 103 acquires an operation state of the device from the status 1709 in the device list 1700 (S12308).

Next, the touch panel control section 102 determines whether or not the device corresponding to the device icon 501 selected by the user is the specific target device (S12309). When the device corresponding to the selected device icon is not the specific target device (NO in S12309), the display control section 103 updates screen display of the display 101 based on the operation state of the device acquired in S12308 (S12310) and the present flow is terminated.

On the other hand, when the touch panel control section 102 determines in S12309 that the device corresponding to the selected device icon is the specific target device (YES in S12309), the process is advanced to a display control flow (S12311) and the present flow is subsequently terminated.

Figure 41:
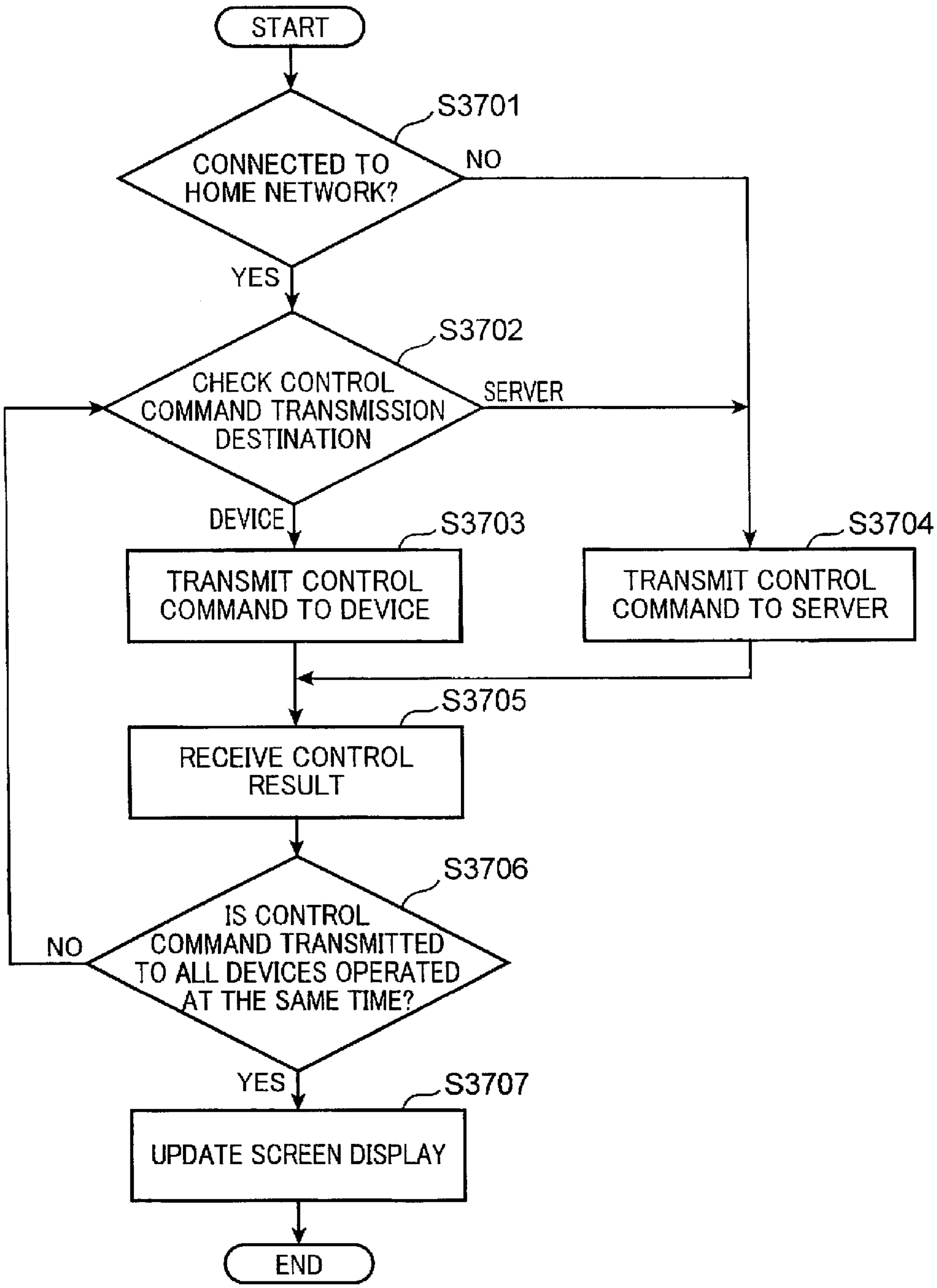
FIG. 41 is a flowchart showing the flow of a process for the home controller to transmit a control command according to the embodiment of the present disclosure.

The control command transmission flow in S12303 is executed in a similar process flow as, for example, the process flow represented by the flow chart in FIG. 41. Moreover, in the present control of the specific target device (in the present embodiment, for example, the air conditioner and the television set), a device that is a control command transmission destination in S3702 and S3703 in FIG. 41 corresponds to the specific target device corresponding to the device icon of the selected specific target device. In addition, in the present control of the specific target device, the simultaneously operated devices in S3706 in FIG. 41 correspond to, for example, specific target devices in a plurality of rooms corresponding to device icons of the specific target device that are used in common.

FIG. 148A is a flow chart showing an example of the display control flow in S12311 in FIG. 147. The flow chart represents an example of the display pattern P1 in which the detail control screen 522 is displayed in both an on state and an off state of the specific target device and the detail setting button 504 is not displayed.

First, the display control section 103 determines whether or not the device control section 106 has switched the specific target device from an on state to an off state (S14801). When the specific target device has been switched from an on state to an off state (YES in S14801), the display control section 103 changes the control target region of the specific target device (for example, the control target region 20101 of the television set) on the floor plan 500 to a display corresponding to an off state (S14802). For example, the display control section 103 displays the control target region 20101 of the television set darkly with brightness lower than the specified brightness. Next, the display control section 103 changes the detail control screen 522 to a display corresponding to an off state (S14803). For example, the display control section 103 erases a symbol representing an air flow direction on the detail control screen 522. Once S14803 is finished, the present flow is terminated.

On the other hand, when the specific target device has not been switched from an on state to an off state (NO in S14801), the display control section 103 changes the control target region of the specific target device (for example, the control target region 20101 of the television set) on the floor plan 500 to a display corresponding to the operation state acquired in S12308 in FIG. 147 (S14804). For example, when the television set is turned on, the display control section 103 displays the control target region 20101 of the television set with brightness not lower than the specified brightness.

Next, the display control section 103 determines whether or not the detail control screen 522 of a device in another room is already displayed on the display 101 (S14805). When the detail control screen 522 of a device in another room is already displayed on the display 101 (YES in S14805), the display control section 103 switches the displayed detail control screen 522 to a screen of the corresponding device in the room (S14806) and the present flow is terminated.

On the other hand, when the detail control screen 522 of a device in another room is not displayed on the display 101 (NO in S14805), the display control section 103 switches the detail control screen 522 of the device to a display corresponding to the operation state (S14807). In other words, in the display pattern P1, since the detail control screen 522 of the device is displayed on the display 101 both when the device is in an on state and in an off state, S14807 is executed. Once S14807 is finished, the present flow is terminated.

FIG. 148B is a flow chart showing an example of the display control flow in S12311 in FIG. 147 which differs from FIG. 148A. The flow chart represents an example of the display pattern P2 in which the detail control screen 522 is displayed only in an on state of the specific target device and the detail setting button 504 is not displayed.

S14821 and S14822 are the same as S14801 and S14802 in FIG. 148A. Following S14822, when the detail control screen 522 of the device is displayed on the display 101, the display control section 103 erases the detail control screen 522 from the display 101 (S14823). Next, the display control section 103 displays the device type and the operation state in the room corresponding to the device (S14824). For example, as shown in FIG. 124, the display control section 103 sets "television set off" as a description content of the operation state display section 552. Once S14824 is finished, the present flow is terminated.

On the other hand, when the specific target device has not been switched from an on state to an off state (NO in S14801), the process is advanced to S14825. S14825 to S14827 are the same as S14804 to S14806 in FIG. 148A.

In S14826, when the detail control screen 522 of a device in another room is not displayed on the display 101 (NO in S14826), the display control section 103 determines whether or not the detail control screen 522 of the corresponding device is already displayed on the display 101 (S14828). When the detail control screen 522 of the corresponding device is already displayed on the display 101 (YES in S14828), the display control section 103 changes the detail control screen 522 of the device to a display corresponding to the operation state (S14829). For example, as shown in FIG. 123, the display control section 103 changes the volume and the channel on the detail control screen 522 of the television set to a display corresponding to the operation state. Once S14829 is finished, the present flow is terminated.

On the other hand, in S14828, when the detail control screen 522 of the corresponding device is not displayed on the display 101 (NO in S14828), the display control section 103 displays the detail control screen 522 of the corresponding device on the display 101 (S14830). In other words, in the display pattern P2, the detail control screen 522 of the device is displayed on the display 101 only when the device is in an on state. Since a state of NO in S14828 means that the device has not been switched from an on state to an off state (NO in S14821), S14830 is executed. Once S14830 is finished, the present flow is terminated.

FIG. 148C is a flow chart showing an example of the display control flow in S12311 in FIG. 147 which differs from FIGS. 148A and 148B. The flow chart represents an example of the display pattern P3 in which the detail setting button 504 is displayed in both an on state and an off state of the specific target device.

S14841 and S14842 are the same as S14801 and S14802 in FIG. 148A, and S14843 is the same as S14823 in FIG. 148B. Once S14843 is finished, the present flow is terminated.

On the other hand, in S14841, when the specific target device has not been switched from an on state to an off state (NO in S14841), the process is advanced to S14844. S14844 to S14846 are the same as S14804 to S14806 in FIG. 148A.

In S14845, when the detail control screen 522 of a device in another room is not displayed on the display 101 (NO in S14845), the process is advanced to S14847. S14847 and S14848 are the same as S14828 and S14829 in FIG. 148B. In S14847, when the detail control screen 522 of the corresponding device is not displayed on the display 101 (NO in S14847), the present process is terminated. In other words, in the display pattern P3, while the detail setting button 504 is displayed both when the device is in an on state and in an off state, the detail control screen 522 is displayed on the display 101 upon selection of the detail setting button 504. Therefore, in the display pattern P3, when NO in S14847, the present process is terminated.

FIG. 148D is a flow chart showing an example of the display control flow in S12311 in FIG. 147 which differs from FIGS. 148A, 148B, and 148C. The flow chart represents an example of the display pattern P4 in which the detail setting button 504 is displayed only when the specific target device is in an on state.

S14861 and S14862 are the same as S14801 and S14802 in FIG. 148A. Following S14862, when the detail control screen 522 or the detail setting button 504 of the device is displayed on the display 101, the display control section 103 erases the detail control screen 522 and the detail setting button 504 from the display 101 (S14863) and the process is advanced to S14864. S14864 is the same as S14824 in FIG. 148B. Once S14864 is finished, the present flow is terminated.

On the other hand, in S14861, when the specific target device has not been switched from an on state to an off state (NO in S14861), the process is advanced to S14865. S14865 to S14867 are the same as S14804 to S14806 in FIG. 148A.

In S14866, when the detail control screen 522 of a device in another room is not displayed on the display 101 (NO in S14866), the process is advanced to S14868. S14868 and S14869 are the same as S14828 and S14829 in FIG. 148B.

In S14868, when the detail control screen 522 of the corresponding device is not displayed on the display 101 (NO in S14868), the display control section 103 determines whether or not the detail setting button 504 is already displayed on the display 101 (S14870). When the detail setting button 504 is already displayed on the display 101 (YES in S14870), the present flow is terminated.

On the other hand, in S14870, when the detail setting button 504 is not displayed on the display 101 (NO in S14870), the display control section 103 displays the detail setting button 504 on the display 101 (S14871). In other words, in the display pattern P4, the detail setting button 504 is displayed on the display 101 only when the device is in an on state. Since a state of NO in S14870 means that the device has not been switched from an on state to an off state (NO in S14861), S14871 is executed. Once S14871 is finished, the present flow is terminated.

FIG. 149 is a sequence diagram showing an example of a process by which the home controller 100 acquires a state of the specific target device. The specific target device 200 notifies a change in a device state to the home controller 100 (S14901). In this case, the specific target device 200 may periodically notify a change in the device state or may notify a change in the device state when such a state change occurs.

The device management section 105 of the home controller 100 updates the status 1709 in the device list 1700 according to contents of the received device state (S14902). The device management section 105 of the home controller 100 notifies the change in the device state to the server 300 (S14903). The server 300 updates the status 1608 in the device list 1600 according to the received device state change notification (S14904).

The touch panel control section 102 of the home controller 100 senses selection of a device icon by the user (S14905). The display control section 103 of the home controller 100 acquires a state of the specific target device from the status 1709 in the device list 1700 (S14906). Next, the display control section 103 of the home controller 100 displays the control screen of the specific target device (for example, the control screen 10100 of the air conditioner) on the display 101 (S14907). Moreover, S14901 to S14904 and S14905 to S14907 are normally executed mutually asynchronously.

FIG. 150 is a sequence diagram showing another example of a process by which the home controller 100 acquires a state of the specific target device. First, the touch panel control section 102 of the home controller 100 senses a control instruction to the specific target device due to selection of the control screen of the specific target device (for example, the control screen 10100 of the air conditioner) by the user (S15001). Next, the device control section 106 of the home controller 100 generates a control command in accordance with the selection by the user and transmits the generated control command to the specific target device 200 (S15002).

The specific target device 200 having received the control command executes the control command (S15003) and transmits a control result to the home controller 100 (S15004). In addition, the specific target device 200 notifies a change in a device state to the home controller 100 (S15005). The device management section 105 of the home controller 100 updates the status 1709 in the device list 1700 according to contents of the received device state change (S15006).

The display control section 103 of the home controller 100 updates the display of the control screen of the specific target device based on the received control result (S15007). The device management section 105 of the home controller 100 notifies the change in the device state to the server 300 (S15008). The server 300 updates the status 1608 in the device list 1600 according to the received change in device state (S15009).

Moreover, in FIG. 150, the specific target device 200 executes transmission of a control result (S15004) and notification of a change in device state (S15005) in separate steps. Alternatively, the specific target device 200 may simultaneously execute the transmission of a control result and the notification of a change in device state in a same step.

FIG. 151 is a sequence diagram showing an example of a process by which the home controller 100 acquires a state of the specific target device from the server 300. The specific target device 200 notifies a change in a device state to the server 300 (S15101). In this case, the specific target device 200 may periodically notify a change in the device state or may notify a change in the device state when such a state change occurs. The server 300 updates the status 1608 in the device list 1600 according to the received change in the device state (S15102).

The touch panel control section 102 of the home controller 100 senses selection of a device icon by the user (S15103). The display control section 103 of the home controller 100 transmits a request for a device state to the server 300 (S15104). In response to the received request for a device state, the server 300 transmits the device state to the home controller 100 (S15105). The display control section 103 of the home controller 100 displays the control screen of the specific target device based on the received device state (S15106). Moreover, S15101, S15102 and S15103 to S15106 are normally executed mutually asynchronously.

FIG. 152 is a sequence diagram showing another example of a process by which the home controller 100 acquires a state of the specific target device from the server 300. First, the touch panel control section 102 of the home controller 100 senses a control instruction to the specific target device due to selection of the control screen of the specific target device (for example, the control screen 10100 of the air conditioner) by the user (S15201). Next, the device control section 106 of the home controller 100 generates a control command in accordance with the selection by the user and transmits the generated control command to the server 300 (S15202).

The server 300 having received the control command transmits the control command to the specific target device 200 (S15203). The specific target device 200 having received the control command executes the control command (S15204) and transmits a control result to the server 300 (S15205). The specific target device 200 further notifies a change in a device state to the server 300 (S15206). The server 300 updates the status 1608 in the device list 1600 according to a content of the received change in the device state (S15207).

The server 300 having received the control result transmits the control result to the home controller 100 after updating the device list 1600 (S15208). The device management section 105 of the home controller 100 transmits a request for a device state to the server 300 (S15209). The server 300 having received the request for a device state transmits the device state to the home controller 100 (S15210). Based on the received device state, the display control section 103 of the home controller 100 updates the control screen of the specific target device (S15211).

Moreover, in FIG. 152, the specific target device 200 executes transmission of a control result (S15205) and notification of a change in device state (S15206) in separate steps. Alternatively, the specific target device 200 may simultaneously execute the transmission of a control result and the notification of a change in device state in a same step.

FIG. 153 is a sequence diagram showing an example of a process by which the home controller 100 acquires a device state from the specific target device 200. First, the touch panel control section 102 of the home controller 100 senses selection of a device icon by the user (S15301). Next, the display control section 103 of the home controller 100 transmits a request for a device state to the specific target device 200 corresponding to the selected device icon (S15302).

The specific target device 200 having received the request for a device state transmits the device state to the home controller 100 (S15303). The display control section 103 of the home controller 100 displays the control screen of the specific target device based on the received device state (S15304). The home controller 100 transmits the device state to the server 300 (S15305). The server 300 having received the device state updates the status 1608 in the device list 1600 (S15306).

FIG. 154 is a sequence diagram showing another example of a process by which the home controller 100 acquires a device state from the specific target device 200. First, the device control section 106 of the home controller 100 generates a control command for the specific target device (S15401). Next, the device control section 106 of the home controller 100 transmits the generated control command to the specific target device 200 (S15402).

The specific target device 200 having received the control command executes the control command (S15403) and transmits a control result to the home controller 100 (S15404). The display control section 103 of the home controller 100 having received the control result transmits a request for a device state to the specific target device 200 (S15405).

The specific target device 200 having received the request for a device state transmits the device state to the home controller 100 (S15406). The display control section 103 of the home controller 100 displays the control screen of the specific target device based on the received device state (S15407). The home controller 100 transmits the device state to the server 300 (S15408). The server 300 having received the device state updates the status 1608 in the device list 1600 (S15409).

(Control Flow of Specific Target Device when Device Icon is Used in Common)

Next, a flow of a process by which the home controller 100 controls the specific target device when a device icon is used in common will be described. Hereinafter, separate descriptions will be given for the display patterns P1 to P4 described earlier.

FIGS. 155A and 155B are flow diagrams showing an example of a flow of a process by which the home controller 100 controls the specific target device when a device icon is used in common. The flow diagrams represent an example of the display pattern P1. The display pattern P1 is a pattern where the detail control screen 522 is displayed in both an on state and an off state of the specific target device and the detail setting button 504 is not displayed.

Specifically, the touch panel control section 102 senses that a device icon 501 used in common has been selected by the user on the basic screen (S15501). The touch panel control section 102 senses that the used-in-common device icon 11301 of the air conditioner has been selected by the user on the basic screen shown in, for example, FIG. 80. Alternatively, the touch panel control section 102 senses that the used-in-common device icon 21301 of the television set has been selected by the user on the basic screen shown in, for example, the upper left diagram in FIG. 128.

Next, the display control section 103 moves all the device icons 501 out of the display region of the control screen of the device (S15502). In this case, for example, as shown in FIG. 81, the device icons 501 are moved outside the display region of the control screen 10100 of the air conditioner. Alternatively, for example, as shown in the upper right diagram in FIG. 128, the device icons 501 are moved outside the display region of the control screen 20100 of the television set.

Next, the display control section 103 then adjusts display positions of the moved device icons 501 (S15503). The display control section 103 adjusts display positions of the device icons so that the selected used-in-common device icon 11301 of the air conditioner is displayed on the display 101 as shown in, for example, FIG. 81. Alternatively, the display control section 103 adjusts display positions of the device icons so that the selected used-in-common device icon 21301 of the television set is displayed on the display 101 as shown in, for example, the upper right diagram in FIG. 128.

Next, the touch panel control section 102 determines whether or not a device corresponding to the device icon selected by the user is the specific target device (S15504). When the device corresponding to the selected device icon is not the specific target device (NO in S15504), the display control section 103 displays a control screen of the device corresponding to the selected device icon on the display 101 (S15505) and the process advances to S15521.

On the other hand, when the touch panel control section 102 determines in S15504 that the device corresponding to the selected device icon is the specific target device (YES in S15504), the display control section 103 displays the floor plan 500 as the control screen of the specific target device on the display 101 (S15506). In this case, when the touch panel control section 102 senses in S15501 that the used-in-common device icon 11301 of the air conditioner has been selected by the user or the used-in-common device icon 21301 of the television set has been selected by the user, the touch panel control section 102 determines in S15504 that a device corresponding to the selected device icon is the specific target device (YES in S15504). In addition, in S15506, the display control section 103 displays the control screen 10100 of the air conditioner or the control screen 20100 of the television set on the display 101.

Subsequently, the display control section 103 acquires an operation state of the specific target device from the status 1709 in the device list 1700 (S15507). Next, the display control section 103 draws a control screen based on the acquired operation state of the specific target device (S15508). The display control section 103 then determines whether or not there are other devices of the same type as the selected specific target device (S15509). When there are devices of the same type as the selected specific target device (YES in S15509), the display control section 103 displays the detail control screen 522 of a device arranged in a largest room on the display 101 (S15510) and the process is advanced to S15521. On the other hand, when there is no device of the same type as the selected specific target device (NO in S15509), the display control section 103 displays the detail control screen 522 of the selected device on the display 101 (S15511) and the process is advanced to S15521.

In S15521, when a start of contact made by the contacting object 10600 with the display 101 is sensed by the touch panel control section 102, the touch panel control section 102 determines whether or not a contact target is the device icon 501 (S15522).

When the touch panel control section 102 determines that the contact target of the contact is the device icon 501 (YES in S15522), the touch panel control section 102 determines whether or not the contacting object 10600 has made contact with the same device icon as the used-in-common device icon selected in S15501 (S15523). If not the same device icon (NO in S15523), the process returns to S15503. On the other hand, when it is determined that the contacting object 10600 has made contact with a device icon that is the same as the used-in-common device icon selected in S15501 (YES in S15523), the display control section 103 hides the control screen of the device and displays the basic screen on the display 101 (S15524) to finish the present flow.

On the other hand, when the touch panel control section 102 determines in S15522 that the contact is not with the device icon 501 (NO in S15522), the touch panel control section 102 further determines whether or not the contact target is the control screen of the device (S15525). When it is determined that the contact target is not the control screen of the device (NO in S15525), the process is advanced to S15524.

On the other hand, when the touch panel control section 102 determines in S15525 that the contacting object 10600 has made contact with a button or the like in the control screen of the device (YES in S15525), the process is advanced to the control flow (in case of the specific target device, FIG. 147 described earlier) of the device (S15526) and the process subsequently returns to S15521.

Moreover, in S15507, the display control section 103 acquires an operation state of the specific target device from the status 1709 in the device list 1700. Alternatively, the display control section 103 may acquire an operation state of the specific target device from the server 300. Further alternatively, the display control section 103 may acquire an operation state directly from the specific target device.

FIGS. 156A, 156B, and 156C are flow diagrams showing another example of a flow of a process by which the home controller 100 controls the specific target device when a device icon is used in common. The flow diagrams represent an example of the display pattern P2. The display pattern P2 is a pattern where the detail control screen 522 is displayed only in an on state of the specific target device and the detail setting button 504 is not displayed.

S15601 to S15609 are the same as S15501 to S15509 in FIG. 155A. In S15609, when there is another device of the same type as the selected specific target device (YES in S15609), the display control section 103 determines whether or not there is at least one device with power turned on (S15610).

When there is at least one device with power turned on (YES in S15610), the display control section 103 displays on the display 101, the detail control screen 522 of a device arranged in a largest room among the devices with their power turned on (S15611) and the process is advanced to S15612. On the other hand, if there is no device with power turned on (NO in S15610), the process is advanced to S15612. In S15612, the display control section 103 displays a type name and an operation state of the device with power turned off in the room in which the device is arranged on the display 101. In S15612, the display control section 103 displays the operation state display section 5511 including a description reading "air conditioner off" on the display 101 as shown in, for example, FIG. 113. Once S15612 is finished, the process is advanced to S15621.

On the other hand, in S15609, when there is no device of the same type as the selected specific target device (NO in S15609), the display control section 103 determines whether or not the operation state of the selected specific target device is a power off state (S15613). When the operation state of the selected specific target device is a power off state (YES in S15613), the display control section 103 displays a type name and an operation state of the device in the corresponding room in a similar manner to S15612 (S15614) and the process is advanced to S15621.

On the other hand, in S15613, when the operation state of the selected specific target device is not a power off state (NO in S15613), the display control section 103 displays the detail control screen 522 of the selected specific target device on the display 101 (S15616) and the process is advanced to S15621. S15621 to S15626 are the same as S15521 to S15526 in FIG. 155B.

FIGS. 157A and 157B are flow diagrams showing another example of a flow of a process by which the home controller 100 controls the specific target device when a device icon is used in common. The flow diagrams represent an example of the display pattern P3. The display pattern P3 is a pattern where the detail setting button 504 is displayed in both an on state and an off state of the specific target device.

S15701 to S15709 are the same as S15501 to S15509 in FIG. 155A. In S15709, when there are devices of the same type as the selected specific target device (YES in S15709), the display control section 103 displays the detail setting button 504 in all the rooms in which devices of the same type are arranged (S15710) and the process is advanced to S15721.

On the other hand, when there is no device of the same type as the selected specific target device (NO in S15709), the display control section 103 displays the detail setting button 504 of the selected specific target device in the corresponding room (S15711) and the process is advanced to S15721. S15721 to S15726 are the same as S15521 to S15526 in FIG. 155B.

FIGS. 158A, 158B, and 158C are flow diagrams showing yet another example of a flow of a process by which the home controller 100 controls the specific target device when a device icon is used in common. The flow diagrams represent an example of the display pattern P4. The display pattern P4 is a pattern where the detail setting button 504 is displayed only in an on state of the specific target device.

S15801 to S15809 are the same as S15501 to S15509 in FIG. 155A. In S15809, when there is another device of the same type as the selected specific target device (YES in S15809), the display control section 103 determines whether or not there is at least one device with power turned on (S15810).

When there is at least one device with power turned on (YES in S15810), the display control section 103 displays the detail setting button 504 in all the rooms in which devices with their power turned on are arranged on the display 101 (S15811) and the process is advanced to S15812. On the other hand, if there is no device with power turned on (NO in S15810), the process is advanced to S15812. In S15812, the display control section 103 displays a type name and an operation state of the device with power turned off in the room in which the device is arranged on the display 101. In S15812, the display control section 103 displays the operation state display section 5511 including a description reading "air conditioner off" on the display 101 as shown in, for example, FIG. 113. Once S15812 is finished, the process is advanced to S15821.

On the other hand, in S15809, when there is no device of the same type as the selected specific target device (NO in S15809), the display control section 103 determines whether or not the operation state of the selected specific target device is a power off state (S15813). When the operation state of the selected specific target device is a power off state (YES in S15813), the display control section 103 displays a type name and an operation state of the device in the corresponding room in a similar manner to S15812 (S15814) and the process is advanced to S15821.

On the other hand, in S15813, when the operation state of the selected specific target device is not a power off state (NO in S15813), the display control section 103 displays the detail setting button 504 of the selected specific target device on the display 101 (S15815) and the process is advanced to S15821. S15821 to S15826 are the same as S15521 to S15526 in FIG. 155B.

(Control Flow of Air Conditioner as Example of Specific Target Device)

Next, a flow of a process by which the home controller 100 controls an air conditioner as an example of the specific target device will be described.

FIGS. 159A, 159B, and 159C are flow diagrams showing an example of a flow of a process by which the home controller 100 controls the air conditioner as an example of the specific target device. The flow diagrams represent an example of the display pattern P1 or P3. The display pattern P1 is a pattern where the detail control screen 522 is displayed in both an on state and an off state of the specific target device and the detail setting button 504 is not displayed. The display pattern P3 is a pattern where the detail setting button 504 is displayed in both an on state and an off state of the specific target device.

S12251 to S12255 are the same as S12201 to S12205 in FIG. 145A. When the touch panel control section 102 determines in S12254 that the device corresponding to the selected device icon is the specific target device (in this case, the air conditioner) (YES in S12254), the display control section 103 displays the floor plan 500 as the control screen 10100 of the air conditioner on the display 101 (S12256). Subsequently, the display control section 103 acquires an operation state of the air conditioner from the status 1709 in the device list 1700 (S12257).

Next, based on the acquired operation state of the air conditioner, the display control section 103 determines whether or not the operation state of the air conditioner is a power off state (S12258). When the operation state of the air conditioner is a power off state (YES in S12258), the control target region 10101 of the air conditioner on the floor plan 500 is displayed darkly with brightness lower than the specified brightness (S12259) and the process is advanced to S12264.

On the other hand, in S12258, when the operation state of the air conditioner is not a power off state (NO in S12258), the display control section 103 determines whether or not the air conditioner is operating in the heater mode (S12260). When the air conditioner is operating in the heater mode (YES in S12260), the display control section 103 displays the control target region 10101 of the air conditioner on the floor plan 500 in a warm color (S12261) and the process is advanced to S12264.

On the other hand, in S12260, when the air conditioner is not operating in the heater mode (NO in S12260), the display control section 103 determines whether or not the air conditioner is operating in the cooler mode (S12262). When the air conditioner is operating in the cooler mode (YES in S12262), the display control section 103 displays the control target region 10101 of the air conditioner on the floor plan 500 in a cold color (S12263) and the process is advanced to S12264.

On the other hand, in S12262, even when the air conditioner is not operating in the cooler mode (NO in S12262), the display control section 103 displays the control target region 10101 of the air conditioner on the floor plan 500 in a cold color (S12263) and the process is advanced to S12264.

In S12264, the display control section 103 displays the detail setting button 504 or the detail control screen 522 of the air conditioner on the display 101. Once S12264 is finished, the process is advanced to S12265.

Subsequent S12265 to S12270 are substantially the same as S12211 to S12216 in FIG. 145B. However, in S12267, the touch panel control section 102 determines whether or not the contacting object 10600 has made contact with a device icon that is the same as the device icon of the air conditioner selected in S12251. In addition, in S12270, a control flow of the air conditioner is executed.

Moreover, in S12262, when the air conditioner is not operating in the cooler mode (NO in S12262), the process is advanced to S12263 and the control target region 10101 of the air conditioner on the floor plan 500 is displayed in a cold color. Alternatively, when the air conditioner is not operating in the cooler mode (NO in S12262), the control target region 10101 of the air conditioner on the floor plan 500 may be displayed in another color. Moreover, cases where the air conditioner is not operating in the cooler mode in S12262 include a dehumidifier mode.

In addition, in S12257, the display control section 103 acquires an operation state of the air conditioner from the status 1709 in the device list 1700. Alternatively, the display control section 103 may acquire an operation state of the air conditioner from the server 300. Further alternatively, the display control section 103 may acquire an operation state directly from the air conditioner.

Furthermore, in S12264, the display control section 103 displays the detail control screen 522 on the display 101 in case of the display pattern P1 and displays the detail setting button 504 on the display 101 in case of the display pattern P3.

FIG. 160 is a flow diagram showing another example of a flow of a process by which the home controller 100 controls the air conditioner as an example of the specific target device. The flow diagram shows an example of the display pattern P2 or P4. The display pattern P2 is a pattern where the detail control screen 522 is displayed only in an on state of the specific target device and the detail setting button 504 is not displayed. The display pattern P4 is a pattern where the detail setting button 504 is displayed only in an on state of the specific target device.

FIG. 160 only shows S12258 to S12264. Steps up to S12258 are the same as S12251 to S12257 shown in FIG. 159A and steps after S12264 are the same as S12265 to S12270 shown in FIG. 159C.

In S12258, based on the acquired operation state of the air conditioner, the display control section 103 determines whether or not the operation state of the air conditioner is a power off state. When the operation state of the air conditioner is a power off state (YES in S12258), the control target region 10101 of the air conditioner on the floor plan 500 is displayed darkly with brightness lower than the specified brightness (S12259) and the process is advanced to S12265. On the other hand, in S12258, when the operation state of the air conditioner is not a power off state (NO in S12258), the process is advanced to S12260. S12260 to S12264 are the same as S12260 to S12264 shown in FIG. 159B.

FIG. 161 is a flow chart showing a flow of a process by which the home controller 100 generates a control command of the air conditioner as an example of the specific target device in accordance with the content of a contact made by the contacting object 10600.

First, the touch panel control section 102 determines whether or not contact made by the contacting object 10600 has been sensed in a control target region of the air conditioner on the floor plan 500 (in other words, the control screen of the air conditioner) (S16101). When contact made by the contacting object 10600 had not been sensed in a control target region of the air conditioner (NO in S16101), the touch panel control section 102 determines whether or not contact made by the contacting object 10600 has been sensed on the detail control screen 522 of the air conditioner (S16104).

When contact made by the contacting object 10600 had also not been sensed on the detail control screen 522 of the air conditioner (NO in S16104), the touch panel control section 102 determines whether or not contact made by the contacting object 10600 has been sensed on the detail setting, button 504 of the air conditioner (S16106). When contact made by the contacting, object 10600 had also not been sensed on the detail setting button 504 of the air conditioner (NO in S16106), the present flow is terminated.

On the other hand, when the touch panel control section 102 senses contact made by the contacting object 10600 in the control target region of the air conditioner in S16101 (YES in S16101), the process is advanced to S16102. In addition, when the touch panel control section 102 senses contact made by the contacting object 10600 on the detail control screen 522 of the air conditioner in S16104 (YES in S16104), the process is advanced to S16105.

When the touch panel control section 102 senses contact made by the contacting object 10600 on the detail setting button 504 of the air conditioner in S16106 (YES in S16106), the display control section 103 switches between display and non-display of the detail control screen 522 (S16107) and terminates the present flow. In other words, in S16107, when the detail control screen 522 is displayed, the detail control screen 522 is erased, and when the detail control screen 522 is not displayed, the detail control screen 522 is displayed.

In S16102, the device control section 106 generates a control command for turning off the power of the device if the power of the device is turned on and generates a control command for turning on the power of the device if the power of the device is turned off, and subsequently the process advances to S16103. In S16105, the device control section 106 generates a control command corresponding to the control selected on the detail control screen 522, and the process advances to S16103.

In S16103, the process is advanced to a control command transmission flow and, subsequently, the display control section 103 acquires an operation state of the air conditioner from the status 1709 in the device list 1700 (S16108). Next, the process is advanced to the display control flow (S16111) and, subsequently, the present flow is terminated.

The control command transmission flow in S16103 is executed in a similar process flow as, for example, the process flow shown in the flow chart in FIG. 41. Moreover, in the present control of the air conditioner, the device that is a control command transmission destination in S3702 and S3703 in FIG. 41 corresponds to the air conditioner corresponding to the selected device icon of the air conditioner. In addition, in the present control of the air conditioner, the simultaneously operated devices in S3706 in FIG. 41 correspond to, for example, air conditioners in a plurality of rooms corresponding to the used-in-common device icon of the air conditioner.

FIG. 162 is a flow chart showing an example of the display control flow in S16111 in FIG. 161. The flow chart represents an example of the display pattern P1 in which the detail control screen 522 is displayed in both an on state and an off state of the specific target device and the detail setting button 504 is not displayed.

First, the display control section 103 determines whether or not the device control section 106 has switched the power of the air conditioner from an on state to an off state (S16201). When the power of the air conditioner has been switched from an on state to an off state (YES in S16201), the display control section 103 changes the control target region 10101 of the air conditioner on the floor plan 500 to a display corresponding to an off state (S16202). Next, the detail control screen 522 of the air conditioner is changed to the display corresponding to an off state (S16203) and the present flow is terminated.

On the other hand, in S16201, when the power of the air conditioner has not been switched from an on state to an off state (NO in S16201), the display control section 103 determines whether or not the air conditioner is operating in the heater mode based on the operation state acquired in S16108 (S16204). When the air conditioner is operating in the heater mode (YES in S16204), the display control section 103 displays the control target region 10101 of the air conditioner on the floor plan 500 in a warm color (S16205) and the process is advanced to S16208.

On the other hand, in S16204, when the air conditioner is not operating in the heater mode (NO in S16204), the display control section 103 determines whether or not the air conditioner is operating in the cooler mode (S16206). When the air conditioner is operating in the cooler mode (YES in S16206), the display control section 103 displays the control target region 10101 of the air conditioner on the floor plan 500 in a cold color (S16207) and the process is advanced to S16208.

On the other hand, in S16206, even when the air conditioner is not operating in the cooler mode (NO in S16206), the display control section 103 displays the control target region 10101 of the air conditioner on the floor plan 500 in a cold color (S16207) and the process is advanced to S16208.

In S16208, the display control section 103 determines whether or not the detail control screen 522 of the air conditioner in another room is already displayed on the display 101. When the detail control screen 522 of the air conditioner in another room is already displayed on the display 101 (YES in S16208), the display control section 103 switches the displayed detail control screen 522 to a screen of the air conditioner corresponding to the room (S16209) and the present flow is terminated.

On the other hand, in S16208, when the detail control screen 522 of the air conditioner in another room is not displayed on the display 101 (NO in S16208), the display control section 103 changes the detail control screen 522 of the air conditioner to a display corresponding to the operation state (S16210) and the present flow is terminated.

Moreover, in S16206, when the air conditioner is not operating in the cooler mode (NO in S16206), the process is advanced to S16207 and the control target region 10101 of the air conditioner on the floor plan 500 is displayed in a cold color. Alternatively, when the air conditioner is not operating in the cooler mode (NO in S16206), the control target region 10101 of the air conditioner on the floor plan 500 may be displayed in another color. Moreover, cases where the air conditioner is not operating in the cooler mode in S16206 include a dehumidifier mode.

FIG. 163 is a flow chart showing another example of the display control flow in S16111 in FIG. 161. The flow chart represents an example of the display pattern P2 in which the detail control screen 522 is displayed only in an on state of the specific target device and the detail setting button 504 is not displayed.

S16301 and S16302 are the same as S16201 and S16202 in FIG. 162. Following S16302, the display control section 103 erases the detail control screen 522 of the air conditioner from the display 101 (S16303). Next, the display control section 103 displays a text reading "air conditioner" and an operation state in the room corresponding to the air conditioner on the display 101 (S16304). In S16304, the display control section 103 displays the operation state display section 551 including a description reading "air conditioner off" on the display 101 as shown in, for example, FIG. 85. Once S16304 is finished, the present flow is terminated.

On the other hand, in S16301, when the power of the air conditioner has not been switched from an on state to an off state (NO in S16301), the process is advanced to S16305. S16305 to S16310 are the same as S16204 to S16209 in FIG. 162.

In S16309, when the detail control screen 522 of the air conditioner in another room is not displayed on the display 101 (NO in S16309), the display control section 103 determines whether or not the detail control screen 522 of the corresponding air conditioner is already displayed on the display 101 (S16311). When the detail control screen 522 of the corresponding air conditioner is already displayed on the display 101 (YES in S16311), the display control section 103 changes the detail control screen 522 of the air conditioner to a display corresponding to the operation state (S16312) and the present flow is terminated.

On the other hand, in S16311, when the detail control screen 522 of the corresponding air conditioner is not displayed on the display 101 (NO in S16311), the display control section 103 displays the detail control screen 522 of the air conditioner on the display 101 (S16313) and the present flow is terminated.

FIG. 164 is a flow chart showing yet another example of the display control flow in S16111 in FIG. 161. The flow chart represents an example of the display pattern P3 in which the detail setting button 504 is displayed in both an on state and an off state of the specific target device.

S16401 and S16402 are the same as S16201 and S16202 in FIG. 162. Following S16402, the display control section 103 erases the detail control screen 522 of the air conditioner from the display 101 (S16403) and the present flow is terminated.

On the other hand, in S16401, when the power of the air conditioner has not been switched from an on state to an off state (NO in S16401), the process is advanced to S16404. S16404 to S16409 are the same as S16204 to S16209 in FIG. 162.

In S16408, when the detail control screen 522 of the air conditioner in another room is not displayed on the display 101 (NO in S16408), the process is advanced to S16410. S16410 and S16411 are the same as S16311 and S16312 in FIG. 163. In S16410, when the detail control screen 522 of the corresponding air conditioner is not displayed on the display 101 (NO in S16410), the present process is terminated.

FIG. 165 is a flow chart showing yet another example of the display control flow in S16111 in FIG. 161. The flow chart represents an example of the display pattern P4 in which the detail setting button 504 is displayed only when the specific target device is in an on state.

S16501 and S16502 are the same as S16201 and S16202 in FIG. 162. S16503 and S16504 are the same as S16303 and S16304 in FIG. 163. Once S16504 is finished, the present flow is terminated.

In S16501, when the power of the air conditioner has not been switched from an on state to an off state (NO in S16501), the process is advanced to S16505. S16505 to S16510 are the same as S16204 to S16209 in FIG. 162. In S16509, when the detail control screen 522 of the air conditioner in another room is not displayed on the display 101 (NO in S16509), the process is advanced to S16511. S16511 and S16512 are the same as S16311 and S16312 in FIG. 163.

In S16511, when the detail control screen 522 of the corresponding air conditioner is not displayed on the display 101 (NO in S16511), the display control section 103 determines whether or not the detail setting button 504 of the air conditioner is already displayed on the display 101 (S16513). When the detail setting button 504 of the air conditioner is already displayed on the display 101 (YES in S16513), the present flow is terminated. On the other hand, in S16513, when the detail setting button 504 of the air conditioner is not displayed on the display 101 (NO in S16513), the display control section 103 displays the detail setting button 504 of the air conditioner on the display 101 (S16514) and the present flow is terminated.

(Control Flow of Air Conditioner when Device Icon is Used in Common)

Next, a flow of a process by which the home controller 100 controls the air conditioner as an example of the specific target device when the device icon is used in common will be described. Hereinafter, separate descriptions will be given for the display patterns P1 to P4 described earlier.

FIGS. 166A, 166B. 166C, and 166D are flow diagrams showing an example of a flow of a process by which the home controller 100 controls the air conditioner as an example of the specific target device when the device icon is used in common. The flow diagrams represent an example of the display pattern P1. The display pattern P1 is a pattern where the detail control screen 522 is displayed in both an on state and an off state of the specific target device and the detail setting button 504 is not displayed.

S16601 to S16605 are the same as S15501 to S15505 in FIG. 155A. In S16604, when the touch panel control section 102 determines that the device corresponding to the selected device icon is the specific target device (in this case, the air conditioner) (YES in S16604), the display control section 103 displays the floor plan 500 as the control screen 10100 of the air conditioner on the display 101 (S16606). Subsequently, the display control section 103 acquires an operation state of the air conditioner from the status 1709 in the device list 1700 (S16607).

Next, the display control section 103 determines whether or not there is the air conditioner with power turned off (S16608). When there is the air conditioner with power turned off (YES in S16608), the display control section 103 displays the control target region of the air conditioner with power turned off darkly with brightness lower than the specified brightness (S16609) and the process is advanced to S16610. On the other hand, in S16608, when there is no air conditioner with power turned off (NO in S16608), the process is advanced to S16610.

In S16610, the display control section 103 determines whether there is the air conditioner operating in the heater mode. When there is the air conditioner operating in the heater mode (YES in S16610), the display control section 103 displays the control target region of the air conditioner that is operating in the heater mode in a warm color (S16611) and the process is advanced to S16612. On the other hand, in S16610, when there is no air conditioner that is operating in the heater mode (NO in S16610), the process is advanced to S16612.

In S16612, the display control section 103 determines whether there is the air conditioner operating in the cooler mode. When there is the air conditioner operating in the cooler mode (YES in S16612), the process is advanced to S16613. On the other hand, even when there is no air conditioner operating in the cooler mode (NO in S16612), the process is advanced to S16613. In S16613, the display control section 103 displays the control target region of air conditioners other than air conditioners with power turned off and air conditioners operating in the heater mode in a cold color and the process is advanced to S16614.

In S16614, the display control section 103 determines whether or not a plurality of air conditioners are installed (S16614). When a plurality of air conditioners are installed (YES in S16614), the display control section 103 displays the detail control screen 522 of the air conditioner installed in a largest room (S16615) and the process is advanced to S16617. When a plurality of air conditioners are not installed (NO in S16614), the display control section 103 displays the detail control screen 522 of the air conditioner corresponding to the device icon selected in S16601 (S16616) and the process is advanced to S16617.

In S16617, when a start of contact made by the contacting object 10600 with the display 101 is sensed by the touch panel control section 102, the touch panel control section 102 determines whether or not a contact target is the device icon 501 (S16618).

When the touch panel control section 102 determines that the contact target of the contact is the device icon 501 (YES in S16618), the touch panel control section 102 determines whether or not the contacting object 10600 has made contact with the same device icon as the used-in-common device icon (in this case, the used-in-common device icon of the air conditioner) selected in S16601 (S16619). If not the same device icon (NO in S16619), the process returns to S16603. On the other hand, when it is determined that the contacting object 10600 has made contact with the device icon that is the same as the used-in-common device icon selected in S16601 (YES in S16619), the display control section 103 hides the control screen of the air conditioner and displays the basic screen on the display 101 (S16620) to finish the present flow.

On the other hand, when the touch panel control section 102 determines in S16618 that the contact is not with the device icon 501 (NO in S16618), the touch panel control section 102 further determines whether or not the contact target is the control screen of the air conditioner (S16621). When it is determined that the contact target is not the control screen of the air conditioner (NO in S16621), the process is advanced to S16620.

On the other hand, when the touch panel control section 102 determines in S16621 that the contacting object 10600 has made contact with a button or the like in the control screen of the air conditioner (YES in S16621), the process is advanced to the control flow (for example, FIG. 161 described earlier) of the air conditioner (S16622) and the process subsequently returns to S16617.

Moreover, in S16607, the display control section 103 acquires an operation state of the air conditioner from the status 1709 in the device list 1700. Alternatively, the display control section 103 may acquire an operation state of the air conditioner from the server 300. Further alternatively, the display control section 103 may acquire an operation state directly from the air conditioner.

FIG. 167 is a flow chart showing another example of a flow of a process by which the home controller 100 controls the air conditioner as an example of the specific target device when the device icon is used in common. This flow diagram shows an example of the display pattern P2. The display pattern P2 is a pattern where the detail control screen 522 is displayed only in an on state of the specific target device and the detail setting button 504 is not displayed.

FIG. 167 only shows S16701 to S16707. Steps up to S16701 are the same as S16601 to S16613 shown in FIGS. 166A and 166B and steps after S16707 are the same as S16617 to S16622 shown in FIG. 166D.

In S16701, the display control section 103 determines whether or not a plurality of air conditioners are installed. When a plurality of air conditioners are installed (YES in S16701), the display control section 103 determines whether or not there is at least one air conditioner with power turned on (S16702).

When there is at least one air conditioner with power turned on (YES in S16702), the display control section 103 displays on the display 101, the detail control screen 522 of the air conditioner arranged in a largest room among the air conditioners with their power turned on (S16703) and the process is advanced to S16704. On the other hand, if there is no air conditioner with power turned on (NO in S16702), the process is advanced to S16704.

In S16704, the display control section 103 displays a text reading "air conditioner" and an operation state in the room in which the air conditioner with its power turned off is arranged on the display 101. In S16704, the display control section 103 displays the operation state display section 5511 including a description reading "air conditioner off" on the display 101 as shown in, for example, FIG. 113. Once S16704 is finished, the process is advanced to S16617 (FIG. 166D).

On the other hand, in S16701, when a plurality of air conditioners are not installed (NO in S16701), the display control section 103 determines whether or not an operation state of the selected air conditioner is a power off state (S16705). When the operation state of the selected air conditioner is a power off state (YES in S16705), the display control section 103 displays a type name and an operation state of the device in the corresponding room in a similar manner to S16704 (S16706) and the process is advanced to S16617 (FIG. 166D).

On the other hand, in S16705, when the operation state of the selected air conditioner is not a power off state (NO in S16705), the display control section 103 displays the detail control screen 522 of the selected air conditioner on the display 101 (S16707) and the process is advanced to S16617 (FIG. 166D).

FIG. 168 is a flow chart showing yet another example of a flow of a process by which the home controller 100 controls the air conditioner as an example of the specific target device when the device icon is used in common. The flow diagram represents an example of the display pattern P3. The display pattern P3 is a pattern where the detail setting button 504 is displayed in both an on state and an off state of the specific target device.

FIG. 168 only shows S16801 to S16803. Steps up to S16801 are the same as S16601 to S16613 shown in FIGS. 166A and 166B and steps after S16803 are the same as S16617 to S16622 shown in FIG. 166D.

In S16801, the display control section 103 determines whether or not a plurality of air conditioners are installed. When a plurality of air conditioners are installed (YES in S16801), the display control section 103 displays the detail setting button 504 in all of the rooms in which the air conditioner is installed (S16802) and the process is advanced to S16617 (FIG. 166D).

On the other hand, when a plurality of air conditioners are not installed (NO in S16801), the display control section 103 displays the detail setting button 504 of the air conditioner corresponding to the device icon selected in S16601 (S16803) and the process is advanced to S16617 (FIG. 166D).

FIG. 169 is a flow chart showing yet another example of a flow of a process by which the home controller 100 controls the air conditioner as an example of the specific target device when the device icon is used in common. The flow diagram represents an example of the display pattern P4. The display pattern P4 is a pattern where the detail setting button 504 is displayed only in an on state of the specific target device.

FIG. 169 only shows S16901 to S16907. Steps up to S16901 are the same as S16601 to S16613 shown in FIGS. 166A and 166B and steps after S16907 are the same as S16617 to S16622 shown in FIG. 166D.

In S16901, the display control section 103 determines whether or not a plurality of air conditioners are installed. When a plurality of air conditioners are installed (YES in S16901), the display control section 103 determines whether or not there is at least one air conditioner with power turned on (S16902).

When there is at least one air conditioner with power turned on (YES in S16902), the display control section 103 displays the detail setting button 504 in all rooms in which air conditioners with their power turned on are arranged on the display 101 (S16903) and the process is advanced to S16904. On the other hand, if there is no air conditioner with power turned on (NO in S16902), the process is advanced to S16904.

In S16904, the display control section 103 displays a text reading "air conditioner" and an operation state in the room in which the air conditioner with its power turned off is arranged on the display 101. In S16904, the display control section 103 displays the operation state display section 551 including a description reading "air conditioner off" on the display 101 as shown in, for example, FIG. 85. Once S16904 is finished, the process is advanced to S16617 (FIG. 166D).

On the other hand, in S16901, when a plurality of air conditioners are not installed (NO in S16901), the display control section 103 determines whether or not an operation state of the selected air conditioner is a power off state (S16905). When the operation state of the selected air conditioner is a power off state (YES in S16905), the display control section 103 displays a type name and an operation state of the device in the corresponding room in a similar manner to S16904 (S16906) and the process is advanced to S16617 (FIG. 166D).

On the other hand, in S16905, when the operation state of the selected air conditioner is not a power off state (NO in S16905), the display control section 103 displays the detail setting button 504 of the selected air conditioner on the display 101 (S16907) and the process is advanced to S16617 (FIG. 166D).

Moreover, in the present specification, a "warm color" refers to a color in a range of for example, 5RP to 5GY in the Munsell color system. In addition, in the present specification, a "cold color" refers to a color in a range of, for example, 10PB to 10BG in the Munsell color system.

INDUSTRIAL APPLICABILITY

The present disclosure provides a useful control method of suitably controlling one or more target devices connected to a network.

The invention claimed is:

1. A method for controlling an information apparatus, the information apparatus having a display and being connected to a network, one or more target devices being controlled over the network, the method causing a computer of the information apparatus to:

display, on the display, a display screen representing a floor plan of one floor including at least two rooms;

display at least one device icon, including a device icon representing an air conditioner; and output an on-off control command to the network, when a selection of the device icon representing the air conditioner is sensed in a region of a first room of the at least two rooms included in the floor plan, and then a selection of the region of the first room is sensed at a position where no device icon is displayed after the selection of the device icon is sensed, the on-off control command controlling an on-off state of power of the air conditioner corresponding to the first room, wherein the on-off control command is not output to the network after the selection of the specific device icon is sensed until the selection of the region of the first room is sensed at the position where no device icon is displayed, wherein, when the power of the air conditioner is turned on and when the air conditioner is operated as a heater, a region on the display screen corresponding to the first room is displayed using a warm color, and when the power of the air conditioner is turned off, the region on the display screen corresponding to the first room is displayed with brightness lower than specified brightness.

2. The method according to claim 1, wherein when the selection of the device icon representing the air conditioner is sensed in the region of the first room, the device icon representing the air conditioner is moved outside of the region corresponding to the first room.

3. The method according to claim 1, wherein when the selection of the device icon representing the air conditioner is sensed, the device icon representing the air conditioner is moved outside of the floor plan represented in the display screen.

4. The method according to claim 1, wherein when the selection of the device icon representing the air conditioner is sensed in the region of the first room, an operation screen for the air conditioner corresponding to the first room is displayed on the display screen.

5. The method according to claim 4, wherein when the air conditioner is switched to an off state by sensing the selection of the region of the first room, and after the operation screen for the air conditioner corresponding to the first room is displayed on the display screen, the operation screen is continued to be displayed.

6. The method according to claim 1, wherein when the selection of the device icon representing the air conditioner is sensed and the air conditioner corresponding to the first room is in an on state, an operation screen for the air conditioner corresponding to the first room is displayed on the display screen.

7. The method according to claim 6, wherein when the air conditioner is switched to an off state by sensing the selection of the region of the first room, and after the operation screen for the air conditioner corresponding to the first room is displayed on the display screen, the displayed operation screen is erased from the display screen.

8. The method according to claim 7, wherein when the displayed operation screen is erased from the display screen, status information regarding the air conditioner is displayed on the display screen.

9. The method according to claim 1, wherein the display comprises a touch panel display, and sensing of the selection of the device icon representing the air conditioner in the region of the first room or sensing of the selection of the region of the first room, is performed by sensing a contact to the touch panel display.

10. The method according to claim 1, wherein sensing of the selection of the device icon representing the air conditioner in the region of the first room or sensing of the selection of the region of the first room, is performed by sensing a click of a mouse pointer.

11. The method according to claim 1, wherein when a selection of a device icon representing a target device other than the air conditioner is sensed, a control screen is displayed on the display screen representing the floor plan, the control screen being used either for operation or for state confirmation of the air conditioner.

12. The method according to claim 1, wherein when the power of the air conditioner is turned on and the air conditioner is operated as a cooler, a region on the display screen corresponding to the first room, is displayed using a cold color.

13. The method according to claim 1, wherein when the power of the air conditioner is turned on and the air conditioner is operated as a heater, a display image stating that the air conditioner operates as a heater is provided in the region on the display screen corresponding to the first room.

14. The method according to claim 13, wherein when the power of the air conditioner is turned off, a display image stating that the power of the air conditioner has been turned off is provided in the region on the display screen corresponding to the first room.

15. The method according to claim 1, wherein when the power of the air conditioner is turned on and the air conditioner is operated as a cooler, a display image stating that the air conditioner operates as a cooler is provided in the region on the display screen corresponding to the first room.

16. A non-transitory computer-readable recording medium which stores a program to be executed by an information apparatus, the information apparatus having a display and being connected to a network, one or more target devices being controlled over the network, the program causing a computer of the information apparatus to:

display, on the display, a display screen representing a floor plan of one floor including at least two rooms;

display at least one device icon, including a device icon representing an air conditioner; and output an on-off control command to the network, when a selection of the device icon representing the air conditioner is sensed in a region of a first room of the at least two rooms included in the floor plan, and then a selection of the region of the first room is sensed at a position where no device icon is displayed after the selection of the device icon is sensed, the on-off control command controlling an on-off state of power of the air conditioner corresponding to the first room, wherein the on-off control command is not output to the network after the selection of the specific device icon is sensed until the selection of the region of the first room is sensed at the position where no device icon is displayed, wherein, when the power of the air conditioner is turned on and when the air conditioner is operated as a heater, a region on the display screen corresponding to the first room is displayed using a warm color, and when the power of the air conditioner is turned off, the region on the display screen corresponding to the first room is displayed with brightness lower than specified brightness.

* * * * *